(12) United States Patent
Kondo et al.

(10) Patent No.: US 7,139,019 B2
(45) Date of Patent: Nov. 21, 2006

(54) IMAGE PROCESSING DEVICE

(75) Inventors: Tetsujiro Kondo, Tokyo (JP); Junichi Ishibashi, Saitama (JP); Takashi Sawao, Tokyo (JP); Takahiro Nagano, Kanagawa (JP); Naoki Fujiwara, Tokyo (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 697 days.

(21) Appl. No.: 10/343,675

(22) PCT Filed: May 24, 2002

(86) PCT No.: PCT/JP02/05045

§ 371 (c)(1),
(2), (4) Date: Jun. 27, 2003

(87) PCT Pub. No.: WO02/099753

PCT Pub. Date: Dec. 12, 2002

(65) Prior Publication Data
US 2004/0021775 A1    Feb. 5, 2004

(30) Foreign Application Priority Data

| Jun. 5, 2001 | (JP) | ............................ 2001-169946 |
| Jun. 19, 2001 | (JP) | ............................ 2001-184421 |
| Jun. 22, 2001 | (JP) | ............................ 2001-189197 |
| Jun. 22, 2001 | (JP) | ............................ 2001-189198 |

(51) Int. Cl.
*H04N 5/14* (2006.01)

(52) U.S. Cl. ................................................. 348/222.1

(58) Field of Classification Search ............. 348/222.1, 348/699, 443, 460, 461, 701, 345, 169; 382/292–293, 382/103, 48, 107
See application file for complete search history.

(56) References Cited

U.S. PATENT DOCUMENTS

| 4,862,259 | A | * | 8/1989 | Gillard et al. ............... 348/699 |
| 4,901,145 | A | * | 2/1990 | Harradine et al. .......... 348/443 |
| 4,992,869 | A | | 2/1991 | Samad et al. |
| 5,162,907 | A | * | 11/1992 | Keating et al. ........ 375/240.16 |
| 5,365,603 | A | * | 11/1994 | Karmann ..................... 382/291 |

(Continued)

FOREIGN PATENT DOCUMENTS

EP    0 395 274    10/1990

(Continued)

*Primary Examiner*—Paulos M. Natnael
(74) *Attorney, Agent, or Firm*—Frommer Lawrence & Haug LLP; William S. Frommer

(57) ABSTRACT

The present invention enables a movement vector of a moving object to the detected, by detecting a mixture ratio indicating the proportion of mixing with an image, or taking into consideration a region mixed with the image. A weighted frame difference computation unit 3423 outputs weighted difference. A movement compensation unit 3424 and a correlation value computing unit 3427 compute the correlation between a block of interest containing each pixel of interest of weighted difference image data, and a corresponding block of weighted difference image data of an adjacent frame. A maximum value judgment unit 3428 detects at least one of weight and a movement vector wherein correlation between weighted difference image data is greatest. The present invention can be applied to signals processing device s for processing images.

131 Claims, 143 Drawing Sheets

U.S. PATENT DOCUMENTS

| | | | |
|---|---|---|---|
| 5,442,409 A * | 8/1995 | Morgan | 348/699 |
| 5,497,338 A * | 3/1996 | Miyake et al. | 382/232 |
| 5,513,281 A * | 4/1996 | Yamashita et al. | 382/278 |
| 5,537,155 A * | 7/1996 | O'Connell et al. | 348/699 |
| 5,587,927 A * | 12/1996 | Nagao et al. | 702/167 |
| 5,731,849 A * | 3/1998 | Kondo et al. | 348/699 |
| 5,778,099 A * | 7/1998 | Suzuki | 382/239 |
| 6,067,114 A * | 5/2000 | Omata et al. | 348/345 |
| 6,298,144 B1 * | 10/2001 | Pucker et al. | 382/103 |
| 6,661,470 B1 * | 12/2003 | Kawakami et al. | 348/699 |
| 6,763,148 B1 * | 7/2004 | Sternberg et al. | 382/293 |
| 6,970,507 B1 * | 11/2005 | Musmann et al. | 375/240.12 |
| 7,053,944 B1 * | 5/2006 | Acharya et al. | 348/273 |
| 2004/0022419 A1 * | 2/2004 | Kesaniemi | 382/107 |

FOREIGN PATENT DOCUMENTS

| | | |
|---|---|---|
| EP | 0 933 727 | 8/1999 |
| JP | 3-62692 | 3/1991 |
| JP | 7-336688 | 12/1995 |
| JP | 10-164436 | 6/1998 |
| JP | 2000-30040 | 1/2000 |
| JP | 2001-250119 | 9/2001 |

* cited by examiner

FIG. 3
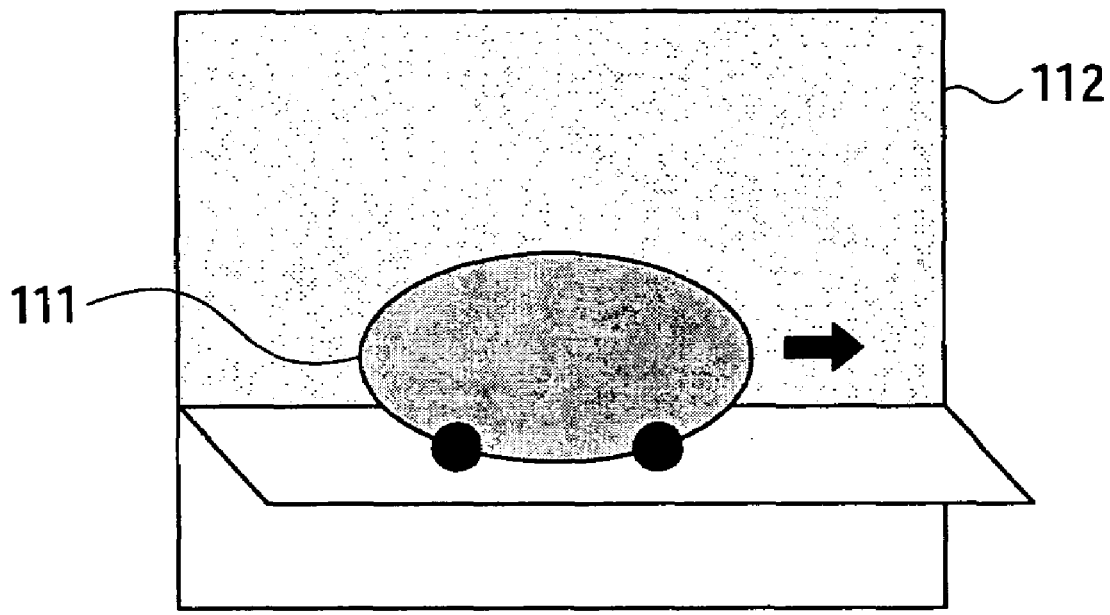
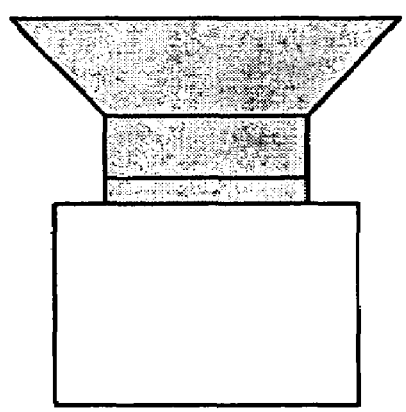

| REGION | | DESCRIPTION |
|---|---|---|
| BACKGROUND REGION | | STILL REGION |
| FOREGROUND REGION | | MOVING REGION |
| MIXED REGION | COVERED BACKGROUND REGION | PORTION WHICH CHANGES FROM BACKGROUND TO FOREGROUND |
| | UNCOVERED BACKGROUND REGION | PORTION WHICH CHANGES FROM FOREGROUND TO BACKGROUND |

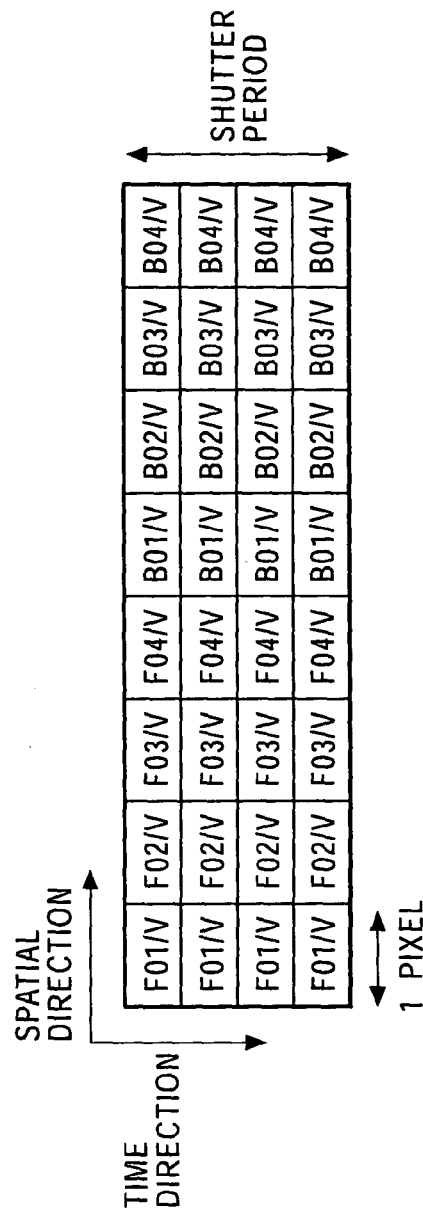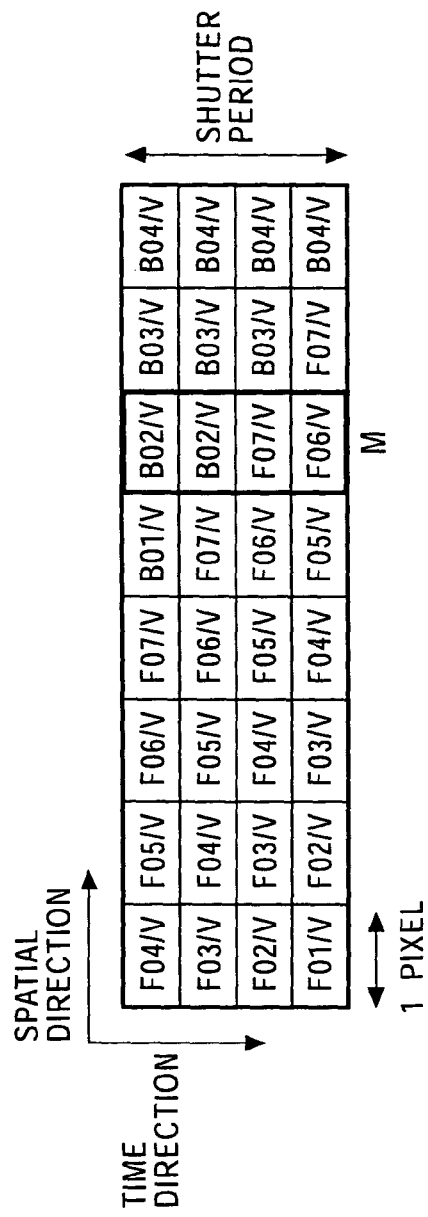

FIG. 25

| REGION JUDGEMENT | STILL/MOTION JUDGEMENT IN FRAME #n-2 AND FRAME #n-1 | STILL/MOTION JUDGEMENT IN FRAME #n-1 AND FRAME #n | STILL/MOTION JUDGEMENT IN FRAME #n AND FRAME #n+1 | STILL/MOTION JUDGEMENT IN FRAME #n+1 AND FRAME #n+2 |
|---|---|---|---|---|
| COVERED BACKGROUND REGION JUDGEMENT | STILL | MOTION | — | — |
| STILL REGION JUDGEMENT | — | STILL | STILL | — |
| MOVING REGION JUDGEMENT | — | MOTION | MOTION | — |
| UNCOVERED BACKGROUND REGION JUDGEMENT | — | — | MOTION | STILL |

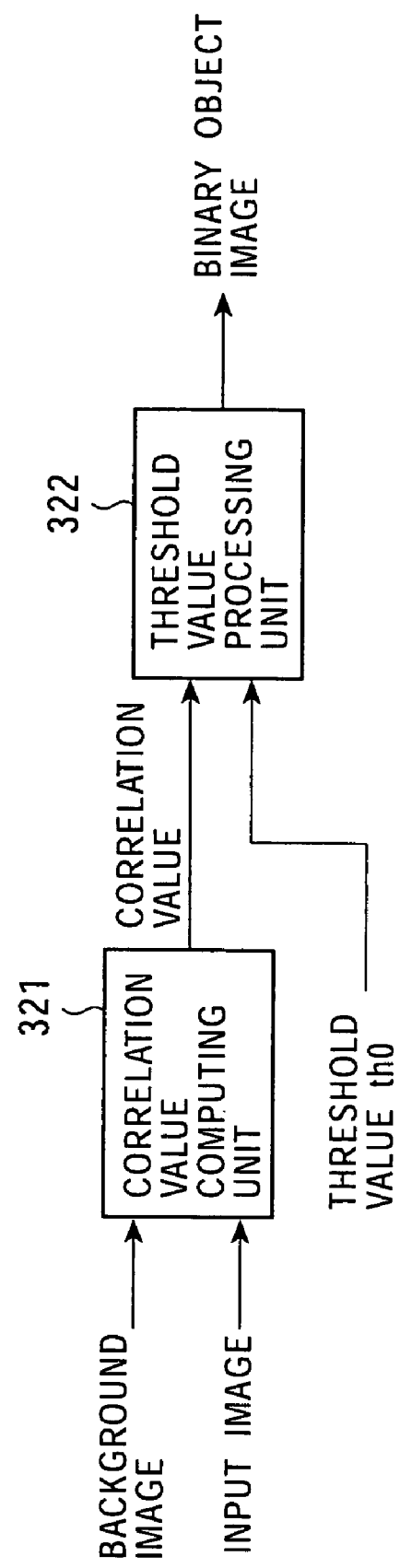

FIG. 33A

| $X_0$ | $X_1$ | $X_2$ |
|---|---|---|
| $X_3$ | $X_4$ | $X_5$ |
| $X_6$ | $X_7$ | $X_8$ |

FIG. 33B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 34A

| $X_0$ | $X_1$ | $X_2$ |
|---|---|---|
| $X_3$ | $X_4$ | $X_5$ |
| $X_6$ | $X_7$ | $X_8$ |

FIG. 34B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 37

| | BACKGROUND REGION | FOREGROUND REGION | COVERED BACKGROUND REGION | UNCOVERED BACKGROUND REGION |
|---|---|---|---|---|
| FRAME #n-1 | 1 | 1 | 0 | 1 |
| FRAME #n | 0 | 1 | 1 | 1 |
| FRAME #n+1 | 1 | 1 | 1 | 0 |

FIG. 54A

| A0 | A1 | A2 |
|----|----|----|
| A3 | A4 | A5 |
| A6 | A7 | A8 |

FIG. 54B

| B0 | B1 | B2 |
|----|----|----|
| B3 | B4 | B5 |
| B6 | B7 | B8 |

FIG. 59A
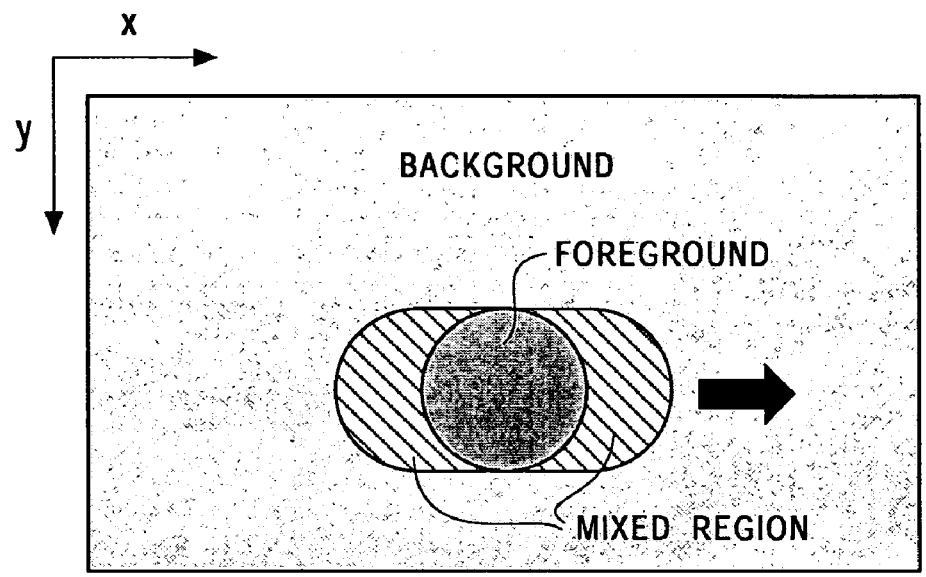
FOREGROUND/BACKGROUND SEPARATION
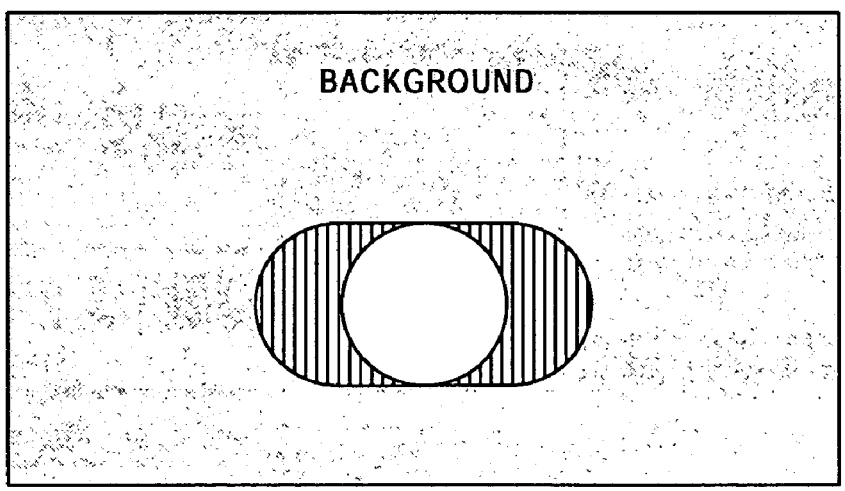
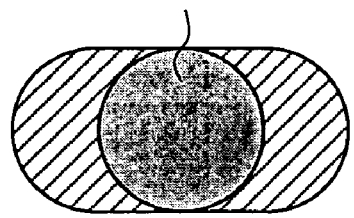

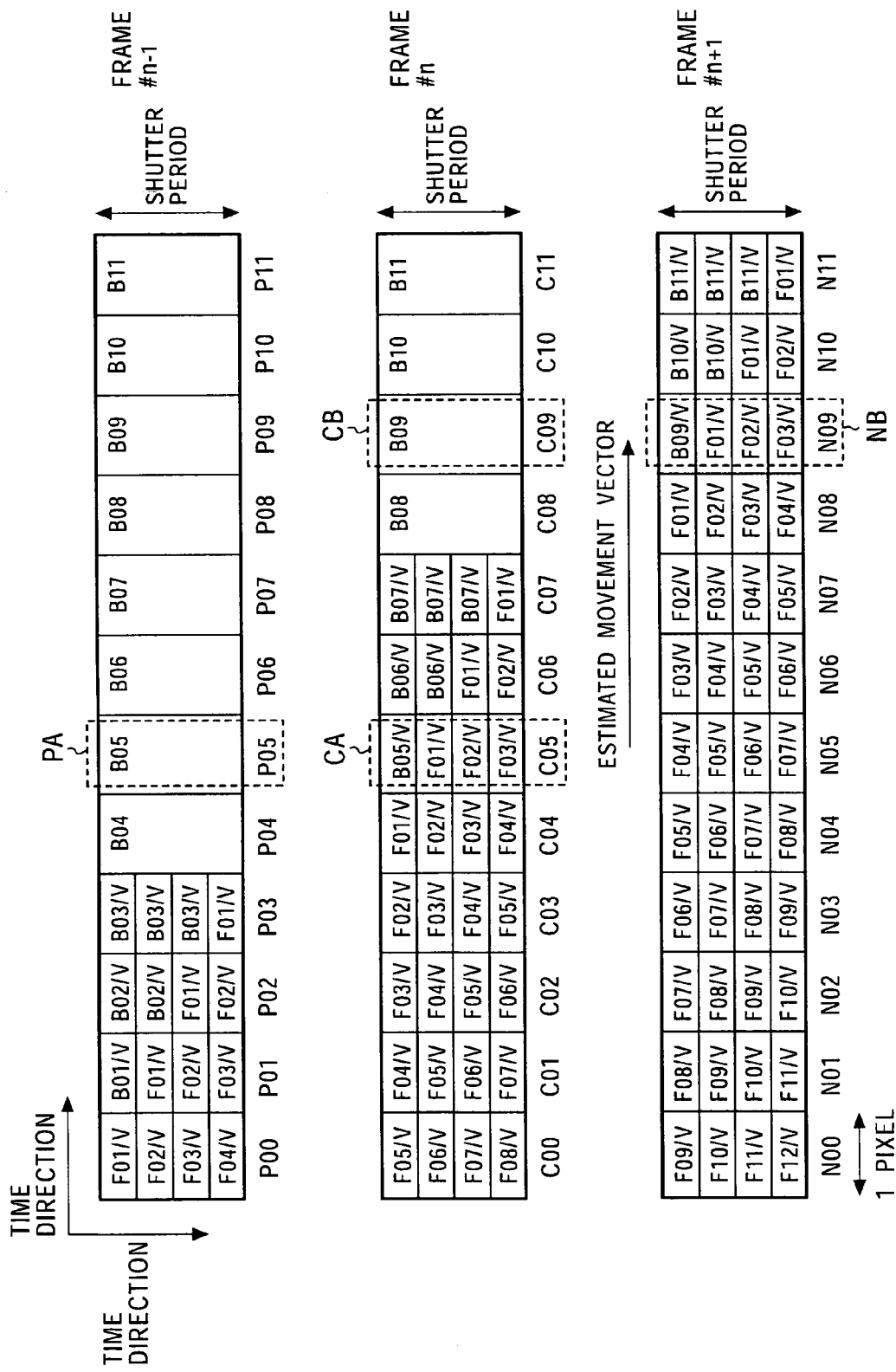

FIG. 105A

| A0 | A1 | A2 |
|----|----|----|
| A3 | A4 | A5 |
| A6 | A7 | A8 |

FIG. 105B

| B0 | B1 | B2 |
|----|----|----|
| B3 | B4 | B5 |
| B6 | B7 | B8 |

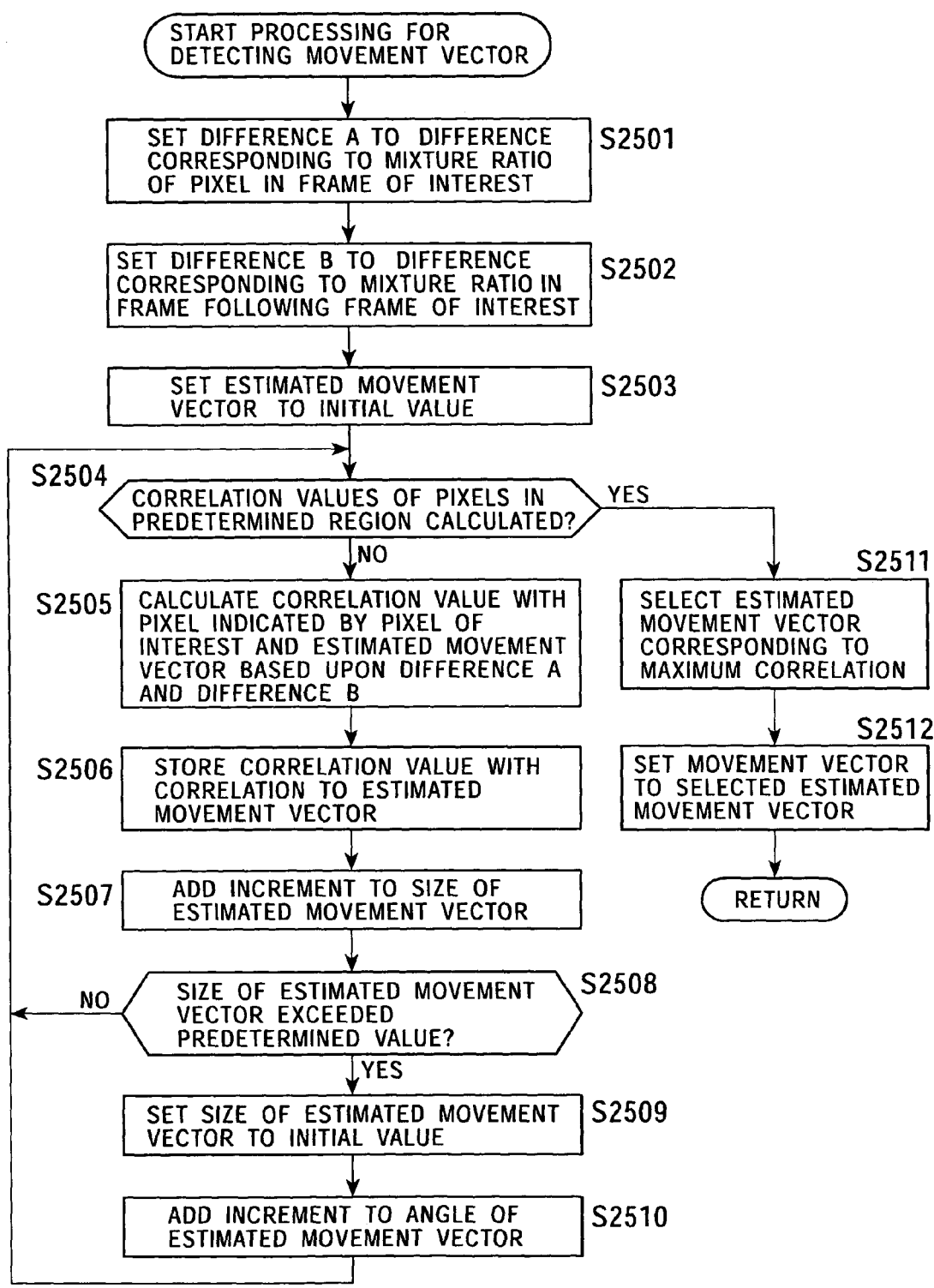

IMAGE PROCESSING DEVICE

TECHNICAL FIELD

The present invention relates to an image processing device, and particularly relates to an image processing device which takes into consideration the difference between signals detected by a sensor and the real world.

BACKGROUND ART

Techniques wherein phenomena in the real world are detected by means of a sensor, and sampled data which is output from the image sensor is processed, are being widely utilized.

For example, with images obtained by a video camera taking a picture of objects which move before predetermined still backgrounds, in the event that movement speed of the objects is relatively high, movement blurring occurs.

However, in the event that objects move in front of still backgrounds, movement blurring occurs not only due to mixture of the moving object images itself, but also due to mixture of the moving object images and the background images.

Conventionally, detection of mixture ratio indicating the ratio of mixture of the background images and the moving object images has not been taken into consideration.

Also, detection of movement vectors in consideration of mixture of the background images and the moving object images, has not been taken into consideration.

DISCLOSURE OF INVENTION

The present invention has been made in consideration of such cases, and it is an object of the present invention to detect a mixture ratio which indicates the state of mixture of multiple objects such as background images and moving object images.

Also, it is an object of the present invention to detect more accurate movement vectors in consideration of the mixture of multiple objects such as background images and moving object images.

Also, it is an object of the present invention to detect a mixture ratio which indicates ratio of mixture of background images and moving object images, or movement vectors of moving objects in consideration of regions where the background images and the moving object images are mixed.

A first image processing device according to the present invention comprises: weighted difference image data calculating means for calculating a weighted difference between each pixel in a frame of interest in the image data and each pixel in an adjacent frame which is adjacent to the frame of interest in the image data, based on weighting which is to correspond to a mixture ratio indicating a mixed state in the pixel data of objects which are multiple in the real world, and outputting as weighted difference image data corresponding to the frame of interest; inter-weighted-difference-image correlation data computing means for matching a relative position of the weighted difference image data of the frame of interest and the weighted difference image data of the adjacent frame according to a movement vector which is to indicate relative movement between the pixel data of the frame of interest and the pixel data of the adjacent frame, computing the correlation between a block of interest containing each pixel of interest of the weighted difference image data of the frame of interest and a corresponding block of the weighted difference image data of the adjacent frame, and outputting as inter-weighted-difference-image correlation data; and detecting means for, with regard to each predetermined increment of the inter-weighted-difference-image correlation data, detecting at least one of the weighting and the movement vector where the correlation between the weighted difference image data is maximum, setting the weighting to the mixture ratio corresponding to the increment of the frame of interest in the event that the weighting is detected, and setting the movement vector to the movement vector corresponding to the increment of the frame of interest in the event that the movement vector is detected.

The image processing device may further comprise weighting information generating means for generating a plurality of the weights corresponding to the mixture ratio indicating a mixed state in the pixel data of the objects which are multiple in the real world, and generating weighting information indicating the weight of each of the generated weights; wherein the weighted difference image data calculating means detect the weighted difference based on the weighting indicated by the weighting information between each pixel of the frame of interest of the image data and each pixel of the adjacent frame which is adjacent to the frame of interest of the image data, and output as the weighted difference image data corresponding to the frame of interest; and wherein the inter-weighted-difference-image correlation data computing means match the relative position of the weighted difference image data of the frame of interest and the weighted difference image data of the adjacent frame according to the movement vector for indicating relative movement between the pixel data of the frame of interest and the pixel data of the adjacent frame, computes the correlation between the block of interest made up of at least one pixel centered on each pixel of interest of the weighted difference image data of the frame of interest and the corresponding block made up of at least one pixel of the weighted difference image data of the adjacent frame, and output as the inter-weighted-difference-image correlation data; and wherein the detecting means detect the weighting where the correlation between the weighted difference image data is maximum, for each predetermined increment made up of at least one pixel of the inter-weighted-difference-image correlation data, and outputs as the mixture ratio corresponding to the increment of the frame of interest.

The image processing device may further comprise: region specifying means for specifying a mixed region made up of a mixture of a foreground object component configuring foreground objects and a background object component configuring background objects based on the image data, and outputting region information indicating the specified mixed region; mixture ratio estimating means for estimating the ratio of mixture between the foreground object component and the background object component in the pixel data belonging to the mixed region, based on the image data and the region information; and estimated movement vector generating means for generating a plurality of estimated movement vectors, and outputting each of the estimated movement vectors that have been generated; wherein the weighted difference image data calculating means calculate difference based on the mixture ratio of the pixel of interest of the frame of interest between each pixel of the frame of interest of the image data and each pixel of a first adjacent frame adjacent to the frame of interest of the image data, and output as first difference image data, and calculate difference based on the mixture ratio of the pixel of interest of the frame of interest between each pixel of the frame of interest of the image data and each pixel of a second adjacent frame adjacent to the frame of interest of the image data, and output as second difference image data; and wherein the inter-weighted-difference-image correlation data computing means match the relative position of the first difference image data and the second difference image data based on the estimated movement vector, computes the correlation between the block of interest made up of at least one pixel centered a pixel of the first difference image data corresponding to the pixel of interest of the frame of interest, and the corresponding block made up of at least one pixel of the second difference image data, and outputs as inter-difference-image correlation data; and wherein the detecting means detect the estimated movement vector where the correlation is maximum, based on the inter-weighted-difference-image correlation data, and outputs as the movement vector corresponding to the pixel of interest of the frame of interest.

The image processing device may further comprise: weighting information generating means for generating a plurality of the weights each with different values, corresponding to the mixture ratio indicating a mixed state in the pixel data of the objects which are multiple in the real world, and generating weighting information indicating the weight of each of the generated weights; and movement vector information generating means for generating a plurality of the movement vectors each having different values indicating relative movement between the pixel data of the frame of interest and pixel data of the adjacent frame, and generating movement vector information indicating each of the generated movement vectors; wherein the weighted difference image data calculating means calculate the weighted difference based on the weighting indicated by the weighting information between each pixel of the frame of interest of the image data and each pixel of the adjacent frame adjacent to the frame of interest of the image data, and outputs as the weighted difference image data corresponding to the frame of interest; and wherein the inter-weighted-difference-image correlation data computing means match the relative position of the weighted difference image data of the frame of interest and the weighted difference image data of the adjacent frame according to the movement vector indicated by the movement vector information, compute the correlation between the block of interest made up of at least one pixel centered on each pixel of interest of the weighted difference image data of the frame of interest and the corresponding block made up of at least one pixel of the weighted difference image data of the adjacent frame, and outputs as inter-weighted-difference-image correlation data; and wherein the detecting means detect the weighting and the movement vector where the correlation between the weighted difference image data is maximum, for each predetermined increment made up of at least one pixel of the inter-weighted-difference-image correlation data, sets the detected weight to the mixture ratio corresponding to the increment of the frame of interest, sets the detected movement vector to the movement vector corresponding to the increment of the frame of interest, and outputs at least one of the mixture ratio and the movement vector.

The image processing device may further comprise: weighting information generating means for generating a plurality of the weights each with different values, corresponding to the mixture ratio indicating the mixed state in the pixel data of the objects which are multiple in the real world, and generating weighting information indicating the weight of each of the generated weights; and movement vector information generating means for generating a plurality of the movement vectors each having different values indicating relative movement between the pixel data of the frame of interest and pixel data of the adjacent frame, and generating movement vector information indicating each of the generated movement vectors; wherein the weighted difference image data calculating means calculate weighted difference based on the weighting indicated by the weighting information between each pixel of the frame of interest of the image data and each pixel of the adjacent frame of the image data, and outputs as the weighted difference image data corresponding to the frame of interest; and wherein the inter-weighted-difference-image correlation data computing means match the relative position of the weighted difference image data of the frame of interest and the weighted difference image data of the adjacent frame according to the movement vector indicated by the movement vector information, computes the correlation between the block of interest made up of a plurality of pixels centered on each pixel of interest of the weighted difference image data of the frame of interest and the corresponding block made up of a plurality of pixels of the weighted difference image data of the adjacent frame, and outputs as inter-weighted-difference-image correlation data; and wherein the detecting means detect the weighting and the movement vector where the correlation between the weighted difference image data is maximum, for each predetermined increment made up of a plurality of pixels of the inter-weighted-difference-image correlation data, sets the detected weight to the mixture ratio corresponding to the increment of the frame of interest, sets the detected movement vector to the movement vector corresponding to the increment of the frame of interest, and outputs at least one of the mixture ratio and the movement vector.

A first image processing method according to the present invention comprises: a weighted difference image data calculating step for calculating a weighted difference between each pixel in a frame of interest in the image data and each pixel in an adjacent frame which is adjacent to the frame of interest in the image data, based on weighting which is to correspond to a mixture ratio indicating a mixed state in the pixel data of objects which are multiple in the real world, and outputting as weighted difference image data corresponding to the frame of interest; an inter-weighted-difference-image correlation data computing step for matching a relative position of the weighted difference image data of the frame of interest and the weighted difference image data of the adjacent frame according to a movement vector which is to indicate relative movement between the pixel data of the frame of interest and the pixel data of the adjacent frame, computing the correlation between a block of interest containing each pixel of interest of the weighted difference image data of the frame of interest and a corresponding block of the weighted difference image data of the adjacent frame, and outputting as inter-weighted-difference-image correlation data; and a detecting step for, with regard to each predetermined increment of the inter-weighted-difference-image correlation data, detecting at least one of the weighting and the movement vector where the correlation between the weighted difference image data is maximum, setting the weighting to the mixture ratio corresponding to the increment of the frame of interest in the event that the weighting is detected, and setting the movement vector to the movement vector corresponding to the increment of the frame of interest in the event that the movement vector is detected.

The image processing method may further comprise a weighting information generating step for generating a plurality of the weights corresponding to the mixture ratio indicating a mixed state in the pixel data of the objects which are multiple in the real world, and generating weighting information indicating the weight of each of the generated weights; wherein, in the weighted difference image data calculating step, the weighted difference is detected based on the weighting indicated by the weighting information between each pixel of the frame of interest of the image data and each pixel of the adjacent frame which is adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector for indicating relative movement between the pixel data of the frame of interest and the pixel data of the adjacent frame, the correlation is calculated between the block of interest made up of at least one pixel centered on each pixel of interest of the weighted difference image data of the frame of interest and the corresponding block made up of at least one pixel of the weighted difference image data of the adjacent frame, and output as the inter-weighted-difference-image correlation data; and wherein in the detecting step, the weighting where the correlation between the weighted difference image data is maximum is detected for each predetermined increment made up of at least one pixel of the inter-weighted-difference-image correlation data, and output as the mixture ratio corresponding to the increment of the frame of interest.

The image processing method may further comprise: a region specifying step for specifying a mixed region made up of a mixture of a foreground object component configuring foreground objects and a background object component configuring background objects based on the image data, and outputting region information indicating the specified mixed region; a mixture ratio estimating step for estimating the mixture ratio indicating ratio of mixture between the foreground object component and the background object component in the pixel data belonging to the mixed region, based on the image data and the region information; and an estimated movement vector generating step for generating a plurality of estimated movement vectors, and outputting each of the estimated movement vectors that have been generated; wherein, in the weighted difference image data calculating step, difference is calculated based on the mixture ratio of the pixel of interest of the frame of interest between each pixel of the frame of interest of the image data and each pixel of a first adjacent frame adjacent to the frame of interest of the image data, and output as first difference image data, and difference is calculated based on the mixture ratio of the pixel of interest of the frame of interest between each pixel of the frame of interest of the image data and each pixel of a second adjacent frame adjacent to the frame of interest of the image data, and output as second difference image data; and wherein, in the inter-weighted-difference-image correlation data computing step, the relative position of the first difference image data and the second difference image data is matched based on the estimated movement vector, the correlation is computed between the block of interest made up of at least one pixel centered a pixel of the first difference image data corresponding to the pixel of interest of the frame of interest, and the corresponding block made up of at least one pixel of the second difference image data, and output as inter-difference-image correlation data; and wherein, in the detecting step, the estimated movement vector where the correlation is maximum is detected based on the inter-difference-image correlation data, and output as the movement vector corresponding to the pixel of interest of the frame of interest.

The image processing method may further comprise: a weighting information generating step for generating a plurality of the weights each with different values, corresponding to the mixture ratio indicating a mixed state in the pixel data of the objects which are multiple in the real world, and generating weighting information indicating the weight of each of the generated weights; and a movement vector information generating step for generating a plurality of the movement vectors each having different values indicating relative movement between the pixel data of the frame of interest and pixel data of the adjacent frame, and generating movement vector information indicating each of the generated movement vectors; wherein, in the weighted difference image data calculating step, the weighted difference is calculated based on the weighting indicated by the weighting information between each pixel of the frame of interest of the image data and each pixel of the adjacent frame adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector indicated by the movement vector information, the correlation is computed between the block of interest made up of at least one pixel centered on each pixel of interest of the weighted difference image data of the frame of interest and the corresponding block made up of at least one pixel of the weighted difference image data of the adjacent frame, and output as inter-weighted-difference-image correlation data; and wherein, in the detecting step, the weighting and the movement vector where the correlation between the weighted difference image data is maximum are detected for each predetermined increment made up of at least one pixel of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output.

The image processing method may further comprise: a weighting information generating step for generating a plurality of the weights each with different values, corresponding to the mixture ratio indicating the mixed state in the pixel data of the objects which are multiple in the real world, and generating weighting information indicating the weight of each of the generated weights; and a movement vector information generating step for generating a plurality of the movement vectors each having different values indicating relative movement between the pixel data of the frame of interest and the pixel data of the adjacent frame, and generating movement vector information indicating each of the generated movement vectors; wherein, in the weighted difference image data calculating step, weighted difference is calculated based on the weighting indicated by the weighting information between each pixel of the frame of interest of the image data and each pixel of the adjacent frame adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector indicated by the movement vector information, the correlation is computed between the block of interest made up of a plurality of pixels centered on each pixel of interest of the weighted difference image data of the frame of interest and the corresponding block made up of a plurality of pixels of the weighted difference image data of the adjacent frame, and output as inter-weighted-difference-image correlation data; and wherein, in the detecting step, the weighting and the movement vector where the correlation between the weighted difference image data is maximum are detected for each predetermined increment made up of a plurality of pixels of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output.

A program on a first recording medium according to the present invention comprises: a weighted difference image data calculating step for calculating a weighted difference between each pixel in a frame of interest in the image data and each pixel in an adjacent frame which is adjacent to the frame of interest in the image data, based on weighting which is to correspond to a mixture ratio indicating a mixed state in the pixel data of objects which are multiple in the real world, and outputting as weighted difference image data corresponding to the frame of interest; an inter-weighted-difference-image correlation data computing step for matching a relative position of the weighted difference image data of the frame of interest and the weighted difference image data of the adjacent frame according to a movement vector which is to indicate relative movement between the pixel data of the frame of interest and the pixel data of the adjacent frame, computing the correlation between a block of interest containing each pixel of interest of the weighted difference image data of the frame of interest and a corresponding block of the weighted difference image data of the adjacent frame, and outputting as inter-weighted-difference-image correlation data; and a detecting step for, with regard to each predetermined increment of the inter-weighted-difference-image correlation data, detecting at least one of the weighting and the movement vector where the correlation between the weighted difference image data is maximum, setting the weighting to the mixture ratio corresponding to the increment of the frame of interest in the event that the weighting is detected, and setting the movement vector to the movement vector corresponding to the increment of the frame of interest in the event that the movement vector is detected.

The program on the recording medium may comprise a weighting information generating step for generating a plurality of the weights corresponding to the mixture ratio indicating a mixed state in the pixel data of the objects which are multiple in the real world, and generating weighting information indicating the weight of each of the generated weights; wherein, in the weighted difference image data calculating step, the weighted difference is detected based on the weighting indicated by the weighting information between each pixel of the frame of interest of the image data and each pixel of the adjacent frame which is adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector for indicating relative movement between the pixel data of the frame of interest and the pixel data of the adjacent frame, the correlation is computed between the block of interest made up of at least one pixel centered on each pixel of interest of the weighted difference image data of the frame of interest and the corresponding block made up of at least one pixel of the weighted difference image data of the adjacent frame, and output as the inter-weighted-difference-image correlation data; and wherein in the detecting step, the weighting where the correlation between the weighted difference image data is maximum is detected for each predetermined increment made up of at least one pixel of the inter-weighted-difference-image correlation data, and output as the mixture ratio corresponding to the increment of the frame of interest.

The program on the recording medium may comprise: a region specifying step for specifying a mixed region made up of a mixture of a foreground object component configuring foreground objects and a background object component configuring background objects based on the image data, and outputting region information indicating the specified mixed region; a mixture ratio estimating step for estimating the mixture ratio indicating ratio of mixture between the foreground object component and the background object component in the pixel data belonging to the mixed region, based on the image data and the region information; and an estimated movement vector generating step for generating a plurality of estimated movement vectors, and outputting each of the estimated movement vectors that have been generated; wherein, in the weighted difference image data calculating step, difference is calculated based on the mixture ratio of the pixel of interest of the frame of interest between each pixel of the frame of interest of the image data and each pixel of a first adjacent frame adjacent to the frame of interest of the image data, and output as first difference image data, and difference is calculated based on the mixture ratio of the pixel of interest of the frame of interest between each pixel of the frame of interest of the image data and each pixel of a second adjacent frame adjacent to the frame of interest of the image data, and output as second difference image data; and wherein, in the inter-weighted-difference-image correlation data computing step, the relative position of the first difference image data and the second difference image data is matched based on the estimated movement vector, the correlation is computed between the block of interest made up of at least one pixel centered a pixel of the first difference image data corresponding to the pixel of interest of the frame of interest, and the corresponding block made up of at least one pixel of the second difference image data, and output as inter-difference-image correlation data; and wherein, in the detecting step, the estimated movement vector where the correlation is maximum is detected based on the difference image correlation data, and output as the movement vector corresponding to the pixel of interest of the frame of interest.

The program on the recording medium may comprise: a weighting information generating step for generating a plurality of the weights each with different values, corresponding to the mixture ratio indicating a mixed state in the pixel data of the objects which are multiple in the real world, and generating weighting information indicating each of the generated weight; and a movement vector information generating step for generating a plurality of the movement vectors each having different values indicating relative movement between the pixel data of the frame of interest and pixel data of the adjacent frame, and generating movement vector information indicating each of the generated movement vectors; wherein, in the weighted difference image data calculating step, the weighted difference is calculated based on the weighting indicated by the weighting information between each pixel of the frame of interest of the image data and each pixel of the adjacent frame adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector indicated by the movement vector information, the correlation is computed between the block of interest made up of at least one pixel centered on each pixel of interest of the weighted difference image data of the frame of interest and the corresponding block made up of at least one pixel of the weighted difference image data of the adjacent frame, and output as inter-weighted-difference-image correlation data; and wherein, in the detecting step, the weighting and the movement vector where the correlation between the weighted difference image data is maximum are detected for each predetermined increment made up of at least one pixel of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output.

The program on the recording medium may comprise: a weighting information generating step for generating a plurality of the weights each with different values, corresponding to the mixture ratio indicating a mixed state in the pixel data of the objects which are multiple in the real world, and generating weighting information indicating each of the generated weights; and a movement vector information generating step for generating a plurality of the movement vectors each having different values indicating relative movement between the pixel data of the frame of interest and the pixel data of the adjacent frame, and generating movement vector information indicating each of the generated movement vectors; wherein, in the weighted difference image data calculating step, weighted difference is calculated based on the weighting indicated by the weighting information between each pixel of the frame of interest of the image data and each pixel of the adjacent frame adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector indicated by the movement vector information, the correlation is computed between the block of interest made up of a plurality of pixels centered on each pixel of interest of the weighted difference image data of the frame of interest and the corresponding block made up of a plurality of pixels of the weighted difference image data of the adjacent frame, and output as inter-weighted-difference-image correlation data; and wherein, in the detecting step, the weighting and the movement vector where the correlation between the weighted difference image data is maximum are detected for each predetermined increment made up of a plurality of pixels of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output.

A first program according to the present invention causes a computer to execute: a weighted difference image data calculating step for calculating a weighted difference between each pixel in a frame of interest in the image data and each pixel in an adjacent frame which is adjacent to the frame of interest in the image data, based on weighting which is to correspond to a mixture ratio indicating a mixed state in the pixel data of objects which are multiple in the real world, and outputting as weighted difference image data corresponding to the frame of interest; an inter-weighted-difference-image correlation data computing step for matching a relative position of the weighted difference image data of the frame of interest and the weighted difference image data of the adjacent frame according to a movement vector which is to indicate relative movement between the pixel data of the frame of interest and the pixel data of the adjacent frame, computing the correlation between a block of interest containing each pixel of interest of the weighted difference image data of the frame of interest and a corresponding block of the weighted difference image data of the adjacent frame, and outputting as inter-weighted-difference-image correlation data; and a detecting step for, with regard to each predetermined increment of the inter-weighted-difference-image correlation data, detecting at least one of the weighting and the movement vector where the correlation between the weighted difference image data is maximum, setting the weighting to the mixture ratio corresponding to the increment of the frame of interest in the event that the weighting is detected, and setting the movement vector to the movement vector corresponding to the increment of the frame of interest in the event that the movement vector is detected.

The program may further comprise a weighting information generating step for generating a plurality of the weights corresponding to the mixture ratio indicating a mixed state in the pixel data of the objects which are multiple in the real world, and generating weighting information indicating each of the generated weights; wherein, in the weighted difference image data calculating step, the weighted difference is detected based on the weighting indicated by the weighting information between each pixel of the frame of interest of the image data and each pixel of the adjacent frame which is adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector for indicating relative movement between the pixel data of the frame of interest and the pixel data of the adjacent frame, the correlation is computed between the block of interest made up of at least one pixel centered on each pixel of interest of the weighted difference image data of the frame of interest and the corresponding block made up of at least one pixel of the weighted difference image data of the adjacent frame, and output as the inter-weighted-difference-image correlation data; and wherein in the detecting step, the weighting where the correlation between the weighted difference image data is maximum is detected for each predetermined increment made up of at least one pixel of the inter-weighted-difference-image correlation data, and output as the mixture ratio corresponding to the increment of the frame of interest.

The program may further comprise: a region specifying step for specifying a mixed region made up of a mixture of a foreground object component configuring foreground objects and a background object component configuring background objects based on the image data, and outputting region information indicating the specified mixed region; a mixture ratio estimating step for estimating the mixture ratio indicating ratio of mixture between the foreground object component and the background object component in the pixel data belonging to the mixed region, based on the image data and the region information; and an estimated movement vector generating step for generating a plurality of estimated movement vectors, and outputting each of the estimated movement vectors that have been generated; wherein, in the weighted difference image data calculating step, difference is calculated based on the mixture ratio of the pixel of interest of the frame of interest between each pixel of the frame of interest of the image data and each pixel of a first adjacent frame adjacent to the frame of interest of the image data, and output as first difference image data, and difference is calculated based on the mixture ratio of the pixel of interest of the frame of interest between each pixel of the frame of interest of the image data and each pixel of a second adjacent frame adjacent to the frame of interest of the image data, and output as second difference image data; and wherein, in the inter-weighted-difference-image correlation data computing step, the relative position of the first difference image data and the second difference image data is matched based on the estimated movement vector, the correlation is computed between the block of interest made up of at least one pixel centered a pixel of the first difference image data corresponding to the pixel of interest of the frame of interest, and the corresponding block made up of at least one pixel of the second difference image data, and output as inter-difference-image correlation data; and wherein, in the detecting step, the estimated movement vector where the correlation is maximum is detected based on the inter-weighted-difference-image correlation data, and output as the movement vector corresponding to the pixel of interest of the frame of interest.

The program may further comprise: a weighting information generating step for generating a plurality of the weights each with different-values, corresponding to the mixture ratio indicating a mixed state in the pixel data of the objects which are multiple in the real world, and generating weighting information indicating the weight of each of the generated weights; and a movement vector information generating step for generating a plurality of the movement vectors each having different values indicating relative movement between the pixel data of the frame of interest and the pixel data of the adjacent frame, and generating movement vector information indicating each of the generated movement vectors; wherein, in the weighted difference image data calculating step, the weighted difference is calculated based on the weighting indicated by the weighting information between each pixel of the frame of interest of the image data and each pixel of the adjacent frame adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector indicated by the movement vector information, the correlation is computed between the block of interest made up of at least one pixel centered on each pixel of interest of the weighted difference image data of the frame of interest and the corresponding block made up of at least one pixel of the weighted difference image data of the adjacent frame, and output as the inter-weighted-difference-image correlation data; and wherein, in the detecting step, the weighting and the movement vector where the correlation between the weighted difference image data is maximum are detected for each predetermined increment made up of at least one pixel of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output.

The program may further comprise: a weighting information generating step for generating a plurality of the weights each with different values, corresponding to the mixture ratio indicating a mixed state in the image data of the objects which are multiple in the real world, and generating weighting information indicating each of the generated weights; and a movement vector information generating step for generating a plurality of the movement vectors each having different values indicating relative movement between the pixel data of the frame of interest and pixel data of the adjacent frame, and generating movement vector information indicating each of the generated movement vectors; wherein, in the weighted difference image data calculating step, weighted difference is calculated based on the weighting indicated by the weighting information between each pixel of the frame of interest of the image data and each pixel of the adjacent frame adjacent to the frame of interest of the image data, and output as the weighted difference image data corresponding to the frame of interest; and wherein, in the inter-weighted-difference-image correlation data computing step, the relative position of the weighted difference image data of the frame of interest and the weighted difference image data of the adjacent frame is matched according to the movement vector indicated by the movement vector information, the correlation is computed between the block of interest made up of a plurality of pixels centered on each pixel of interest of the weighted difference image data of the frame of interest and the corresponding block made up of a plurality of pixels of the weighted difference image data of the adjacent frame, and output as inter-weighted-difference-image correlation data; and wherein, in the detecting step, the weighting and the movement vector where the correlation between the weighted difference image data is maximum are detected for each predetermined increment made up of a plurality of pixels of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output.

A first image-taking device according to the present invention comprises: image-taking means for outputting a subject image taken by an image-taking device having a predetermined number of pixels having time-integration effects as image data made up of a predetermined number of pieces of pixel data; weighted difference image data calculating means for calculating a weighted difference between each pixel in a frame of interest in the image data and each pixel in an adjacent frame which is adjacent to the frame of interest in the image data, based on weighting which is to correspond to a mixture ratio indicating a mixed state in the pixel data of objects which are multiple in the real world, and outputting as weighted difference image data corresponding to the frame of interest; inter-weighted-difference-image correlation data computing means for matching a relative position of the weighted difference image data of the frame of interest and the weighted difference image data of the adjacent frame according to a movement vector which is to indicate relative movement between the pixel data of the frame of interest and the pixel data of the adjacent frame, computing the correlation between a block of interest containing each pixel of interest of the weighted difference image data of the frame of interest and a corresponding block of the weighted difference image data of the adjacent frame, and outputting as inter-weighted-difference-image correlation data; and detecting means for, with regard to each predetermined increment of the inter-weighted-difference-image correlation data, detecting at least one of the weighting and the movement vector where the correlation between the weighted difference image data is maximum, setting the weighting to the mixture ratio corresponding to the increment of the frame of interest in the event that the weighting is detected, and setting the movement vector to the movement vector corresponding to the increment of the frame of interest in the event that the movement vector is detected.

The image-taking device may further comprise weighting information generating means for generating a plurality of the weights corresponding to the mixture ratio indicating a mixed state in the pixel data of the objects which are multiple in the real world, and generating weighting information indicating each of the generated weights; wherein the weighted difference image data calculating means detect the weighted difference based on the weighting indicated by the weighting information between each pixel of the frame of interest of the image data and each pixel of the adjacent frame which is adjacent to the frame of interest of the image data, and outputs as the weighted difference image data corresponding to the frame of interest; and wherein the inter-weighted-difference-image correlation data computing means match the relative position of the weighted difference image data of the frame of interest and the weighted difference image data of the adjacent frame according to the movement vector for indicating relative movement between the pixel data of the frame of interest and the pixel data of the adjacent frame, computes the correlation between the block of interest made up of at least one pixel centered on each pixel of interest of the weighted difference image data of the frame of interest and the corresponding block made up of at least one pixel of the weighted difference image data of the adjacent frame, and outputs as the inter-weighted-difference-image correlation data; and wherein the detecting means detect the weighting where the correlation between the weighted difference image data is maximum, for each predetermined increment made up of at least one pixel of the inter-weighted-difference-image correlation data, and outputs as the mixture ratio corresponding to the increment of the frame of interest.

The image-taking device may further comprise: region specifying means for specifying a mixed region made up of a mixture of a foreground object component configuring foreground objects and a background object component configuring background objects based on the image data, and outputting region information indicating the specified mixed region; mixture ratio estimating means for estimating the mixture ratio indicating ratio of mixture between the foreground object component and the background object component in the pixel data belonging to the mixed region, based on the image data and the region information; and estimated movement vector generating means for generating a plurality of estimated movement vectors, and outputting each of the estimated movement vectors that have been generated; wherein the weighted difference image data calculating means calculate difference based on the mixture ratio of the pixel of interest of the frame of interest between each pixel of the frame of interest of the image data and each pixel of a first adjacent frame adjacent to the frame of interest of the image data, and output as first difference image data, and calculate difference based on the mixture ratio of the pixel of interest of the frame of interest between each pixel of the frame of interest of the image data and each pixel of a second adjacent frame adjacent to the frame of interest of the image data, and output as second difference image data; and wherein the inter-weighted-difference-image correlation data computing means match the relative position of the first difference image data and the second difference image data based on the estimated movement vector, computes the correlation between the block of interest made up of at least one pixel centered a pixel of the first difference image data corresponding to the pixel of interest of the frame of interest, and the corresponding block made up of at least one pixel of the second difference image data, and outputs as inter-difference-image correlation data; and wherein the detecting means detect the estimated movement vector where the correlation is maximum, based on the inter-weighted-difference-image correlation data, and outputs as the movement vector corresponding to the pixel of interest of the frame of interest.

The image-taking device may further comprise: weighting information generating means for generating a plurality of the weights each with different values, corresponding to the mixture ratio indicating a mixed state in the pixel data of the objects which are multiple in the real world, and generating weighting information indicating each of the generated weights; and movement vector information generating means for generating a plurality of the movement vectors each having different values indicating relative movement between the pixel data of the frame of interest and the pixel data of the adjacent frame, and generating movement vector information indicating each of the generated movement vectors; wherein the weighted difference image data calculating means calculate the weighted difference based on the weighting indicated by the weighting information between each pixel of the frame of interest of the image data and each pixel of the adjacent frame adjacent to the frame of interest of the image data, and outputs as the weighted difference image data corresponding to the frame of interest; and wherein the inter-weighted-difference-image correlation data computing means match the relative position of the weighted difference image data of the frame of interest and the weighted difference image data of the adjacent frame according to the movement vector indicated by the movement vector information, computes the correlation between the block of interest made up of at least one pixel centered on each pixel of interest of the weighted difference image data of the frame of interest and the corresponding block made up of at least one pixel of the weighted difference image data of the adjacent frame, and outputs as inter-weighted-difference-image correlation data; and wherein the detecting means detect the weighting and the movement vector where the correlation between the weighted difference image data is maximum, for each predetermined increment made up of at least one pixel of the inter-weighted-difference-image correlation data, sets the detected weight to the mixture ratio corresponding to the increment of the frame of interest, sets the detected movement vector to the movement vector corresponding to the increment of the frame of interest, and outputs at least one of the mixture ratio and the movement vector.

The image-taking device may further comprise: weighting information generating means for generating a plurality of the weights each with different values, corresponding to the mixture ratio indicating the mixed state in the pixel data of the objects which are multiple in the real world, and generating weighting information indicating each of the generated weights; and movement vector information generating means for generating a plurality of the movement vectors each having different values indicating relative movement between the pixel data of the frame of interest and the pixel data of the adjacent frame, and generating movement vector information indicating each of the generated movement vectors; wherein the weighted difference image data calculating means calculate weighted difference based on the weighting indicated by the weighting information between each pixel of the frame of interest of the image data and each pixel of the adjacent frame adjacent to the frame of interest of the image data, and outputs as the weighted difference image data corresponding to the frame of interest; and wherein the inter-weighted-difference-image correlation data computing means match the relative position of the weighted difference image data of the frame of interest and the weighted difference image data of the adjacent frame according to the movement vector indicated by the movement vector information, computes the correlation between the block of interest made up of a plurality of pixels centered on each pixel of interest of the weighted difference image data of the frame of interest and the corresponding block made up of a plurality of pixels of the weighted difference image data of the adjacent frame, and outputs as inter-weighted-difference-image correlation data; and wherein the detecting means detect the weighting and the movement vector where the correlation between the weighted difference image data is maximum, for each predetermined increment made up of a plurality of pixels of the inter-weighted-difference-image correlation data, sets the detected weight to the mixture ratio corresponding to the increment of the frame of interest, sets the detected movement vector to the movement vector corresponding to the increment of the frame of interest, and outputs at least one of the mixture ratio and the movement vector.

A second image processing device according to the present invention comprises: weighting information generating means for generating a plurality of weights corresponding to a mixture ratio indicating a mixed state in the pixel data of objects which are multiple in the real world, and generating weighting information indicating each of the generated weights; weighted difference image data detecting means for detecting a weighted difference between each pixel in a frame of interest in the image data and each pixel in an adjacent frame which is adjacent to the frame of interest in the image data, based on the weight indicated by the weighting information, and outputting as weighted difference image data corresponding to the frame of interest; inter-weighted-difference-image correlation data detecting means for matching a relative position of the weighted difference image data of the frame of interest and the weighted difference image data of the adjacent frame according to a movement vector for indicating relative movement between the pixel data of the frame of interest and the pixel data of the adjacent frame, computing the correlation between a block of interest made up of at least one pixel and centered on each pixel of interest of the weighted difference image data of the frame of interest and a corresponding block made up of at least one pixel of the weighted difference image data of the adjacent frame, and outputting as inter-weighted-difference-image correlation data; and mixture ratio detecting means for, with regard to each predetermined increment made up of at least one pixel of the inter-weighted-difference-image correlation data, detecting the weighting where the correlation between the weighted difference image data is maximum, and outputting as the mixture ratio corresponding to the increment of the frame of interest.

The weighting information generating means may sequentially generate the weighting information indicating a plurality of the weights which each differ, corresponding to a plurality of the mixture ratios which each differ, with the weighted difference image data detecting means detecting the weighted difference corresponding to the plurality of weights which each differ, and outputting as weighted difference image data corresponding to the frame of interest, the inter-weighted-difference-image correlation data detecting means computing the correlation corresponding to the plurality of weights which each differ, and outputting as inter-weighted-difference-image correlation data, and the mixture ratio detecting means detecting, from the plurality of weights which each differ, the weighting where the correlation between the weighted difference image data is maximum, and outputting as the mixture ratio corresponding to the predetermined increment of the frame of interest.

The inter-weighted-difference-image correlation data detecting means may compute, as the correlation, a difference absolute value between the block of interest made up of at least one pixel and centered on each pixel of interest of the weighted difference image data of the frame of interest and the corresponding block made up of at least one pixel of the weighted difference image data of the adjacent frame, and output as inter-weighted-difference-image correlation data.

The inter-weighted-difference-image correlation data detecting means may compute, as the correlation, a sum of absolute value of difference between the block of interest made up of at least one pixel and centered on each pixel of interest of the weighted difference image data of the frame of interest and the corresponding block made up of at least one pixel of the weighted difference image data of the adjacent frame, and output as inter-weighted-difference-image correlation data.

The weighted difference image data detecting means may detect a weighted difference due to the weight indicated by the weighting information between each pixel of the frame of interest and each pixel of the frame prior to the frame of interest in the event that the pixel of the frame of interest belongs to a covered background region formed at a tip side in the direction of movement of an object in the foreground and which is a mixed region wherein a plurality of the objects are mixed, and detect a weighted difference due to the weight indicated by the weighting information between each pixel of the frame of interest and each pixel of the frame following the frame of interest in the event that the pixel of the frame of interest belongs to an uncovered background region formed at a trailing side in the direction of movement of an object in the foreground and which is a mixed region wherein a plurality of the objects are mixed.

The image processing device may further comprise region information generating means for specifying a foreground region made up of objects forming a foreground of the plurality of objects in the image data, a background region made up of objects forming a background of the plurality of objects in the image data, a covered background region formed at a tip side in the direction of movement of the foreground objects which is a mixed region wherein a plurality of the objects are mixed, and an uncovered background region formed at a trailing side in the direction of movement of the foreground objects which is the mixed region, and generating region information indicating the foreground region, the background region, and the mixed region including the covered background region and the uncovered background region.

The image processing device may further comprise movement vector detecting means for detecting the movement vector indicating relative movement between the pixel data of the frame of interest and the pixel data of the adjacent frame.

The mixture ratio detecting means may detect the mixture ratio of the pixel of the frame of interest, belonging to a mixed region where the plurality of objects are mixed.

The image processing device may further comprise separating means for separating, from the pixel data, at least objects making up a foreground from the plurality of objects, based on the mixture ratio.

The image processing device may further comprise movement blurring adjustment means for adjusting the amount of movement blurring of objects making up the separated foreground.

The image processing device may further comprise synthesizing means for synthesizing desired other objects and objects making up the separated foreground, based on the mixture ratio.

A second image processing method according to the present invention comprises: a weighting information generating step for generating a plurality of weights corresponding to a mixture ratio indicating a mixed state in the pixel data of objects which are multiple in the real world, and generating weighting information indicating each of the generated weights; a weighted difference image data detecting step for detecting a weighted difference between each pixel in a frame of interest in the image data and each pixel in an adjacent frame which is adjacent to the frame of interest in the image data, based on the weight indicated by the weighting information, and outputting as weighted difference image data corresponding to the frame of interest; an inter-weighted-difference-image correlation data detecting step for matching a relative position of the weighted difference image data of the frame of interest and the weighted difference image data of the adjacent frame according to a movement vector for indicating relative movement between the pixel data of the frame of interest and the pixel data of the adjacent frame, computing the correlation between a block of interest made up of at least one pixel and centered on each pixel of interest of the weighted difference image data of the frame of interest and a corresponding block made up of at least one pixel of the weighted difference image data of the adjacent frame, and outputting as inter-weighted-difference-image correlation data; and a mixture ratio detecting step for, with regard to each predetermined increment made up of at least one pixel of the inter-weighted-difference-image correlation data, detecting the weighting where the correlation between the weighted difference image data is maximum, and outputting as the mixture ratio corresponding to the increment of the frame of interest.

The weighting information generating step may sequentially generate the weighting information indicating a plurality of the weights which each differ, corresponding to a plurality of the mixture ratios which each differ; the weighted difference image data detecting step may detect the weighted difference corresponding to the plurality of weights which each differ, and output as weighted difference image data corresponding to the frame of interest; the inter-weighted-difference-image correlation data detecting step may compute the correlation corresponding to the plurality of weights which each differ, and output as inter-weighted-difference-image correlation data; and the mixture ratio detecting step may detect the weighting where the correlation between the weighted difference image data is maximum from the plurality of weights which each differ, and output as the mixture ratio corresponding to the predetermined increment of the frame of interest.

The inter-weighted-difference-image correlation data detecting step may compute a difference absolute value between the block of interest made up of at least one pixel and centered on each pixel of interest of the weighted difference image data of the frame of interest and the corresponding block made up of at least one pixel of the weighted difference image data of the adjacent frame as the correlation, and output as inter-weighted-difference-image correlation data.

The inter-weighted-difference-image correlation data detecting step may compute a sum of absolute value of difference between the block of interest made up of at least one pixel and centered on each pixel of interest of the weighted difference image data of the frame of interest and the corresponding block made up of at least one pixel of the weighted difference image data of the adjacent frame is computed as the correlation, and output as the inter-weighted-difference-image correlation data.

The weighted difference image data detecting step may detect a weighted difference due to the weight indicated by the weighting information between each pixel of the frame of interest and each pixel of the frame prior to the frame of interest in the event that the pixel of the frame of interest belongs to a covered background region formed at a tip side in the direction of movement of an object in the foreground and which is a mixed region wherein a plurality of the objects are mixed, and detect a weighted difference due to the weight indicated by the weighting information between each pixel of the frame of interest and each pixel of the frame following the frame of interest in the event that the pixel of the frame of interest belongs to an uncovered background region formed at a trailing side in the direction of movement of an object in the foreground and which is a mixed region wherein a plurality of the objects are mixed.

The image processing method may further comprise a region information generating step for specifying a foreground region made up of objects forming a foreground of the plurality of objects in the image data, a background region made up of objects forming a background of the plurality of objects in the image data, a covered background region formed at a tip side in the direction of movement of the foreground objects which is a mixed region wherein a plurality of the objects are mixed, and an uncovered background region formed at a trailing side in the direction of movement of the foreground objects which is the mixed region, and generate region information indicating the foreground region, the background region, and the mixed region including the covered background region and the uncovered background region.

The image processing method may further comprise a movement vector detecting step for detecting the movement vector indicating relative movement between the pixel data of the frame of interest and the pixel data of the adjacent frame.

The mixture ratio detecting step may detect the mixture ratio of the pixel of the frame of interest belonging to a mixed region where the plurality of objects are mixed.

The image processing method may further comprise a separating step for separating, from the pixel data, at least objects making up a foreground from the plurality of objects, based on the mixture ratio.

The image processing method may further comprise a movement blurring adjustment step for adjusting the amount of movement blurring of objects making up the separated foreground.

The image processing method may further comprise a synthesizing step for synthesizing desired other objects and objects making up the separated foreground, based on the mixture ratio.

A program on a second recording medium according to the present invention comprises: a weighting information generating step for generating a plurality of weights corresponding to a mixture ratio indicating a mixed state in the pixel data of objects which are multiple in the real world, and generating weighting information indicating each of the generated weights; a weighted difference image data detecting step for detecting a weighted difference between each pixel in a frame of interest in the image data and each pixel in an adjacent frame which is adjacent to the frame of interest in the image data, based on the weight indicated by the weighting information, and outputting as weighted difference image data corresponding to the frame of interest; an inter-weighted-difference-image correlation data detecting step for matching a relative position of the weighted difference image data of the frame of interest and the weighted difference image data of the adjacent frame according to a movement vector for indicating relative movement between the pixel data of the frame of interest and the pixel data of the adjacent frame, computing the correlation between a block of interest made up of at least one pixel and centered on each pixel of interest of the weighted difference image data of the frame of interest and a corresponding block made up of at least one pixel of the weighted difference image data of the adjacent frame, and outputting as inter-weighted-difference-image correlation data; and a mixture ratio detecting step for, with regard to each predetermined increment made up of at least one pixel of the inter-weighted-difference-image correlation data, detecting the weighting where the correlation between the weighted difference image data is maximum, and outputting as the mixture ratio corresponding to the increment of the frame of interest.

The weighting information generating step may sequentially generate the weighting information indicating a plurality of the weights which each differ, corresponding to a plurality of the mixture ratios which each differ; the weighted difference image data detecting step may detect the weighted difference corresponding to the plurality of weights which each differ, and output as weighted difference image data corresponding to the frame of interest; the inter-weighted-difference-image correlation data detecting step may compute the correlation corresponding to the plurality of weights which each differ, and output as inter-weighted-difference-image correlation data; and the mixture ratio detecting step may detect the weighting where the correlation between the weighted difference image data is maximum from the plurality of weights which each differ, and output as the mixture ratio corresponding to the predetermined increment of the frame of interest.

The inter-weighted-difference-image correlation data detecting step may compute a difference absolute value between the block of interest made up of at least one pixel and-centered on each pixel of interest of the weighted difference image data of the frame of interest and the corresponding block made up of at least one pixel of the weighted difference image data of the adjacent frame as the correlation, and output as inter-weighted-difference-image correlation data.

The inter-weighted-difference-image correlation data detecting step may compute a sum of absolute value of difference between the block of interest made up of at least one pixel and centered on each pixel of interest of the weighted difference image data of the frame of interest and the corresponding block made up of at least one pixel of the weighted difference image data of the adjacent frame is computed as the correlation, and output as the inter-weighted-difference-image correlation data.

The weighted difference image data detecting step may detect a weighted difference due to the weight indicated by the weighting information between each pixel of the frame of interest and each pixel of the frame prior to the frame of interest in the event that the pixel of the frame of interest belongs to a covered background region formed at a tip side in the direction of movement of an object in the foreground and which is a mixed region wherein a plurality of the objects are mixed, and detect a weighted difference due to the weight indicated by the weighting information between each pixel of the frame of interest and each pixel of the frame following the frame of interest in the event that the pixel of the frame of interest belongs to an uncovered background region formed at a trailing side in the direction of movement of an object in the foreground and which is a mixed region wherein a plurality of the objects are mixed.

The program may further comprise a region information generating step for specifying a foreground region made up of objects forming a foreground of the plurality of objects in the image data, a background region made up of objects forming a background of the plurality of objects in the image data, a covered background region formed at a tip side in the direction of movement of the foreground objects which is a mixed region wherein a plurality of the objects are mixed, and an uncovered background region formed at a trailing side in the direction of movement of the foreground objects which is the mixed region, and generate region information indicating the foreground region, the background region, and the mixed region including the covered background region and the uncovered background region.

The program may further comprise a movement vector detecting step for detecting the movement vector indicating relative movement between the pixel data of the frame of interest and the pixel data of the adjacent frame.

The mixture ratio detecting step may detect the mixture ratio of the pixel of the frame of interest belonging to a mixed region where the plurality of objects are mixed.

The program may further comprise a separating step for separating, from the pixel data, at least objects making up a foreground from the plurality of objects, based on the mixture ratio.

The program may further comprise a movement blurring adjustment step for adjusting the amount of movement blurring of objects making up the separated foreground.

The program may further comprise a synthesizing step for synthesizing desired other objects and objects making up the separated foreground, based on the mixture ratio.

A second program according to the present invention causes a computer to execute: a weighting information generating step for generating a plurality of weights corresponding to a mixture ratio indicating a mixed state in the pixel data of objects which are multiple in the real world, and generating weighting information indicating each of the generated weights; a weighted difference image data detecting step for detecting a weighted difference between each pixel in a frame of interest in the image data and each pixel in an adjacent frame which is adjacent to the frame of interest in the image data, based on the weight indicated by the weighting information, and outputting as weighted difference image data corresponding to the frame of interest; an inter-weighted-difference-image correlation data detecting step for matching a relative position of the weighted difference image data of the frame of interest and the weighted difference image data of the adjacent frame according to a movement vector for indicating relative movement between the pixel data of the frame of interest and the pixel data of the adjacent frame, computing the correlation between a block of interest made up of at least one pixel and centered on each pixel of interest of the weighted difference image data of the frame of interest and a corresponding block made up of at least one pixel of the weighted difference image data of the adjacent frame, and outputting as inter-weighted-difference-image correlation data; and a mixture ratio detecting step for, with regard to each predetermined increment made up of at least one pixel of the inter-weighted-difference-image correlation data, detecting the weighting where the correlation between the weighted difference image data is maximum, and outputting as the mixture ratio corresponding to the increment of the frame of interest.

The weighting information generating step may sequentially generate the weighting information indicating a plurality of the weights which each differ, corresponding to a plurality of the mixture ratios which each differ; the weighted difference image data detecting step may detect the weighted difference corresponding to the plurality of weights which each differ, and output as weighted difference image data corresponding to the frame of interest; the inter-weighted-difference-image correlation data detecting step may compute the correlation corresponding to the plurality of weights which each differ, and output as inter-weighted-difference-image correlation data; and the mixture ratio detecting step may detect the weighting where the correlation between the weighted difference image data is maximum from the plurality of weights which each differ, and output as the mixture ratio corresponding to the predetermined increment of the frame of interest.

The inter-weighted-difference-image correlation data detecting step may compute a difference absolute value between the block of interest made up of at least one pixel and centered on each pixel of interest of the weighted difference image data of the frame of interest and the corresponding block made up of at least one pixel of the weighted difference image data of the adjacent frame as the correlation, and output as inter-weighted-difference-image correlation data.

The inter-weighted-difference-image correlation data detecting step may compute a sum of absolute value of difference between the block of interest made up of at least one pixel and centered on each pixel of interest of the weighted difference image data of the frame of interest and the corresponding block made up of at least one pixel of the weighted difference image data of the adjacent frame is computed as the correlation, and output as the inter-weighted-difference-image correlation data.

The weighted difference image data detecting step may detect a weighted difference due to the weight indicated by the weighting information between each pixel of the frame of interest and each pixel of the frame prior to the frame of interest in the event that the pixel of the frame of interest belongs to a covered background region formed at a tip side in the direction of movement of an object in the foreground and which is a mixed region wherein a plurality of the objects are mixed, and detect a weighted difference due to the weight indicated by the weighting information between each pixel of the frame of interest and each pixel of the frame following the frame of interest in the event that the pixel of the frame of interest belongs to an uncovered background region formed at a trailing side in the direction of movement of an object in the foreground and which is a mixed region wherein a plurality of the objects are mixed.

The program may further comprise a region information generating step for specifying a foreground region made up of objects forming a foreground of the plurality of objects in the image data, a background region made up of objects forming a background of the plurality of objects in the image data, a covered background region formed at a tip side in the direction of movement of the foreground objects which is a mixed region wherein a plurality of the objects are mixed, and an uncovered background region formed at a trailing side in the direction of movement of the foreground objects which is the mixed region, and generate region information indicating the foreground region, the background region, and the mixed region including the covered background region and the uncovered background region.

The program may further comprise a movement vector detecting step for detecting the movement vector indicating relative movement between the pixel data of the frame of interest and the pixel data of the adjacent frame.

The mixture ratio detecting step may detect the mixture ratio of the pixel of the frame of interest belonging to a mixed region where the plurality of objects are mixed.

The program may further comprise a separating step for separating, from the pixel data, at least objects making up a foreground from the plurality of objects, based on the mixture ratio.

The program may further comprise a movement blurring adjustment step for adjusting the amount of movement blurring of objects making up the separated foreground.

The program may further comprise a synthesizing step for synthesizing desired other objects and objects making up the separated foreground, based on the mixture ratio.

A second image-taking device according to the present invention comprises: image-taking means for outputting a subject image taken by an image-taking device having a predetermined number of pixels having time-integration effects as image data made up of a predetermined number of pieces of pixel data; weighting information generating means for generating a plurality of weights corresponding to a mixture ratio indicating a mixed state in the pixel data of objects which are multiple in the real world, and generating weighting information indicating each of the generated weights; weighted difference image data detecting means for detecting a weighted difference between each pixel in a frame of interest in the image data and each pixel in an adjacent frame which is adjacent to the frame of interest in the image data, based on the weight indicated by the weighting information, and outputting as weighted difference image data corresponding to the frame of interest; inter-weighted-difference-image correlation data detecting means for matching a relative position of the weighted difference image data of the frame of interest and the weighted difference image data of the adjacent frame according to a movement vector for indicating relative movement between the pixel data of the frame of interest and the pixel data of the adjacent frame, computing the correlation between a block of interest made up of at least one pixel and centered on each pixel of interest of the weighted difference image data of the frame of interest and a corresponding block made up of at least one pixel of the weighted difference image data of the adjacent frame, and outputting as inter-weighted-difference-image correlation data; and mixture ratio detecting means for, with regard to each predetermined increment made up of at least one pixel of the inter-weighted-difference-image correlation data, detecting the weighting where the correlation between the weighted difference image data is maximum, and outputting as the mixture ratio corresponding to the increment of the frame of interest.

The weighting information generating means may sequentially generate the weighting information indicating a plurality of the weights which each differ, corresponding to a plurality of the mixture ratios which each differ, with the weighted difference image data detecting means detecting the weighted difference corresponding to the plurality of weights which each differ, and outputting as weighted difference image data corresponding to the frame of interest, the inter-weighted-difference-image correlation data detecting means computing the correlation corresponding to the plurality of weights which each differ, and outputting as inter-weighted-difference-image correlation data, and the mixture ratio detecting means detecting, from the plurality of weights which each differ, the weighting where the correlation between the weighted difference image data is maximum, and outputting as the mixture ratio corresponding to the increment of the frame of interest.

The inter-weighted-difference-image correlation data detecting means may compute, as the correlation, a difference absolute value between the block of interest made up of at least one pixel and centered on each pixel of interest of the weighted difference image data of the frame of interest and the corresponding block made up of at least one pixel of the weighted difference image data of the adjacent frame, and output as inter-weighted-difference-image correlation data.

The inter-weighted-difference-image correlation data detecting means may compute, as the correlation, a sum of absolute value of difference between the block of interest made up of at least one pixel and centered on each pixel of interest of the weighted difference image data of the frame of interest and the corresponding block made up of at least one pixel of the weighted difference image data of the adjacent frame, and output as inter-weighted-difference-image correlation data.

The weighted difference image data detecting means may detect a weighted difference due to the weight indicated by the weighting information between each pixel of the frame of interest and each pixel of the frame prior to the frame of interest in the event that the pixel of the frame of interest belongs to a covered background region formed at a tip side in the direction of movement of an object in the foreground and which is a mixed region wherein a plurality of the objects are mixed, and detect a weighted difference due to the weight indicated by the weighting information between each pixel of the frame of interest and each pixel of the frame following the frame of interest in the event that the pixel of the frame of interest belongs to an uncovered background region formed at a trailing side in the direction of movement of an object in the foreground and which is a mixed region wherein a plurality of the objects are mixed.

The image-taking device may further comprise region information generating means for specifying a foreground region made up of objects forming a foreground of the plurality of objects in the image data, a background region made up of objects forming a background of the plurality of objects in the image data, a covered background region formed at a tip side in the direction of movement of the foreground objects which is a mixed region wherein a plurality of the objects are mixed, and an uncovered background region formed at a trailing side in the direction of movement of the foreground objects which is the mixed region, and generating region information indicating the foreground region, the background region, and the mixed region including the covered background region and the uncovered background region.

The image-taking device may further comprise movement vector detecting means for detecting the movement vector indicating relative movement between the pixel data of the frame of interest and the pixel data of the adjacent frame.

The mixture ratio detecting means may detect the mixture ratio of the pixel of the frame of interest, belonging to a mixed region where the plurality of objects are mixed.

The image-taking device may further comprise separating means for separating, from the pixel data, at least objects making up a foreground from the plurality of objects, based on the mixture ratio.

The image-taking device may further comprise movement blurring adjustment means for adjusting the amount of movement blurring of objects making up the separated foreground.

The image-taking device may further comprise synthesizing means for synthesizing desired other objects and objects making up the separated foreground, based on the mixture ratio.

A third image processing device according to the present invention comprises: region specifying means for specifying a mixed region made up of a mixture of a foreground object component configuring foreground objects and a background object component configuring background objects based on the image data, and outputting region information indicating the specified mixed region; mixture ratio estimating means for estimating mixture ratio indicating ratio of mixture between the foreground object component and the background object component in the pixel data belonging to the mixed region, based on the image data and the region information; estimated movement vector generating means for generating a plurality of estimated movement vectors, and outputting each of the estimated movement vectors that have been generated; difference image data calculating means for calculating difference based on the mixture ratio of the pixel of interest of the frame of interest between each pixel of the frame of interest of the image data and each pixel of a first adjacent frame adjacent to the frame of interest of the image data and outputting as first difference image data, and calculating difference based on the mixture ratio of the pixel of interest of the frame of interest between each pixel of the frame of interest of the image data and each pixel of a second adjacent frame adjacent to the frame of interest of the image data and outputting as second difference image data; inter-difference-image correlation data computing means for matching the relative position of the first difference image data and the second difference image data based on the estimated movement vector, computing the correlation between the block of interest made up of at least one pixel centered a pixel of the first difference image data corresponding to the pixel of interest of the frame of interest, and the corresponding block made up of at least one pixel of the second difference image data, and outputting as inter-difference-image correlation data; and detecting means for detecting the estimated movement vector where the correlation is maximum, based on the inter-difference-image correlation data, and outputting as the movement vector corresponding to the pixel of interest of the frame of interest.

The inter-difference-image correlation data computing means may compute, as the correlation, a difference absolute value between the block of interest and the corresponding block, and output as inter-difference-image correlation data.

The inter-difference-image correlation data computing means may compute, as the correlation, a sum of absolute value of difference between the block of interest and the corresponding block, and output as inter-weighted-difference-image correlation data.

The image processing device may further comprise separating means for separating, from the pixel data, at least the foreground objects, based on the mixture ratio.

The image processing device may further comprise movement blurring adjustment means for adjusting the amount of movement blurring of the separated foreground objects, based on the movement vector.

The image processing device may further comprise noise removing means for removing noise of the separated foreground objects, based on the movement vector.

A third image processing method according to the present invention comprises: a region specifying step for specifying a mixed region made up of a mixture of a foreground object component configuring foreground objects and a background object component configuring background objects based on the image data, and outputting region information indicating the specified mixed region; a mixture ratio estimating step for estimating mixture ratio indicating ratio of mixture between the foreground object component and the background object component in the pixel data belonging to the mixed region, based on the image data and the region information; an estimated movement vector generating step for generating a plurality of estimated movement vectors, and outputting each of the estimated movement vectors that have been generated; a difference image data calculating step for calculating difference based on the mixture ratio of the pixel of interest of the frame of interest between each pixel of the frame of interest of the image data and each pixel of a first adjacent frame adjacent to the frame of interest of the image data and outputting as first difference image data, and calculating difference based on the mixture ratio of the pixel of interest of the frame of interest between each pixel of the frame of interest of the image data and each pixel of a second adjacent frame adjacent to the frame of interest of the image data and outputting as second difference image data; an inter-difference-image correlation data computing step for matching the relative position of the first difference image data and the second difference image data based on the estimated movement vector, computing the correlation between the block of interest made up of at least one pixel centered a pixel of the first difference image data corresponding to the pixel of interest of the frame of interest, and the corresponding block made up of at least one pixel of the second difference image data, and outputting as inter-difference-image correlation data; and a detecting step for detecting the estimated movement vector where the correlation is maximum, based on the inter-difference-image correlation data, and outputting as the movement vector corresponding to the pixel of interest of the frame of interest.

A program on a third recording medium according to the present invention comprises: a region specifying step for specifying a mixed region made up of a mixture of a foreground object component configuring foreground objects and a background object component configuring background objects based on the image data, and outputting region information indicating the specified mixed region; a mixture ratio estimating step for estimating mixture ratio indicating ratio of mixture between the foreground object component and the background object component in the pixel data belonging to the mixed region, based on the image data and the region information; an estimated movement vector generating step for generating a plurality of estimated movement vectors, and outputting each of the estimated movement vectors that have been generated; a difference image data calculating step for calculating difference based on the mixture ratio of the pixel of interest of the frame of interest between each pixel of a frame of interest of the image data and each pixel of a first adjacent frame adjacent to the frame of interest of the image data and outputting as first difference image data, and calculating difference based on the mixture ratio of the pixel of interest of the frame of interest between each pixel of the frame of interest of the image data and each pixel of a second adjacent frame adjacent to the frame of interest of the image data and outputting as second difference image data; an inter-difference-image correlation data computing step for matching the relative position of the first difference image data and the second difference image data based on the estimated movement vector, computing the correlation between the block of interest made up of at least one pixel centered a pixel of the first difference image data corresponding to the pixel of interest of the frame of interest, and the corresponding block made up of at least one pixel of the second difference image data, and outputting as inter-difference-image correlation data; and a detecting step for detecting the estimated movement vector where the correlation is maximum, based on the inter-difference-image correlation data, and outputting as the movement vector corresponding to the pixel of interest of the frame of interest.

A third program according to the present invention causes a computer to execute: a region specifying step for specifying a mixed region made up of a mixture of a foreground object component configuring foreground objects and a background object component configuring background objects based on the image data, and outputting region information indicating the specified mixed region; a mixture ratio estimating step for estimating mixture ratio indicating ratio of mixture between the foreground object component and the background object component in the pixel data belonging to the mixed region, based on the image data and the region information; an estimated movement vector generating step for generating a plurality of estimated movement vectors, and outputting each of the estimated movement vectors that have been generated; a difference image data calculating step for calculating difference based on the mixture ratio of the pixel of interest of the frame of interest between each pixel of the frame of interest of the image data and each pixel of a first adjacent frame adjacent to the frame of interest of the image data and outputting as first difference image data, and calculating difference based on the mixture ratio of the pixel of interest of the frame of interest between each pixel of the frame of interest of the image data and each pixel of a second adjacent frame adjacent to the frame of interest of the image data and outputting as second difference image data; an inter-difference-image correlation data computing step for matching the relative position of the first difference image data and the second difference image data based on the estimated movement vector, computing the correlation between the block of interest made up of at least one pixel centered a pixel of the first difference image data corresponding to the pixel of interest of the frame of interest, and the corresponding block made up of at least one pixel of the second difference image data, and outputting as interdifference-image correlation data; and a detecting step for detecting the estimated movement vector where the correlation is maximum, based on the inter-difference-image correlation data, and outputting as the movement vector corresponding to the pixel of interest of the frame of interest.

A third image-taking device according to the present invention comprises: image-taking means for outputting a subject image taken by an image-taking device having a predetermined number of pixels having time-integration effects as image data made up of a predetermined number of pieces of pixel data; region specifying means for specifying a mixed region made up of a mixture of a foreground object component configuring foreground objects and a background object component configuring background objects based on the image data, and outputting region information indicating the specified mixed region; mixture ratio estimating means for estimating mixture ratio indicating ratio of mixture between the foreground object component and the background object component in the pixel data belonging to the mixed region, based on the image data and the region information; estimated movement vector generating means for generating a plurality of estimated movement vectors, and outputting each of the estimated movement vectors that have been generated; difference image data calculating means for calculating difference based on the mixture ratio of the pixel of interest of the frame of interest between each pixel of the frame of interest of the image data and each pixel of a first adjacent frame adjacent to the frame of interest of the image data and outputting as first difference image data, and calculating difference based on the mixture ratio of the pixel of interest of the frame of interest between each pixel of the frame of interest of the image data and each pixel of a second adjacent frame adjacent to the frame of interest of the image data and outputting as second difference image data; inter-difference-image correlation data computing means for matching the relative position of the first difference image data and the second difference image data based on the estimated movement vector, computing the correlation between the block of interest made up of at least one pixel centered a pixel of the first difference image data corresponding to the pixel of interest of the frame of interest, and the corresponding block made up of at least one pixel of the second difference image data, and outputting as inter-difference-image correlation data; and detecting means for detecting the estimated movement vector where the correlation is maximum, based on the inter-difference-image correlation data, and outputting as the movement vector corresponding to the pixel of interest of the frame of interest.

The inter-difference-image correlation data computing means may compute, as the correlation, a difference absolute value between the block of interest and the corresponding block, and output as inter-difference-image correlation data.

The inter-difference-image correlation data computing means may compute, as the correlation, a sum of absolute value of difference between the block of interest and the corresponding block, and output as inter-weighted-difference-image correlation data.

The image-taking device may further comprise separating means for separating, from the pixel data, at least the foreground objects, based on the mixture ratio.

The image-taking device may further comprise movement blurring adjustment means for adjusting the amount of movement blurring of the separated foreground objects, based on the movement vector.

The image-taking device may further comprise noise removing means for removing noise of the separated foreground objects, based on the movement vector.

A fourth image processing device according to the present invention comprises: weighting information generating means for generating a plurality of weights each with differing values, corresponding to a mixture ratio indicating a mixed state in the pixel data of objects which are multiple in the real world, and generating weighting information indicating the weight of each of the generated weights; weighted difference image data calculating means for calculating weighted difference based on the weighting indicated by the weighting information between each pixel of the frame of interest of the image data and each pixel of the adjacent frame which is adjacent to the frame of interest of the image data, and outputting as weighted difference image data corresponding to the frame of interest; movement vector information generating means for generating a plurality of movement vectors each having different values indicating relative movement between the pixel data of the frame of interest and the pixel data of the adjacent frame, and generating movement vector information indicating each of the generated movement vectors; inter-weighted-difference-image correlation data computing means for matching the relative position of the weighted difference image data of the frame of interest and the weighted difference image data of the adjacent frame according to the movement vector indicated by the movement vector information, computing the correlation between block of interest made up of at least one pixel centered on each pixel of interest of the weighted difference image data of the frame of interest and the corresponding block made up of at least one pixel of the weighted difference image data of the adjacent frame, and outputting as inter-weighted-difference-image correlation data; and detecting means for detecting the weighting and the movement vector where the correlation between the weighted difference image data is maximum, for each predetermined increment made up of at least one pixel of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

The inter-weighted-difference-image correlation data computing means may match the relative position of at least the weighted difference image data of the frame of interest, the weighted difference image data of a frame before the frame of interest, and the weighted difference image data of a frame following the frame of interest, according to the movement vector indicated by the movement vector information, compute the correlation between the block of interest made up of at least one pixel centered on each pixel of interest of the weighted difference image data of the frame of interest, a corresponding block made up of at least one pixel of the weighted difference image data of the previous frame, and a corresponding block made up of at least one pixel of the weighted difference image data of the following frame, and output as inter-weighted-difference-image correlation data.

The inter-weighted-difference-image correlation data computing means may compute, as the correlation, a difference absolute value between the block of interest made up of at least one pixel and centered on each pixel of interest of the weighted difference image data of the frame of interest and the corresponding block made up of at least one pixel of the weighted difference image data of the adjacent frame, and output as the inter-weighted-difference-image correlation data.

The inter-weighted-difference-image correlation data computing means may compute, as the correlation, a sum of absolute value of difference between the block of interest made up of at least one pixel and centered on each pixel of interest of the weighted difference image data of the frame of interest and the corresponding block made up of at least one pixel of the weighted difference image data of the adjacent frame, and output as the inter-weighted-difference-image correlation data.

The weighted difference image data calculating means may calculate a weighted difference due to the weight indicated by the weighting information between each pixel of the frame of interest and each pixel of the frame prior to the frame of interest in the event that the pixel of the frame of interest belongs to a covered background region formed at a tip side in the direction of movement of an object in the foreground and which is a mixed region wherein a plurality of the objects are mixed, and calculate a weighted difference due to the weight indicated by the weighting information between each pixel of the frame of interest and each pixel of the frame following the frame of interest in the event that the pixel of the frame of interest belongs to an uncovered background region formed at a trailing side in the direction of movement of an object in the foreground and which is a mixed region wherein a plurality of the objects are mixed.

The image processing device may further comprise region information generating means for specifying a foreground region made up of objects forming a foreground of the plurality of objects in the image data, a background region made up of objects forming a background of the plurality of objects in the image data, a covered background region formed at a tip side in the direction of movement of the foreground objects which is a mixed region wherein a plurality of the objects are mixed, and an uncovered background region formed at a trailing side in the direction of movement of the foreground objects which is the mixed region, and generating region information indicating the foreground region, the background region, and the mixed region including the covered background region and the uncovered background region.

The detecting means may detect the mixture ratio of the pixel of the frame of interest, belonging to a mixed region where the plurality of objects are mixed.

The image processing device may further comprise separating means for separating, from the pixel data, at least objects making up a foreground from the plurality of objects, based on the mixture ratio.

The image processing device may further comprise movement blurring adjustment means for adjusting the amount of movement blurring of objects making up the separated foreground.

The image processing device may further comprise noise removing means for removing noise of the separated foreground objects, based on the movement vector.

A fourth image processing method according to the present invention comprises: a weighting information generating step for generating a plurality of weights each with differing values, corresponding to a mixture ratio indicating a mixed state in the pixel data of objects which are multiple in the real world, and generating weighting information indicating the weight of each of the generated weights; a weighted difference image data calculating step for calculating weighted difference based on the weighting indicated by the weighting information between each pixel of the frame of interest of the image data and each pixel of the adjacent frame which is adjacent to the frame of interest of the image data, and outputting as weighted difference image data corresponding to the frame of interest; a movement vector information generating step for generating a plurality of movement vectors each having different values indicating relative movement between the pixel data of the frame of interest and the pixel data of the adjacent frame, and generating movement vector information indicating each of the generated movement vectors; an inter-weighted-difference-image correlation data computing step for matching the relative position of the weighted difference image data of the frame of interest and the weighted difference image data of the adjacent frame according to the movement vector indicated by the movement vector information, computing the correlation between block of interest made up of at least one pixel centered on each pixel of interest of the weighted difference image data of the frame of interest and the corresponding block made up of at least one pixel of the weighted difference image data of the adjacent frame, and outputting as inter-weighted-difference-image correlation data; and a detecting step for detecting the weighting and the movement vector where the correlation between the weighted difference image data is maximum, for each predetermined increment made up of at least one pixel of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

A program on a fourth recording medium according to the present invention comprises: a weighting information generating step for generating a plurality of weights each with differing values, corresponding to a mixture ratio indicating a mixed state in the pixel data of objects which are multiple in the real world, and generating weighting information indicating the weight of each of the generated weights; a weighted difference image data calculating step for calculating weighted difference based on the weighting indicated by the weighting information between each pixel of the frame of interest of the image data and each pixel of the adjacent frame which is adjacent to the frame of interest of the image data, and outputting as weighted difference image data corresponding to the frame of interest; a movement vector information generating step for generating a plurality of movement vectors each having different values indicating relative movement between the pixel data of the frame of interest and the pixel data of the adjacent frame, and generating movement vector information indicating each of the generated movement vectors; an inter-weighted-difference-image correlation data computing step for matching the relative position of the weighted difference image data of the frame of interest and the weighted difference image data of the adjacent frame according to the movement vector indicated by the movement vector information, computing the correlation between block of interest made up of at least one pixel centered on each pixel of interest of the weighted difference image data of the frame of interest and the corresponding block made up of at least one pixel of the weighted difference image data of the adjacent frame, and outputting as inter-weighted-difference-image correlation data; and a detecting step for detecting the weighting and the movement vector where the correlation between the weighted difference image data is maximum, for each predetermined increment made up of at least one pixel of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

A fourth program according to the present invention causes a computer to execute: a weighting information generating step for generating a plurality of weights each with differing values, corresponding to a mixture ratio indicating a mixed state in the pixel data of objects which are multiple in the real world, and generating weighting information indicating the weight of each of the generated weights; a weighted difference image data calculating step for calculating weighted difference based on the weighting indicated by the weighting information between each pixel of the frame of interest of the image data and each pixel of the adjacent frame which is adjacent to the frame of interest of the image data, and outputting as weighted difference image data corresponding to the frame of interest; a movement vector information generating step for generating a plurality of movement vectors each having different values indicating relative movement between the pixel data of the frame of interest and the pixel data of the adjacent frame, and generating movement vector information indicating each of the generated movement vectors; an inter-weighted-difference-image correlation data computing step for matching the relative position of the weighted difference image data of the frame of interest and the weighted difference image data of the adjacent frame according to the movement vector indicated by the movement vector information, computing the correlation between block of interest made up of at least one pixel centered on each pixel of interest of the weighted difference image data of the frame of interest and the corresponding block made up of at least one pixel of the weighted difference image data of the adjacent frame, and outputting as inter-weighted-difference-image correlation data; and a detecting step for detecting the weighting and the movement vector where the correlation between the weighted difference image data is maximum, for each predetermined increment made up of at least one pixel of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

A fourth image-taking device according to the present invention comprises: image-taking means for outputting a subject image taken by an image-taking device having a predetermined number of pixels having time-integration effects as image data made up of a predetermined number of pieces of pixel data; weighting information generating means for generating a plurality of weights each with differing values, corresponding to a mixture ratio indicating a mixed state in the pixel data of objects which are multiple in the real world, and generating weighting information indicating the weight of each of the generated weights; weighted difference image data calculating means for calculating weighted difference based on the weighting indicated by the weighting information between each pixel of the frame of interest of the image data and each pixel of the adjacent frame which is adjacent to the frame of interest of the image data, and outputting as weighted difference image data corresponding to the frame of interest; movement vector information generating means for generating a plurality of movement vectors each having different values indicating relative movement between the pixel data of the frame of interest and the pixel data of the adjacent frame, and generating movement vector information indicating each of the generated movement vectors; inter-weighted-difference-image correlation data computing means for matching the relative position of the weighted difference image data of the frame of interest and the weighted difference image data of the adjacent frame according to the movement vector indicated by the movement vector information, computing the correlation between block of interest made up of at least one pixel centered on each pixel of interest of the weighted difference image data of the frame of interest and the corresponding block made up of at least one pixel of the weighted difference image data of the adjacent frame, and outputting as inter-weighted-difference-image correlation data; and detecting means for detecting the weighting and the movement vector where the correlation between the weighted difference image data is maximum, for each predetermined increment made up of at least one pixel of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

The inter-weighted-difference-image correlation data computing means may match the relative position of at least the weighted difference image data of the frame of interest, the weighted difference image data of a frame before the frame of interest, and the weighted difference image data of a frame following the frame of interest, according to the movement vector indicated by the movement vector information, compute the correlation between the block of interest made up of at least one pixel centered on each pixel of interest of the weighted difference image data of the frame of interest, a corresponding block made up of at least one pixel of the weighted difference image data of the previous frame, and a corresponding block made up of at least one pixel of the weighted difference image data of the following frame, and output as inter-weighted-difference-image correlation data.

The inter-weighted-difference-image correlation data computing means may compute, as the correlation, a difference absolute value between the block of interest made up of at least one pixel and centered on each pixel of interest of the weighted difference image data of the frame of interest and the corresponding block made up of at least one pixel of the weighted difference image data of the adjacent frame, and output as the inter-weighted-difference-image correlation data.

The inter-weighted-difference-image correlation data computing means may compute, as the correlation, a sum of absolute value of difference between the block of interest made up of at least one pixel and centered on each pixel of interest of the weighted difference image data of the frame of interest and the corresponding block made up of at least one pixel of the weighted difference image data of the adjacent frame, and output as the inter-weighted-difference-image correlation data.

The weighted difference image data calculating means may calculate a weighted difference due to the weight indicated by the weighting information between each pixel of the frame of interest and each pixel of the frame prior to the frame of interest in the event that the pixel of the frame of interest belongs to a covered background region formed at a tip side in the direction of movement of an object in the foreground and which is a mixed region wherein a plurality of the objects are mixed, and calculate a weighted difference due to the weight indicated by the weighting information between each pixel of the frame of interest and each pixel of the frame following the frame of interest in the event that the pixel of the frame of interest belongs to an uncovered background region formed at a trailing side in the direction of movement of an object in the foreground and which is a mixed region wherein a plurality of the objects are mixed.

The image-taking device may further comprise region information generating means for specifying a foreground region made up of objects forming a foreground of the plurality of objects in the image data, a background region made up of objects forming a background of the plurality of objects in the image data, a covered background region formed at a tip side in the direction of movement of the foreground objects which is a mixed region wherein a plurality of the objects are mixed, and an uncovered background region formed at a trailing side in the direction of movement of the foreground objects which is the mixed region, and generating region information indicating the foreground region, the background region, and the mixed region including the covered background region and the uncovered background region.

The detecting means may detect the mixture ratio of the pixel of the frame of interest, belonging to a mixed region where the plurality of objects are mixed.

The image-taking device may further comprise separating means for separating, from the pixel data, at least objects making up a foreground from the plurality of objects, based on the mixture ratio.

The image-taking device may further comprise movement blurring adjustment means for adjusting the amount of movement blurring of objects making up the separated foreground.

The image-taking device may further comprise noise removing means for removing noise of the separated foreground objects, based on the movement vector.

A fifth image processing device according to the present invention comprises: weighting information generating means for generating a plurality of weights each with different values, corresponding to a mixture ratio indicating a mixed state in the pixel data of objects which are multiple in the real world, and generating weighting information indicating each of the generated weights; weighted difference image data calculating means for calculating weighted difference based on the weighting indicated by the weighting information between each pixel of a frame of interest of the image data and each pixel of an adjacent frame which is adjacent to the frame of interest of the image data, and outputting as weighted difference image data corresponding to the frame of interest; movement vector information generating means for generating a plurality of movement vectors each having different values indicating relative movement between the pixel data of the frame of interest and the pixel data of the adjacent frame, and generating movement vector information indicating each of the generated movement vectors; inter-weighted-difference-image correlation data computing means for matching the relative position of the weighted difference image data of the frame of interest and the weighted difference image data of the adjacent frame according to the movement vector indicated by the movement vector information, computing the correlation between a first block of interest made up of a plurality of pixels centered on each pixel of interest of the weighted difference image data of the frame of interest and a first corresponding block made up of a plurality of pixels of the weighted difference image data of the adjacent frame, and outputting as inter-weighted-difference-image correlation data; and detecting means for detecting the weighting and the movement vector where the correlation between the weighted difference image data is maximum, for each predetermined increment made up of a plurality of pixels of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

The weighted difference image data calculating means may calculate weighted difference, based on the weighting indicated by the weighting information between a second block of interest made up of a plurality of pixels centered on each pixel of interest of the frame of interest of the image data and a second corresponding block made up of a plurality of pixels of the adjacent frame adjacent to the frame of interest of the image data, with the weighting corresponding to the plurality of pixels of the second block of interest or the second corresponding block as being constant, and output as weighted difference image data corresponding to the frame of interest; and the inter-weighted-difference-image correlation data computing means may match the relative position of the weighted difference image data of the frame of interest and the weighted difference image data of the adjacent frame according to the movement vector indicated by the movement vector information, compute the correlation between the first block of interest of the weighted difference image data of the frame of interest and the first corresponding block of the weighted difference image data of the adjacent frame, and output as inter-weighted-difference-image correlation data.

The weighted difference image data calculating means may calculate weighted difference, based on the weighting corresponding to each pixel of the plurality of pixels indicated by the weighting information which is sequentially generated, between a second block of interest made up of a plurality of pixels centered on each pixel of interest of a frame of interest of the image data and a second corresponding block made up of a plurality of pixels of an adjacent frame adjacent to the frame of interest of the image data, and output as the weighted difference image data corresponding to the frame of interest; and the inter-weighted-difference-image correlation data computing means may match the relative position of the weighted difference image data of the frame of interest and the weighted difference image data of the adjacent frame according to the movement vector indicated by the movement vector information, compute the correlation between the first block of interest of the weighted difference image data of the frame of interest and the first corresponding block of the weighted difference image data of the adjacent frame, and output as inter-weighted-difference-image correlation data.

The weighted difference image data calculating means may calculate weighted difference based on the weighting which continuously changes corresponding to the position of each pixel, as well as corresponding to each pixel of the plurality of pixels indicated by the weighting information which is sequentially generated, between the second block of interest and the second corresponding block, and output as weighted difference image data corresponding to the pixel of interest.

The detecting means may detect the most accurate weight and movement vector of the plurality of the weights and the movement vectors by evaluating the continuity of the weighting corresponding to each pixel within the first block of interest where the correlation between the weighted difference image data is maximum, set the detected weight to the mixture ratio corresponding to the increment of the frame of interest, set the detected movement vector to the movement vector corresponding to the increment of the frame of interest, and output at least one of the mixture ratio and the movement vector.

A fifth image processing method according to the present invention comprises: a weighting information generating step for generating a plurality of weights each with different values, corresponding to a mixture ratio indicating a mixed state in the pixel data of objects which are multiple in the real world, and generating weighting information indicating each of the generated weights; a weighted difference image data calculating step for calculating weighted difference based on the weighting indicated by the weighting information between each pixel of a frame of interest of the image data and each pixel of an adjacent frame which is adjacent to the frame of interest of the image data, and outputting as weighted difference image data corresponding to the frame of interest; a movement vector information generating step for generating a plurality of movement vectors each having different values indicating relative movement between the pixel data of the frame of interest and the pixel data of the adjacent frame, and generating movement vector information indicating each of the generated movement vectors; an inter-weighted-difference-image correlation data computing step for matching the relative position of the weighted difference image data of the frame of interest and the weighted difference image data of the adjacent frame according to the movement vector indicated by the movement vector information, computing the correlation between a first block of interest made up of a plurality of pixels centered on each pixel of interest of the weighted difference image data of the frame of interest and a first corresponding block made up of a plurality of pixels of the weighted difference image data of the adjacent frame, and outputting as inter-weighted-difference-image correlation data; and a detecting step for detecting the weighting and the movement vector where the correlation between the weighted difference image data is maximum, for each predetermined increment made up of a plurality of pixels of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

A program on a fifth recording medium according to the present invention comprises: a weighting information generating step for generating a plurality of weights each with different values, corresponding to a mixture ratio indicating a mixed state in the pixel data of objects which are multiple in the real world, and generating weighting information indicating each of the generated weights; a weighted difference image data calculating step for calculating weighted difference based on the weighting indicated by the weighting information between each pixel of a frame of interest of the image data and each pixel of an adjacent frame which is adjacent to the frame of interest of the image data, and outputting as weighted difference image data corresponding to the frame of interest; a movement vector information generating step for generating a plurality of movement vectors each having different values indicating relative movement between the pixel data of the frame of interest and the pixel data of the adjacent frame, and generating movement vector information indicating each of the generated movement vectors; an inter-weighted-difference-image correlation data computing step for matching the relative position of the weighted difference image data of the frame of interest and the weighted difference image data of the adjacent frame according to the movement vector indicated by the movement vector information, computing the correlation between a first block of interest made up of a plurality of pixels centered on each pixel of interest of the weighted difference image data of the frame of interest and a first corresponding block made up of a plurality of pixels of the weighted difference image data of the adjacent frame, and outputting as inter-weighted-difference-image correlation data; and a detecting step for detecting the weighting and the movement vector where the correlation between the weighted difference image data is maximum, for each predetermined increment made up of a plurality of pixels of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

A fifth program according to the present invention causes a computer to execute: a weighting information generating step for generating a plurality of weights each with different values, corresponding to a mixture ratio indicating a mixed state in the pixel data of objects which are multiple in the real world, and generating weighting information indicating each of the generated weights; a weighted difference image data calculating step for calculating weighted difference based on the weighting indicated by the weighting information between each pixel of a frame of interest of the image data and each pixel of an adjacent frame which is adjacent to the frame of interest of the image data, and outputting as weighted difference image data corresponding to the frame of interest; a movement vector information generating step for generating a plurality of movement vectors each having different values indicating relative movement between the pixel data of the frame of interest and the pixel data of the adjacent frame, and generating movement vector information indicating each of the generated movement vectors; an inter-weighted-difference-image correlation data computing step for matching the relative position of the weighted difference image data of the frame of interest and the weighted difference image data of the adjacent frame according to the movement vector indicated by the movement vector information, computing the correlation between a first block of interest made up of a plurality of pixels centered on each pixel of interest of the weighted difference image data of the frame of interest and a first corresponding block made up of a plurality of pixels of the weighted difference image data of the adjacent frame, and outputting as inter-weighted-difference-image correlation data; and a detecting step for detecting the weighting and the movement vector where the correlation between the weighted difference image data is maximum, for each predetermined increment made up of a plurality of pixels of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

A fifth image-taking device according to the present invention comprises: image-taking means for outputting a subject image taken by an image-taking device having a predetermined number of pixels having time-integration effects as image data made up of a predetermined number of pieces of pixel data; weighting information generating means for generating a plurality of weights each with different values, corresponding to a mixture ratio indicating a mixed state in the pixel data of objects which are multiple in the real world, and generating weighting information indicating each of the generated weights; weighted difference image data calculating means for calculating weighted difference based on the weighting indicated by the weighting information between each pixel of a frame of interest of the image data and each pixel of an adjacent frame which is adjacent to the frame of interest of the image data, and outputting as weighted difference image data corresponding to the frame of interest; movement vector information generating means for generating a plurality of movement vectors each having different values indicating relative movement between the pixel data of the frame of interest and the pixel data of the adjacent frame, and generating movement vector information indicating each of the generated movement vectors; inter-weighted-difference-image correlation data computing means for matching the relative position of the weighted difference image data of the frame of interest and the weighted difference image data of the adjacent frame according to the movement vector indicated by the movement vector information, computing the correlation between a first block of interest made up of a plurality of pixels centered on each pixel of interest of the weighted difference image data of the frame of interest and a first corresponding block made up of a plurality of pixels of the weighted difference image data of the adjacent frame, and outputting as inter-weighted-difference-image correlation data; and detecting means for detecting the weighting and the movement vector where the correlation between the weighted difference image data is maximum, for each predetermined increment made up of a plurality of pixels of the inter-weighted-difference-image correlation data, setting the detected weight to the mixture ratio corresponding to the increment of the frame of interest, setting the detected movement vector to the movement vector corresponding to the increment of the frame of interest, and outputting at least one of the mixture ratio and the movement vector.

The weighted difference image data calculating means may calculate weighted difference, based on the weighting indicated by the weighting information between a second block of interest made up of a plurality of pixels centered on each pixel of interest of the frame of interest of the image data and a second corresponding block made up of a plurality of pixels of the adjacent frame adjacent to the frame of interest of the image data, with the weighting corresponding to the plurality of pixels of the second block of interest or the second corresponding block as being constant, and output as weighted difference image data corresponding to the frame of interest; and the inter-weighted-difference-image correlation data computing means may match the relative position of the weighted difference image data of the frame of interest and the weighted difference image data of the adjacent frame according to the movement vector indicated by the movement vector information, compute the correlation between the first block of interest of the weighted difference image data of the frame of interest and the first corresponding block of the weighted difference image data of the adjacent frame, and output as inter-weighted-difference-image correlation data.

The weighted difference image data calculating means may calculate weighted difference, based on the weighting corresponding to each pixel of the plurality of pixels indicated by the weighting information which is sequentially generated, between a second block of interest made up of a plurality of pixels centered on each pixel of interest of a frame of interest of the image data and a second corresponding block made up of a plurality of pixels of an adjacent frame adjacent to the frame of interest of the image data, and output as the weighted difference image data corresponding to the frame of interest; and the inter-weighted-difference-image correlation data computing means may match the relative position of the weighted difference image data of the frame of interest and the weighted difference image data of the adjacent frame according to the movement vector indicated by the movement vector information, compute the correlation between the first block of interest of the weighted difference image data of the frame of interest and the first corresponding block of the weighted difference image data of the adjacent frame, and output as inter-weighted-difference-image correlation data.

The weighted difference image data calculating means may calculate weighted difference based on the weighting which continuously changes corresponding to the position of each pixel, as well as corresponding to each pixel of the plurality of pixels indicated by the weighting information which is sequentially generated, between the second block of interest and the second corresponding block, and output as weighted difference image data corresponding to the pixel of interest.

The detecting means may detect the most accurate weight and movement vector of the plurality of the weights and the movement vectors by evaluating the continuity of the weighting corresponding to each pixel within the first block of interest where the correlation between the weighted difference image data is maximum, set the detected weight to the mixture ratio corresponding to the increment of the frame of interest, set the detected movement vector to the movement vector corresponding to the increment of the frame of interest, and output at least one of the mixture ratio and the movement vector.

A weighted difference between each pixel in a frame of interest in the image data and each pixel in an adjacent frame which is adjacent to the frame of interest in the image data is calculated, based on weighting which is to correspond to a mixture ratio indicating a mixed state in the pixel data of objects which are multiple in the real world, output as weighted difference image data corresponding to the frame of interest, a relative position of the weighted difference image data of the frame of interest and the weighted difference image data of the adjacent frame is matched according to a movement vector which is to indicate relative movement between the pixel data of the frame of interest and the pixel data of the adjacent frame, the correlation between a block of interest containing each pixel of interest of the weighted difference image data of the frame of interest and a corresponding block of the weighted difference image data of the adjacent frame is computed, and output as inter-weighted-difference-image correlation data, and, with regard to each predetermined increment of the inter-weighted-difference-image correlation data, at least one of the weighting and the movement vector where the correlation between the weighted difference image data is maximum are detected, with the weighting being set to the mixture ratio corresponding to the increment of the frame of interest in the event that the weighting is detected, and the movement vector being set to the movement vector corresponding to the increment of the frame of interest in the event that the movement vector is detected.

Accordingly, a mixture ratio indicating the proportion of mixing of a background image and an image of a moving object can be detected, or a movement vector of a moving object can be detected taking into consideration a region wherein a background image and an image of a moving object are mixed, for example.

A plurality of weights corresponding to a mixture ratio indicating a mixed state in the pixel data of objects which are multiple in the real world and weighting information indicating each of the generated weights are generated, a weighted difference between each pixel in a frame of interest in the image data and each pixel in an adjacent frame which is adjacent to the frame of interest in the image data is detected based on the weight indicated by the weighting information, and output as weighted difference image data corresponding to the frame of interest, a relative position of the weighted difference image data of the frame of interest and the weighted difference image data of the adjacent frame is matched according to a movement vector for indicating relative movement between the pixel data of the frame of interest and the pixel data of the adjacent frame, correlation between a block of interest made up of at least one pixel and centered on each pixel of interest of the weighted difference image data of the frame of interest and a corresponding block made up of at least one pixel of the weighted difference image data of the adjacent frame is computed, and output as inter-weighted-difference-image correlation data, and, with regard to each predetermined increment made up of at least one pixel of the inter-weighted-difference-image correlation data, the weighting where the correlation between the weighted difference image data is maximum is detected, and output as the mixture ratio corresponding to the increment of the frame of interest.

Accordingly, a mixture ratio indicating the state of mixing of multiple objects such as a background image and an image of a moving object, for example, can be detected.

A mixed region made up of a mixture of a foreground object component configuring foreground objects and a background object component configuring background objects based on the image data is specified, region information indicating the specified mixed region is output, a mixture ratio indicating ratio of mixture between the foreground object component and the background object component in the pixel data belonging to the mixed region is estimated based on the image data and the region information, a plurality of estimated movement vectors are generated and each of the estimated movement vectors that have been generated are output, difference based on the mixture ratio of the pixel of interest of the frame of interest between each pixel of the frame of interest of the image data and each pixel of a first adjacent frame adjacent to the frame of interest of the image data is calculated and output as first difference image data, and difference based on the mixture ratio of the pixel of interest of the frame of interest between each pixel of the frame of interest of the image data and each pixel of a second adjacent frame adjacent to the frame of interest of the image data is calculated and output as second difference image data, the relative position of the first difference image data and the second difference image data is matched based on the estimated movement vector, the correlation between the block of interest made up of at least one pixel centered a pixel of the first difference image data corresponding to the pixel of interest of the frame of interest and the corresponding block made up of at least one pixel of the second difference image data is computed and output as inter-difference-image correlation data, and the estimated movement vector where the correlation is maximum is detected based on the inter-difference-image correlation data, and output as the movement vector corresponding to the pixel of interest of the frame of interest.

Accordingly, a more accurate movement vector can be detected, taking into consideration the mixing of multiple objects such as background images and moving object images, for example.

A plurality of weights each with different values are generated corresponding to a mixture ratio indicating a mixed state in the pixel data of objects which are multiple in the real world, weighting information indicating each of the generated weights is generated, weighted difference is calculated based on the weighting indicated by the weighting information between each pixel of a frame of interest of the image data and each pixel of an adjacent frame which is adjacent to the frame of interest of the image data and output as weighted difference image data corresponding to the frame of interest, a plurality of movement vectors each having different values indicating relative movement between the pixel data of the frame of interest and the pixel data of the adjacent frame are generated, movement vector information indicating each of the generated movement vectors is generated, the relative position of the weighted difference image data of the frame of interest and the weighted difference image data of the adjacent frame is matched according to the movement vector indicated by the movement vector information, the correlation between a first block of interest made up of at least one pixel centered on each pixel of interest of the weighted difference image data of the frame of interest and a first corresponding block made up of at least one pixel of the weighted difference image data of the adjacent frame is computed and output as inter-weighted-difference-image correlation data, and the weighting and the movement vector where the correlation between the weighted difference image data is maximum are detected for each predetermined increment made up of at least one pixel of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output.

Accordingly, a mixture ratio indicating the proportion of mixing of a background image and an image of a moving object can be detected, or a movement vector of a moving object can be detected taking into consideration a region wherein a background image and an image of a moving object are mixed, for example.

A plurality of weights each with different values are generated corresponding to a mixture ratio indicating a mixed state in the pixel data of objects which are multiple in the real world, weighting information indicating each of the generated weights is generated, weighted difference is calculated based on the weighting indicated by the weighting information between each pixel of a frame of interest of the image data and each pixel of an adjacent frame which is adjacent to the frame of interest of the image data and output as weighted difference image data corresponding to the frame of interest, a plurality of movement vectors each having different values indicating relative movement between the pixel data of the frame of interest and the pixel data of the adjacent frame are generated, movement vector information indicating each of the generated movement vectors is generated, the relative position of the weighted difference image data of the frame of interest and the weighted difference image data of the adjacent frame is matched according to the movement vector indicated by the movement vector information, the correlation between a first block of interest made up of a plurality of pixels centered on each pixel of interest of the weighted difference image data of the frame of interest and a first corresponding block made up of a plurality of pixels of the weighted difference image data of the adjacent frame is computed and output as inter-weighted-difference-image correlation data, and the weighting and the movement vector where the correlation between the weighted difference image data is maximum are detected for each predetermined increment made up of a plurality of pixels of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output.

Accordingly, a mixture ratio indicating the proportion of mixing of a background image and an image of a moving object can be detected, or a vector of a moving object can be detected taking into consideration a region wherein a background image and an image of a moving object are mixed, for example.

BRIEF DESCRIPTION OF THE DRAWINGS

FIG. 3 is a diagram describing image-taking by a sensor.

FIG. 9 is a model diagram wherein the pixel values are developed over the time direction, and periods corresponding to shutter time are divided.

FIG. 10 is a model diagram wherein the pixel values are developed over the time direction, and periods corresponding to shutter time are divided.

FIG. 25 is a diagram describing conditions for region judgment.

FIG. 32 is a block diagram illustrating the configuration of a binary object image extracting unit 302.

FIG. 33A is a diagram describing calculating of correlation values.

FIG. 33B is a diagram describing calculating of correlation values.

FIG. 34A is a diagram describing calculating of correlation values.

FIG. 34B is a diagram describing calculating of correlation values.

FIG. 37 is a diagram describing judgment of a region judgment unit 342.

FIG. 54A is a diagram illustrating an example of a block of pixels which is the object of computation of correlation value.

FIG. 54B is a diagram illustrating an example of a block of pixels which is the object of computation of correlation value.

FIG. 59A is a diagram illustrating an input image, foreground component image, and background component image.

FIG. 104 is a diagram describing processing for calculating movement vectors.

FIG. 105A is a diagram describing a block for calculating correlation values.

FIG. 105B is a diagram describing a block for calculating correlation values.

FIG. 106 is a flowchart describing processing for detecting movement vectors.

FIG. 110 is a block diagram illustrating the configuration of an estimated mixture ratio processing unit 3401.

FIG. 111 is a model diagram wherein the pixel values are developed over the time direction, and periods corresponding to shutter time are divided.

FIG. 112 is a diagram describing weighted difference image data.

FIG. 113 is a model diagram wherein the pixel values are developed over the time direction, and periods corresponding to shutter time are divided.

FIG. 114 is a model diagram wherein the pixel values are developed over the time direction, and periods corresponding to shutter time are divided.

FIG. 115 is a model diagram wherein the pixel values are developed over the time direction, and periods corresponding to shutter time are divided.

FIG. 116 is a model diagram wherein the pixel values are developed over the time direction, and periods corresponding to shutter time are divided.

FIG. 117 is a diagram describing weighted difference image correlation data.

FIG. 118 is a diagram illustrating an example of an estimated mixture ratio by block.

FIG. 119 is a model diagram wherein the pixel values are developed over the time direction, and periods corresponding to shutter time are divided.

FIG. 120 is a diagram illustrating an example of detection of estimated mixture ratio, by way of blocks.

FIG. 121 is a model diagram wherein the pixel values are developed over the time direction, and periods corresponding to shutter time are divided.

Figure 122:
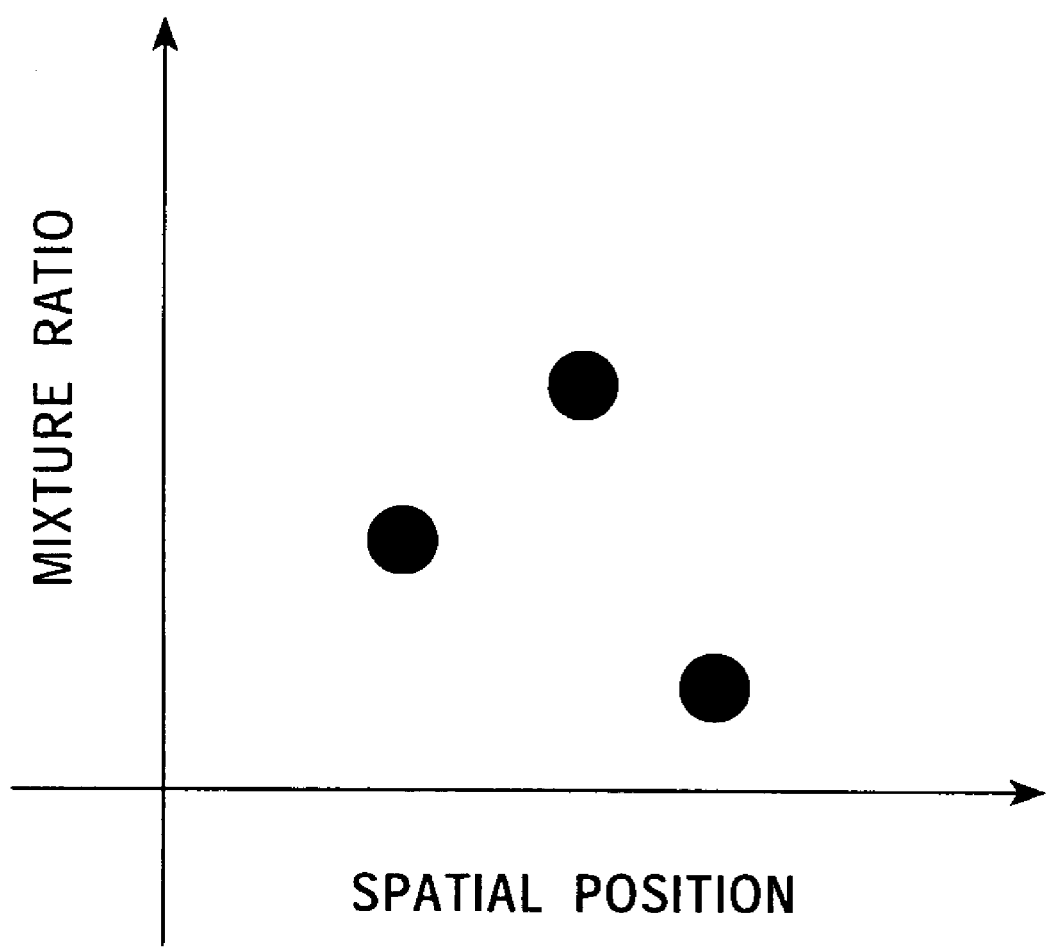

FIG. 122 is a diagram illustrating an example of detection of estimated mixture ratio, by way of blocks.

Figure 123:
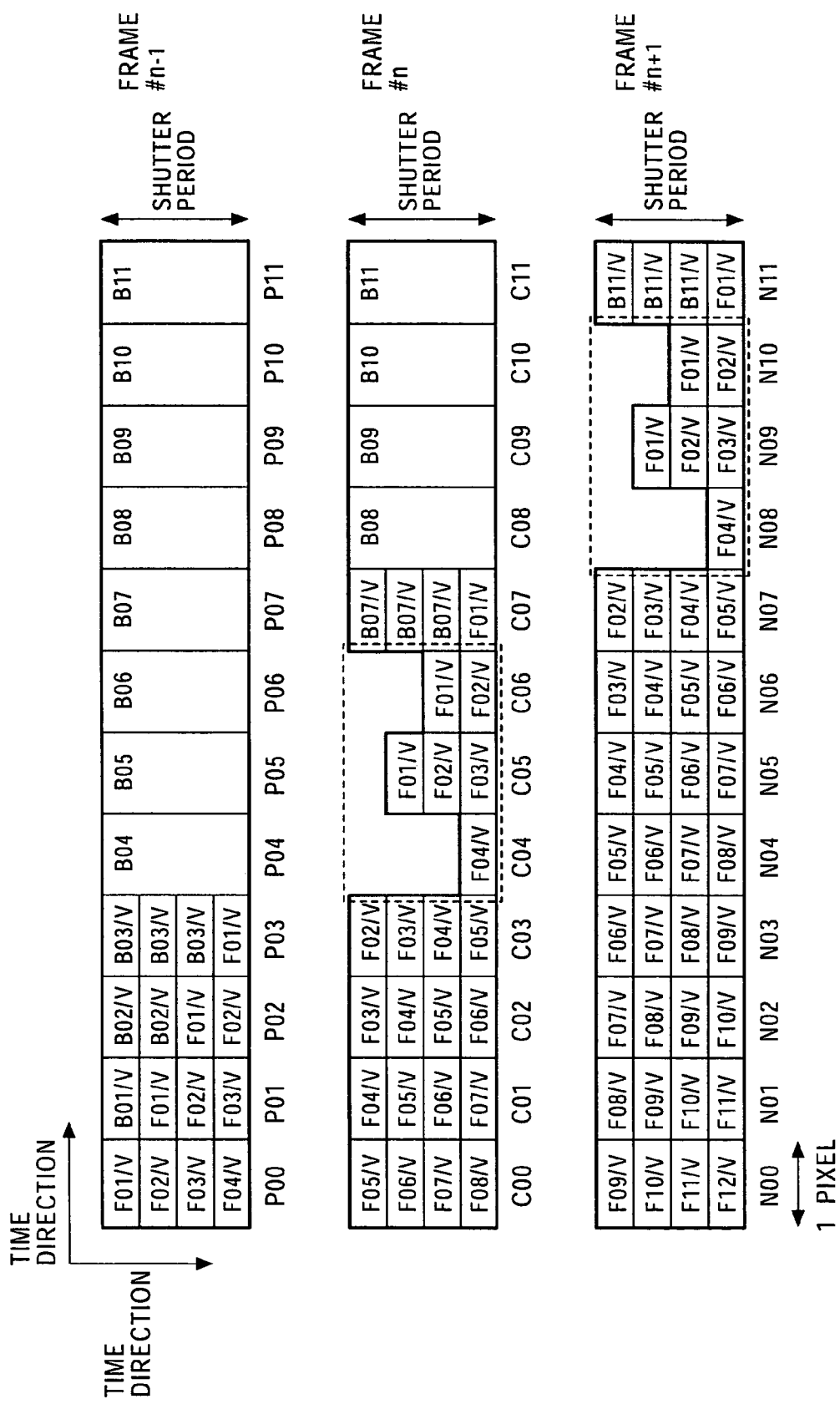

FIG. 123 is a model diagram wherein the pixel values are developed over the time direction, and periods corresponding to shutter time are divided.

Figure 124:
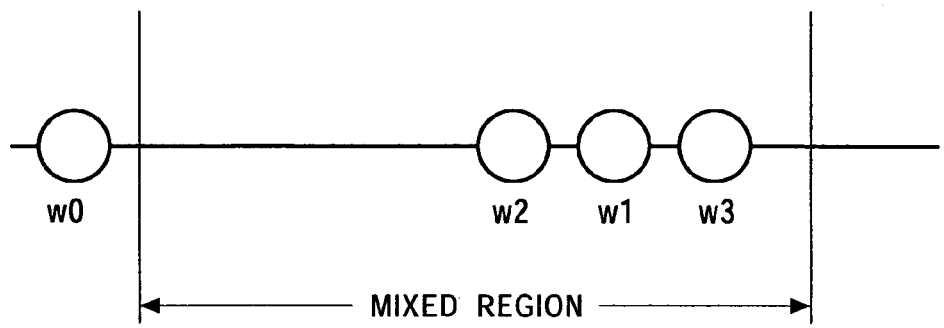

FIG. 124 is a diagram describing selection of a more accurate estimated mixture ratio and estimated movement vector.

Figure 125:
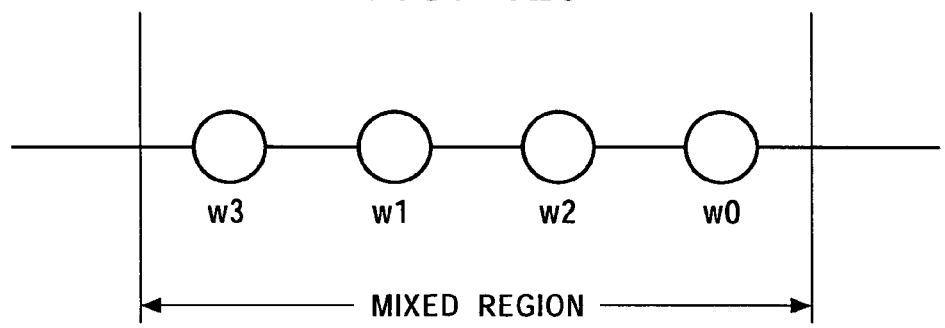

FIG. 125 is a diagram describing selection of a more accurate estimated mixture ratio and estimated movement vector.

Figure 126:
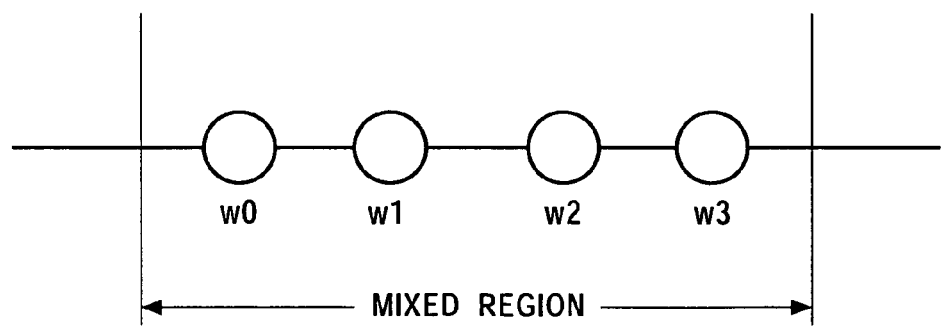

FIG. 126 is a diagram describing selection of a more accurate estimated mixture ratio and estimated movement vector.

Figure 127:
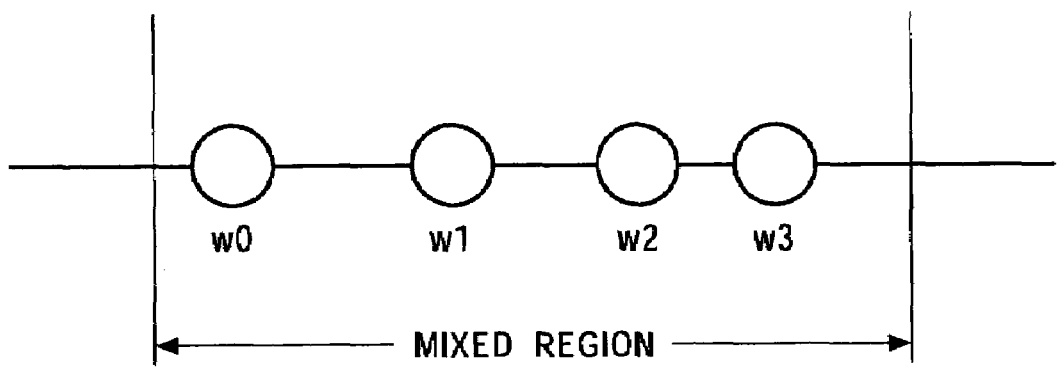

FIG. 127 is a diagram describing selection of a more accurate estimated mixture ratio and estimated movement vector.

Figure 128:
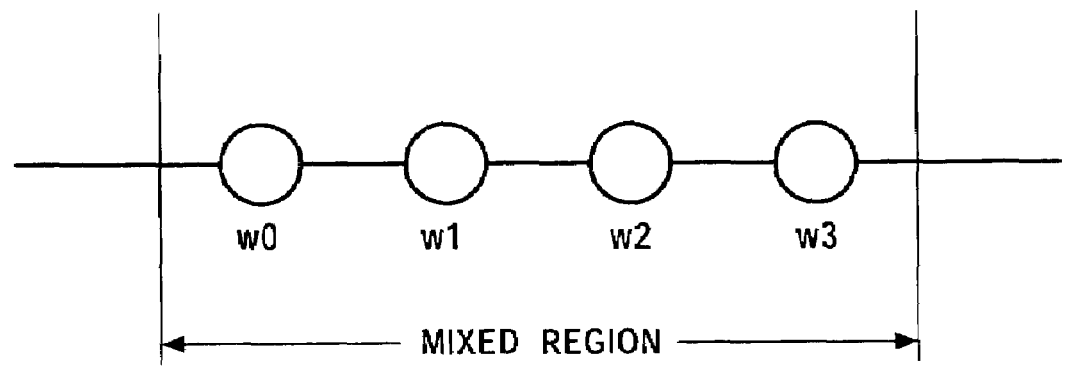

FIG. 128 is a diagram describing selection of a more accurate estimated mixture ratio and estimated movement vector.

Figure 129:
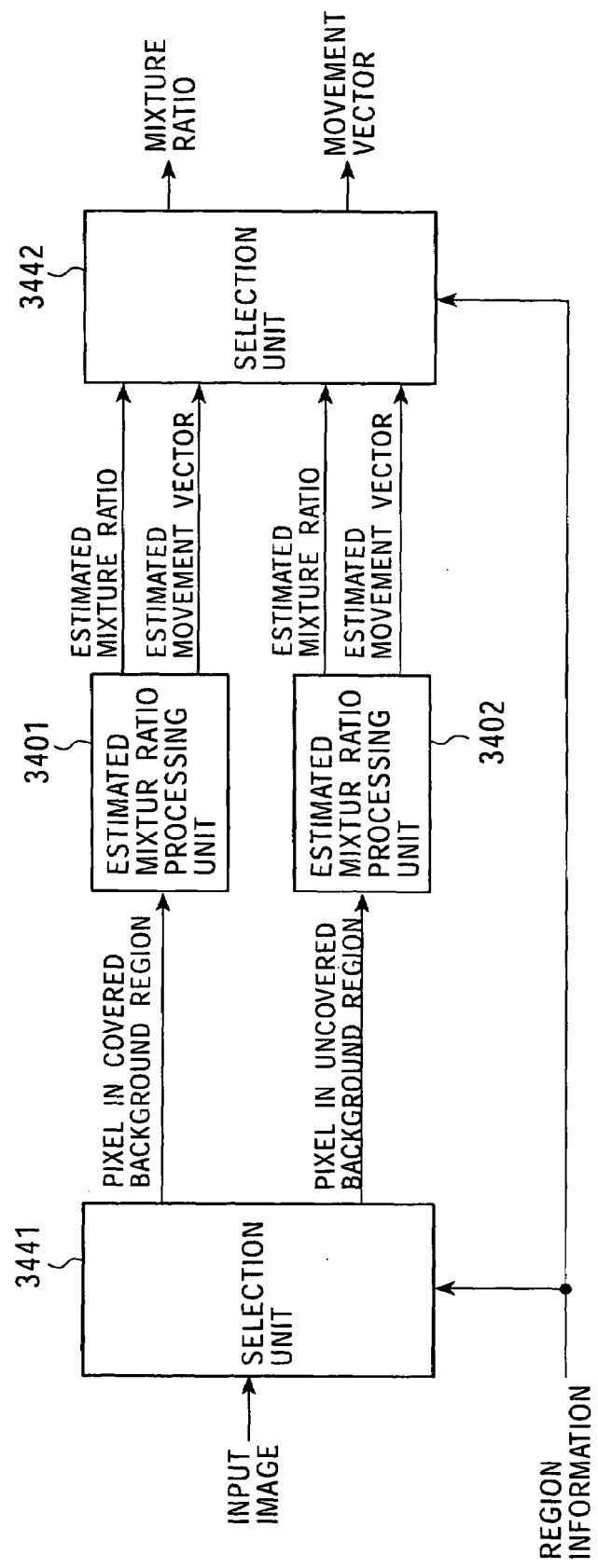

FIG. 129 is a block diagram illustrating another configuration of the coincidence detecting unit 3001.

Figure 130:
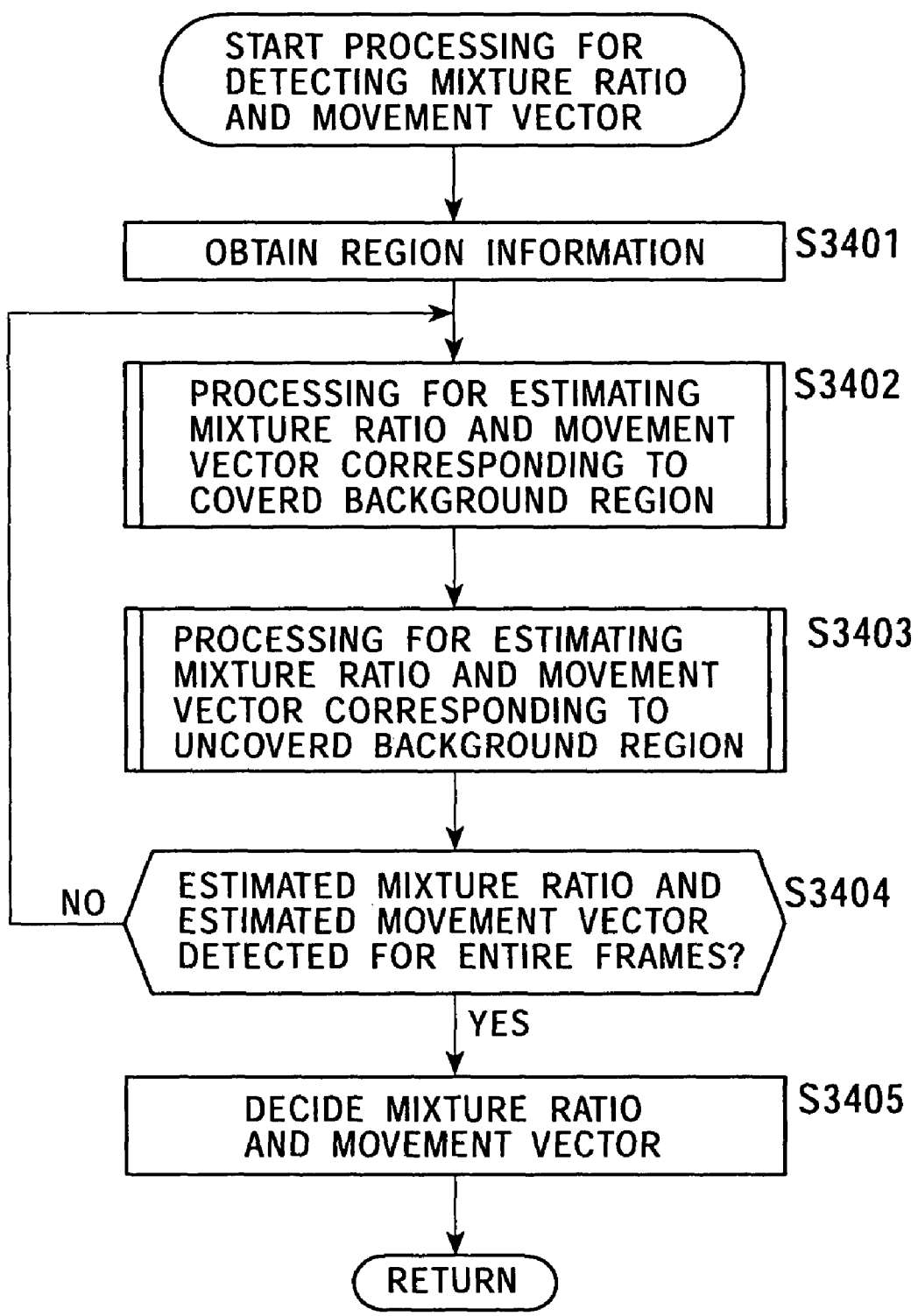

FIG. 130 is a flowchart describing the processing of mixture ratio α and movement vector detection.

Figure 131:
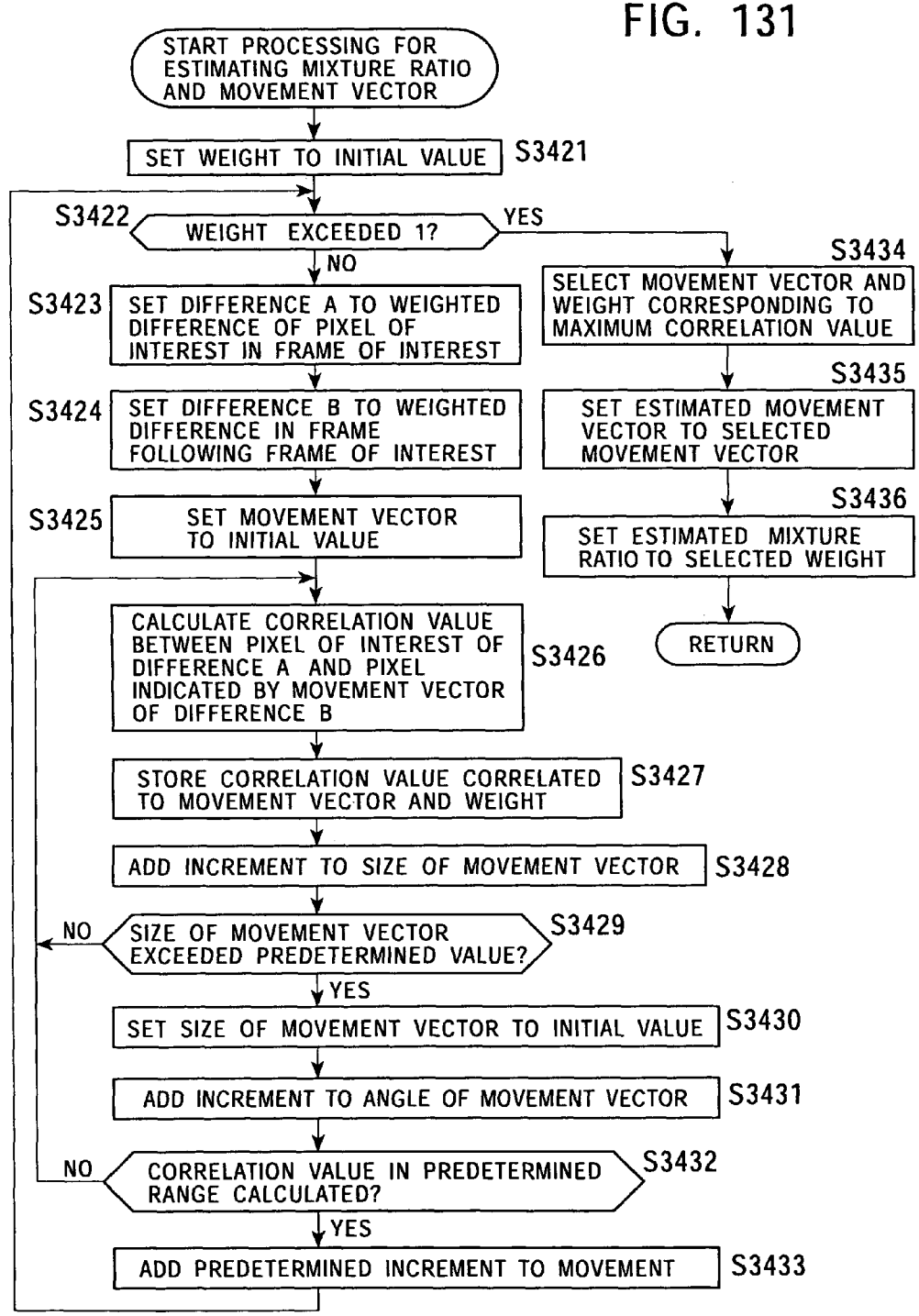

FIG. 131 is a flowchart describing processing of mixture ratio and movement vector estimation.

Figure 132:
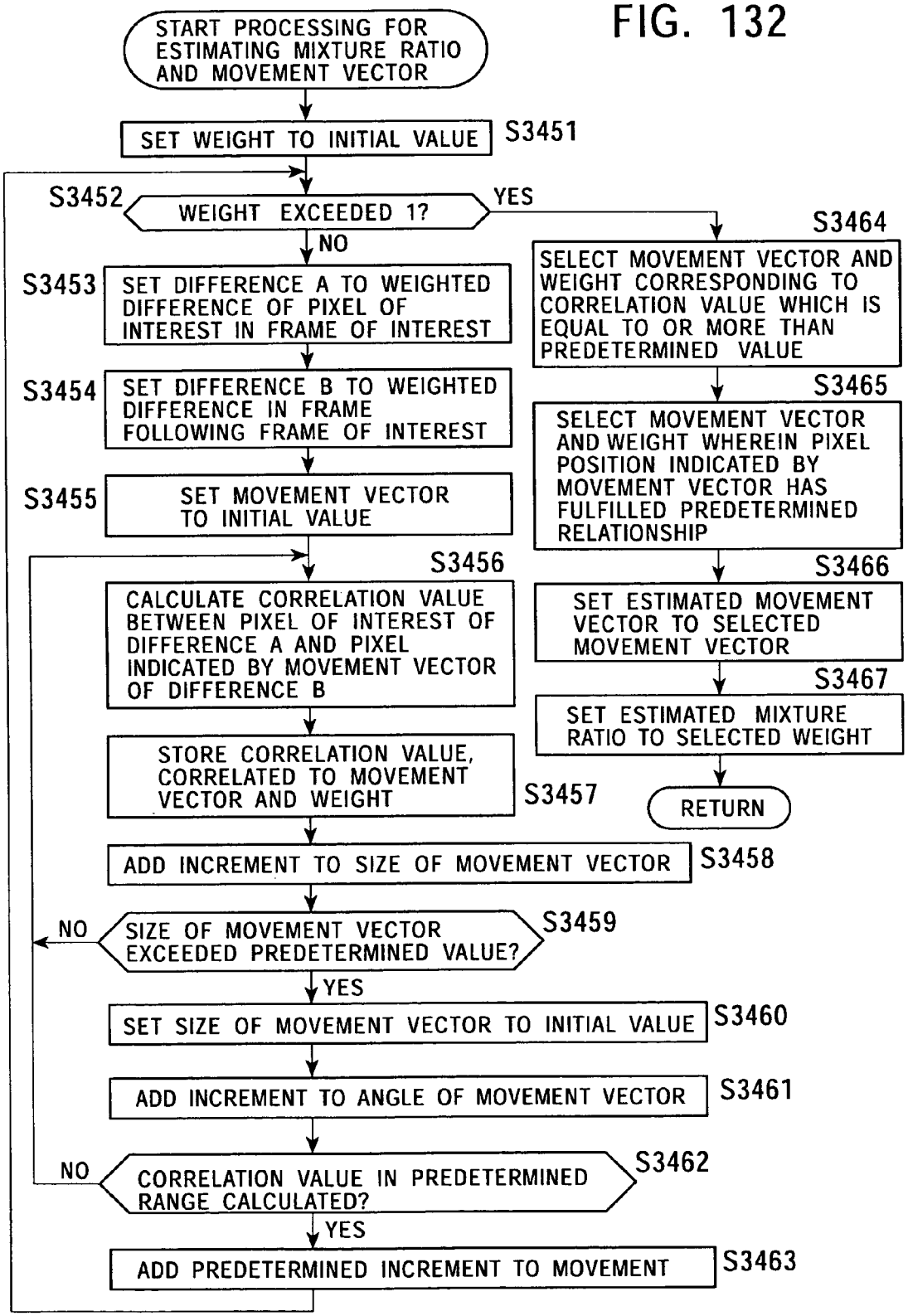

FIG. 132 is a flowchart describing other processing of mixture ratio and movement vector estimation.

Figure 133:
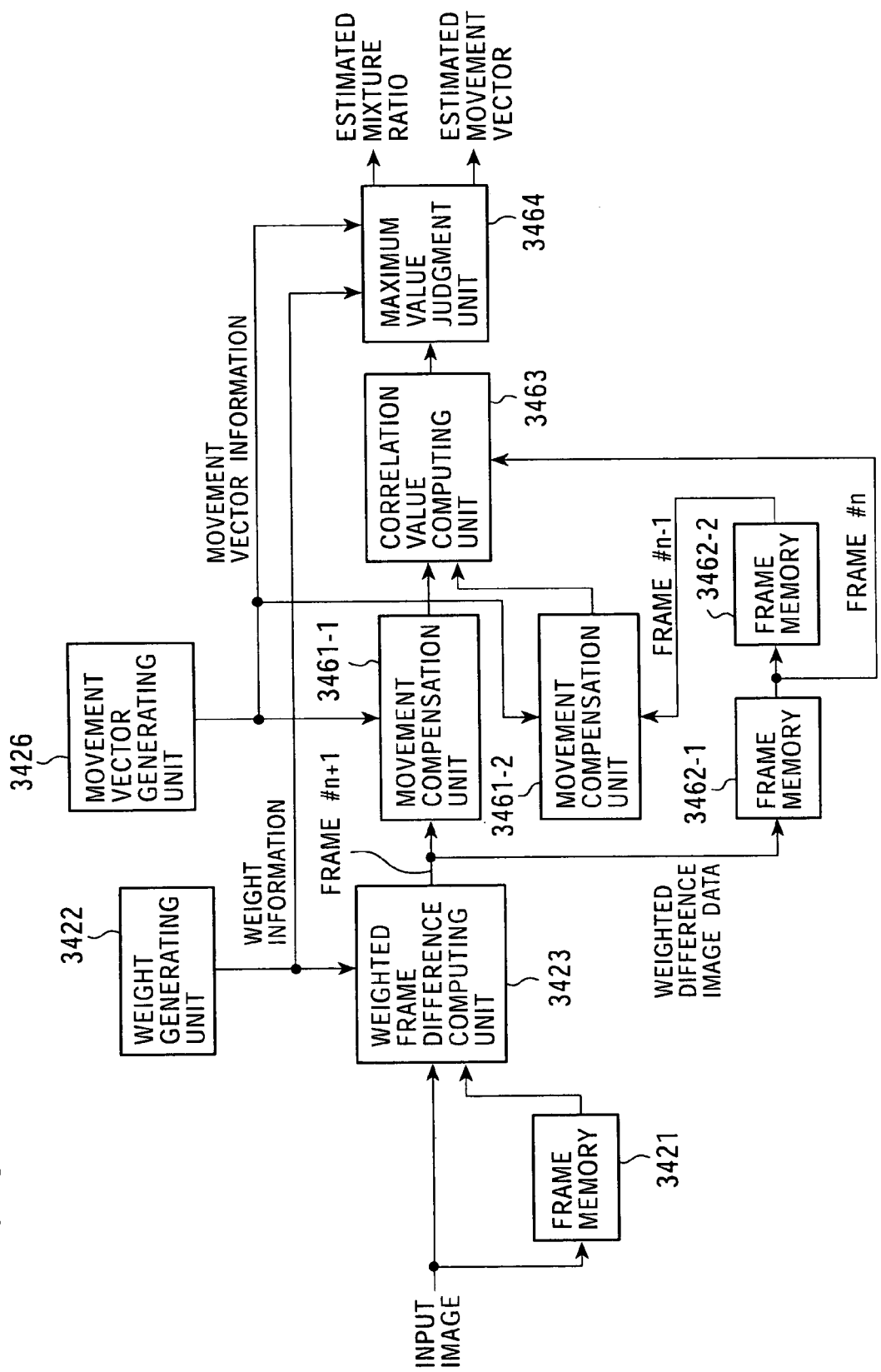

FIG. 133 is a block diagram illustrating another configuration of an estimated mixture ratio processing unit 3401.

Figure 134:
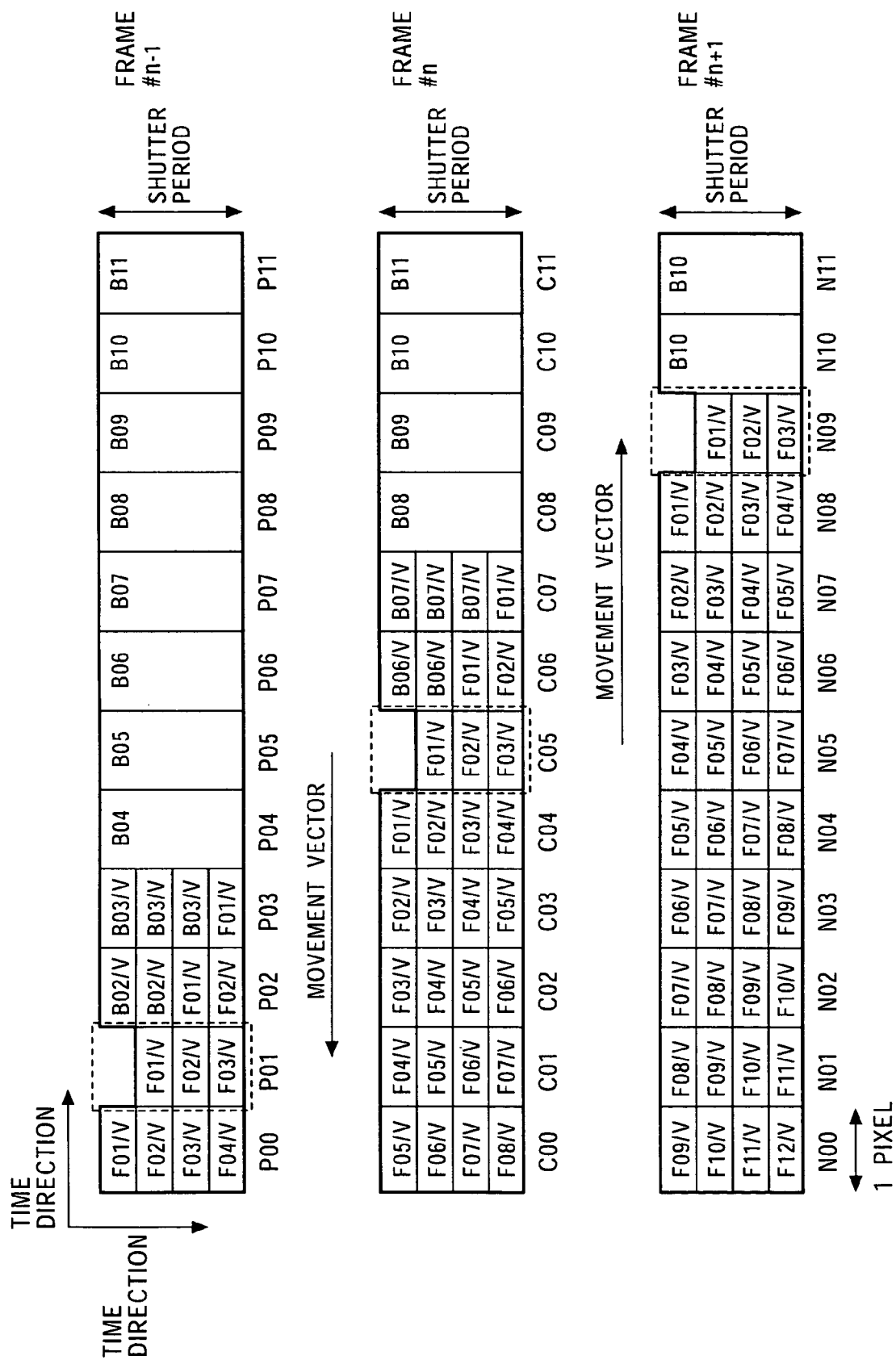

FIG. 134 is a model diagram wherein the pixel values are developed over the time direction, and periods corresponding to shutter time are divided.

Figure 135:
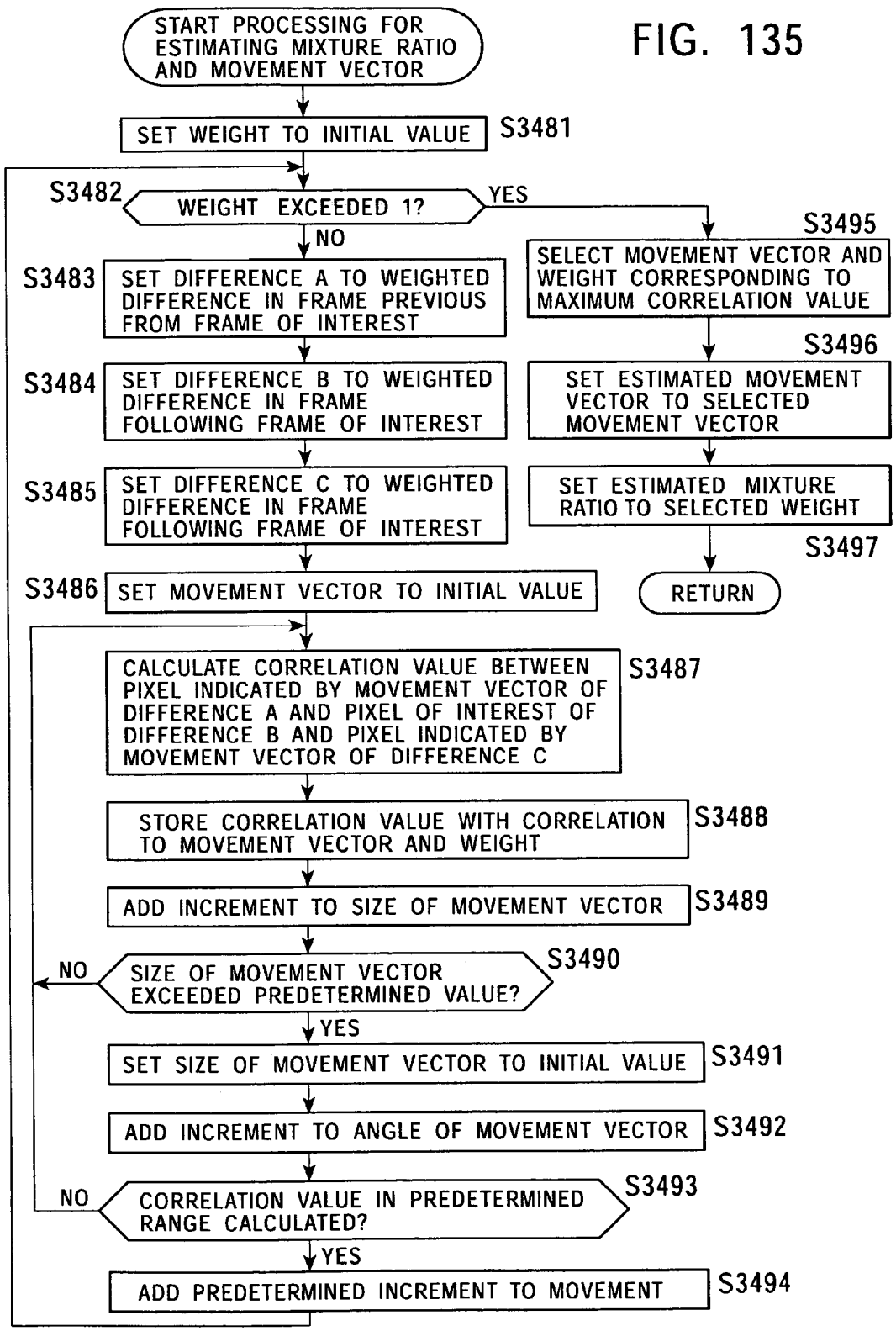

FIG. 135 is a flowchart describing yet other processing of mixture ratio and movement vector estimation.

Figure 136:
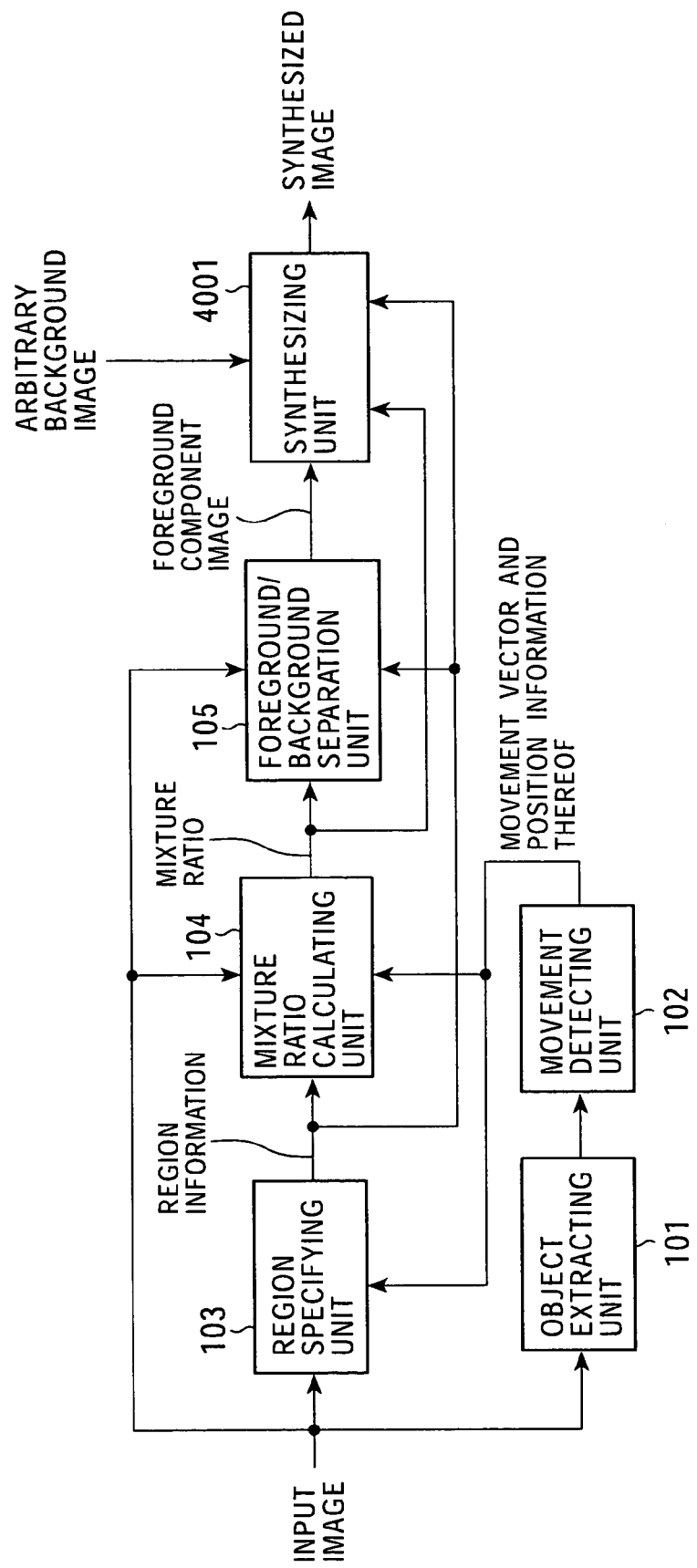

FIG. 136 is a block diagram illustrating another configuration of functions of a signal processing device.

Figure 137:
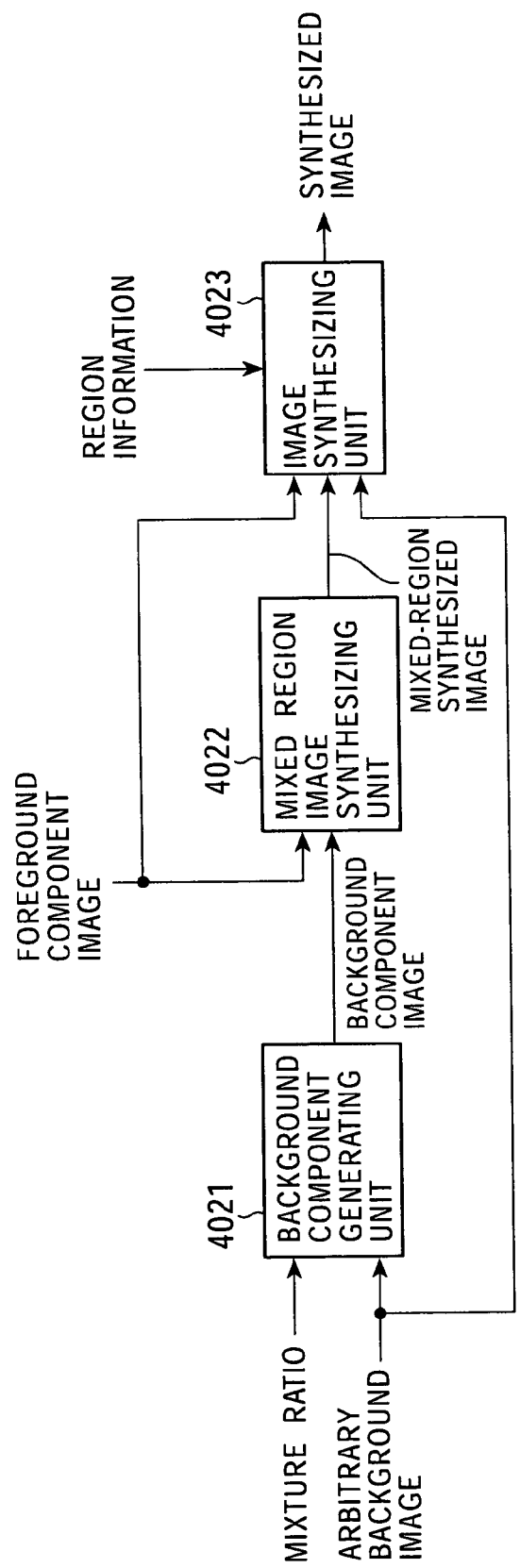

FIG. 137 is a diagram illustrating the configuration of a synthesizing unit 4001.

Figure 138:
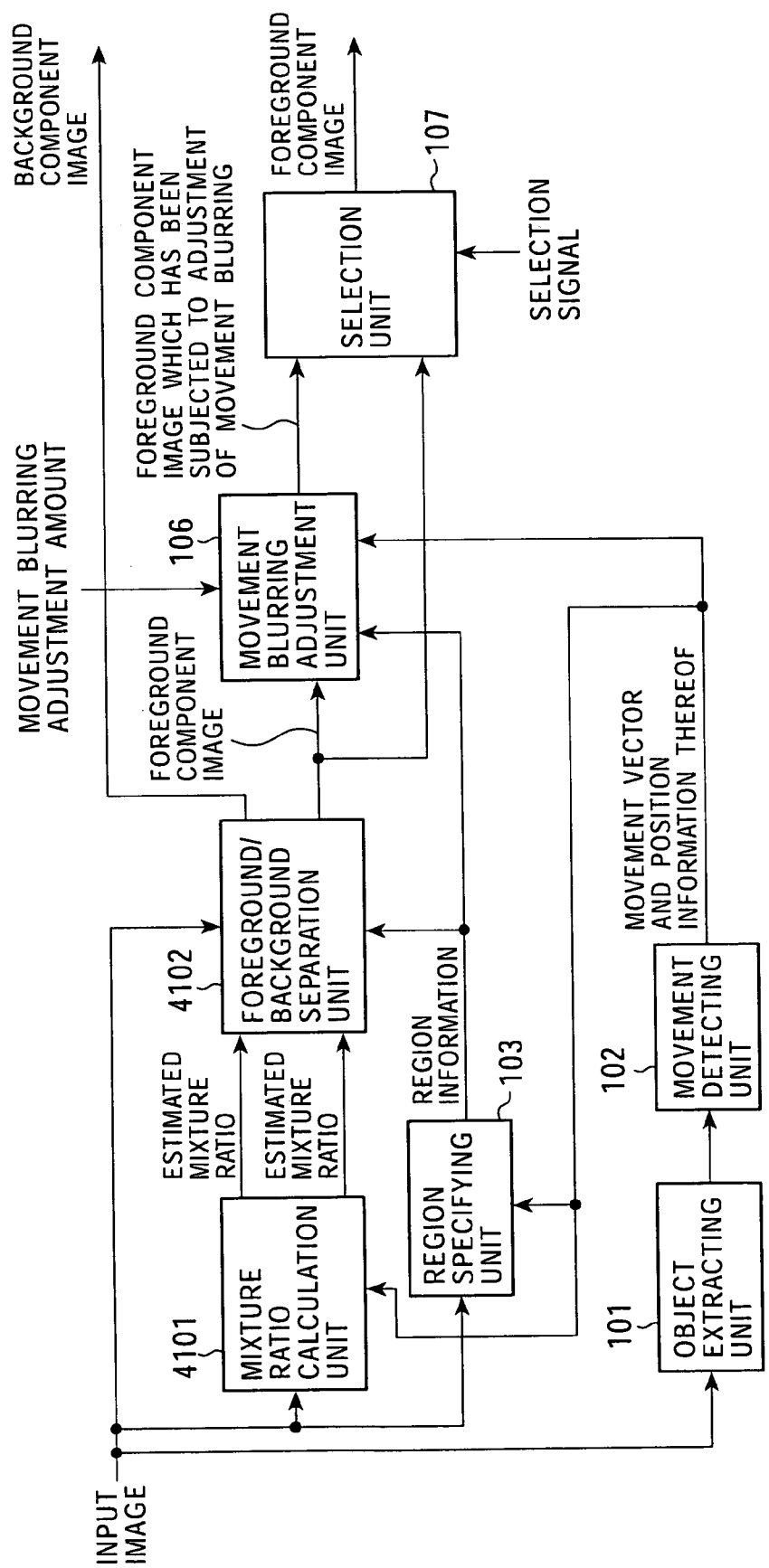

FIG. 138 is a block diagram illustrating yet another configuration of functions of a signal processing device.

Figure 139:
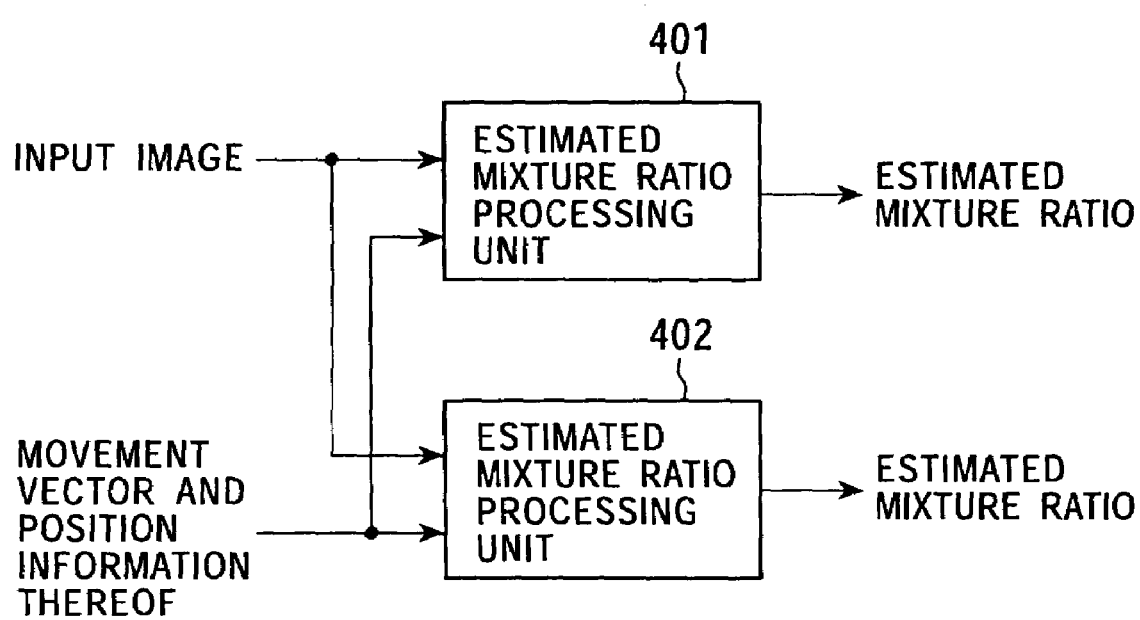

FIG. 139 is a block diagram illustrating a configuration of a mixture ratio calculation unit 4101.

Figure 140:
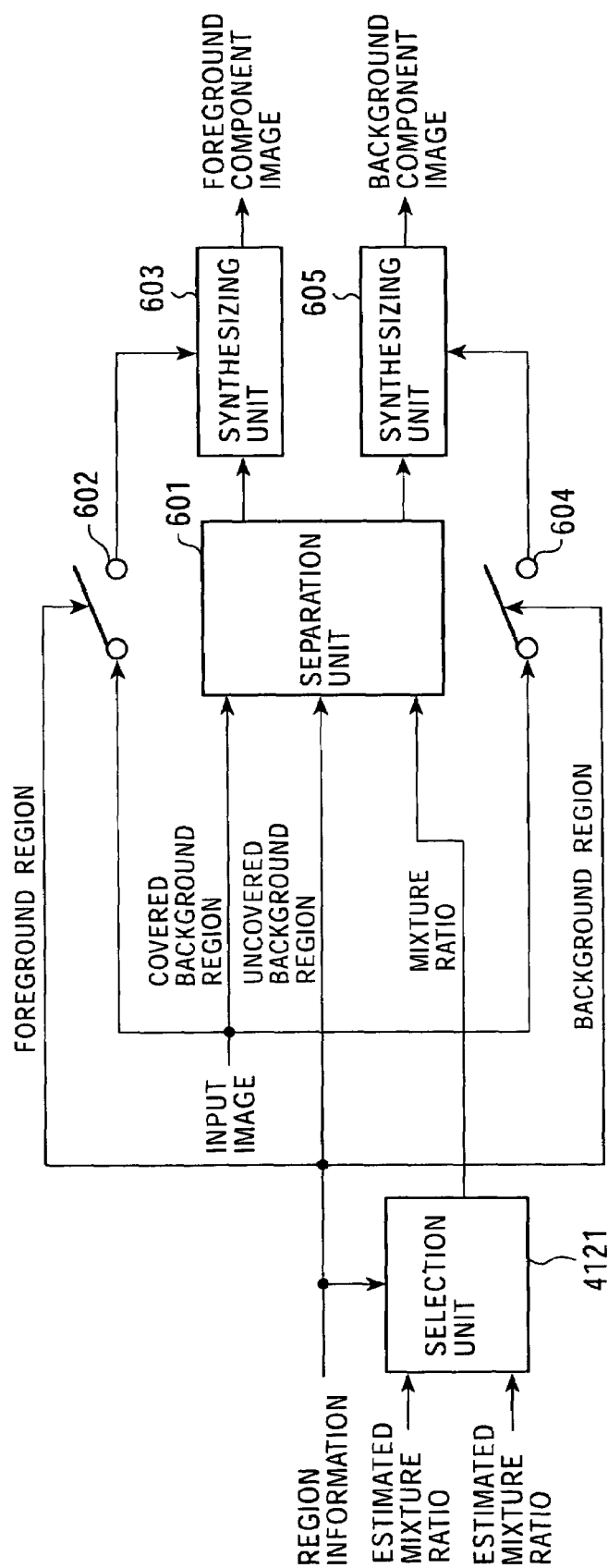

FIG. 140 is a block diagram illustrating a configuration of a foreground/background separation unit 4102.

Figure 141:
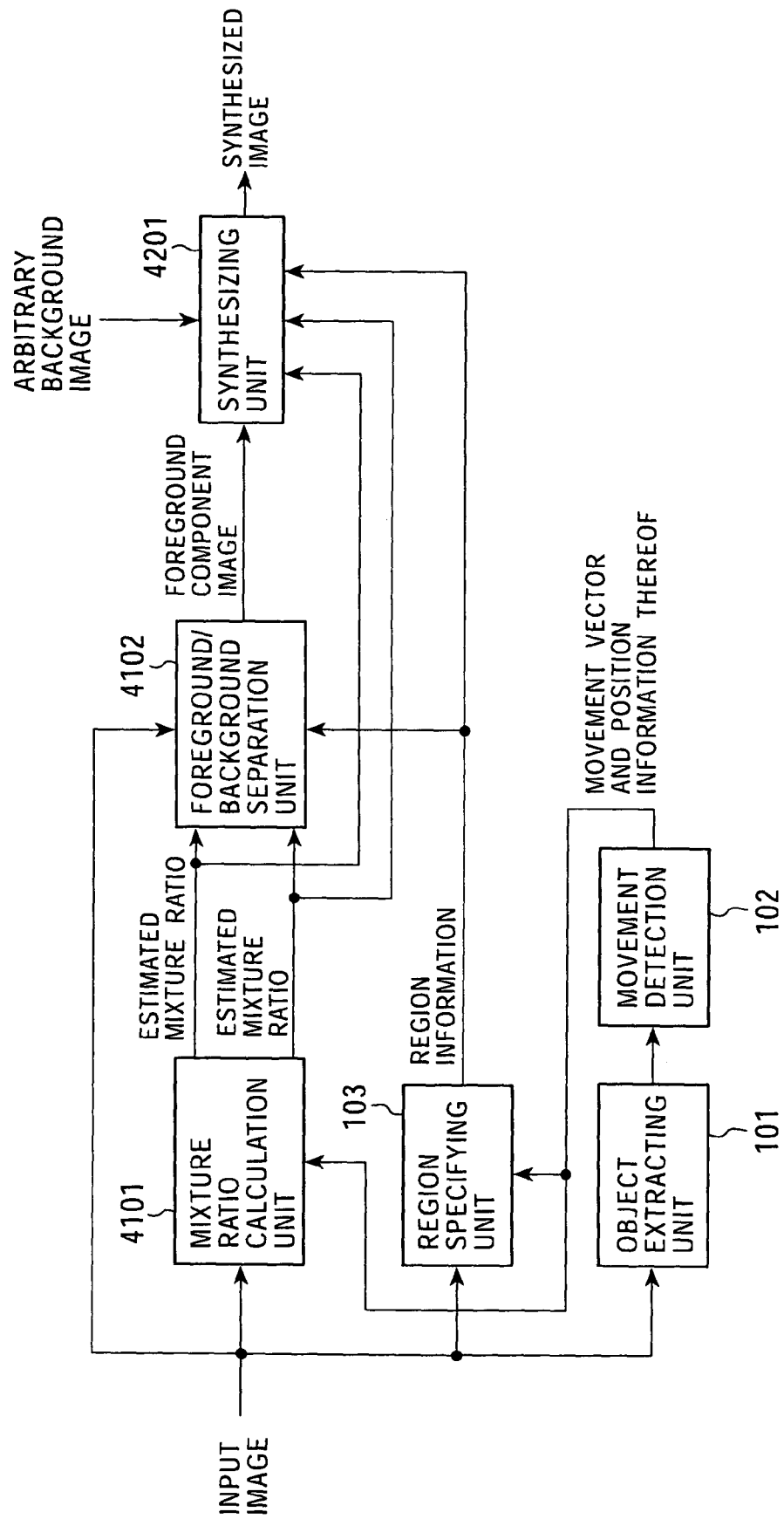

FIG. 141 is a block diagram illustrating yet another configuration of functions of a signal processing device.

Figure 142:
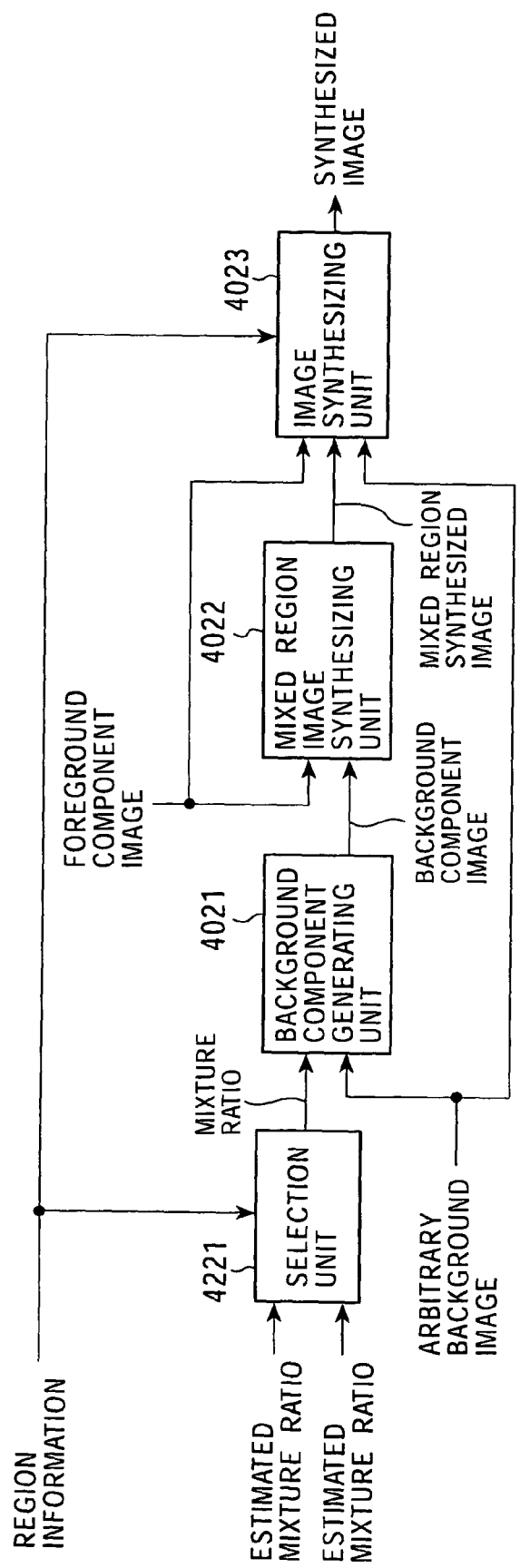

FIG. 142 is a diagram illustrating the configuration of a synthesizing unit 4201.

Figure 143:
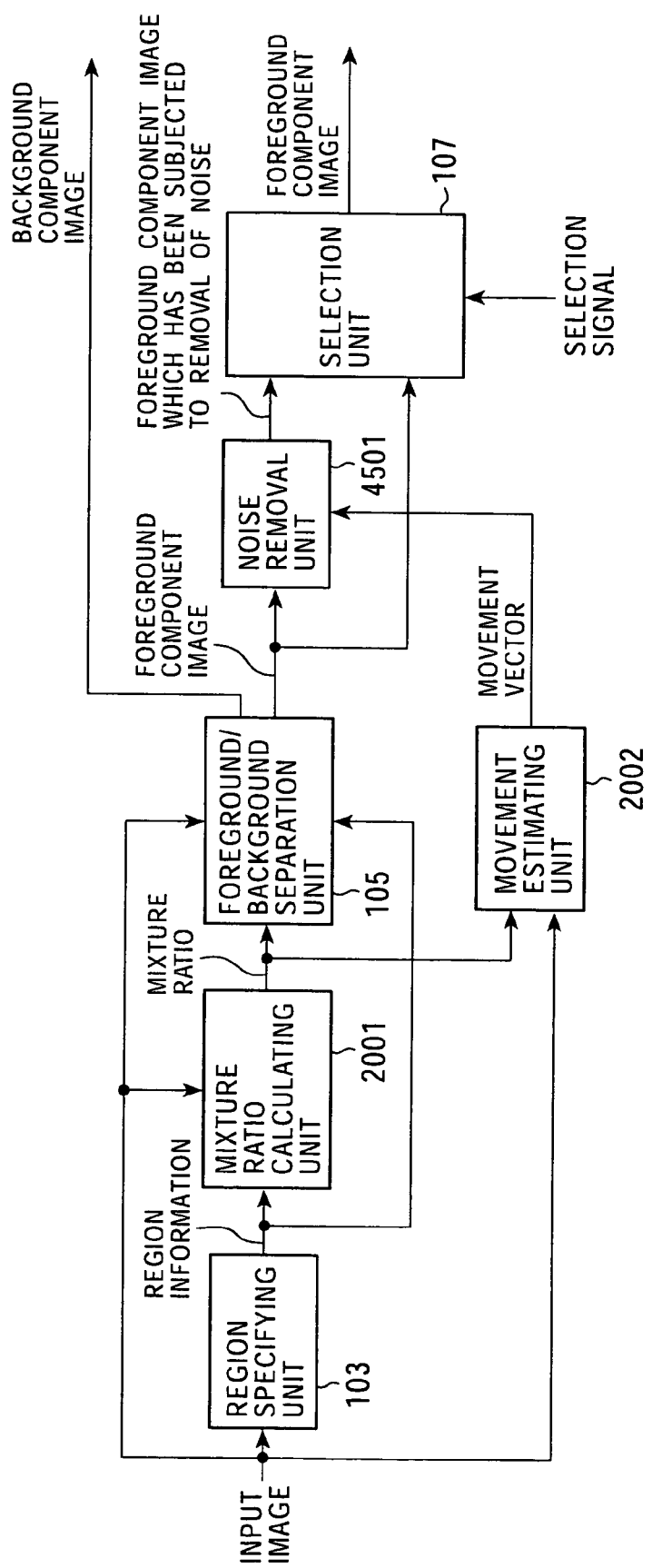

FIG. 143 is a block diagram illustrating another configuration of a signal processing device.

Figure 144:
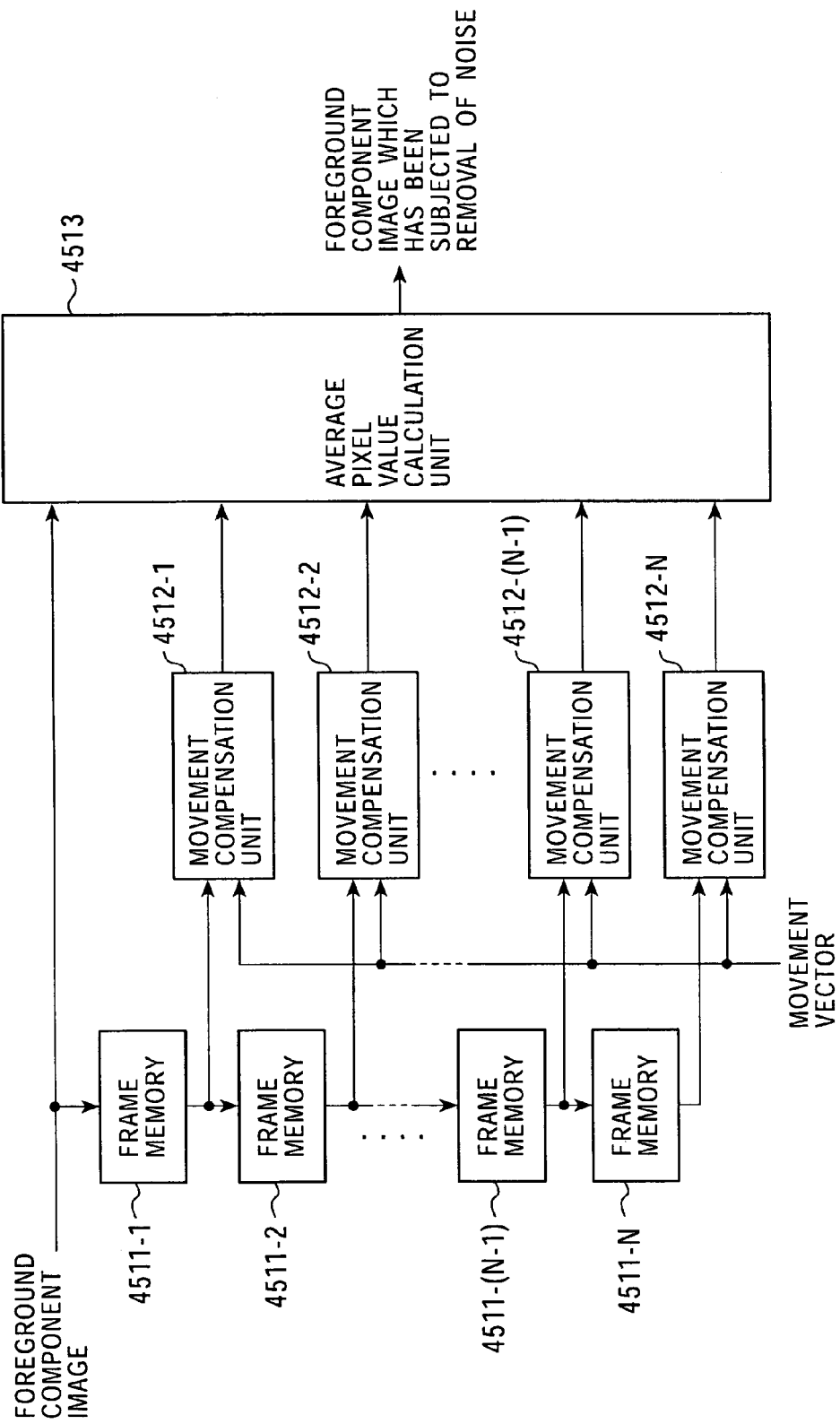

FIG. 144 is a block diagram illustrating the configuration of a noise removal unit 4501.

Figure 145:
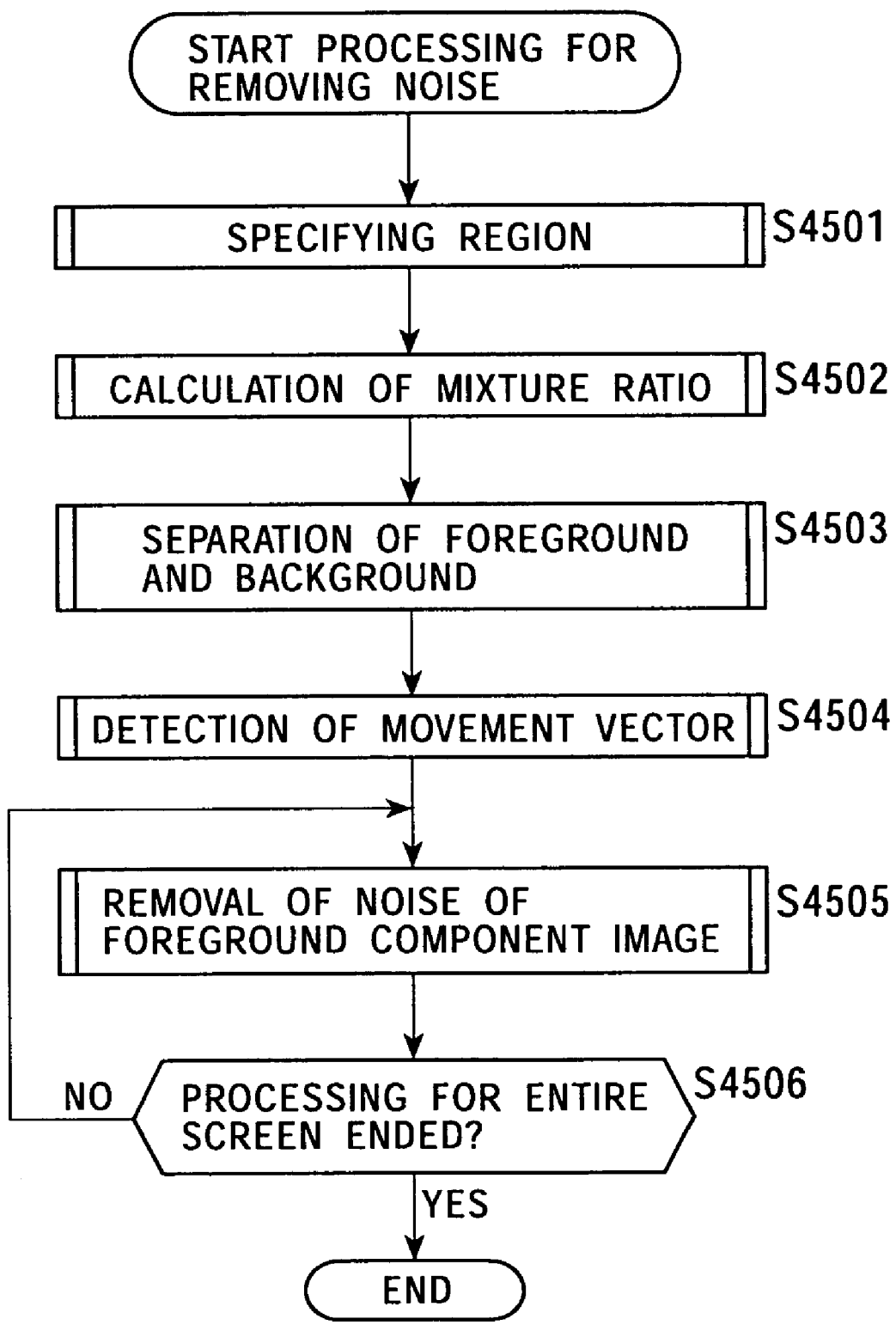

FIG. 145 is a flowchart describing processing for removing noise by a signal processing device.

Figure 146:
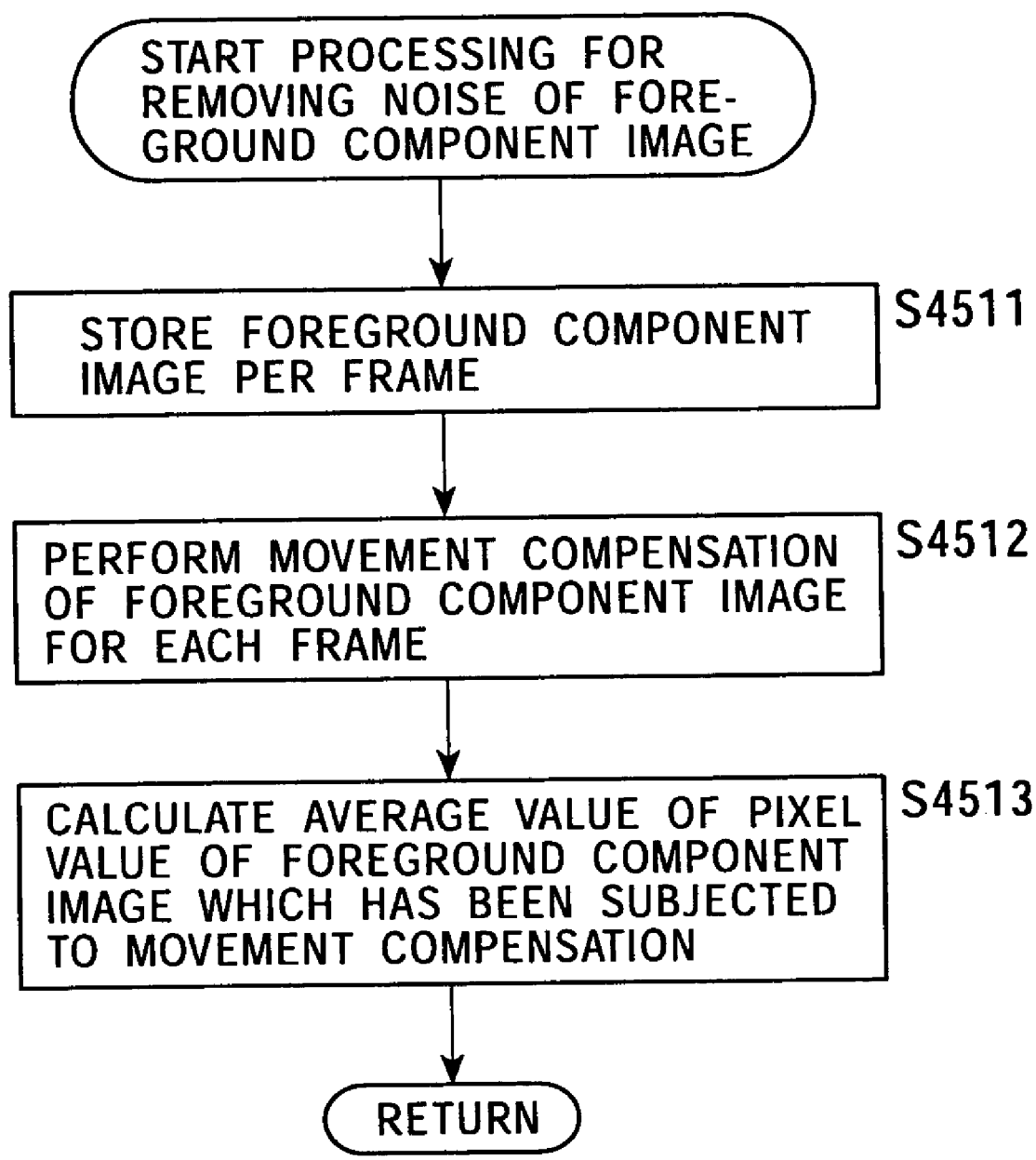

FIG. 146 is a flowchart describing processing for removing noise of a foreground component image.

Figure 147:
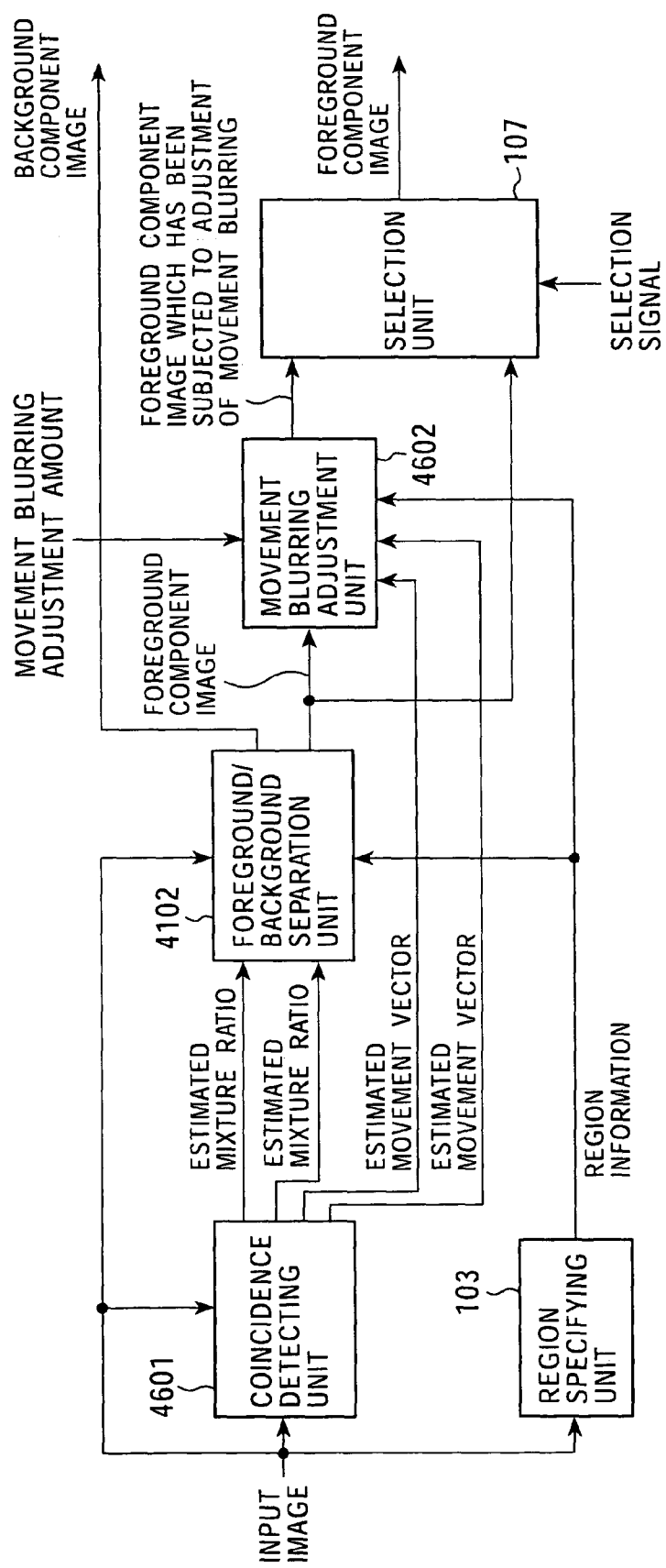

FIG. 147 is a block diagram illustrating another configuration of functions of a signal processing device.

Figure 148:
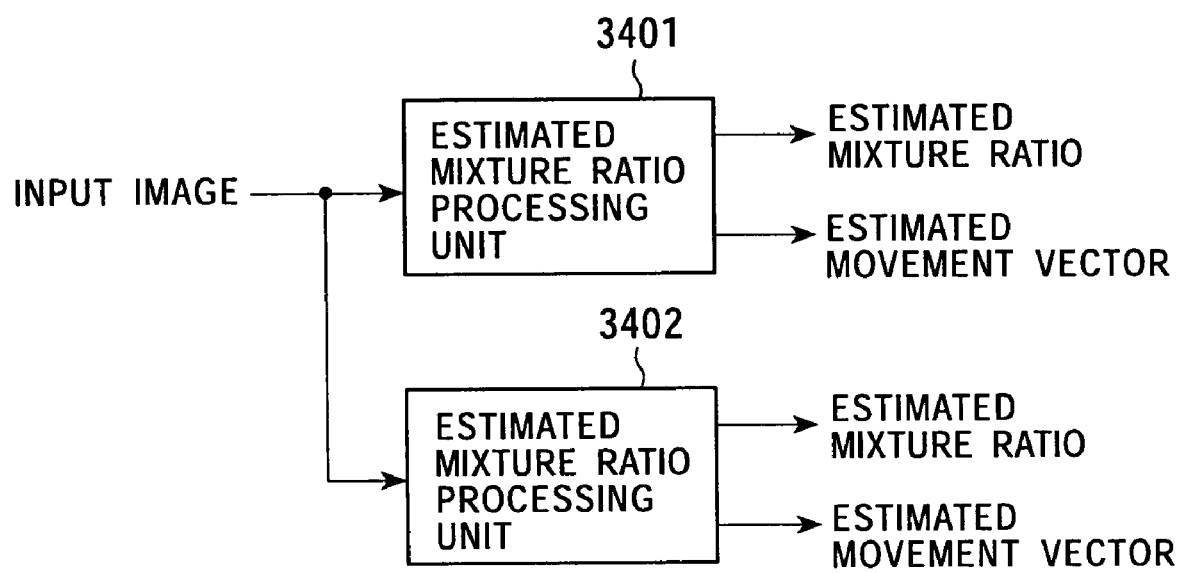

FIG. 148 is a diagram illustrating a configuration of the coincidence detecting unit 4601.

Figure 149:
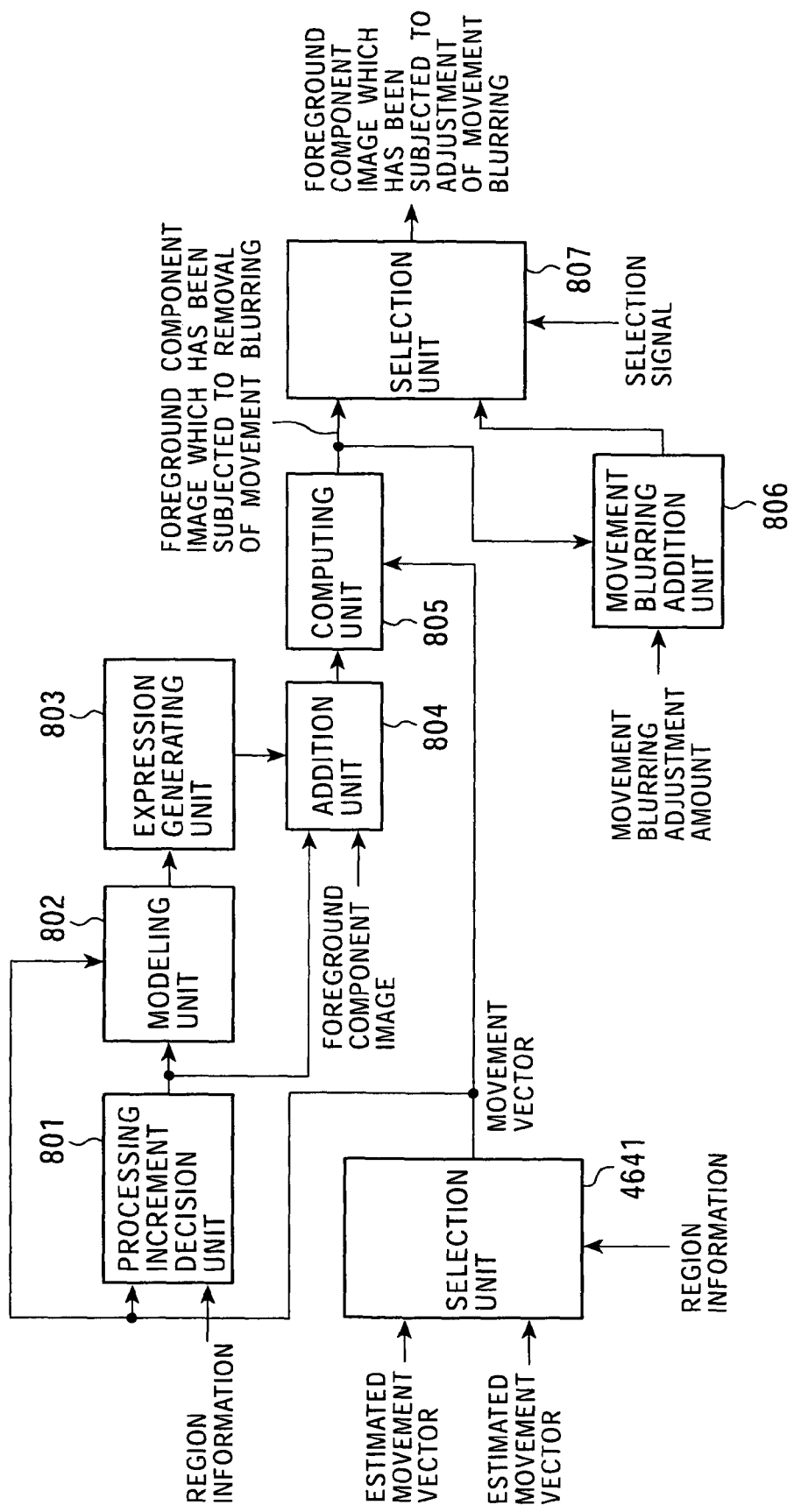

FIG. 149 is a diagram illustrating a configuration of the movement blurring adjustment unit 4602.

Figure 150:
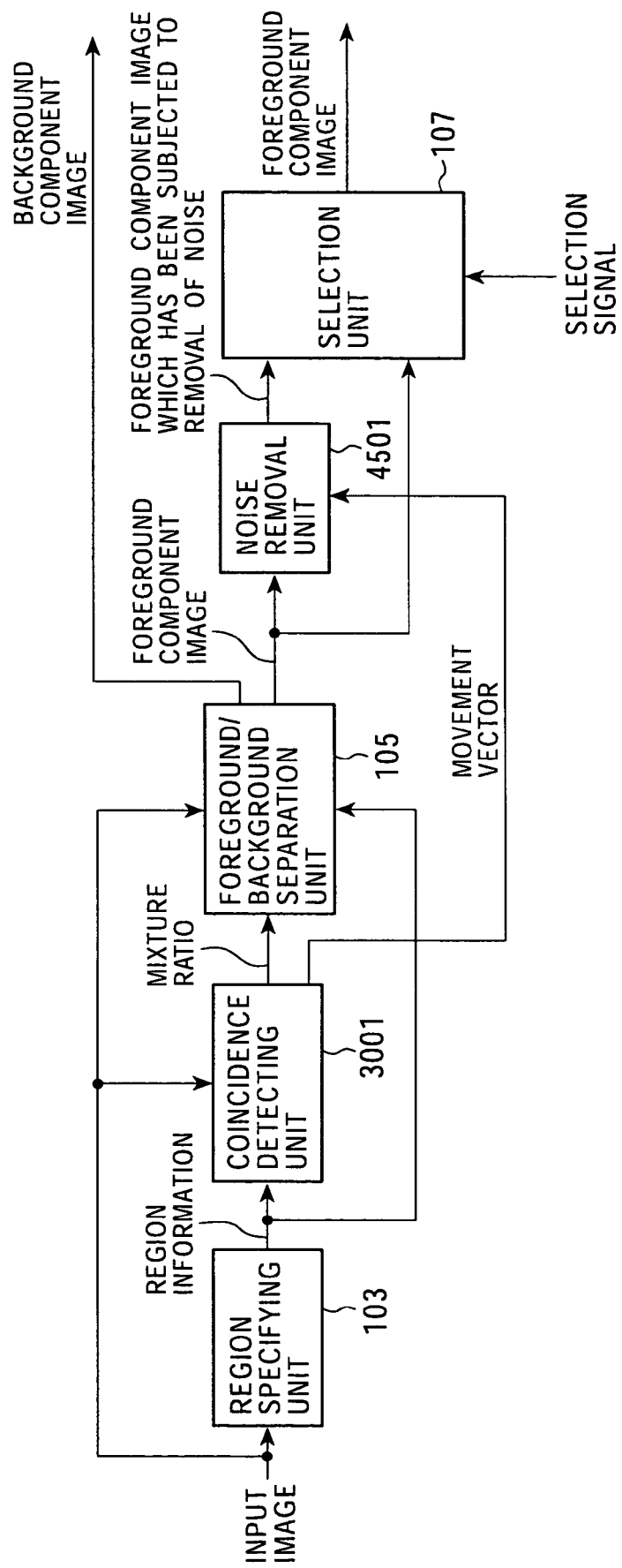

FIG. 150 is a block diagram illustrating yet another configuration of functions of a signal processing device.

Figure 151:
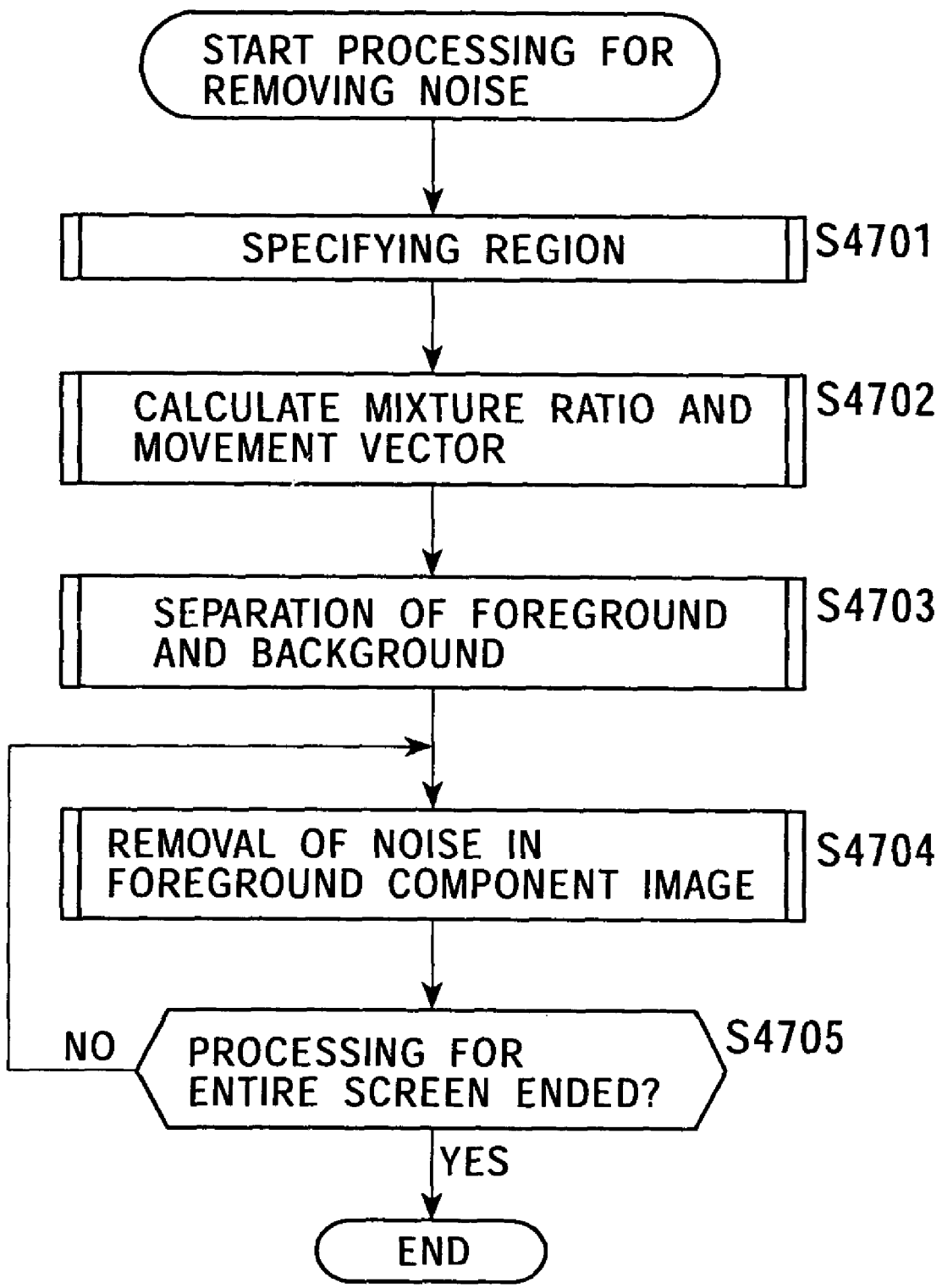

FIG. 151 is a flowchart describing processing for removing noise.

BEST MODE FOR CARRYING OUT THE INVENTION

Figure 1:
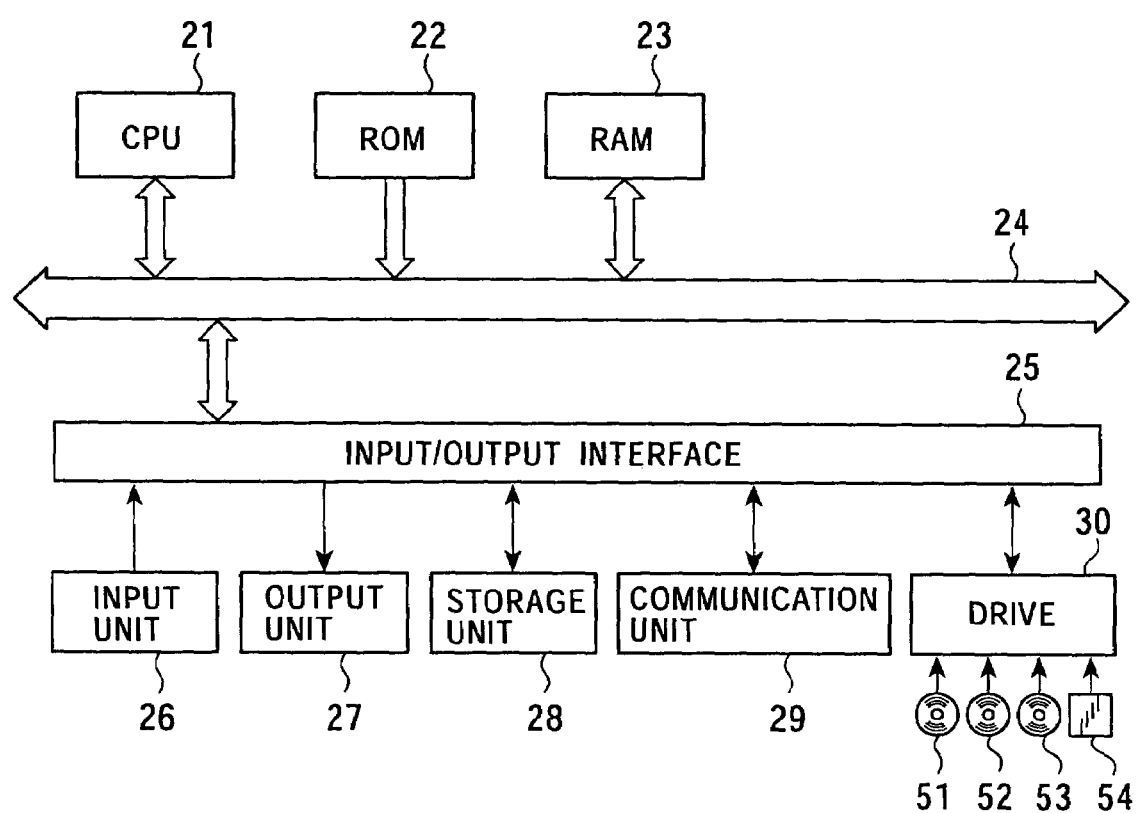
FIG. 1 is a block diagram illustrating a configuration example of a signal processing device.

FIG. 1 is a diagram which illustrates the configuration of an embodiment of a signal processing device according to the present invention. A CPU (Central Processing Unit) 21 performs various types of processing following programs stored in ROM (Read Only Memory) 22 or a storage unit 28. RAM (Random Access Memory) 23 suitably stores programs for the CPU 21 to execute, data, and so forth. These CPU 21, ROM 22, and RAM 23 are mutually connected via a bus 24.

The CPU 21 is also connected to an input/output interface 25 via the bus 24. The input/output interface 25 is connected to an input unit 26 such as a keyboard, mouse, microphone, or the like, and is connected to an output unit 27 such as a display, speaker, or the like. The CPU 21 performs various types of processing corresponding to instructions input from the input unit 26. The CPU 21 then outputs images, audio, or the like, which are obtained as a result of processing, to the output unit 27.

A storage unit 28 connected to the input/output interface 25 comprises a hard disk, for example, and stores programs for the CPU 21 to execute and various types of data. A communication unit 29 communicates with external devices via the Internet or other networks. In the case of the example, the communication unit 29 also serves as an obtaining unit which obtains output from a sensor.

Also, an arrangement may be made wherein programs are obtained via the communication unit 29, and are stored in the storage unit 28.

A drive 30 connected to the input/output interface 25 drives a magnetic disk 51, optical disk 52, magneto-optical disk 53, semiconductor memory 54, or the like, in the event that those are mounted thereon, and obtains programs and data stored in the storage unit. The obtained programs, data, or the like are transmitted to the storage unit 28 and stored therein, as necessary.

A signal processing device for specifying regions which contain valid information, and performing processing for extracting the contained valid information from the data obtained with a sensor, will now be described, by way of a more specific example. In the following examples, a CCD line sensor or CCD area sensor corresponds to the sensor, region information or mixture ratio corresponds to the valid information, and mixture of foregrounds and background or movement blurring corresponds to distortion in mixed regions.

Figure 2:
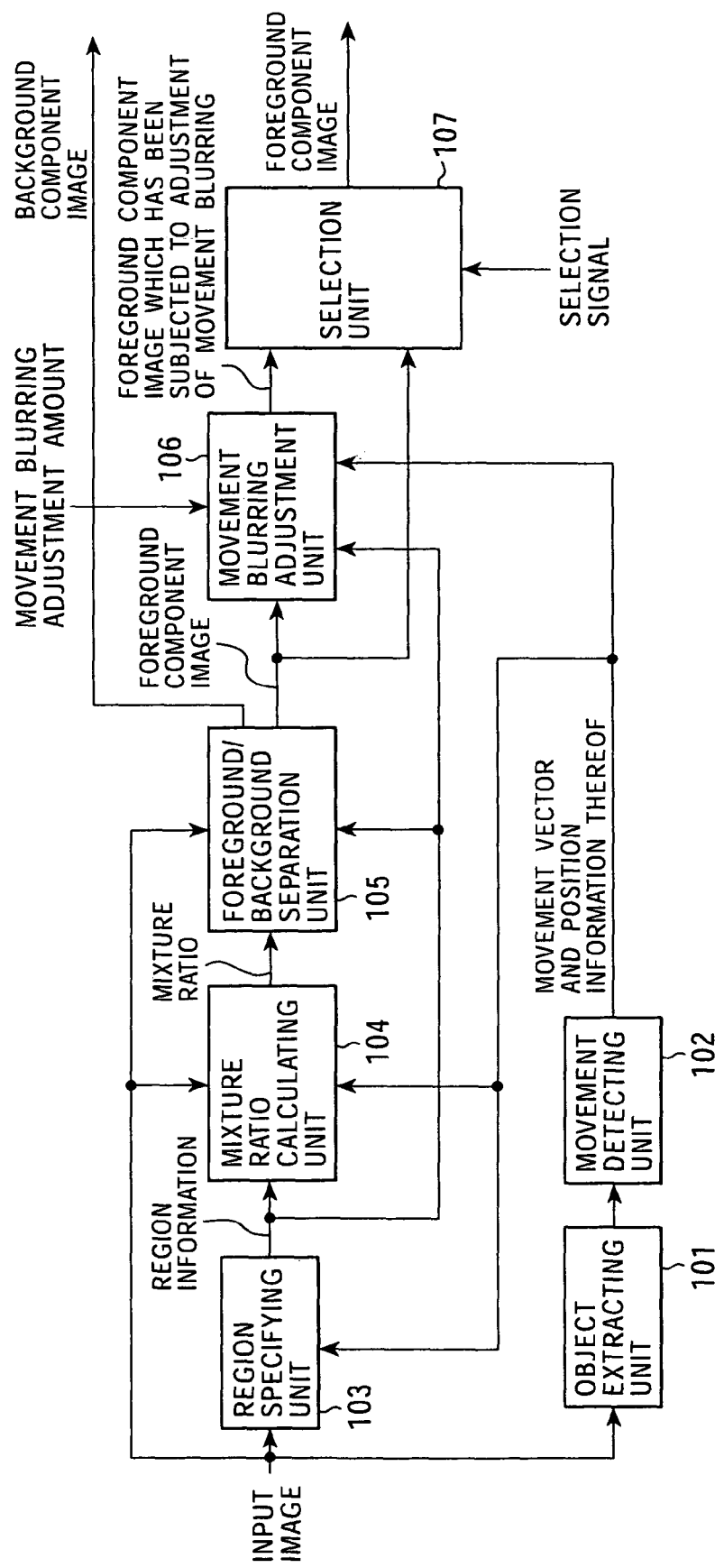
FIG. 2 is a block diagram illustrating the signal processing device.

FIG. 2 is a block diagram which illustrates the signal processing device.

Note that whether each function of the signal processing device is realized by hardware or software does not matter. That is to say, each block diagram in the present Specification may be regarded as not only a hardware block diagram but also as a software function block diagram.

Note that movement blurring means distortion which is included in images corresponding to moving objects, which occurs due to movement of objects which are objects of image-taking in the real world and due to image-taking properties of the sensor.

In the present Specification, images corresponding to objects which are objects of image-taking in the real world are called image objects.

Input images provided to the signal processing device are provided to an object extracting unit 101, a region specifying unit 103, a mixture ratio calculating unit 104, and a foreground/background separation unit 105.

The object extracting unit 101 roughly extracts the image objects corresponding to the foreground object contained in the input image, and supplies the extracted image object to the movement detecting unit 102. The object extracting unit 101 roughly extracts the image object corresponding to the foreground object, for example, by detecting the outlines of the image object corresponding to the foreground object included in input image.

The object extracting unit 101 roughly extracts the image object corresponding to the background object contained in the input image, and supplies the extracted image object to the movement detecting unit 102. The object extracting unit 101 roughly extracts the image object corresponding to the background object, by the difference between the input image and the image object corresponding to the extracted foreground object, for example.

Also, for example, an arrangement may be made wherein the object extracting unit 101 roughly extracts the image objects corresponding to the foreground objects and the image objects corresponding to the background objects based upon the difference between the background images stored in background memory provided therein and the input images.

The movement detecting unit 102 calculates the movement vectors corresponding to the roughly extracted foreground objects by techniques such as block matching, gradation, phase correlation, and pixel recursion, or the like, and provides the calculated movement vectors and movement vector position information (information for specifying the pixel positions corresponding to the movement vectors) to the region specifying unit 103, the mixture ratio calculating unit 104, and the movement blurring adjustment unit 106.

The movement vector output from the movement detecting unit 102 includes information corresponding to a movement amount v.

Also, for example, an arrangement may be made wherein the movement vector per image object is output to the movement blurring adjusting unit 106 with the pixel position information for specifying a pixel with regard to the image object.

The movement amount v is a value which represents the change of position of the image corresponding to the moving object in increments of pixel interval. For example, in the event that the object image corresponding to the foreground moves so as to be displayed at a position four pixels away in the following frame with a given frame as a reference, the movement amount v of the image of the object corresponding to the foreground is 4.

Note that the object extracting unit 101 and the movement detecting unit 102 are needed in the event of adjusting the movement blurring amount corresponding to the moving objects.

The region specifying unit 103 classifies each of pixels of the input images into one of foreground region, background region, or mixed region, and the information (which is called region information hereafter) which indicates which of the foreground region, background region, or mixed region, each pixel belongs to, is provided to the mixture ratio calculation unit 104, the foreground/background separating unit 105, and the movement blurring adjusting unit 106.

The mixture ratio calculating unit 104 calculates the mixture ratio corresponding to the pixels contained in the mixed region 63 (which will be referred to as mixture ratio $\alpha$ hereafter) based upon the input image and the region information supplied from the region specifying unit 103, and supplies the calculated mixed ratio corresponding to the pixels contained in the mixed region to the foreground/background separating unit 105.

The mixture ratio $\alpha$ is a value which represents the ratio of the image component corresponding to the background object (which will also be referred to as background component hereafter) with the pixel value as indicated in Expression (3) described below.

The foreground/background separating unit 105 separates the input images into foreground component images which consist of only the image components corresponding to the foreground object (which will also be referred to as the foreground component hereafter) and background component images which consist of only the background components based upon the region information supplied from the region specifying unit 103 and the mixture ratio $\alpha$ supplied from the mixture ratio calculating unit 104, and supplies the foreground component images to the movement blurring adjustment unit 106 and a selection unit 107. Note that an arrangement may be made wherein the separated foreground component images are made to be the final output. Accurate foregrounds and backgrounds can be obtained as compared with conventional methods wherein only the foregrounds and backgrounds are specified and separated without taking the mixed region into consideration.

The movement blurring adjustment unit 106 decides the increment of processing, which indicates one or more pixels included in the foreground component images, based upon the movement amount v which is led from the movement vector, and the region information. An increment of processing is the data which designates one group of the pixels which are the object for adjustment processing for the movement blurring value.

The movement blurring adjustment unit 106 adjusts the movement blurring amounts contained in the foreground component images, such as removing, reducing, or increasing the movement blurring amounts contained in the foreground component images, based upon the movement blurring adjustment amounts input to the signal processing device, the foreground component images provided from the foreground/background separation unit 105, and the movement vectors, position information thereof, and processing increments, provided from the movement detection unit 102, and outputs the foreground component image which has been subjected to adjustment of the movement blurring amount to the selection unit 107. An arrangement may be made wherein the movement vectors and the position information are not used.

The selection unit 107 selects one of the foreground component images supplied from the foreground/background separation unit 105 or foreground component images which has been subjected to adjustment of the movement blurring amount, supplied from the movement blurring adjustment unit 106, and outputs the selected foreground component images.

The input images supplied to the signal processing device will now be described, referring to FIG. 3 through FIG. 18.

FIG. 3 is a diagram which describes image-taking by a sensor. The sensor comprises a CCD video camera or the like, for example, including a CCD (Charge-Coupled Device) area sensor which is a solid-state image-taking device. An object 111 corresponding to the foreground in the real world moves between an object 112 corresponding to the background in the real world, and the sensor, for example, from the left side to the right side horizontally in the drawing.

The sensor takes images of the object 111 corresponding to the foreground with the object 112 corresponding to the background. The sensor outputs the taken images in increments of one frame. For example, the sensor outputs images of 30 frames per second. In this case, the exposure period of the sensor is $\frac{1}{30}$ seconds. The exposure period represents a period from the sensor beginning conversion of input light into electric charges, up to the end of conversion of input light to electric charges. The exposure period is also called a shutter period hereafter.

Figure 4:
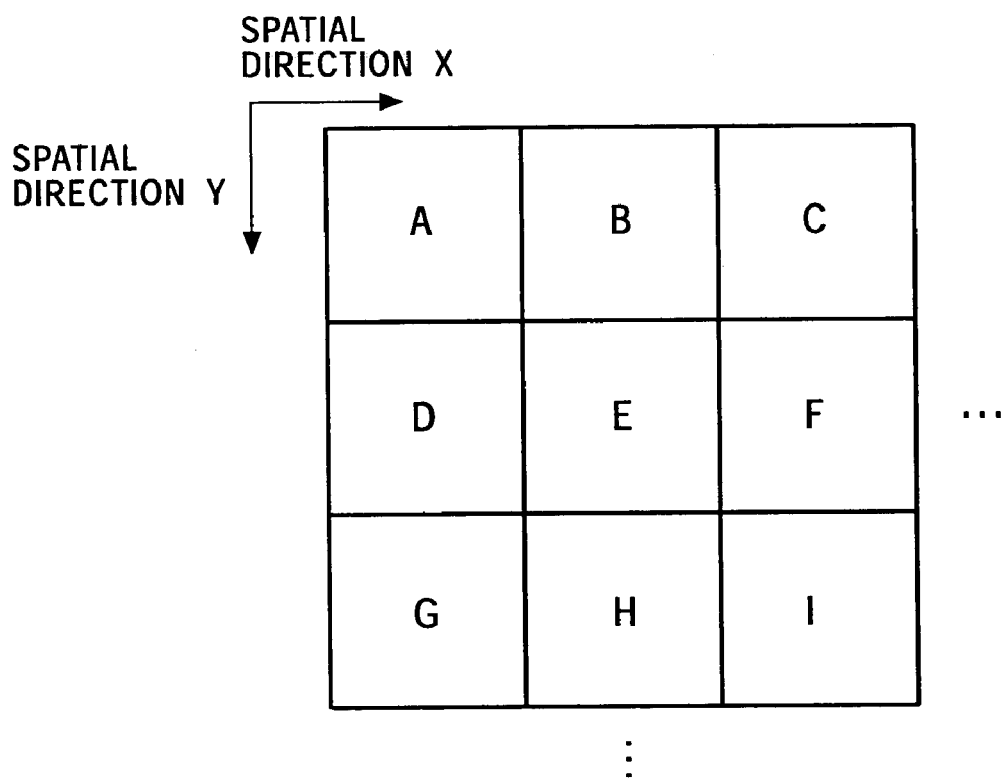
FIG. 4 is a diagram describing an arrangement of pixels.

FIG. 4 is a diagram which describes an arrangement of pixels. In FIG. 4, A through I denote individual pixels. These pixels are arranged on a plane corresponding to the image. One detecting element corresponding to one pixel is disposed on the sensor. Upon the sensor taking images, one detecting element outputs pixel values corresponding to one pixel which makes up the image. For example, a position in the X direction of the detecting elements corresponds to a position in the horizontal direction on the image, and a position in the Y direction of the detecting elements corresponds to a position in the vertical direction on the image.

Figure 5:
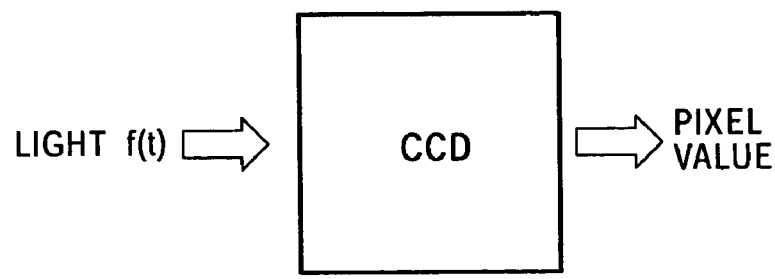
FIG. 5 is a diagram describing operation of a detecting device.

As shown in FIG. 5, for example, the detecting element of the CCD converts the input light into charges for a period corresponding to the shutter period, and accumulates the converted charges. The quantity of charges is approximately proportional to the strength of the input light and the period during which the light is input. The detecting element adds the charges converted from the input light to the accumulated charges in the period corresponding to the shutter period. That is to say, the detecting element integrates the input light during the period corresponding to the shutter period, and accumulates the amount of charges corresponding to the integrated light. It can also be said that the detecting element has integrating effects with regard to time.

The charges accumulated in the detecting element are converted into a voltage value by a circuit not shown in the drawings, which is further converted to pixel values such as digital data or the like, and is output. Accordingly, individual pixel values output from a sensor have values projected in one-dimensional space, which is from a result wherein a given portion having a spatial extension of the object corresponding to the foreground or the background, is integrated for the shutter period.

The signal processing device extracts valid information buried in output signals due to such accumulation operations of the sensor, such as the mixture ratio $\alpha$, for example. The signal processing device adjusts the distortion amounts occurring due to the mixture of the foreground image objects themselves, such as movement blurring amounts. Also, the signal processing device adjusts the distortion amounts which occur due to mixture of the foreground image objects and the background image objects.

Figure 6A:
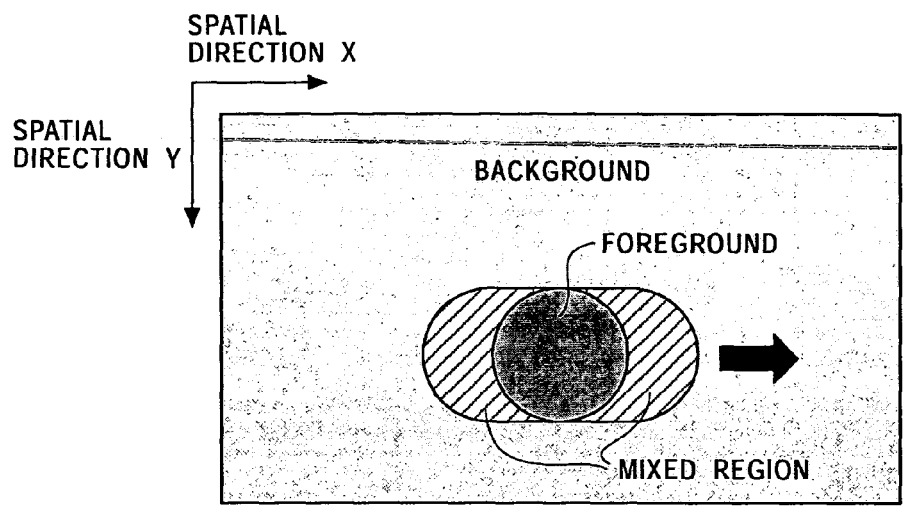
FIG. 6A is a diagram describing an image obtained by taking an image of an object corresponding to a moving foreground, and an object corresponding to a still background.

FIG. 6A shows an image which is obtained by taking images of the object corresponding to the foreground with motion, and the object corresponding to the still object. With the example illustrated in FIG. 6A, the object corresponding to the foreground moves from the left to the right horizontally on the screen.

Figure 6B:
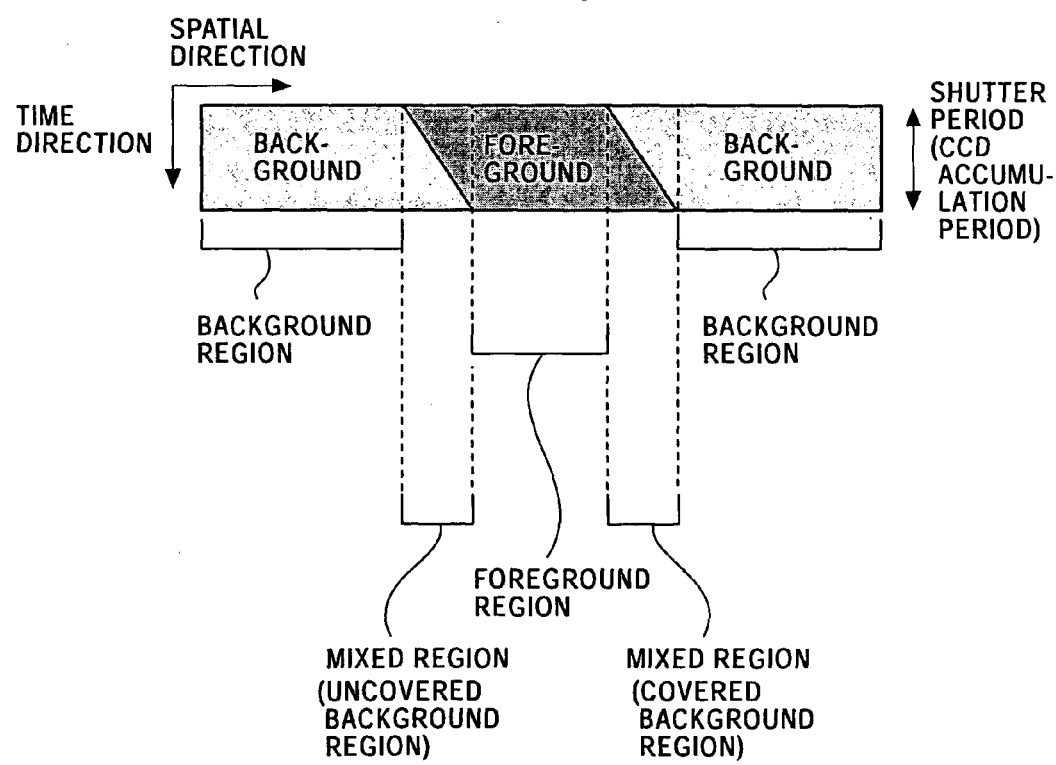
FIG. 6B is a diagram describing a model corresponding to an image obtained by taking an image of an object corresponding to a moving foreground, and an object corresponding to a still background.

FIG. 6B is a model diagram wherein pixel values corresponding to one line of the image shown in FIG. 6A develop over the time direction. The horizontal direction in FIG. 6B corresponds to the spatial X direction in FIG. 6A.

The pixels in the background regions are made up of only the background components, i.e., the image components corresponding to the background objects. The pixels in the foreground regions are made up of only the foreground components, i.e., the image components corresponding to the foreground objects.

The pixel values of pixels in mixed regions are made up of the background components and the foreground components. Since the pixels in the mixed region consists of the background components and the foreground components, the mixed region can also be said to be a distortion region. The mixed regions are further classified into covered background regions and uncovered background regions.

The covered background region is a mixed region at a position corresponding to a leading portion in the progress direction of the foreground object with regard to the foreground region, and accordingly is a region wherein the background components are covered by the foreground corresponding to elapsing of time.

Conversely, the uncovered background region is a mixed region at a position corresponding to a trailing portion in the progress direction of the foreground object with regard to the foreground region, and accordingly is a region wherein the background components emerge corresponding to elapsing of time.

As described above, images including the foreground region, background region, covered background region, or uncovered background region, are input as input images to the region specifying unit 103, the mixture ratio calculating unit 104, and the foreground/background separation unit 105.

Figures 7, 8:
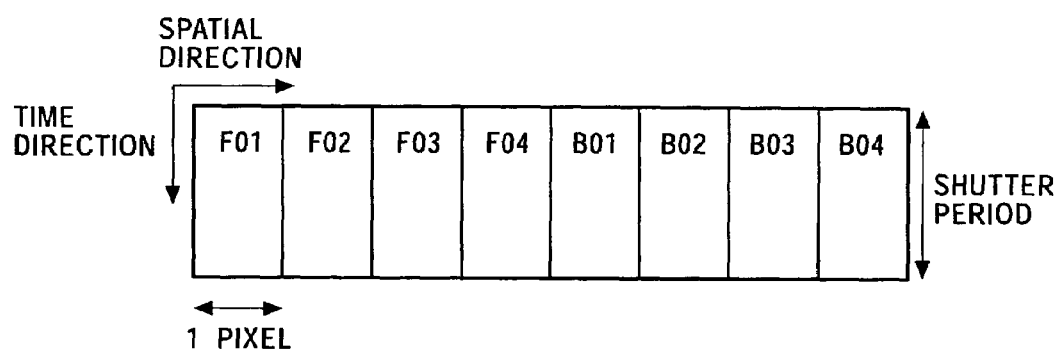
FIG. 7 is a diagram describing background region, foreground region, mixed region, covered background region, and uncovered background region.
FIG. 8 is a model diagram which develops, over the time direction, the pixel values of pixels adjacently arrayed in one row, in an image wherein an object corresponding to a still foreground and an object corresponding to a still background are subjected to image-taking.

FIG. 7 is a diagram which describes the background region, foreground region, mixed region, covered background region, and uncovered background region, as described above. In the event of corresponding to the images shown in FIG. 6, the background region is the still portion, the foreground region is the moving portion, the covered background region of the mixed region is the portion which changes from the background to the foreground, and the uncovered background region of the mixed region is the portion which changes from the foreground to the background.

FIG. 8 is a model diagram wherein pixel values of the pixels arrayed adjacently in one line in the image that has been taken of the objects corresponding to the still foregrounds and the objects corresponding to the still backgrounds, develop over the time direction. For example, pixels arrayed in one line in a screen may be selected, as pixels adjacently arrayed in one line.

The pixel values F01 through F04 shown in FIG. 8 are pixel values of pixels corresponding to the still foreground object. The pixel values B01 through B04 shown in FIG. 8 are pixel values of pixels corresponding to the still background object.

The vertical direction in FIG. 8 represents elapsing of time from the top to the bottom in the drawing. The position of the upper side of the rectangle in FIG. 8 corresponds to the time at which the sensor begins conversion of the input light into charges, and the position of the lower side of the rectangle in FIG. 8 corresponds to the time at which the sensor ends the conversion of the input light into charges. That is to say, the distance from the upper side to the lower side of the rectangle in FIG. 8 corresponds to the shutter period.

An arrangement wherein the shutter period equals the frame interval will now be described below, by way of an example.

The horizontal direction in FIG. 8 corresponds to the spatial direction X as described in FIG. 6. More particularly, shown by way of an example in FIG. 8, the distance from the left side of the rectangle denoted by "F01" to the right side of the rectangle denoted by "B04", is eight times long as the pixel pitch, that is to say, corresponds to the interval of eight continuous pixels.

In the event that the foreground objects and the background objects keep still, the light input to the sensor is not altered during the period corresponding to the shutter period.

Now, the period corresponding to the shutter period is divided into two or more periods of equal length. For example, in the event that the virtual dividing number is 4, the model diagram shown in FIG. 8 can be represented by the model diagram shown in FIG. 9. The virtual dividing number is set corresponding to the movement amount v or the like of the object corresponding to the foreground within the shutter period. For example, corresponding to the movement amount v of 4, the virtual dividing number is 4, and the period corresponding to the shutter period is divided into 4 periods.

The uppermost row in the drawing corresponds to the first of the divided periods from the shutter being opened. The second row from the top in the drawing corresponds to the second of the divided periods from the shutter being opened. The third row from the top in the drawing corresponds to the third of the divided periods from the shutter being opened. The fourth row from the top in the drawing corresponds to the fourth of the divided periods from the shutter being opened.

The divided shutter period corresponding to the moving amount v is also called a shutter period/v hereafter.

In the event that the object corresponding to the foreground keeps still, the foreground component F01/v equals the value in which the pixel value F01 is divided by the virtual dividing number, since the light input to the sensor is not altered. Similarly, in the event that the object corresponding to the foreground keeps still, the foreground component F02/v equals the value of the pixel value F02 being divided by the virtual dividing number, the foreground component F03/v equals the value of the pixel value F03 being divided by the virtual dividing number, and the foreground component F04/v equals the value of the pixel value F04 being divided by the virtual dividing number.

In the event that the object corresponding to the background keeps still, the background component B01/v equals the value of the pixel value B01 being divided by the virtual dividing number, since the light input to the sensor is not altered. Similarly, in the event that the object corresponding to the background keeps still, the background component B02/v equals the value of the pixel value B02 being divided by the virtual dividing number, B03/v equals the value of the pixel value B03 being divided by the virtual dividing number, and B04/v equals the value of the pixel value B04 being divided by the virtual dividing number.

That is to say, in the event that the object corresponding to the foreground keeps still, the foreground component F01/v corresponding to the first shutter period/v from the shutter opening, the foreground component F01/v corresponding to the second shutter period/v from the shutter opening, the foreground component F01/v corresponding to the third shutter period/v from the shutter opening, and the foreground component F01/v corresponding to the fourth shutter period/v from the shutter opening, are the same value, since the light corresponding to the foreground object which is input to the sensor is not altered during the period corresponding to the shutter period. F02/v through F04/v have the same relationship as F01/v.

In the event that the object corresponding to the background keeps still, the background component B01/v corresponding to the first shutter period/v from the shutter opening, the background components B01/v corresponding to the second shutter period/v from the shutter opening, the background components B01/v corresponding to the third shutter period/v from the shutter opening, and the background components B01/v corresponding to the fourth shutter period/v from the shutter opening, are the same value, since the light corresponding to the background object which is input to the sensor is not altered during the period corresponding to the shutter period. B02/v through B04/v have the same relationship as B01/v.

A case will now be described wherein the object corresponding to the foreground moves while the object corresponding to the background keeps still.

FIG. 10 is a model diagram wherein pixel values of the pixels on one line including the covered background region develop over the time direction in the event that the object corresponding to the foreground moves towards the right side in the drawing. In FIG. 10, the movement amount v of the foreground is 4. Since one frame is a short period, an assumption may be made that the object corresponding to the foreground is a rigid body, and moves at a constant velocity. In FIG. 10, the object image corresponding to the foreground moves so as to be displayed at a position four pixels to the right in the following frame, with reference to a given frame.

In FIG. 10, the left-most pixel through the fourth pixel from the left, belong to the foreground region. In FIG. 10, the fifth through the seventh pixels from the left belong to the covered background region of the mixed region. In FIG. 10, the right-most pixel belongs to the background region.

Since the object corresponding to the foreground moves so as to hide the object corresponding to the background with elapsing of time, the components contained in the pixel values of the pixels which belong to the covered background region change from the background components to the foreground components at a certain point of the period corresponding to the shutter period.

For example, the pixel value M shown with a heavy frame in FIG. 10, is represented by Expression (1).

$$M = B02/v + B02/v + F07/v + F06/v \quad (1)$$

For example, since the fifth pixel from the left includes a background component corresponding to one shutter period/v and foreground components corresponding to the three shutter period/vs, the mixture ratio α of the fifth pixel from the left is ¼. Since the sixth pixel from the left includes background components corresponding to the two shutter period/vs and two foreground components corresponding to the two shutter period/vs, the mixture ratio α of the sixth pixel from the left is ½. Since the seventh pixel from the left includes background components corresponding to the three shutter period/vs and a foreground component corresponding to the one shutter period/v, the mixture ratio α of the seventh pixel from the left is ¾.

Since an assumption may be made that the object corresponding to the foreground is a rigid body and the foreground image moves at a constant velocity so as to be displayed at a position four pixels to the right in the following frame, the foreground component F07/v of the first shutter period/v from the shutter opening of the fourth pixel from the left in FIG. 10, for example, equals the foreground component corresponding to the second shutter period/v from the shutter opening of the fifth pixel from the left in FIG. 10. Similarly, the foreground component F07/v equals the foreground component corresponding to the third shutter period/v from the shutter opening of the sixth pixel from the left in FIG. 10, and the foreground component corresponding to the fourth shutter period/v from the shutter opening of the seventh pixel from the left side in FIG. 10, respectively.

Since an assumption may be made that the object corresponding to the foreground is a rigid body and that the foreground image moves at a constant velocity so as to be displayed at a point four pixels to the right in the following frame, the foreground component F06/v of the first shutter period/v from the shutter opening of the third pixel from the left in FIG. 10, for example, equals the foreground component corresponding to the second shutter period/v from the shutter opening of the fourth pixel from the left in FIG. 10. Similarly, the foreground component F06/v equals the foreground component corresponding to the third shutter period/v from the shutter opening of the fifth pixel from the left in FIG. 10, and the foreground component corresponding to the fourth shutter period/v from the shutter opening of the sixth pixel from the left in FIG. 10, respectively.

An assumption may be made that since the object corresponding to the foreground is a rigid body and the foreground image moves at a constant velocity so as to be displayed at a position four pixels to the right in the following frame, the foreground component F05/v of the first shutter period/v from the shutter opening of the second pixel from the left in FIG. 10, for example, equals the foreground component corresponding to the second shutter period/v from the shutter opening of the third pixel from the left in FIG. 10. Similarly, the foreground component F05/v equals the foreground component corresponding to the third shutter period/v from the shutter opening of the fourth pixel from the left in FIG. 10, and the foreground component corresponding to the fourth shutter period/v from the shutter opening of the fifth pixel from the left in FIG. 10, respectively.

Since an assumption may be made that the object is a rigid body and the foreground image moves at a constant velocity so as to be displayed at a position four pixels to the right in the following frame, the foreground component F04/v corresponding to the first shutter period/v from the shutter opening of the left-most pixel in FIG. 10, for example, equals the foreground component corresponding to the second shutter period/v from the shutter opening of the second pixel from the left in FIG. 10. Similarly, the foreground component F04/v equals the foreground component corresponding to the third shutter period/v from the shutter opening of the third pixel from the left in FIG. 10, and the foreground component corresponding to the fourth shutter period/v from the shutter opening of the fourth pixel from the left in FIG. 10, respectively.

As described above, the foreground region corresponding to the moving object includes movement blurring, so this can be said to be a distorted region.

Figure 11:
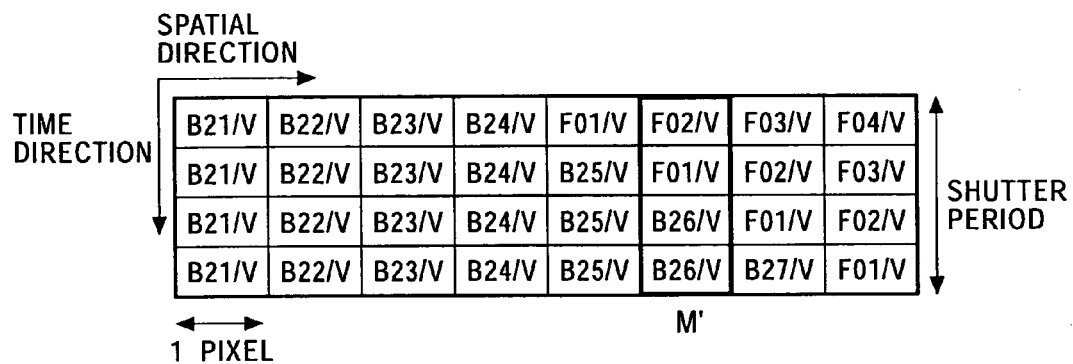
FIG. 11 is a model diagram wherein the pixel values are developed over the time direction, and periods corresponding to shutter time are divided.

FIG. 11 is a model diagram wherein the pixel values of the pixels on one line including the uncovered background region develop over the time direction in the event that the foreground moves toward the right side in the drawing. In FIG. 11, the movement amount v of the foreground is 4. Since one frame is a short time, an assumption may be made that the object corresponding to the foreground is a rigid body, and moves at a constant velocity. In FIG. 11, the object image corresponding to the foreground moves to the right side by four pixels in the following frame with reference to a given frame.

In FIG. 11, the left-most pixel through the fourth pixel from the left, belong to the background region. In FIG. 11, the fifth through the seventh pixels from the left belong to the mixed region of the uncovered background. In FIG. 11, the right-most pixel belongs to the foreground region.

Since the object corresponding to the foreground which has hidden the object corresponding to the background moves so as to be removed from the front of the object corresponding to the background with elapsing of time, the components included in the pixel values of the pixels which belong to the uncovered background region change from the foreground components to the background components at a certain point in the period corresponding to the shutter period.

For example, the pixel value M′ indicated with a heavy frame in FIG. 11, is represented by Expression (2).

$$M'=F02/v+F01/v+B26/v+B26/v \quad (2)$$

For example, since the fifth pixel from the left includes the background components corresponding to the three shutter period/vs, and the foreground component corresponding to the one shutter period/v, the mixture ratio α of the fifth pixel from the left is ¾. Since the sixth pixel from the left includes the background components corresponding to the two shutter period/vs and the foreground components corresponding to the two shutter period/vs, the mixture ratio α of the sixth pixel from the left is ½. Since the seventh pixel from the left includes the background component corresponding to the one shutter period/v and the foreground components corresponding to the three shutter period/vs, the mixture ratio α of the seventh pixel from the left is ¼.

Further generalizing Expression (1) and Expression (2), the pixel value M is represented by Expression (3).

$$M = \alpha \cdot B + \sum_i Fi/v \quad (3)$$

Here, α denotes the mixture ratio. B denotes the pixel value of the background, and Fi/V denotes the foreground component.

Since an assumption may be made that the object corresponding to the foreground is a rigid body and moves at a constant velocity, and the movement amount v is 4, for example, the foreground component F01/v of the first shutter period/v from the shutter opening of the fifth pixel from the left in FIG. 11 equals the foreground component corresponding to the second shutter period/v from the shutter opening of the sixth pixel from the left in FIG. 11. Similarly, F01/v equals the foreground component corresponding to the third shutter period/v from the shutter opening of the seventh pixel from the left in FIG. 11, and the foreground component corresponding to the fourth shutter period/v from the shutter opening of the eighth pixel from the left in FIG. 11, respectively.

Since an assumption may be made that the object corresponding to the foreground is a rigid body and moves at a constant velocity, and the virtual dividing number is 4, the foreground component F02/v of the first shutter period/v from the shutter opening of the sixth pixel from the left in FIG. 11, for example, equals the foreground component corresponding to the second shutter period/v from the shutter opening of the seventh pixel from the left in FIG. 11. Similarly, the foreground component F02/v equals the foreground component corresponding to the third shutter period/v from the shutter opening of the eighth pixel from the left in FIG. 11.

Since an assumption may be made that the object corresponding to the foreground is an rigid body and moves at a constant velocity, and movement amount v is 4, the foreground component F03/v of the first shutter period/v from the shutter opening of the seventh pixel from the left in FIG. 11, for example, equals the foreground component corresponding to the second shutter period/v from the shutter opening of the eighth pixel from the left in FIG. 11.

While a description has been made in the description of FIG. 9 through FIG. 11 wherein the virtual dividing number is 4, the virtual dividing number corresponds to the movement amount v. The movement amount v generally corresponds to the movement velocity of the object corresponding to the foreground. For example, in the event that the object corresponding to the foreground moves so as to be displayed at a position four pixels to the right in the following frame with reference to a given frame, the movement amount v is 4. The virtual dividing number is 4 corresponding to the movement amount v. Similarly, for example, in the event that the object corresponding to the foreground moves so as to be displayed at a position six pixels to the left in the following frame with reference to a given frame, the movement amount v is 6, and the virtual dividing number is 6.

Figure 12:
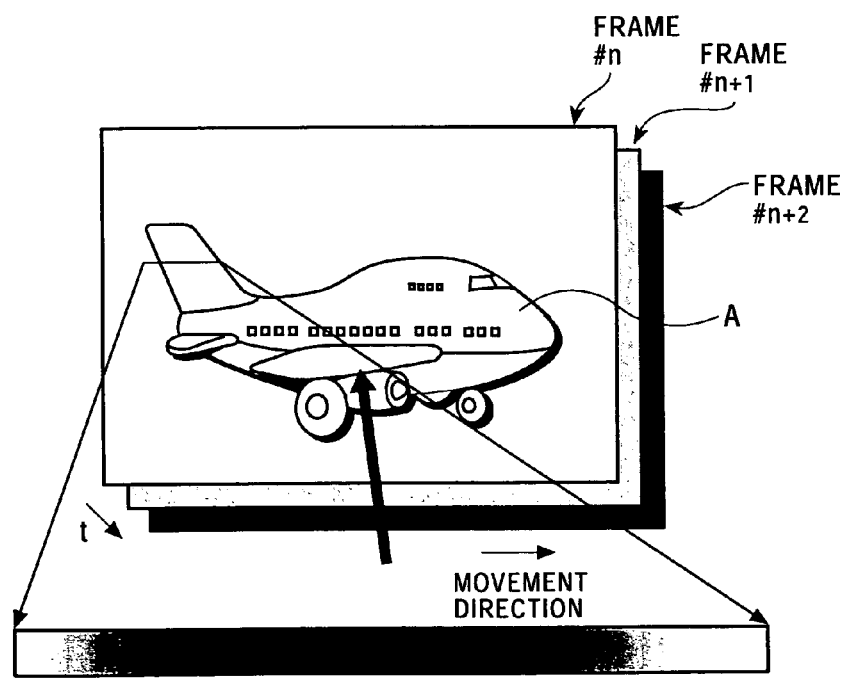
FIG. 12 is a diagram illustrating an example of extracting pixels of the foreground region, background region, and mixed region.
Figure 13:
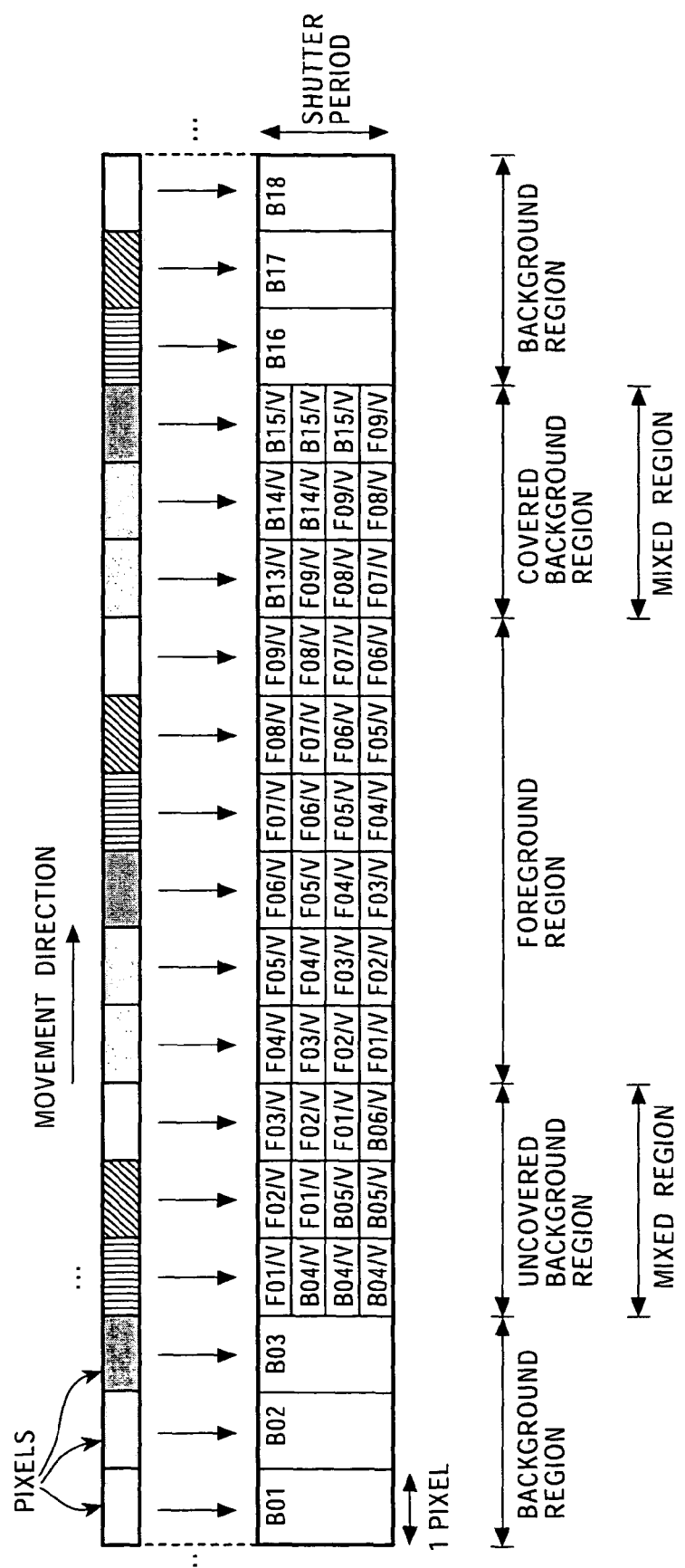
FIG. 13 is a diagram illustrating how pixels correspond to a model wherein pixel values are developed over the time direction.

FIG. 12 and FIG. 13 illustrate the relationship between the foreground region, the background region, and the mixed region which consists of the covered background region and the uncovered background region, and the foreground components and the background components, corresponding to the divided shutter period.

FIG. 12 illustrates an example wherein the pixels of the foreground region, the background region, and the mixed region, are extracted from the image including the foreground corresponding to the object which moves in front of the still background. In an example shown in FIG. 12, the object corresponding to the foreground denoted by reference character A in FIG. 12 moves horizontally on the screen.

The frame #n+1 is the frame following the frame #n, and the frame #n+2 is the frame following the frame #n+1.

FIG. 13 illustrates a model wherein the pixels of the foreground region, the background region, and the mixed region are extracted from one of frame #n through frame #n+2, and the pixel values of the extracted pixels are developed over the time direction, the movement amount v at 4.

Since the object corresponding to the foreground moves, the pixel values of the foreground region consist of four different foreground components corresponding to the period of shutter period/v. For example, the left-most pixel of the pixels of the foreground region shown in FIG. 13 consists of F01/v, F02/v, F03/v, and F04/v. That is to say, the pixels of the foreground region include movement blurring.

Since the object corresponding to the background keeps still, the light corresponding to the background input to the sensor is not altered during the period corresponding to the shutter period. In this case, the pixel values of the background region do not contain movement blurring.

The pixel value of the pixel which belongs to the mixed region made up of the covered background region or the uncovered background region consists of the foreground components and the background components.

Next, a model will be described wherein, in the event that the image corresponding to the object moves, the pixel values of the pixels which are arrayed adjacently in a single line on multiple frames, and at the same position in the frames, develop over the time direction. For example, in the event that the image corresponding to the object moves horizontally on the screen, the pixels arrayed in a single line can be selected as pixels arrayed adjacently in a single line.

Figure 14:
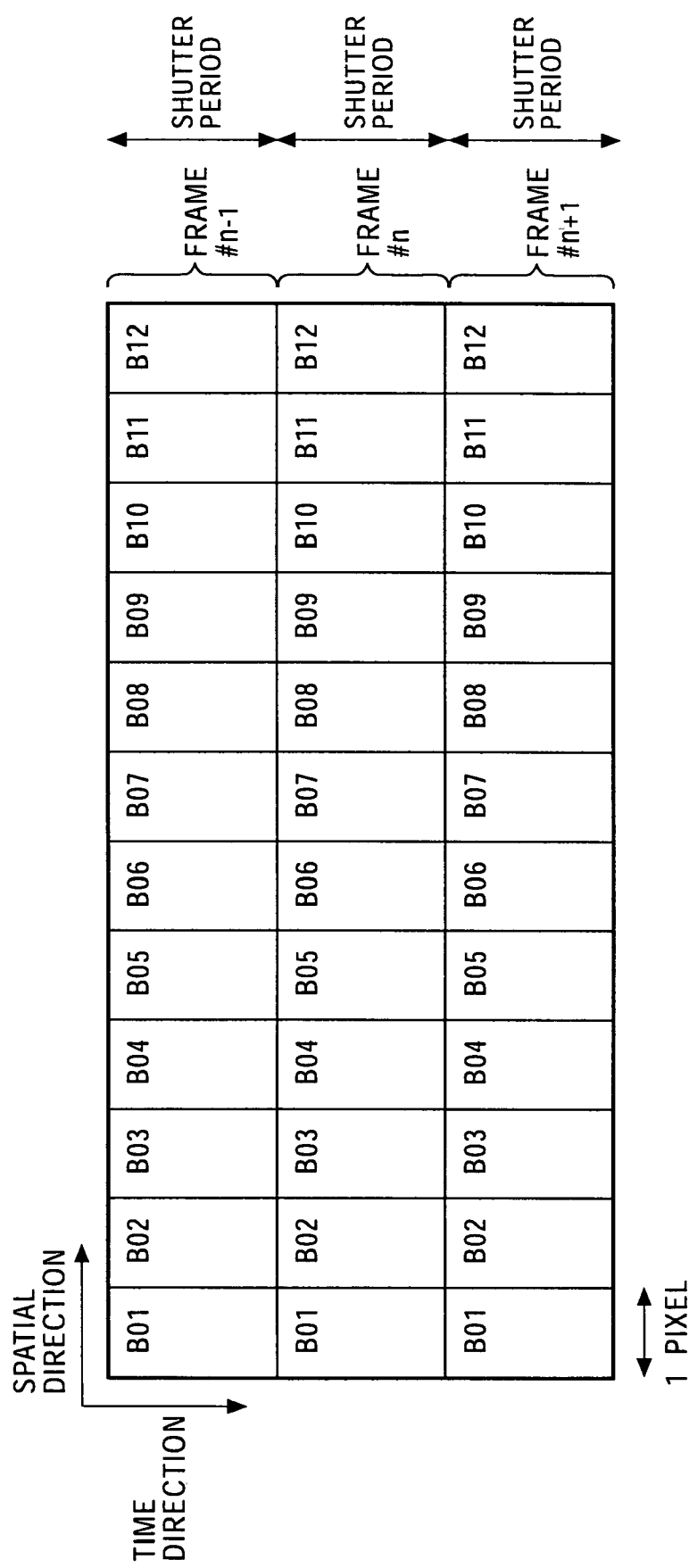
FIG. 14 is a model diagram wherein the pixel values are developed over the time direction, and periods corresponding to shutter time are divided.

FIG. 14 is a model diagram wherein the pixels arrayed adjacently in a single line on three frames of images which are taken of the object corresponding to the still background, and are at the same position in the frames, develop over the time direction. The frame #n is the frame following the frame #n−1, and the frame #n+1 is the frame following the frame #n. Other frames are denoted in the same way.

The pixel values of the B01 through B12 shown in FIG. 14 are the pixel values of the pixels corresponding to the object of the still background. Since the object corresponding to the background keeps still, the pixel values of the corresponding pixels do not change in the frame #n−1 through the frame #n+1. For example, the pixels in the frame #n and the pixels in the frame #n+1 at the position corresponding to the pixel having a pixel value B05 in the frame n−1, have a pixel value B05, respectively.

Figure 15:
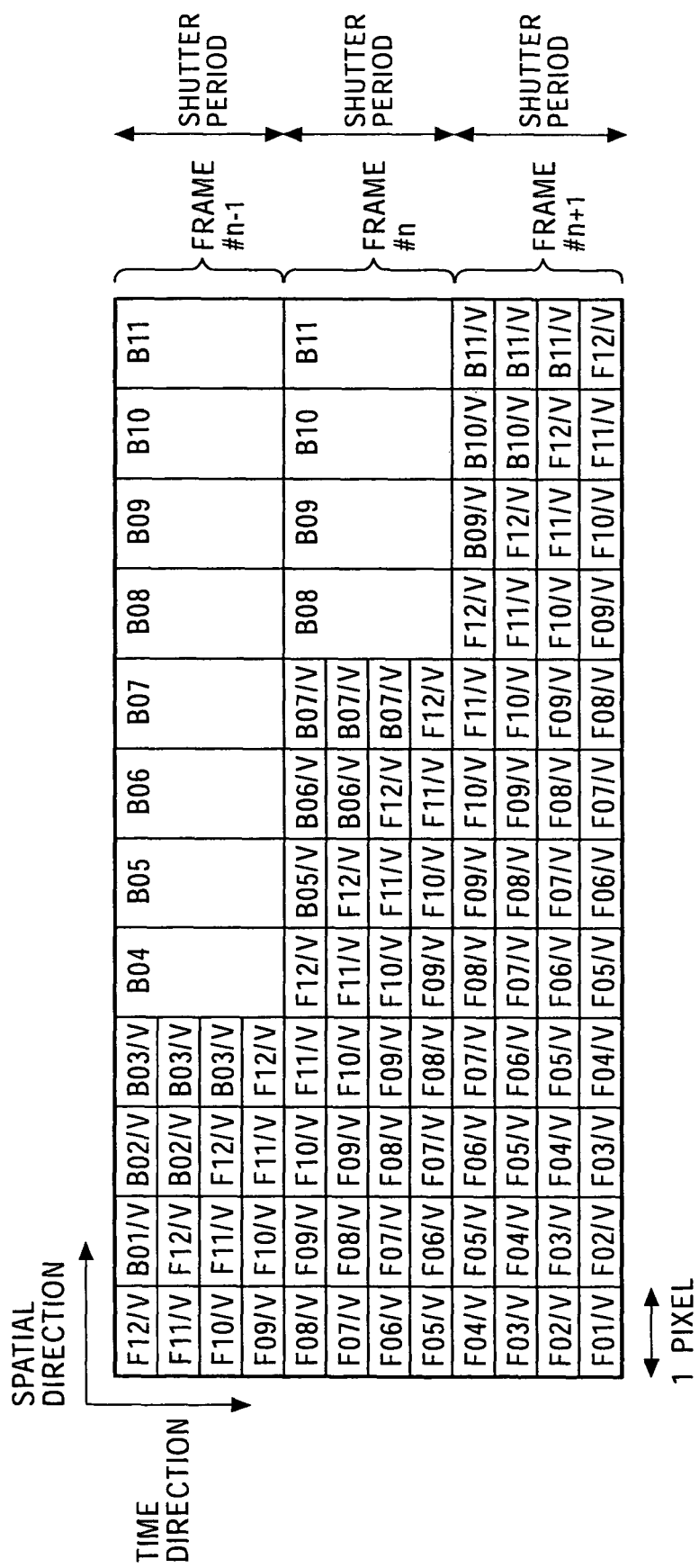
FIG. 15 is a model diagram wherein the pixel values are developed over the time direction, and periods corresponding to shutter time are divided.

FIG. 15 is a model diagram wherein the pixel values of pixels arrayed adjacently in a single line on three frames of images taken of the object corresponding to the foreground which moves to the right side in the drawing with the object corresponding to the still background, and at the same position in the frames, develop over the time direction. The models shown in FIG. 15 includes the covered background region.

Since an assumption may be made in FIG. 15 that the object corresponding to the foreground is a rigid body and moves at a constant velocity, and the foreground image moves so as to be displayed at a position four pixels to the right side in the following frame, the foreground movement amount v is 4, and the virtual dividing number is 4.

For example, the foreground component of the first shutter period/v from the shutter opening of the left-most pixel of the frame #n−1 in FIG. 15 is F12/v, the foreground component of the second shutter period/v from the shutter opening of the second pixel from the left in FIG. 15 is also F12/v. The foreground component of the third shutter period/v from the shutter opening of the third pixel from the left in FIG. 15, and the foreground component of the fourth shutter period/v from the shutter opening of the fourth pixel from the left in FIG. 15, are F12/v.

The foreground component of the second shutter period/v from the shutter opening of the left-most pixel in the frame #n−1 in FIG. 15 is F11/v, and the foreground component of the third shutter period/v from the shutter opening of the second pixel from the left in FIG. 15 is also F11/v. The foreground component of the fourth shutter period/v from the shutter opening of the third pixel from the left in FIG. 15 is F11/v.

The foreground component of the third shutter period/v from the shutter opening of the left-most pixel in the frame #n−1 in FIG. 15 is F10/v, and the foreground component of the fourth shutter period/v from the shutter opening of the second pixel from the left in FIG. 15 is also F10/v. The foreground component of the fourth shutter period/v from the shutter opening of the left-most pixel in the frame #n−1 in FIG. 15 is F09/v.

Since the object corresponding to the background keeps still, the background component of the first shutter period/v from the shutter opening of the second pixel from the left in the frame #n−1 in FIG. 15 is B01/v. The background components of the first and second shutter period/vs from the shutter opening of the third pixel from the left in the frame #n−1 in FIG. 15 are B02/v. The background components of the first through third shutter period/vs from the shutter opening of the fourth pixel from the left in the frame #n−1 in FIG. 15 are B03/v.

In the frame #n−1 in FIG. 15, the left-most pixel belongs to the foreground region, and the second through fourth pixels from the left belong to the mixed region of the covered background region.

The fifth through twelfth pixels from the left in the frame #n−1 in FIG. 15 belong to the background region, and the pixel values thereof are F04 through F11, respectively.

The first through fifth pixels from the left in the frame #n in FIG. 15 belong to the foreground region. The foreground component of the shutter period/v in the foreground region in the frame #n, is one of F05/v through F12/v.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the fifth pixel from the left in the frame #n in FIG. 15 is F12/v, the foreground component of the second shutter period/v from the shutter opening of the sixth pixel from the left in FIG. 15 is also F12/v. The foreground component of the third shutter period/v from the shutter opening of the seventh pixel from the left in FIG. 15, and the foreground component of the fourth shutter period/v from the shutter opening of the eighth pixel from the left in FIG. 15, are F12/v.

The foreground component of the second shutter period/v from the shutter opening of the fifth pixel from the left in the frame #n in FIG. 15 is F11/v, and the foreground component of the third shutter period/v from the shutter opening of the sixth pixel from the left in FIG. 15 is also F11/v. The foreground component of the fourth shutter period/v from the shutter opening of the seventh pixel from the left in FIG. 15 is F11/v.

The foreground component of the third shutter period/v from the shutter opening of the fifth pixel from the left in the frame #n in FIG. 15 is F10/v, and the foreground component of the fourth shutter period/v from the shutter opening of the sixth pixel from the left in FIG. 15 is also F10/v. The foreground component of the fourth shutter period/v from the shutter opening of the fifth pixel from the left in the frame #n in FIG. 15 is F09/v.

Since the object corresponding to the background keeps still, the background component of the first shutter period/v from the shutter opening of the sixth pixel from the left in the frame #n in FIG. 15 is B05/v. The background components of the first and second shutter period/vs from the shutter opening of the seventh pixel from the left in the frame #n in FIG. 15 are B06/v. The background components of the first through third shutter period/vs from the shutter opening of the eighth pixel from the left in the frame #n in FIG. 15 are B07/v.

In the frame #n in FIG. 15, the sixth through eighth pixels from the left belong to the mixed region of the covered background region.

The ninth through twelfth pixels from the left in the frame #n in FIG. 15 belong to the background region, and the pixel values are B08 through B11, respectively.

The first through ninth pixels from the left in the frame #n+1 in FIG. 15 belong to the foreground region. The foreground region of the shutter period/v in the foreground region in the frame #n+1 is one of F01/v through F12/v.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the ninth pixel from the left in the frame #n+1 in FIG. 15 is F12/v, and the foreground component of the second shutter period/v from the shutter opening of the tenth pixel from the left in FIG. 15 is also F12/v. The foreground component of the third shutter period/v from the shutter opening of the eleventh pixel from the left in FIG. 15, and the foreground component of the fourth shutter period/v from the shutter opening of the twelfth pixel from the left in FIG. 15, are F12/v.

The foreground component of the second shutter period/v from the shutter opening of the ninth pixel from the left in the frame #n+1 in FIG. 15 is F11/v, and the foreground component of the third shutter period/v from the shutter opening of the tenth pixel from the left in FIG. 15 is also F11/v. The foreground component of the fourth shutter period/v from the shutter opening of the eleventh pixel from the left in FIG. 15 is F11/v.

The foreground component of the third shutter period/v from the shutter opening of the ninth pixel from the left in the frame #n+1 in FIG. 15 is F10/v, and the foreground component of the fourth shutter period/v from the shutter opening of the tenth pixel from the left in FIG. 15 is F10/v. The foreground component of the fourth shutter period/v from the shutter opening of the ninth pixel from the left in the frame #n+1 in FIG. 15 is F09/v.

Since the object corresponding to the background keeps still, the background component of the first shutter period/v from the shutter opening of the tenth pixel from the left in the frame #n+1 in FIG. 15 is B09/v. The background components of the first and second shutter period/vs from the shutter opening of the eleventh pixel from the left in the frame #n+1 in FIG. 15 are B10/v. The background components of the first through third shutter period/vs from the shutter opening of the twelfth pixel from the left in the frame #n+1 in FIG. 15 are B11/v.

In the frame #n+1 in FIG. 15, the tenth through twelfth pixels from the left side correspond to the mixed region which is the covered background region.

Figure 16:
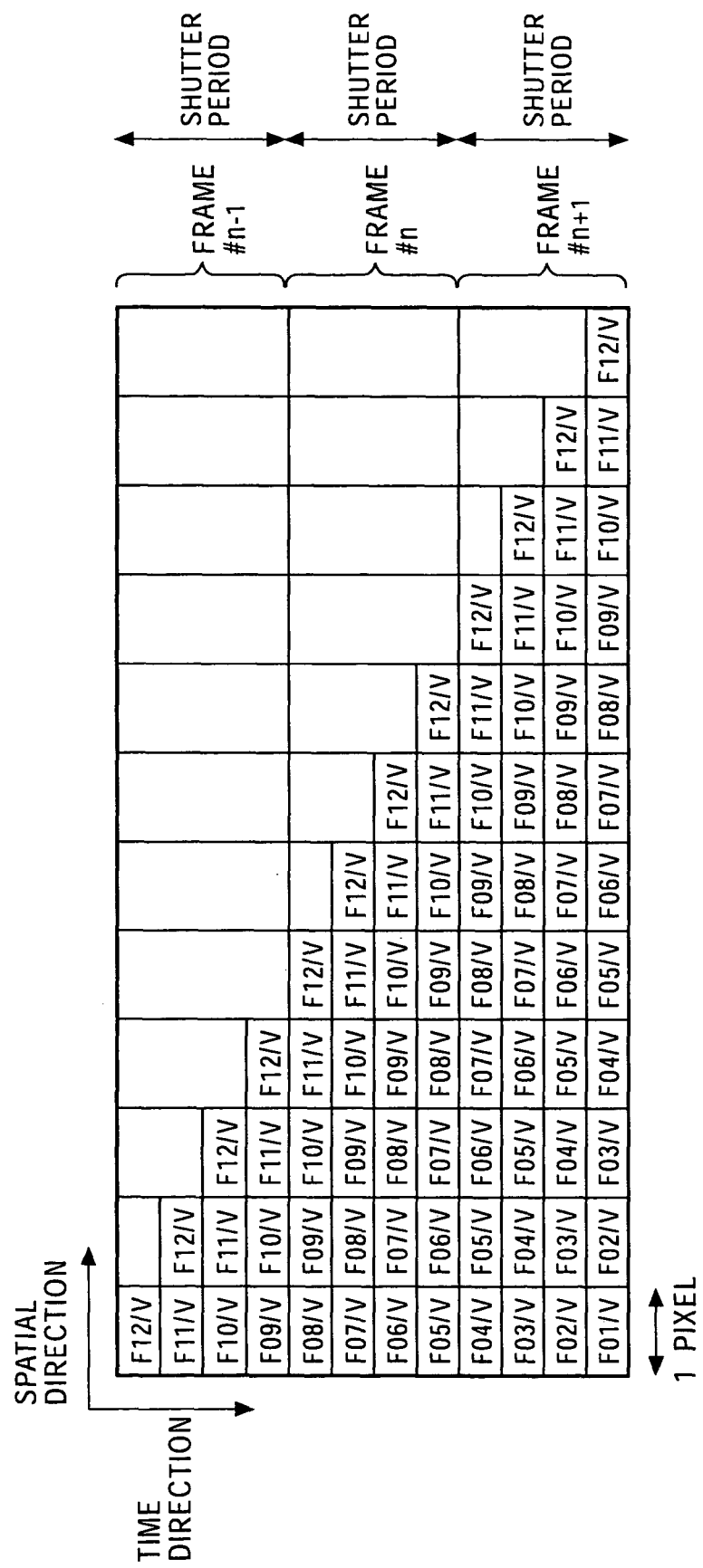
FIG. 16 is a model diagram wherein the pixel values are developed over the time direction, and periods corresponding to shutter time are divided.

FIG. 16 is a model diagram wherein the foreground components are extracted from the pixel values illustrated in FIG. 15.

Figure 17:
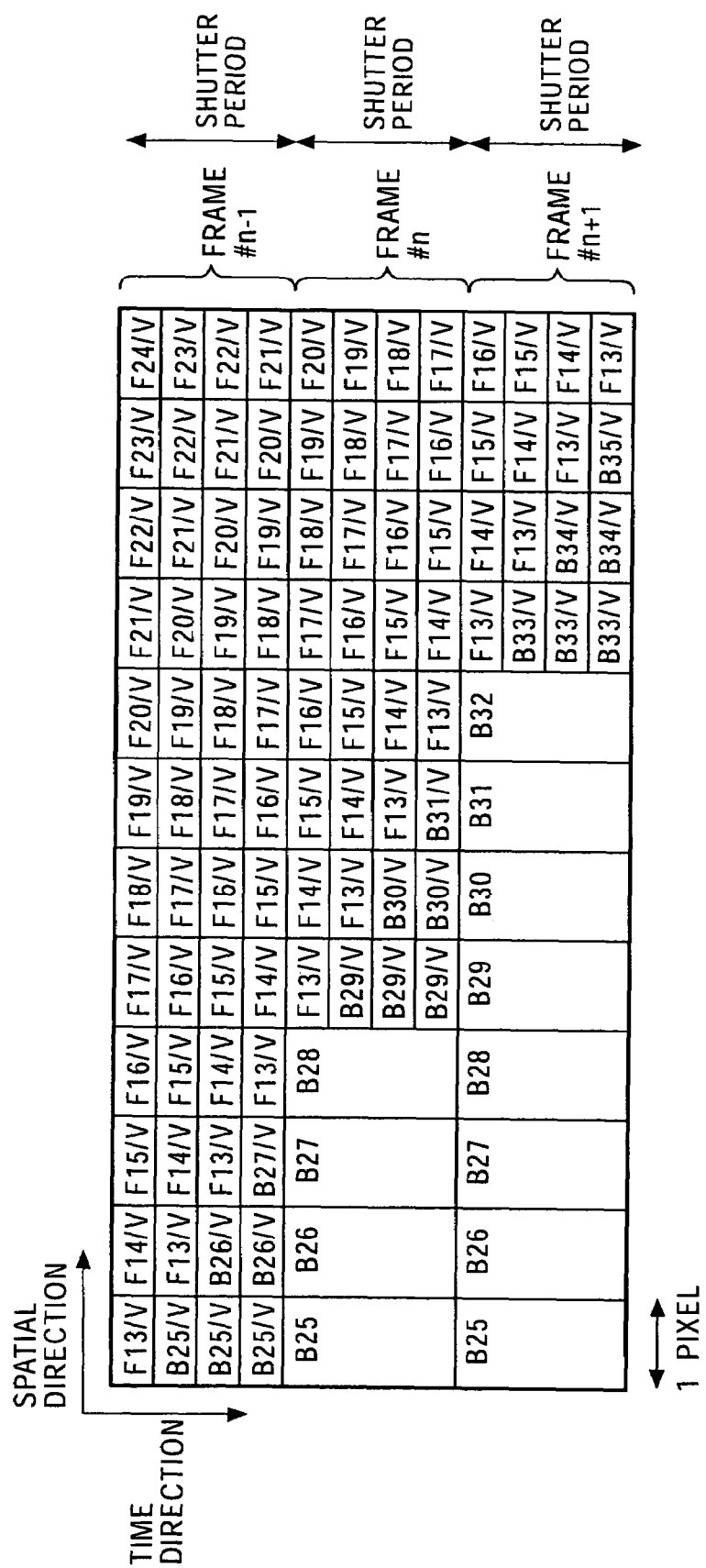
FIG. 17 is a model diagram wherein the pixel values are developed over the time direction, and periods corresponding to shutter time are divided.

FIG. 17 is a model diagram wherein the pixel values of the pixels adjacently arrayed in a row in three frames of the images which are taken of the foreground corresponding to the object which moves to the right side in the drawing with the still background, and are at the same position in the frames, develop over the time direction. In FIG. 17, the model diagram includes the uncovered background region.

In FIG. 17, an assumption may be made that the object corresponding to the foreground is a rigid body, and moves at a constant velocity. Since the object corresponding to the foreground moves so as to be displayed at a position four pixels to the right side in the following frame, the movement amount v is 4.

For example, the foreground component of the first shutter period/v from the shutter opening of the left-most pixel in the frame #n−1 in FIG. 17 is F13/v, and the foreground component of the second shutter period/v from the shutter opening of the second pixel from the left in FIG. 17 is also F13/v. The foreground component of the third shutter period/v from the shutter opening of the third pixel from the left in FIG. 17, and the foreground component of the fourth shutter period/v from the shutter opening of the fourth pixel from the left in FIG. 17, are F13/v.

The foreground component of the first shutter period/v from the shutter opening of the second pixel from the left in the frame #n−1 in FIG. 17 is F14/v, and the foreground component of the second shutter period/v from the shutter opening of the third pixel from the left in FIG. 17 is also F14/v. The foreground component of the first shutter period/v from the shutter opening of the third pixel from the left in FIG. 17 is F15/v.

Since the object corresponding to the background keeps still, the background component of the second through fourth shutter period/vs from the shutter opening of the left-most pixel in the frame #n−1 in FIG. 17 is B25/v. The background component of the third and fourth shutter period/vs from the shutter opening of the second pixel from the left in the frame #n−1 in FIG. 17 are B26/v. The background component of the fourth shutter period/v from the shutter opening of the third pixel from the left in the frame #n−1 in FIG. 17 is B27/v.

In the frame #n−1 in FIG. 17, the left-most pixel through the third pixel belong to a mixed region of the uncovered background region.

The fourth through twelfth pixels from the left in the frame #n−1 in FIG. 17 belong to the foreground region. The foreground component in the frame is one of F13/v through F24/v.

The left-most pixel through the fourth pixel from the left in the frame #n in FIG. 17 belong to the background region, and the pixel values are B25 through B28, respectively.

Since an assumption may be made that the object corresponding to the foreground is a rigid body and moves at a constant velocity, and the foreground image moves so as to be displayed at a position four pixels to the right side in the following frame, the foreground component of the first shutter period/v from the shutter opening of the fifth pixel from the left in the frame #n in FIG. 17 is F13/v, and the foreground component of the second shutter period/v from the shutter opening of the sixth pixel from the left in FIG. 17 is also F13/v. The foreground component of the third shutter period/v from the shutter opening of the seventh pixel from the left in FIG. 17, and the foreground component of the fourth shutter period/v from the shutter opening of the eighth pixel from the left in FIG. 17, are F13/v.

The foreground component of the first shutter period/v from the shutter opening of the sixth pixel from the left in the frame #n in FIG. 17 is F14/v, and the foreground component of the second shutter period/v from the shutter opening of the seventh pixel from the left in FIG. 17 is also F14/v. The foreground component of the first shutter period/v from the shutter opening of the eighth pixel from the left in FIG. 17 is F15/v.

Since the object corresponding to the background keeps still, the background components of the second through fourth shutter period/vs from the shutter opening of the fifth pixel from the left in the frame #n in FIG. 17 are B29/v. The background components of the third and fourth shutter period/vs from the shutter opening of the sixth pixel from the left in the frame #n in FIG. 17 are B30/v. The background component of the fourth shutter period/v from the shutter opening of the seventh pixel from the left in the frame #n in FIG. 17 is B31/v.

In the frame #n in FIG. 17, the fifth through seventh pixels from the left belong to the mixed region of the uncovered background region.

The eighth through twelfth pixels from the left in the frame #n in FIG. 17 belong to the foreground region. The value corresponding to the period of the shutter period/v in the foreground region in the frame #n is one of F13/v through F20/v.

The left-most pixel through the eighth pixel from the left in the frame #n+1 in FIG. 17, belong to the background region, and the pixel values thereof are B25 through B32, respectively.

Since an assumption may be made that the object corresponding to the foreground is a rigid body and moves at a uniform velocity, and the foreground image moves so as to be displayed at a position four pixels to the right side in the following frame, the foreground component of the first shutter period/v from the shutter opening of the ninth pixel from the left in the frame #n+1 in FIG. 17 is F13/v, and the foreground component of the second shutter period/v from the shutter opening of the tenth pixel from the left in FIG. 17 is also F13/v. The foreground component of the third shutter period/v from the shutter opening of the eleventh pixel from the left in FIG. 17, and the foreground component of the fourth shutter period/v from the shutter opening of the twelfth pixel from the left in FIG. 17, are F13/v.

The foreground component of the first shutter period/v from the shutter opening of the tenth pixel from the left in the frame #n+1 in FIG. 10 is F14/v, and the foreground component of the second shutter period/v from the shutter opening of the eleventh pixel from the left in FIG. 17 is also F14/v. The foreground component of the first shutter period/v from the shutter opening of the twelfth pixel from the left in FIG. 17 is F15/v.

Since the object corresponding to the background keeps still, the background components of the second through fourth shutter period/vs from the shutter opening of the ninth pixel from the left in the frame #n+1 in FIG. 17 are B33/v. The background components of the third and fourth shutter period/vs from the shutter opening of the tenth pixel from the left in the frame #n+1 in FIG. 17 are B34/v. The background component of the fourth shutter period/v from the shutter opening of the eleventh pixel from the left in the frame #n+1 in FIG. 17 is B35/v.

In the frame #n+1 in FIG. 17, the ninth through eleventh pixels from the left belong to the mixed region of the uncovered background region.

The twelfth pixel from the left in the frame #n+1 in FIG. 17 belongs to the foreground region. The foreground component of the shutter period/v in the foreground region in the frame #n+1 is one of F13/v through F16/v.

Figure 18:
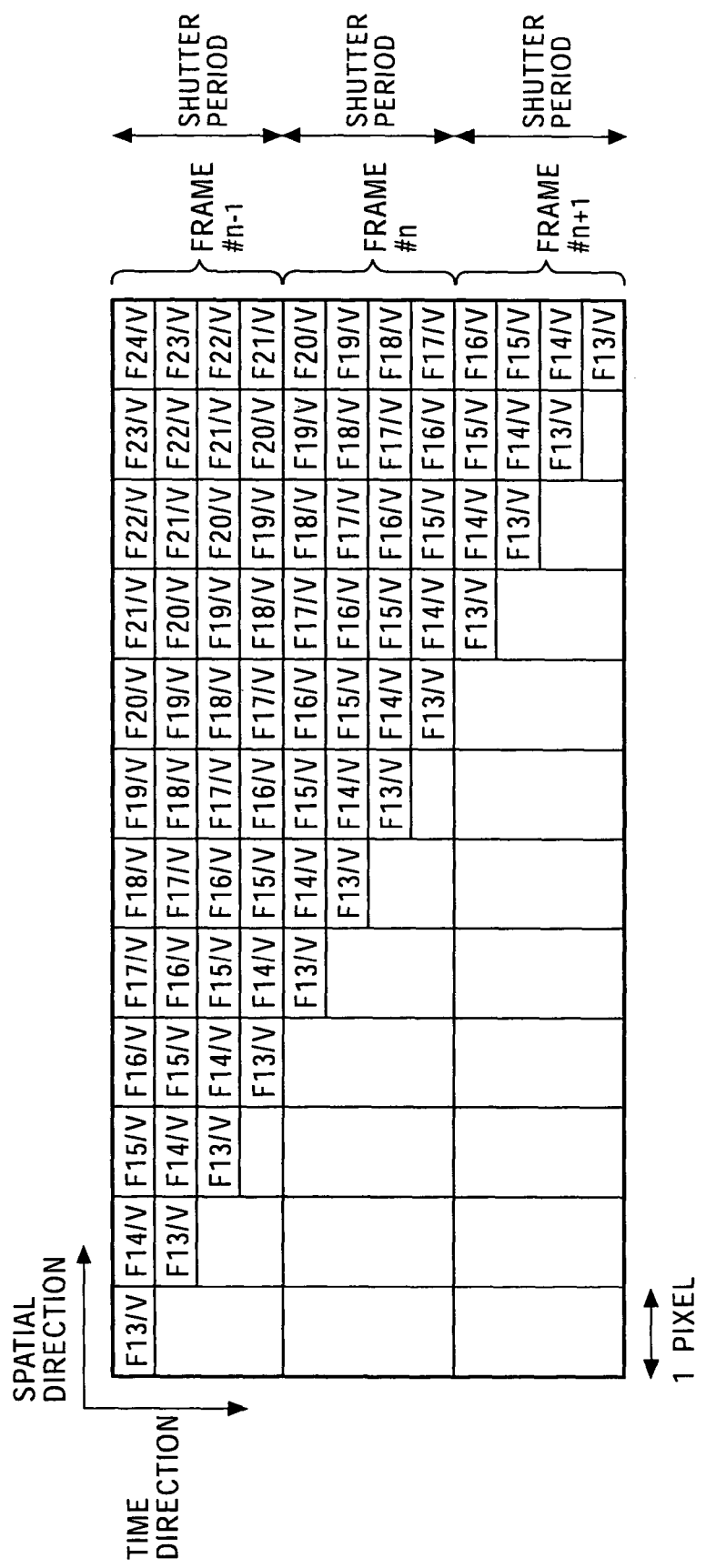
FIG. 18 is a model diagram wherein the pixel values are developed over the time direction, and periods corresponding to shutter time are divided.

FIG. 18 is a model diagram of the image wherein the foreground components are extracted from the pixel values shown in FIG. 17.

Returning to FIG. 2, the region specifying unit 103 correlates a flag which indicates that a pixel belongs to the foreground region, the background region, the uncovered background region, or uncovered background region, with each of the pixels, using the pixel values in multiple frames, and supplies the flags to the mixture ratio calculating unit 104 and the movement blurring adjustment unit 106, as region information.

The mixture ratio calculating unit 104 calculates the mixture ratio α for each of the pixels included in the mixed region based upon the pixel values in the multiple frames and the region information, and supplies the calculated mixture ratio αto the foreground/background separation unit 105.

The foreground/background separation unit 105 extracts the foreground component images which consist of only the foreground components based upon the pixel values in the multiple frames, the region information, and the mixture ratio α, and supplies to the movement blurring adjustment unit 106.

The movement blurring adjustment unit 106 adjusts the amount of the movement blurring contained in the foreground image based upon the foreground component images supplied from the foreground/background separation unit 105, the movement vector supplied from the movement detecting unit 102, and the region information supplied from the region specifying unit 103, and outputs the foreground component images which have been subjected to adjustment of the movement blurring.

Figure 19:
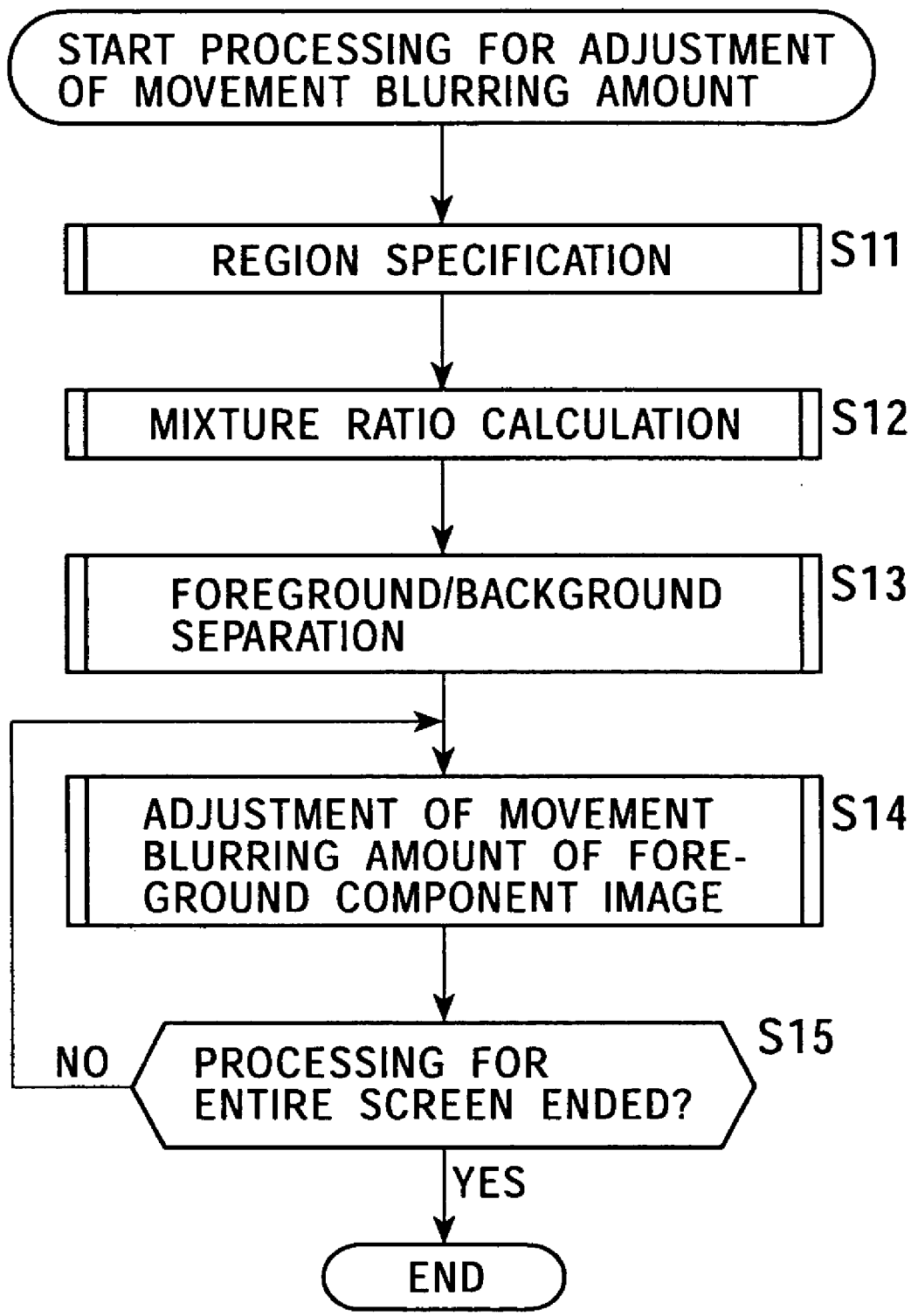
FIG. 19 is a flowchart describing the processing for adjusting the amount of movement blurring.

The processing of adjustment of the amount of the movement blurring by the signal processing device will be described, referring to the flowchart in FIG. 19. In Step S11, the region specifying unit 103 performs processing of region specification for generating the region information which indicates which of the foreground region, the background region, the covered background region, or the uncovered background region, each pixel of the input image belongs to, based upon the input image. The processing of the region specification will be described in detail later. The region specification unit 103 supplies the generated region information to the mixture ratio calculation unit 104.

Note that in Step S11, the region specification unit 103 may generate the region information which indicates which of the foreground region, the background region, or the mixed region (with no distinction between the covered background region and the uncovered background region) each pixel of the input image belongs to, based upon the input image. In this case, the foreground/background separation unit 105 and the movement blurring adjustment unit 106 judges whether the mixed region is the covered background region or the uncovered background region, based upon the direction of the movement vector. For example, in the event that the foreground region, the mixed region, and the background region are in sequence corresponding to the direction of the movement vector, judgment is made that the mixed region is the covered background region, and in the event that the background region, the mixed region, and the foreground region are in sequence, corresponding to the direction of the movement vector, judgment is made that the mixed region is the uncovered background region.

In Step S12, the mixture ratio calculating unit 104 calculates the mixture ratio αfor each pixel included in the mixed region based upon the input image and the region information. The processing of the mixture ratio calculation will be described in detail later. The mixture ratio calculating unit 104 supplies the calculated mixture ratio α to the foreground/background separation unit 105.

In Step S13, the foreground/background separation unit 105 extracts the foreground components from the input image based upon the region information and the mixture ratio α, and supplies as the foreground component image to the movement blurring adjustment unit 106.

In Step S14, the movement blurring adjustment unit 106 generates an increment of processing which indicates the position on an image for the pixels arrayed in the movement direction, which belongs to one of the uncovered background region, the foreground region, or the covered background region, and adjusts the amount of movement blurring included in the foreground component corresponding to the increment of processing, based upon the movement vectors and the region information. The processing of adjustment of the amount of the movement blurring will be described in detail later.

In Step S15, the signal processing device judges whether the processing of the entire image has ended or not, and in the event that judgment is made that the processing has not ended for the entire image, the flow proceeds to Step S14, and the processing of adjustment of the amount of the movement blurring for the foreground components corresponding to the increment of processing is repeated.

In Step S15, in the event that the processing of the entire image has ended, the processing ends.

As described above, the signal processing device can separate the foreground and the background, and can adjust the amount of the movement blurring included in the foreground. That is to say, the signal processing device can adjust the amount of the movement blurring included in the sampled data of the pixel values of the pixel of the foreground.

The configuration of the region specifying unit 103, the mixture ratio calculating unit 104, the foreground/background separation unit 105, and the movement blurring adjustment unit 106 will be described below.

Figure 20:
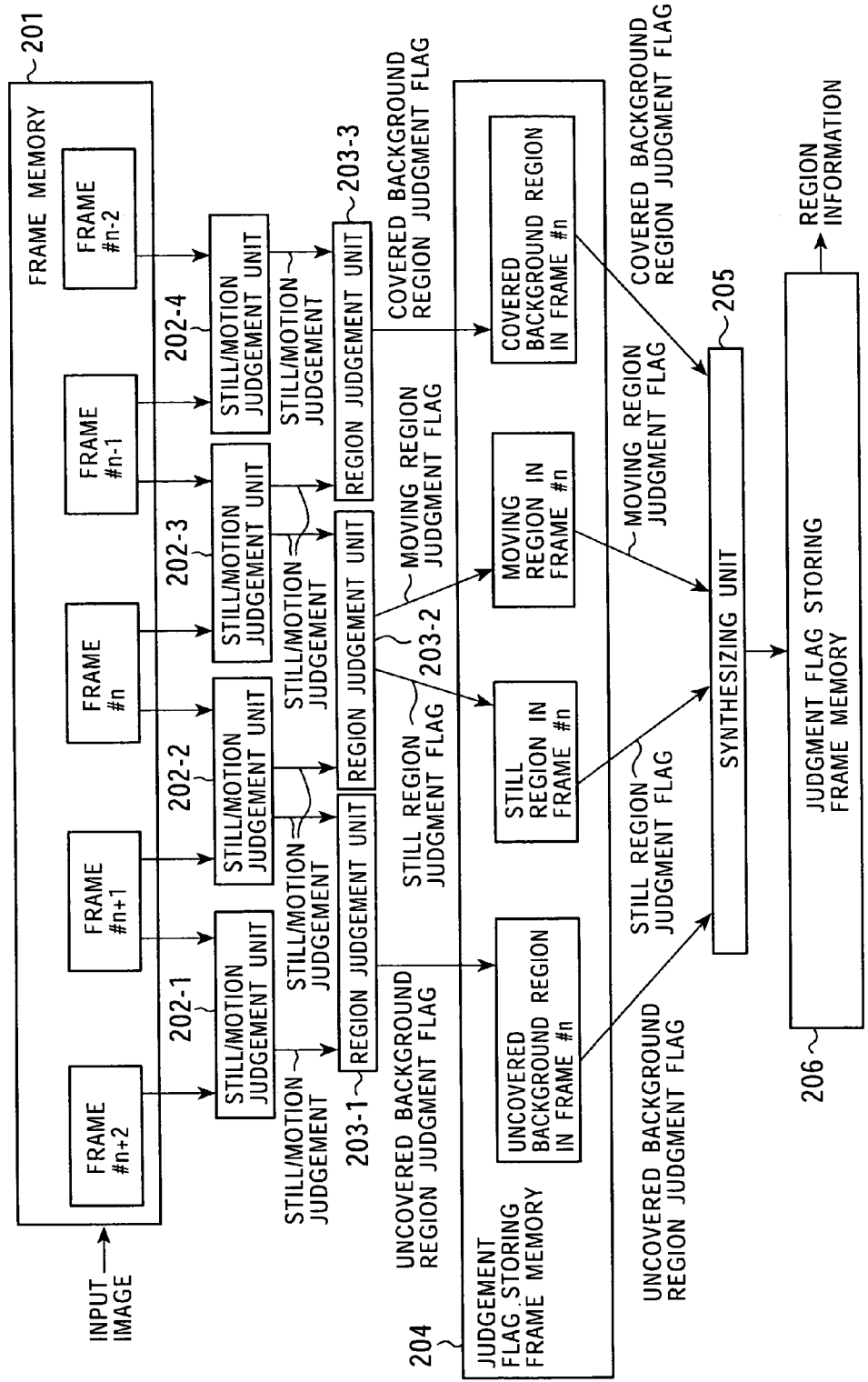
FIG. 20 is a block diagram illustrating the configuration of the region specifying unit 103.

FIG. 20 is a block diagram which illustrates the configuration of the region specifying unit 103. The region specifying unit 103, of which the structure is shown in FIG. 20, does not use the movement vectors. Frame memory 201 stores the input images in increments of one frame. In the event that the object of the processing is the frame #n, the frame memory 201 stores the frame #n−2 which is two frames previous from the frame #n, the frame #n−1 which is one frame previous from the frame #n, the frame #n, and the frame #n+1 which is one frame following the frame #n, and the frame #n+2 which is two frames following the frame #n.

A still/motion judgment unit 202-1 reads out the pixel value of the pixel in the frame #n+2, which is at the same position as the position of the pixel on the image, which is the object of specifying the region in the frame #n, and the pixel value of the pixel in the frame #n+1, which is at the same position as the position of the pixel on the image, which is the object of specifying the region of the frame #n, from the frame memory 201, and calculates the absolute value of the difference between the read out pixel values. The still/motion judgment unit 202-1 judges whether the absolute value of the difference between the pixel value in the frame #n+2 and the pixel value in the frame #n+1 is greater than the predetermined threshold value Th, and in the event that judgment is made that the absolute value of the difference is greater than the threshold value Th, the still/motion judgment unit 202-1 supplies the still/motion judgment, indicating motion, to a region judgment unit 203-1. In the event that judgment is made that the absolute value of the difference between the pixel value of the frame #n+2 and the pixel value of the pixel of the frame #n+1 is equal to or less than the threshold value Th, the still/motion judgment unit 202-1 supplies the still/motion judgment, indicating "still", to the region judgment unit 203-1.

A still/motion judgment unit 202-2 reads out the pixel value of the pixel in the frame #n+1, which is at the same position as the position of the pixel on the image, which is the object of specifying the region in the frame #n, and the pixel value of pixel which is the object in the frame #n from the frame memory 201, and calculates the absolute value of the difference between the pixel values. The still/motion judgment unit 202-2 judges whether the absolute value of the difference between the pixel value in the frame #n+1 and the pixel value in the frame #n is greater than the predetermined threshold value Th, and in the event that judgment is made that the absolute value of the difference between the pixel values is greater than the threshold value Th, the still/motion judgment indicating motion is supplied to the region judgment unit 203-1 and the region judgment unit 203-2. In the event that judgment is made that the absolute value of the difference between the pixel value of the pixel in the frame #n+1 and the pixel value of the pixel in the frame #n is equal to or smaller than the threshold value Th, the still/motion judgment unit 202-2 supplies the still/motion judgment, indicating "still", to the region judgment unit 203-1 and the region judgment unit 203-2.

The still/motion judgment unit 202-3 reads out the pixel value of the pixel, which is the object of specifying the region in the frame #n, and the pixel value of the pixel in the frame #n−1, which is at the same position as the position on the image of the pixel, which is the object of specifying the region in the frame #n, from the frame memory 201, and calculates the absolute value of the difference between the pixel values. The still/motion judgment unit 202-3 judges whether the absolute value of the difference between the pixel value in the frame #n and the pixel value in the frame #n−1 is greater than the predetermined value Th, and in the event that judgment is made that the absolute value of the difference between the pixel values is greater than the threshold value Th, the still/motion judgment indicating motion is supplied to the region judgment unit 203-2 and the region judgment unit 203-3. In the event that judgment is made that the absolute value of the difference between the pixel values of the pixel in the frame #n and the pixel value of the pixel in the frame #n−1 is equal to or smaller than the threshold value Th, the still/motion judgment unit 202-3 supplies the still/motion judgment indicating "still" to the region judgment unit 203-2 and the region judgment unit 203-3.

The still/motion judgment unit 202-4 reads out the pixel value of the pixel in the frame #n−1 at the same position as the position of the pixel on the image, which is the object of specifying the region in the frame #n, and the pixel value of the pixel in the frame #n−2 at the same position as the position on the image of the pixel, which is the object of specifying the region in the frame #n, from the frame memory 201, and calculates the absolute value of the difference between the pixel values. The still/motion judgment unit 202-4 judges whether the absolute value of the difference between the pixel value in the frame #n−1 and the pixel value in the frame #n−2 is greater than the predetermined threshold value Th, and in the event that judgment is made that the absolute value of the difference between the pixel values is greater than the threshold value Th, the still/motion judgment indicating motion is supplied to the region judgment unit 203-3. In the event that judgment is made that the absolute value of the difference between the pixel value of the pixel in the frame #n−1 and the pixel value of the pixel in the frame #n−2 is equal to or smaller than the threshold value Th, the still/motion judgment unit 202-4 supplies the still/motion judgment indicating "still" to the region judgment unit 203-3.

In the event that the still/motion judgment supplied from the still/motion judgment unit 202-1 indicates "still", and the still/motion judgment supplied from the still/motion judgment unit 202-2 indicates motion, the region judgment unit 203-1 judges that the pixel which is the object of specifying the region in the frame #n belongs to the uncovered background region, and sets the uncovered background region judgment flag corresponding to the judged pixel in the region, to "1", which indicates that the pixel belongs to the uncovered background region.

In the event that the still/motion judgment supplied from the still/motion judgment unit 202-1 indicates motion, or the still/motion judgment supplied from the still/motion judgment unit 202-2 indicates still, the region judgment unit 203-1 judges that the pixel which is the object of specifying the region in the frame #n does not belong to the uncovered background region, and sets the uncovered background region judgment flag corresponding to the judged pixel in the region to "0", which indicates that the pixel does not belong to the uncovered background region.

The region judgment unit 203-1 supplies the uncovered background region judgment flag which has been set to "1" or "0", as described above, to the judgment flag storing memory 204.

In the event that the still/motion judgment supplied from the still/motion judgment unit 202-2 indicates "still", and the still/motion judgment supplied from the still/motion judgment unit 202-3 indicates "still", the region judgment unit 203-3 judges that the pixel which is the object of specifying the region in the frame #n belongs to the still region, and sets the still region judgment flag corresponding to the pixel judged in the region, to "1", which indicates that the pixel belongs to the still region.

In the event that the still/motion judgment supplied from the still/motion judgment unit 202-2 indicates motion, or the still/motion judgment supplied from the still/motion judgment unit 202-3 indicates motion, the region judgment unit 203-2 judges that the pixel which is the object of specifying the region in the frame #n does not belong to the still region, and sets the still region judgment flag corresponding to the judged pixel in the region, to "0", which indicates that the pixel does not belong to the still region.

The region judgment unit 203-2 supplies the still region judgment flag which has been set to "1" or "0" as described above, to judgment flag storing frame memory 204.

In the event that the still/motion judgment supplied from the still/motion judgment unit 202-2 indicates motion, and the still/motion judgment supplied from the still/motion judgment indicates motion, the region judgment unit 203-2 judges the pixel which is the object of specifying the region in the frame #n belongs to the moving region, and sets the moving region judgment flag corresponding to the judged pixel in the region, to "1", which indicates that the pixel belongs to the moving region.

In the event that the still/motion judgment supplied from the still/motion judgment unit 202-2 indicates "still", or the still/motion judgment supplied from the still/motion judgment unit 202-3 indicates "still", the region judgment unit 203-2 judges that the pixel which is the target of specifying the region in the frame #n does not belong to the moving region, and sets the moving region judgment flag corresponding to the judged pixel in the region, to "0", which indicates that the pixel does not belong to the moving region.

The region judgment unit 203-2 supplies the moving region judgment flag which has been set "1" or "0", to the judgment flag storing frame memory 204.

In the event that the still/motion judgment unit supplied from the still/motion judgment unit 202-3 indicates motion, and the still/motion judgment supplied from the still/motion judgment unit 202-4 indicates "still", the region judgment unit 203-3 judges that the pixel which is the target of specifying the region in the frame #n belongs to the covered background region, and sets the covered background region judgment flag to "1", which indicates that the pixel belongs to the covered background region.

In the event that the still/motion judgment supplied from the still/motion judgment unit 202-3 indicates "still", or the still/motion judgment supplied from the still/motion judgment unit 202-4 indicates motion, the region judgment unit 203-3 judges that the pixel which is the object of specifying the region in the frame #n does not belong to the covered background region, and sets the covered background region judgment flag to "0", which indicates that the pixel does not belong to the covered background region.

The region judgment unit 203-3 supplies the covered background region judgment flag which has been set to "1" or "0" as described above, to the judgment flag storing frame memory 204.

The judgment flag storing frame memory 204 stores the uncovered background region judgment flag supplied from the region judgment unit 203-1, the still region judgment flag supplied from the region judgment unit 203-2, the moving region judgment flag supplied from the region judgment unit 203-2, and the covered background region judgment flag supplied from the region judgment unit 203-3.

The judgment flag storing frame memory 204 supplies the uncovered background region judgment flag, the still region judgment flag, the moving region judgment flag, and the covered background region judgment flag, which is stored therein, to a synthesizing unit 205. The synthesizing unit 205 generates the region information which indicates which of the uncovered background region, the still region, the moving region, or the covered background region, each pixel belongs to, and supplies the information to judgment flag storing frame memory 206, based upon the uncovered background region judgment flag, the still region judgment flag, the moving region judgment flag, and the covered background region judgment flag, which are supplied from the judgment flag storing frame memory 204.

The judgment flag storing frame memory 206 stores the region information supplied from the synthesizing unit 205, and outputs the stored region information.

An example for processing performed by the region specifying unit 103 will now be described with reference to FIG. 21 through FIG. 25.

Figure 21:
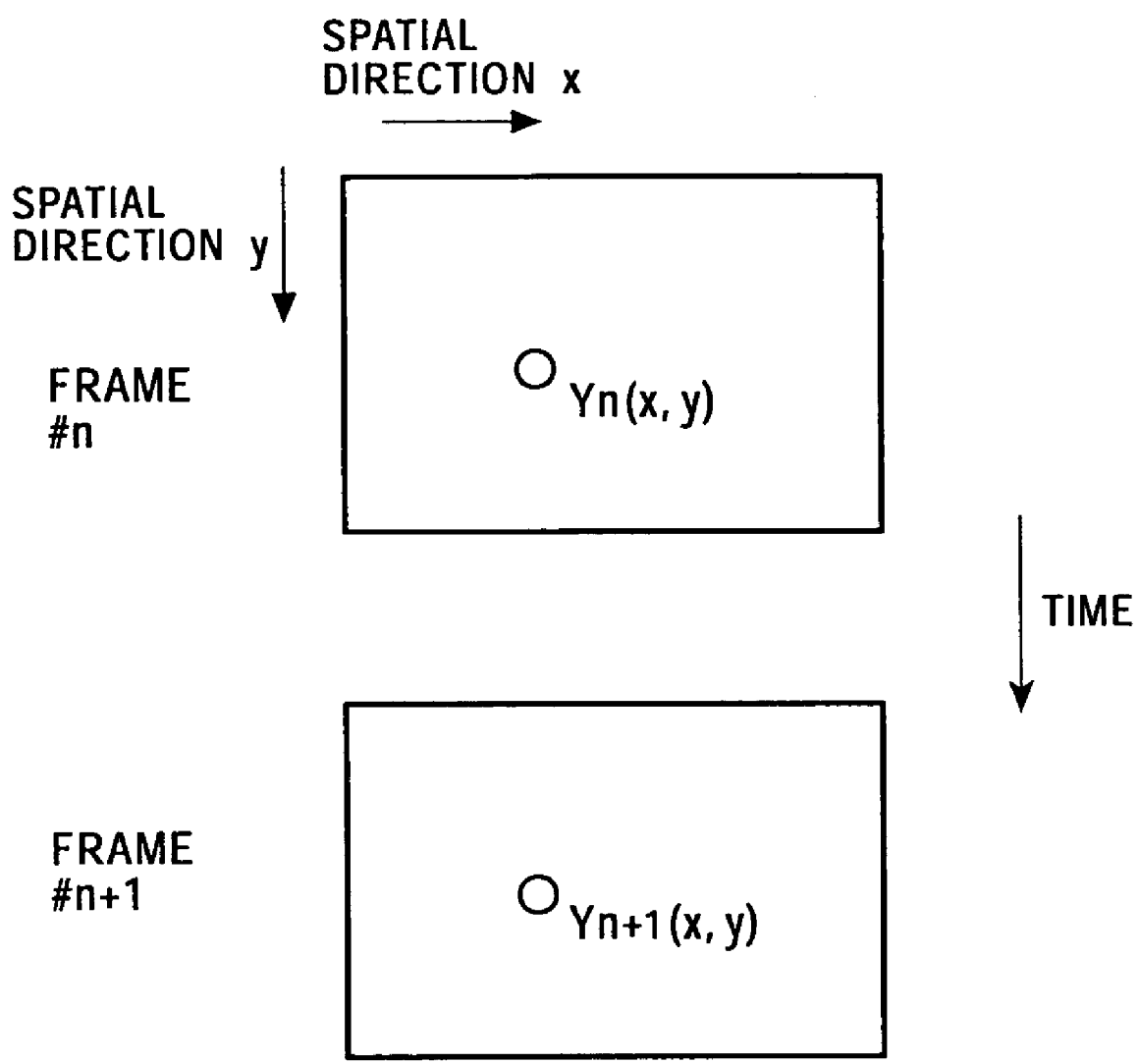
FIG. 21 is a diagram describing an image wherein an object corresponding to the foreground is moving.

In the event that the object corresponding to the foreground moves, the position of the image corresponding to the object on the screen changes with each frame. As shown in FIG. 21, in the frame #n, the image corresponding to the object which is at the position indicated by Yn(x,y) is at the position Yn+1(x,y) in the following frame #n+1.

Figure 24:
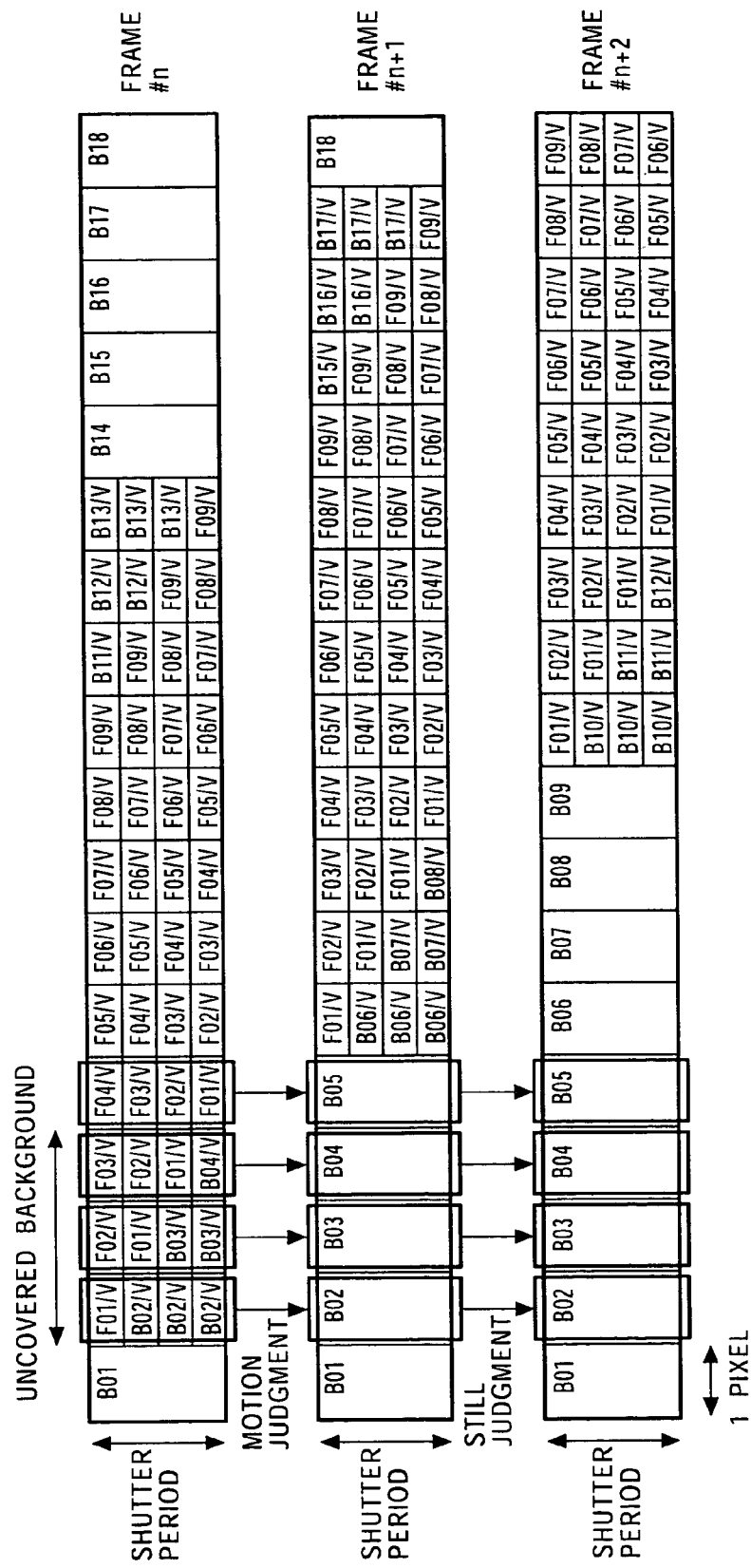
FIG. 24 is a model diagram wherein the pixel values are developed over the time direction, and periods corresponding to shutter time are divided.

FIG. 24 is a model diagram wherein the pixel values of pixels of the image corresponding to the foreground object, which are adjacently arrayed in sequence in a image movement direction, develop over the time direction. For example, in the event that the image moving direction corresponding to the foreground object is horizontal to the screen, the model diagram in FIG. 22 indicates the model wherein the pixel values of adjacent pixels in one line develop over the time direction.

Figure 22:
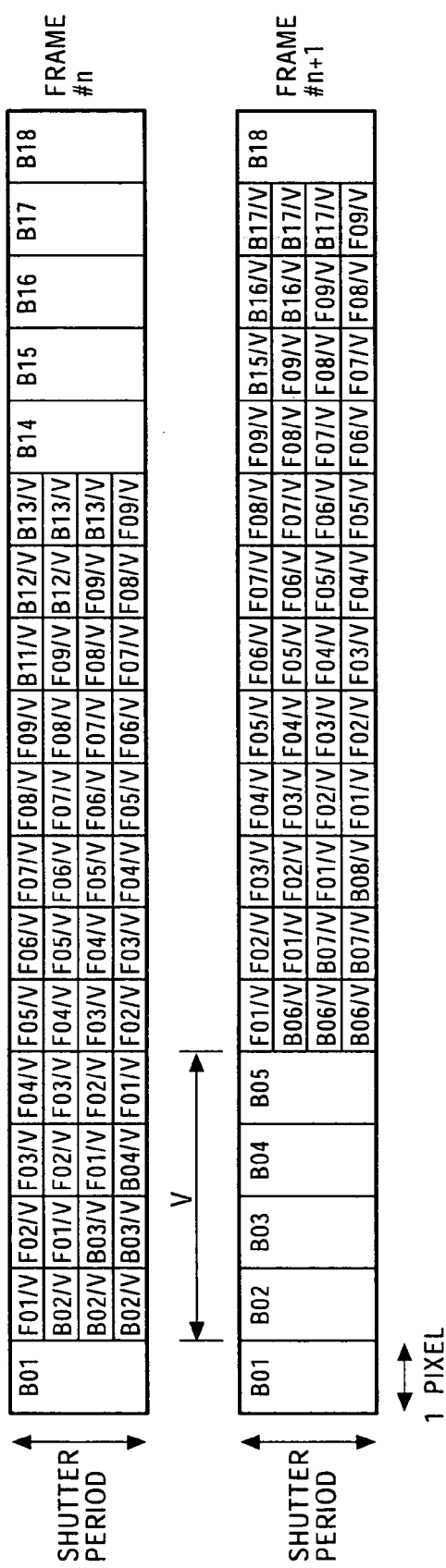
FIG. 22 is a model diagram wherein the pixel values are developed over the time direction, and periods corresponding to shutter time are divided.

In FIG. 22, the line in the frame #n is the same as the line in the frame #n+1.

The foreground components corresponding to the object, which are included in the second pixel through thirteenth pixel from the left in the frame #n, are included in the sixth through seventeenth pixels from the left in the frame #n+1.

In the frame #n, the pixels belonging to the covered background region are the eleventh through thirteenth pixels from the left, and the pixels belonging to the uncovered background region are the second through fourth pixels from the left. In the frame #n+1, the pixels belonging to the covered background region are the fifteenth through seventeenth pixels from the left, and the pixels belonging to the uncovered background region are sixth through eighth pixels from the left.

With the example shown in FIG. 22, the movement amount v is 4, since the foreground components included in the frame #n move by four pixels in the frame #n+1. The virtual dividing number is 4, corresponding to the movement value v.

Next, a description will be made regarding the change of the pixel values of the pixels belonging to the mixed region in the frames previous to and following the frame of interest.

Figure 23:
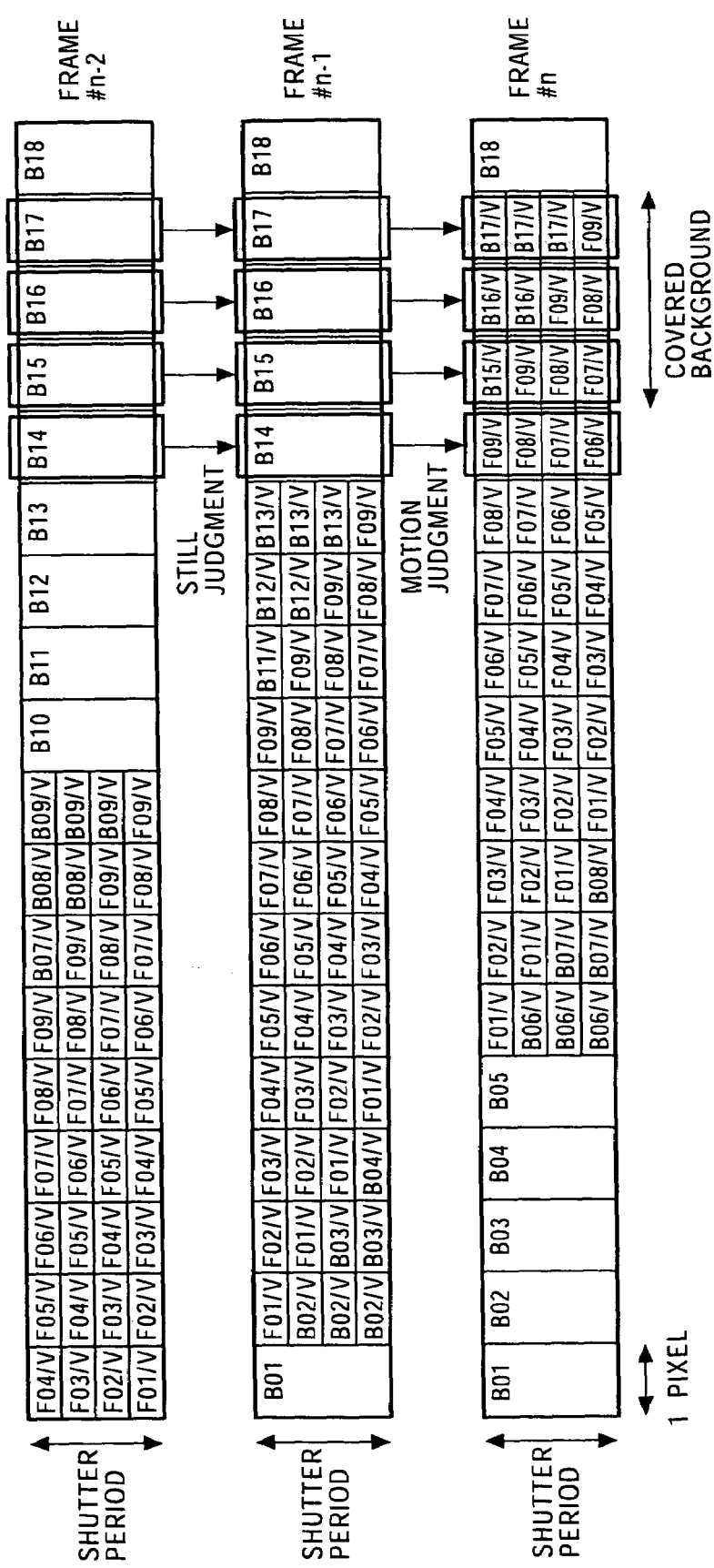
FIG. 23 is a model diagram wherein the pixel values are developed over the time direction, and periods corresponding to shutter time are divided.

In the frame #n wherein the background keeps still and the movement amount v of the foreground is 4, shown in FIG. 23, the pixels belonging to the covered background region are the fifteenth through seventeenth pixels from the left. Since the movement amount v is 4, in the previous frame #n−1, the fifteenth through seventeenth pixels from the left include only the background components, and belong to the background region. Also, in the frame #n−2 which is one further before, the fifteenth through seventeenth pixels from the left contain only the background components, and belong to the background region.

Note that since the object corresponding to the background keeps still, the pixel values of the fifteenth pixel from the left in the frame #n−1 do not change from the pixel value of the fifteenth pixel from the left in the frame #n−2. Similarly, the pixel values of the sixteenth pixel from the left in the frame #n−1 do not change from the pixel value of the sixteenth pixel from the left in the frame #n−2, and the pixel values of the seventeenth pixel from the left in the frame #n−1 do not change from the pixel value of the seventeenth pixel from the left in the frame #n−2.

That is to say, the pixels of the frame #n−1 and frame #n−2 corresponding to the pixels belonging to the covered background region in the frame #n consists of only the background components, so the pixel values do not change, and accordingly the absolute value of the difference therebetween is approximately zero. Accordingly, judgment is made that the still/motion judgment for the pixels of the frame #n−1 and the frame #n−2 corresponding to the pixels belonging to the mixed region in the frame #n is still by the still/motion judgment unit 202-4.

Since the pixels belonging to the covered background region in the frame #n include the foreground components, the pixel values are different from the case wherein the pixel values in the frame #n−1 consist of only the background components. Accordingly, judgment is made that the still/motion judgment for the pixels belonging to the mixed region in the frame #n and the pixels in the frame #n−1 corresponding thereto is motion by the still/motion judgment unit 202-3.

As described above, the region judgment unit 203-3 judges that the corresponding pixels belong to the covered background region in the event that the still/motion judgment unit 202-3 supplies the results of the still/motion judgment which indicates motion, and the still/motion judgment unit 202-4 supplies the results of the still/motion judgment which indicates "still".

In the frame #n wherein the background keeps still and the foreground movement amount v is 4 as shown in FIG. 24, the pixels included in the uncovered background region are the second through fourth from the left. Since the movement amount v is 4, in the frame #n+1 following the frame #n, the second through fourth pixels from the left include only the background components, and belong to the background region. Also, in the frame #n+2 further one frame following the frame #n+1, the second through fourth pixels from the left contain only the background components, and belong to the background region.

Note that since the object corresponding to the background keeps still, the pixel values of the second pixel from the left in the frame #n+2 does not change from the pixel value of the second pixel from the left in the frame #n+1. Similarly, the pixel values of the third pixel from the left in the frame #n+2 do not change from the pixel value of the third pixel from the left in the frame #n+1, and the pixel values of the fourth pixel from the left in the frame #n+2 do not change from the pixel value of the fourth pixel from the left in the frame #n+1.

That is to say, the pixels of the frame #n+1 and the frame #n+2, corresponding to the uncovered background region in the frame #n, consist of only the background components, so the pixel values thereof do not change, and accordingly the absolute value of the difference thereof is approximately zero. Accordingly, judgment is made that the still/motion judgment for the pixels of the frame #n+1 and the frame #n+2 corresponding to the pixels belonging to the mixed region in the frame #n is "still" by the still/motion judgment unit 202-1.

Since the pixels belonging to the uncovered background region in the frame #n include the foreground components, the pixel values are different from the case wherein the pixels consists of only the background components in the frame #n+1. Accordingly, judgment is made that the still/motion judgment for the pixels belonging to the mixed region in the frame #n and the pixels corresponding thereto in the frame #n+1 is motion by the still/motion judgment unit 202-2.

As described above, the region judgment unit 203-1 judges that the corresponding pixels belong to the uncovered background region in the event that the still/motion judgment unit 202-2 supplies the results of the still/motion judgment which indicates motion, and the still/motion judgment unit 202-1 supplies the still/motion judgment which indicates "still".

FIG. 25 is a diagram which illustrates judgment conditions of the region specifying unit 103 in the frame #n. In the event that the pixel in the frame #n−2 at the same position as the position of the pixel which is the object of judgment on the image in the frame #n, and the pixel in the frame #n−1 at the same position as the position of the pixel which is the object of judgment on the image in the frame #n, are judged to be "still", and the pixel in the frame #n−1 at the same position as the position of the pixel which is the object of judgment on the image in the frame #n, and the pixel in the frame #n are judged to be motion, the region specifying unit 103 judges that the pixel which is the object of judgment of the frame #n belongs to the covered background region.

In the event that the pixel in the frame #n−1 at the same position as the position of the pixel which is the object of judgment on the image in the frame #n, and the pixel in the frame #n, are judged to be "still", and the pixel in the frame n and the pixel in the frame #n+1 at the same position as the position of the pixel which is the object of judgment on the image in the frame #n, are judged to be "still", the region specifying unit 103 judges that the pixel which is the object of judgment of the frame #n belongs to the still region.

In the event that the pixel in the frame #n−1 at the same position as the position of the pixel which is the object of judgment on the image in the frame #n, and the pixel in the frame #n, are judged to be motion, and the pixel of the frame #n and the pixel in the frame #n+1 at the same position as the position of the pixel which is the object of judgment on the image in the frame #n, are judged to be motion, the region specifying unit 103 judges that the pixel which is the object of judgment of the frame #n belongs to the movement region.

In the event that the pixel of the frame #n and the pixel in the frame #n+1 at the same position as the position of the pixel which is the object of judgment on the image in the frame #n, are judged to be motion, and the pixel in the frame #n+1 at the same position as the position of the pixel which is the object of judgment on the image in the frame #n, and the pixel in the frame #n+2 at the same position as the position of the pixel which is the object of judgment on the image in the frame #n, are judged to be "still", the region specifying unit 103 judges that the pixel which is the object of judgment of the frame #n belongs to the uncovered background region.

Figure 26A:
FIG. 26A is a diagram illustrating an example of the results of region specification made by the region specifying unit 103.
Figure 26B:
FIG. 26B is a diagram illustrating an example of the results of region specification made by the region specifying unit 103.

FIG. 26A through FIG. 26D are diagrams which illustrate examples of results of the region specifying unit 103 specifying the region. In FIG. 26A, the pixels which are judged to belong to the covered background region are displayed in white. In FIG. 26B, the pixels which are judged to belong to the uncovered background region are displayed in white.

Figure 26C:
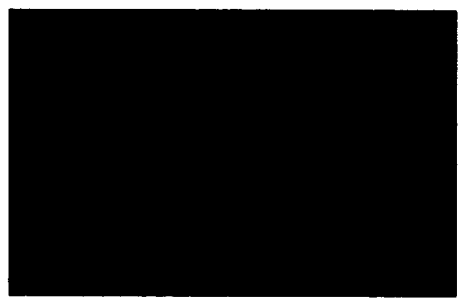
FIG. 26C is a diagram illustrating an example of the results of region specification made by the region specifying unit 103.
Figure 26D:
FIG. 26D is a diagram illustrating an example of the results of region specification made by the region specifying unit 103.

In FIG. 26C, the pixels which are judged to belong to the movement region are displayed in white. In FIG. 26D, the pixels which are judged to belong to the still region are displayed in white.

Figure 27:
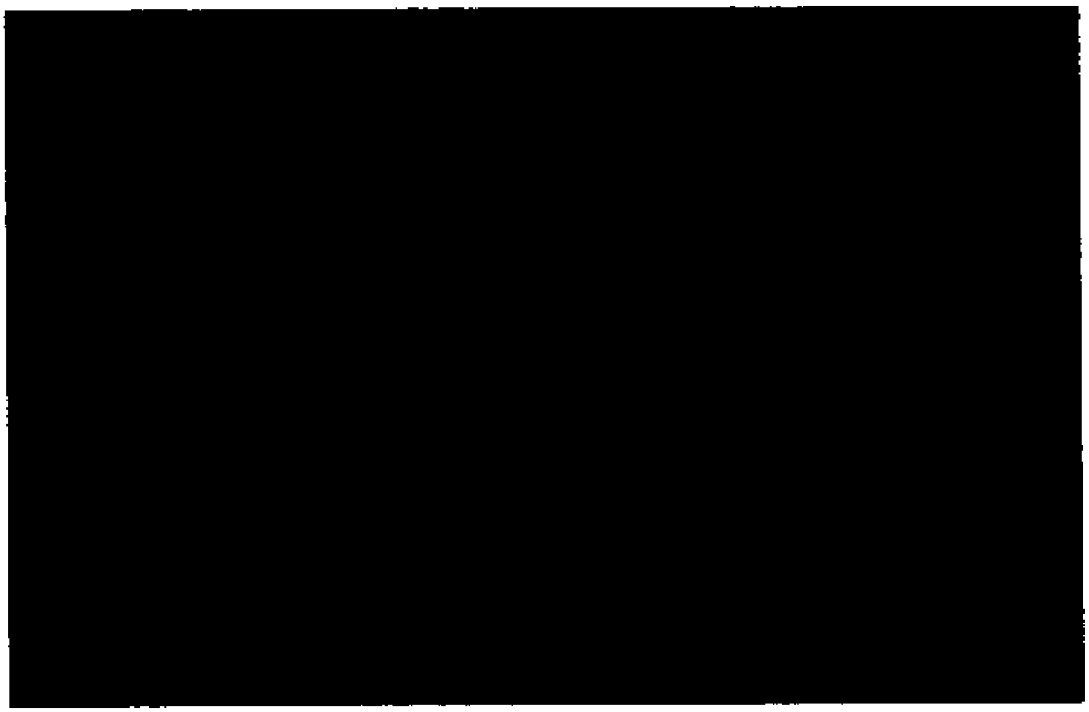
FIG. 27 is a diagram illustrating an example of the results of region specification made by the region specifying unit 103.

FIG. 27 is a diagram which illustrates the region information as an image, indicating the mixed region of the region information which the judgment flag storing frame memory 206 outputs. In FIG. 27, the pixels which are judged to belong to the covered background region or the uncovered background region, i.e., the pixels judged to belong to the mixed region, are displayed in white. The region information indicating the mixed region, which the judgment flag storing frame memory 206 outputs, indicates the mixed region and the portions which have texture within the foreground region and are surrounded by portions which have no texture.

Figure 28:
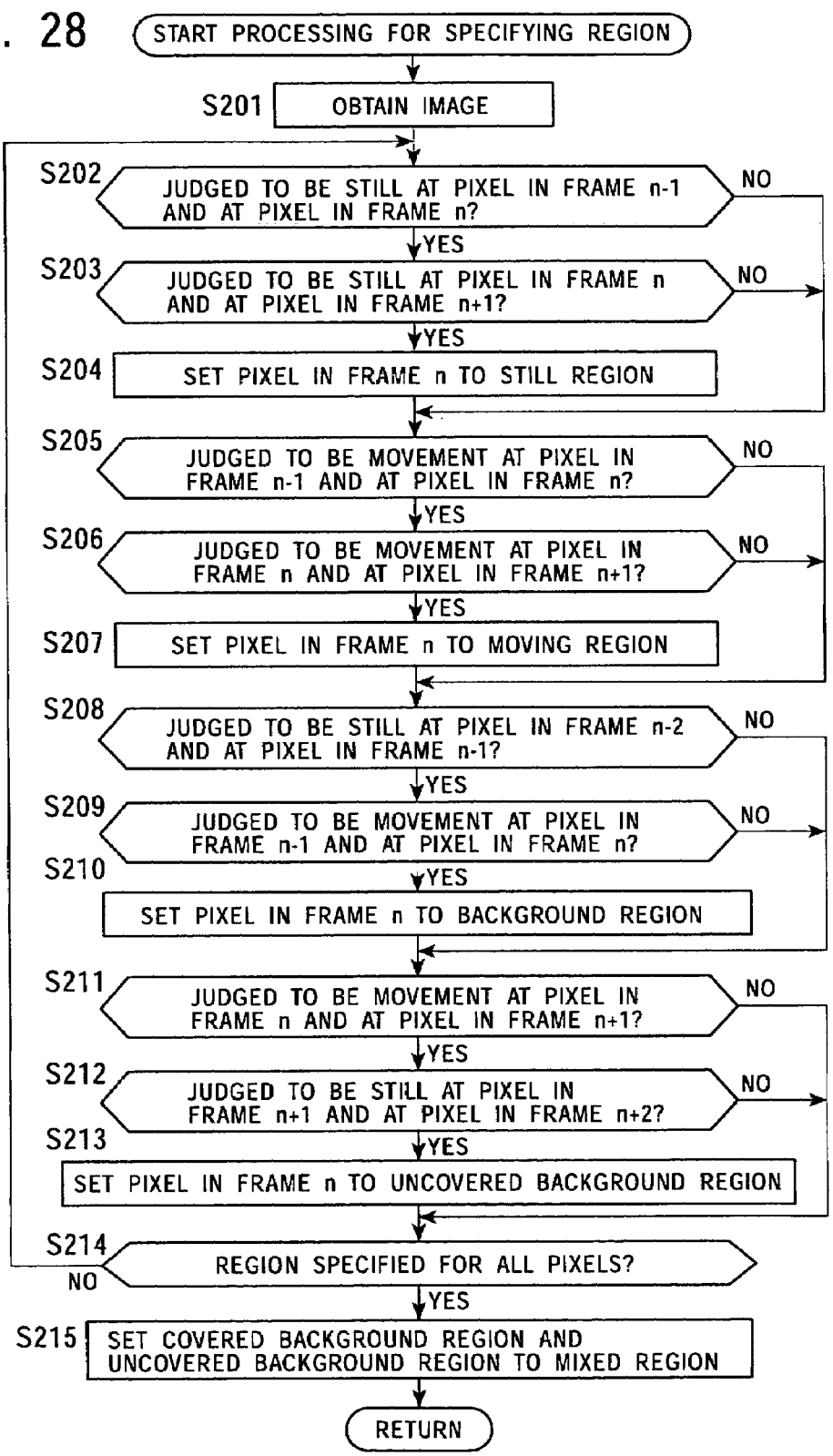
FIG. 28 is a flowchart describing processing for region specifying.

Next, referring to the flowchart in FIG. 28, the processing for region specifying by the region specifying unit 103 will be described. In Step S201, the frame memory 201 obtains the images of the frame #n−2 through the frame #n+2, including the frame #n which is the object of judgment.

In Step S202, the still/motion judgment unit 202-3 judges whether or not the pixel of the frame #n−1 and the pixel of the frame #n at the same position as the frame #n−1 keeps still, and in the event of judgment of "still", the flow proceeds to Step S203, and the still/motion judgment unit 202-2 judges whether or not the pixel of the frame #n and the pixel of the frame #n+1 at the same position keep still.

In Step S203, in the event that the pixel of the frame #n and the pixel of the frame #n+1 at the same position are judged to be "still", the flow proceeds to Step S204, and the region judgment unit 203-2 sets the still region judgment flag corresponding to the judged pixel in the region to "1" which indicates the pixel belongs to the still region. The region judgment unit 203-2 supplies the still region judgment flag to the judgment flag storing frame memory 204, and the procedure proceeds to Step S205.

In Step S202, in the event that the pixel of the frame #n−1 and the pixel of the frame #n at the same position are judged to be motion, or in Step S203, the pixel of the frame #n and the pixel of the frame #n+1 at the same position as the frame #n are judged to be motion, the pixel of the frame #n does not belong to the still region, and accordingly the processing in Step S204 is skipped, and the procedure proceeds to Step S205.

In Step S205, the still/motion judgment unit 202-3 judges whether or not the pixel of the frame #n−1 and the pixel of the frame #n at the same position are in motion, and in the event of judgment of motion, the flow proceeds to Step S206, and the still/motion judgment unit 202-2 judges whether or not the pixel of the frame #n and the pixel of the frame #n+1 at the same position are in motion.

In Step S206, in the event that the pixel of the frame #n and the pixel of the frame #n+1 at the same position are judged to be motion, the flow proceeds to Step S207, the region judgment unit 203-2 set the movement region judgment flag corresponding to the judged pixel in the region to "1" which indicates that the pixel belongs to the movement region. The region judgment unit 203-2 supplies the movement region judgment flag to the judgment flag storing frame memory 204, and the procedure proceeds to Step S208.

In Step S205, in the event that the pixel of the frame #n−1 and the pixel of the frame #n at the same position are judged to be "still", or in Step 206, in the event that the pixel of the frame #n and the pixel of the frame #n+1 at the same position are judged to be "still", since the pixel of the frame #n does not belong to the movement region, the processing in Step S207 is skipped, and the procedure proceeds to Step S208.

In Step S208, the still/motion judgment unit 202-4 judges whether or not the pixel of the frame #n−2 and the pixel of the frame #n−1 at the same position keeps still, and in the event of judgment of "still", the flow proceeds to Step S209, and the still/motion judgment unit 202-3 judges whether or not the pixel of the frame #n−1 and the pixel of the frame #n at the same position are in motion.

In Step S209, in the event that the pixel of the frame #n−1 and the pixel of the frame #n at the same position are judged to be motion, the flow proceeds to Step S210, and the region judgment unit 203-3 sets the covered background region judgment flag corresponding to the judged pixel in the region to "1" which indicates that the pixel belongs to the covered background region. The region judgment unit 203-3 supplies the covered background region judgment flag to the judgment flag storing frame memory 204, and the procedure proceeds to Step S211.

In Step 208, in the event that the pixel of the frame #n−2 and the pixel of the frame #n−1 at the same position are judged to be motion, or in Step S209, in the event that the pixel of the frame #n−1 and the pixel of the frame #n at the same position are judged to be "still", the pixel of the frame #n does not belong to the covered background region, so the processing in Step S210 is skipped, and the procedure proceeds to Step S211.

In Step S211, the still/motion judgment unit 202-2 judges whether or not the pixel of the frame #n and the pixel of the frame #n+1 at the same position are in motion, and in the event of judgment of motion, the flow proceeds to Step S212, and the still/motion judgment unit 202-1 judges whether or not the pixel of the frame #n+1 and the pixel of the frame #n+2 at the same position keep still.

In Step S212, in the event that the pixel of the frame #n+1 and the pixel of the frame #n+2 at the same position are judged to be "still", the flow proceeds to Step S213, and the region judgment unit 203-1 sets the uncovered background region judgment flag corresponding to the judged pixel in the region to "1" which indicates that the pixel belongs to the uncovered background region. The region judgment unit 203-1 supplies the uncovered background region judgment flag to the judgment flag storing frame memory 204, and the procedure proceeds to Step S214.

In Step S211, in the event that the pixel of the frame #n and the pixel of the frame #n+1 at the same position are judged to be "still", or in Step 212, in the event that the pixel of the frame #n+1 and the pixel of the frame #n+2 at the same position are judged to be motion, since the pixel of the frame #n does not belong to the uncovered background region, the processing in Step S213 is skipped, and the procedure proceeds to Step S214.

In Step 214, the region specifying unit 103 judges whether or not all the pixels in the frame #n are region-specified, and in the event that judgment is made that not all pixels are region-specified, the procedure returns to Step S202, and repeats the processing of specifying the region for other pixels.

In Step S214, in the event that judgment is made that all the pixels in frame are region-specified, the flow proceeds to Step S215, and the synthesizing unit 205 generates the region information which indicates the mixed region based upon the uncovered background region judgment flag and the covered background region judgment flag, which are stored in the judgment flag storing frame memory 204, and furthermore generates the region information which indicates which of uncovered background region, the still region, the movement region, or the covered background region, each pixel belongs to, sets the generated region information for the judgment flag storing frame memory 206, and the processing ends.

As described above, the region specifying unit 103 can generate region information which indicates which of movement region, the still region, the uncovered background region, or the covered background region, each pixel included in the frame belongs to.

Note that an arrangement may be made wherein the region specifying unit 103 generates the region information corresponding to the mixed region and the region information made up of flags which indicates which of the movement region, the still region, or the mixed region, each of pixels included in the frame belongs to, by applying the logical sum to the region information corresponding to the uncovered background region and the covered background region.

In the event that the object corresponding to the foreground has texture, the region specifying unit 103 can specify the movement region more accurately.

The region specifying unit 103 can output the region information indicating the movement region as the region information indicating the foreground region, or output the region information indicating the still region as the region information indicating the background region.

While description has been made wherein the object corresponding to the background keeps still, the processing of specifying the region above described can be applied even if the image corresponding to the background region includes motion. For example, in the event that the image corresponding to the background region moves in a constant manner, the region specifying unit 103 shift the entire image corresponding to the movement, and performs processing in the same manner as with the case wherein the object corresponding to the background keeps still. Also, in the event that the image corresponding to the background region includes a different motion at each position, the region specifying unit 103 selects the pixel corresponding to the motion, and performs the above-described processing.

Figure 29:
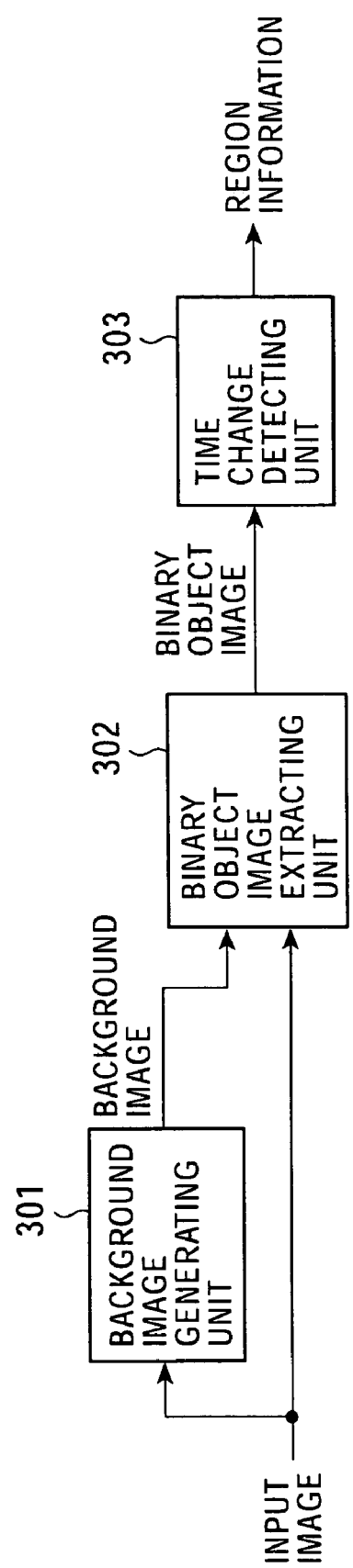
FIG. 29 is a block diagram illustrating another configuration of the region specifying unit 103.

FIG. 29 is a block diagram which illustrates the structure of the region specifying unit 103. The region specifying unit 103 shown in FIG. 29 does not use movement vectors. A background image generating unit 301 generates the background image corresponding to the input image, and supplies the generated background image to a binary object image extracting unit 302. The background image generating unit 301 extracts, for example, the image object corresponding to the background object included in the input image, and generates the background image.

Figure 30:
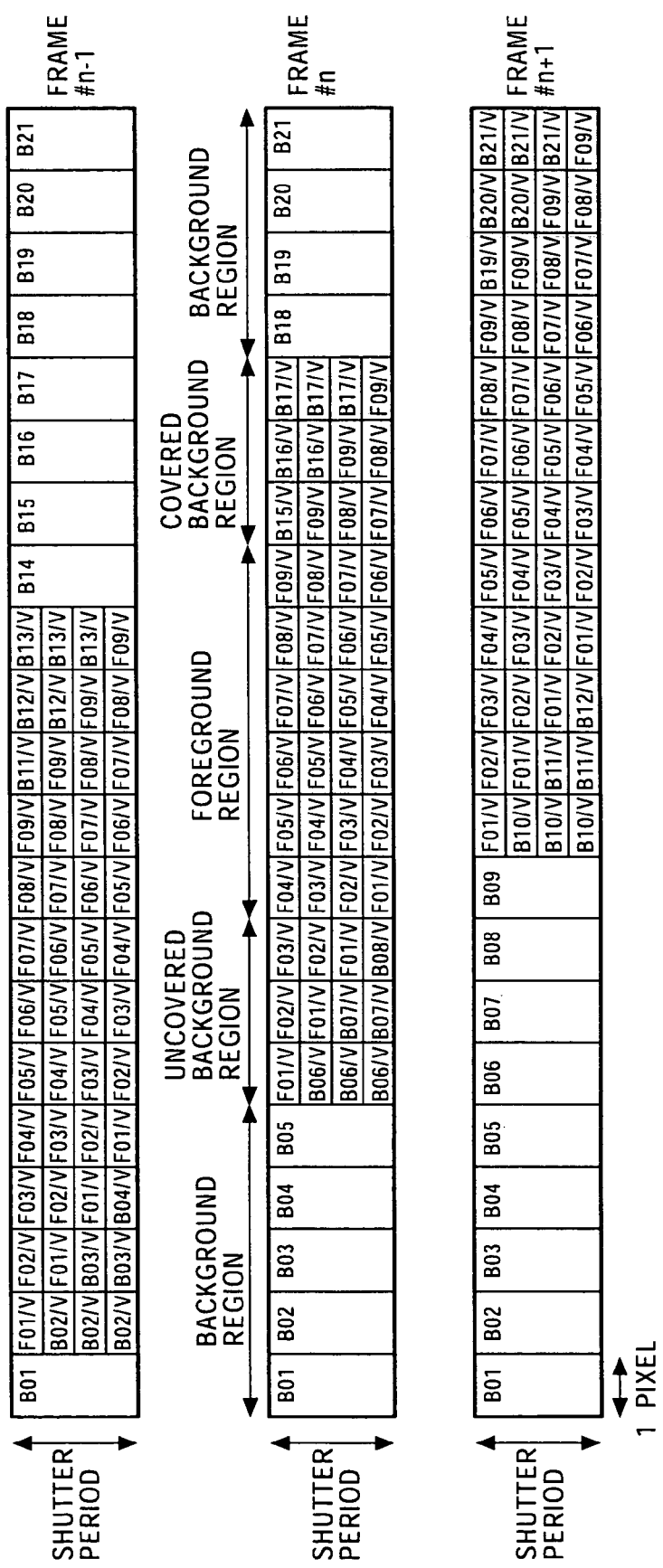
FIG. 30 is a model diagram wherein the pixel values are developed over the time direction, and periods corresponding to shutter time are divided.

An example of a model diagram is illustrated in FIG. 30 wherein the pixel values of the pixels arrayed in sequence adjacently in a movement direction of the image corresponding to the foreground object, develop over the time direction. For example, in the event that the movement direction of the image corresponding to the foreground object is horizontal to the screen, the model diagram in FIG. 30 illustrates a model wherein the pixel values of the adjacent pixels in one line develop over the time direction.

In FIG. 30, the line in the frame #n is the same as the line in the frame #n−1 and the line in the frame #n+1.

In the frame #n, the foreground components corresponding to the object, which are included in the sixth pixel through seventeenth pixel from the left, are included in the second through thirteenth pixels from the left in the frame #n−1, and are included in the tenth through 21st pixels from the left in the frame #n+1.

In the frame #n−1, the pixels belonging to the covered background region are the eleventh through thirteenth pixels from the left, and the pixels belonging to the uncovered background region are the second through fourth pixels from the left. In the frame #n, the pixels belonging to the covered background region are the fifteenth through the seventeenth pixels from the left, and the pixels belonging to the uncovered background region are the sixth through eighth pixels from the left. In the frame #n+1, the pixels belonging to the covered background region are the nineteenth through 21st pixels from the left, and the pixels belonging to the uncovered background region are the tenth through twelfth pixels from the left.

In the frame #n−1, the pixels belonging to the background region are the first from the left, and the fourteenth through 21st pixels from the left. In the frame #n, the pixels belonging to the background region are the first through fifth pixels from the left, and the eighteenth through 21st pixels from the left. In the frame #n+1, the pixels belonging to the background region are the first through ninth pixels from the left.

Figure 31:
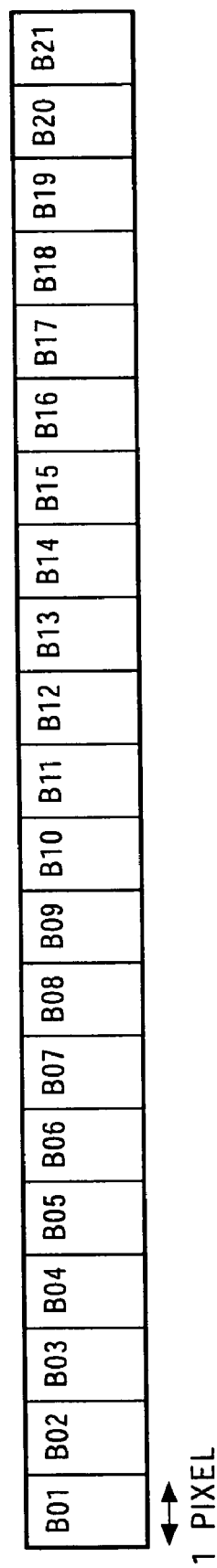
FIG. 31 is a diagram illustrating an example of a background image.

An example of the background image corresponding to the example shown in FIG. 30, which is generated by the background image generating unit 301, is illustrated in FIG. 31. The background image is made up of the pixels corresponding to the background object, and does not include image components corresponding to the foreground object.

The binary object image extracting unit 302 generates a binary object image based upon the correlation between the background image and the input image, and supplies the generated binary object image to a time change detecting unit 303.

FIG. 32 is a block diagram which illustrates the structure of the binary object image extracting unit 302. A correlation value computing unit 321 computes the correlation between the background image and the input image supplied from the background generating unit 301, generates a correlation value, and supplies the generated correlation value to a threshold value processing unit 322.

The correlation value computing unit 321 applies Expression (4) to a block 3×3 wherein $X_4$ is centered in the background image as shown in FIG. 33A, and a block 3×3 wherein $Y_4$ is centered in the background image as shown in FIG. 33B, and calculates the correlation value corresponding to the $Y_4$, for example.

$$\text{Correlation Value} = \frac{\sum_{i=0}^{8}(Xi-\overline{X})\sum_{i=0}^{8}(Yi-\overline{Y})}{\sqrt{\sum_{i=0}^{8}(Xi-\overline{X})^2 \cdot \sum_{i=0}^{8}(Yi-\overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation value computing unit 321 supplies the correlation value calculated corresponding to each pixel as described above to the threshold value processing unit 322.

Also, an arrangement may be made wherein the correlation value computing unit 321, for example, applies Expression (7) to the block 3 by 3 in the background image wherein $X_4$ is centered as shown in FIG. 34A, and the block 3 by 3 in the input image wherein $Y_4$ is centered corresponding to the block in the background image, and calculates the sum of absolute value of difference corresponding to $Y_4$.

$$\text{sum of absolute value of difference} = \sum_{i=0}^{8}|(Xi-Yi)| \quad (7)$$

The correlation value computing unit 321 supplies the difference absolute value sum calculated as described above as the correlation value to the threshold value processing unit 322.

The threshold value processing unit 322 compares the pixel value of the correlation image with the threshold value th0, and in the event that the correlation value is equal to or less than the threshold value th0, the threshold value processing unit 322 sets the pixel value of the binary object image to 1, and in the event that the correlation value is greater than the threshold value th0, the threshold value processing unit 322 sets the pixel value of the binary object image to 0, and accordingly the processing unit 322 outputs the binary object image of which each pixel value is set to 0 or 1. The threshold value processing unit 322 may store the threshold value th0 beforehand, and may use the threshold value th0 which is input externally.

Figure 35:
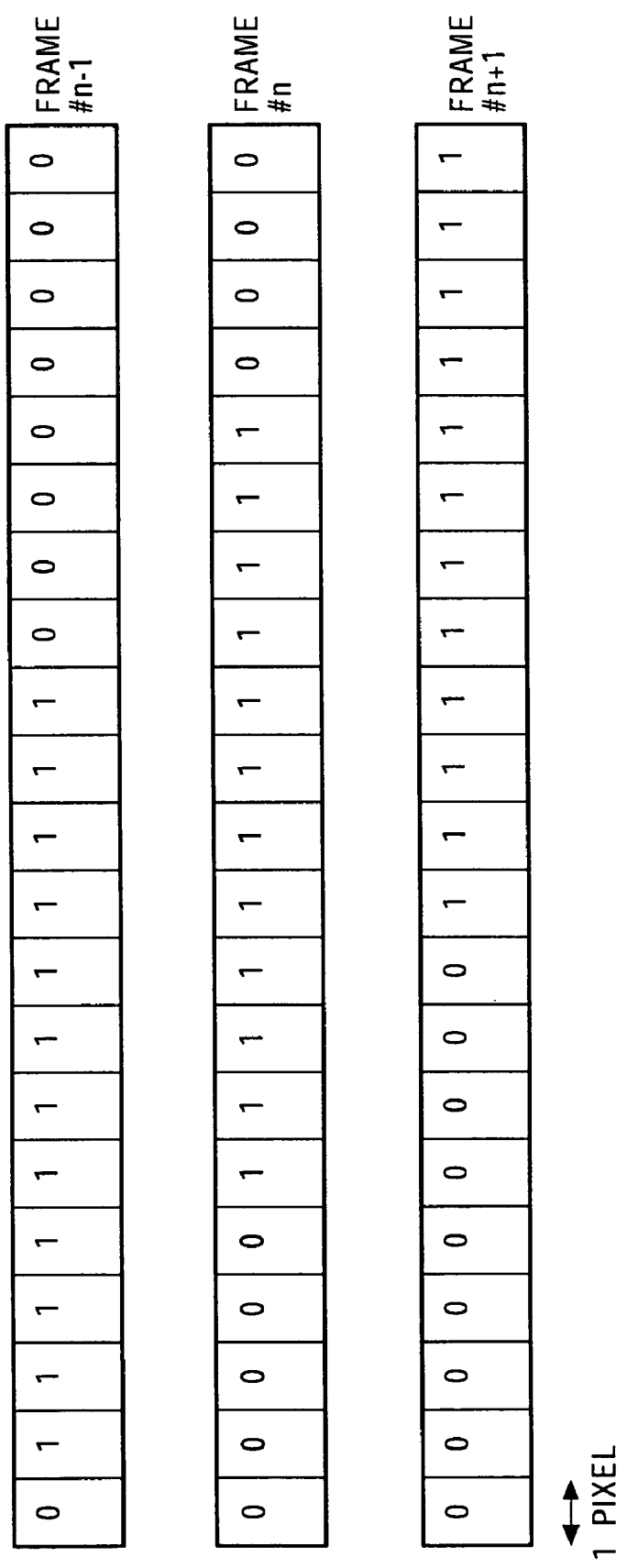
FIG. 35 is a diagram illustrating an example of a binary object image.

FIG. 35 is a diagram which illustrates an example of the binary object image corresponding to the model of the input image shown in FIG. 30. In the binary object image, a pixel value of a pixel having a high correlation with the background image is set to 0.

Figure 36:
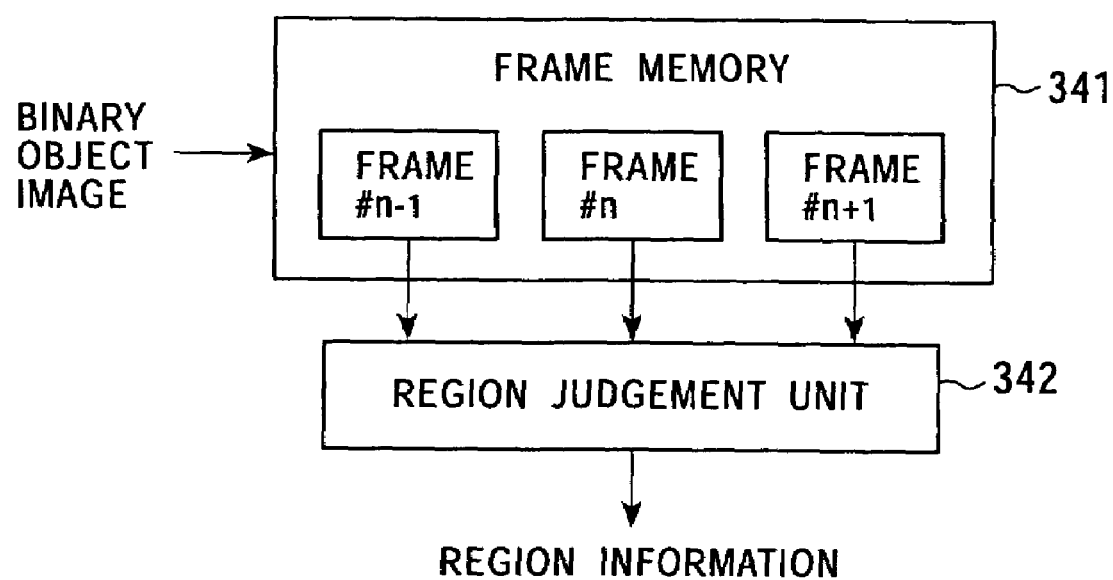
FIG. 36 is a block diagram illustrating the configuration of a time change detecting unit 303.

FIG. 36 is a block diagram which illustrates the structure of the time change detecting unit 303. Frame memory 341 stores the binary object images of the frame #n−1, frame #n, and frame #n+1, supplied from the binary object image extracting unit 302 at the point of judgment of the region for the pixel of the frame #n.

A region judgment unit 342 judges the region for each pixel of the frame #n based upon the binary object images of the frame #n−1, frame #n, and frame #n+1, which are stored in the frame memory 341, generates the region information, and outputs the generated region information.

FIG. 37 is a diagram which describes the judgment made by the region judgment unit 342. In the event that the pixel of interest of the binary object image of the frame #n is 0, the region judgment unit 342 judges the pixel of interest of the frame #n to belong to the background region.

In the event that the pixel of interest of the binary object image of the frame #n is 1, the pixel value of the corresponding pixel of the binary object image of the frame #n−1 is 1, and the corresponding pixel of the binary object image of the frame #n+1 is 1, the region judgment unit 342 judges the pixel of interest of the frame #n to belong to the foreground region.

In the event that the pixel of interest of the binary object image of the frame #n is 1, and the corresponding pixel of the binary object image of the frame #n−1 is 0, the region judgment unit 342 judges the pixel of interest of the frame #n to belong to the covered background region.

In the event that the pixel of interest of the binary object image of the frame #n is 1, and the corresponding pixel of the binary object image of the frame #n+1 corresponding to the frame #n is 0, the region judgment unit 342 judges the pixel of interest of the frame #n to belong to the uncovered background region.

Figure 38:
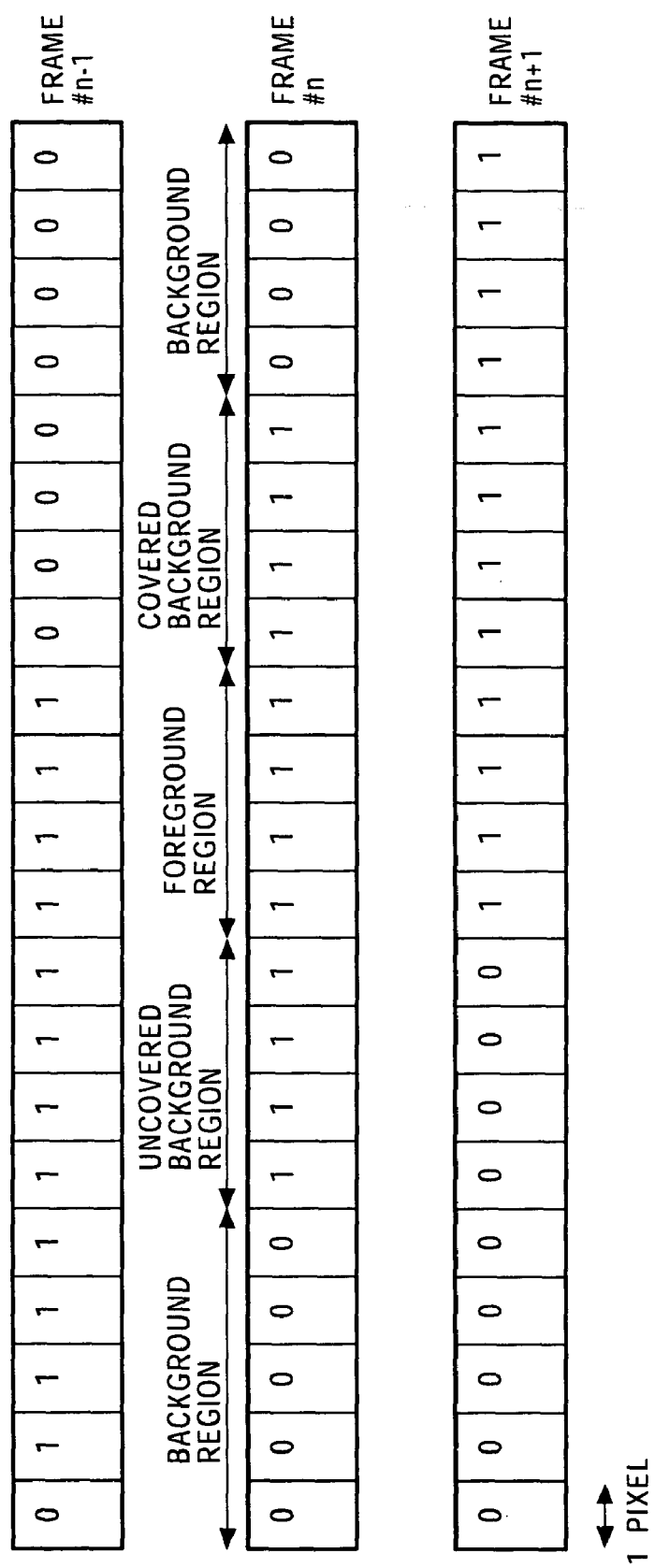
FIG. 38 is a diagram illustrating an example of judgment made by the time change detecting unit 303.

FIG. 38 is a diagram which illustrates an example wherein the time change detecting unit 303 judges the binary object image corresponding to the model of the input image shown in FIG. 30. The time change detecting unit 303 judges the first through fifth pixels from the left of the frame #n to belong to the background region since the corresponding pixels of the binary object image of the frame #n are 0.

The time change detecting unit 303 judges the sixth through ninth pixels from the left to belong to the uncovered background region since the corresponding pixels of the binary object image of the frame #n are 1, and the corresponding pixels of the frame #n+1 are 0.

The time change detecting unit 303 judges the tenth through thirteenth pixels from the left to belong to the foreground region since the pixel values of the pixels of the binary object image of the frame #n are 1, and the corresponding pixels of the frame #n+1 are 1.

The time change detecting unit 303 judges the fourteenth through seventeenth pixels from the left to belong to the covered background region since the pixels of the binary object image of the frame #n are 1, and the corresponding pixels of the frame #n−1 are 0.

The time change detecting unit 303 judges the eighteenth through 21st pixels from the left to belong to the background region since the corresponding pixels of the binary object image of the frame #n are 0.

Figure 39:
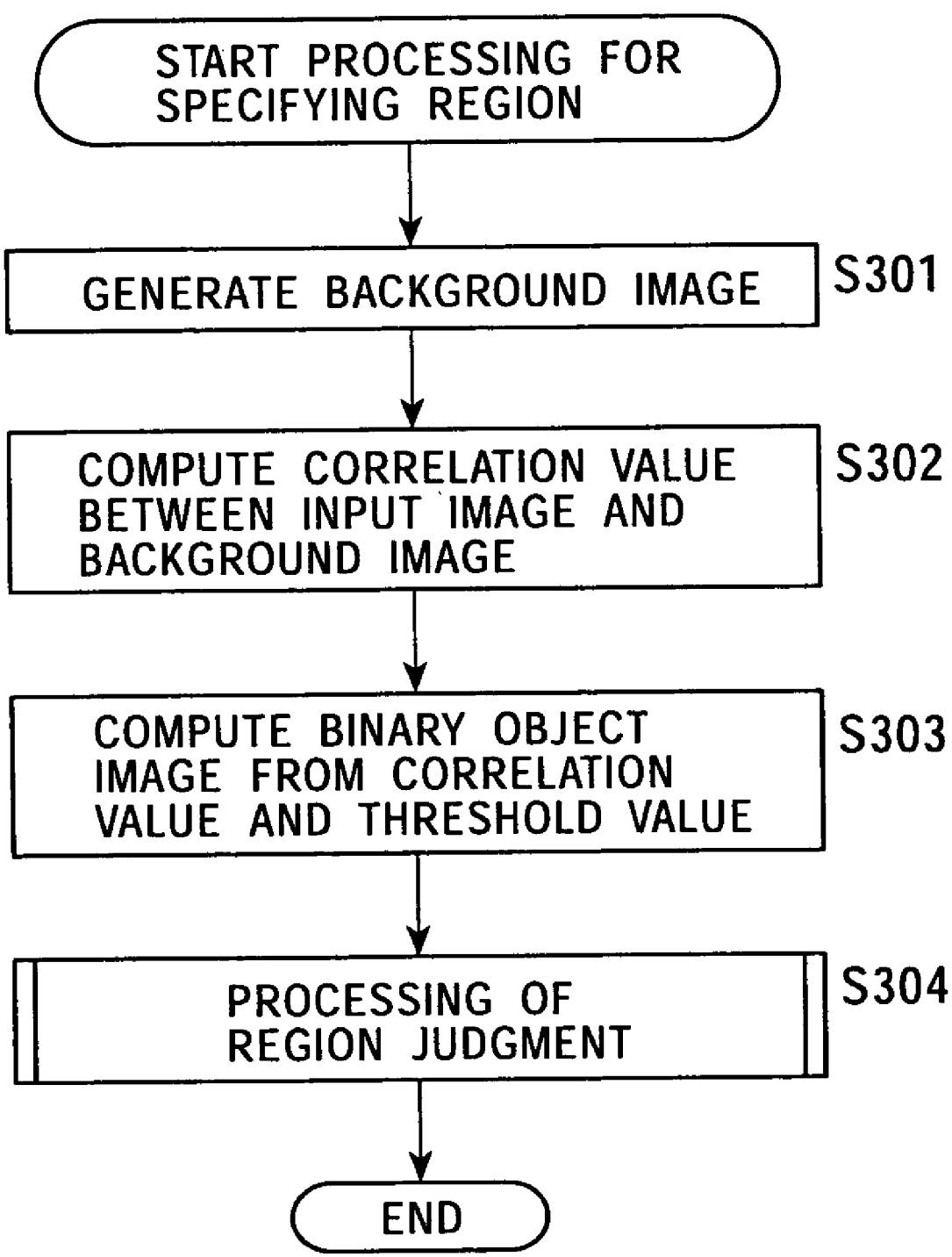
FIG. 39 is a flowchart describing processing for region specification by the region judgment unit 103.

The processing of specifying the region by the region judgment unit 103 will be now described, referring to the flowchart shown in FIG. 39. In Step S301, the background image generating unit 301 of the region judgment unit 103, for example, generates the background image by extracting the image object corresponding to the background object included in the input image based upon the input image, and supplies the generated background image to the binary object image extracting unit 302.

In Step S302, the binary object image extracting unit 302 computes the correlation value between the input image and the background image supplied from the background image generating unit 301 by the computation described referring to FIG. 33, for example. In Step S303, the binary object image extracting unit 302 computes the binary object image from the correlation value and the threshold value th0 by comparing the correlation value with the threshold value th0, for example.

In Step S304, the time change detecting unit 303 performs processing of region judgment, and the processing ends.

Figure 40:
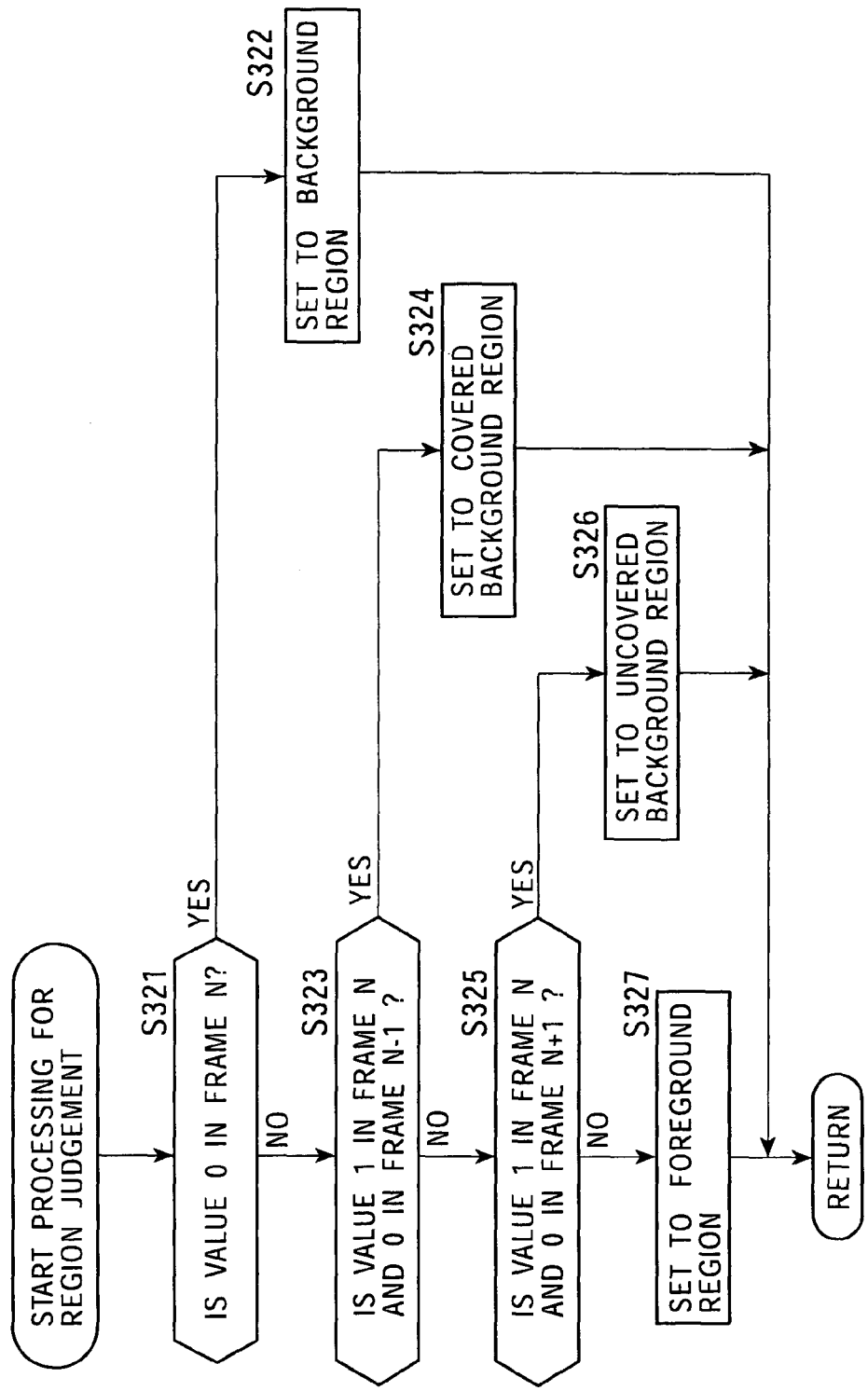
FIG. 40 is a flowchart for describing the processing for region specification in detail.

The processing of the region judgment corresponding to Step S304 will be described in detail, referring to the flowchart shown in FIG. 40. In Step S321, the region judgment unit 342 of the time change detecting unit 303 judges whether or not the pixel of interest in the frame #n stored in the frame memory 341 is 0, and in the event that the judgment is made that the pixel of the interest in the frame #n is 0, the flow proceeds to Step S322, makes settings to the effect that the pixel of interest in the frame #n belongs to the background region, and the processing ends.

In Step S321, in the event that judgment is made that the pixel of interest in the frame #n is 1, the flow proceeds to Step S323, and the region judgment unit 342 of the time change detecting unit 303 judges whether or not the pixel of interest in the frame #n stored in the frame memory 341 is 1, and the corresponding pixel in the frame #n−1 is 0, and in the event that judgment is made that the pixel of interest in the frame #n is 1, and the pixel value of the corresponding pixel in the frame #n−1 is 0, the flow proceeds to Step S324, makes settings to the effect that the pixel of interest in the frame #n belongs to the covered background region, and the processing ends.

In Step S323, in the event that judgment is made that the pixel of interest in the frame #n is 0, or the corresponding pixel in the frame #n−1 is 1, the flow proceeds to Step S325, and the region judgment unit 342 of the time change detecting unit 303 judges whether or not the pixel of interest in the frame #n stored in the frame memory 341 is 1, and the corresponding pixel in the frame #n+1 is 0, and in the event that judgment is made that the pixel of interest in the frame #n is 1, and the corresponding pixel in the frame #n+1 is 0, the flow proceeds to Step S326, makes settings to the effect that the pixel of interest in the frame #n belongs to the uncovered background region, and the processing ends.

In Step 325, in the event that judgment is made that the pixel of interest in the frame #n is 0, or the corresponding pixel in the frame #n+1 is 1, the flow proceeds to Step S327, and the region judgment unit 342 of the time change detecting unit 303 sets the pixel of interest in the frame #n for the foreground region, and the processing ends.

As described above, the region specifying unit 103 can classify the pixel of the input image into one of the foreground region, the background region, the covered background region, or the uncovered background region, and generate region information corresponding to the classified results.

Figure 41:
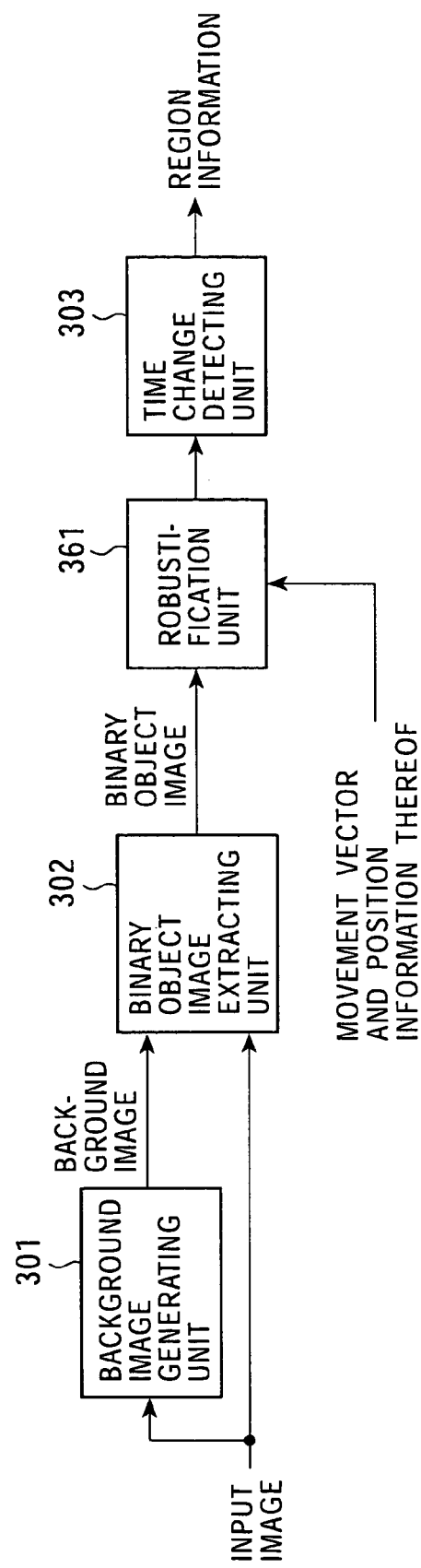
FIG. 41 is a block diagram illustrating yet another configuration of the region specifying unit 103.

FIG. 41 is a block diagram which illustrates another structure of the region specifying unit 103. The region specifying unit 103 shown in FIG. 41 uses the movement vector and the position information thereof, which are supplied from the movement detecting unit 102. Portions the same as those shown in FIG. 29 are denoted by the same reference numerals, and description thereof will be omitted.

A robustification unit 361 generates a robustified binary object image based upon N frames of the binary object image supplied from the binary object image extracting unit 302, and outputs to the time change detecting unit 303.

Figure 42:
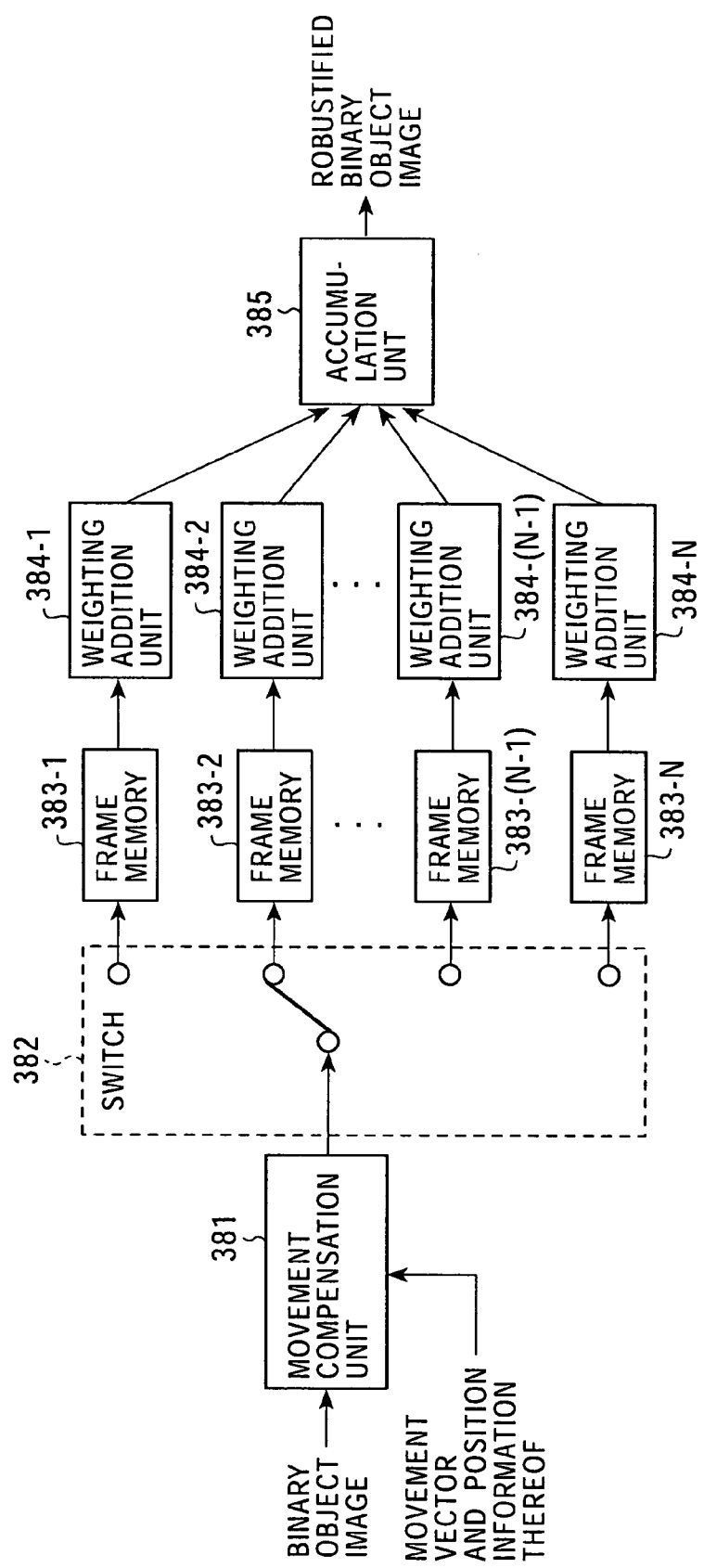
FIG. 42 is a block diagram describing the configuration of a robustification unit 361.

FIG. 42 is a block diagram which describes the structure of the robustification unit 361. A movement compensation unit 381 compensates for the movement of the binary object image of N frames based upon the movement vector and the position information thereof supplied from the movement detecting unit 102, and outputs the binary object image, in which the movement has been compensated, to the switch 382.

Figure 43:
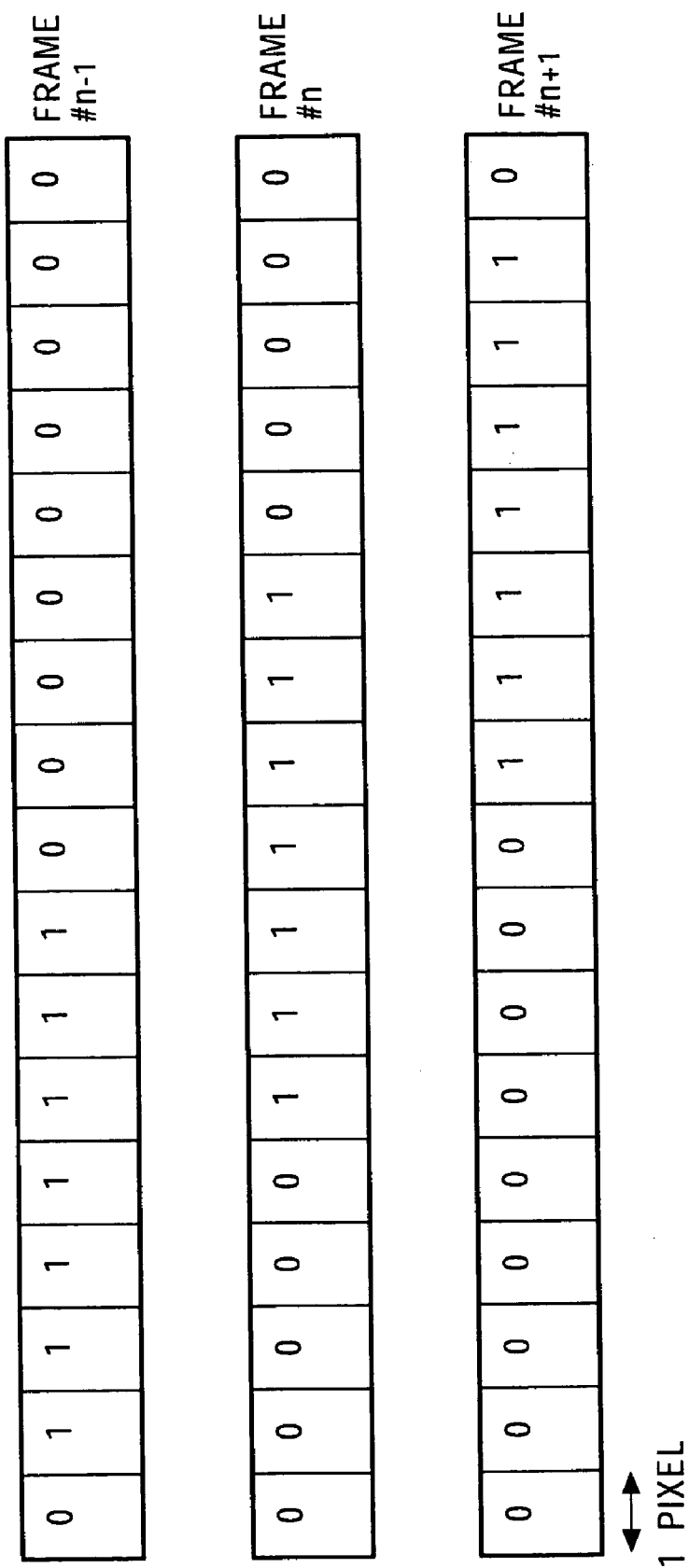
FIG. 43 is a diagram describing movement compensation of a movement compensation unit 381.
Figure 44:
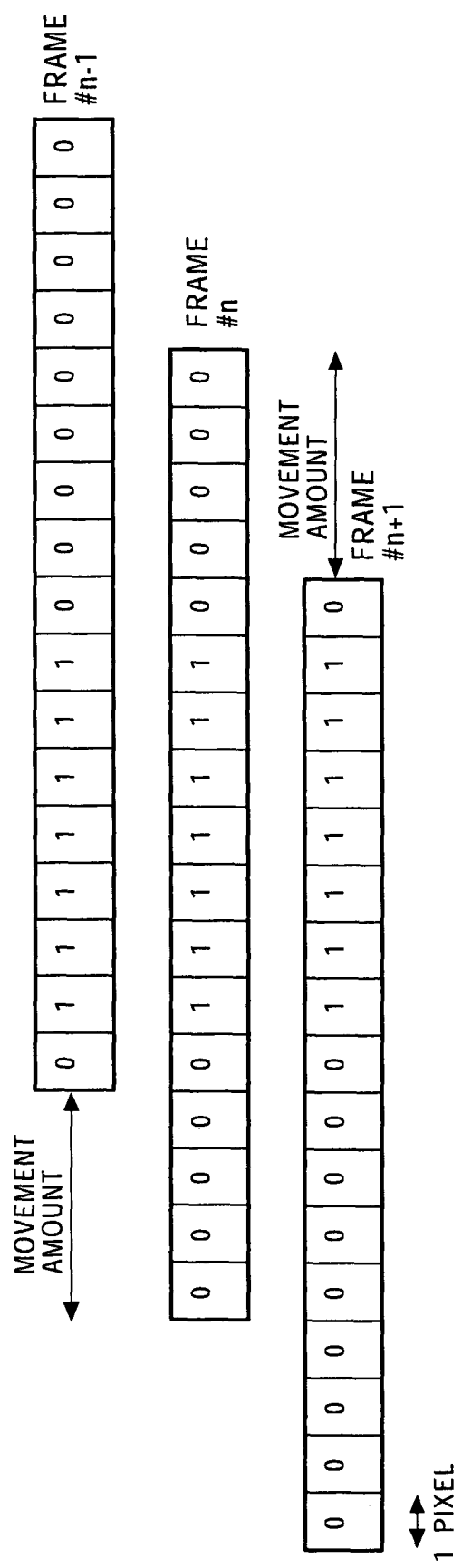
FIG. 44 is a diagram describing movement compensation of a movement compensation unit 381.

The movement compensation of the movement compensation unit 381 will be described with reference to examples shown in FIG. 43 and FIG. 44. For example, in cases wherein the region in the frame #n is judged, in the event that there is input of the binary object images of the frame #n−1, the frame #n, and the frame #n+1, shown by way of the example in FIG. 43, the movement compensation unit 381 compensates for movement of the binary object image of the frame #n−1 and the binary object image of the frame #n+1, based upon the movement vector supplied from the movement detecting unit 102, and supplies the binary object image in which movement has been compensated to the switch 382, as indicated in the example shown in FIG. 44.

The switch 382 outputs the binary object image, in which the movement of the first frame has been compensated, to the frame memory 383-1, and outputs the binary object image in which the movement of the second frame to the frame memory 383-2 has been compensated. Similarly, the switch 382 outputs each of the binary object images of which the third through N−1'th frames have been subjected to compensation for the movement to each of frame memory 383-3 through frame memory 383-(N−1), respectively, and outputs the binary object image of which the N'th frame has been subjected to movement compensation to frame memory 383-N.

The frame memory 383-1 stores the binary object image of which the first frame has been compensated for movement, and outputs the stored binary object image to a weighting addition unit 384-1. The frame memory 383-2 stores the binary object image of which the second frame has been compensated for movement, and outputs the stored binary object image to a weighting addition unit 384-2.

Similarly, each of the frame memory 383-3 through the frame memory 383-(N−1) stores each of the binary object images of which one of the third frame through N−1'th frame has been subjected to compensation for the movement, and outputs the stored binary object image to each of the weighing addition unit 384-3 through the weighing addition unit 384-(N−1). The frame memory 383-N stores the binary object image of which N'th frame has been subjected to compensation for the movement, and outputs the stored binary object image to a weighing addition unit 384-N.

The weighing addition unit 384-1 multiplies the pixel value of the binary object image of which the first frame has been subjected to compensation for the movement supplied from the frame memory 383-1 by the predetermined weight w2, and supplies to an accumulation unit 385. The weighing addition unit 384-2 multiplies the pixel value of the binary object image of the second frame which has been subjected to movement compensation supplied from the frame memory 383-2 by the predetermined weight w2, and supplies to an accumulation unit 385.

Similarly, each of the weighting addition unit 384-3 through the weighing addition unit 384-(N−1) multiplies the pixel value of the binary object image of one of the third through N−1'th frames, which has been subjected to movement compensation supplied from one of the frame memory 383-3 through the frame memory 383-(N−1) by one of the predetermined weights w3 through w(N−1), and supplies to the accumulation unit 385. A weighing addition unit 384-N multiplies the pixel value of the binary object image of the N'th frame supplied from the frame memory 383-N which has been subjected to movement compensation by the predetermined weight wN, and supplies to the accumulation unit 385.

The accumulation unit 385 accumulates the pixel value corresponding to the binary object image, wherein each of the first through N'th frames which are compensated for movement is multiplies by one of the predetermined weights w1 through wN, and generates the binary object image by comparing the accumulated pixel value with the predetermined threshold value th0.

As described above, the robustification unit 361 generates the robustified binary object image from the N frames of binary object images, which is supplied to the time change detecting unit 303, so the region specifying unit 103 of which the structure is shown in FIG. 41 can specify the region more accurately as compared with the case shown in FIG. 29, even if the input image includes noise.

Figure 45:
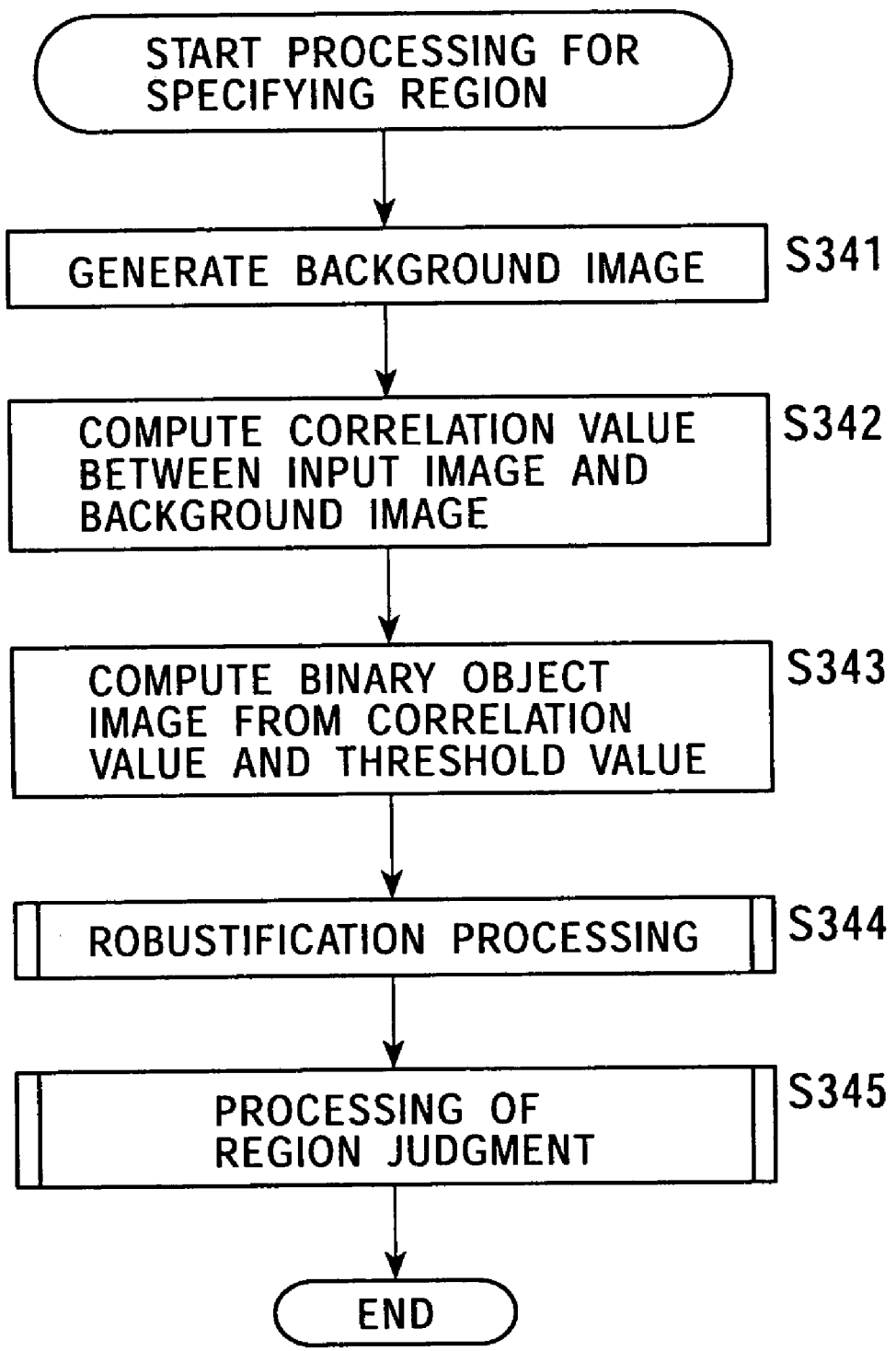
FIG. 45 is a flowchart describing the processing for region specification.

The processing for specifying the region of the region specifying unit 103 of which the structure is shown in FIG. 41 will now be described, referring to the flowchart shown in FIG. 45. The processing in Step S341 through Step S343 is the same as Step S301 through Step S303 described in the flowchart shown in FIG. 39, respectively, and accordingly, description thereof will be omitted.

In Step S344, the robustification unit 361 performs processing for robustification.

In Step S345, the time change detecting unit 303 performs processing for specifying the region, and processing ends. The details of the processing in Step S345 are the same as the processing described with reference to the flowchart shown in FIG. 40, so description thereof will be omitted.

Figure 46:
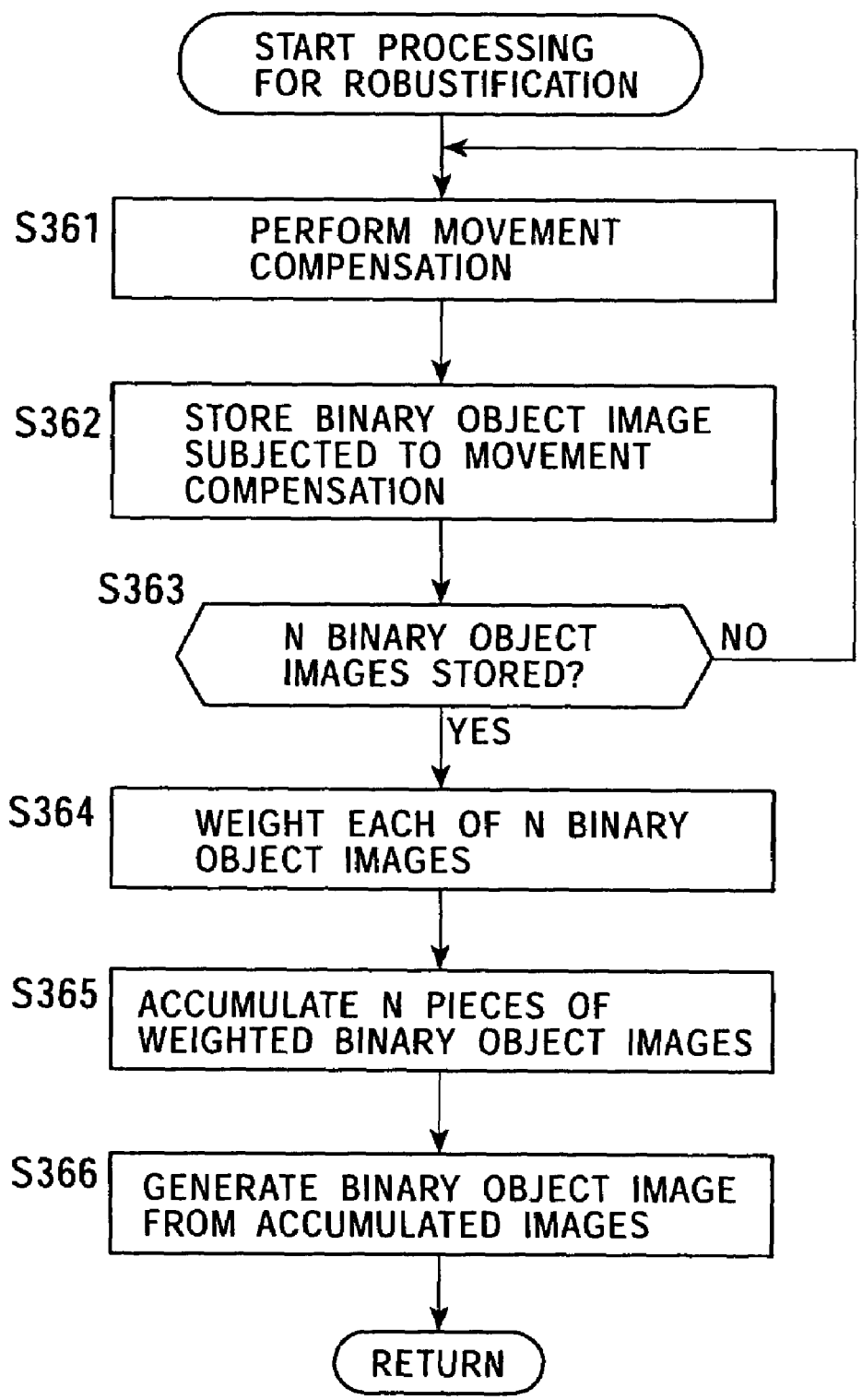
FIG. 46 is a flowchart describing details of processing for robustification.

Referring to the flowchart shown in FIG. 46, processing of robustification corresponding to the processing in Step S344 shown in FIG. 45 will now be described in detail. In Step S361, the movement compensation unit 381 performs movement compensation processing of the input binary object image based upon the movement vector and the position information thereof supplied from the movement detecting unit 102. In Step S362, one of the frame memory 383-1 through the frame memory 383-N stores the binary object image, which has been subjected to movement compensation, supplied via the switch 382.

In Step S363, the robustification unit 361 judges whether or not N binary object images are stored, and in the event that N binary object images are judged not to be stored, the flow returns to Step S361, and the robustification unit 361 repeats processing of compensation for movement of the binary object image, and processing of storing the binary object image.

In Step S363, in the event that N binary object images are judged to be stored, the flow proceeds to Step S364, and each of the weighting addition units 384-1 through 384-N multiplies each of N binary object images, by one of the weights w1 through wN for weighting.

In Step S365, the accumulation unit 385 accumulates the N weighted binary object images.

In Step 366, the accumulation unit 385 generates the binary object image from the accumulated image, for example, by comparing with the predetermined threshold value th1, and the processing ends.

As described above, the region specifying unit 103 of which the structure is shown in FIG. 41 can generate the region information based upon the robustified binary object image.

As described above, the region specifying unit 103 can generate the region information which indicates which of the movement region, the still region, the uncovered background region, or the covered background region, each of pixels included in the frame belongs to.

Figure 47:
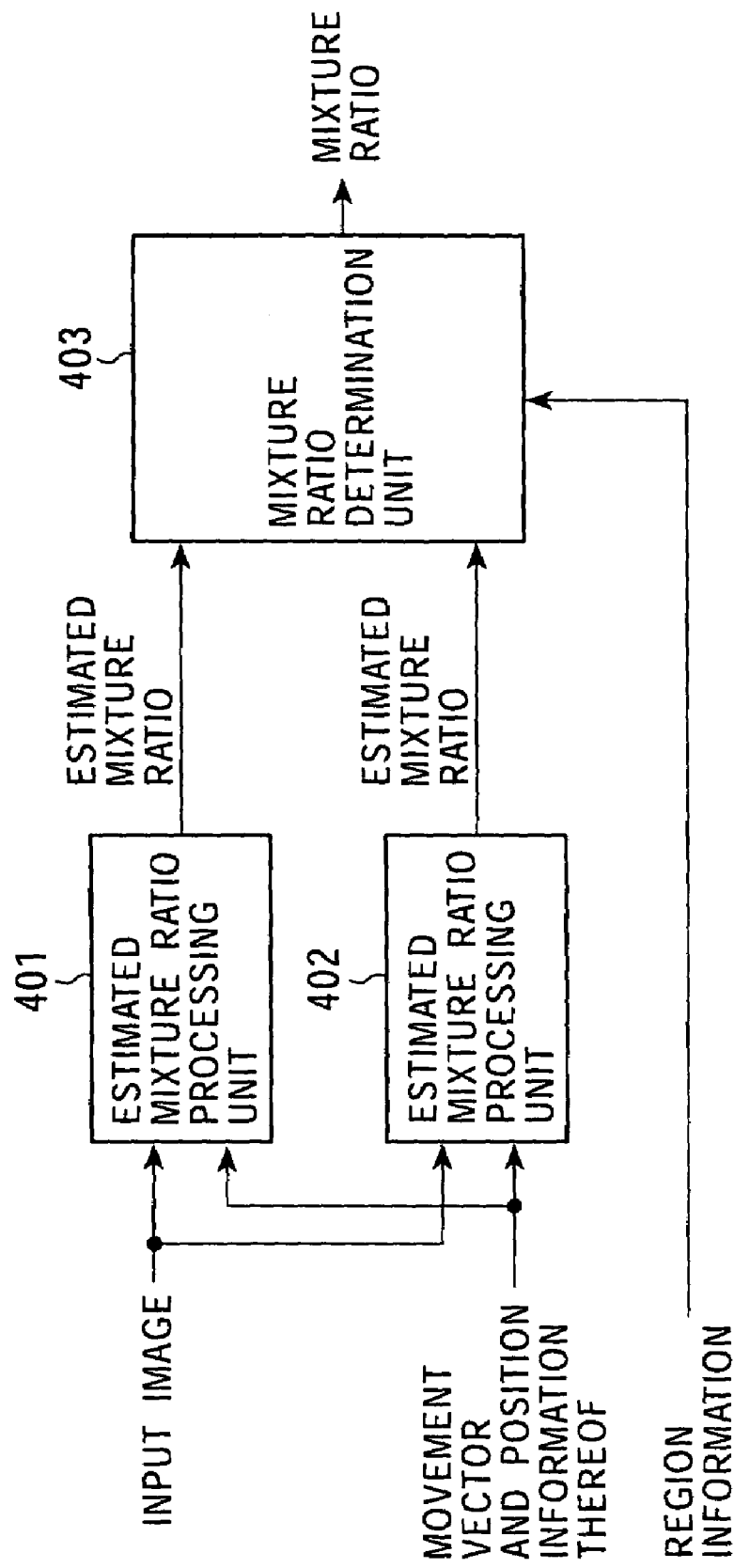
FIG. 47 is a block diagram illustrating the configuration of a mixture ratio calculating unit 104.

FIG. 47 is a block diagram which illustrates the structure of the mixture ratio calculating unit 104. An estimated mixture ratio processing unit 401 calculates estimated mixture ratio for each pixel by computation corresponding to the covered background region based upon the input image and the movement vector and the position information thereof supplied from the movement detecting unit 102, and supplies the calculated estimated mixture ratio to a mixture ratio determination unit 403.

An estimated mixture ratio processing unit 402 calculates the estimated mixture ratio for each pixel by computation corresponding to the uncovered background region based upon the input image and the movement vector and the position information thereof supplied from the movement detecting unit 102, and supplies the calculated estimated mixture ratio to a mixture ratio determination unit 403.

The mixture ratio determination unit 403 sets the mixture ratio $\alpha$ based upon the region information which indicates which of the foreground region, the background region, the covered background region, or the uncovered background region, the pixel which is the object of calculation of the mixture ratio belongs to, which is supplied from the region specifying unit 101. In the event that the pixel which is the object belongs to the foreground region, the mixture ratio determination unit 403 sets the mixture ratio $\alpha$ to 0, in the event that the pixel which is the object belongs to the background region, sets the mixture ratio $\alpha$ to 1, in the event that the pixel which is the object belongs to the covered background region, sets the mixture ratio $\alpha$ to the estimated mixture ratio supplied from the estimated mixture ratio processing unit 401, and in the event that the pixel which is the object belongs to the uncovered background region, sets the mixture ratio $\alpha$ to the estimated mixture ratio supplied from the estimated mixture ratio processing unit 402. The mixture ratio determination unit 403 outputs the mixture ratio $\alpha$ which is set based upon the region information.

Figure 48:
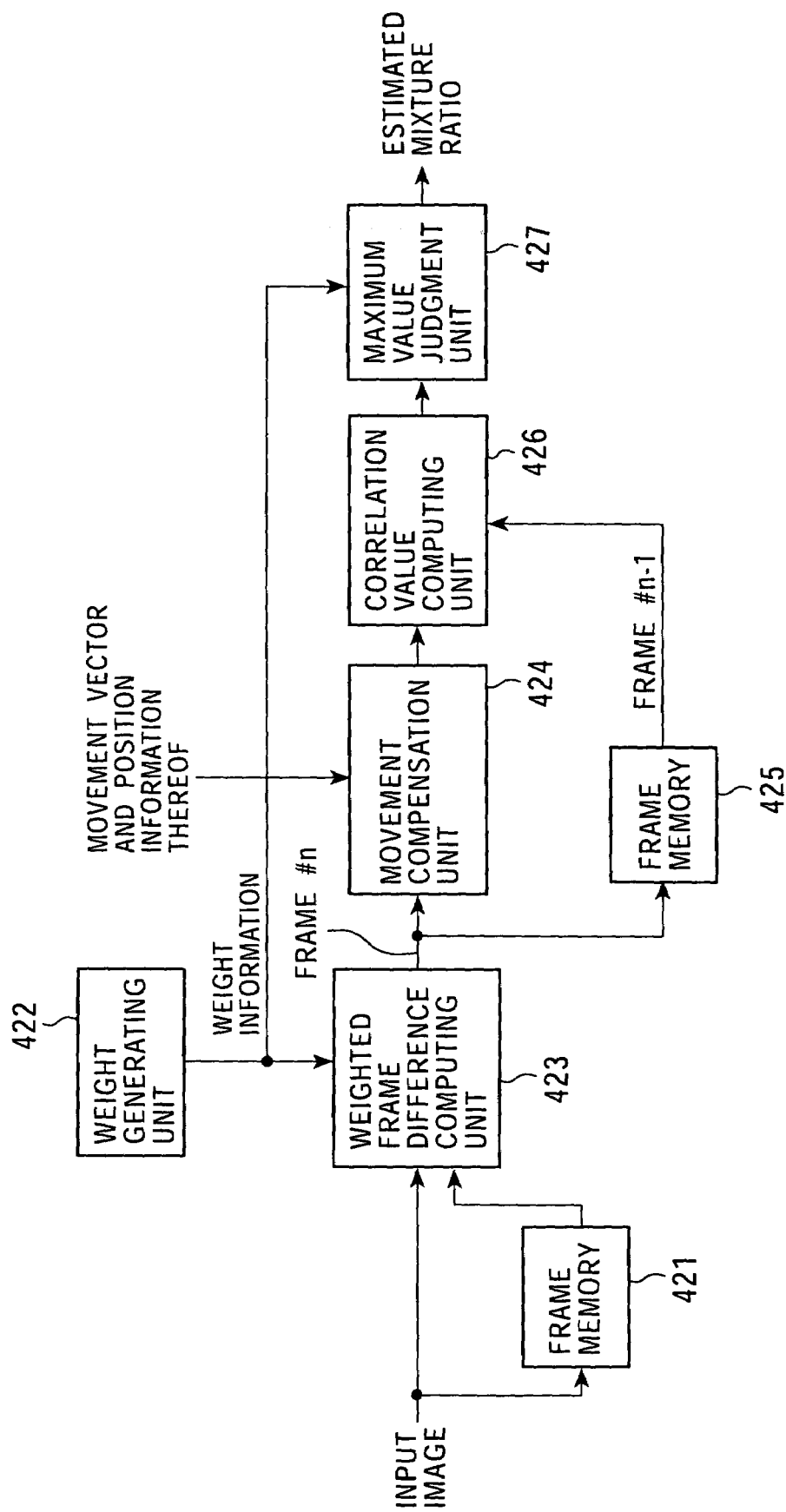
FIG. 48 is a block diagram illustrating the configuration of an estimated mixture ratio processing unit 401.

FIG. 48 is a block diagram which illustrates the structure of the estimated mixture ratio processing unit 401.

The image input to the estimated mixture ratio processing unit 401 is input to frame memory 421 and a weighted frame difference computing unit 423.

The frame memory 421 stores the input image in increment of frames, which is delayed for a period corresponding to one frame, and supplies the stored image to the weighted frame difference computing unit 423.

A weight generating unit 422 generates the weight of which the value increases sequentially from the predetermined initial value corresponding to a given frame, and supplies the generated weight to the weighted frame difference computing unit 423 and a maximum value judgment unit 427 as weighing information. For example, the weight generating unit 422 sets the weight to the initial value stored beforehand, and generates a weight which increases from the initial value sequentially, by adding the incrementation δ which is a minute value and is stored beforehand, to the weight sequentially.

The weighted frame difference computing unit 423 calculates the pixel value wherein the pixel value of the frame supplied from the frame memory 421 is multiplied by the weight supplied from the weight generating unit 422. The weighed frame difference computing unit 423 calculates the weighed difference by subtracting the weighed pixel value of the corresponding pixel from the pixel value of the pixel of interest of the input image.

The weighted frame difference computing unit 423 calculates multiple weighted differences for one frame corresponding to the weights which increase from the initial value sequentially supplied from the weight generating unit 422.

The weighted frame difference computing unit 423 supplies the weighed difference calculated as described above to the movement compensation unit 424 and frame memory 425 as weighed difference image data.

The movement compensation unit 424 compensates for the weighed difference image data supplied from the weighted frame difference computing unit 423 based upon the movement vector and the position information thereof supplied from the movement detecting unit 102, and supplies the weighted difference of which movement has been compensated to a correlation value computing unit 426.

The frame memory 425 stores multiple sets of weighted difference image data in increment of frames, delays for a period corresponding to one frame, and supplies the stored weighted difference image data to the correlation value computing unit 426.

The correlation value computing unit 426 computes the correlation value between the weighed difference image data which has been subjected to movement compensation, supplied from the movement compensation unit 424, and the weighted difference image data which is delayed for one frame supplied from the frame memory 425, per weight which increases from the initial value one by one, and supplies the computed correlation value to the maximum value judgment unit 427.

The correlation value computing unit 426, for example, calculates the absolute value of the difference between the weighted difference image data which has been subjected to movement compensation supplied from the movement compensation unit 424, and the weighted difference image data which is delayed for one frame supplied from the frame memory 425, per pixel, and supplies the calculated absolute value of the difference to the maximum value judgment unit 427 as the correlation value. The correlation value output from the correlation value computing unit 426 is also referred to as inter-weighted-difference-image correlation data.

The maximum value judgment unit 427 stores the correlation value supplied from the correlation value computing unit 426 with corresponding to the value of the weight supplied from the weight generating unit 422. The maximum value judgment unit 427 selects the weight corresponding to the correlation value with the greatest correlation based upon the stored correlation values. The maximum value judgment unit 427 sets the selected weight for the estimated mixture ratio, and outputs the estimated mixture ratio to which the selected weight is set.

Note that an arrangement may be made wherein the maximum value judgment unit 427 detects the mixture ratio in increment of blocks made up of multiple pixels.

Also, an arrangement may be made wherein the maximum value judgment unit 427 detects the mixture ratio in increments of blocks made up of multiple pixels under an assumption that the mixture ratio in the block is constant.

The processing of the estimated mixture ratio processing unit 401 corresponding to the covered background region will be described with reference to FIG. 48 through FIG. 54.

Figure 49:
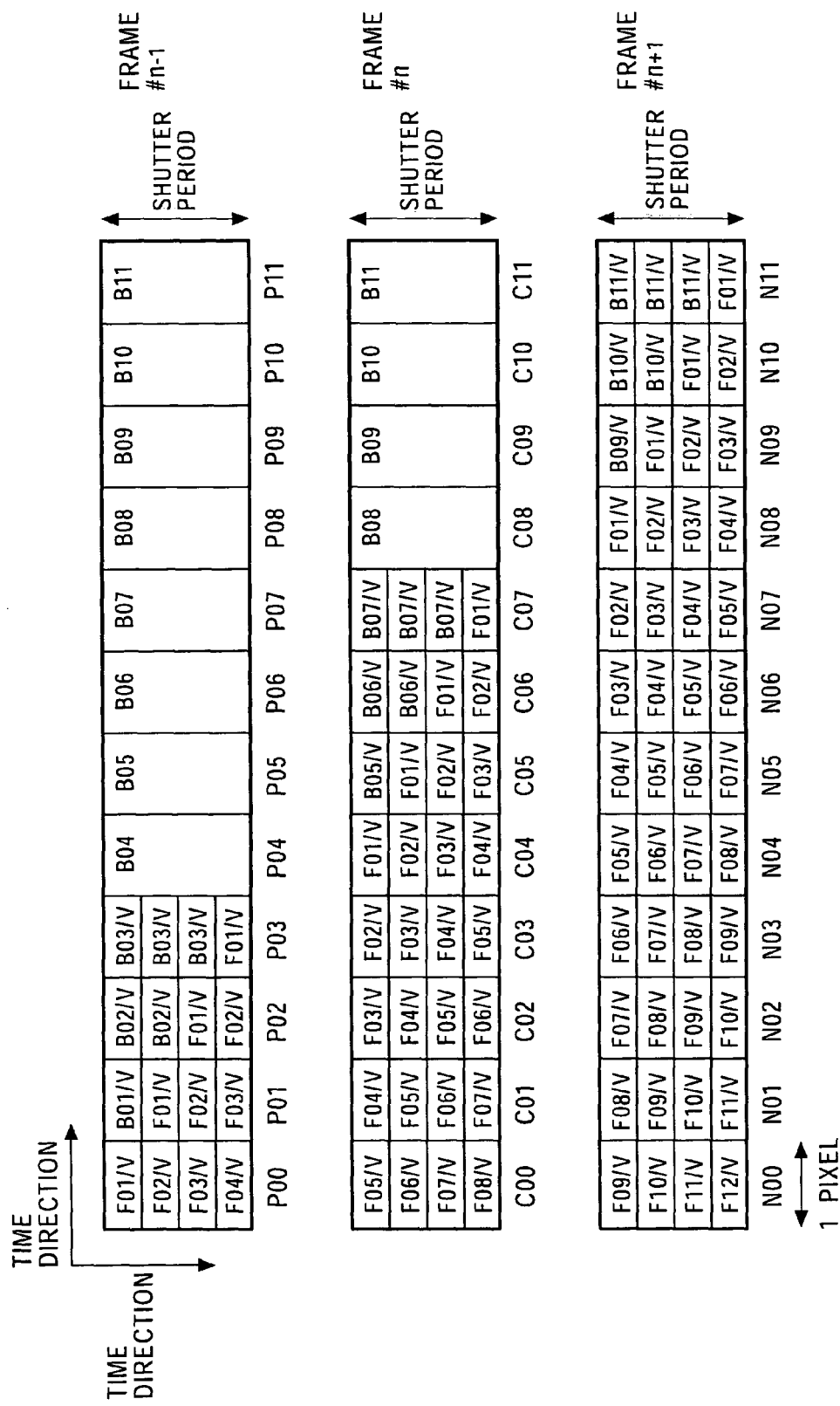
FIG. 49 is a model diagram wherein the pixel values are developed over the time direction, and periods corresponding to shutter time are divided.

In a model of an image wherein the movement amount v of the foreground object is 4, shown by way of an example in FIG. 49, the sixth through eighth pixels from the left in the frame #n belong to the mixed region.

The pixel value of the sixth pixel from the left in the frame #n may be represented by Expression (8). Similarly, the pixel value of the seventh pixel from the left in the frame #n may be represented by Expression (9), and the pixel value of the eighth pixel from the left in the frame #n may be represented by Expression (10).

$$C05 = \sum_{i=1}^{3} Fi + \alpha 05 \cdot B05 \quad (8)$$

$$C06 = \sum_{i=1}^{2} Fi + \alpha 06 \cdot B06 \quad (9)$$

$$C07 = \sum_{i=1}^{1} Fi + \alpha 07 \cdot B07 \quad (10)$$

Similarly, the tenth through twelfth pixels from the left in the frame #n+1 belong to the mixed region. The pixel value of the tenth pixel from the left in the frame #n +1 may be represented by Expression (11). Similarly, the pixel value of the eleventh pixel from the left in the frame #n+1 may be represented by Expression (12), and the pixel value of the twelfth pixel from the left in the frame #n+1 may be represented by Expression (13).

$$N09 = \sum_{i=1}^{3} Fi + \alpha 09 \cdot B09 \quad (11)$$

$$N10 = \sum_{i=1}^{2} Fi + \alpha 10 \cdot B10 \quad (12)$$

$$N11 = \sum_{i=1}^{1} Fi + \alpha 11 \cdot B11 \quad (13)$$

Figure 50:
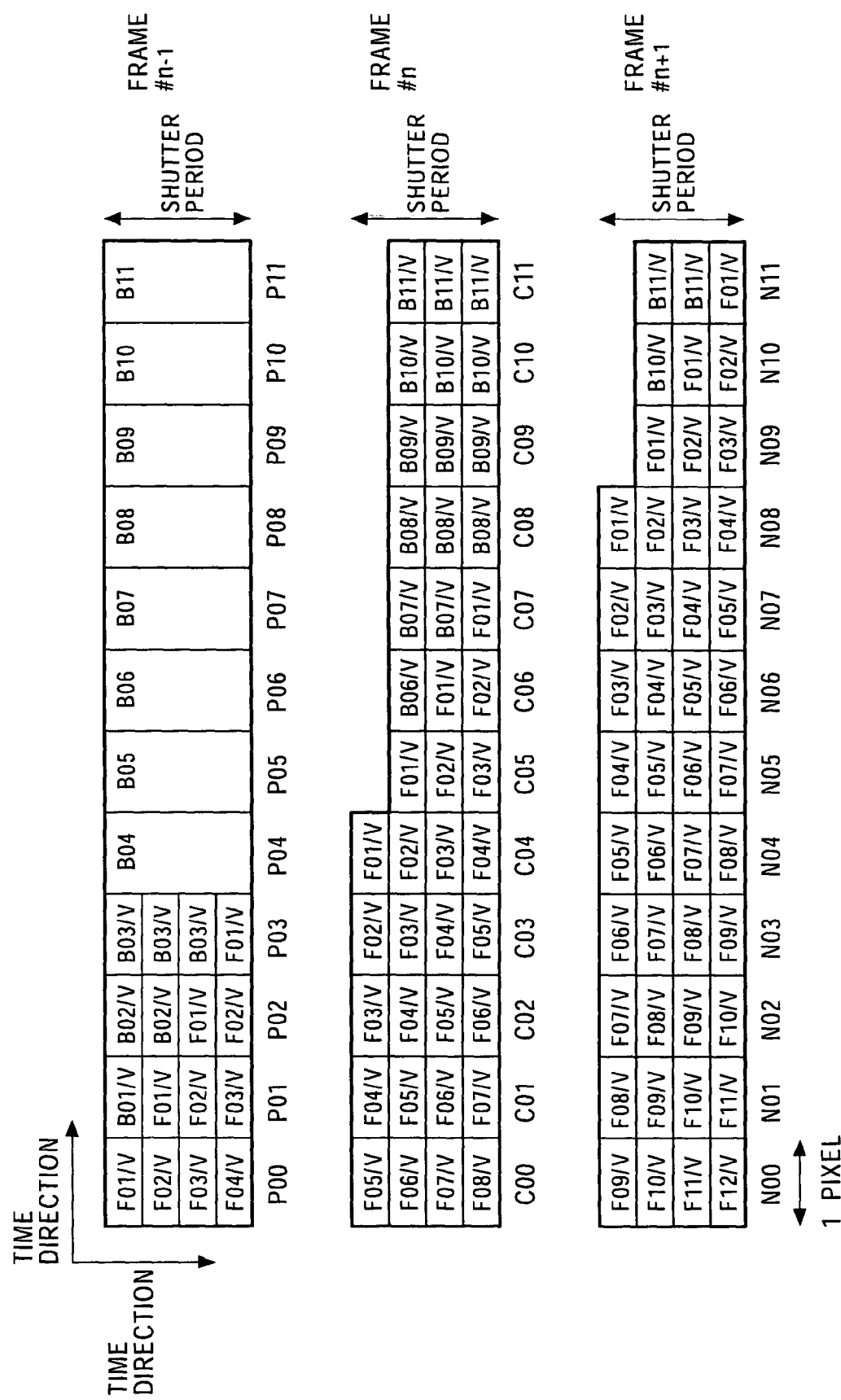
FIG. 50 is a model diagram describing weighted difference.

In Expression (8), α05 is ¼. In the event that the pixel value of the frame #n−1 is multiplied by α05, and the difference between the product and the pixel value of the corresponding pixel which belongs to the mixed region or the background region in the frame #n, is calculated, all or a portion of the background components included in the pixel value are removed, as shown in FIG. 50.

In the sixth pixel from the left, all the background components included in the pixel value are removed, and only the foreground components are left.

Similarly, in Expression (11), α09 is ¼. In the event that the pixel value of the frame #n is multiplied by α09, and the difference between the product and the pixel value of the corresponding pixel which belongs to the mixed region in the frame #n+1, is calculated, all or part of the background components included in the pixel value are removed, as shown in FIG. 50.

In the tenth pixel from the left, all the background components included in the pixel value is removed, and only the foreground components are left.

Figure 51:
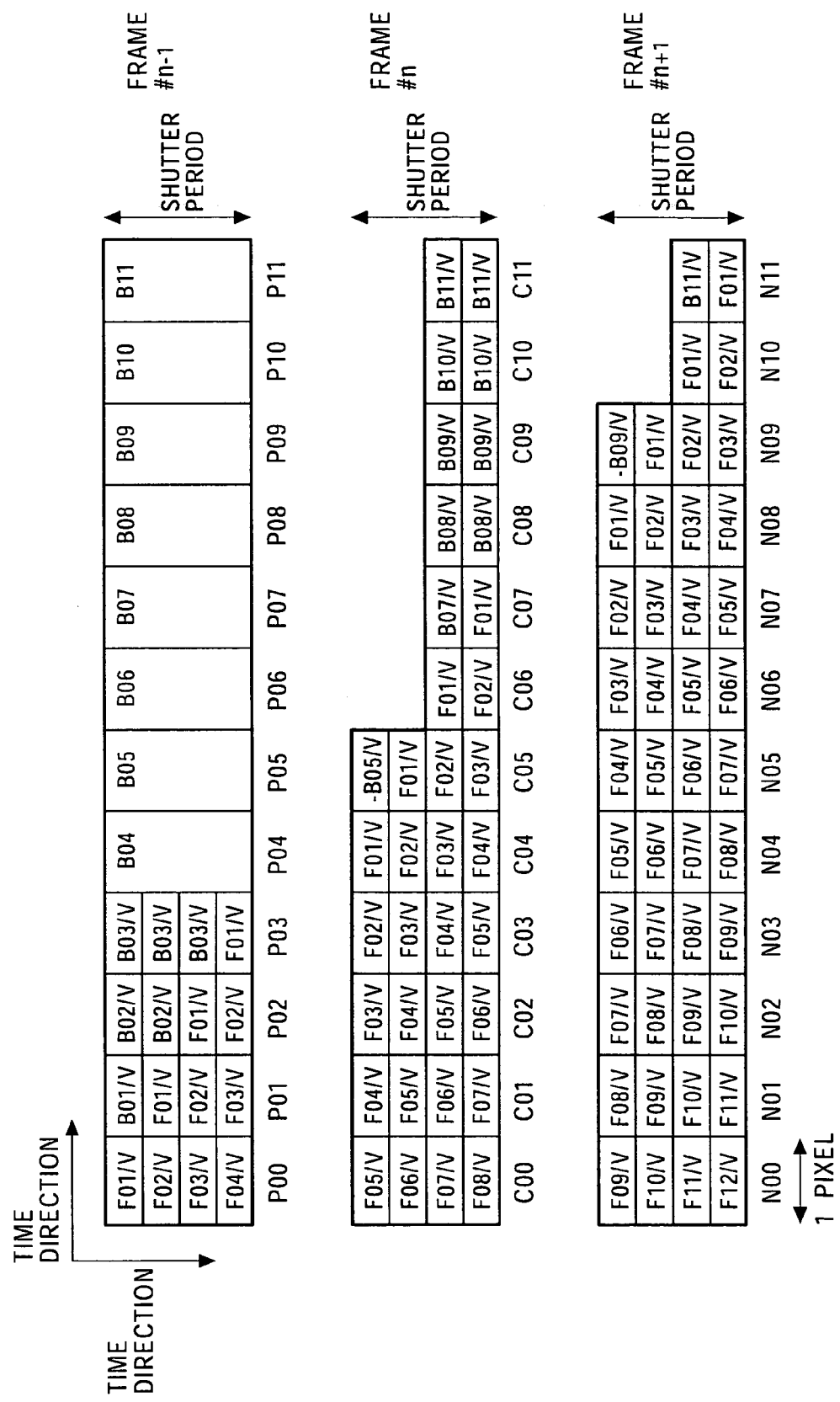
FIG. 51 is a model diagram describing weighted difference.

In Expression (9), α06 is ½. In the event that the pixel value of the frame #n−1 is multiplied by α06, and the difference between the product and the pixel value of the corresponding pixel which belongs to the mixed region or the background region in the frame #n, is calculated, all or a portion of the background components included in the pixel value are removed, as shown in FIG. 51. In the sixth pixel from the left, the pixel value includes the negative value of the corresponding background components, since the background components which are equal to or more than the actual background components are subtracted.

In the seventh pixel from the left, all the background components included in the pixel value is removed, and only the foreground components are left.

In Expression (12), α10 is ½. In the event that the pixel value of the frame #n is multiplied by α10, and the difference between the product and the pixel value of the corresponding pixel which belongs to the mixed region in the frame #n+1, is calculated, all or a portion of the background components included in the pixel value are removed as shown in FIG. 51. In the tenth pixel from the left, since the background components which are equal to or more than the actual background components are subtracted, the pixel value includes the negative value of the corresponding background components.

In the eleventh pixel from the left, all the background components included in the pixel value is removed, and only the foreground components are left.

Figure 52:
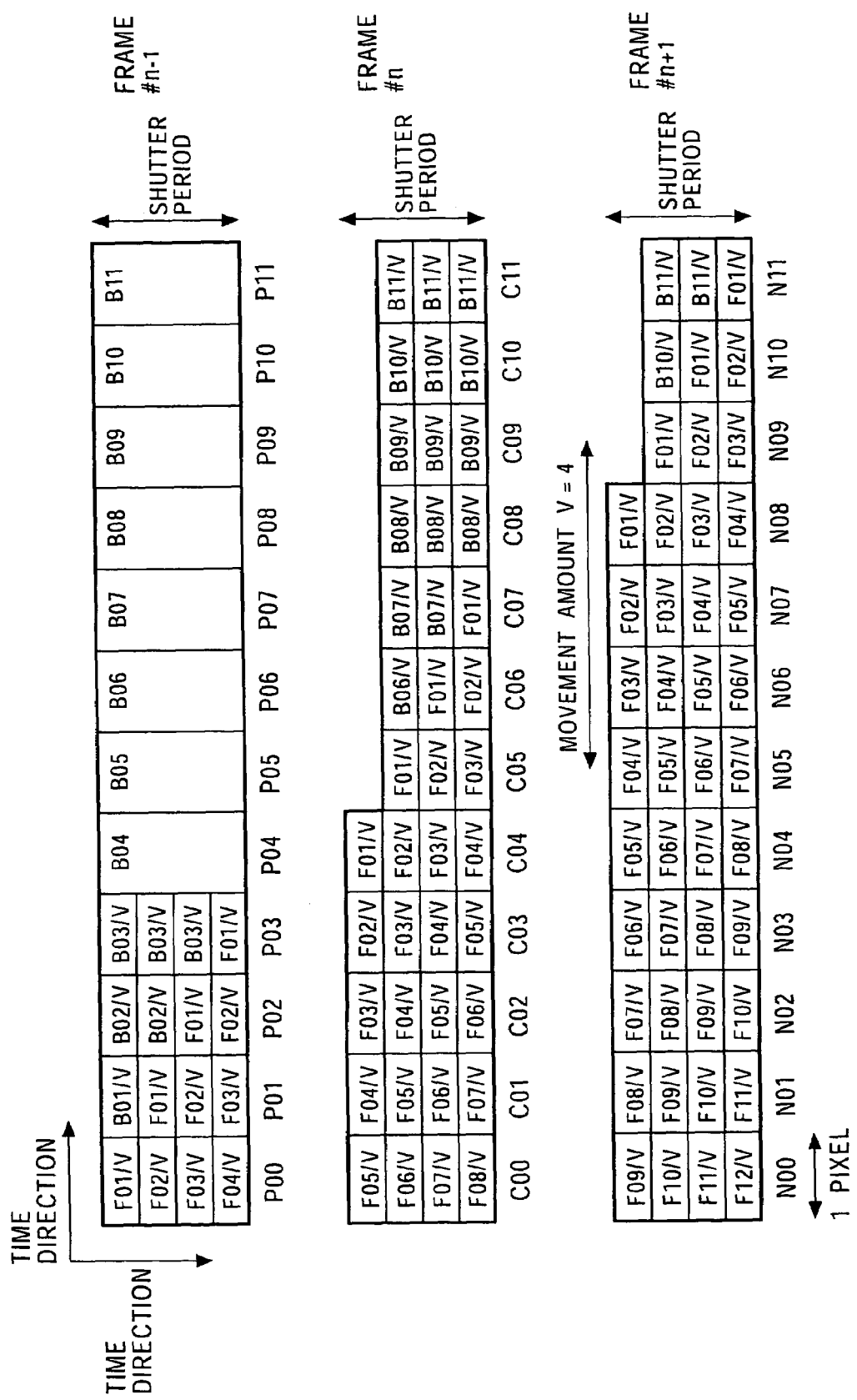
FIG. 52 is a model diagram describing the relation between weighted difference and movement vectors.

As shown in FIG. 52, in the event that the pixel value of the previous frame is multiplied by α05, and the difference between the product and the pixel value of the corresponding pixel which belongs to the mixed region or the background region in the following frame, only the foreground components are left in the sixth pixel from the left in the frame #n, and also, in the tenth pixel from the left in the frame #n+1, indicated by the movement vector with the sixth pixel from the left in the frame #n as a reference, only the foreground components are left.

The foreground components included in the sixth pixel from the left in the frame #n are the same as the foreground components included in the tenth pixel from the left in the frame #n+1.

Similarly, in the event that the pixel value of the previous frame is multiplied by α06, and the difference between the product and the pixel value of the corresponding pixel which belongs to the mixed region or the background region in the following frame, only the foreground components are left in the seventh pixel from the left in the frame #n, and also, in the eleventh pixel from the left in the frame #n+1, indicated by the movement vector with the seventh pixel from the left in the frame #n as a reference, only the foreground components are left.

The foreground components included in the seventh pixel from the left in the frame #n are the same as the foreground components included in the eleventh pixel from the left in the frame #n+1.

As described above, in a case wherein the pixel value of the frame #n−1 is multiplied by a certain weight, the difference between the product and the pixel value of the corresponding pixel belonging to the mixed region in the frame #n is calculated, and the difference between the product and the pixel value of the corresponding pixel in the mixed region in the frame #n+1 is obtained, in the event that the difference corresponding to the pixel of interest in the frame #n and the difference corresponding to the pixel at the position indicated by the movement vector with the pixel of interest as a reference in the frame #n+1, are the same, the weight is the same as the mixture ratio α of the pixel of interest in the frame #n.

Figure 53:
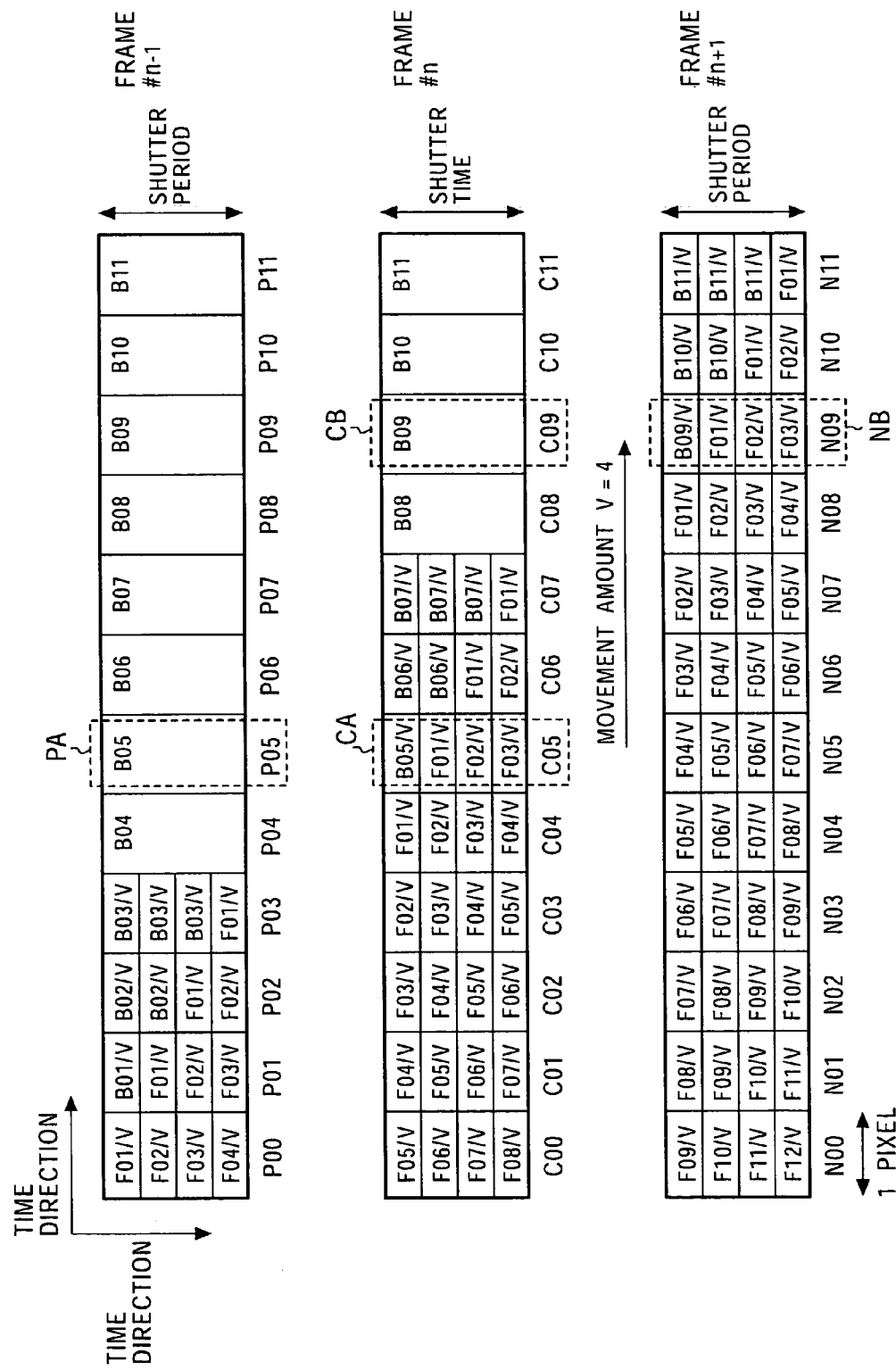
FIG. 53 is a model diagram describing computation of correlation value.

The above processing will be described with reference to an expression, with reference to FIG. 53.

The difference A between the pixel value CA of the pixel of interest belonging the mixed region in the frame #n and the value wherein the pixel value PA of the corresponding pixel of the frame #n−1 is multiplied by the weight W, are calculated by the computation represented by Expression (14).

$$A = CA - PA \times W \quad (14)$$

The difference B between the pixel value NB of the pixel of the frame #n+1 at the position indicated by the movement vector with the pixel of the interest in the frame #n as a reference and the value wherein the pixel value CB of the corresponding pixel in the frame #n is multiplied by the weight W, is calculated by the computation represented by Expression (15).

$$B = NB - CB \times W \quad (15)$$

The correlation value J may be, for example, the absolute value of the difference between the difference A and the difference B as represented by Expression (16).

$$J = |A - B| \quad (16)$$

In the event that judgment is made that the correlation value J is equal to or less than the threshold value th1 stored beforehand, the weight W is judged to be the same as the mixture ratio α.

Also, an arrangement may be made wherein, for example, the correlation value J1 corresponding to the center pixel of a block in the frame of interest is calculated by applying Expression (17) to the differences A0 through A8 of a block 3×3 pixels wherein A4 is centered in the frame of interest as shown in FIG. 54A and the differences B0 through B8 of a block 3×3 pixels wherein the corresponding B4 is centered in the frame following the frame of interest as shown in FIG. 54B.

$$J1 = \frac{\sum_{i=0}^{8}(Ai - \overline{A})\sum_{i=0}^{8}(Bi - \overline{B})}{\sqrt{\sum_{i=0}^{8}(Ai - \overline{A})^2 \cdot \sum_{i=0}^{8}(Bi - \overline{B})^2}} \quad (17)$$

$$\overline{A} = \frac{\sum_{i=0}^{8} Ai}{9} \quad (18)$$

$$\overline{B} = \frac{\sum_{i=0}^{8} Bi}{9} \quad (19)$$

In this case, for example, in the event that judgment is made that the correlation value J1 is equal to or more than the threshold th2 stored beforehand, the weight W is judged to be the same as the mixture ratio α.

Moreover, an arrangement may be made wherein, for example, the sum of absolute value of difference J2 is calculated as the correlation value corresponding to the center pixel of the block in the frame of interest by applying Expression (20) to the differences A0 through A8 of a block 3×3 pixels wherein A4 is centered in the frame of interest and the differences B0 through B8 of a block 3×3 pixels wherein corresponding B4 is centered in the frame following the frame of interest.

$$J2 = \sum_{i=0}^{8} |(Ai - Bi)| \qquad (20)$$

In this case, for example, in the event that judgment is made that the sum of absolute value of difference J2 is less than the threshold th3 stored beforehand, the weight W is judged to be the same as the mixture ratio α.

The processing corresponding to the uncovered background region, which is performed by the estimated mixture ratio processing unit 402, is the same as the processing corresponding to the covered background region, except for the processing wherein the difference A is the difference between the pixel value CA of the pixel of interest belonging to the mixed region in the frame #n and the value wherein the pixel value PA of the corresponding pixel in the frame #n+1 is multiplied by the weight W, and the difference B is the difference between the pixel value NB of the pixel in the frame #n+1 at the position indicated by the movement vector with the pixel of interest in the frame #n as a reference and the value wherein the pixel value CB of the corresponding pixel in the frame #n+2 is multiplied by the weight W, and accordingly description thereof will be omitted.

Note that an arrangement may be made wherein the estimated mixture ratio processing unit 401 or the estimated mixture ratio processing unit 401 calculates the difference B based upon the pixel in the frame #n−1 at the position indicated by the movement vector corresponding to the pixel of interest in the frame #n, for calculating the estimated mixture ratio.

Figure 55:
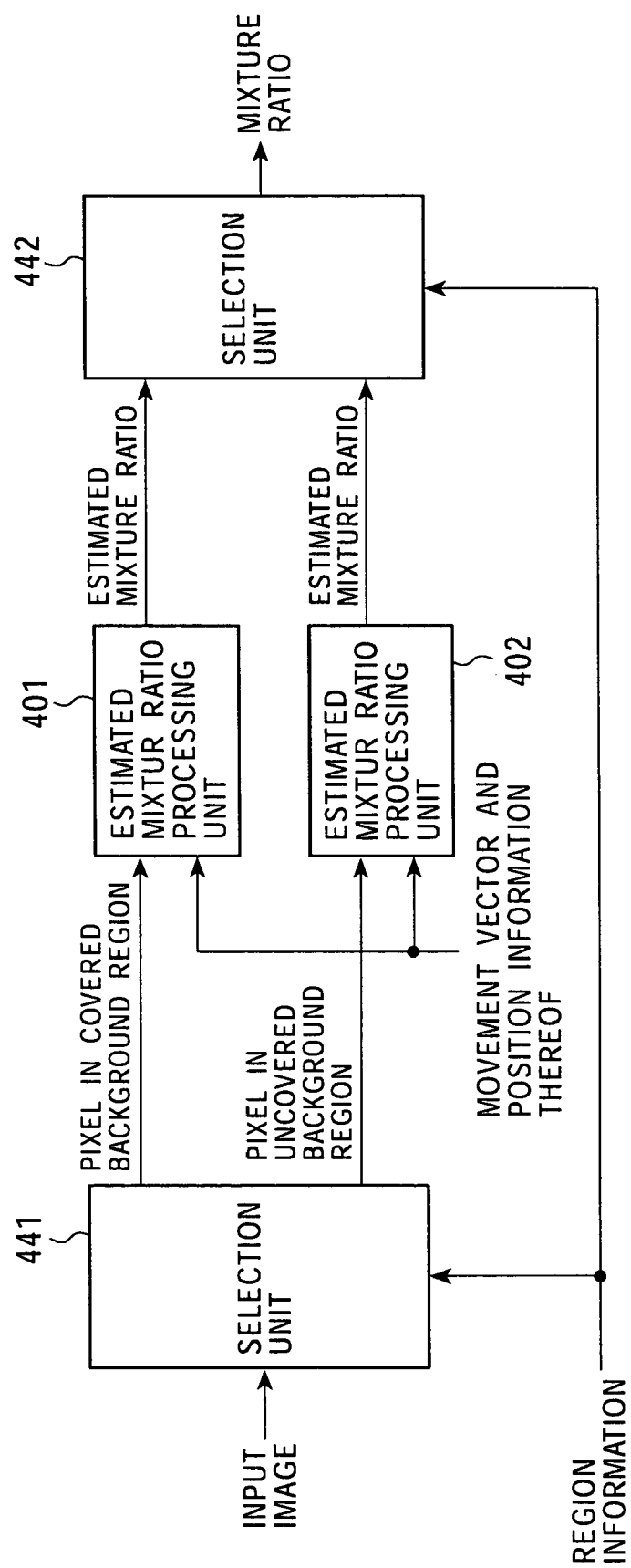
FIG. 55 is a block diagram illustrating another configuration of a mixture ratio calculating unit 104.

FIG. 55 is a block diagram which illustrates a different structure of the mixture ratio calculating unit 104.

The selecting unit 441 supplies the pixels belonging to the covered background region and the pixels corresponding thereto in the previous and following frame, to the estimated mixture ratio processing unit 401. The selecting unit 441 supplies the pixels belonging to the uncovered background region and the pixels corresponding thereto in the previous and following frame, to the estimated mixture ratio processing unit 402.

The estimated mixture ratio processing unit 401 calculates the estimated mixture ratio of the pixel of interest belonging to the covered background region based on the pixel values input from the selecting unit 441, and supplies the calculated estimated mixture ratio to a selecting unit 442.

The estimated mixture ratio processing unit 402 calculates the estimated mixture ratio of the pixel of interest belonging to the uncovered background region based upon the pixel values input from the selecting unit 441, and supplies the calculated estimated mixture ratio to the selecting unit 442.

In the event that the pixel which is the object belongs to the foreground region, the selecting unit 442 selects an estimated mixture ratio of 0 based upon the region information supplied from the region specifying unit 103, and sets the mixture ratio α thereto, and in the event that the pixel which is the object belongs to the background region, the selecting unit 442 selects an estimated mixture ratio of 1, and sets the mixture ratio α thereto. In the event that the pixel which is the object belongs to the covered background region, the selecting unit 442 selects the estimated mixture ratio supplied from the estimated mixture ratio processing unit 401, and sets the mixture ratio α thereto, and in the event that the pixel which is the object belongs to the uncovered background region, the selecting unit 442 selects the estimated mixture ratio supplied from the estimated mixture ratio processing unit 402, and sets the mixture ratio α thereto. The selecting unit 442 outputs the mixture ratio α which is selected and set based upon the region information.

As described above, a mixture ratio calculating unit 104 having a different structure such as shown in FIG. 55 can calculate the mixture ratio α for each pixel included in the image, and output the calculated mixture ratio α.

The calculation processing of the mixture ratio α by the mixture ratio calculating unit 104 will now be described with reference to the flowchart shown in FIG. 56.

In Step S401, the mixture ratio calculating unit 104 acquires the region information supplied from the region specifying unit 103. In Step S402, the estimated mixture ratio processing unit 401 performs processing of mixture ratio estimation corresponding to the covered background region, and supplies the estimated mixture ratio to the mixture ratio to the mixture ratio determination unit 403. A detailed description of the processing of mixture ratio estimation will be made later with reference to the flowchart shown in FIG. 57.

In Step S403, the estimated mixture ratio processing unit 402 performs the processing of mixture ratio estimation corresponding to the uncovered background region, and supplies the estimated mixture ratio to the mixture ratio determination unit 403.

In Step S404, the mixture ratio calculating unit 104 judges whether or not the mixture ratio has been estimated for the entire frame, and in the event that judgment is made that the mixture ratio has not been estimated for the entire frame, the flow returns to Step S402, and the processing for estimating mixture ratio for the following the pixel.

In Step S404, in the event that judgment is made that the mixture ratio has been estimated for the entire frame, the flow proceeds to Step S405, and the mixture ratio determination unit 403 sets the mixture ratio α based upon the region information which indicates which of the foreground region, the background region, the covered background region, or the uncovered background region, the pixel which is the object of calculation of the mixture ratio α and is supplied from the region specifying unit 103, belongs to. In the event that the pixel which is the object belongs to the foreground region, the mixture ratio determination unit 403 sets the mixture ratio α to 0, in the event that the pixel which is the object belongs to the background region, sets the mixture ratio α to 0, in the event that the pixel which is the object belongs to the covered background region, sets the mixture ratio α to the estimated mixture ratio supplied from the estimated mixture ratio processing unit 401, and in the event that the pixel which is the object belongs to the uncovered background region, sets the mixture ratio α to the estimated mixture ratio supplied from the estimated mixture ratio processing unit 402, and the processing ends.

As described above, the mixture ratio calculating unit 104 can calculate the mixture ratio α which is the amount of features corresponding to each pixel based upon the region information and the input image supplied from the region specifying unit 103.

Using the mixture ratio α enables the separation of the foreground components and the background components contained in a pixel value while leaving the movement blurring information included in the image corresponding to the moving object.

Figure 56:
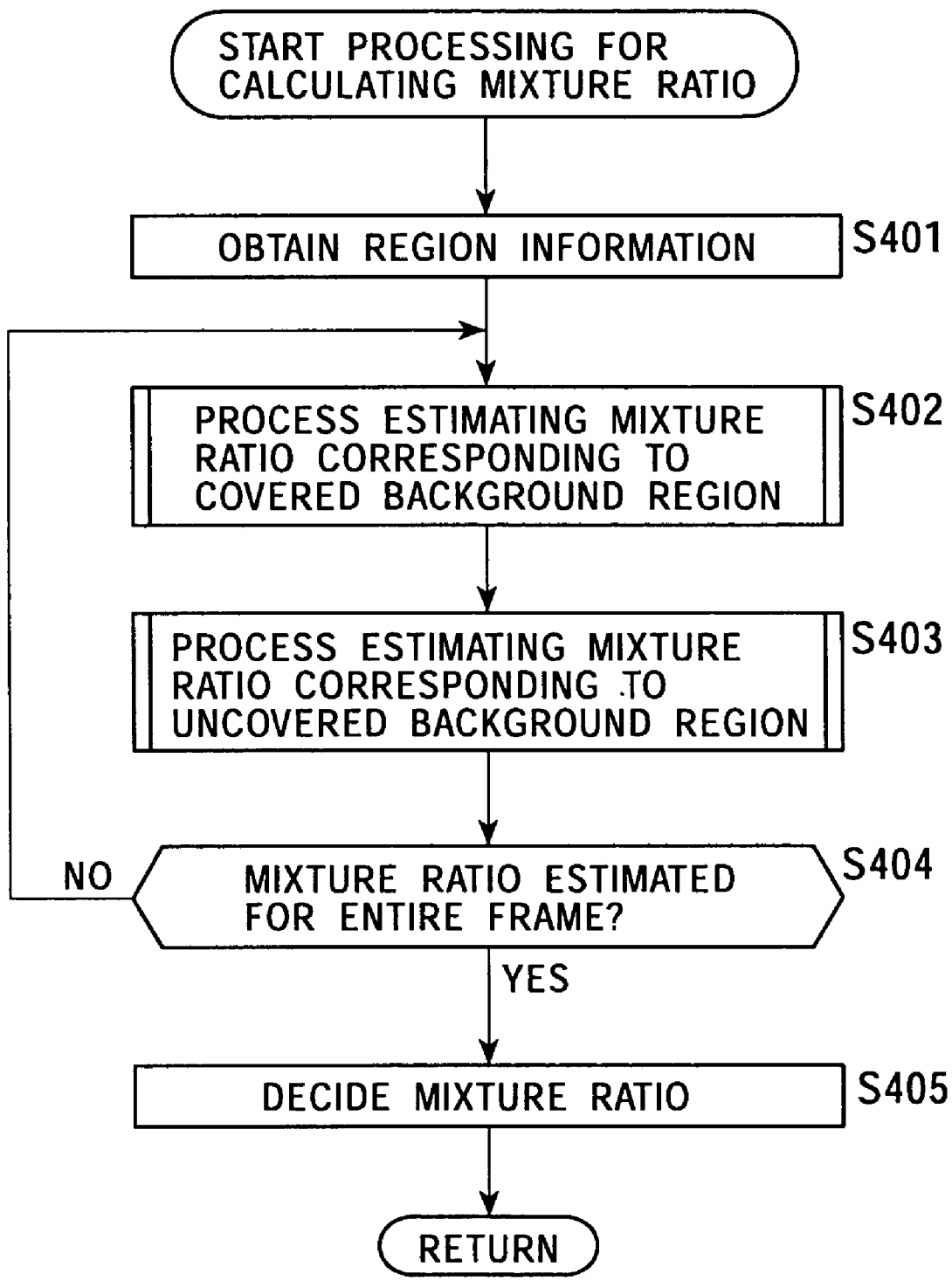
FIG. 56 is a flowchart describing the processing for calculating the mixture ratio.
Figure 57:
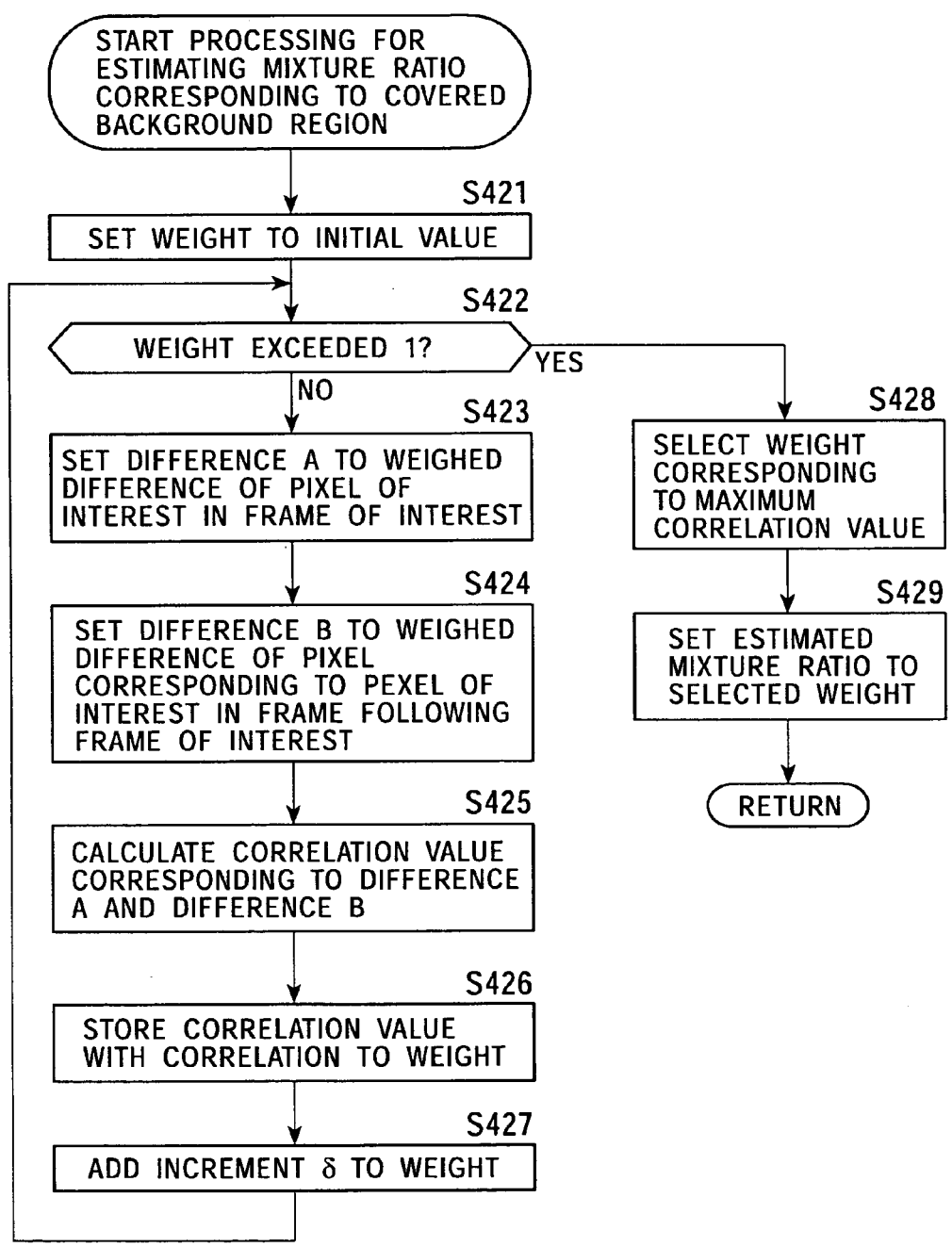
FIG. 57 is a flowchart describing processing for mixture ratio estimation corresponding to a covered background region.

Referring to the flowchart shown in FIG. 57, the mixture ratio estimation processing corresponding to the covered background region corresponding to Step S402 shown in FIG. 56 will be now described.

In Step S421, the weight generating unit 422 sets the weight to the initial value stored beforehand. The weight generating unit 422 supplies the weight which is set to the initial value as weighting information to the weighted frame difference computing unit 423 and the maximum value judgment unit 427.

In Step S422, the estimated mixture ratio processing unit 401 judges whether or not the weight output from the weight generating unit 422 exceeds 1, and in the event that the weight is judged not to exceed 1, the flow proceeds to Step S423.

In Step 423, the weighted frame difference computing unit 423 calculates the weighed difference which is the difference between the pixel value of the pixel of interest in the frame of interest and the value wherein the pixel value of the corresponding pixel in the following frame is multiplied by the weight, and sets the difference A to the weighted difference of the pixel of interest in the frame of interest.

In Step S424, the weighted frame difference computing unit 423 calculates the weighted difference which is the difference between the pixel value of the pixel in the frame following the frame of interest at the position indicated by the movement vector with the pixel of interest in the frame of interest as a reference, and the value wherein the pixel value of the corresponding pixel in the frame of interest is multiplied by the weight, and sets the difference B to the weighted difference of the pixel corresponding to the pixel of interest in the frame following the frame of interest.

In Step S425, the correlation value computing unit 426 calculates the correlation value corresponding to the difference A and the difference B. The correlation value calculated by the correlation value computing unit 426 may be, for example, the absolute value of the difference between the difference A and the difference B. Also, the correlation value calculated by the correlation value computing unit 426 may be, for example, the correlation value J1 wherein the computation corresponding to Expression (17) is applied to the weighted differences of the block 3×3 pixels A0 through A8, and the weighted differences of the corresponding block 3×3 pixels B0 through B8.

In Step S426, the maximum value judgment unit 427 stores the correlation value supplied from the correlation value computing unit 426, in a manner correlating with the weight supplied from the weight generating unit 422.

In Step S427, the weight generating unit 422 adds the increment δ stored beforehand to the weight, the flow returns to Step S422, and the flow repeats the calculation processing of the correlation value corresponding to the weight.

That is to say, in the event that the weight is equal to or less than 1, the processing of Step S423 through Step S427 is repeated, the correlation value corresponding to the weight which increases in increment of δ is calculated, and the correlation value is stored in a manner correlated with the weight.

In the event that in Step S422, judgment is made that the weight exceeds 1, the flow proceeds to Step S428, and the maximum value judgment unit 427 selects the weight corresponding to the maximum correlation value indicating the greatest correlation.

In Step S429, the maximum value judgment unit 427 sets the estimated mixture ratio to the selected weight, outputs the estimated mixture ratio which is set to the weight, and the processing ends.

As described above, the estimated mixture ratio processing unit 401 can calculate the estimated mixture ratio corresponding to the covered background region.

Note that the processing corresponding to the uncovered background region in Step S403 is the same as the processing described with reference to the flowchart shown in FIG. 57 except for the processing wherein the pixel values of the following frame are used as the pixel value corresponding to the background in the calculation processing of the difference A and the difference B, and accordingly description thereon will be omitted.

Also, while description has been made under the assumption that the object corresponding to the background keeps still, the calculation processing of the mixture ratio described above may be applied even if the image corresponding to the background contains movement. For example, in the event that the image corresponding to the background moves in a constant manner, the estimated mixture ratio processing unit 401 shifts the entire image corresponding to the movement, and performs processing in the same manner as the case wherein the object corresponding to the background keeps still. Also, in the event that the image corresponding to the background is made up of portions each of which has different movement, the estimated mixture ratio processing unit 401 selects the pixel corresponding to the movement as the pixel corresponding to the pixel belonging to the mixed region, and performs the above-described processing.

Note that an arrangement may be made wherein the mixture ratio calculating unit 104 performs only the mixture ratio estimation processing by a model corresponding to the covered background region for all pixels, and outputs the calculated estimated mixture ratio as the mixture ratio α. In this case, the mixture ratio α represents the ratio of the background components for the pixel belonging to the covered background region, and represents the ratio of the foreground components for the pixel belonging to the uncovered background region. In the event that the absolute value of the difference between the mixture ratio α which is calculated for the pixel belonging to the uncovered background region as described above, and 1, and the calculated absolute value is set for the mixture ratio α, the signal processing device can calculate the mixture ratio α indicating the ratio of the background components for the pixel belonging to the uncovered background region.

Note that similarly, an arrangement may be made wherein the mixture ratio calculating unit 104 performs only the mixture ratio estimation processing by a model corresponding to the uncovered background region for all pixels, and outputs the calculated estimated mixture ratio as the mixture ratio α.

Figure 58:
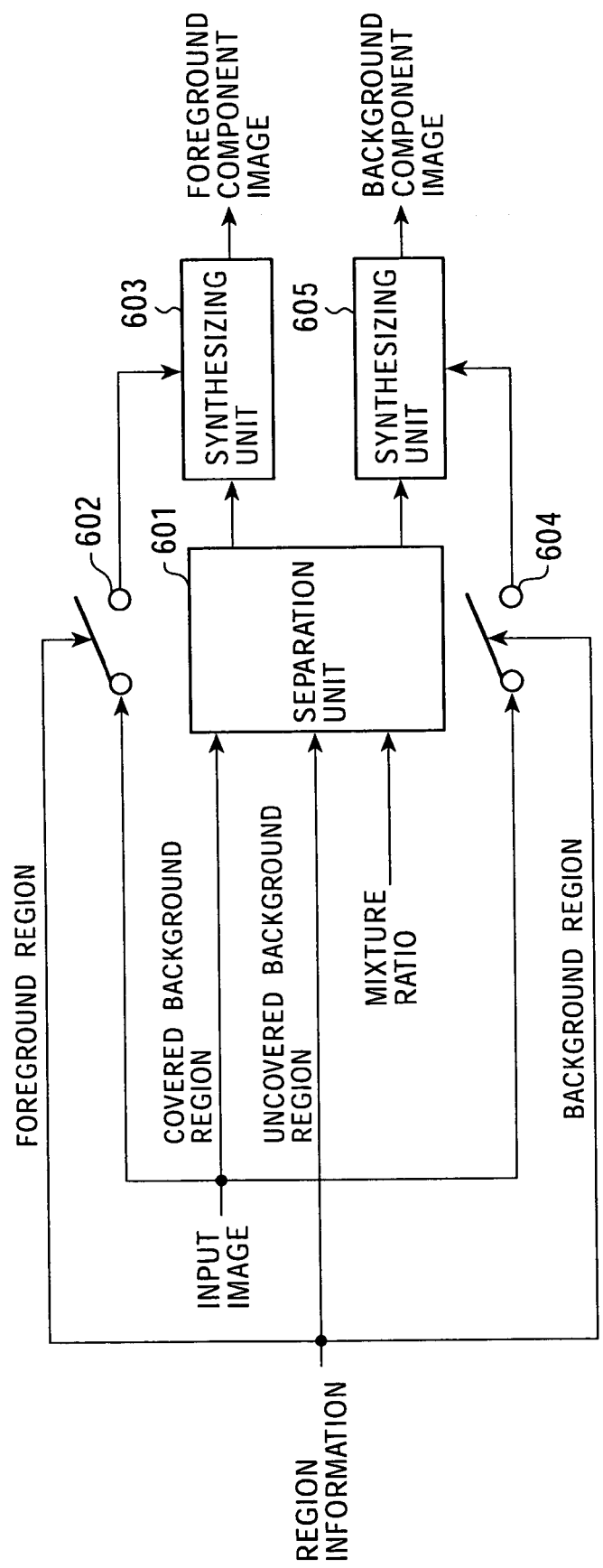
FIG. 58 is a block diagram illustrating an example of the configuration of a foreground/background separation unit 105.

The foreground/background separation unit 105 will now be described. FIG. 58 is a block diagram which illustrates one example of the structure of the foreground/background separation unit 105. The input image supplied to the foreground/background separation unit 105 is supplied to a separation unit 601, a switch 602, and a switch 604. The information indicating the covered background region, and the information indicating the uncovered background region, which is supplied from the region specifying unit 103 is supplied to the separation unit 601. The information indicating the foreground region is supplied to the switch

602. The region information indicating the background region is supplied to the switch 604.

The mixture ratio α supplied from the mixture ratio calculating unit 104 is supplied to the separation unit 601.

The separation unit 601 separates the foreground components from the input image based upon the region information indicating the covered background region, the region information indicating the uncovered background region, and the mixture ratio α, and supplies the separated foreground components to a synthesizing unit 603, as well as separating the background components from the input image, and supplying the separated background components to the synthesizing unit 605.

In the event that the pixel corresponding to the foreground is input, the switch 602 is closed based upon the region information indicating the foreground region, and supplies only the pixels corresponding to the foreground included in the input image to the synthesizing unit 603.

In the event that the pixel corresponding to the background is input, the switch 604 is closed based upon the region information indicating the background region, and supplies only the pixels corresponding to the background included in the input image to the synthesizing unit 605.

The synthesizing unit 603 synthesize the foreground component image based upon the components corresponding to the foreground supplied from the separation unit 601, and the pixel corresponding to the foreground supplied from the switch 602, and outputs the synthesized foreground component image. Since the foreground region and the mixed region are not overlapped, the synthesizing unit 603 synthesizes the foreground component image, for example, by applying the logical sum computation to the components corresponding to the foreground, and the pixel corresponding to the foreground.

In the initialization processing which is performed in the first stage of the foreground component image synthesizing processing, the synthesizing unit 603 stores the image wherein all the pixel values are 0 in built-in frame memory, and in the foreground component image synthesizing processing, the synthesizing unit 603 stores (or overwrites) the foreground component image. Accordingly, the pixel corresponding to the background region, which is the foreground component image output from the synthesizing unit 603, stores 0 as a pixel value.

The synthesizing unit 605 synthesizes the background component image based upon the components corresponding to the background supplied from the separation unit 601, and the pixels corresponding to the background supplied from the switch 604, and outputs the synthesized background component image. Since the background region and the mixed region are not overlapped, the synthesizing unit 605 synthesizes the background component image, for example, by applying the logical sum computation to the components corresponding to the background, and the pixel corresponding to the background.

In the initialization processing which is performed in the first stage of the background component image synthesizing processing, the synthesizing unit 605 stores the image wherein all the pixel values are 0 in built-in frame memory, and in the background component image synthesizing processing, the synthesizing unit 605 stores (or overwrites) the background component image. Accordingly, the pixel corresponding to the foreground region, which is the background component image output from the synthesizing unit 605, stores 0 as a pixel value.

Figure 59B:
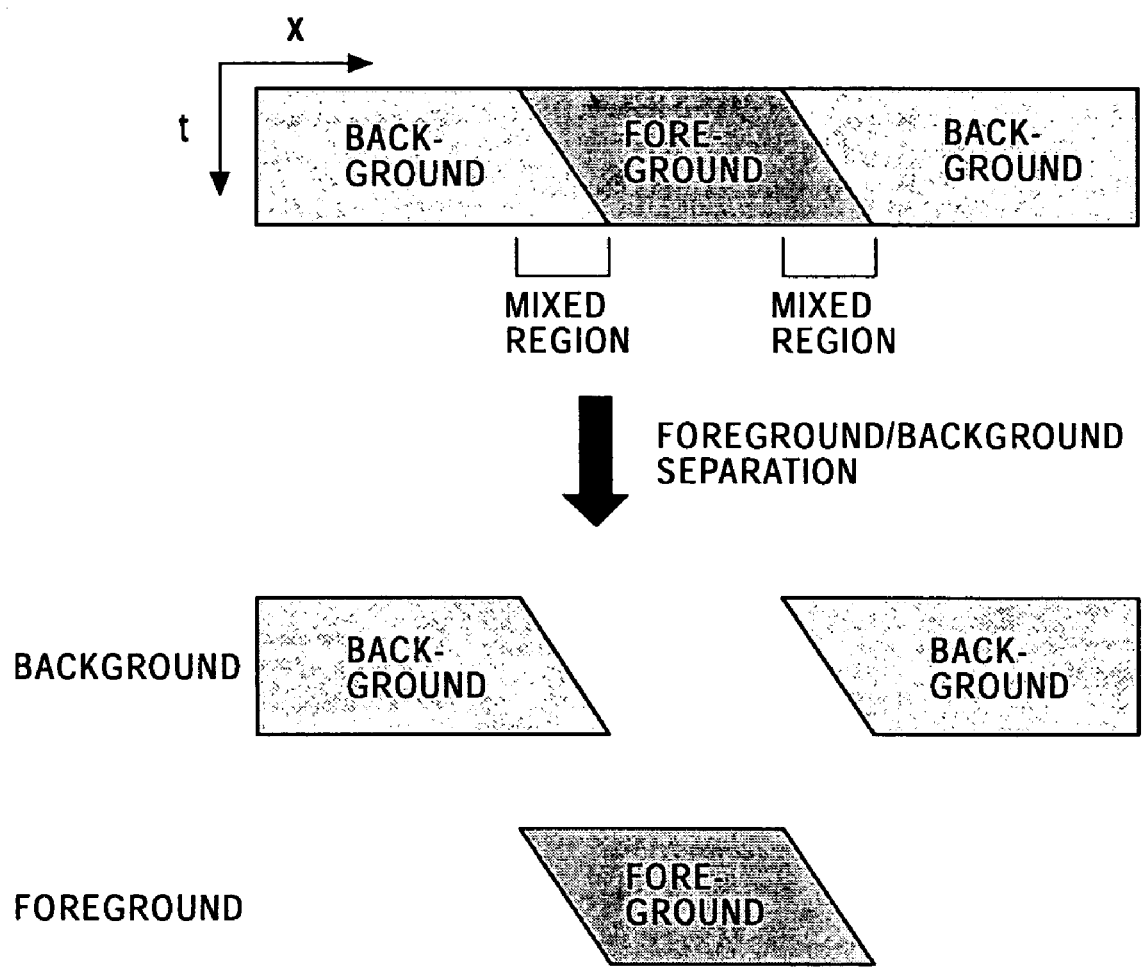
FIG. 59B is a diagram illustrating a model which develops, over the time direction, one line of pixels containing pixels belonging to the foreground region corresponding to FIG. 59A, pixels belonging to the background region, and pixels belonging to the mixed region.

FIG. 59A and FIG. 59B are diagrams which illustrate the input image input to the foreground/background separation unit 105, and the foreground component image and the background component image output from the foreground/background separation unit 105.

FIG. 59A is a schematic diagram of the displayed image, and FIG. 59B is a model diagram wherein pixels on one line including pixels belonging to the foreground, pixels belonging to the background region, and the pixels belonging to the mixed region, develop over the time direction.

As shown in FIG. 59A and FIG. 59B, the background component image output from the foreground/background separation unit 105 is made up of the pixels belonging to the background region, and the background components included in the pixels in the mixed region.

As shown in FIG. 59A and FIG. 59B, the foreground component image output from the foreground/background separation unit 105 is made up of the pixels belonging to the foreground region, and the foreground components included in the pixels in the mixed region.

The pixel value of the pixel in the mixed region is separated into the background components and the foreground components by the foreground/background separation unit 105. The separated background components make up the background component image along with the pixels belonging to the background region. The separated foreground components make up the foreground component image with the pixels belonging to the foreground region.

As described above, in the foreground component image, the pixel values of the pixels corresponding to the background region are set to 0, and the pixels corresponding to the foreground region and the pixels corresponding to the mixed region are set to valid pixel values. Similarly, in the background component image, the pixel values of the pixels corresponding to the foreground region are set to 0, and the pixels corresponding to the background region and the pixels corresponding to the mixed region are set to valid pixel values.

A description will now be made regarding the separation processing of the foreground components and the background components from the pixel belonging to the mixed region performed by the separation unit 601.

Figure 60:
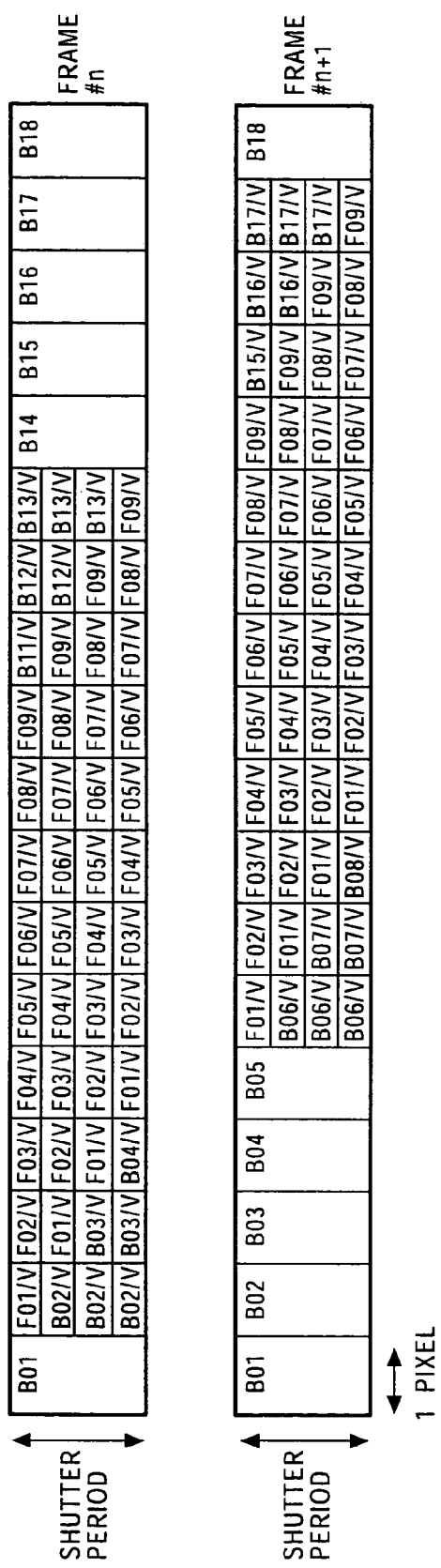
FIG. 60 is a model diagram wherein the pixel values are developed over the time direction, and periods corresponding to shutter time are divided.

FIG. 60 is a model of an image which indicates two frames of the foreground components and the background components, including the foreground corresponding to the object which moves from the left to the right in the drawing. In the model of the image shown in FIG. 60, the movement amount v of the foreground is 4, and the virtual dividing number is 4.

In the frame #n, the left-most pixel and the fourteenth through eighteenth pixels from the left are made up of only the background components, and belong to the background region. In the frame #n, the second through fourth pixels from the left are made up of the background components and the foreground components, and belong to the uncovered background region. In the frame #n, the eleventh through thirteenth pixels from the left are made up of the background components and the foreground components, and belong to the covered background region. In the frame #n, the fifth through tenth pixels from the left are made up of only the foreground components, and belong to the foreground region.

In the frame #n+1, the first through fifth pixels and the eighteenth pixel from the left are made up of only the background components, and belong to the background region. In the frame #n+1, the sixth through eighth pixels from the left are made up of the background components and foreground components, and belong to the uncovered background region. In the frame #n+1, the fifteenth through seventeenth pixels are made up of the background components and foreground components, and belong to the covered background region. In the frame #n+1, the ninth through fourteenth pixels are made up of only the foreground components, and belong to the foreground region.

Figure 61:
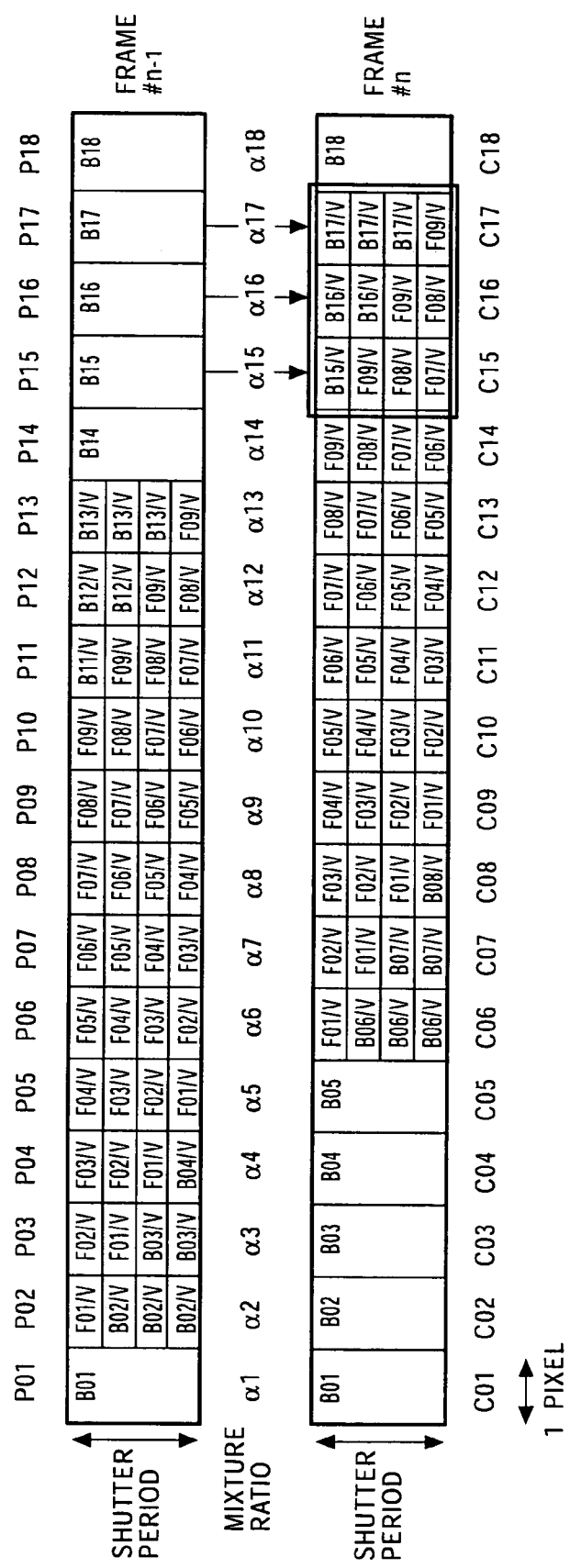
FIG. 61 is a model diagram wherein the pixel values are developed over the time direction, and periods corresponding to shutter time are divided.

FIG. 61 is a diagram which describes the processing for separating the foreground components from the pixel belonging to the covered background region. In FIG. 61, α1 through α18 represent mixture ratios corresponding to the pixels in the frame #n, respectively. In FIG. 61, the fifteenth through seventeenth pixels from the left belong to the covered background region.

The pixel value C15 of the fifteenth pixel from the left in the frame #n is represented in Expression (21).

$$C15 = B15/v + F09/v + F08/v + F07/v \qquad (21)$$
$$= \alpha15 \cdot B15 + F09/v + F08/v + F07/v$$
$$= \alpha15 \cdot P15 + F09/v + F08/v + F07/v$$

Here, α15 denotes the mixture ratio of the fifteenth pixel from the left in the frame #n. P15 denotes the pixel value of the fifteenth pixel from the left in the frame #n−1.

The sum f15 of the foreground components of the fifteenth pixel from the left in the frame #n is represented in Expression (22) based upon Expression (21).

$$f15 = F09/v + F08/v + F07/v \qquad (22)$$
$$= C15 - \alpha15 \cdot P15$$

Similarly, the sum f16 of the foreground components of the sixteenth pixel from the left in the frame #n is represented in Expression (23), and the sum f17 of the foreground components of the seventeenth pixel from the left in the frame #n is represented in Expression (24).

$$f16 = C16 - \alpha16 \cdot P16 \qquad (23)$$

$$f17 = C17 - \alpha17 \cdot P17 \qquad (24)$$

As described above, the foreground component fc included in the pixel value C of the pixel belonging to the covered background region is calculated by Expression (25).

$$fc = C - \alpha \cdot P \qquad (25)$$

P denotes the pixel value of the corresponding pixel in the previous frame.

Figure 62:
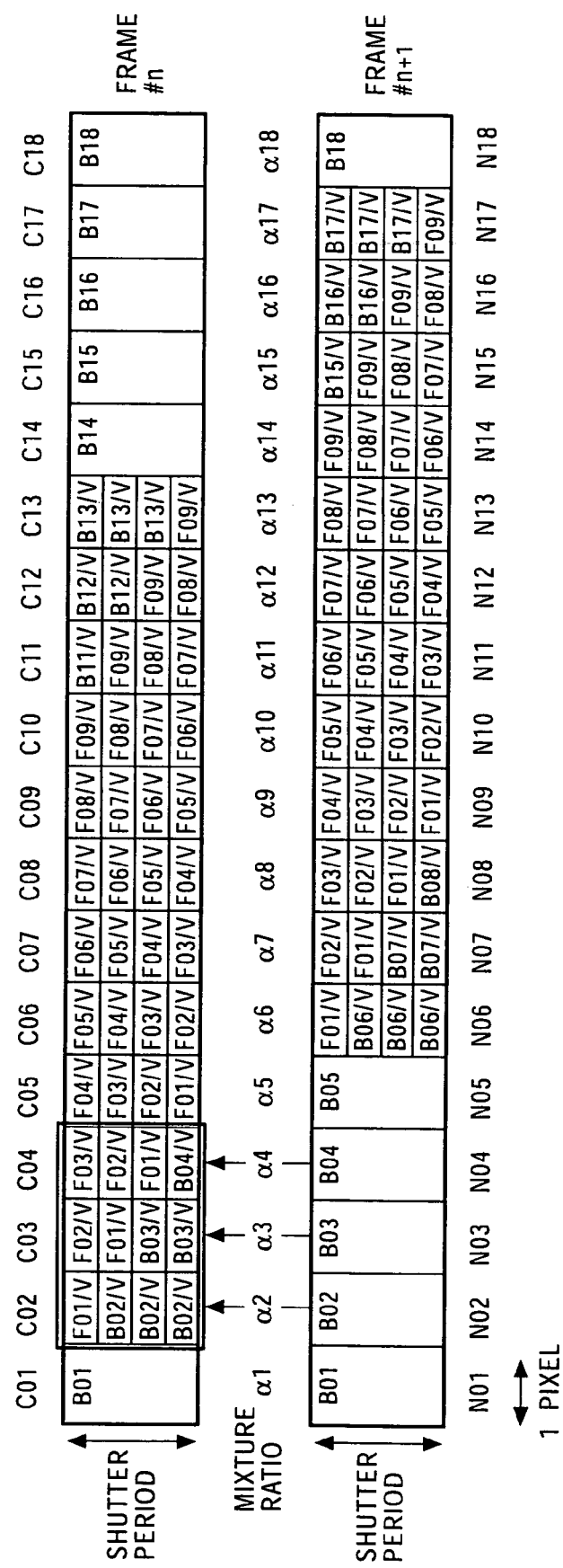
FIG. 62 is a model diagram wherein the pixel values are developed over the time direction, and periods corresponding to shutter time are divided.

FIG. 62 is a diagram which describes the processing for separating the foreground components from the pixel belonging to the uncovered background region. In FIG. 62, α1 through α18 denote the mixture ratio corresponding to the pixels in the frame #n, respectively. In FIG. 62, the second through fourth pixels from the left belong to the uncovered background region.

The pixel value C02 of the second pixel from the left in the frame #n is represented in Expression (26).

$$C02 = B02/v + B02/v + B02/v + F01/v \qquad (26)$$
$$= \alpha2 \cdot B02 + F01/v$$
$$= \alpha2 \cdot N02 + F01/v$$

Here, α2 denotes the mixture ratio of the second pixel from the left in the frame #n. N02 denotes the pixel value of the second pixel from the left in the frame #n+1.

The foreground component sum of the second pixel from the left in the frame #n, fo2, is represented in Expression (27) based upon Expression (26).

$$f02 = F01/v \qquad (27)$$
$$= C02 - \alpha2 \cdot N02$$

Similarly, the foreground component sum of the third pixel from the left in the frame #n, f03 is represented in Expression (28), and the foreground component sum of the fourth pixel from the left in the frame #n, f04 is represented in Expression (29).

$$f03 = C03 - \alpha3 \cdot N03 \qquad (28)$$

$$f04 = C04 - \alpha4 \cdot N04 \qquad (29)$$

As described above, the foreground component fu included in the pixel value C of the pixel belonging to the uncovered background region is calculated by Expression (30).

$$fu = C - \alpha \cdot N \qquad (30)$$

N denotes the pixel value of the corresponding pixel in the following frame.

As described above, the separation unit 601 can separate the foreground components and the background components from the pixel belonging to the mixed region based upon the region information including the information which indicates the covered background region, the information which indicates the uncovered background region, and the mixture ratio α for each pixel.

Figure 63:
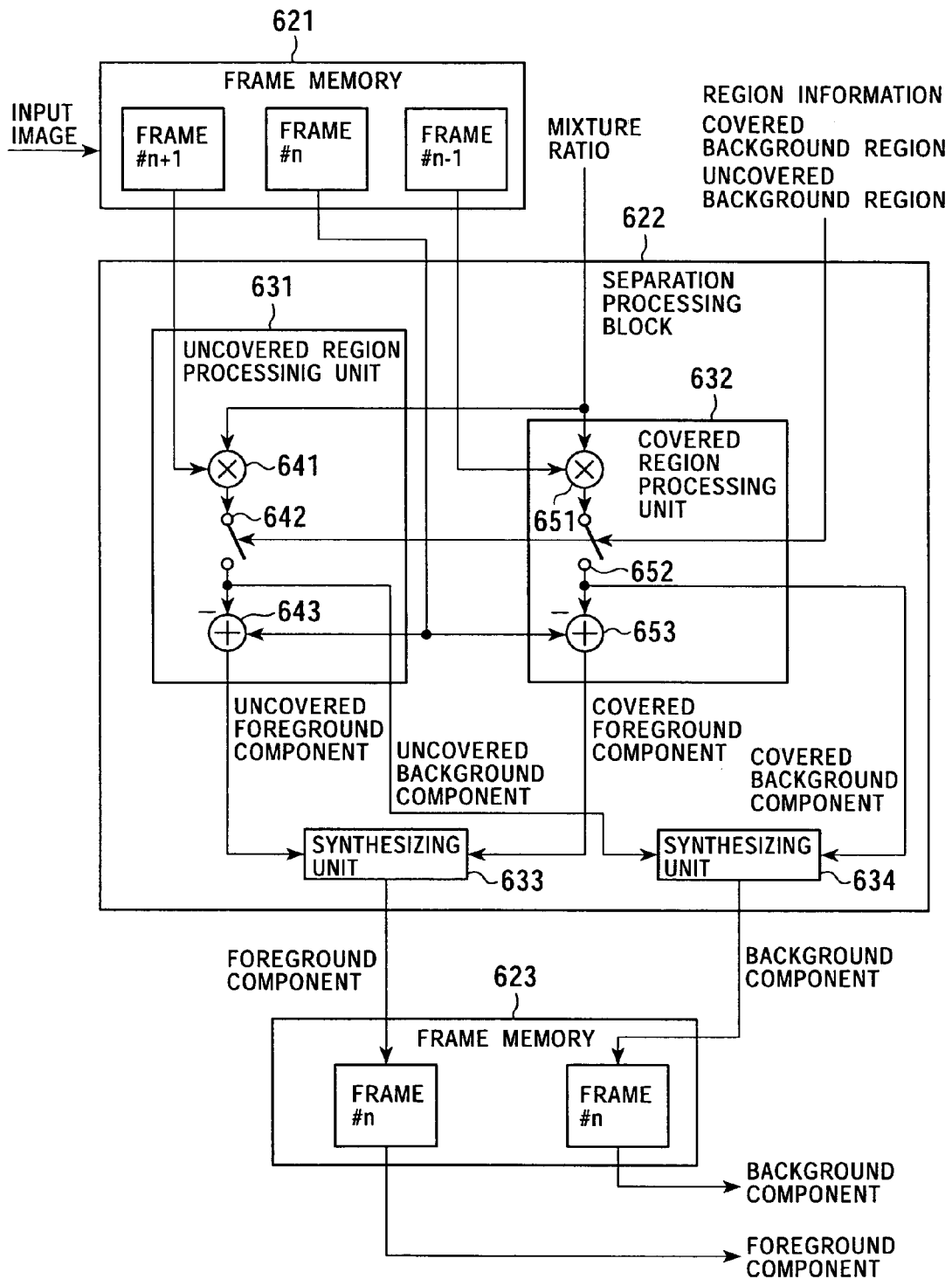
FIG. 63 is a block diagram illustrating an example of the configuration of the separating unit 601.

FIG. 63 is a block diagram which illustrates an example of the structure of the separation unit 601 for performing the processing described above. The image input to the separation unit 601 is supplied to frame memory 621, and the region information indicating the covered background region and the uncovered background region supplied from the mixture ratio calculating unit 104, and the mixture ratio α is input to a separation processing block 622.

The frame memory 621 stores the input image in increments of frames. In the event that the object of processing is the frame #n, the frame memory 621 stores the frame #n−1 which is the frame previous from the frame #n, frame #n, and the frame #n+1 which is the frame following the frame #n.

The frame memory 621 supplies the corresponding pixels in the frame #n−1, the frame #n, and the frame #n+1 to the separation processing block 622.

The separation processing block 622 separates the foreground components and the background components from the pixel belonging to the mixed region in the frame #n by applying the computation described with reference to FIG. 61 and FIG. 62 to the pixel values of corresponding pixels in the frame #n−1, the frame #n, and the frame #n+1, supplied from the frame memory 621, based upon the region information indicating the covered background region and the uncovered background region, and the mixture ratio α, and supplies to frame memory 623.

The separation processing block 622 comprises an uncovered region processing unit 631, a covered region processing unit 632, a synthesizing unit 633, and a synthesizing unit 634.

A multiplication device 641 of the uncovered region processing unit 631 multiplies the pixel value of the pixel of the frame #n+1 supplied from the frame memory 621 by the mixture ratio α, and outputs to a switch 642. In the event that the pixel in the frame #n supplied from the frame memory 621 (which is corresponding to the pixel of the frame #n+1) belongs to the uncovered background region, the switch 642 is closed, the pixel value which is multiplied by the mixture ratio α supplied from the multiplication device 641 is supplied to a computing device 643 and the synthesizing unit 634. The value wherein the pixel value of the pixel of the frame #n+1 output from the switch 642 is multiplied by the mixture ratio α is the same as the background component of the pixel value of the corresponding pixel in the frame #n.

The computing device 643 calculates the foreground components by subtracting the background components supplied from the switch 642 from the pixel value of the pixel of the frame #n supplied from the frame memory 621. The computing device 643 supplies the foreground components of the pixel in the frame #n belonging to the uncovered background region, to the synthesizing unit 633.

A multiplication device 651 of the covered region processing unit 632 multiplies the pixel value of the pixel of the frame #n−1 supplied from the frame memory 621 by the mixture ratio α, and outputs to a switch 652. In the event that the pixel in the frame #n supplied from the frame memory 621 (corresponding to the pixel of the frame #n−1) belongs to the covered background region, the switch 652 is closed, and the pixel value which is multiplied by the mixture ratio α supplied from the multiplication device 651 is supplied to a computing device 653 and the synthesizing unit 634. The value wherein the pixel value of the pixel of the frame #n−1 output from the switch 652 is multiplied by the mixture ratio α, is the same as the background component of the pixel value of the corresponding pixel in the frame #n.

The computing device 653 calculates the foreground components by subtracting the background components supplied from the switch 652 from the pixel value of the pixel of the frame #n supplied from the frame memory 621. The computing device 653 supplies the foreground components of the pixel in the frame #n belonging to the covered background region, to the synthesizing unit 633.

The synthesizing unit 633 synthesizes the foreground components of the pixel belonging to the uncovered background region in the frame #n supplied from the computing device 643, and the foreground components of the pixel belonging to the covered background region supplied from the computing device 653, and supplies to the frame memory 623.

The synthesizing unit 634 synthesizes the background components of the pixel belonging to the uncovered background region in the frame #n supplied from the switch 642, and the background components of the pixel belonging to the covered background region supplied from the switch 652, and supplies to the frame memory 623.

The frame memory 623 stores the foreground components and the background components of the pixels in the mixed region in the frame #n, supplied from the separation processing block 622, respectively.

The frame memory 623 outputs the foreground components of the pixels in the mixed region in the frame #n stored therein, and the background components of the pixels in the mixed region in the frame #n stored therein.

Using the mixture ratio α which is the feature amount enables complete separation of the foreground components and the background components, included in the pixel value.

The synthesizing unit 603 generates the foreground component image by synthesizing the foreground components of the pixel in the mixed region in the frame #n output from the separation unit 601, and the pixels belonging to the foreground region. The synthesizing unit 605 generates the background component image by synthesizing the background components of the pixels in the mixed region in the frame #n output from the separation unit 601, and pixels belonging to the background region.

Figure 64A:
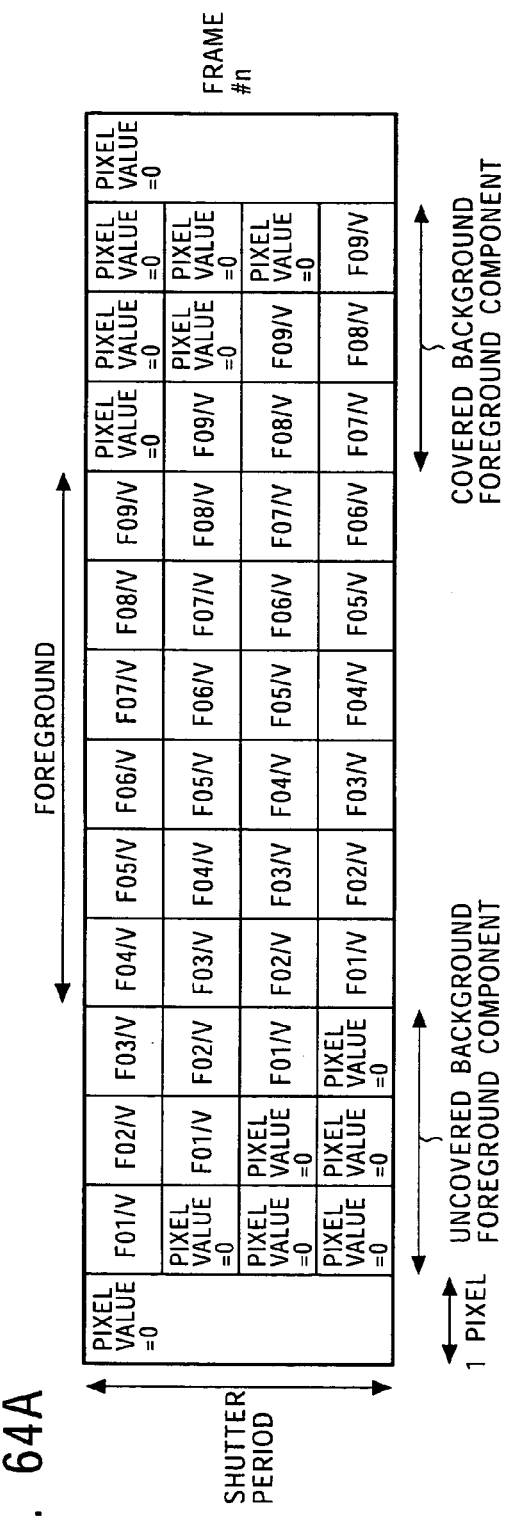
FIG. 64A is a diagram illustrating an example of a separated foreground component image.

FIG. 64A illustrates an example of the foreground component image corresponding to the frame #n shown in FIG. 60. Since the left-most pixel and the fourteenth pixel from the left are made up of only the background components before separation of the foreground and the background, the pixel values are 0.

The second through fourth pixels from the left belong to the uncovered background region prior to the foreground and the background being separated, the background components being 0, and the foreground components being left as they were. The eleventh through thirteenth pixels belonged to the covered background region before separation of the foreground and the background, and the background components are 0, and the foreground components are left as they are. Since the fifth through tenth pixels from the left are made up of only the foreground components, those are left as they are.

Figure 64B:
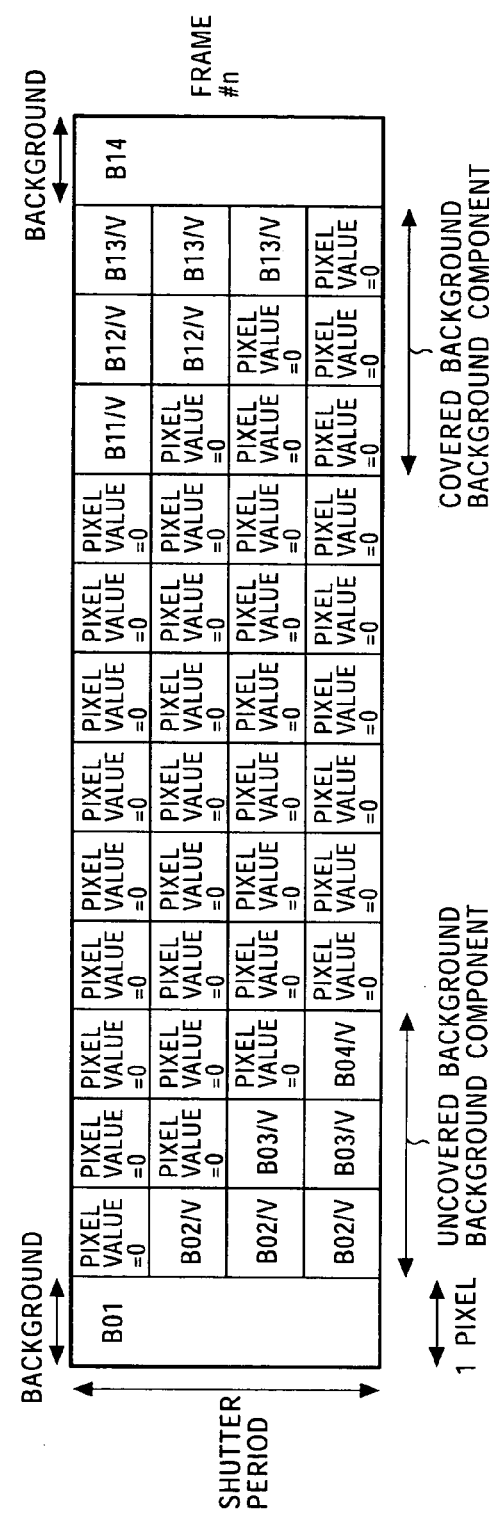
FIG. 64B is a diagram illustrating an example of a separated background component image.

FIG. 64B illustrates an example of the background component image corresponding to the frame #n shown in FIG. 60. The left-most pixel and the fourteenth pixel from the left are made up of the background components prior to the foreground and the background being separated, and accordingly those being left as they were.

The second through fourth pixels from the left belong to the uncovered background region prior to the foreground and the background being separated, with the foreground components being 0, and the background components being left as they were. The eleventh through the thirteenth pixels belong to the covered background region prior to the foreground and the background being separated, the foreground components being 0, and the background components being left as they were. The fifth through tenth pixels from the left are made up of only the foreground components prior to the foreground and the background being separated, and accordingly the pixel values are 0.

Figure 65:
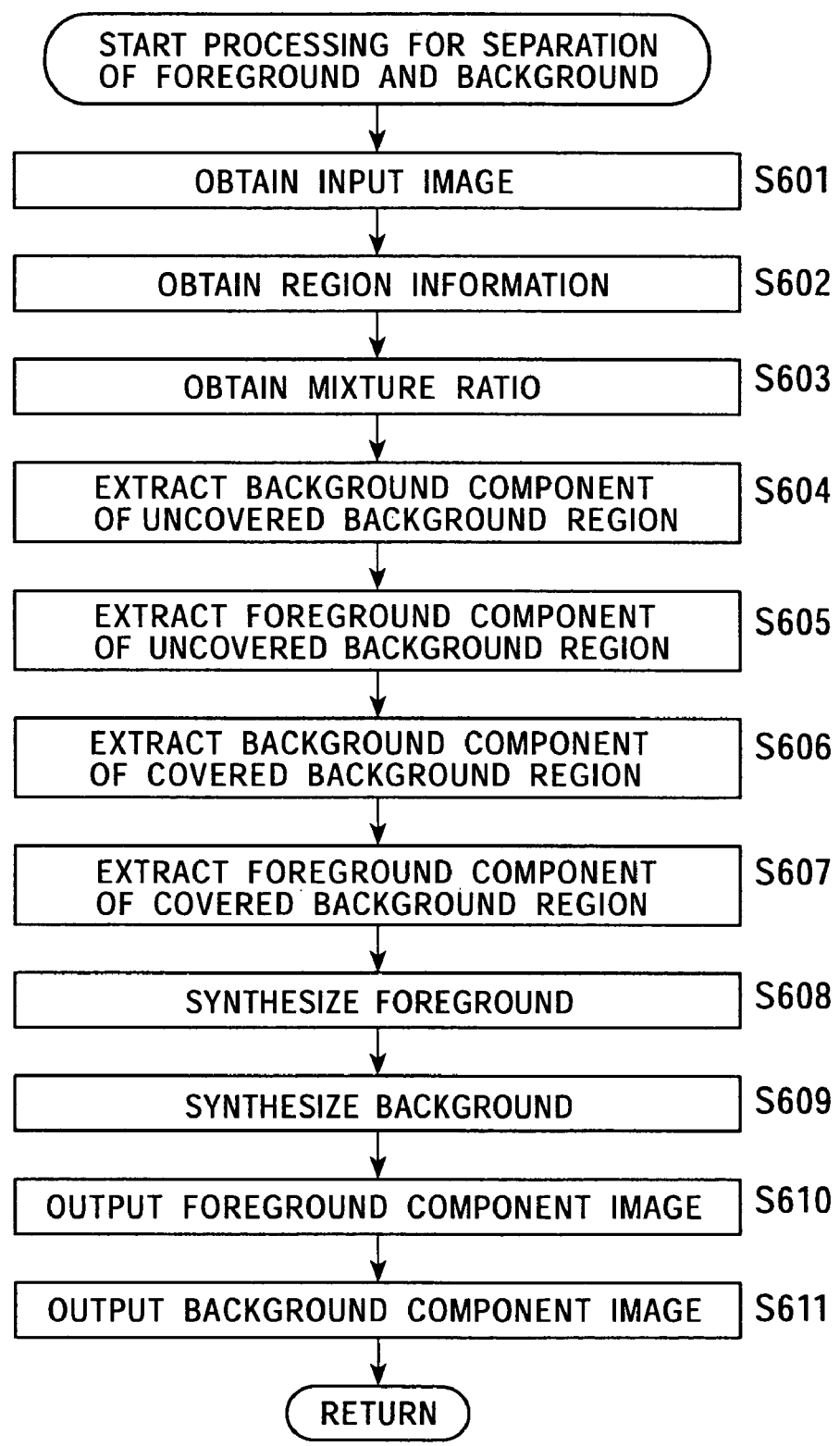
FIG. 65 is a flowchart describing the processing for separating the foreground and the background.

The separation processing of the foreground and the background by the foreground/background separation unit 105 will now be described, with reference to the flowchart shown in FIG. 65. In Step S601, the frame memory of the separation unit 601 obtains the input image, and stores the frame #n which is the object of the separation of the foreground and the background, as well as the previous frame #n−1 and the following frame #n+1.

In Step S602, the separation processing block 622 of the separation unit 601 obtains the region information supplied from the mixture ratio calculating unit 104. In Step S603, the separation processing block 622 of the separation unit 601 obtains the mixture ratio α supplied from the mixture ratio calculating unit 104.

In Step S604, the uncovered region processing unit 631 extracts the background components from the pixel value of the pixel belonging to the uncovered background region supplied from the frame memory 621 based upon the region information and the mixture ratio α.

In Step S605, the uncovered region processing unit 631 extracts the foreground components from the pixel value of the pixel belonging to the uncovered background region supplied from the frame memory 621 based upon the region information and the mixture ratio α.

In Step S606, the covered region processing unit 632 extracts the background components from the pixel value of the pixel belonging to the covered background region supplied from the frame memory 621 based upon the region information and the mixture ratio α.

In Step S607, the covered region processing unit 632 extracts the foreground components from the pixel value of the pixel belonging to the covered background region supplied from the frame memory 621 based upon the region information and the mixture ratio α.

In Step S608, the synthesizing unit 633 synthesizes the foreground components of the pixel belonging to the uncovered background region extracted in the processing in Step S605, and the foreground components of the pixel belonging to the covered background region extracted in the processing in Step S607. The synthesized foreground components are supplied to the synthesizing unit 603. Moreover, the synthesizing unit 603 synthesizes the pixels belonging to the foreground region supplied via the switch 602, and the foreground components supplied from the separation unit 601, and generates the foreground component image.

In Step S609, the synthesizing unit 634 synthesizes the background components of the pixel belonging to the uncovered background region extracted in the processing in Step S604, and the background components of the pixel belonging to the covered background region extracted in the processing in Step S606. The synthesized background components are supplied to the synthesizing unit 605. Moreover, the synthesizing unit 605 synthesizes the pixels belonging to the background region supplied via the switch 604, and the background components supplied from the separation unit 601, and generates the background component image.

In Step S610, the synthesizing unit 603 outputs the foreground component image. In Step S611, the synthesizing unit 605 outputs the background component image, and the processing ends.

As described above, the foreground/background separation unit 105 can separate the foreground components and the background components from the input image based upon the region information and the mixture ratio α, and output the foreground component image which is made up of only the foreground components, and the background component image which is made up of only the background components.

The processing of adjustment of the movement blurring amount from the foreground component image will now be described.

Figure 66:
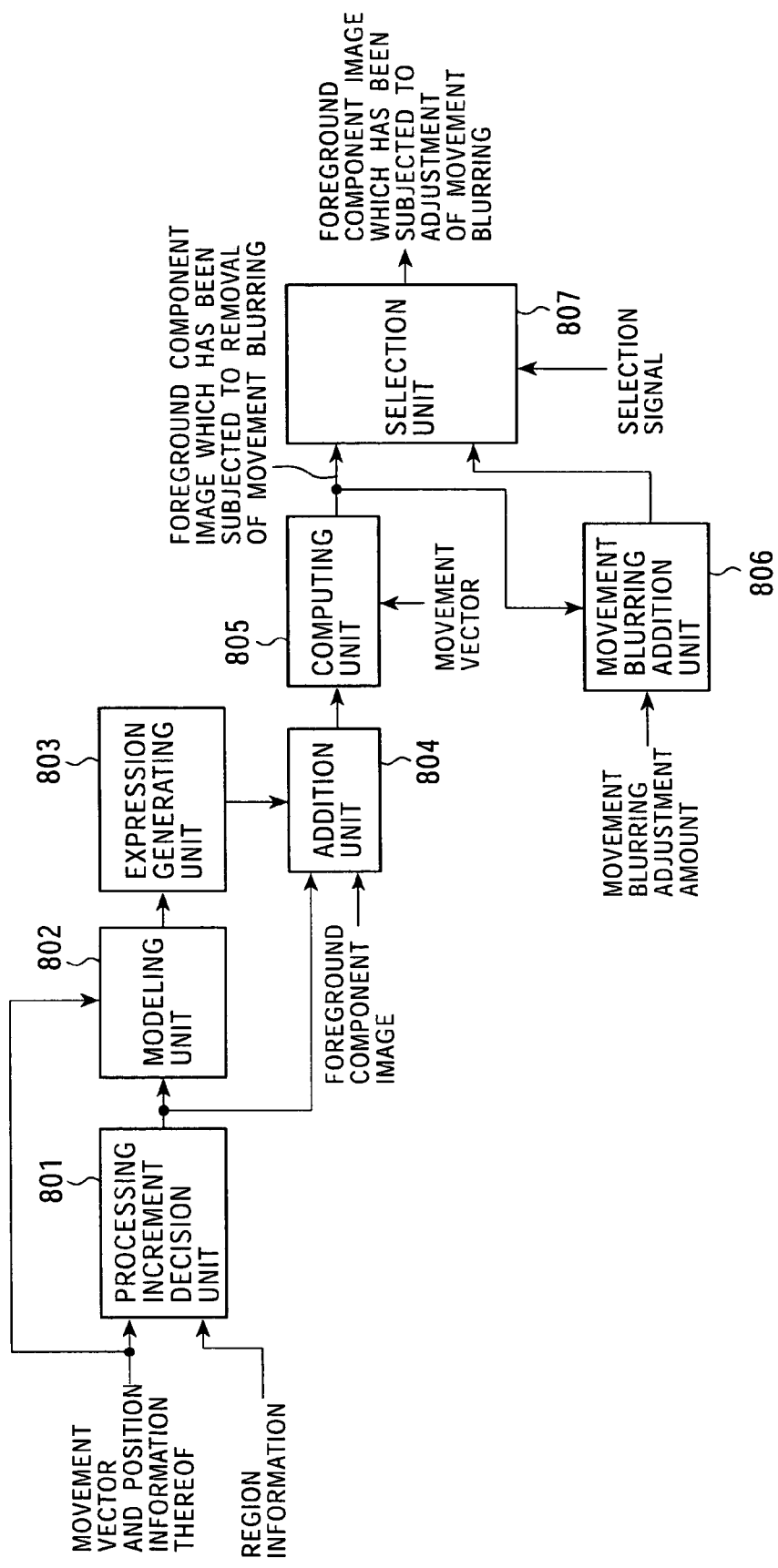
FIG. 66 is a block diagram illustrating an example of the configuration of a movement blurring adjustment unit 106.

FIG. 66 is a block diagram which illustrates an example of the structure of the movement blurring adjustment unit 106. The movement vector and the position information thereof supplied from the movement detecting unit 102, and the region information supplied from the region specifying unit 103 are supplied to a processing increment decision unit 801 and the modeling unit 802. The foreground component image supplied from the foreground/background separation unit 105 is supplied to the addition unit 804.

The processing increment decision unit 801 supplies the processing increment generated based upon the movement vector, the position information thereof, and the region information, as well as the movement vector, to the modeling unit 802. The processing increment decision unit 801 supplies the generated processing increment to the addition unit 804.

Figure 67:
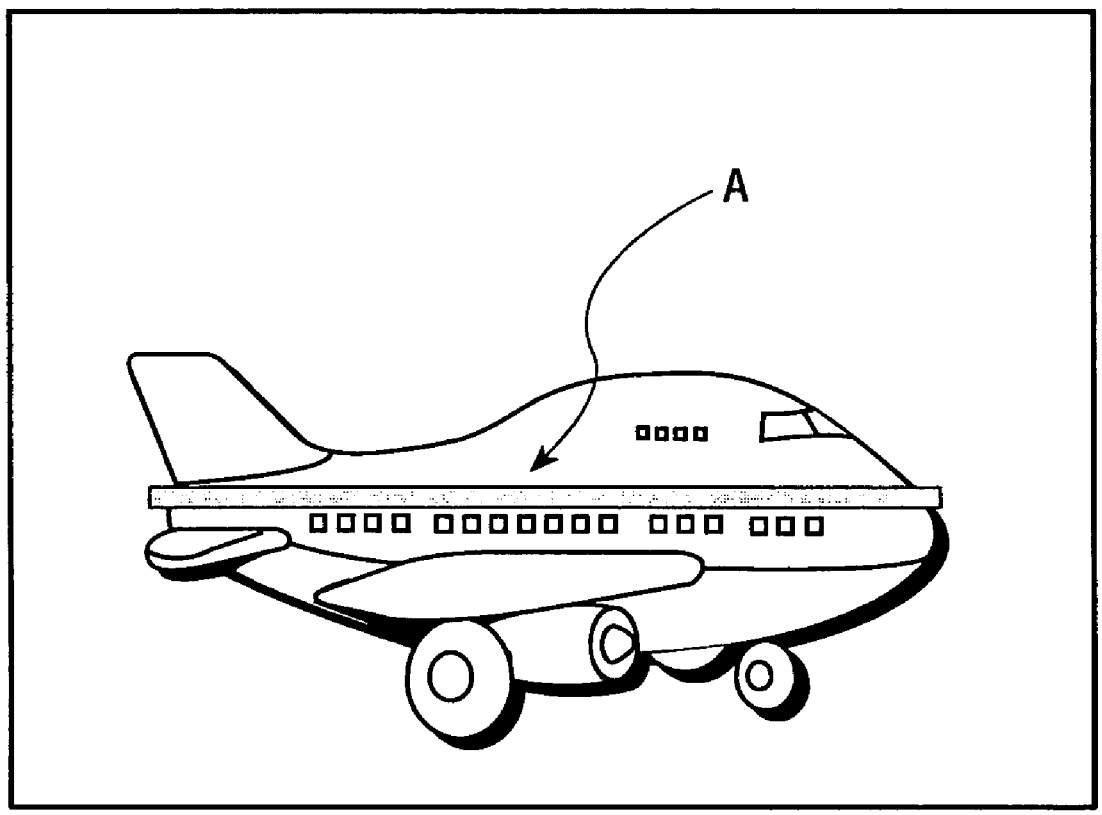
FIG. 67 is a diagram describing increments of processing.

The processing increment generated by the processing increment decision unit 801 denoted by A in FIG. 67, as illustrated by an example in FIG. 67, indicates the pixels arrayed sequentially in a movement direction beginning at the pixel corresponding to the covered background region of the foreground component image up to the pixel corresponding to the uncovered background region, or the pixels arrayed sequentially in a movement direction beginning at the pixel corresponding to the uncovered background region up to the pixel corresponding to the covered background region. The processing increment is made up of, for example, two pieces of data of the upper-left point (the left-most or the topmost position of the pixel, which is the pixel designated by the processing increment) and the bottom-right point.

Figure 68:
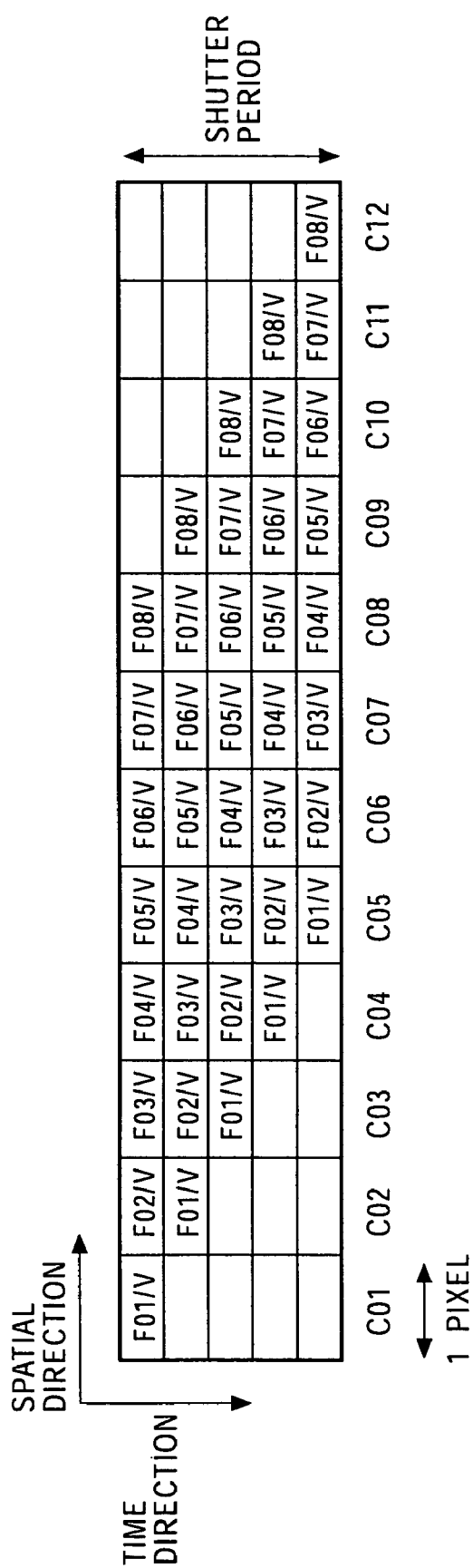
FIG. 68 is a model diagram wherein the pixel values of a foreground component image are developed over the time direction, and periods corresponding to shutter time are divided.

The modeling unit 802 performs modeling based upon the movement vector and the input processing increment. More specifically, for example, an arrangement may be made wherein the modeling unit 802 stores the number of pixels included in the processing increment, the virtual dividing number of the pixel value in the time direction, and multiple models corresponding to the number of the foreground components for each pixel beforehand, and selects a model which designates the correspondence of the pixel value to the foreground components as shown in FIG. 68, based upon the processing increment and the virtual dividing number of the pixel value in the time direction.

For example, in the event that the pixel number corresponding to the processing increment is 12, and the movement amount v in the shutter period is 5, the modeling unit 802 sets the virtual dividing number to 5, and selects a model made up of eight foreground components overall, wherein the left-most positioned pixel includes one foreground component, the second pixel from the left includes two foreground components, the third pixel from the left includes three foreground components, the fourth pixel from the left includes four foreground components, the fifth pixel from the left includes five foreground components, the sixth pixel from the left includes five foreground components, the seventh pixel from the left includes five foreground components, the eighth pixel from the left includes five foreground components, the ninth pixel from the left includes four foreground components, the tenth pixel from the left includes three foreground components, the eleventh pixel from the left includes two foreground components, and the twelfth pixel from the left includes one foreground component.

Note that an arrangement may be made wherein the modeling unit 802 does not select a model from the models stored beforehand, but rather generates a model based upon the movement vector and the processing increment in the event that the movement vector and the processing increment is supplied.

The modeling unit 802 supplies the selected model to an expression generating unit 803.

The expression generating unit 803 generates a expression based upon the model supplied from the modeling unit 802. The expression generated by the expression generating unit 803 will be described in a case wherein the number of the foreground components is 8, the pixel number corresponding to the processing increment is 12, the movement amount v is 5, and the virtual dividing number is 5, with reference to the model for foreground component image shown in FIG. 68.

In the event that the foreground component corresponding to the shutter period/v included in the foreground component image are F01/v through F08/v, the relationships between F01/v through F08/v and the pixel values C01 through C12 are represented in Expression (31) through expression (42).

$$C01 = F01/v \quad (31)$$

$$C02 = F02/v + F01/v \quad (32)$$

$$C03 = F03/v + F02/v + F01/v \quad (33)$$

$$C04 = F04/v + F03/v + F02/v + F01/v \quad (34)$$

$$C05 = F05/v + F04/v + F03/v + F02/v + F01/v \quad (35)$$

$$C06 = F06/v + F05/v + F04/v + F03/v + F02/v \quad (36)$$

$$C07 = F07/v + F06/v + F05/v + F04/v + F03/v \quad (37)$$

$$C08 = F08/v + F07/v + F06/v + F05/v + F04 \quad (38)$$

$$C09 = F08/v + F07/v + F06/v + F05/v \quad (39)$$

$$C10 = F08/v + F07/v + F06/v \quad (40)$$

$$C11 = F08/v + F07/v \quad (41)$$

$$C12 = F08/v \quad (42)$$

The expression generating unit 803 generates expression by transforming the generated expression. The expressions generated by the expression generating unit 803 are represented in Expression (43) through Expression (54).

$$C01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v \quad (43)$$

$$C02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v \quad (44)$$

$$C03 = 1 \cdot F01/v + 1 \cdot F02/v + 1 \cdot F03/v + 0 \cdot F04/v + 0 \cdot F05/v + 0 \cdot F06/v + 0 \cdot F07/v + 0 \cdot F08/v \quad (45)$$

$$C04 = 1 \cdot F01/v + 1 \cdot F02/v + 1 \cdot F03/v + 1 \cdot F04/v + 0 \cdot F05/v + 0 \cdot F06/v + 0 \cdot F07/v + 0 \cdot F08/v \quad (46)$$

$$C05 = 1 \cdot F01/v + 1 \cdot F02/v + 1 \cdot F03/v + 1 \cdot F04/v + 1 \cdot F05/v + 0 \cdot F06/v + 0 \cdot F07/v + 0 \cdot F08/v \quad (47)$$

$$C06 = 0 \cdot F01/v + 1 \cdot F02/v + 1 \cdot F03/v + 1 \cdot F04/v + 1 \cdot F05/v + 1 \cdot F06/v + 0 \cdot F07/v + 0 \cdot F08/v \quad (48)$$

$$C07 = 0 \cdot F01/v + 0 \cdot F02/v + 1 \cdot F03/v + 1 \cdot F04/v + 1 \cdot F05/v + 1 \cdot F06/v + 1 \cdot F07/v + 0 \cdot F08/v \quad (49)$$

$$C08 = 0 \cdot F01/v + 0 \cdot F02/v + 0 \cdot F03/v + 1 \cdot F04/v + 1 \cdot F05/v + 1 \cdot F06/v + 1 \cdot F07/v + 1 \cdot F08/v \quad (50)$$

$$C09 = 0 \cdot F01/v + 0 \cdot F02/v + 0 \cdot F03/v + 0 \cdot F04/v + 1 \cdot F05/v + 1 \cdot F06/v + 1 \cdot F07/v + 1 \cdot F08/v \quad (51)$$

$$C10 = 0 \cdot F01/v + 0 \cdot F02/v + 0 \cdot F03/v + 0 \cdot F04/v + 0 \cdot F05/v + 1 \cdot F06/v + 1 \cdot F07/v + 1 \cdot F08/v \quad (52)$$

$$C11 = 0 \cdot F01/v + 0 \cdot F02/v + 0 \cdot F03/v + 0 \cdot F04/v + 0 \cdot F05/v + 0 \cdot F06/v + 1 \cdot F07/v + 1 \cdot F08/v \quad (53)$$

$$C12 = 0 \cdot F01/v + 0 \cdot F02/v + 0 \cdot F03/v + 0 \cdot F04/v + 0 \cdot F05/v + 0 \cdot F06/v + 0 \cdot F07/v + 1 \cdot F08/v \quad (54)$$

Expression (43) through Expression (54) may be represented as with Expression (55).

$$Cj = \sum_{i=01}^{08} aij \cdot Fi/v \quad (55)$$

In Expression (55), j denotes the pixel position. In this example, j has one of the values between 1 and 12. Also, i denotes the position of the foreground value. In this example, i has one value between 1 and 8. Corresponding to the values of i and j, aij has one of the values of 0 or 1.

Taking margin of error into consideration, Expression (55) may be represented as with Expression (56).

$$Cj = \sum_{i=01}^{08} aij \cdot Fi/v + ej \quad (56)$$

In Expression (56), ej denotes the margin of error included in the pixel of interest, Cj.

Expression (56) can be rewritten into Expression (57)

$$ej = Cj - \sum_{i=01}^{08} aij \cdot Fi/v \quad (57)$$

Note that in order to use the least square method, the squared-sum E of the margin of error is defined as represented in Expression (58).

$$E = \sum_{j=01}^{12} ej^2 \quad (58)$$

To minimize margin of error, the value of the partial derivative from the variable Fk as to the squared-sum of the margin of error E should become 0. Fk is obtained so as to satisfy Expression (59).

$$\frac{\partial E}{\partial Fk} = 2 \cdot \sum_{j=01}^{12} ej \cdot \frac{\partial ej}{\partial Fk} \quad (59)$$

$$= 2 \cdot \sum_{j=01}^{12} \left\{ \left( Cj - \sum_{i=01}^{08} aij \cdot Fi/v \right) \cdot (-akj/v) \right\} = 0$$

In Expression (59), the movement value v is a fixed value, so Expression (60) can be derived.

$$\sum_{j=01}^{12} akj \cdot \left( Cj - \sum_{i=01}^{08} aij \cdot Fi/v \right) = 0 \quad (60)$$

Developing Expression (60) and transposing arguments, Expression (61) is obtained.

$$\sum_{j=01}^{12} \left( akj \cdot \sum_{i=01}^{08} aij \cdot Fi \right) = v \cdot \sum_{j=01}^{12} akj \cdot Cj \quad (61)$$

Expression (61) is developed into eight expressions, each of which is obtained by substituting one of the integers between 1 and 8 for k in Expression (61). The obtained eight expressions may be represented in one expression by a matrix. The expression is called a normal equation.

An example of the normal expression generated by the expression generating unit 803 based upon such a least square method is represented in Expression (62).

$$\begin{bmatrix} 54321000 \\ 45432100 \\ 34543210 \\ 23454321 \\ 12345432 \\ 01234543 \\ 00123454 \\ 00012345 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \quad (62)$$

In the event that Expression (62) is represented by A·F=v·C, then C, A, and v are known, and F is unknown. Also, while A and v are known at the point of modeling, C becomes known by inputting the pixel value in addition operation.

The margin of error included in the pixel C is dispersed by calculating the foreground components by the normal expression based upon the least square method.

The expression generating unit 803 supplies the normal expression generated as described above, to the addition unit 804.

The addition unit 804 sets the pixel value C included in the foreground component image for the expression of the matrix supplied from the expression generating unit 803 based upon the processing increment supplied from the processing increment decision unit 801. The addition unit 804 supplies the matrix which is set to the pixel value C, to the computing unit 805.

Figure 69:
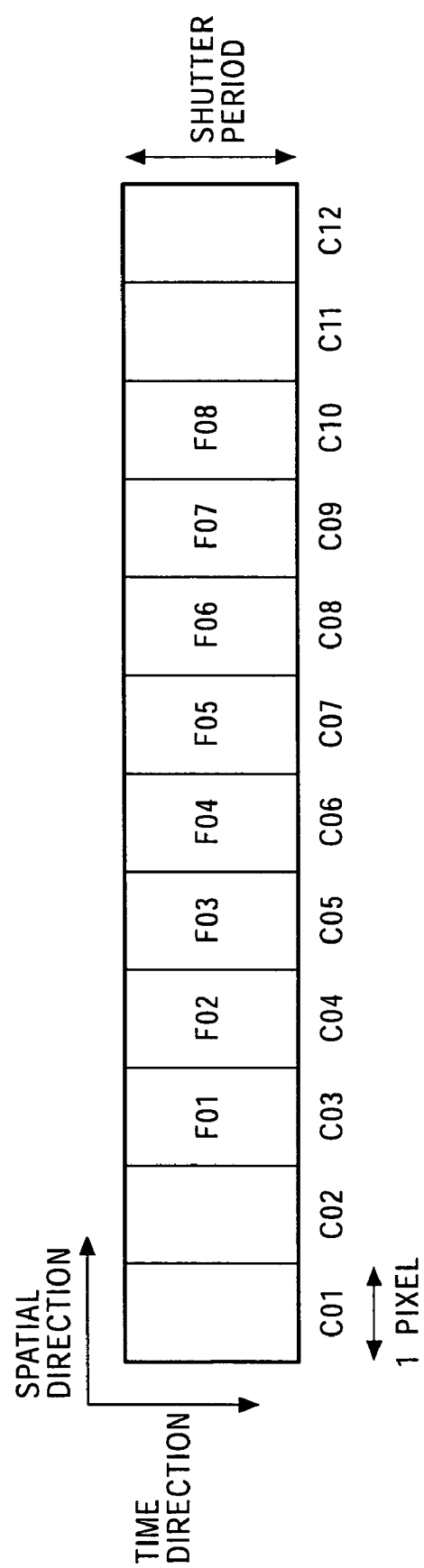
FIG. 69 is a model diagram wherein the pixel values of foreground component image are developed over the time direction, and periods corresponding to shutter time are divided.

The computing unit 805 calculates the foreground component Fi/v which has been subjected to removal of the movement blurring by the processing based upon the method such as the sweeping method (Gauss-Jordan elimination), calculates Fi corresponding to one of the integers i between 0 and 8, which is the pixel value of the foreground which has been subjected to removal of the movement blurring, and outputs the foreground component image which has been subjected to removal of the movement blurring, which is made up of Fi which is the pixel value which has been subjected to the removal of the movement blurring as shown by way of a example in FIG. 69, to a movement blurring addition unit 806 and a selection unit 807.

Note that in the foreground component image which has been subjected to removal of the movement blurring shown in FIG. 69, each of C03 through C10 is set to each of F01 through F08 so as not to change the position of the foreground component image with regard to the screen, which can correspond to an arbitrary position.

Figure 70:
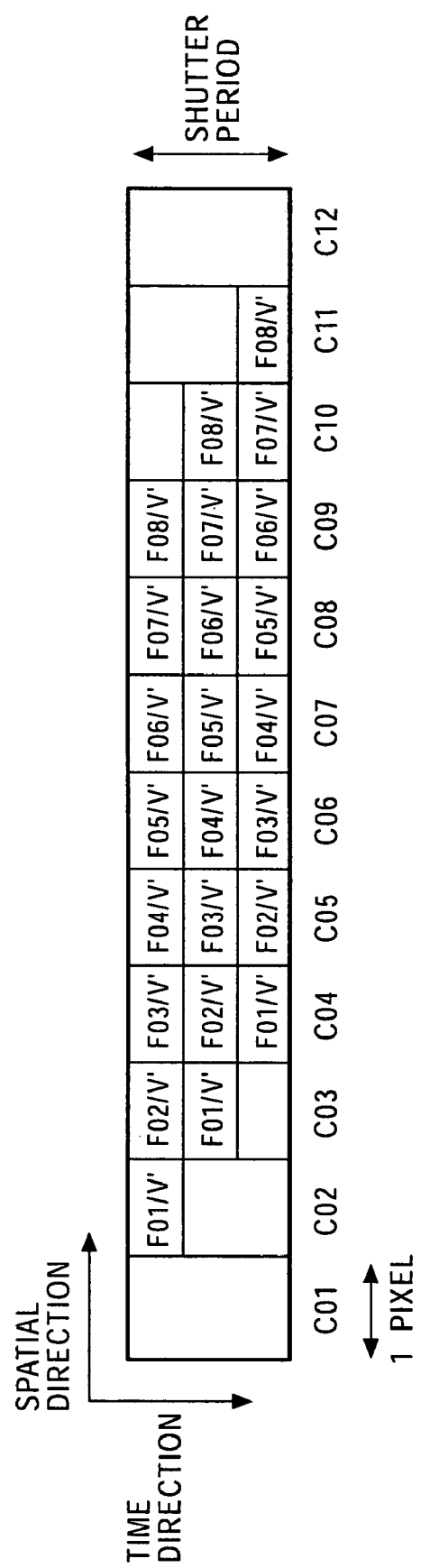
FIG. 70 is a model diagram wherein the pixel values of foreground component image are developed over the time direction, and periods corresponding to shutter time are divided.

The movement blurring addition unit 806 can adjust the movement blurring amount by providing a movement blurring adjustment amount v' different from the movement amount v, e.g., the movement blurring adjustment amount v' wherein the value thereof is the half of the movement amount v, or the movement blurring amount v' having no relationship with the movement amount v. For example, as shown in FIG. 70, the movement blurring addition unit 806 calculates the foreground component Fi/v' by dividing the pixel value of the foreground which has been subjected to removal of the movement blurring, Fi, by the movement blurring adjustment amount v', calculates the sum of the foreground components Fi/v', and generates the pixel values which are subjected to adjustment of the movement blurring. For example, in the event that the movement blurring adjustment amount v' is 3, the pixel value C02 is (F01)/v', the pixel value C03 is (F01 +F02)/v', the pixel value C04 is (F01+F02+F03)/v', and the pixel value C05 is (F02+F03+ F04)/v'.

The movement blurring addition unit 806 supplies the foreground component image which has been subjected to the adjustment of the movement blurring amount, to the selection unit 807.

The selection unit 807 selects either of the foreground component image which has been subjected to removal of the movement blurring supplied from the computing unit 805, or the foreground component image which has been subjected to adjustment of the movement blurring amount supplied from the movement blurring addition unit 806, and outputs the selected foreground component image.

As described above, the movement blurring adjustment unit 106 can adjust the movement blurring amount based upon the selection signal and the movement blurring adjustment amount v'.

Figure 71:
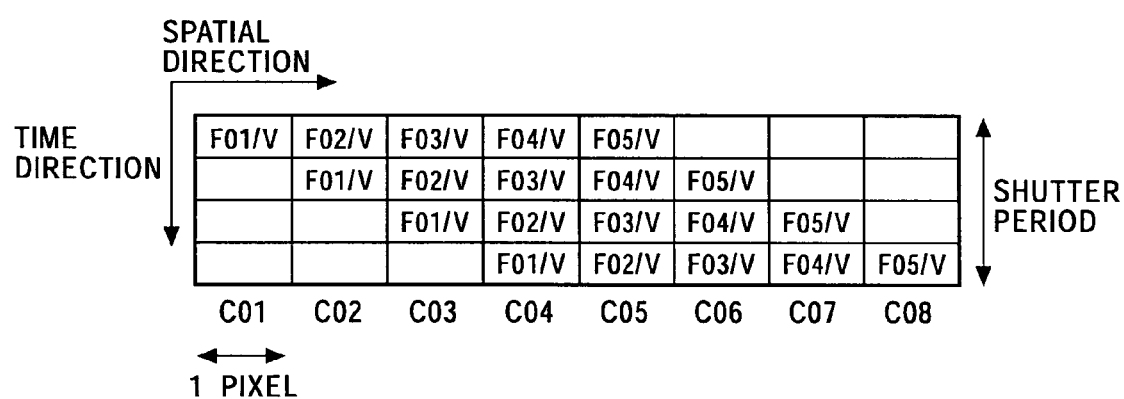
FIG. 71 is a model diagram wherein the pixel values of foreground component image are developed over the time direction, and periods corresponding to shutter time are divided.

Also, for example, as shown in FIG. 71, in the event that the pixel number corresponding to the processing increment is 8, and the movement amount v is 4, the movement blurring adjustment unit 106 generates the expression of the matrix represented in Expression (63).

$$\begin{bmatrix} 43210 \\ 34321 \\ 23432 \\ 12343 \\ 01234 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{04} Ci \end{bmatrix} \quad (63)$$

The movement blurring adjustment unit 106 sets up the expressions wherein the number thereof corresponds to the length of the processing increment, and calculates the pixel value which is subjected to adjustment of movement blurring, Fi. Similarly, in the event that there are one hundred pixels included in the processing increment, for example, expressions corresponding to the one hundred pixels are generated, and Fi is calculated.

Figure 72:
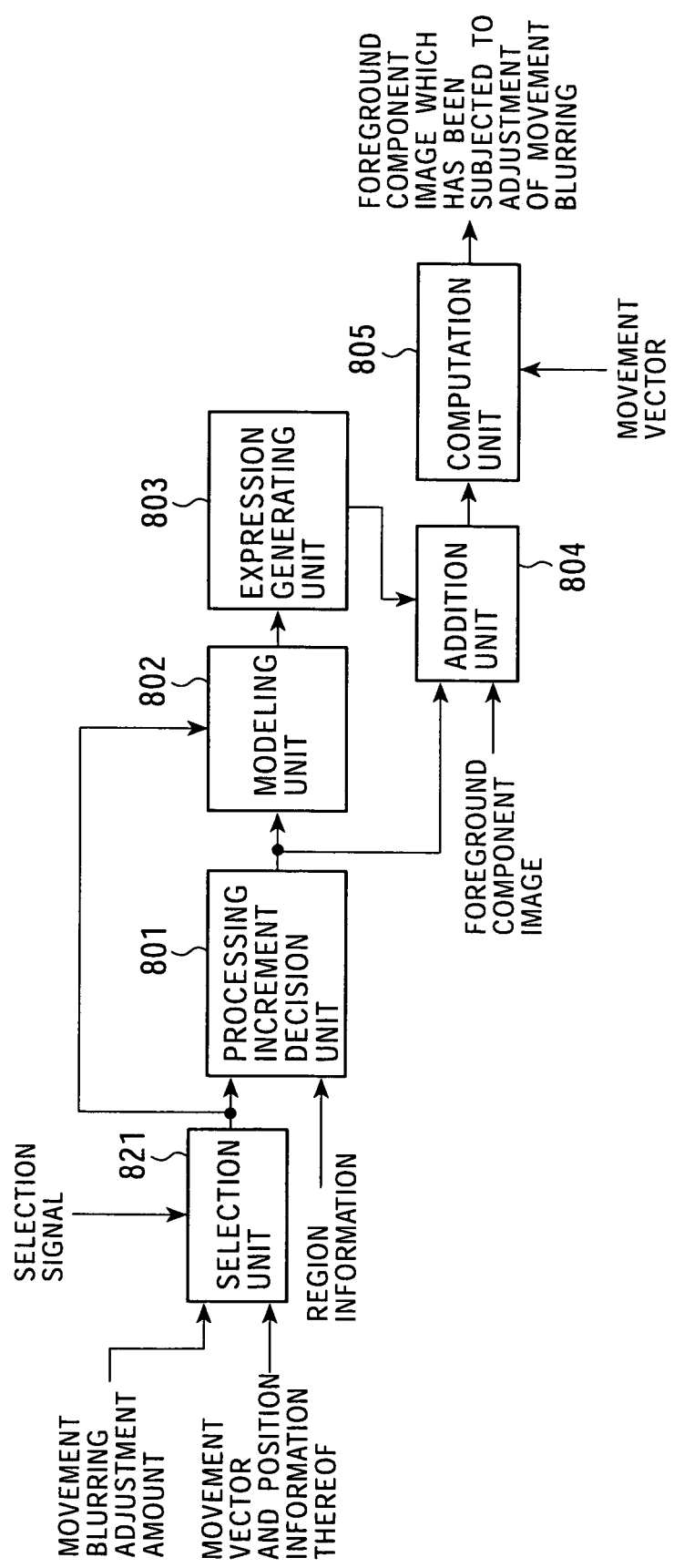
FIG. 72 is a diagram illustrating another configuration of the movement blurring adjustment unit 106.

FIG. 72 is a diagram which illustrates a different structure of the movement blurring adjustment unit 106. The same portions as with the case shown in FIG. 66 are denoted by the same reference numbers, and description thereof will be omitted.

The selection unit 821 supplies the input movement vector and the position signal thereof to the processing increment decision unit 801 and the modeling unit 802 as they were, or replaces the size of movement vector with the movement blurring adjustment amount v', and supplies the movement vector wherein the amount thereof is replaced with the movement blurring adjustment amount v' and the position signal to the processing increment decision unit 801 and the modeling unit 802, based upon the selection signal.

Thus, the processing increment decision unit 801 through the computing unit 805 of the movement blurring adjustment unit 106 shown in FIG. 72 can adjust the movement blurring amount corresponding to the values of the movement amount v and the movement blurring adjustment amount v'. For example, in the event that the movement amount v is 5 and the movement blurring adjustment amount v' is 3, the processing increment decision unit 801 through the computing unit 805 of the movement blurring adjustment unit 106 shown in FIG. 72, performs computation for the foreground component image wherein the movement amount v is 5 as shown in FIG. 68, based upon the model corresponding to the movement blurring adjustment amount v' of 3 as shown in FIG. 70, and outputs the image containing the movement blurring corresponding to the movement amount v of (movement amount v)/(movement blurring adjustment amount v')=5/3, i.e., approximately 1.7. In this case, since the calculated image does not contain the movement blurring corresponding to the movement amount v of 3, it should be noted that the meaning of the relationship between the movement amount v and the movement blurring adjustment amount v' is not the same as the results of the movement blurring addition unit 806.

As described above, the movement blurring adjustment unit 106 generates the expression corresponding to the movement amount v and the processing increment, sets the pixel values of the foreground component image for the generated expression, and calculates the foreground component image which is subjected to adjustment of the movement blurring.

Figure 73:
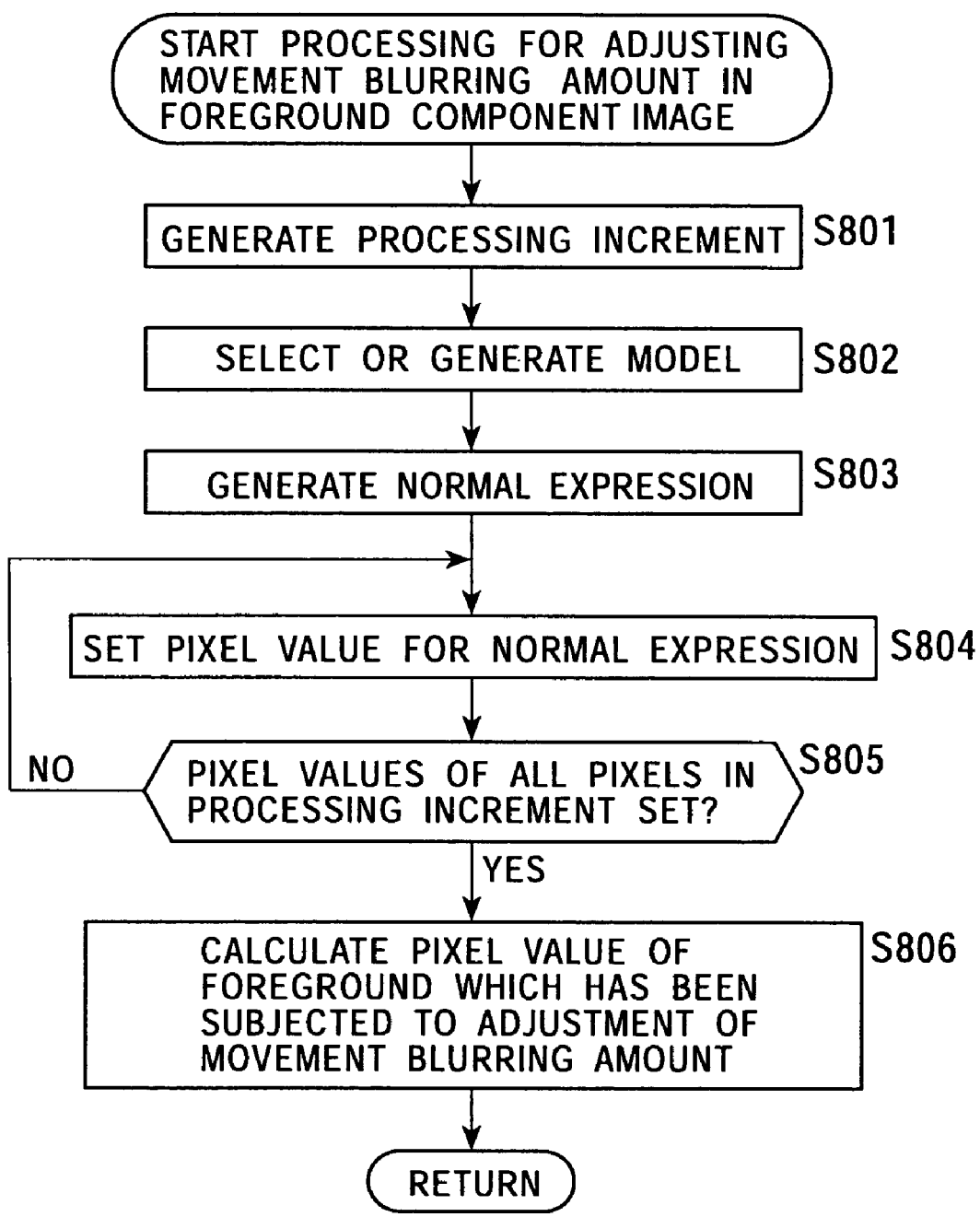
FIG. 73 is a flowchart describing the processing for adjusting the amount of movement blurring contained in the foreground component image by the movement blurring adjustment unit 106.

The processing of adjustment of the movement blurring amount included in the foreground component image by the movement blurring adjustment unit 106 will now be described, with reference to the flowchart shown in FIG. 73.

In Step S801, the processing increment decision unit 801 of the movement blurring adjustment unit 106 generates the processing increment based upon the movement vector and the region information, and supplies the generated processing increment to the modeling unit 802.

In Step S802, the modeling unit 802 of the movement blurring adjustment unit 106 performs selecting or generating of the model corresponding to the movement amount v and the processing increment. In Step S803, the expression generating unit 803 creates the normal expression based upon the selected model.

In Step S804, the addition unit 804 sets the pixel values of the foreground component image for the created normal expression. In Step S805, the addition unit 804 judges whether or not the pixel values of all the pixel corresponding to the processing increment are set, and in the event that judgment is made that not all the pixel values of the pixels corresponding to the processing increment have been set, the flow returns to Step S804 and repeats the processing of setting the pixel values for the normal expression.

In the event that judgment is made that all the pixel values of the pixel of the processing increment have been set in Step S805, the flow proceeds to Step S806, the computing unit 805 calculates the pixel values of the foreground which has been subjected to adjustment of the movement blurring amount based upon the normal expression wherein the pixel values supplied from the addition unit 804 are set, and the processing ends.

As described above, the movement blurring adjustment unit 106 can adjust the movement blurring amount in the foreground image containing the movement blurring based upon the movement vector and the region information.

That is to say, the movement blurring amount included in the pixel values which are the sampled data, can be adjusted.

As described above, the signal processing device of which the structure is shown in FIG. 2 can adjust the movement blurring amount included in the input image. The signal processing device wherein the structure is shown in FIG. 2 can calculate the mixture ratio α which is buried information, and output the calculated mixture ratio α.

Figure 74:
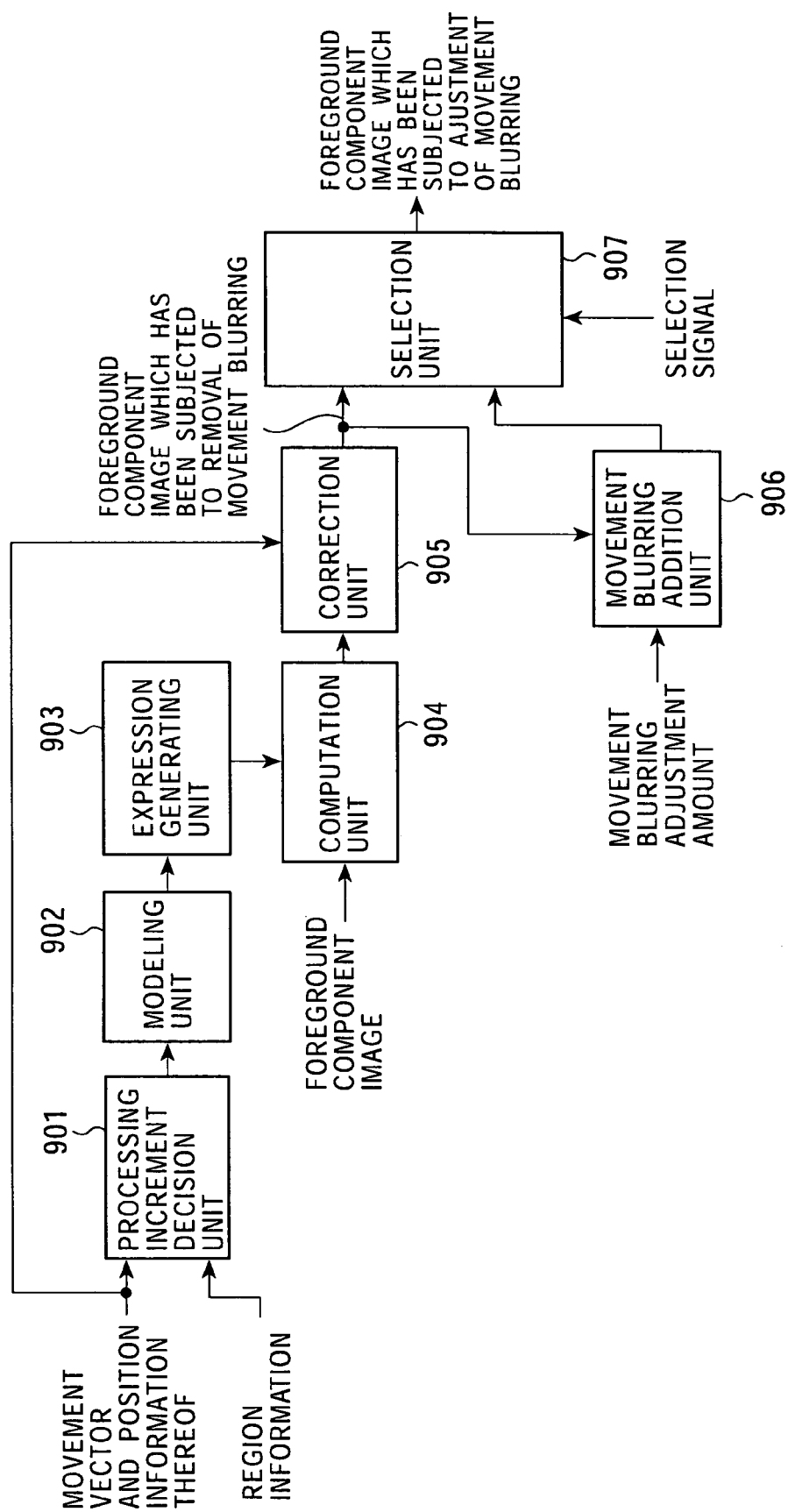
FIG. 74 is a block diagram illustrating another configuration of the movement blurring adjustment unit 106.

FIG. 74 is a block diagram which illustrates a different example of the structure of the movement blurring adjustment unit 106. The movement vector and the position information thereof supplied from the movement detecting unit 102 are supplied to a processing increment decision unit 901 and the correction unit 905, and the region information supplied from the region specifying unit 103 is supplied to the processing increment decision unit 901. The foreground component image supplied from the foreground/background separation unit 105 is supplied to a computation unit 904.

The processing increment decision unit 901 supplies the generated processing increment along with the movement vector based upon the movement vector, the position information thereof, and the region information.

The modeling unit 902 performs modeling based upon the movement vector and the input processing increment.

The expression generating unit 903 generates the expression based upon the model supplied from the modeling unit 902.

Figure 75:
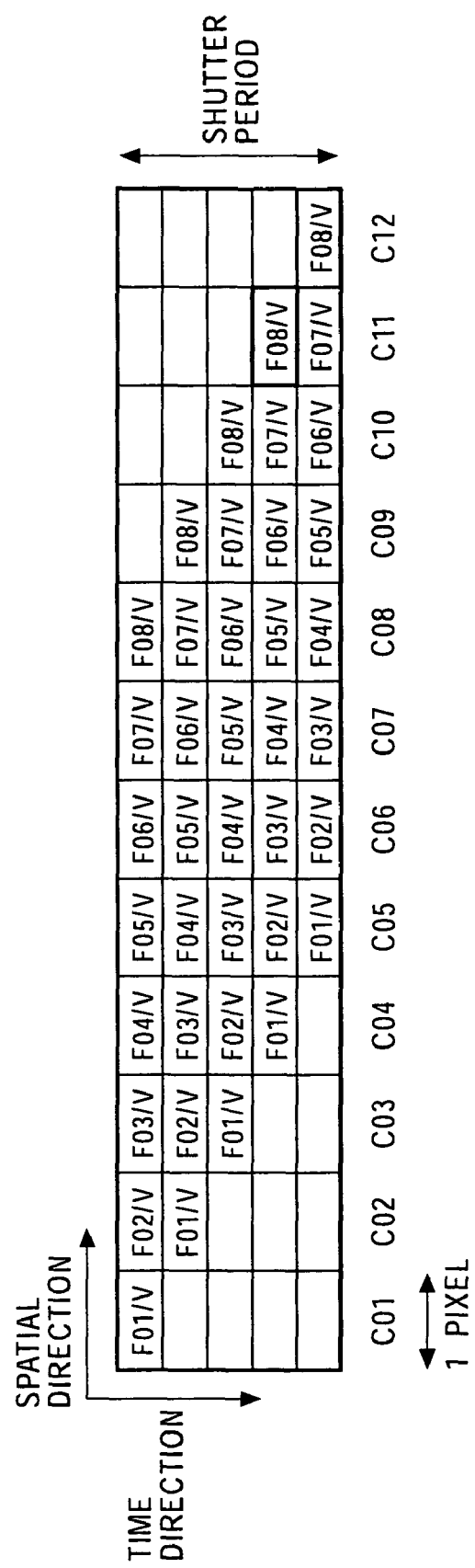
FIG. 75 is a diagram illustrating a model specifying the how the pixel value and foreground component correspond.
Figure 76:
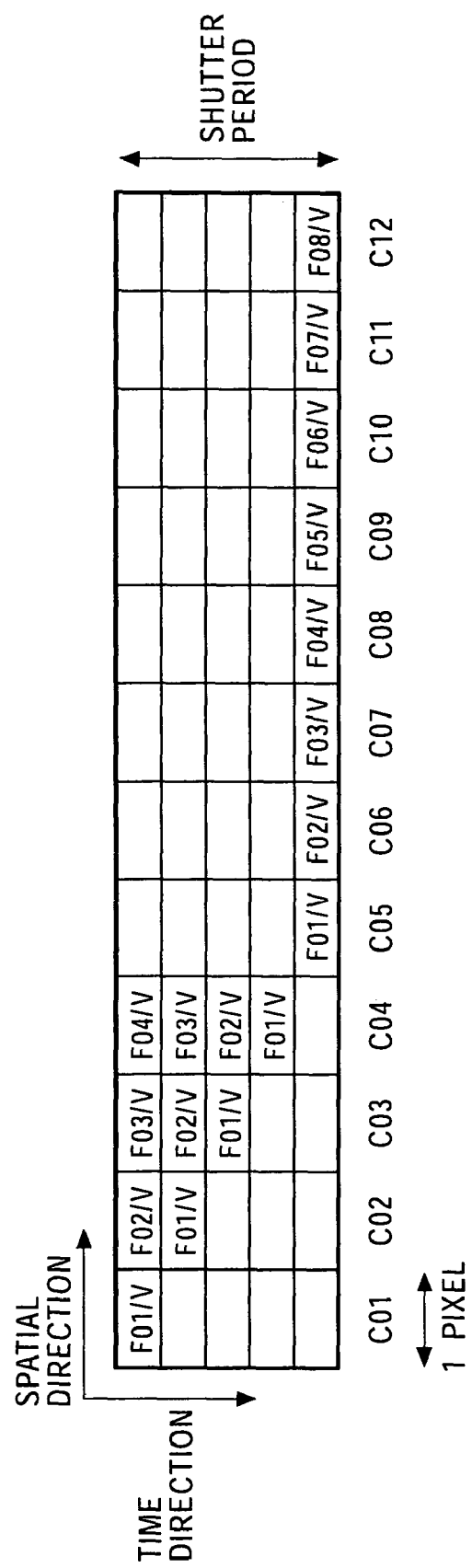
FIG. 76 is a diagram describing calculating the foreground component.
Figure 77:
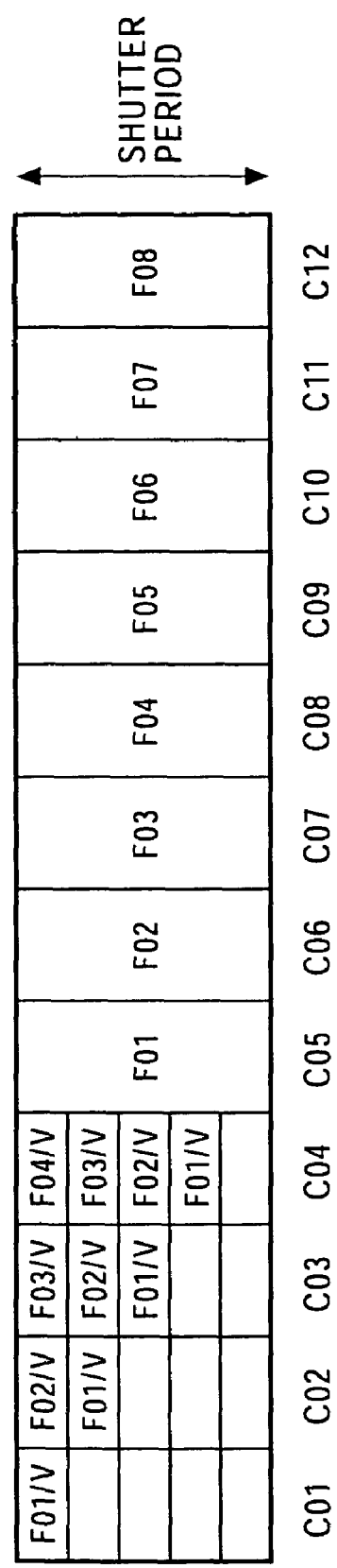
FIG. 77 is a diagram describing calculating the background component.

Referring to the model of the foreground component image as shown in FIG. 75 through FIG. 77, a description will be made with regard to an example of the expression generated by the expression generating unit 903 in the event that the number of the foreground components is 8, the pixel number corresponding to the processing increment is 12, and the movement amount v is 5.

In the event that the foreground components corresponding to the shutter period/v included in the foreground component image are F01/v through F08/v, the relationships between F01/v through F08/v and the pixel values C01 through C12 are represented in Expression (31) through Expression (42), as described above.

Giving attention to the pixel values C12 and C11, the pixel value C12 includes only the foreground component F08/v as represented in Expression (64), the pixel value C11 consists of the sum of products of the foreground component F08/v and the foreground component F07/v. Accordingly, the foreground component F07/v is calculated by Expression (65).

$$F08/v = C12 \quad (64)$$

$$F07/v = C11 - C12 \quad (65)$$

Similarly, taking the foreground components included in the pixel values C10 through C01 into consideration, the foreground components F06/v through F01/v are calculated by Expression (66) through Expression (71).

$$F06/v = C10 - C11 \tag{66}$$

$$F05/v = C09 - C10 \tag{67}$$

$$F04/v = C08 - C09 \tag{68}$$

$$F03/v = C07 - C08 + C12 \tag{69}$$

$$F02/v = C06 - C07 + C11 - C12 \tag{70}$$

$$F01/v = C05 - C06 + C10 - C11 \tag{71}$$

The expression generating unit 903 generates the expression for calculating the foreground components by the differences of the pixel values as represented by way of examples in Expression (64) through Expression (71).

The computation unit 904 sets the pixel values of the foreground component image for the expression supplied from the expression generating unit 903, and calculates the foreground components based upon the expression wherein the pixel values are set. For example, in the event that Expression (64) through Expression (71) are supplied from the expression generating unit 903, the computation unit 904 sets the pixel values C05 through C12 for Expression (64) through Expression (71).

The computation unit 904 calculates the foreground components based upon the expression wherein the pixel values are set. For example, the computation unit 904 calculates the foreground components F01/v through F08/v by the computation based upon Expression (64) through Expression (71) for which the pixel values C05 through C12, as shown in FIG. 76. The computation unit 904 supplies the foreground components F01/v through F08/v to the correction unit 905.

The correction unit 905 calculates the foreground pixel value which is subjected to removal of the movement blurring by multiplying the foreground component supplied from the computation unit 904 by the movement amount v included in the movement vector supplied from the processing increment decision unit 901. For example, in the event that the foreground components F01/v through F08/v supplied from the computation unit 904 are supplied, the correction unit 905 calculates the foreground pixel values F01 through F08 which are subjected to removal of the movement blurring as shown in FIG. 77, by multiplying each of the foreground components F01/v through F08/v by the movement amount v of 5.

The correction unit 905 supplies the foreground component image made up of the foreground pixel values which are subjected to removal of the movement blurring by calculating as described above, to a movement blurring addition unit 906 and a selection unit 907.

The movement addition unit 906 can adjust the movement blurring by a movement blurring adjustment value v' with a value different from the movement amount v, for example, a movement blurring adjustment amount v' of which value is the half value of the movement amount v, or a movement blurring adjustment amount v' which has no relationship with the movement amount v. For example, as shown in FIG. 70, the movement blurring addition unit 906 calculates the foreground component Fi/v' by dividing the foreground pixel value Fi which has been subjected to removal of the movement blurring by the movement blurring adjustment amount v', calculates the sum of the foreground components Fi/v, and generates the pixel values which have been subjected to adjustment of the movement blurring. For example, in the event that the movement blurring adjustment amount v' is 3, the pixel value C02 is (F01)/v', pixel value C03 is (F01+F02)/v', the pixel value C04 is (F01+F02+F03)/v', and the pixel value C05 is (F02+F03+F04)/v'.

The movement blurring addition unit 906 supplies the foreground component image which has been subjected to adjustment of the movement blurring, to the selection unit 907.

The selection unit 907 selects either of the foreground component image which has been subjected to removal of the movement blurring supplied from the correction unit 905, or the foreground component image which has been subjected to adjustment of the movement blurring supplied from the movement blurring addition unit 906, based upon the selection signal corresponding to user's selection, and outputs the selected foreground component image.

As described above, the movement blurring adjustment unit 106 can adjust the movement blurring amount based upon the selection signal and the movement blurring adjustment amount v'.

Figure 78:
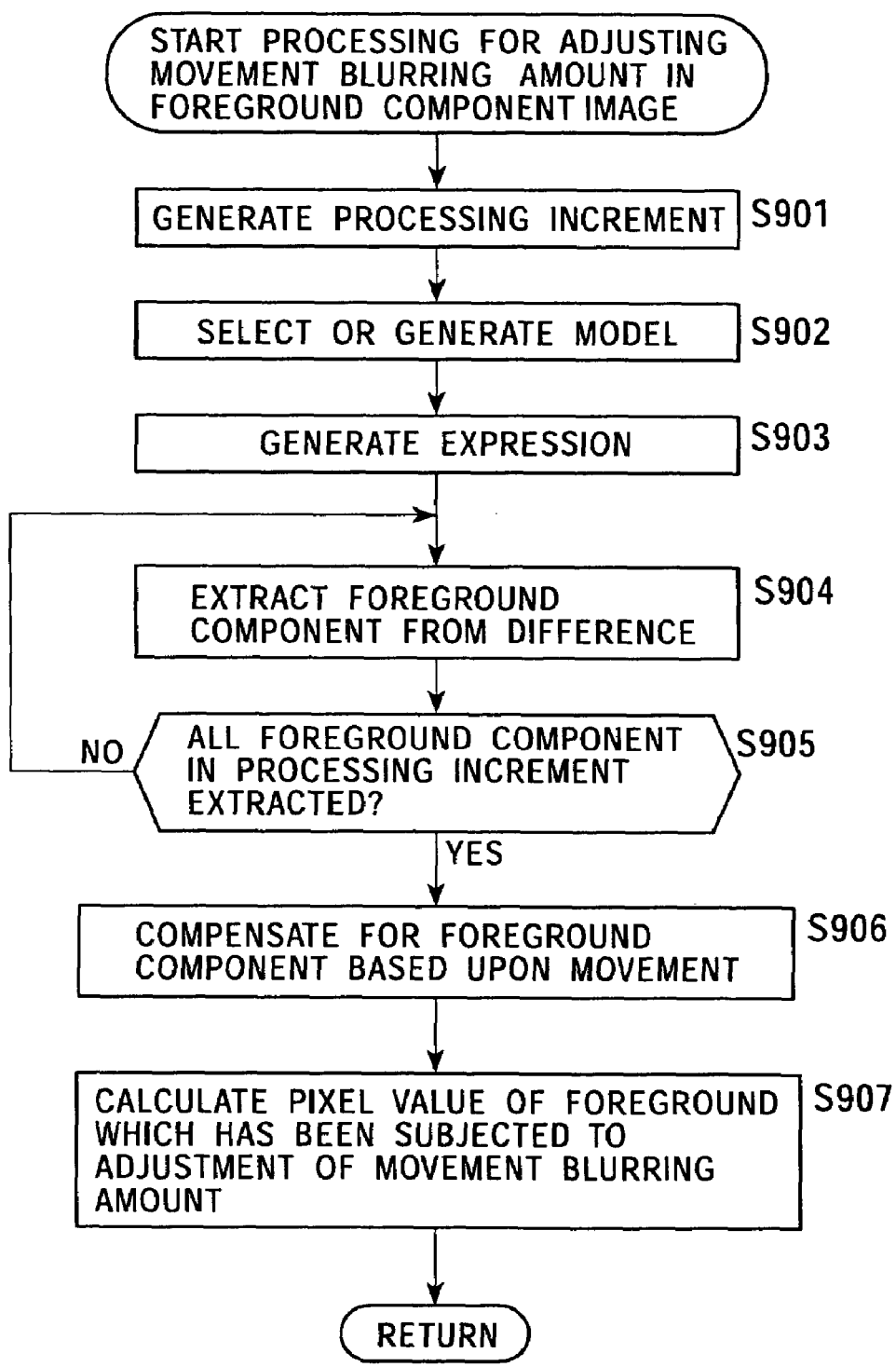
FIG. 78 is a flowchart describing processing for removing movement blurring of the foreground.

Referring to the flowchart shown in FIG. 78, a description will now be made regarding the processing of the adjustment of the movement blurring amount of the foreground by the movement blurring adjustment unit 106 of which structure is illustrated in FIG. 74.

In Step S901, the processing increment decision unit 901 of the movement blurring adjustment unit 106 generates the processing increment based upon the movement vector and the region information, and supplies the generated processing increment to the modeling unit 902 and the correction unit 905.

In Step S902, the modeling unit 902 of the movement blurring adjustment unit 106 performs selecting or generating of the model corresponding to the movement amount v and the processing increment. In Step S903, the expression generating unit 903 generates the expression for calculating the foreground components by the difference of the pixel values of the foreground component image base upon the model which is selected or generated.

In Step S904, the computation unit 904 sets the pixel values of the foreground component image for the created expression, and extracts the foreground components from the difference of the pixel values based upon the expression wherein the pixel values are set. In Step S905, the computation unit 904 judges whether or not all the foreground components corresponding to the processing increment have been extracted, and in the event that judgement is made that not all the foreground components corresponding to the processing increment have been extracted, the flow returns to Step S904, and repeats the processing of extracting the foreground components.

In Step S905, in the event that judgment is made that all the foreground components corresponding to the processing increment have been extracted, the flow proceeds to Step S906, the correction unit 905 corrects each of the foreground components F01/v through F08/v supplied from the computation unit 904 based upon the movement amount v, and calculates the pixel values of the foreground components F01 through F08, which are subjected to removal of the movement blurring.

In Step S907, the movement blurring addition unit 906 calculates the pixel values of the foreground which is subjected to adjustment of the movement blurring, and the selection unit 907 selects either of the image which is subjected to removal of the movement blurring, or the image which is subjected to adjustment of the movement blurring, outputs the selected image, and the processing ends.

As described above, the movement blurring adjustment unit 106 of which the structure is shown in FIG. 74 can adjust the movement blurring in the foreground image containing the movement blurring more speedily by simpler computation.

While effects are observed in ideal conditions with conventional techniques which partially remove the movement blurring such as the Winner filter or the like, sufficient effects are not observed for actual images which has been quantized and contains noise, while with the movement blurring adjustment unit 106 wherein the structure is shown in FIG. 74, sufficient effects are observed for actual images which has been quantized and contains noise, and accurate removal of the movement blurring is realized.

Figure 79:
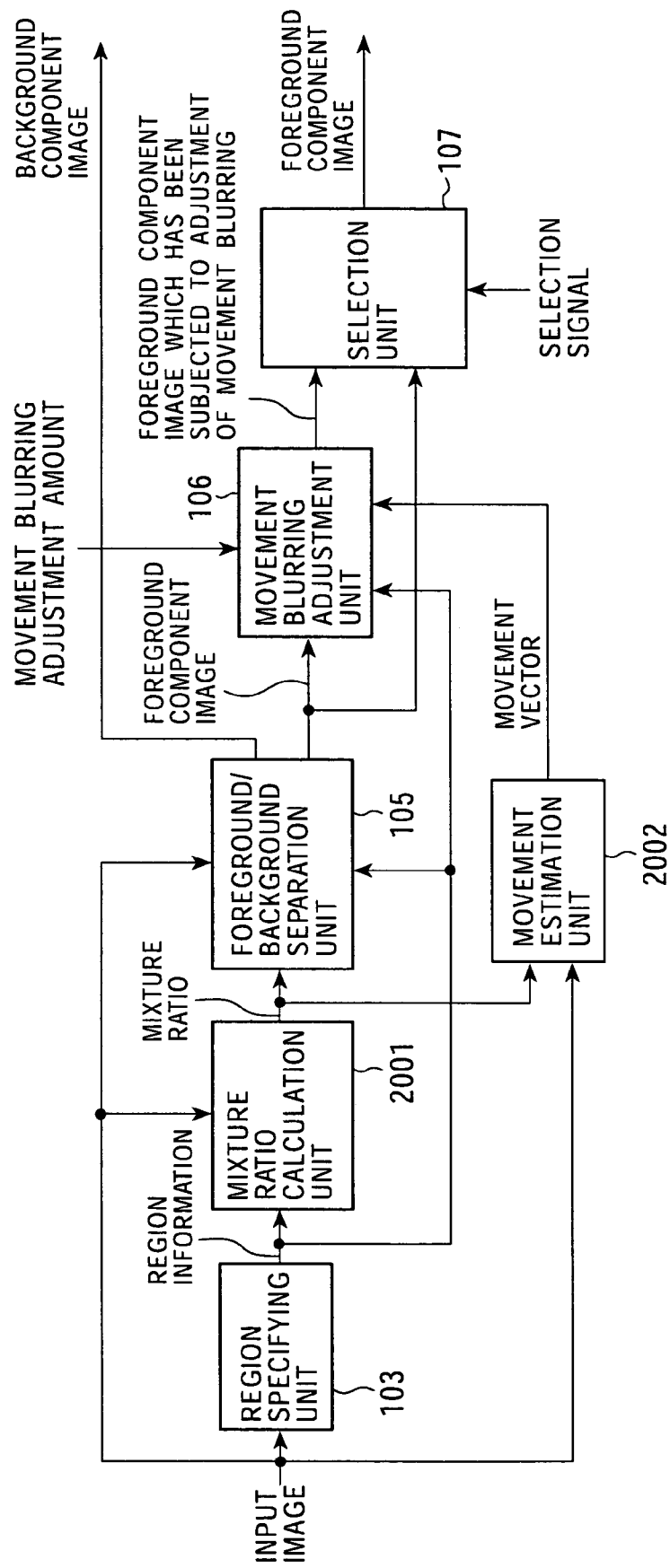
FIG. 79 is a block diagram illustrating a signal processing device.

FIG. 79 is a block diagram which illustrates a different structure of the signal processing device.

The same portions as shown in FIG. 2 are denoted by the same reference numerals, and description thereof will be omitted.

The input image supplied to the signal processing device is supplied to the region specifying unit 103, the mixture ratio calculating unit 2001, the foreground/background separation unit 105, and a movement estimation unit 2002.

The mixture ratio calculating unit 2001 calculates the mixture ratio α corresponding to the pixel included in the mixed region based upon the input image and the region information supplied from the region specifying unit 103, and supplies the calculated mixture ratio to the foreground/background separation unit 105 and the movement estimation unit 2002.

The movement estimation unit 2002 calculates the correlation value of the foreground components for multiple frames based upon the input image and the mixture ratio α supplied from the mixture ratio calculating unit 2001, and detects the movement vector of the pixel from the calculated correlation value. The movement estimation unit 2002 supplies the detected movement vector to the movement blurring adjustment unit 105.

Note that the movement estimation unit 2002 may output the detected movement vector as the movement vector which corresponds to the foreground object.

Figure 80:
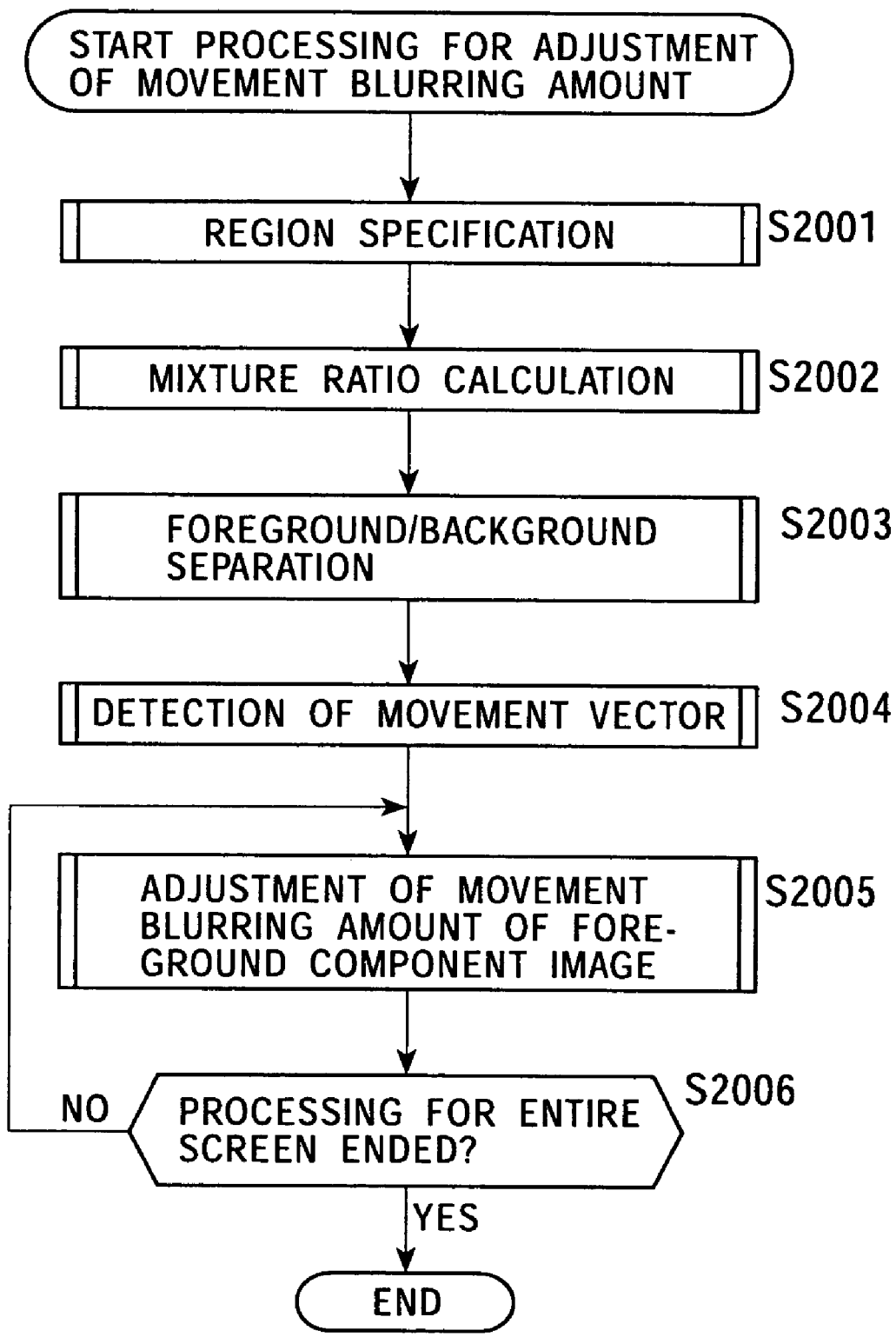
FIG. 80 is a flowchart describing processing for adjusting the amount of movement blurring.

The processing of adjustment of the movement blurring amount by the signal processing device will now be described with reference to the flowchart shown in FIG. 80. In Step S2001, the region specifying unit 103 performs processing of region specifying which generates the region information which indicates which of the foreground region, the background region, the covered background region, or the uncovered background region, each pixel of the input image belongs to, based upon the input image. The processing in Step S2001 is the same as the processing in Step S11, and accordingly description thereof will be omitted. The region specifying unit 103 supplies the generated region information to the mixture ratio calculating unit 2001.

In Step S2002, the mixture ratio calculating unit 2001 calculates the mixture ratio α for each pixel included in the mixed region based upon the input image and the region information. A detailed description of the mixture ratio calculation in Step S2002 will be made later. The mixture ratio calculating unit 2001 supplies the calculated mixture ratio α to the foreground/background separation unit 105.

In Step S2003, the foreground/background separation unit 105 extracts the foreground components from the input image based upon the region information and the mixture ratio α, and supplies those as the foreground component image to the movement blurring adjustment unit 105. The processing in Step S2003 is the same as the processing in Step S13, and accordingly detailed description thereof will be omitted.

In Step S2004, the movement estimation unit 2002 detects the movement vector corresponding to the mixed region or the foreground object based upon the input image and the mixture ratio α supplied from the mixture ratio calculating unit 2001. A detailed description of the processing for detection of the movement vector will be described later. The movement estimation unit 2002 supplies the detected movement vector to the movement blurring adjustment unit 105.

In Step S2005, the movement blurring adjustment unit 105 generates the processing increment indicating a position on an image, of the pixels arrayed sequentially in a movement direction and belonging to one of the uncovered background region, the foreground region, or the covered background region, based upon the movement vector and the region information, and adjusts the movement blurring amount contained in the foreground components corresponding to the processing increment. The processing in Step S2005 is the same as the processing in Step S214, so the detailed description of the processing will be omitted.

In Step 2006, the signal processing device judges whether or not the processing has ended for the entire screen, and in the event that judgment is made that the processing of the entire screen has not ended, the flow proceeds to Step S2005, and repeats the processing of adjustment of the movement blurring for the foreground components corresponding to the processing increment.

In Step S2006, in the event that judgment is made that the processing of the entire screen has ended, the processing ends.

As described above, the signal processing device can separate the foreground and the background, adjust the movement blurring amount contained in the foreground, and detect the movement vector. That is to say, the signal processing device can adjust the movement blurring amount included in the sampled data which is the pixel values of the foreground pixels. Also, the signal processing device can detect the movement vector, by taking the mixture of the foreground and background into consideration.

Figure 81:
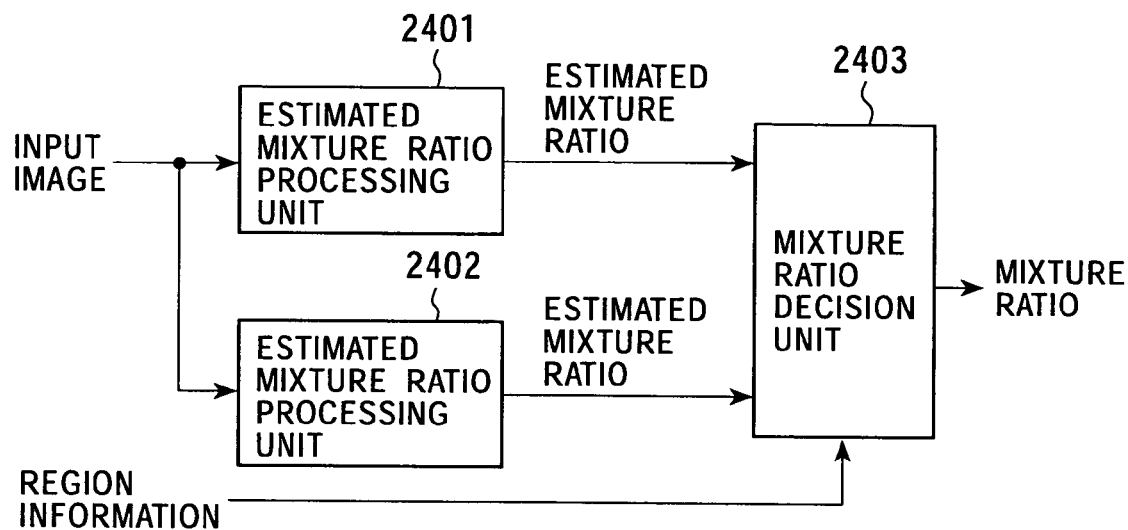
FIG. 81 is a block diagram illustrating an example of the configuration of a mixture ratio calculation unit 2001.

FIG. 81 is a block diagram which illustrates an example of the structure of the mixture ratio calculating unit 2001. An estimated mixture ratio processing unit 2401 calculates the estimated mixture ratio for each pixel by the computation corresponding to the model of the covered background region based upon the input image, and supplies the calculated mixture ratio to a mixture ratio decision unit 2403.

An estimated mixture ratio processing unit 2402 calculates the estimated mixture ratio for each pixel by computation corresponding to the model of the uncovered background region based upon the input image, and supplies the calculated estimated mixture ratio to a mixture ratio decision unit 2403.

Since an assumption may be made that the object corresponding to the foreground moves at a constant velocity, the mixture ratio α of the pixel belonging to the mixed region has the nature as described below. That is to say, the mixture ratio α changes linearly corresponding to the change of the pixel position. In the event that the change of the pixel position is one-dimensional, the change of the mixture ratio α is represented by a straight line, and in the event that the change of the pixel position is two-dimensional, the change of the mixture ratio α is represented by a plane.

Note that since the period of one frame is short, an assumption may be made that the object corresponding to the foreground is a rigid body, and moves at a constant velocity.

In this case, the inclination of the mixture ratio α is inversely proportionate to the movement amount v of the foreground within the shutter period.

Figure 82:
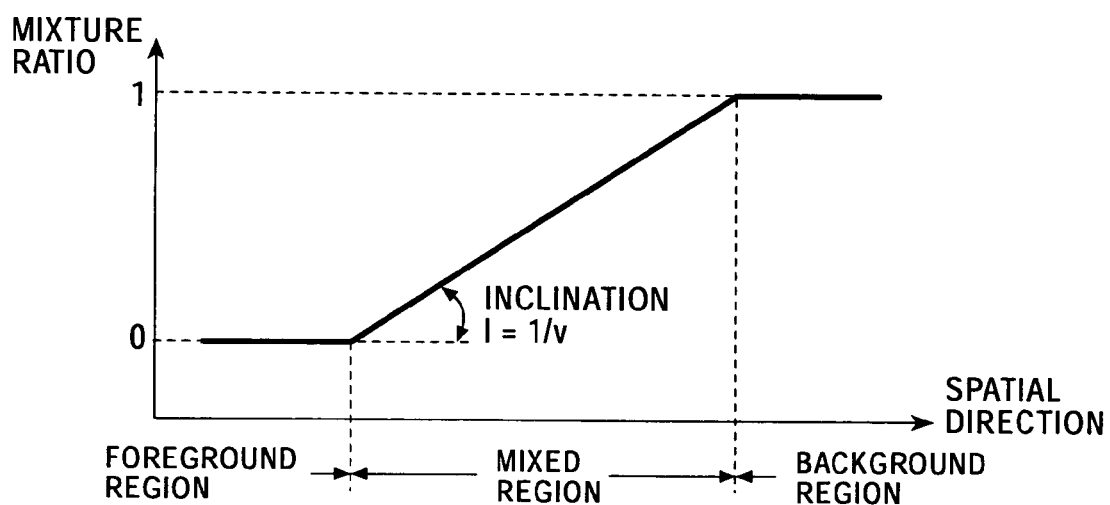
FIG. 82 is a diagram illustrating an example of an ideal mixture ratio α.

An example of the ideal mixture ratio α is illustrated in FIG. 82. The inclination 1 in the mixed region of an ideal mixture ratio α, may be represented as the reciprocal of the movement amount v.

As shown in FIG. 82, the ideal mixture ratio α has a value of 1 in the background region, has a value of 0 in the foreground region, and has a value which exceeds 0 and is less than 1 in the mixed region.

Figure 83:
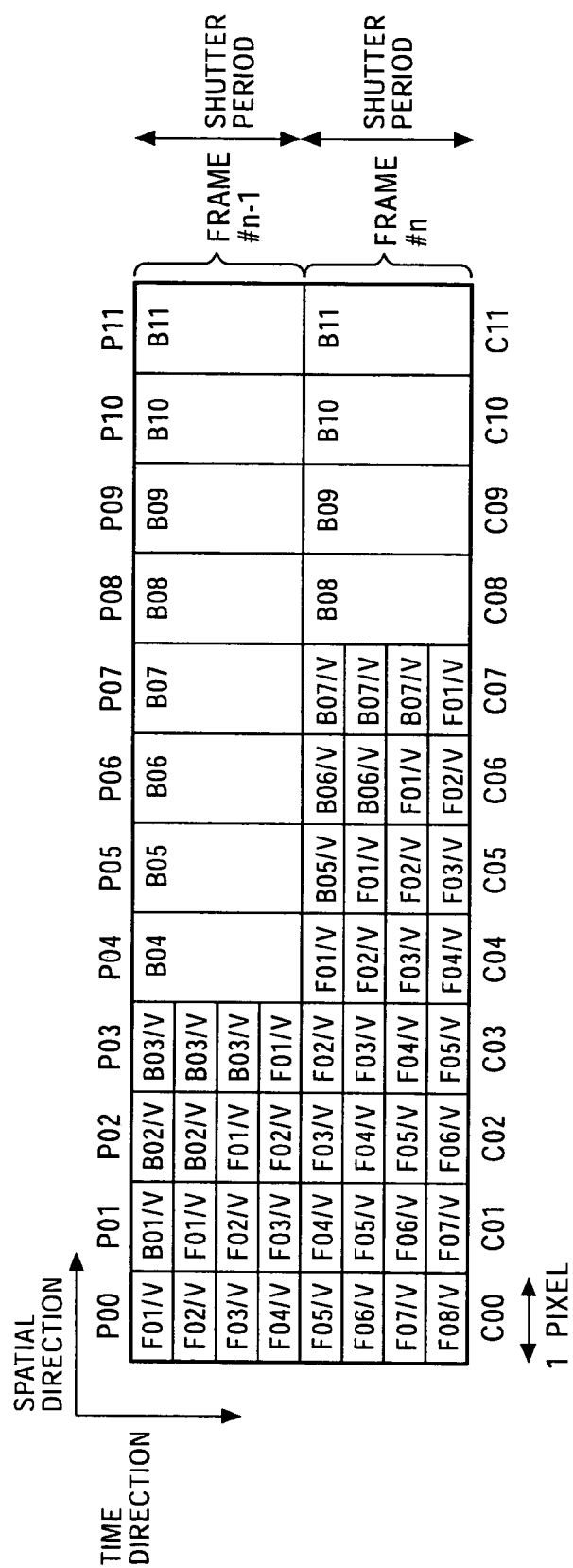
FIG. 83 is a model diagram wherein the pixel values are developed over the time direction, and periods corresponding to shutter time are divided.

With an example shown in FIG. 83, the pixel value C06 of the seventh pixel value from the left in the frame #n may be represented by Expression (72), using the pixel value P06 of the seventh pixel from the left in the frame #n−1.

$$C06 = B06/v + B06/v + F01/v + F02/v \quad (72)$$
$$= P06/v + P06/v + F01/v + F02/v$$
$$= 2/v \cdot P06 + \sum_{i=1}^{2} Fi/v$$

In Expression (72), the pixel value C06 is represented by the pixel value M of the pixel in the mixed region, and the pixel value P06 is represented by the pixel value B of the pixel in the background region. That is to say, the pixel value M of the pixel in the mixed region and the pixel value B of the pixel in the background region may be represented in Expression (73) and Expression (74), respectively.

$$M=C06 \quad (73)$$

$$B=P06 \quad (74)$$

In expression (72), 2/v corresponds to the mixture ratio α. Since the movement amount v is 4, the mixture ratio α of the seventh pixel from the left in the frame #n is 0.5.

As described above, reckoning the pixel value C in the frame #n of interest to be the pixel value in the mixed region, and the pixel value P in the frame #n−1 previous from the frame #n to be the pixel value in the background region, Expression (3) indicating the mixture ratio α may be rewritten as Expression (75).

$$C=\alpha \cdot P + f \quad (75)$$

Here, f in Expression (75) is the sum of the foreground components $\Sigma_i Fi/v$ included in the pixel of interest. The variables included in Expression (75) are the two variables of the mixture ratio α and the sum of the foreground components f.

Figure 84:
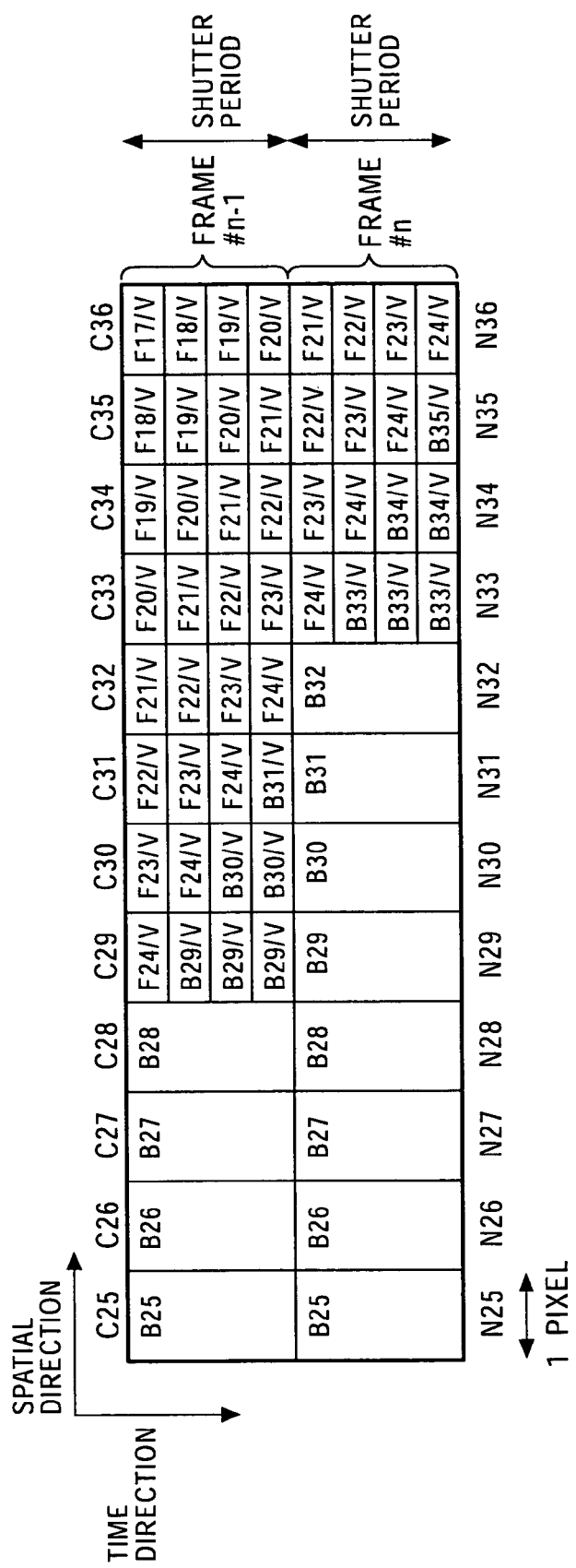
FIG. 84 is a model diagram wherein the pixel values are developed over the time direction, and periods corresponding to shutter time are divided.

Similarly, a model wherein the movement amount v in the uncovered background region is 4, the virtual dividing number in the time direction is 4, and the pixel values develop over the time direction, is illustrated in FIG. 84.

In the uncovered background region, Expression (3) indicating the mixture ratio α is represented as in Expression (76) in the same manner as with the representation in the covered background region described above, by reckoning the pixel value C in the frame #n of interest to be the pixel value of the mixed region, and the pixel value N in the frame #n+1 following the frame #n to be the pixel value in the background region.

$$C=\alpha \cdot N + f \quad (76)$$

Note that while description has been made under an assumption that the background object keeps still, Expression (72) through Expression (76) may be applied by using the pixel values of the pixels at the positions which are correlated to the background movement amount v, even if the background object moves. For example, in FIG. 83, in a case that the movement amount v of the object corresponding to the background is 2, and the virtual dividing number is 4, in the event that the object corresponding to the background moves to the right side in the drawing, the pixel value B of the pixel in the background region in Expression (74) is the pixel value P04.

Since Expression (75) and Expression (76) each contain two variables, the mixture ratio α cannot be calculated as they are. In this case, the adjacent pixels have approximately the same pixel value, since images generally have great correlation spatially.

Accordingly, the expression is transformed so as to calculate the sum of the foreground components, f, from the previous or following frame, and the mixture ratio α is calculated, since the foreground components have great correlation spatially.

Figure 85:
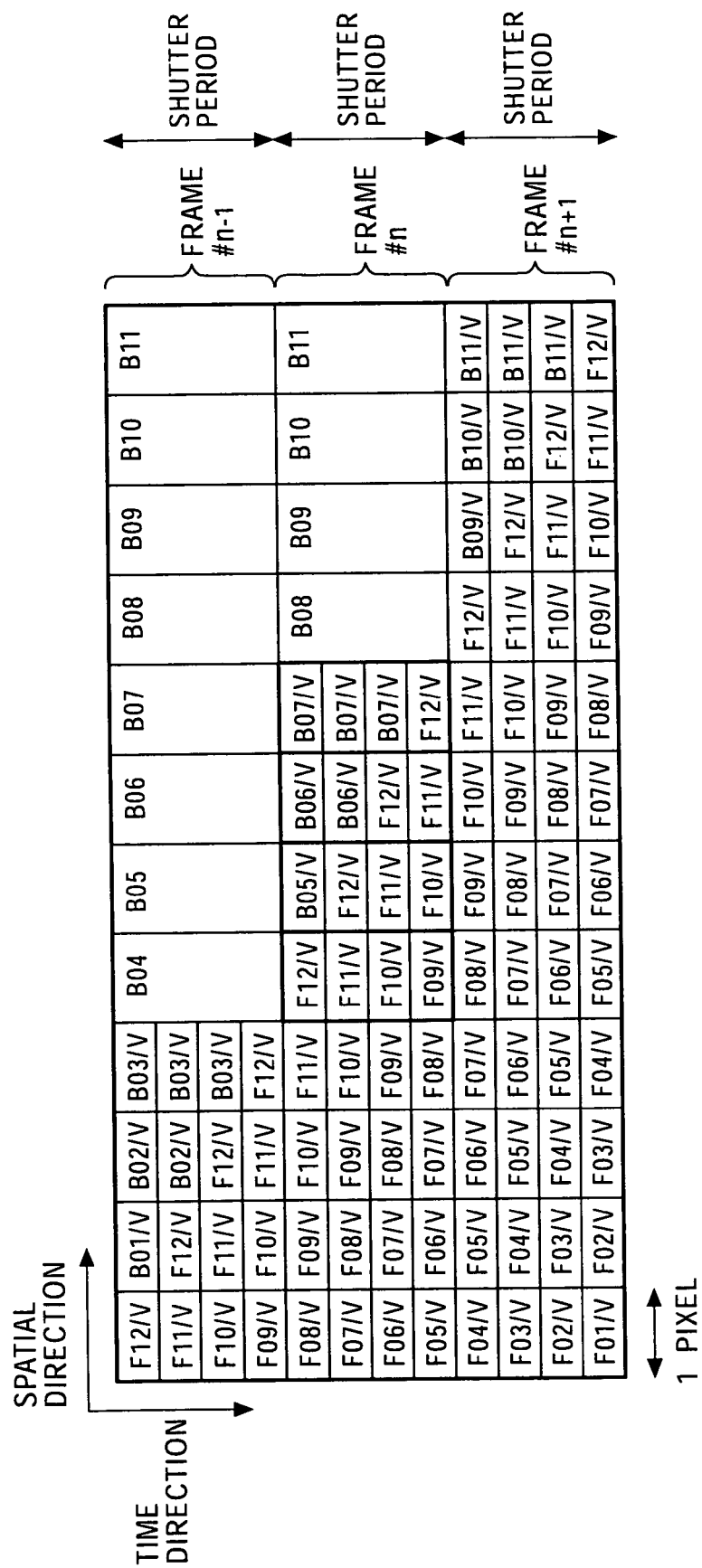
FIG. 85 is a diagram describing approximation using correlation of foreground components.

The pixel value Mc of the seventh pixel from the left in the frame #n shown in FIG. 85 may be represented in Expression (77).

$$Mc = \frac{2}{v} \cdot B06 + \sum_{i=11}^{12} Fi/v \quad (77)$$

The first argument of the right side in Expression (77), 2/v, corresponds to the mixture ratio α. The second argument of the right side in Expression (77) may be represented in Expression (78), using the pixel values in the following frame #n+1.

$$\sum_{i=11}^{12} Fi/v = \beta \cdot \sum_{i=7}^{10} Fi/v \quad (78)$$

An assumption will now be made that Expression (79) holds, using the spatial correlation of the foreground components.

$$F=F05=F06=F07=F08=F09=F10=F11=F12 \quad (79)$$

Expression (78) may be rewritten as Expression (80) using Expression (79).

$$\sum_{i=11}^{12} Fi/V = \frac{2}{v} \cdot F \quad (80)$$
$$= \beta \cdot \frac{4}{V} \cdot F$$

As a result, β may be represented in Expression (81).

$$\beta = 2/4 \quad (81)$$

In general, in the event that an assumption is made wherein the foreground components correlated to the mixed region are the same as shown in Expression (79), Expression (82) is formed by the relationship of the internal dividing ratio for all the pixel in the mixed region.

$$\beta = 1 - \alpha \quad (82)$$

In the event that Expression (82) holds, Expression (75) may develop as indicated in Expression (83).

$$C = \alpha \cdot P + f \qquad (83)$$
$$= \alpha \cdot P + (1-\alpha) \cdot \sum_{i=\gamma}^{\gamma+v-1} Fi/v$$
$$= \alpha \cdot P + (1-\alpha) \cdot N$$

Similarly, in the event that Expression (82) holds, Expression (76) may develop as indicated in Expression (84).

$$C = \alpha \cdot N + f \qquad (84)$$
$$= \alpha \cdot N + (1-\alpha) \cdot \sum_{i=\gamma}^{\gamma+v-1} Fi/v$$
$$= \alpha \cdot N + (1-\alpha) \cdot P$$

Figure 86:
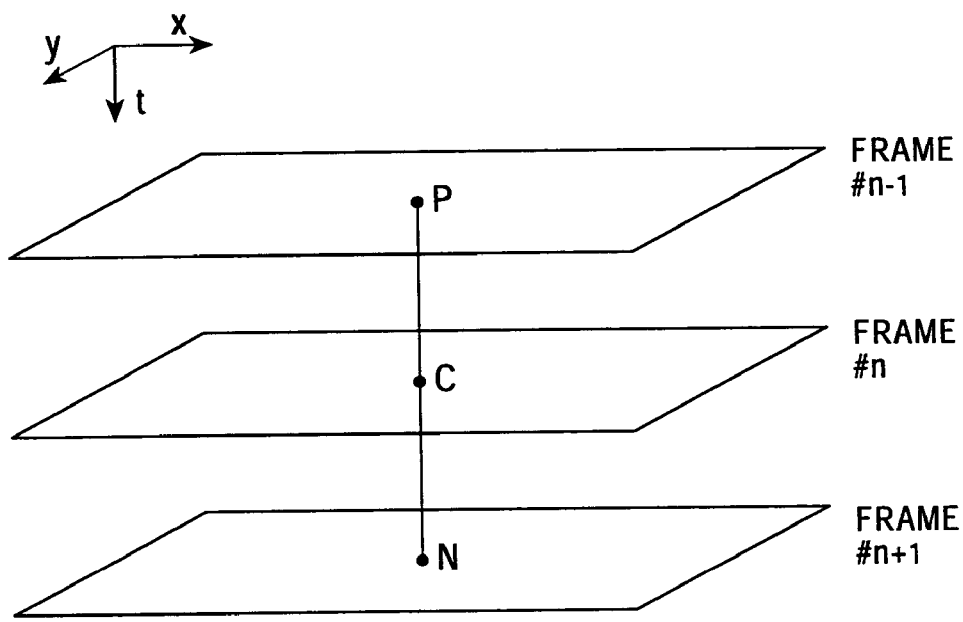
FIG. 86 is a diagram describing the relation between C, N, and P.

In Expression (83) and Expression (84), since C, N, and P are known pixel values, the variable included in Expression (83) and Expression (84) is only the mixture ratio α. The relationship between C, N, and P in Expression (83) and Expression (84) is illustrated in FIG. 86. C is the pixel value of the pixel of interest in the frame #n for calculating the mixture ratio α. N is the pixel value of the pixel in the frame #n+1, of which the position in the spatial direction corresponds to that of the pixel of interest. P is the pixel value of the pixel in the frame #n−1, of which the position in the spatial direction corresponds to that of the pixel of interest.

Accordingly, since Expression (83) and Expression (84) include one variable each, the mixture ratio α can be calculated using the pixel values in three frames. The conditions for calculating an accurate mixture ratio α by solving Expression (83) and Expression (84) is that foreground components with regard to the mixed region are the same, that is to say, in the foreground image object which has been taken in the state of the foreground object being still, the pixel values of pixels of a number double the movement amount v, which are arrayed sequentially at the boundary of the image object, corresponding to the movement direction of the foreground object, are constant.

As described above, the mixture ratio α of the pixel belonging to the covered background region is calculated by Expression (85), and the mixture ratio α belonging to the uncovered background region is calculated by Expression (86).

$$\alpha = (C-N)/(P-N) \qquad (85)$$

$$\alpha = (C-P)/(N-P) \qquad (86)$$

Figure 87:
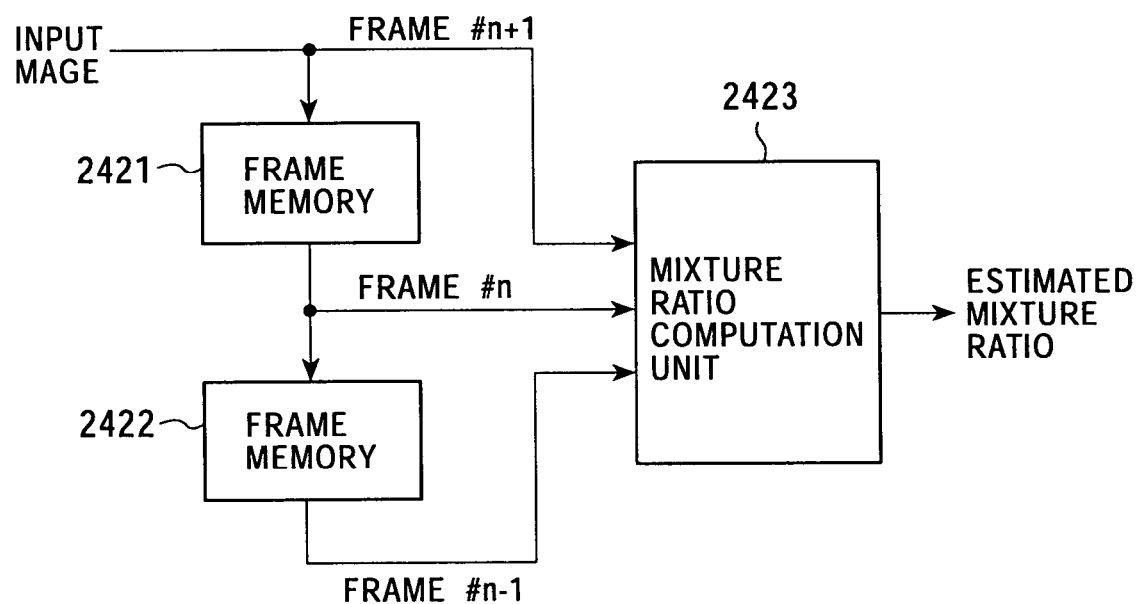
FIG. 87 is a block diagram illustrating the configuration of an estimated mixture ratio processing unit 2401.

FIG. 87 is a block diagram which illustrates the structure of the estimated mixture ratio processing unit 2401. Frame memory 2421 stores the input image in increment of frames, and supplies the frame following the frame which is input as an input image, to frame memory 2422 and a mixture ratio computation unit 2423.

The frame memory 2422 stores the input image in increment of frames, and supplies the frame following the frame supplied from the frame memory 2421, to the mixture ratio computation unit 2423.

Accordingly, in the event that the frame #n+1 is input as an input image to the mixture ratio computation unit 2423, the frame memory 2421 supplies the frame #n to the mixture ratio computation unit 2423, and the frame memory 2422 supplies the frame #n−1 to the mixture ratio computation unit 2423.

The mixture ratio computation unit 2423 calculates the estimated mixture ratio of the pixel of interest based upon the pixel value C of the pixel of interest in the frame #n, the pixel value N of the pixel in the frame #n+1 wherein the spatial position thereof corresponds to that of the pixel of interest, and the pixel value P of the pixel in the frame #n−1 wherein the spatial position thereof corresponds to that of the pixel of interest, and outputs the calculated estimated mixture ratio. For example, in the event that the background keeps still, the mixture ratio computation unit 2423 calculates the estimated mixture ratio of the pixel of interest based upon the pixel value C of the pixel of interest in the frame #n, the pixel value N of the pixel in the frame #n+1 at the same position in the frame as the pixel of interest, and the pixel value P of the pixel in the frame #n−1 at the same position in the frame as the pixel of interest, and outputs the calculated estimated mixture ratio.

As described above, the estimated mixture ratio processing unit 2401 can calculate the estimated mixture ratio based upon the input image, and supply to the mixture ratio decision unit 2403.

Note that the processing of the estimated mixture ratio processing unit 2402 is the same as that of the estimated mixture ratio processing unit 2401 except for the processing wherein while the estimated mixture ratio processing unit 2401 calculates the estimated mixture ratio of the pixel of interest by the computation represented in Expression (85), the estimated mixture ratio processing unit 2402 calculates the estimated mixture ratio of the pixel of interest by the computation represented in Expression (86), and accordingly description thereof will be omitted.

Figure 88:
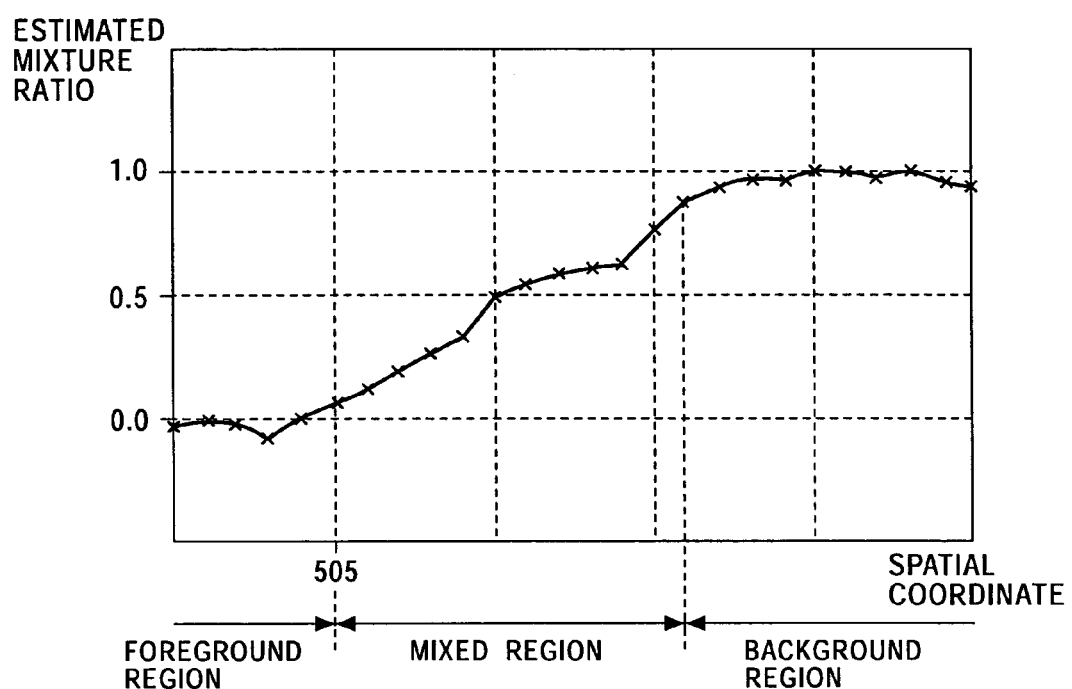
FIG. 88 is a diagram illustrating an example of an estimated mixture ratio.

FIG. 88 is a diagram which illustrates an example of the estimated mixture ratio calculated by the estimated mixture ratio processing unit 2401. The estimated mixture ratio shown in FIG. 88 indicates the results in a case wherein the foreground movement amount v corresponding to the object which moves at a constant velocity is 11, for one line.

It can be understood that the estimated mixture ratio changes approximately linearly in the mixed region, as shown in FIG. 82.

Returning to FIG. 81, the mixture ratio decision unit 2403 sets the mixture ratio α based upon the region information indicating which of the foreground region, the background region, the covered background region, or the uncovered background region, the pixel which is the object of calculation of the mixture ratio α belongs to, supplied from the region specifying unit 103. In the event that the pixel which is the object belongs to the foreground region, the mixture ratio decision unit 2403 sets the mixture ratio α to 0, and in the event that the pixel which is the object belongs to the background region, sets the mixture ratio α to 1, and in the event that the pixel which is the object belongs to the covered background region, sets the mixture ratio α to the estimated mixture ratio supplied from the estimated mixture ratio processing unit 2401, and in the event that the pixel which is the object belongs to the uncovered background region, sets the mixture ratio α to the estimated mixture ratio supplied from the estimated mixture ratio processing unit 2402. The mixture ratio decision unit 2403 outputs the mixture ratio α which is set based upon the region information.

Figure 89:
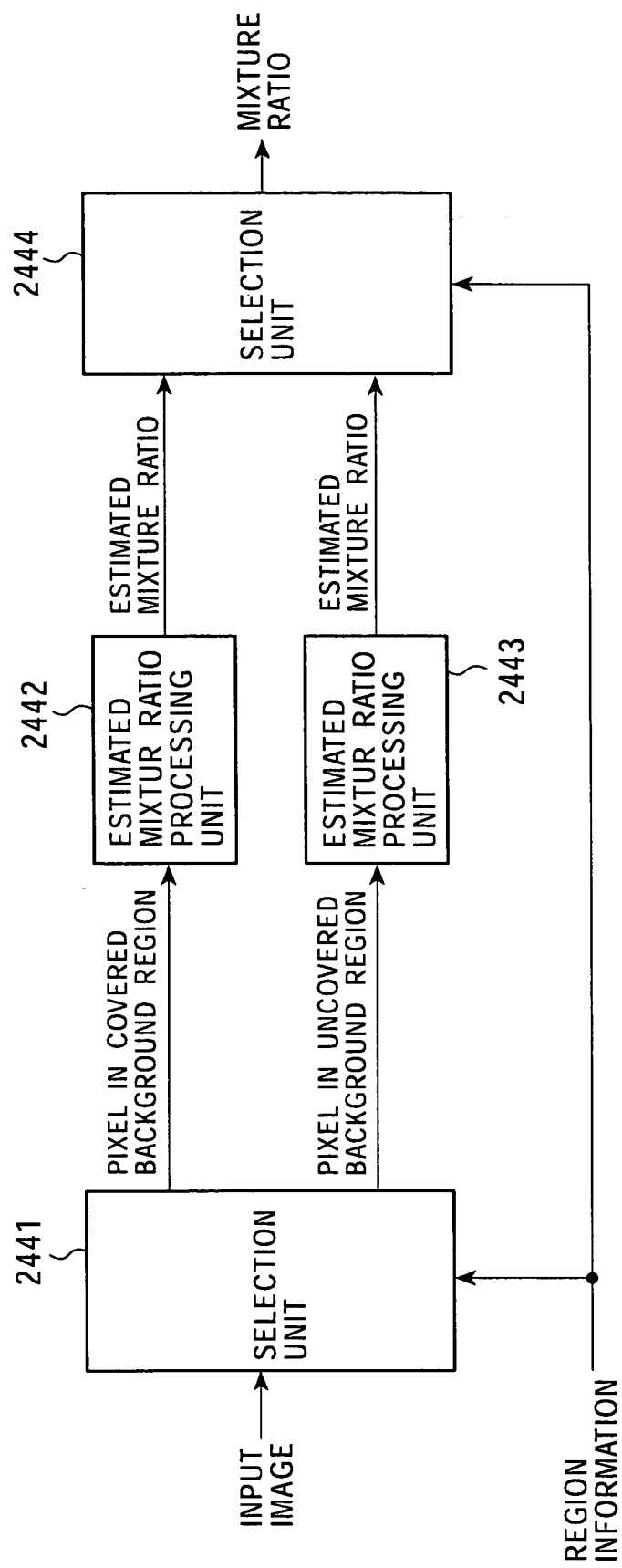
FIG. 89 is a block diagram illustrating another configuration of a mixture ratio calculation unit 2001.

FIG. 89 is a block diagram which illustrates another configuration of the mixture ratio calculating unit 2001. A selection unit 2441 supplies the pixels belonging to the covered background region and the corresponding pixels in the following and previous frames, to an estimated mixture ratio processing unit 2442, based upon the region information supplied from the region specifying unit 103. The selection unit 2441 supplies the pixels belonging to the uncovered background region and the corresponding pixels in the previous and following frames, to an estimated mixture ratio processing unit 2443, based upon the region information supplied from the region specifying unit 103.

The estimated mixture ratio processing unit 2442 calculates the estimated mixture ratio of the pixel of interest belonging to the covered background region by the computation represented in Expression (85) based upon the pixel values input from the selection unit 2441, and supplies the calculated estimated mixture ratio to a selection unit 2444.

The estimated mixture ratio processing unit 2443 calculates the estimated mixture ratio of the pixel of interest belonging to the uncovered background region by the computation represented in Expression (86) based upon the pixel values input from the selection unit 2441, and supplies the calculated estimated mixture ratio to a selection unit 2444.

In the event that the pixel which is the object belongs to the foreground region, the selection unit 2444 selects the estimated mixture ratio of 0, and sets for the mixture ratio $\alpha$, and in the event that the pixel which is the object belongs to the background region, the selection unit 2444 selects the estimated mixture ratio of 1, and sets for the mixture ratio $\alpha$, based upon the region information supplied from the region specifying unit 103. In the event that the pixel which is the object belongs to the covered background region, the selection unit 2444 selects the estimated mixture ratio supplied from the estimated mixture ratio processing unit 2442, and sets for the mixture ratio $\alpha$, and in the event that the pixel which is the object belongs to the uncovered background region, the selection unit 2444 selects the estimated mixture ratio supplied from the estimated mixture ratio processing unit 2443, and sets this for the mixture ratio $\alpha$. The selection unit 2444 outputs the mixture ratio $\alpha$ which is selected and set based upon the region information.

As described above, the mixture ratio calculating unit 2001 having a different structure shown in FIG. 89 can calculate the mixture ratio $\alpha$ for each pixel included in the image, and output the calculated mixture ratio $\alpha$.

Referring to the flowchart shown in FIG. 90, the processing of calculation of the mixture ratio $\alpha$ by the mixture ratio calculating unit 2001 of which structure is shown in FIG. 81 will be described. The processing described with reference to the flowchart shown in FIG. 90 corresponds to the processing indicated in Step S2002.

In Step S2401, the mixture ratio calculating unit 2001 obtains the region information supplied from the region specifying unit 103. In Step S2402, the estimated mixture ratio processing unit 2401 performs the processing of the computation of the estimated mixture ratio by the model corresponding to the covered background region, and supplies the calculated estimated mixture ratio to the mixture ratio decision unit 2403. A detailed description with regard to the processing of the computation of the mixture ratio estimation will be made later, with reference to the flowchart shown in FIG. 91.

In Step S2403, the estimated mixture ratio processing unit 2402 performs the processing of the computation of the estimated mixture ratio by the model corresponding to the uncovered background region, and supplies the calculated mixture ratio to the mixture ratio decision unit 2403.

In Step S2404, the mixture ratio calculating unit 2001 judges whether or not the mixture ratio $\alpha$ has been estimated for the entire frame, and in the event that judgment is made that the mixture ratio $\alpha$ has not been estimated for the entire frame, the flow returns to Step S2402, and performs the processing of estimation of the mixture ratio $\alpha$ for the following pixel.

In the event that judgment is made in Step S2404 that the mixture ratio $\alpha$ has been estimated for the entire frame, the flow proceeds to Step S2405, and the mixture ratio decision unit 2403 sets the mixture ratio $\alpha$ based upon the region information which of the foreground region, the background region, the covered background region, or the uncovered background region, the pixel belongs to, supplied from the region specifying unit 103. In the event that the pixel which is the object belongs to the foreground region, the mixture ratio decision unit 2403 sets the mixture ratio $\alpha$ to 0, in the event that the pixel which is the object belongs to the background region, sets the mixture ratio $\alpha$ to 1, in the event that the pixel which is the object belongs to the covered background region, sets the mixture ratio $\alpha$ to the estimated mixture ratio supplied from the estimated mixture ratio processing unit 2401, and in the event that the pixel which is the object belongs to the uncovered background region, sets the mixture ratio $\alpha$ to the estimated mixture ratio supplied from the estimated mixture ratio processing unit 2402, and the processing ends.

As described above, the mixture ratio calculating unit 2001 can calculate the mixture ratio $\alpha$ which is the amount of features corresponding to each pixel based upon the region information supplied from the region specifying unit 103 and the input image.

The processing of calculation of the mixture ratio $\alpha$ by the mixture ratio calculating unit 2001 of which the configuration is shown in FIG. 89, is the same as the processing described with reference to FIG. 90, and accordingly description thereof will be omitted.

A description will now be made with regard to the processing of the mixture ratio estimation by the model corresponding to the covered background region, corresponding to Step S2402 shown in FIG. 90, with reference to the flowchart shown in FIG. 91.

In Step S2421, the mixture ratio computation unit 2423 obtains the pixel value C of the pixel of interest in the frame #n, from the frame memory 2421.

In Step S2422, the mixture ratio computation unit 2423 obtains the pixel value P of the pixel in the frame #n−1 corresponding to the pixel of interest, from the frame memory 2422.

In Step S2423, the mixture ratio computation unit 2423 obtains the pixel value N of the pixel in the frame #n+1 corresponding to the pixel of interest contained in the input image.

In Step S2424, the mixture ratio computation unit 2423 computes the estimated mixture ratio based upon the pixel value C of the pixel of interest in the frame #n, the pixel value P of the pixel in the frame #n−1, and the pixel value N of the pixel in the frame #n+1.

In Step S2425, the mixture ratio computation unit 2423 judges whether or not the processing of computation of the estimated mixture ratio has ended for the entire frame, and in the event that judgment is made that the processing of computation of the estimated mixture ratio has not ended for the entire frame, the flow returns to Step S2421, and repeats the processing of calculation of the estimated mixture ratio for the following pixel.

In Step S2425, in the event that judgment is made that the processing of calculation of the estimated mixture ratio has ended for the entire frame, the processing ends.

As described above, the estimated mixture ratio processing unit 2401 can compute the estimated mixture ratio based upon the input image.

Figure 90:
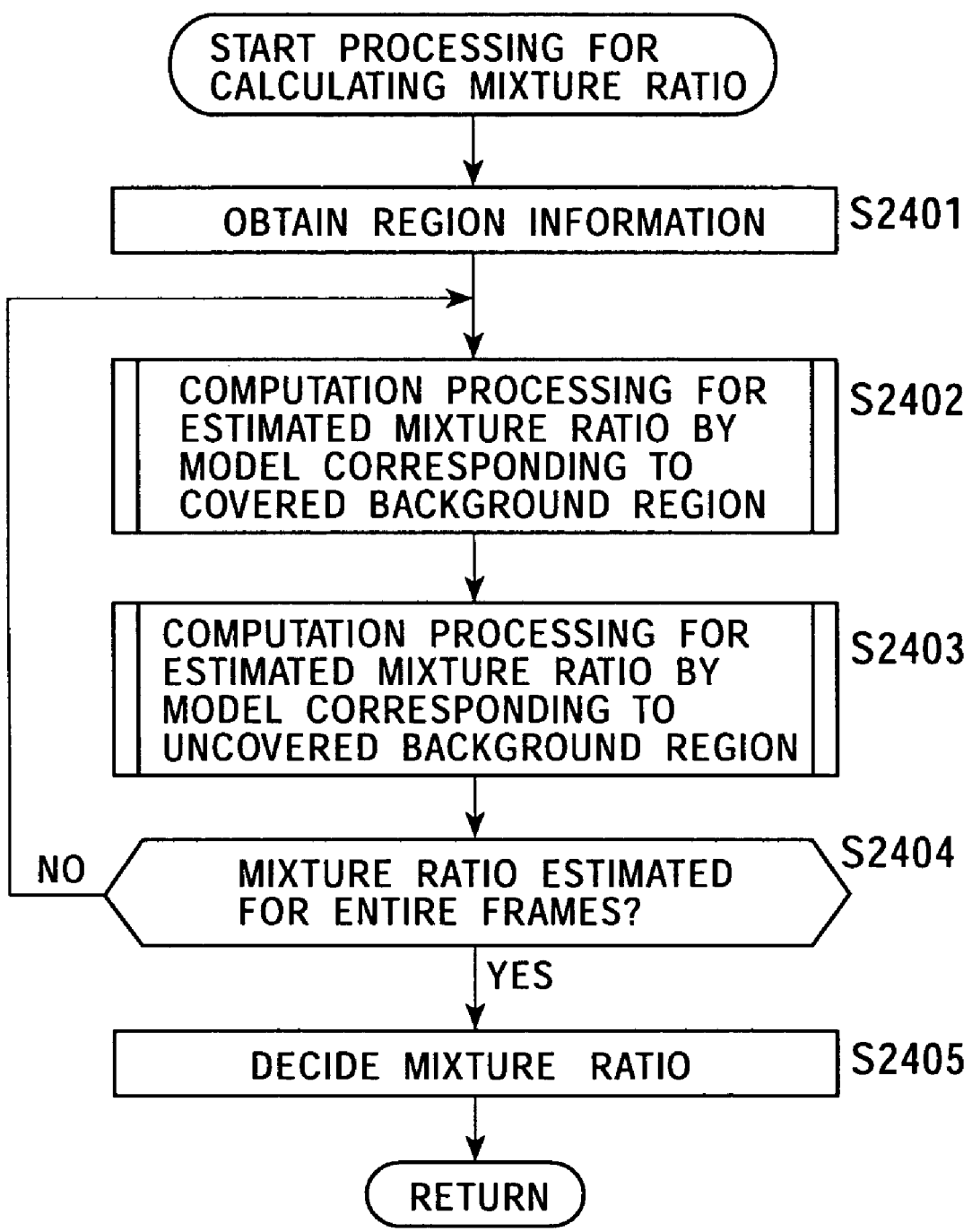
FIG. 90 is a flowchart describing processing for calculating a mixture ratio.
Figure 91:
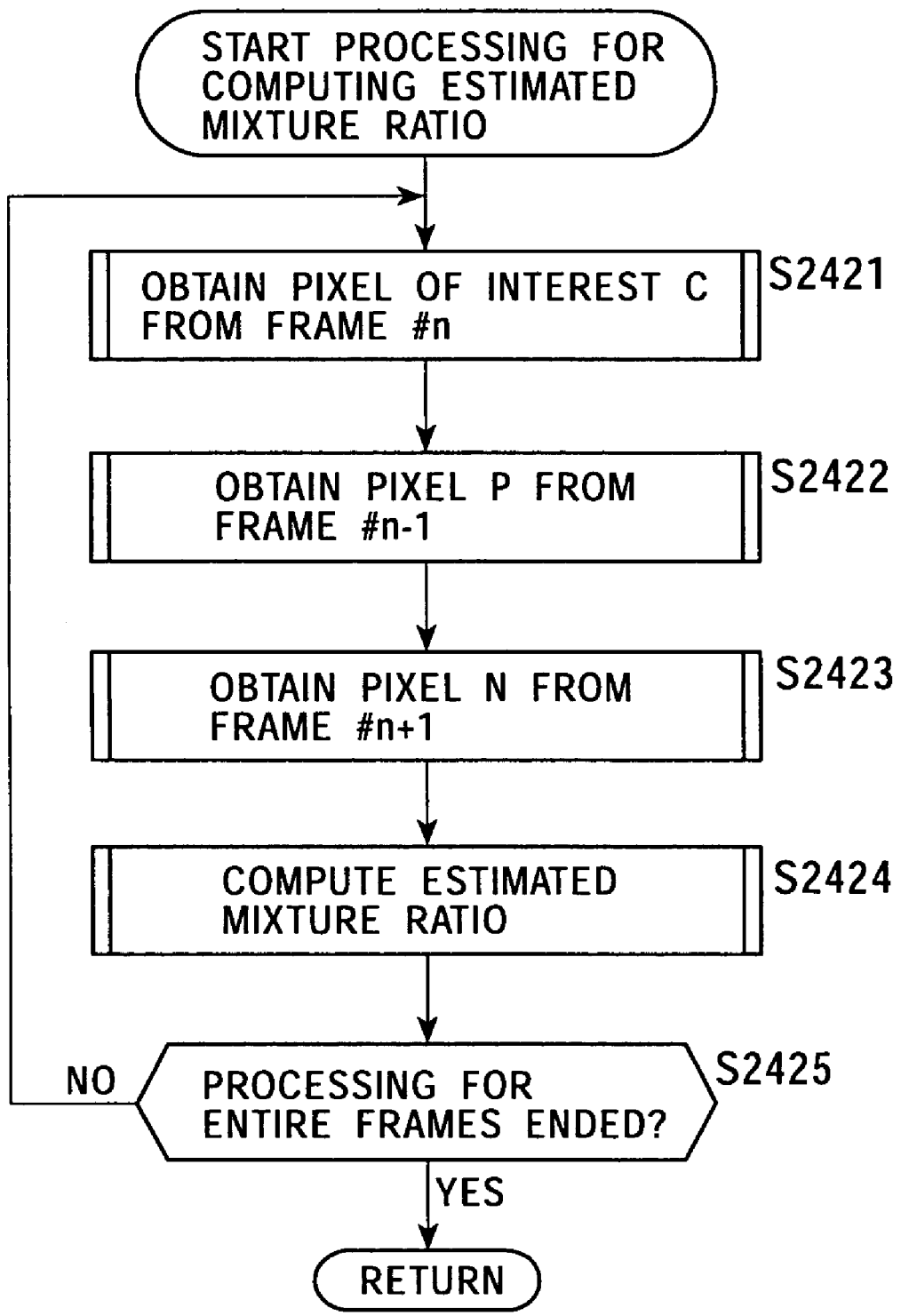
FIG. 91 is a flowchart describing processing for computing an estimated mixture ratio.

The processing of the mixture ratio estimation by the model corresponding to the uncovered background region in Step S2403 shown in FIG. 90, which uses the model corresponding to the uncovered background region, is the same as the processing indicated in the flowchart shown in FIG. 91, and accordingly description thereof will be omitted.

Note that the estimated mixture ratio processing unit 2442 and the estimated mixture ratio processing unit 2443 perform the same processing as in the flowchart shown in FIG. 91, and compute the estimated mixture ratio, and accordingly description thereof will be omitted.

Also, while description has been made with an assumption that the object corresponding to the background keeps still, the processing for obtaining the mixture ratio α described above may be applied even if the image corresponding to the background region contains movement. For example, in the event that the image corresponding to the background moves uniformly, the estimated mixture ratio processing unit 2401 shifts the entire image corresponding to the background movement, and performs processing in the same manner as in the case wherein the object corresponding to the background keeps still. Also, in the event that the image corresponding to the background contains the background movement which is different at each local position, the estimated mixture ratio processing unit 2401 selects the pixels corresponding to the background movement as the pixels corresponding to the pixels belonging to the mixed region, and performs the processing described above.

Also, an arrangement may be made wherein the mixture ratio calculating unit 2001 performs only the processing of the mixture ratio estimation by the model corresponding to the covered background region for all pixels, and outputs the calculated estimated mixture ratio as the mixture ratio α. In this case, the mixture ratio α indicates the ratio of the background components with regard to the pixels belonging to the covered background region, and indicates the ratio of the foreground components with regard to the pixels belonging to the uncovered background region. The signal processing device can obtain the mixture ratio α indicating the ratio of the background components with regard to the pixels belonging to the uncovered background region, by calculating the absolute value of the difference between the mixture ratio α calculated as described above and 1, and setting the absolute value for the mixture ratio α, with regard to the pixels belonging to the uncovered background region.

Note that similarly, an arrangement may be made wherein the mixture ratio calculating unit 2001 performs only the processing for the mixture ratio estimation by the model corresponding to the uncovered background region for all pixels, and outputs the calculated estimated mixture ratio as the mixture ratio α.

Other processing of the estimated mixture ratio calculating unit 2001 will now be described.

Using the nature that the mixture ratio α changes linearly corresponding to the position of the pixel, due to the movement of the object corresponding to the foreground at a constant velocity within the shutter period, an expression wherein the mixture ratio α and the sum of the foreground components in the spatial direction are approximated, may be formed. Using multiple sets of the pixel values of the pixels belonging to the mixed region and the pixel values of the pixel belonging to the background region, the mixture ratio α is calculated by solving the expression which approximates the mixture ratio α and the sum of the foreground components f.

In the event that the change of the mixture ratio α is approximated linearly, the mixture ratio α is represented in Expression (87).

$$\alpha = il + p \tag{87}$$

In Expression (87), i denotes the index in the spatial direction, wherein the position of the pixel of interest is 0. l is the inclination of the straight line of the mixture ratio α. p is the intercept of the straight line of the mixture ratio α, as well as the mixture ratio α of the pixel of interest. In Expression (87), while the index i is known, the inclination l and the intercept p is unknown.

Figure 92:
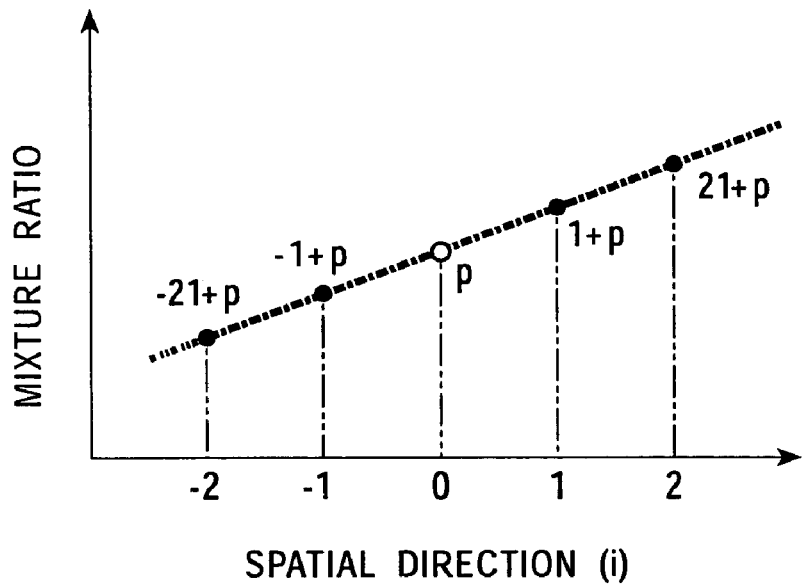
FIG. 92 is a diagram describing a straight line approximating a mixture ratio α.

The relationship between the index i, the inclination l, and the intercept p, are illustrated in FIG. 92.

A plurality of different mixture ratio α for a plurality of pixels are represented by two variables by approximating the mixture ratio α as in Expression (87). In the example shown in FIG. 92, five mixture ratios for five pixels are represented by two variables, i.e., the inclination l and the intercept p.

Figure 93:
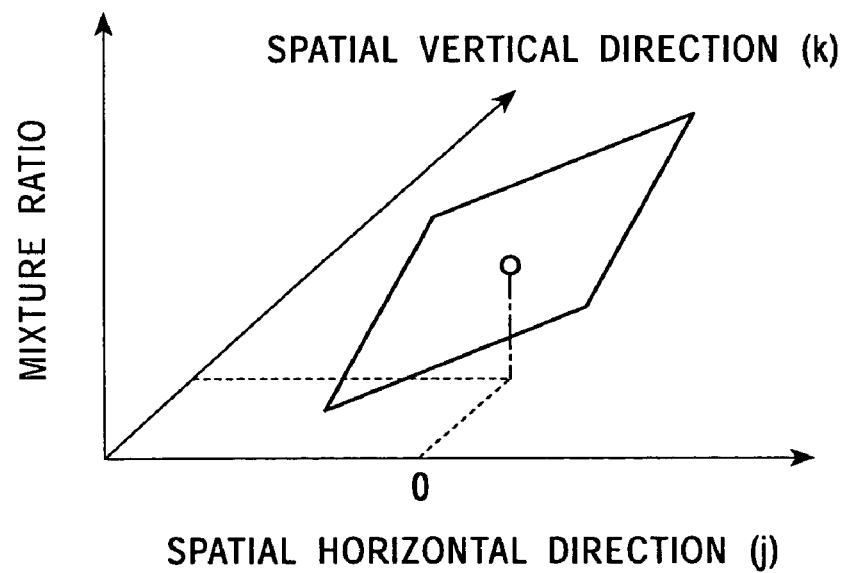
FIG. 93 is a diagram describing a plane approximating a mixture ratio α.

In the event of approximating the mixture ratio α in a planar manner shown in FIG. 93, taking the movement v corresponding to the two directions of the horizontal direction and the vertical direction of the image into consideration, the mixture ratio α is represented in Expression (88) by expanding Expression (87) onto a plane.

$$\alpha = jm + kq + p \tag{88}$$

In Expression (88), j is the index in the horizontal direction wherein the position of pixel of interest is 0, and k is the index in the vertical direction. m is the inclination of the plane of the mixture ratio α in the horizontal direction, and q is the inclination of the plane of the mixture ratio α in the vertical direction. Symbol p is the intercept of the plane of the mixture ratio α.

For example, in the frame #n shown in FIG. 83, Expression (89) through Expression (91) holds for C05 through C07, respectively.

$$C05 = \alpha 05 \cdot B05/v + f05 \tag{89}$$

$$C06 = \alpha 06 \cdot B06/v + f06 \tag{90}$$

$$C07 = \alpha 07 \cdot B07/v + f07 \tag{91}$$

Making an assumption that the foreground components generally agree, i.e., F01 through F03 are the same, and F01 through F03 are written as Fc, Expression (92) holds.

$$f(x) = (1 - \alpha(x)) \cdot Fc \tag{92}$$

In Expression (92), x denotes the position in the spatial direction.

Rewriting α(x) as Expression (88), Expression (92) may be represented as Expression (93).

$$\begin{aligned} f(x) &= (1 - (jm + kq + p)) \cdot Fc \\ &= j \cdot (-m \cdot Fc) + k \cdot (-q \cdot Fc) + ((1 - p) \cdot Fc) \\ &= js + kt + u \end{aligned} \tag{93}$$

In Expression (93), (−m·Fc), (−q·Fc), and (1−p)·Fc are rewritten as Expression (94) through Expression (96).

$$s = -m \cdot Fc \tag{94}$$

$$t = -q \cdot Fc \tag{95}$$

$$u = (1 - p) \cdot Fc \tag{96}$$

In Expression (93), j is the index in the horizontal direction wherein the position of pixel of interest is 0, and k is the index in the vertical direction.

As described above, since an assumption may be made that the object corresponding to the foreground object moves at a constant velocity within the shutter period, and the components corresponding to the foreground generally agree, the sum of the foreground components is approximated in Expression (93).

Note that in the event of approximating the mixture ratio α linearly, the sum of the foreground components are represented in Expression (97).

$$f(x) = is + u \tag{97}$$

Rewriting the mixture ratio α and the sum of the foreground components in Expression (77) using Expression (88) and Expression (93), the pixel value M is represented as in Expression (98).

$$\begin{aligned} M &= (jm + kq + p) \cdot B + js + kt + u \\ &= jB \cdot m + kB \cdot q + B \cdot p + j \cdot s + k \cdot t + u \end{aligned} \tag{98}$$

In Expression (98), the unknown variables are the six values of the inclination of the plane of the mixture ratio α in the horizontal direction, m, the inclination of the plane of the mixture ratio α in the vertical direction, q, the cuts of the plane of the mixture ratio α, p, s, and t, and u.

Setting the pixel value M and pixel value B for Expression (98) corresponding to the pixels near the pixel of interest, the mixture ratio α is calculated by solving multiple expressions which the pixel value M and the pixel value B has been set for, by the least square method.

For example, with the index j of the pixel of interest in the horizontal direction as 0, with the index k of the pixel of interest in the vertical direction as 0, and setting the pixel value M or the pixel value B for the normal expression represented in Expression (98) with regard to 3×3 pixels near the pixel of interest, Expression (99) through Expression (107) are obtained.

$$M_{-1,-1} = (-1) \cdot B_{-1,-1} \cdot m + (-1) \cdot B_{-1,-1} \cdot q + B_{-1,-1} \cdot p + (-1) \cdot s + (-1) \cdot t + u \tag{99}$$

$$M_{0,-1} = (0) \cdot B_{0,-1} \cdot m + (-1) \cdot B_{0,-1} \cdot q + B_{0,-1} \cdot p + (0) \cdot s + (-1) \cdot t + u \tag{100}$$

$$M_{+1,-1} = (+1) \cdot B_{+1,-1} \cdot m + (-1) \cdot B_{+1,-1} \cdot q + B_{+1,-1} \cdot p + (+1) \cdot s + (-1) \cdot t + u \tag{101}$$

$$M_{-1,0} = (-1) \cdot B_{-1,0} \cdot m + (0) \cdot B_{-1,0} \cdot q + B_{-1,0} \cdot p + (-1) \cdot s + (0) \cdot t + u \tag{102}$$

$$M_{0,0} = (0) \cdot B_{0,0} \cdot m + (0) \cdot B_{0,0} \cdot q + B_{0,0} \cdot p + (0) \cdot s + (0) \cdot t + u \tag{103}$$

$$M_{+1,0} = (+1) \cdot B_{+1,0} \cdot m + (0) \cdot B_{+1,0} \cdot q + B_{+1,0} \cdot p + (+1) \cdot s + (0) \cdot t + u \tag{104}$$

$$M_{-1,+1} = (-1) \cdot B_{-1,+1} \cdot m + (+1) \cdot B_{-1,+1} \cdot q + B_{-1,+1} \cdot p + (-1) \cdot s + (+1) \cdot t + u \tag{105}$$

$$M_{0,+1} = (0) \cdot B_{0,+1} \cdot m + (+1) \cdot B_{0,+1} \cdot q + B_{0,+1} \cdot p + (0) \cdot s + (+1) \cdot t + u \tag{106}$$

$$M_{+1,+1} = (+1) \cdot B_{+1,+1} \cdot m + (+1) \cdot B_{+1,+1} \cdot q + B_{+1,+1} \cdot p + (+1) \cdot s + (+1) \cdot t + u \tag{107}$$

Since the index of the pixel of interest in the horizontal direction, j, is 0, and the index in the vertical direction, k, is 0, the mixture ratio α of the pixel of interest is equal to the value wherein j=0 and k=0, from Expression (88), i.e., the intercept p.

Accordingly, the intercept p can be output as the mixture ratio α by calculating the inclination in the horizontal direction, m, the inclination in the vertical direction, q, the intercept p, s, t, and u, by the least square method, based upon the nine expressions of Expression (99) through Expression (107).

More specific procedures for calculating the mixture ratio α by applying the least square method will now be described.

Representing the index i and the index k with one index x, the relationship between the index i, the index k, and the index x, is represented in Expression (108).

$$x = (j+1) \cdot 3 + (k+1) \tag{108}$$

The inclination in the horizontal direction, m, the inclination in the vertical direction, q, the intercept p, s, t, and u, are represented by variables, w0, w1, w2, w3, w4, and w5, respectively, and jB, kB, B, j, k, and l are represented by a0, a1, a2, a3, a4, and a5, respectively. Taking the margin of error ex into consideration, Expression (99) through Expression (107) are rewritten as Expression (109).

$$Mx = \sum_{y=0}^{5} ay \cdot wy + ex \tag{109}$$

In Expression (109), x denotes one of the integers between 0 and 8.

Expression (110) may be derived from Expression (109).

$$ex = Mx - \sum_{y=0}^{5} ay \cdot wy \tag{110}$$

To apply the least square method, the sum of squares of margin of error E is defined as represented in Expression (111).

$$E = \sum_{x=0}^{8} ex^2 \tag{111}$$

To minimize the margin of error, the partial derivative from the variable Wv as to the squared-sum of the margin of error E should be 0. Where v is one of the integers between 0 through 5. Accordingly, wy is calculated so as to satisfy Expression (112).

$$\begin{aligned} \frac{\partial E}{\partial wv} &= 2 \cdot \sum_{x=0}^{8} ex \cdot \frac{\partial ex}{\partial wv} \\ &= 2 \cdot \sum_{x=0}^{8} ex \cdot av = 0 \end{aligned} \tag{112}$$

Substituting Expression (110) for Expression (112), Expression (113) is obtained.

$$\sum_{x=0}^{8}\left(av\cdot\sum_{y=0}^{5}ay\cdot wy\right)=\sum_{x=0}^{8}av\cdot Mx \qquad (113)$$

Applying, for example, the sweeping method (Gauss-Jordan elimination) and so forth, to the normal expression which consists of six expressions which is obtained by substituting one of the integers between 0 and 5, for v in Expression (113), wy is calculated. As described above, w0 denotes the inclination in the horizontal direction, m, w1 denotes the inclination in the vertical direction, q, w3 denotes the intercept p, w 3 denotes s, w4 denotes t, and w5 denotes u.

As described above, the inclination in the vertical direction, m, the inclination in the vertical direction, the intercept p, s, t, and u may be calculated by applying the least square method to the expression wherein the pixel value M and the pixel value B is set.

Here, the intercept p is the mixture ratio α at the point wherein the index i and the index k are 0, i.e., at the center position, and accordingly, this is output.

In the description corresponding to Expression (99) through Expression (107), while description has been made with the pixel value of the pixel included in the mixed region as M, and the pixel value of the pixel included in the background region as B, the normal expression needs to be formed for each case of the pixel of interest being included in the covered background region, and being included in the uncovered background region.

For example, in a case of calculating the mixture ratio α of the pixel included in the covered background region of the frame #n shown in FIG. 83, the pixels of the frame #n, C04 through C08, and the pixel values of the pixels of the frame #n−1, P04 through P08, are set for the normal expression.

In a case of calculating the mixture ratio α of the pixel included in the uncovered background region of the frame #n shown in FIG. 84, the pixels of the frame #n, C28 through C32, and the pixel values of the pixels of the frame #n+1, N28 through N32, are set for the normal expression.

Figure 94:
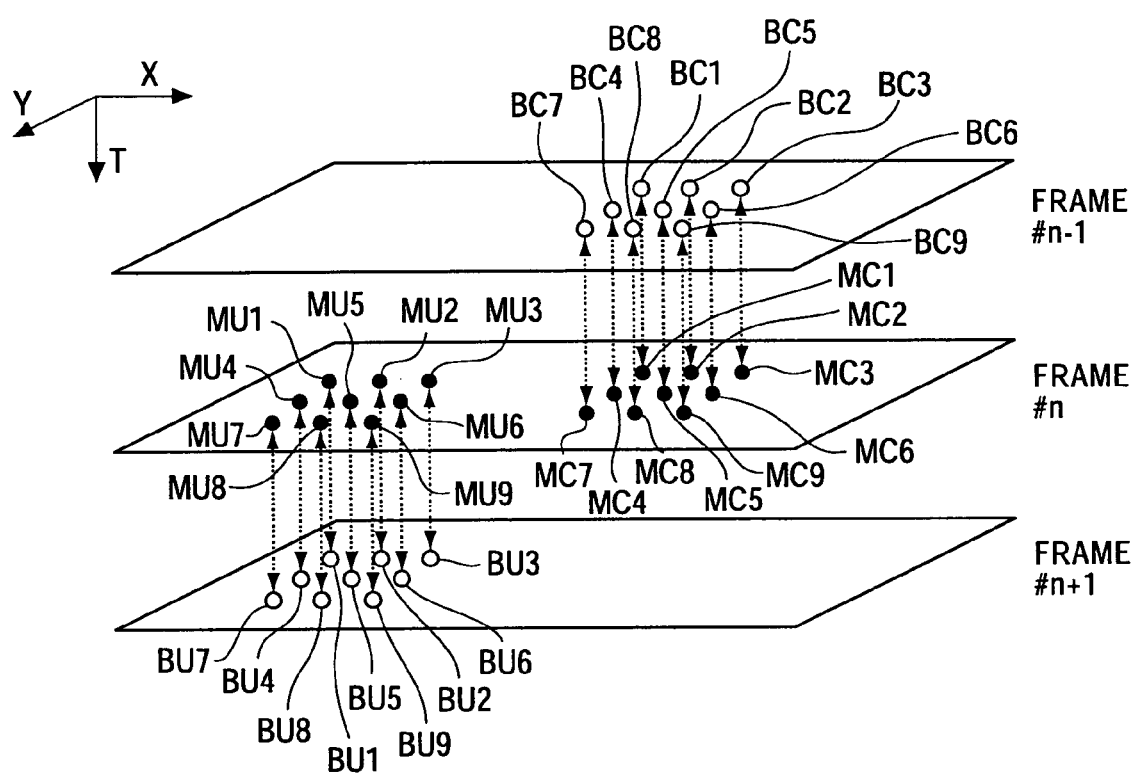
FIG. 94 is a diagram describing how pixels in multiple frames correspond at the time of calculating the mixture ratio α.

Also, for example, in the event of calculating the mixture ratio α of the pixel included in the covered background region shown in FIG. 94, Expression (114) through Expression (122) described below may be formed. The pixel value of the pixel for calculation of the mixture ratio α is Mc5. In FIG. 94, white circles indicate the pixels which are regarded as backgrounds.

$Mc1=(-1)\cdot Bc1\cdot m+(-1)\cdot Bc1\cdot q+Bc1\cdot p+(-1)\cdot s+(-1)\cdot t+u$ (114)

$Mc2=(0)\cdot Bc2\cdot m+(-1)\cdot Bc2\cdot q+Bc2\cdot p+(0)\cdot s+(-1)\cdot t+u$ (115)

$Mc3=(+1)\cdot Bc3\cdot m+(-1)\cdot Bc3\cdot q+Bc3\cdot p+(+1)\cdot s+(-1)\cdot t+u$ (116)

$Mc4=(-1)\cdot Bc4\cdot m+(0)\cdot Bc4\cdot q+Bc4\cdot p+(-1)\cdot s+(0)\cdot t+u$ (117)

$Mc5=(0)\cdot Bc5\cdot m+(0)\cdot Bc5\cdot q+Bc5\cdot p+(0)\cdot s+(0)\cdot t+u$ (118)

$Mc6=(+1)\cdot Bc6\cdot m+(0)\cdot Bc6\cdot q+Bc6\cdot p+(+1)\cdot s+(0)\cdot t+u$ (119)

$Mc7=(-1)\cdot Bc7\cdot m+(+1)\cdot Bc7\cdot q+Bc7\cdot p+(-1)\cdot s+(+1)\cdot t+u$ (120)

$Mc8=(0)\cdot Bc8\cdot m+(+1)\cdot Bc8\cdot q+Bc8\cdot p+(0)\cdot s+(+1)\cdot t+u$ (121)

$Mc9=(+1)\cdot Bc9\cdot m+(+1)\cdot Bc9\cdot q+Bc9\cdot p+(+1)\cdot s+(+1)\cdot t+u$ (122)

In the event of calculating the mixture ratio α of the pixel included in the covered background region in the frame #n, the pixel values Bc1 through Bc9 of the pixels in the background region in the frame #n−1 corresponding to the pixels in the frame #n, are used in Expression (114) through Expression (122).

In the event of calculating the mixture ratio α of the pixel included in the uncovered background region shown in FIG. 94, Expression (123) through Expression (131) described below may be formed. The pixel value of the pixel for calculation of the mixture ratio α is Mu5.

$Mu1=(-1)\cdot Bu1\cdot m+(-1)\cdot Bu1\cdot q+Bu1\cdot p+(-1)\cdot s+(-1)\cdot t+u$ (123)

$Mu2=(0)\cdot Bu2m+(-1)\cdot Bu2\cdot q+Bu2\cdot p+(0)\cdot s+(-1)\cdot t+u$ (124)

$Mu3=(+1)\cdot Bu3m+(-1)\cdot Bu3\cdot q+Bu3\cdot p+(+1)\cdot s+(-1)\cdot t+u$ (125)

$Mu4=(-1)\cdot Bu4m+(0)\cdot Bu4\cdot q+Bu4\cdot p+(-1)\cdot s+(0)\cdot t+u$ (126)

$Mu5=(0)\cdot Bu5m+(0)\cdot Bu5\cdot q+Bu5\cdot p+(0)\cdot s+(0)\cdot t+u$ (127)

$Mu6=(+1)\cdot Bu6m+(0)\cdot Bu6\cdot q+Bu6\cdot p+(+1)\cdot s+(0)\cdot t+u$ (128)

$Mu7=(-1)\cdot Bu7m+(+1)\cdot Bu7\cdot q+Bu7\cdot p+(-1)\cdot s+(+1)\cdot t+u$ (129)

$Mu8=(0)\cdot Bu8m+(+1)\cdot Bu8\cdot q+Bu8\cdot p+(0)\cdot s+(+1)\cdot t+u$ (130)

$Mu9=(+1)\cdot Bu9m+(+1)\cdot Bu9\cdot q+Bu9\cdot p+(+1)\cdot s+(+1)\cdot t+u$ (131)

In the event of calculating the mixture ratio α of the pixel included in the uncovered background region in the frame #n, the pixel values Bu1 through Bu9 of the pixels in the background region in the frame #n+1 corresponding to the pixels in the frame #n, are used in Expression (123) through Expression (131).

Figure 95:
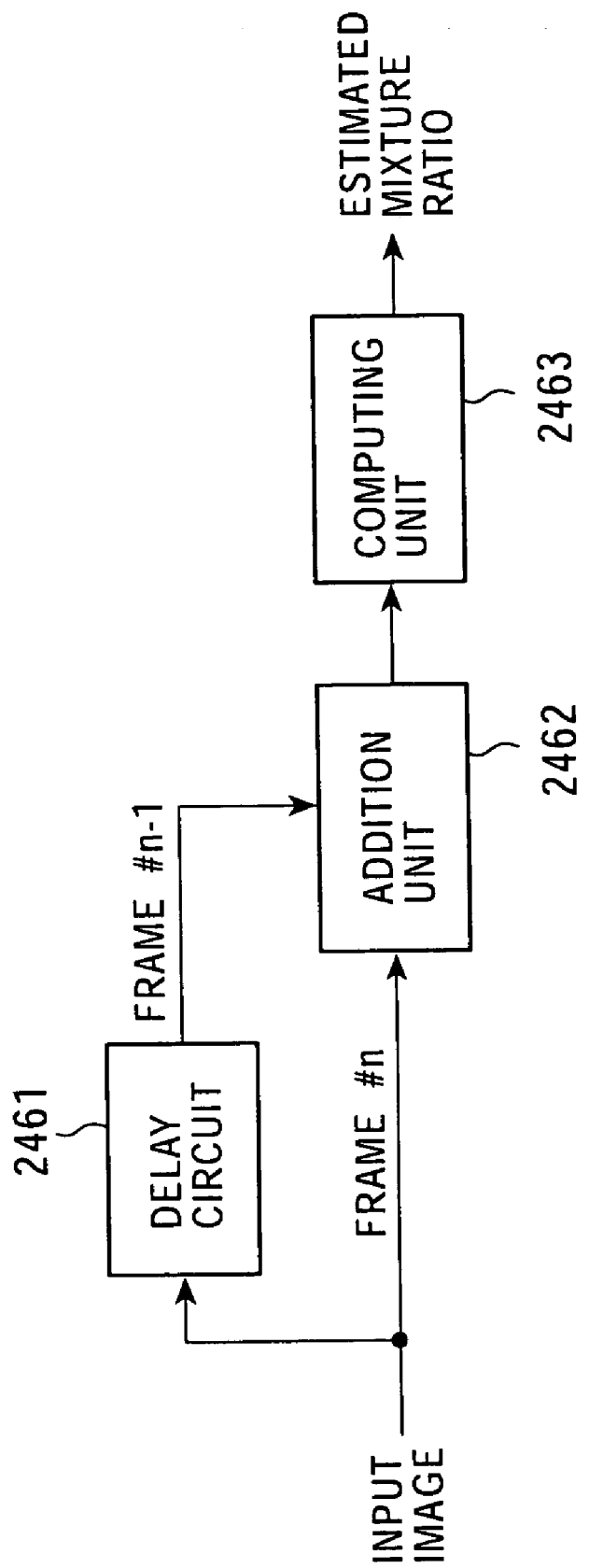
FIG. 95 is a block diagram illustrating another configuration of the mixture ratio estimation processing unit 401.

FIG. 95 is a block diagram which illustrates the configuration of the estimated mixture ratio processing unit 2401. The image input to the estimated mixture ratio processing unit 2401 is supplied to a delay circuit 2461 and an addition unit 2462.

The delay circuit 2461 delays the input image by one frame, and supplies to the addition unit 2462. At the point that the frame #n is input to the addition unit 2462 as an input image, the delay circuit 2461 supplies the frame #n−1 to the addition unit 2462.

The addition unit 2462 sets the pixel values of the pixels near the pixel for calculation of the mixture ratio α, and the pixel values of the frame #n−1, for the normal expression. For example, the addition unit 2462 sets the pixel values Mc1 through Mc9, and the pixel values Bc1 through Bc9 for the normal expression based upon Expression (114) through Expression (122). The addition unit 2462 supplies the normal expression for which the pixel values have been set, to a computation unit 2463.

The computation unit 2463 calculates the estimated mixture ratio by solving the normal expression supplied from the addition unit 2462 by the sweeping method or the like, and outputs the calculated estimated mixture ratio.

As described above, the estimated mixture ratio processing unit 2401 can calculate the estimated mixture ratio based upon the input image, and supply to the mixture ratio decision unit 2403.

Note that the estimated mixture ratio processing unit 2402 has the same structure as the estimated mixture ratio processing unit 2401, and accordingly description thereof will be omitted.

Figure 96:
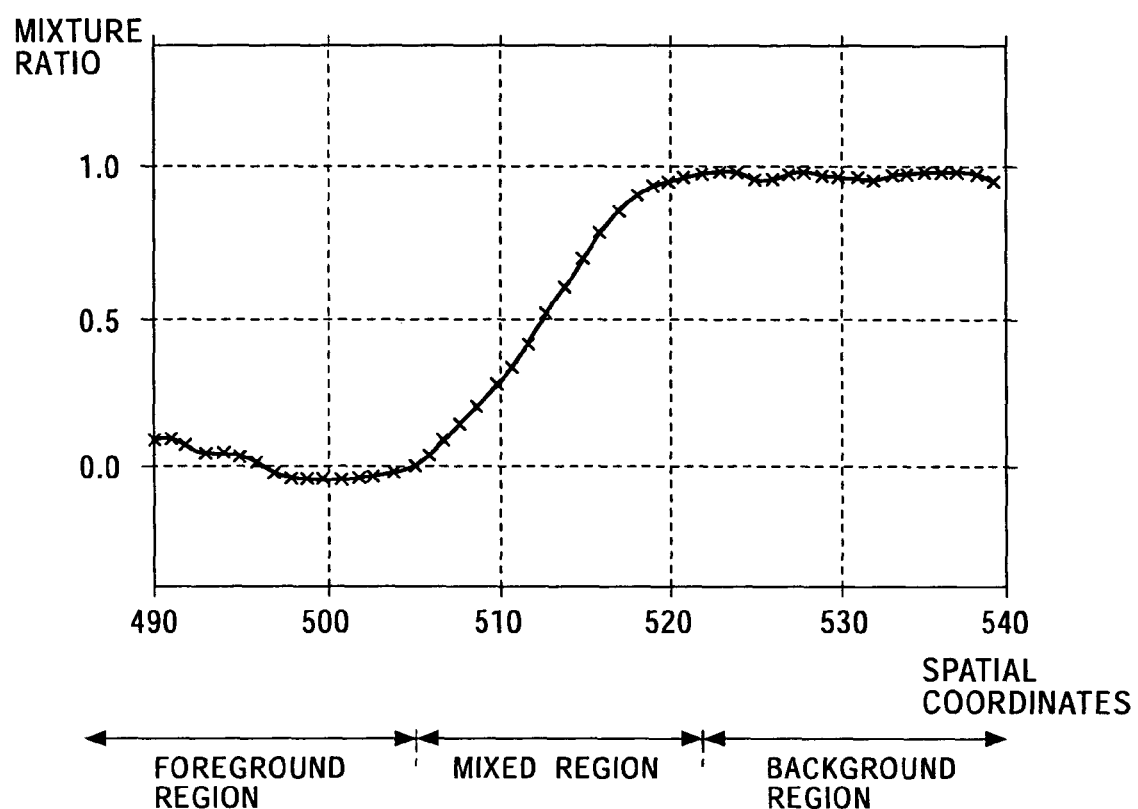
FIG. 96 is a diagram illustrating an example of an estimated mixture ratio.

FIG. 96 is a diagram which illustrates an example of the estimated mixture ratio calculated by the estimated mixture ratio processing unit 2401. FIG. 96 illustrates the estimated mixture ratio with regard to one line, wherein the movement v of the foreground corresponding to the object which moves at a constant velocity is 11, and the results are calculated by the expression generated in increments of blocks 7×7 pixels.

It can be understood that the estimated mixture ratio changes approximately linearly in the mixed region as shown in FIG. 82.

The mixture ratio decision unit 2403 sets the mixture ratio based upon the region information which of the foreground region, the background region, the covered background region, or the uncovered background region the pixel for calculation of the mixture ratio belongs to, supplied from the region specifying unit 103. In the event that the pixel which is the object belongs to the foreground region, the mixture ratio decision unit 2403 sets the mixture ratio to 0, in the event that the pixel which is the object belongs to the background region, sets the mixture ratio to 1, in the event that the pixel which is the object belongs to the covered background region, sets the mixture ratio to the estimated mixture ratio supplied from the estimated mixture ratio processing unit 2401, and in the event that the pixel which is the object belongs to the uncovered background region, sets the mixture ratio to the estimated mixture ratio supplied from the estimated mixture ratio processing unit 2402. The mixture ratio decision unit 2403 outputs the mixture ratio which is set based upon the region information.

Figure 97:
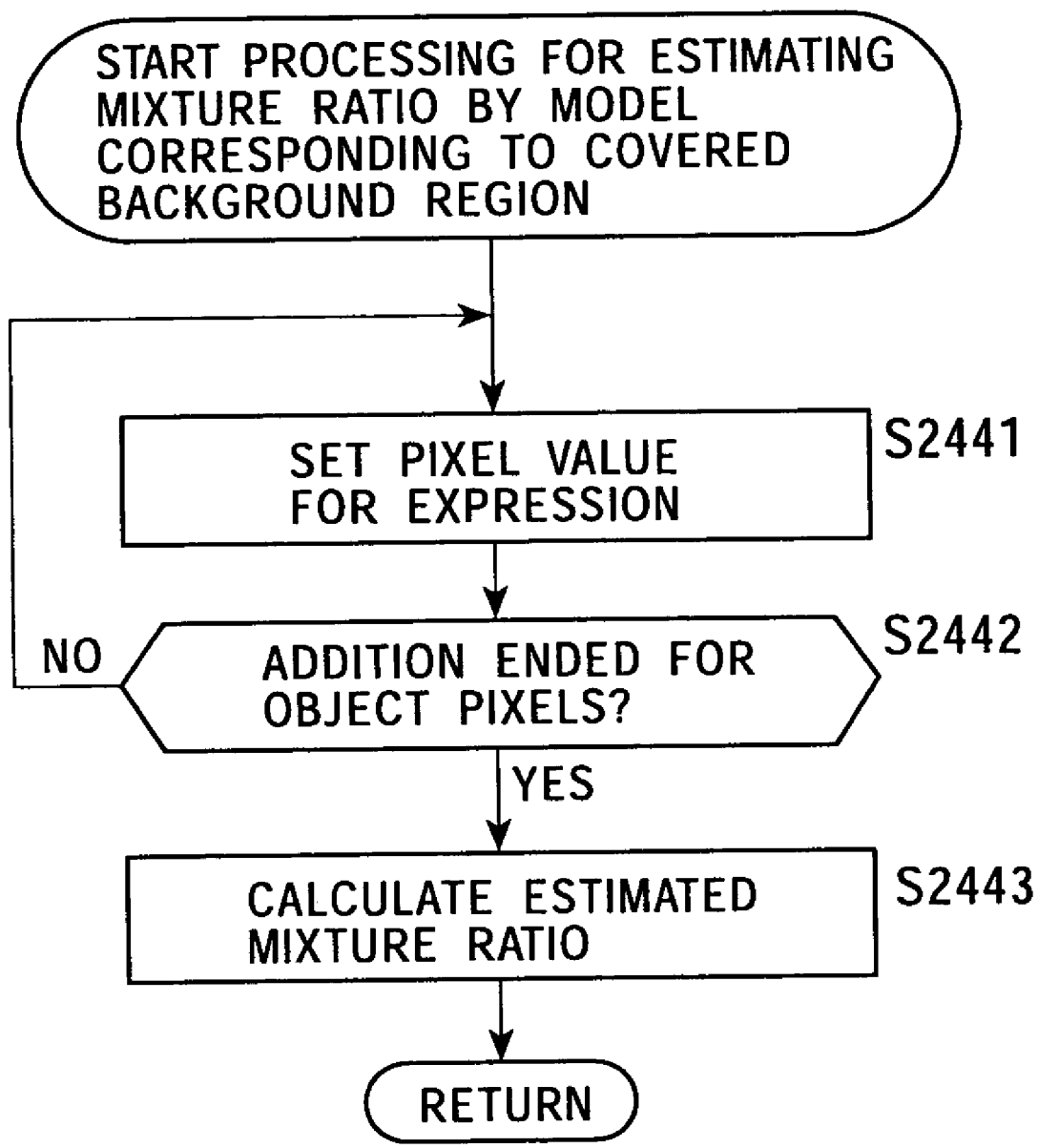
FIG. 97 is a flowchart describing the processing for mixture ratio estimation by way of a model corresponding to a covered background region.

Referring to the flowchart shown in FIG. 97, the processing of mixture ratio estimation by the model corresponding to the covered background region, which is performed by the estimated mixture ratio processing unit 2401 of which the structure is shown in FIG. 95, corresponding to the processing in Step S2402 shown in FIG. 90, is described.

In Step S2441, the addition unit 2462 sets the pixel values contained in the input image, and the pixel values contained in the image supplied from the delay circuit 2461, for the normal expression corresponding to the model of the covered background region.

In Step S2442, the estimated mixture ratio processing unit 2401 judges whether or not the setting for the pixel which is the object has ended, and in the event that judgment is made that the setting for the pixel which is the object has not ended, the flow returns to Step S2441, and repeats the processing of setting of the pixel values for the normal expression.

In Step S2442, in the event that judgment is made that the setting of the pixel values for the pixel which is the object has ended, the flow proceeds Step S2443, and a computation unit 173 computes the estimated mixture ratio based upon the normal expression for which the pixel values are set, and outputs the calculated estimated mixture ratio.

As described above, the estimated mixture ratio processing unit 2401 can compute the estimated mixture ratio based upon the input image.

The processing of the mixture ratio estimation by the model corresponding to the uncovered background region of the estimated mixture ratio processing unit 2401 of which the structure is shown in FIG. 95 is the same as the processing indicated by the flowchart shown in FIG. 97, for which the normal expression corresponding to the model of the uncovered background region is used, and accordingly description thereof will be omitted.

Note that while description has been made under an assumption that the object corresponding to the background keeps still, the processing for calculation of the mixture ratio described above may be applied even if the image corresponding to the background region contains movement. For example, in the event that the image corresponding to the background region moves uniformly, the estimated mixture ratio processing unit 2401 shifts the entire image corresponding to the movement, and processes in the same manner as a case wherein the object corresponding to the background keeps still. Also, in the event that the image corresponding to the background region contains a different movement at each local position, the estimated mixture ratio processing unit 2401 selects pixels corresponding to the movement as the pixels corresponding to the pixels belonging to the mixed region, and performs the processing described above.

Figure 98:
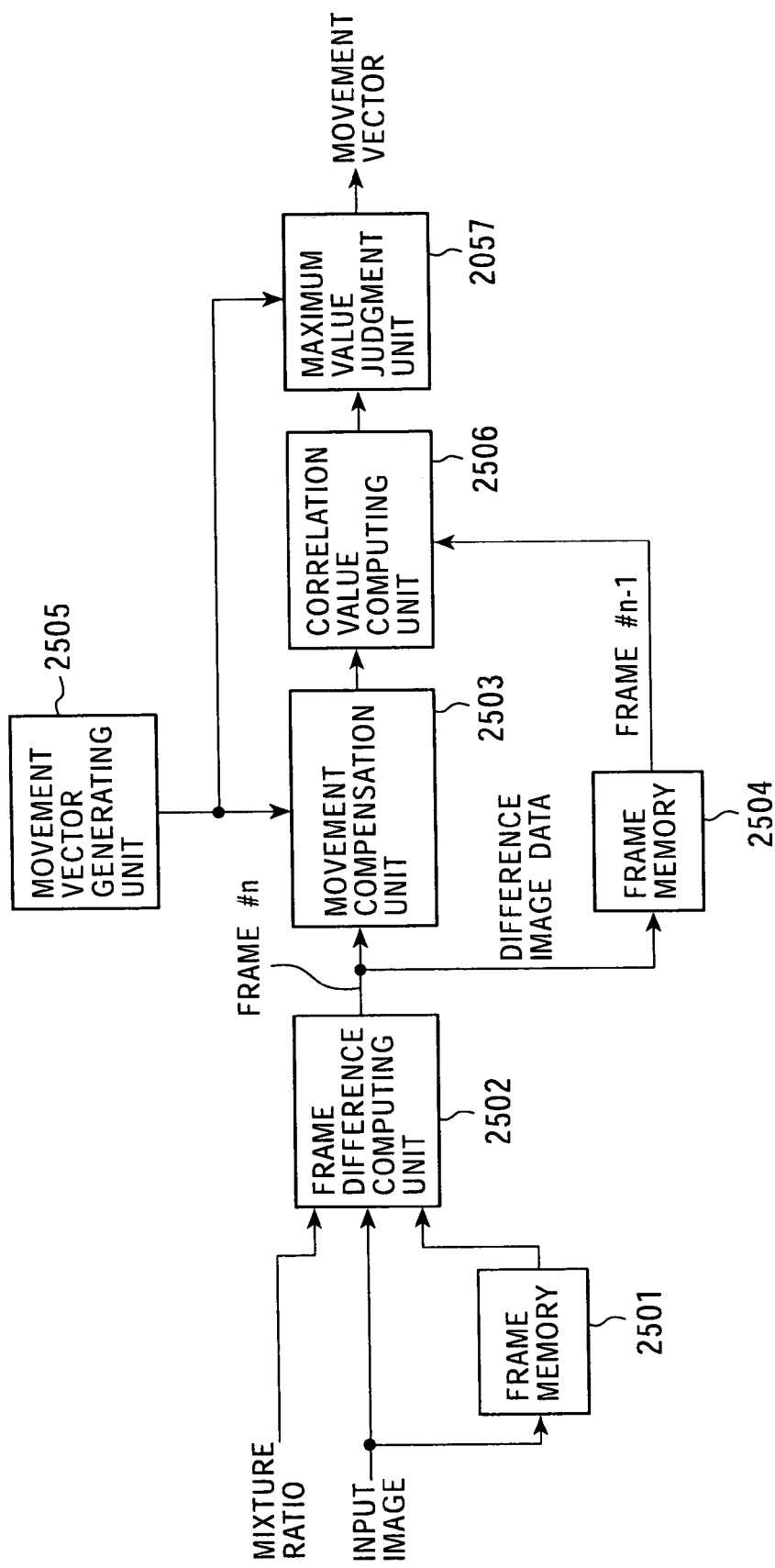
FIG. 98 is a block diagram illustrating the configuration of a movement estimating unit 2002.
Figure 99:
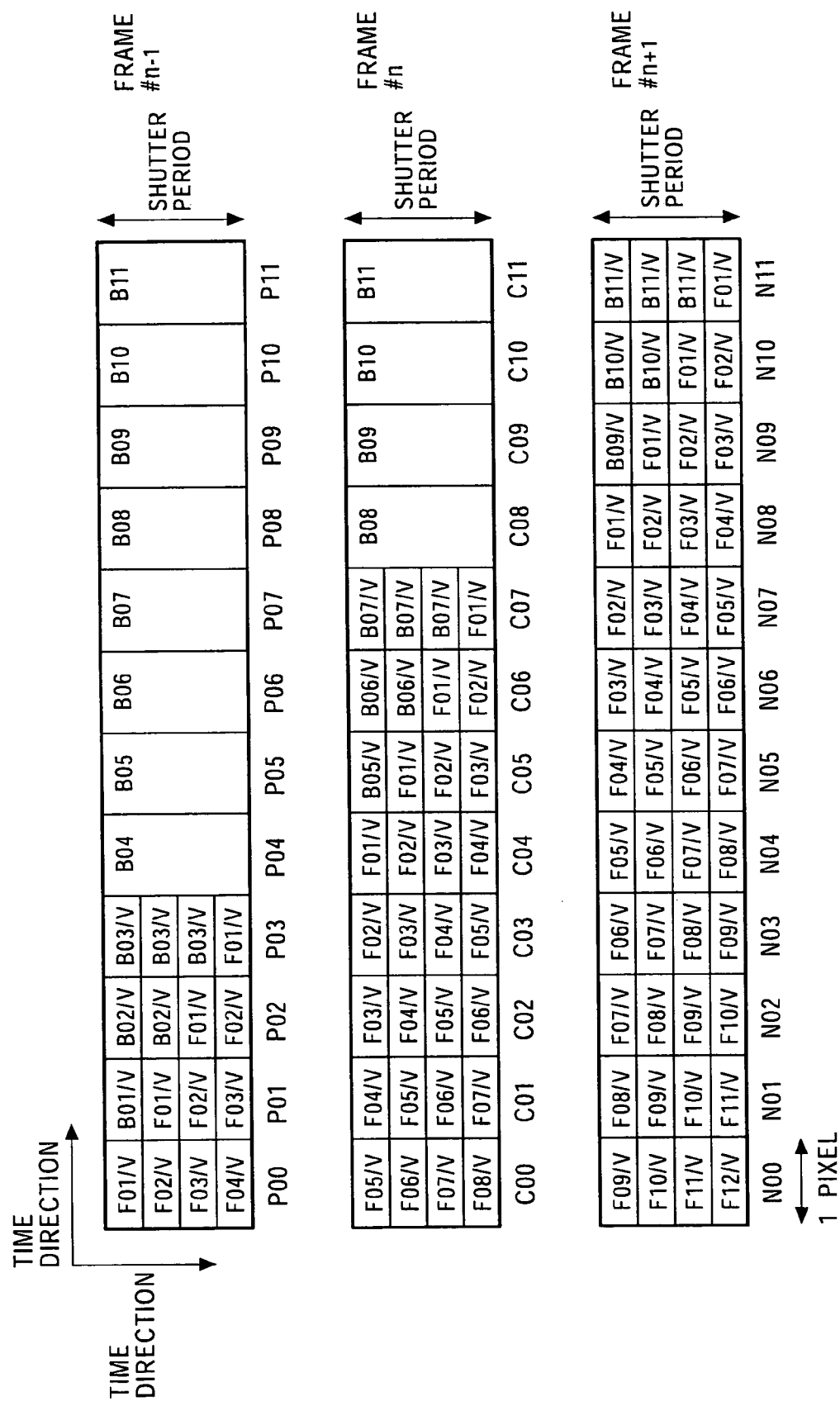
FIG. 99 is a model diagram wherein the pixel values are developed over the time direction, and periods corresponding to shutter time are divided.

FIG. 98 is a block diagram which illustrates the structure of the movement estimation unit 2002.

The mixture ratio α supplied to the movement estimation unit 2002 is input to a frame difference computing unit 2502. The input image supplied to the movement estimation unit 2002 is input to frame memory 2501 and the frame difference computing unit 2502.

The frame memory 2501 stores the input image in increment of frames, delays by a period corresponding to one frame, and outputs the stored input image to the frame difference computing unit 2502.

Taking the frame of the input image supplied to the movement estimation unit 2002 as the frame of interest, the frame difference computing unit 2502 multiples the pixel value of the input image supplied from the frame memory 2501 corresponding to the pixel of the background region by the mixture ratio α of the pixel of interest of the frame of interest (which will also be referred to as the pixel of interest hereafter), and calculates the pixel value corresponding to the background components. The frame difference computing unit 2502 subtracts the pixel value corresponding to the background components from the pixel values of the pixel of interest of the input image supplied to the movement estimation unit 2002 and the pixel corresponding to the pixel of interest, respectively, and calculates the difference.

The frame difference computation unit 2502 supplies the calculated difference as difference image data to a movement compensation unit 2503 and frame memory 2504 for each pixel of interest, i.e., for each pixel of interest mixture ratio α.

A movement vector generating unit 2505 generates an estimated movement vector wherein the size thereof increases sequentially from a predetermined initial value, as well as the angle thereof changing sequentially from another predetermined initial value for each pixel of interest of the frame of interest, i.e., for each piece of difference image data, and supplies the generated estimated movement vector to the movement compensation unit 2503 and a maximum value judgment unit 2507.

For example, the movement vector generating unit 2505 generates an estimated movement vector based upon the initial value of the size and the initial value of the angle, which are stored beforehand. The movement vector generating unit 2505 changes the size of the estimated movement vector by adding the predetermined increment to the size of the generated estimated movement vector. In the event that the size of the estimated movement vector exceeds the predetermined value, the movement vector generating unit 2505 adds the predetermined angle to the angle of the estimated movement vector, as well as sets the initial value of the size for the size of the estimated movement vector.

The movement vector generating unit 2505 repeats the processing of change of the size of the estimated movement vector and change of the angle, and generates an estimated movement vector of which the size and the angle are within a predetermined range.

The movement compensation unit 2503 performs movement compensation of the difference image data supplied from the frame difference computing unit 2502 based upon the estimated movement vector supplied from the movement vector generating unit 2505, and supplies the difference image data which has been subjected to movement compensation to a correlation value computing unit 2506.

The frame memory 2504 stores the difference image data for each frame, delays by a period corresponding to one frame, and supplies the stored difference image data to the correlation value computing unit 2506.

The correlation value computing unit 2506 computes for each estimated movement vector, the correlation value between the difference image data which has been subjected to movement compensation supplied from the movement compensation unit 2503 and the difference image data which has been subjected to delay of one frame supplied from the frame memory 2504, and supplies the computed correlation value to the maximum value judgment unit 2507.

The correlation value computing unit 2506 computes, for example, the absolute value of the difference between the difference image data which has been subjected to movement-compensation supplied from the movement compensation unit 2503 and the difference image data which has been subjected to delay of one frame supplied from the frame memory 2504 for each pixel, and supplies the computed absolute value of the difference to the maximum value judgment unit 2507 as a correlation value. The correlation value output by the correlation value computing unit 2506 is called inter-difference-image-correlation data.

The maximum judgment unit 2507 stores the correlation value supplied from the correlation value computing unit 2506, correlated to the value of the estimated movement vector supplied from the movement vector generating unit 2505. The maximum value judgment unit 2507 selects the correlation value having the greatest correlation from among the stored correlation values corresponding to one pixel of interest, and selects the estimated movement vector corresponding to the selected correlation value. The maximum value judgment unit 2507 sets the estimated movement vector selected for each pixel of interest for the movement vector corresponding to the pixel of interest, and outputs the movement vector corresponding to the pixel of interest.

Note that the maximum value judgment unit 2507 may detect the movement vector in increments of blocks made up of a plurality of pixels.

Also, an arrangement may be made wherein the maximum value judgment unit 2507 detects the movement vector in increments of a block made up of a plurality of pixels, under an assumption that the movement vector is constant within a block.

The processing of the movement estimation unit 2002 will be described, by way of a model of an image wherein the movement amount v of the foreground object is 4, as shown in FIG. 99 through FIG. 105.

The pixel value of the sixth pixel from the left in the frame #n can be represented with Expression (132). In the same way, the pixel value of the seventh pixel from the left in the frame #n can be represented with Expression (133), and the pixel value of the eighth pixel from the left in the frame #n can be represented with Expression (134).

$$C05 = \sum_{i=1}^{3} Fi + \alpha 05 \cdot B05 \quad (132)$$

-continued $$C06 = \sum_{i=1}^{2} Fi + \alpha 06 \cdot B06 \quad (133)$$

$$C07 = \sum_{i=1}^{1} Fi + \alpha 07 \cdot B07 \quad (134)$$

In the same way, the pixel value of the tenth pixel from the left in the frame #n+1 can be represented with Expression (135). The pixel value of the eleventh pixel from the left in the frame #n+1 can be represented with Expression (136), and the pixel value of the twelfth pixel from the left in the frame #n+1 can be represented with Expression (137).

$$N09 = \sum_{i=1}^{3} Fi + \alpha 09 \cdot B09 \quad (135)$$

$$N10 = \sum_{i=1}^{2} Fi + \alpha 10 \cdot B10 \quad (136)$$

$$N11 = \sum_{i=1}^{1} Fi + \alpha 11 \cdot B11 \quad (137)$$

In Expression (132), $\alpha 05$ is $\frac{1}{4}$. In the event that a value, wherein the pixel value of a corresponding pixel in frame #n−1 is multiplied by $\alpha 05$, is subtracted from the pixel value of a pixel belonging to the mixed region or background region of the frame #n, all or part of the background component contained in the pixel value of frame #n is removed, as shown in FIG. 100.

In the sixth pixel from the left in the frame #n, all of the background component contained in the pixel value is removed, and all of the foreground component contained in the pixel value is left.

Figure 100:
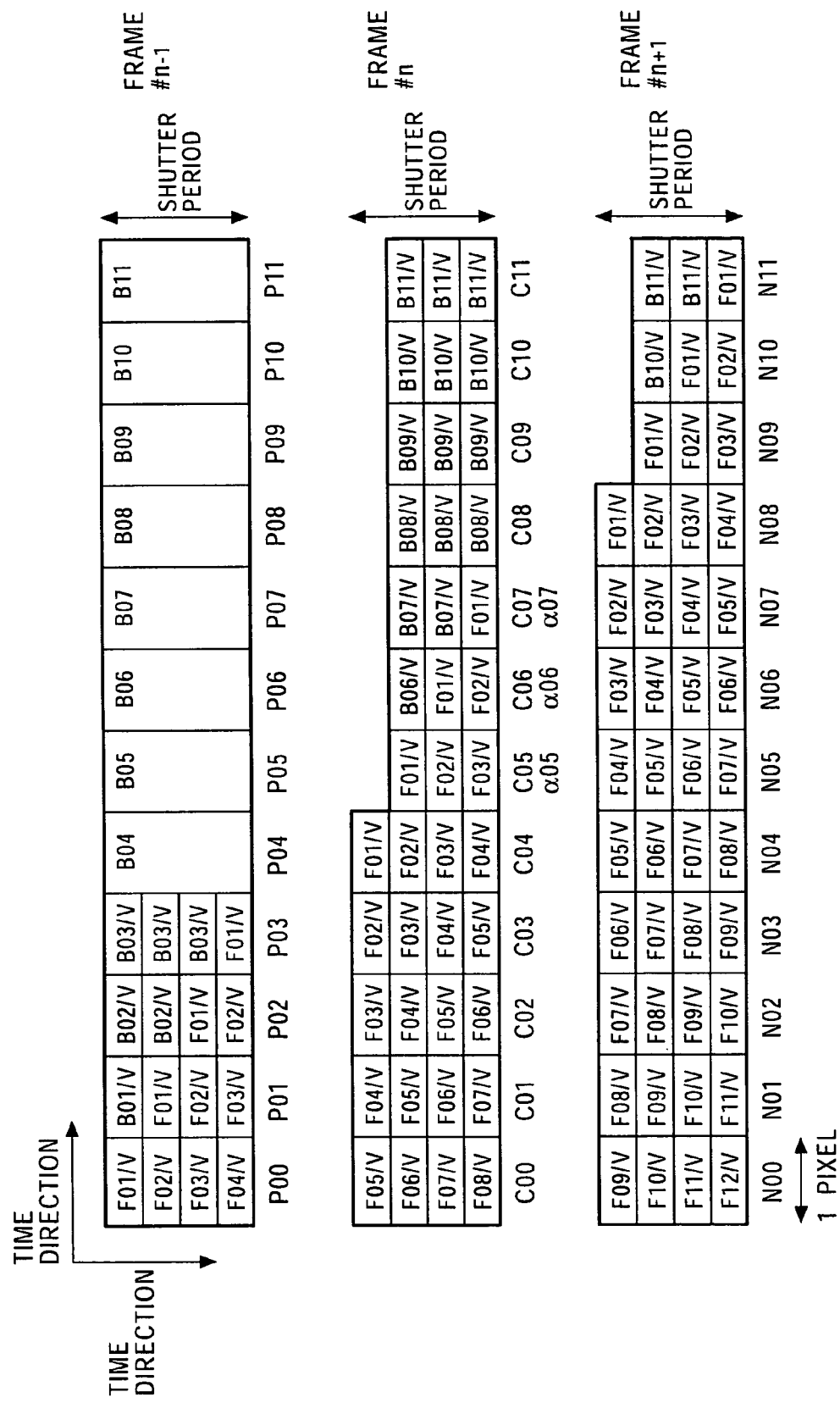
FIG. 100 is a model diagram wherein the pixel values are developed over the time direction, and periods corresponding to shutter time are divided.

In the same way, in the event that a value, wherein the pixel value of a corresponding pixel in frame #n is multiplied by $\alpha 05$, is subtracted from the pixel value of a pixel belonging to the mixed region or background region of the frame #n+1, all or part of the background component contained in the pixel value is removed, as shown in FIG. 100.

In Expression (135), $\alpha 09$ is $\frac{1}{4}$, and is the same value as $\alpha 05$, so in the tenth pixel from the left in the frame #n+1, all of the background component contained in the pixel value is removed, and all of the foreground component contained in the pixel value is left.

Figure 101:
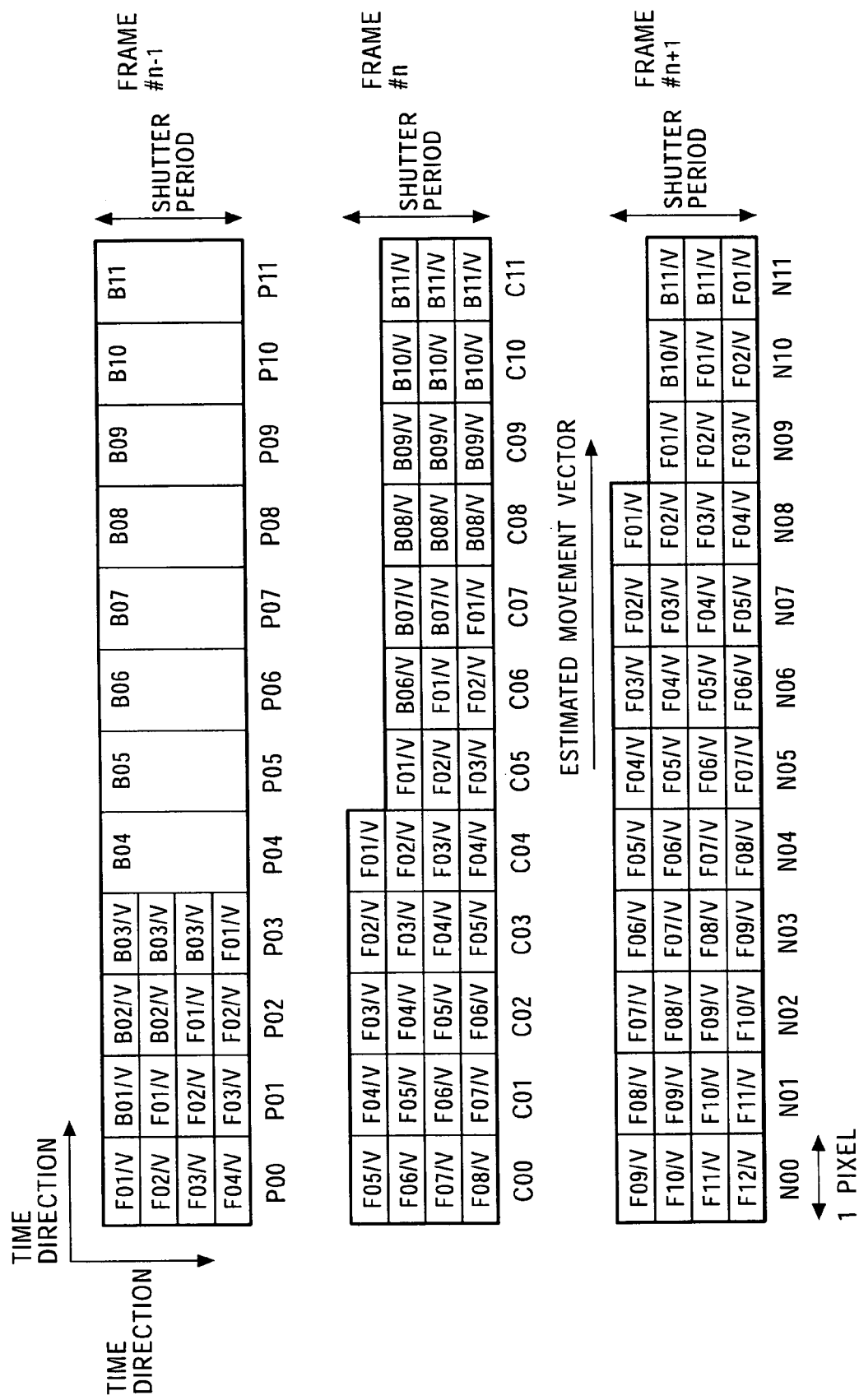
FIG. 101 is a model diagram wherein the pixel values are developed over the time direction, and periods corresponding to shutter time are divided.

As shown in FIG. 101, the foreground component contained in the sixth pixel from the left in the frame #n, is the same as the foreground component contained in the tenth pixel from the left in the frame #n+1, so the correlation between the difference corresponding to the sixth pixel from the left in the frame #n and the difference of the tenth pixel from the left in the frame #n+1 is the greatest of each correlation between the difference corresponding to the sixth pixel from the left in the frame #n and the difference of each pixel in the frame #n+1.

In the event that the sixth pixel from the left in the frame #n is the pixel of interest, the movement estimation unit 2002 selects an estimated movement vector indicating the tenth pixel from the left in the frame #n+1 as the movement vector corresponding to the sixth pixel from the left in the frame #n, with the sixth pixel from the left in the frame #n corresponding to the maximum correlation as a reference.

Figure 102:
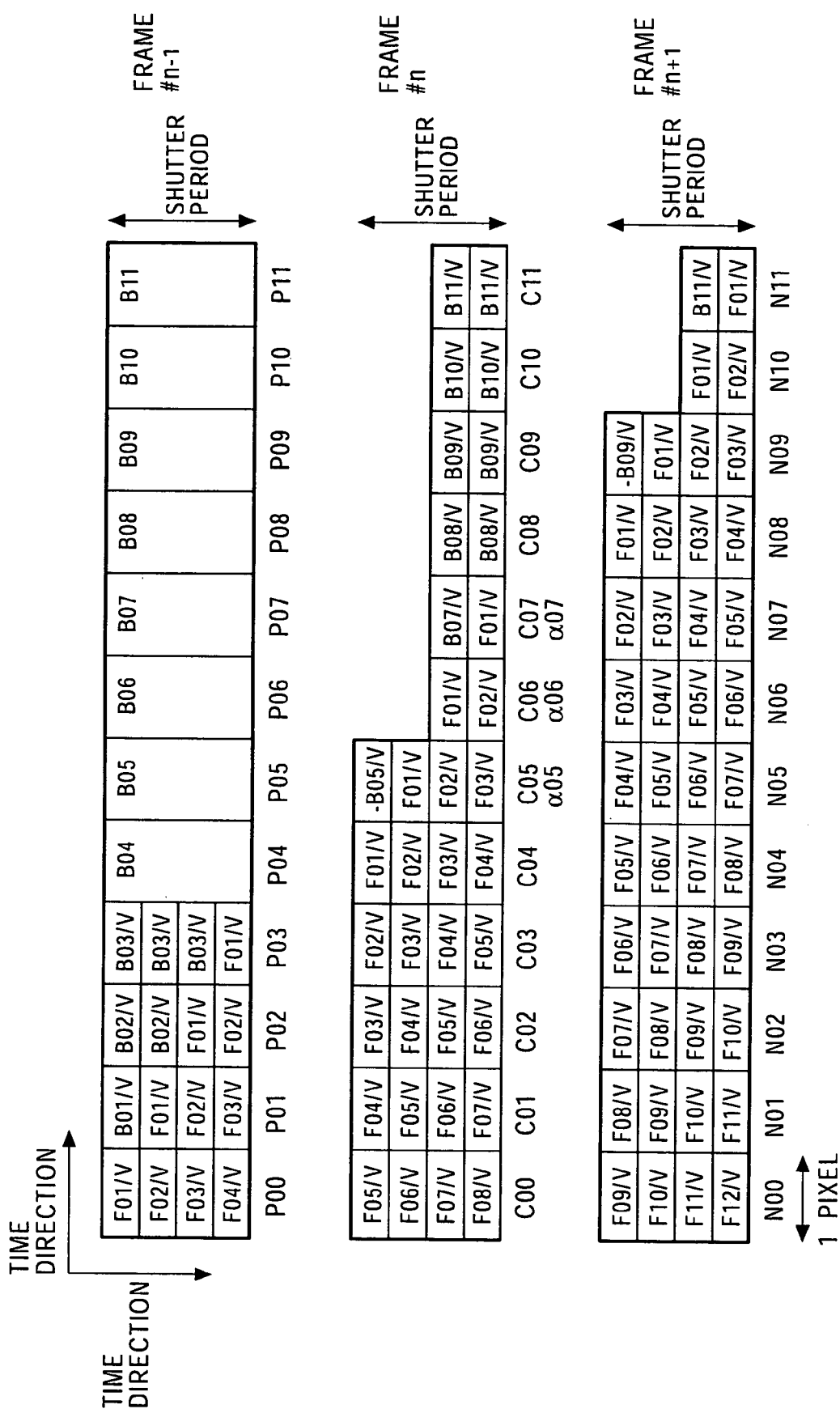
FIG. 102 is a model diagram wherein the pixel values are developed over the time direction, and periods corresponding to shutter time are divided.

In Expression (133), α06 is ½. In the event that a value, wherein the pixel value of a corresponding pixel in frame #n−1 is multiplied by α06, is subtracted from the pixel value of a pixel belonging to the mixed region or background region of the frame #n, all or part of the background component contained in the pixel value of frame #n is removed, as shown in FIG. 102. With the sixth pixel from the left, the background component equal to or exceeding the originally contained background component is removed, so this pixel value contains a negative value from the corresponding background component.

In the seventh pixel from the left in the frame #n, all of the background component contained in the pixel value is removed, and all of the foreground component contained in the pixel value is left.

In the same way, in the event that a value, wherein the pixel value of a corresponding pixel in frame #n is multiplied by α06, is subtracted from the pixel value of a pixel belonging to the mixed region or background region of the frame #n+1, all or part of the background component contained in the pixel value is removed, as shown in FIG. 102. With the tenth pixel from the left, the background component equal to or exceeding the originally contained background component is removed, so this pixel value contains a negative value from the corresponding background component.

In. Expression (136), α10 is ½, and is the same value as α06, so in the eleventh pixel from the left in the frame #n+1, all of the background component contained in the pixel value is removed, and all of the foreground component contained in the pixel value is left.

Figure 103:
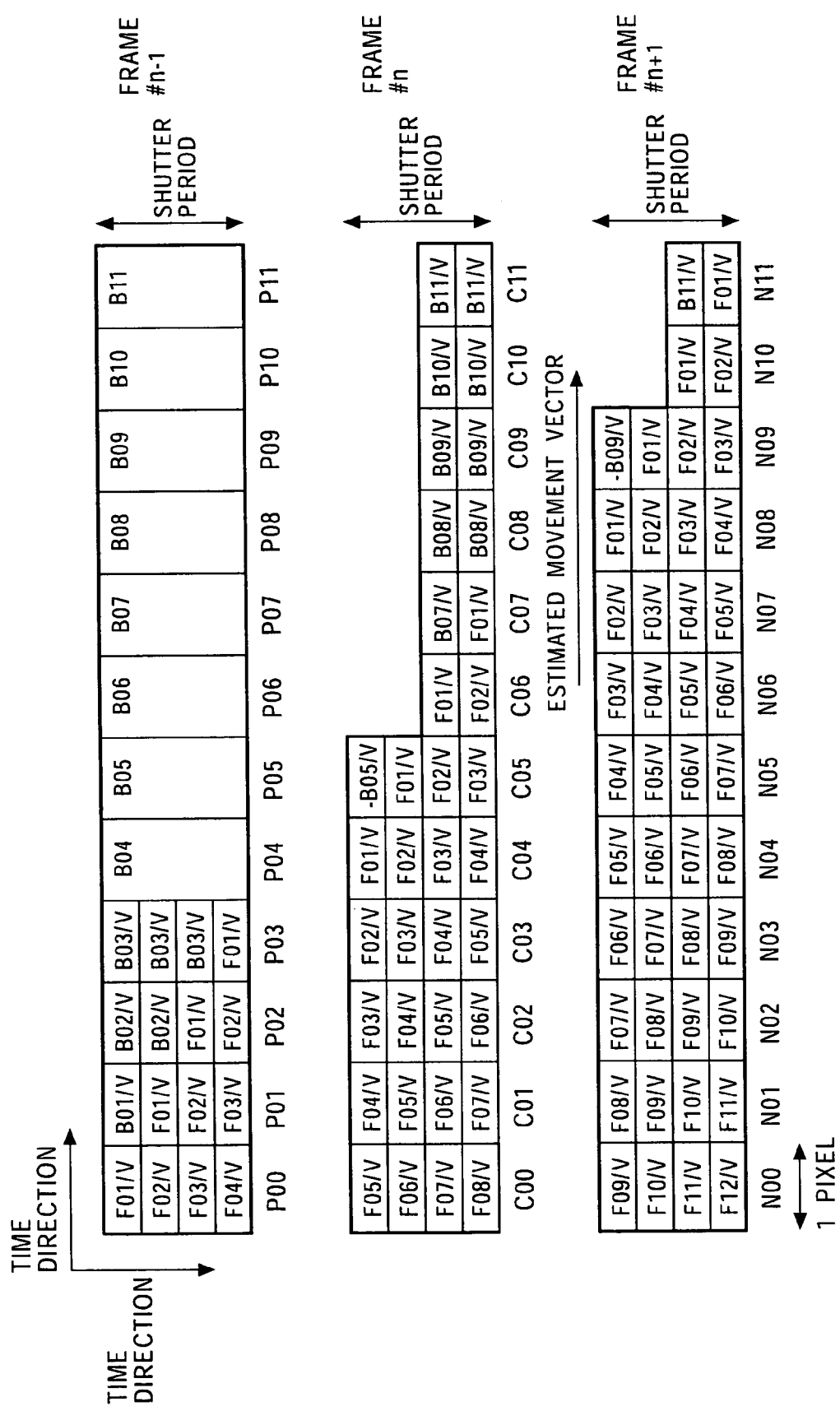
FIG. 103 is a model diagram wherein the pixel values are developed over the time direction, and periods corresponding to shutter time are divided.

As shown in FIG. 103, the foreground component contained in the seventh pixel from the left in the frame #n, is the same as the foreground component contained in the eleventh pixel from the left in the frame #n+1, so the correlation between the difference corresponding to the seventh pixel from the left in the frame #n and the difference of the eleventh pixel from the left in the frame #n+1 is the greatest of each correlation between the difference corresponding to the seventh pixel from the left in the frame #n and the difference of each pixel in the frame #n+1.

In the event that the seventh pixel from the left in the frame #n is the pixel of interest, the movement estimation unit 2002 selects an estimated movement vector indicating the eleventh pixel from the left in the frame #n+1 as the movement vector corresponding to the seventh pixel from the left in the frame #n, with the seventh pixel from the left in the frame #n corresponding to the maximum correlation as a reference.

In this way, the movement estimation unit 2002 obtains difference A by subtracting, from the pixel value of a pixel in the frame #n, a value wherein the pixel value in frame #n−1 is multiplied by the mixture ratio α, and also obtains difference B by subtracting, from the pixel value of a pixel in the frame #n+1, a value wherein the pixel value in frame #n+1 is multiplied by the mixture ratio α, based upon the mixture ratio α of the pixel of interest in the frame #n.

The movement estimation unit 2002 calculates, the correlation between the difference corresponding to the pixel of interest in the frame #n, of the difference A, and the difference corresponding to each pixel in the difference B. The movement estimation unit 2002 selects an estimated movement vector indicating a pixel where the correlation is the greatest with reference to the pixel of interest in frame #n, based on the calculated correlation, and outputs the selected estimated movement vector as the movement vector of the pixel of interest in frame #n.

The above processing will be described with reference to expressions, with reference to FIG. 104.

The difference A between the pixel value CA of the pixel of interest belonging to the mixed region in frame #n, and a value wherein the pixel value PA of the corresponding pixel in the frame #n−1 has been multiplied by the mixture ratio α, can be calculated by the computation shown in Expression (138).

$$A = CA - PA \times \alpha \tag{138}$$

The difference B between the pixel value NB of the pixel in the frame #n+1, and a value wherein the pixel value CB of the corresponding pixel in the frame #n has been multiplied by the mixture ratio α, can be calculated by the computation shown in Expression (139).

$$B = NB - CB \times \alpha \tag{139}$$

The difference B is calculated for all pixels.

The correlation value J between the difference A corresponding to the pixel of interest in the frame #n, and the difference B corresponding to each pixel in frame #n+1 can be made to be an absolute value of difference for the difference A and difference B $$J = |A - B| \tag{140}$$

Of the correlation values J between the difference A corresponding to the pixel of interest in the frame #n and the difference B corresponding to each pixel in the frame #n+1, the estimated movement vector corresponding to the greatest correlation value (the estimated movement vector indicating the pixel of the difference B corresponding to the greatest correlation value, with the pixel of interest in the frame #n as a reference) is taken as the movement vector.

Also, an arrangement may be made wherein, for example, the correlation value J1 corresponding to the center pixel of a block in the frame of interest is calculated, applying Expression (141) to the differences A0 through A8 in a 3×3 pixel block centered on A4 within the frame of interest as shown in FIG. 105A, and the differences B0 through B8 in a 3×3 pixel block centered on the corresponding B4 within the frame following the frame of interest as shown in FIG. 105B.

$$J1 = \frac{\sum_{i=0}^{8}(Ai - \overline{A}) \sum_{i=0}^{8}(Bi - \overline{B})}{\sqrt{\sum_{i=0}^{8}(Ai - \overline{A})^2 \cdot \sum_{i=0}^{8}(Bi - \overline{B})^2}} \tag{141}$$

$$\overline{A} = \frac{\sum_{i=0}^{8} Ai}{9} \tag{142}$$

$$\overline{B} = \frac{\sum_{i=0}^{8} Bi}{9} \tag{143}$$

In this case, for example, the estimated movement vector corresponding to the maximum correlation value J1 (the estimated movement vector indicating the pixel corresponding to B4, with the pixel corresponding to A4 as a reference) is taken as the movement vector.

Further, an arrangement may be made wherein, for example, the sum of absolute value of difference J2 is calculated as a correlation value corresponding to the center pixel of a block in the frame of interest, applying Expression (144) to the differences A0 through A8 in a 3×3 pixel block centered on A4 within the frame of interest and the differences B0 through B8 in a 3×3 pixel block centered on the corresponding B4 within the frame following the frame of interest.

$$J2 = \sum_{i=0}^{8} |(Ai - Bi)| \tag{144}$$

In this case, for example, the estimated movement vector corresponding to the minimum sum of absolute value of difference J2 is taken as the movement vector.

Next, processing for movement vector detection by the movement estimation unit 2002 corresponding to a predetermined pixel of interest will be described with reference to the flowchart in FIG. 106. The processing shown in the flowchart in FIG. 106 corresponds to Step S2004 in FIG. 80.

In Step S2501, the frame difference computing unit 2502 multiplies the mixture ratio α of the pixel of interest of the frame of interest #n by the pixel value of each pixel in the frame #n−1 supplied from the frame memory 2501, based on the mixture ratio α, input image of the frame #n, and the image of the frame #n−1 supplied from the frame memory 2501, calculates the difference between the results of multiplication corresponding to each pixel and the pixel value of each pixel in the frame #n of the input image, and sets the difference A to the calculated difference.

In Step S2502, the frame difference computing unit 2502 multiplies the mixture ratio α of the pixel of interest of the frame of interest #n by the pixel value of each pixel in the frame #n supplied from the frame memory 2501, based on the mixture ratio α, input image of the frame #n+1, and the image of the frame #n supplied from the frame memory 2501, calculates the difference between the results of multiplication corresponding to each pixel and the pixel value of each pixel in the frame #n+1 of the input image, and sets the difference B to the calculated difference.

In Step S2503, the movement vector generating unit 2505 sets an initial value for the estimated movement vector, and supplies the estimated movement vector, to which has been set the initial value, to the movement compensation unit 2503 and the maximum value judgment unit 2507.

In step S2504, the movement estimation unit 2002 judges whether or not correlation values have been calculated for pixels within a predetermined range, based on the size and angle of the estimated movement vector, and in the event that judgment is made that correlation values have not been calculated for pixels within a predetermined range, the flow proceeds to Step S2505, where the correlation value computing unit 2506 calculates the correlation value between the pixel of interest and the pixel indicated by the estimated movement vector, based on difference A and difference B.

That is to say, in Step S2505, the movement compensation unit 2503 compensates for the difference B supplied from the frame difference computing unit 2502, based on the estimated movement vector supplied from the movement vector generating unit 2505, and supplies the difference B which has been subjected to movement compensation, to the correlation value computing unit 2506.

The correlation value computing unit 2506 calculates the correlation value between the difference A supplied from the frame memory 2504, corresponding to the pixel of interest, and the difference B which has been subjected to movement compensation, and supplies this to the maximum value judgment unit 2507.

For example, the correlation value computing unit 2506 calculates the correlation value which is an absolute value of the difference corresponding to the pixel of interest of the difference A, and the difference corresponding to a pixel indicated by the estimated movement vector of the difference B, based on the computation indicated in Expression (140).

For example, the correlation value computing unit 2506 calculates the correlation value J1 between the differences A0 through A8 of a block corresponding to the pixel of interest, and the differences B0 through B8 of a block corresponding to the pixel indicated by an estimated movement vector, based on the computation indicated in Expression (141).

In Step S2506, the maximum value judgment unit 2507 stores the correlation value supplied from the correlation value computing unit 2506, in a manner corresponding to the estimated movement vector supplied from the movement vector generating unit 2505.

In Step S2507, the movement vector generating unit 2505 adds a predetermined increment to the size of the estimated movement vector.

In Step S2508, the movement estimation unit 2002 judges whether or not the size of the estimated movement vector which the movement vector generating unit 2505 outputs has exceeded a predetermined value, and in the event that judgment is made that the size of the estimated movement vector has exceeded a predetermined value, the flow proceeds to Step S2509, where the movement vector generating unit 2505 sets the size of the estimated movement vector to the initial value. In Step S2510, the movement vector generating unit 2505 adds a predetermined increment to the size of the estimated movement vector. The movement vector generating unit 2505 supplies the estimated movement vector of which the size has been set to the initial value and the angle thereof changed, to the movement compensation unit 2503 and the maximum value judgment unit 2507, the procedures proceed to Step S2504, where judgment regarding whether or not correlation values for pixels within a predetermined range have been calculated is repeated.

In the event that judgment is made in Step 508 that the size of the estimated movement vector has not exceeded a predetermined value, the flow proceeds to Step S2504, where judgment regarding whether or not correlation values for pixels within a predetermined range have been calculated is repeated.

In Step S2504, in the event that judgment is made that the correlation values for pixels within the predetermined range have been calculated, the flow proceeds to Step S2511, and the maximum value judgment unit 2507 selects the estimated movement vector corresponding to the maximum correlation.

For example, in the case that the correlation value computing unit 2506 calculates the correlation value based on the computation indicated in Expression (140), the maximum value judgment unit 2507 selects the estimated movement vector corresponding to the smallest correlation value.

For example, in the case that the correlation value computing unit 2506 calculates the correlation value J1 based on the computation indicated in Expression (141), the maximum value judgment unit 2507 selects the estimated movement vector corresponding to the greatest correlation value J1.

In Step S2512, the maximum value judgment unit 2507 sets the selected estimated movement vector to the movement vector, and the processing ends.

Thus, the movement estimation unit 2002 can detect the movement vector corresponding to the pixel of interest, based on the mixture ratio α and the input image. The movement estimation unit 2002 can detect the movement vector corresponding to each pixel in the frame of interest, by repeating the above-described movement vector detecting processing, with each pixel in the frame of interest as a pixel of interest.

Now, description has been made that the pixel in the frame #n−1 is a pixel of the background corresponding to the frame #n, and that the pixel in the frame #n is a pixel of the background corresponding to the frame #n+1, but an arrangement may be made wherein processing is performed with the pixel in the frame #n+1 as a pixel of the background corresponding to the frame #n, and with the pixel in the frame #n+2 as a pixel of the background corresponding to the frame #n+1.

At this time, an arrangement may be made wherein, switching is performed between, for example, processing performed with the pixel in the frame #n−1 as a pixel of the background corresponding to the frame #n, and with the pixel in the frame #n as a pixel of the background corresponding to the frame #n+1, and processing performed with the pixel in the frame #n+1 as a pixel of the background corresponding to the frame #n, and with the pixel in the frame #n+2 as a pixel of the background corresponding to the frame #n+1, based upon the region information.

Also, an arrangement may be made wherein processing is executed with the pixel of interest restricted to pixels in the mixed region, based on region information.

Figure 107:
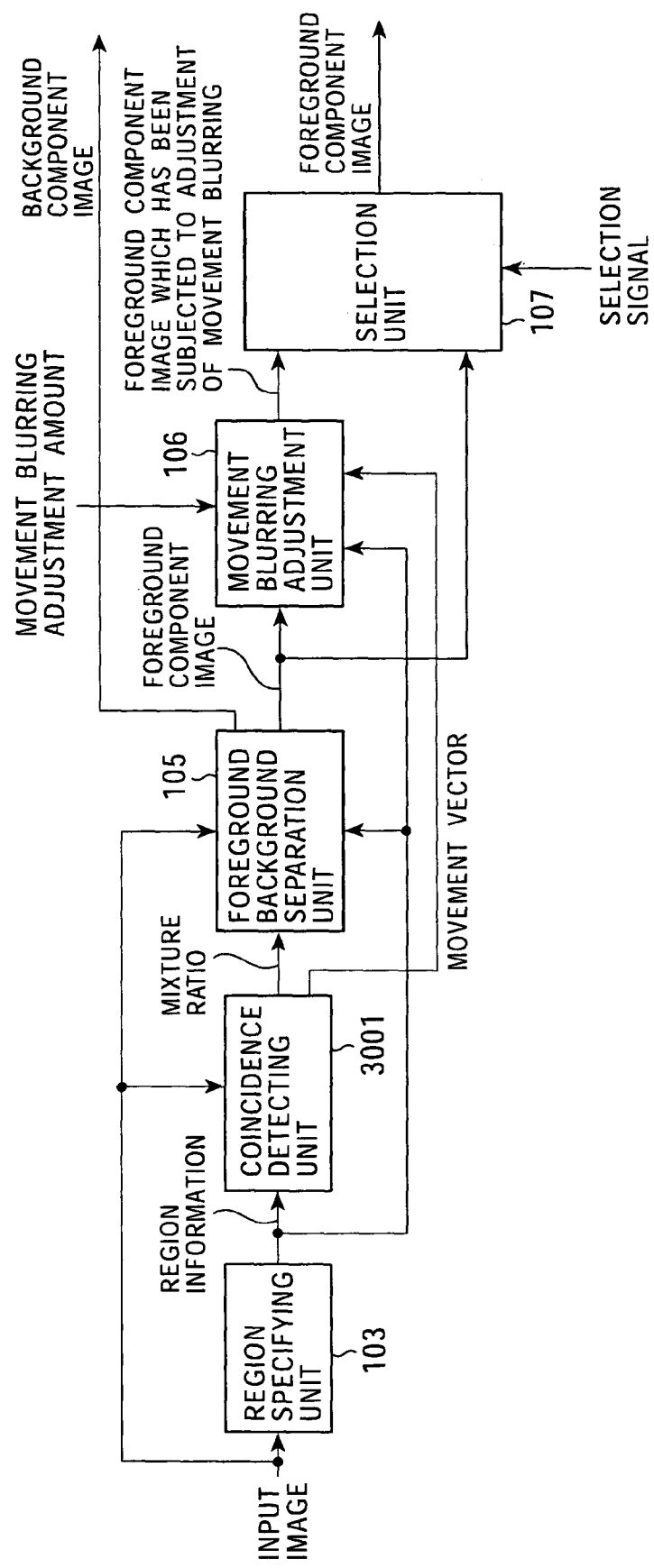
FIG. 107 is a block diagram illustrating a signal processing device.

FIG. 107 is a block diagram illustrating yet another configuration of the signal processing device.

Parts the same as the case shown in FIG. 2 are denoted with the same reference numerals, and description thereof will be omitted.

The input image supplied to the signal processing device are supplied to a region specifying unit 103, coincidence detecting unit 3001, and foreground/background separation unit 105.

The coincidence detecting unit 3001 detects the mixture ratio α corresponding to pixels contained in the mixed region and a movement vector corresponding to a foreground object, supplies the detected mixture ratio to the foreground/background separation unit 105, and supplies the detected vector to the movement blurring adjusting unit 106, based upon an input image and region information supplied from the region specifying unit 103.

The movement vector output by the coincidence detecting unit 3001 contains information corresponding to the movement amount v.

Also, the coincidence detecting unit 3001 can detect movement vectors in a manner corresponding to pixels in the mixed region.

Figure 108:
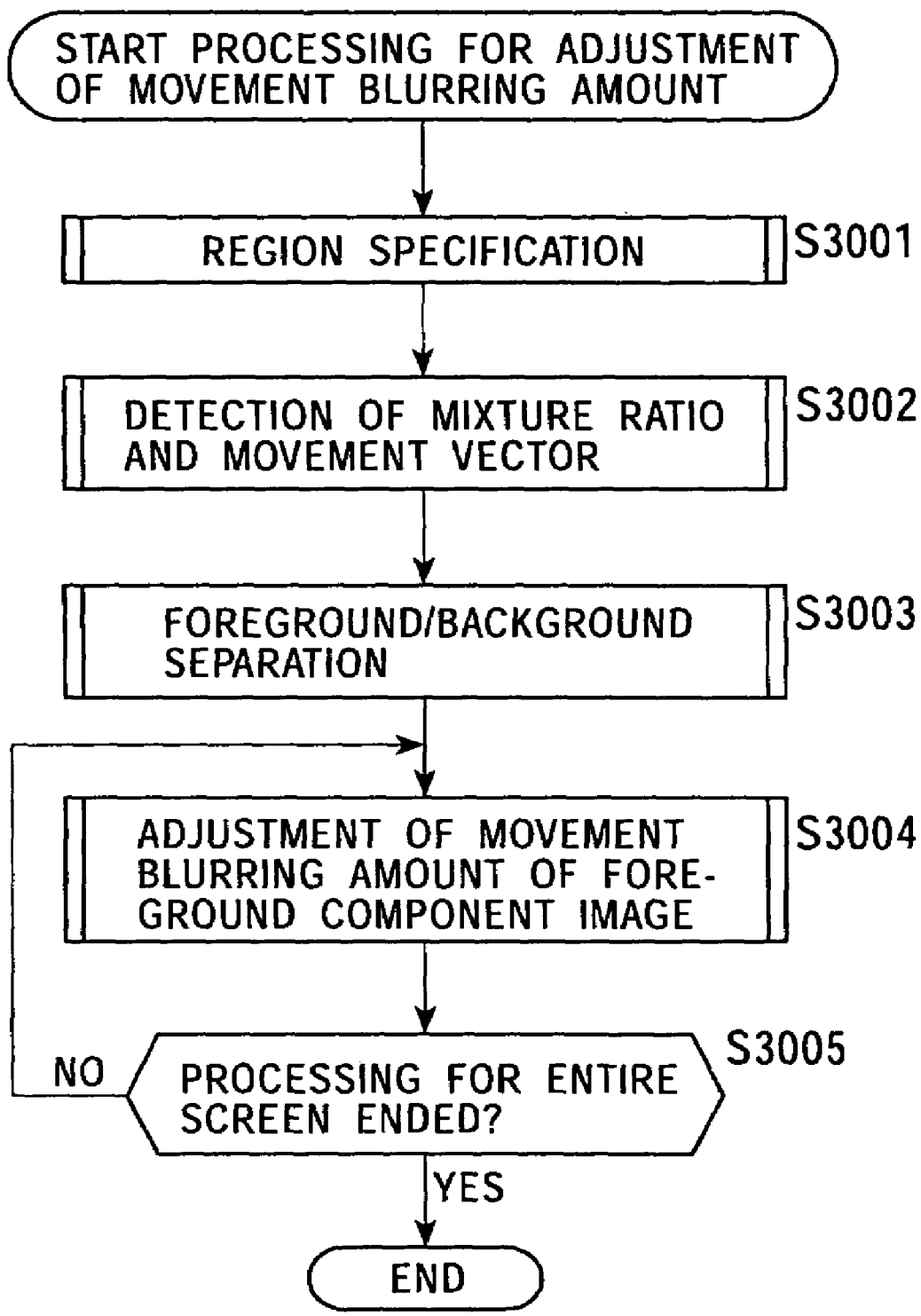
FIG. 108 is a flowchart describing the processing for adjusting the amount of movement blurring.

The processing for adjusting the amount of movement blurring with the signal processing device will be described with reference to the flowchart in FIG. 108. In Step S3001, the region specifying unit 103 performs processing for region specification, for generating the region information which indicates which of the foreground region, the background region, the covered background region, or the uncovered background region, each pixel of the input image belongs to, based upon the input image. The processing in Step S3001 is the same as the processing in Step S11, so detailed description thereof will be omitted. The region specifying unit 103 supplies the generated region information to the coincidence detecting unit 3001 and the movement blurring adjustment unit 106.

In Step S3002, the coincidence detecting unit 3001 detects the mixture ratio α for each pixel included in the mixed region based upon the input image and the region information, and also detects movement vectors corresponding to relative movement between background objects and foreground objects. The processing of the mixture ratio and movement vector detection will be described later. The coincidence detecting unit 3001 supplies the detected mixture ratio α to the foreground/background separation unit 105, and supplies the detected movement vector to the movement blurring adjusting unit 106.

In Step S3003, the foreground/background separation unit 105 extracts the foreground components from the input image based upon the region information and the mixture ratio α, and supplies as the foreground component image to the movement blurring adjustment unit 106. The processing in Step S3003 is the same as the processing in Step S13, so detailed description of the processing will be omitted.

In Step S3004, the movement blurring adjustment unit 106 generates an increment of processing which indicates the position on an image for consecutive pixels in the movement direction, which belong to one of the uncovered background region, the foreground region, or the covered background region, and adjusts the amount of movement blurring included in the foreground component corresponding to the increment of processing, based upon the movement vectors and the region information. The processing in Step S3004 is the same as the processing in Step S14, so detailed description of the processing will be omitted.

In Step S3005, the signal processing device judges whether or not the processing of the entire image has ended, and in the event that judgment is made that the processing has not ended for the entire image, the flow proceeds to Step S3004, and the processing for adjustment of the amount of the movement blurring for the foreground components corresponding to the increment of processing is repeated.

In Step S3005, in the event that judgment is made that the processing of the entire image has ended, the processing ends.

In this way, the signal processing device can separate the foreground and the background and adjust the amount of the movement blurring included in the foreground, and also detect movement vectors. That is to say, the signal processing device can adjust the amount of the movement blurring included in the sampled data of the pixel values of the pixel of the foreground. Also, movement vectors can be detected, taking into consideration the mixing of the foreground and the background.

Figure 109:
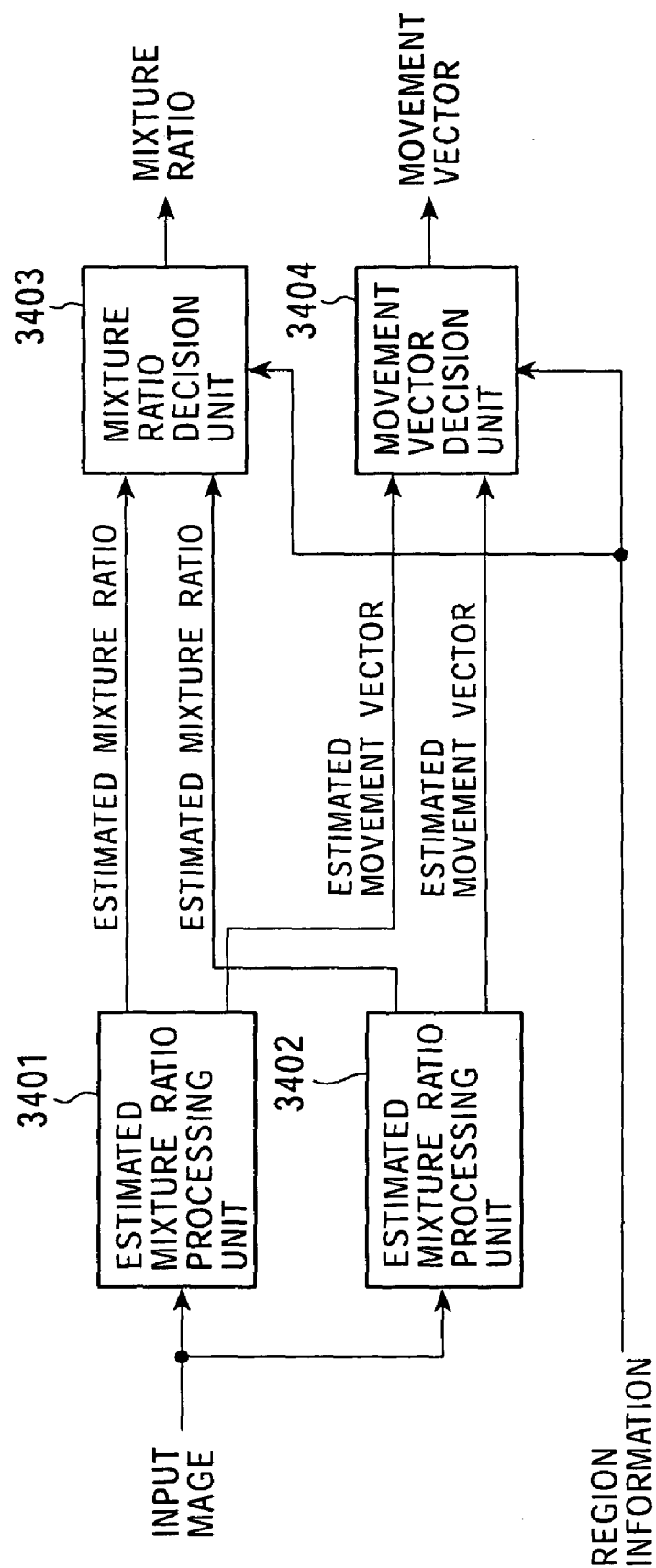
FIG. 109 is a block diagram illustrating the configuration of a simultaneous detecting unit 3001.

FIG. 109 is a block diagram illustrating an example of the configuration of the coincidence detecting unit 3001. The estimated mixture ratio processing unit 3401 calculates the estimated mixture ratio and estimated movement vector for each pixel by computation corresponding to the covered background, based on the input image, and supplies the calculated estimated mixture ratio to the mixture ratio decision unit 3403, while supplying the calculated estimated movement vector to the movement vector decision unit 3404.

The estimated mixture ratio processing unit 3402 calculates estimated mixture ratio and estimated movement vectors for each pixel by computation corresponding to the uncovered background region, and supplies the calculated estimated mixture ratio to the mixture ratio decision unit 3403, while supplying the calculated estimated movement vector to the movement vector decision unit 3404.

The mixture ratio decision unit 3403 sets the mixture ratio α, based on region information which indicates supplied from the region specifying unit 103 which of the foreground region, the background region, the covered background region, or the uncovered background region, the pixel which is the object of calculation of mixture ratio α belongs to. In the event that the pixel which is the object belongs to the foreground region, the mixture ratio decision unit 3403 sets the mixture ratio α to 0, in the event that the pixel which is the object belongs to the background region, sets the mixture ratio α to 1, in the event that the pixel which is the object belongs to the covered background region, sets the mixture ratio α to the estimated mixture ratio supplied from the estimated mixture ratio processing unit 3401, and in the event that the pixel which is the object belongs to the uncovered background region, sets the mixture ratio α to the estimated mixture ratio supplied from the estimated mixture ratio processing unit 3402. The mixture ratio decision unit 3403 outputs the mixture ratio α which is set based upon the region information.

The movement vector decision unit 3404 sets the movement vector, based on the estimated movement vector supplied from the estimated mixture ratio processing unit 3401, the estimated movement vector supplied from the estimated mixture ratio processing unit 3402, and the region information supplied from the region specifying unit 103.

For example, in the event that the object pixel belongs to the covered background region, the movement vector decision unit 3404 sets the estimated movement vector supplied from the estimated mixture ratio processing unit 3401 for the movement vector, and in the event that the object pixel belongs to the uncovered background, the movement vector decision unit 3404 sets the estimated movement vector supplied from the estimated mixture ratio processing unit 3402 for the movement vector. The movement vector decision unit 3404 outputs the movement vector set based on the region information.

Figure 110:
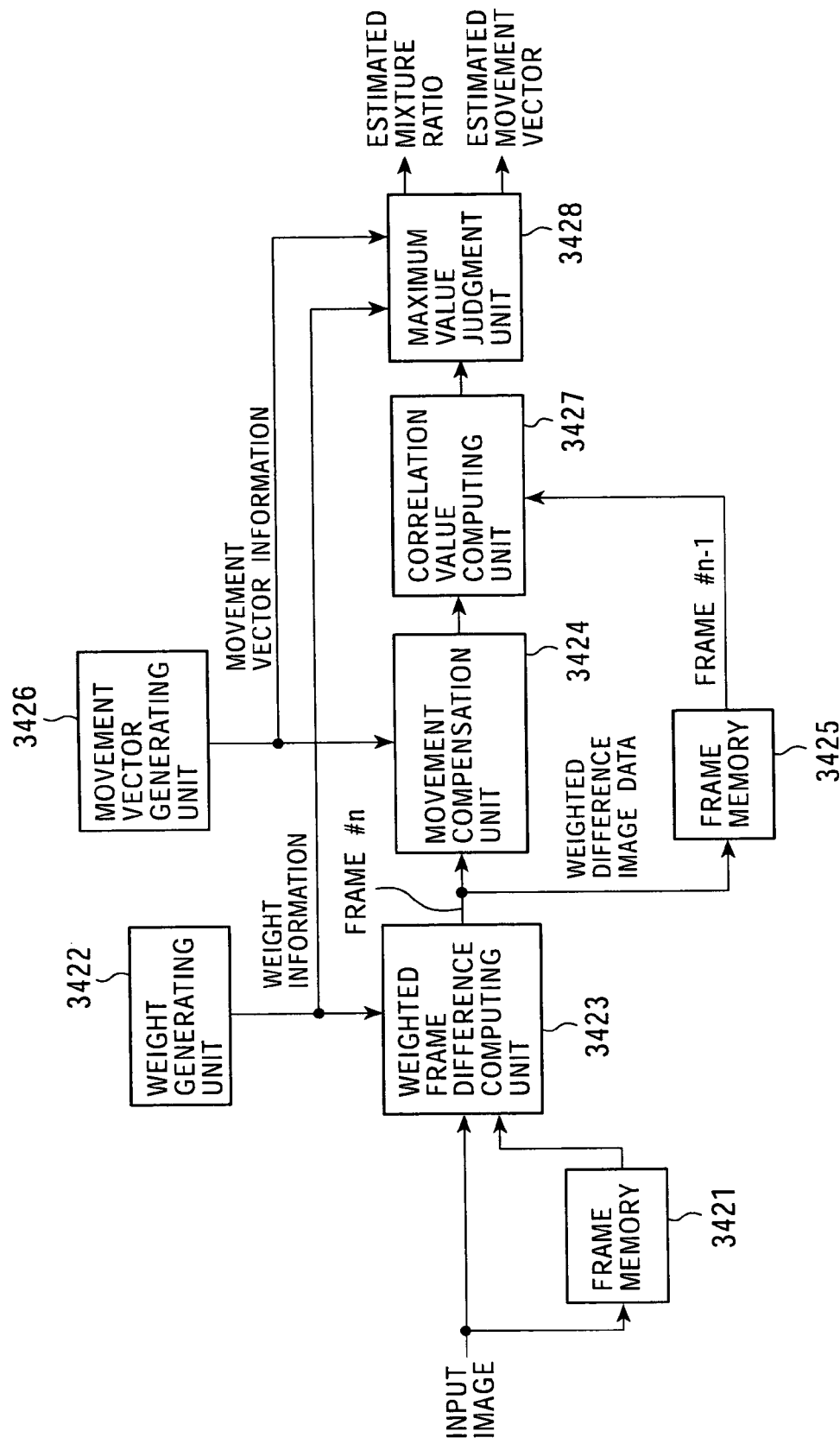

FIG. 110 is a block diagram illustrating the configuration of the estimated mixture ratio processing unit 3401.

An image input to the estimated mixture ratio processing unit 3401 is input to the frame memory 3421 and the weighted frame difference computation unit 3423.

The frame memory 3421 stores the input image in increments of frames, delays by a period corresponding to one frame, and supplies the stored image to the weighted frame difference computation unit 3423.

The weight generating unit 3422 generates weight wherein the value thereof sequentially increases from a predetermined initial value corresponding to one frame, and supplies the generated weight as weight information to the weighted frame difference computation unit 3423 and maximum value judgment unit 3428. For example, the weight generating unit 3422 sets an initial value stored beforehand as the weight, and generates a weight which increases from the initial value sequentially, by adding the incrementation δ which is a minute value stored beforehand, to the weight, sequentially.

Or, the weight generating unit 3422 generates weight corresponding to a block made up of multiple pixels centered on one pixel of interest, and supplies the generated weight as weight information to the weighted frame difference computation unit 3423 and the maximum value judgment unit 3428. A weight corresponding to a block is made up of one value, or made up of multiple values corresponding to each of the multiple pixels configuring the block.

The weighted frame difference computation unit 3423 multiplies the pixel value of the pixel of the frame supplied from the frame memory 3421 by the weight supplied from the weight generating unit 3422, and calculates weighted pixel values. The weighted frame difference computation unit 3423 subtracts the weighed pixel value of a corresponding pixel from the pixel value of a pixel of interest in the input image, to calculate the weighted difference.

Or, the weighted frame difference computation unit 3423 multiples each pixel in a block made up of multiple pixels centered on a pixel corresponding to the pixel of interest in the frame supplied from the frame memory 3421, by the weight supplied from the weight generating unit 3422, to calculate the weighted pixel value. The weighted frame difference computation unit 3423 subtracts the weighed pixel value of corresponding pixels of the corresponding block from the pixel value of each pixel of a block made up of multiple pixels centered on a pixel corresponding to the pixel of interest in the input image, to calculate the weighted difference.

The weighted frame difference computation unit 3423 calculates multiple weighted differences for one frame, corresponding to the weight which sequentially increases from the initial value, that is supplied from the weight generating unit 3422.

The weighted frame difference computation unit 3423 supplies the weighted difference thus calculated to the movement compensation unit 3424 and the frame memory 3425, as weighted difference image data.

The movement compensation unit 3424 performs movement compensation for the weighted difference image data supplied from the weighted frame difference computation unit 3423 based on the movement vector supplied from the movement vector generating unit 3426, and supplies the weighted difference subjected to movement compensation to the correlation value computing unit 3427.

The frame memory 3425 stores the multiple pieces of weighted difference image data supplied from the weighted frame difference computation unit 3423 for each frame, delays by a time period corresponding to one frame, and supplies the stored weighted difference image data to the correlation value computing unit 3427.

The movement vector generating unit 3426 generates a movement vector wherein the size thereof sequentially increases from a predetermined initial value as well as the angle thereof sequentially changing from a different predetermined initial value, for each of the weights generated by the weight generating unit 3422, and supplies the generated movement vector to the movement compensation unit 3424 and the maximum value judgment unit 3428.

For example, the movement vector generating unit 3426 generates movement vectors based on an initial value of a size and an initial value of an angle, stored beforehand. The movement vector generating unit 3426 changes the size of the movement vector by adding a predetermined increment to the size of the generated movement vector. In the event that the size of the movement vector exceeds a predetermined value, the movement vector generating unit 3426 adds a predetermined angle to the angle of the movement vector, while setting the initial value of the size to the size of the movement vector.

The movement vector generating unit 3426 repeats the processing for changing the size of the movement vector and the angle thereof, and generates a movement vector within a predetermined range in size and angle.

The correlation value computing unit 3427 computes for each pixel the correlation value between weighted difference image data subjected to movement compensation that has been supplied from the movement compensation unit 3424, and the weighted difference image data delayed by one frame that is supplied from the frame memory 3425, for each combination of each of the weights and each of the movement vectors, and supplies the computed correlation values to the maximum value judgment unit 3428.

The correlation value computing unit 3427 calculates, for each pixel, the absolute value of difference between the weighted difference image data subjected to movement compensation that has been supplied from the movement compensation unit 3424, and the weighted difference image data delayed by one frame that is supplied from the frame memory 3425, for example, and supplies the absolute value of the difference which has been calculated to the maximum value judgment unit 3428 as a correlation value. The correlation value output from the correlation value computing unit 3427 will also be referred to as inter-weighted-difference-image correlation data.

Also, the correlation value computing unit 3427 computes, for each block, the correlation value between the weighted difference image data subjected to movement compensation that has been supplied from the movement compensation unit 3424, and the weighted difference image data delayed by one frame that is supplied from the frame memory 3425, for each combination of each of the weights and each of the movement vectors, and supplies the computed correlation values to the maximum value judgment unit 3428.

The correlation value computing unit 3427 may be arranged so as to calculate a sum of absolute value of difference, or a sum of squared difference, or the like, as a correlation value, based on a 3×3 pixel block, for example.

The maximum value judgment unit 3428 stores correlation values supplied from the correlation value computing unit 3427, corresponding to combinations of values of weights indicated by the weight information supplied from the weight generating unit 3422 and movement vectors indicated by movement vector information supplied from the movement vector generating unit 3426. The maximum value judgment unit 3428 selects the weight and movement vector corresponding to the greatest correlation value, based on the stored correlation values. The maximum value judgment unit 3428 sets the selected weight for the estimated mixture ratio, and outputs the estimated mixture ratio to which the selected weight has been set. The maximum value judgment unit 3428 sets the selected movement vector for the estimated movement vector, and outputs the estimated movement vector to which the selected movement vector has been set Note that the maximum value judgment unit 3428 may be arranged to further select more accurate weights and movement vectors, based on the mutual relationship between the weight corresponding to the pixel and the pixel position. Details of the processing for selecting movement vectors based on the mutual relationship between the weight corresponding to the pixel and the pixel position will be described later.

The processing of the estimated mixture ratio processing unit 3401 corresponding to the covered background region will be described with reference to FIG. 111 through FIG. 116.

Figure 111:
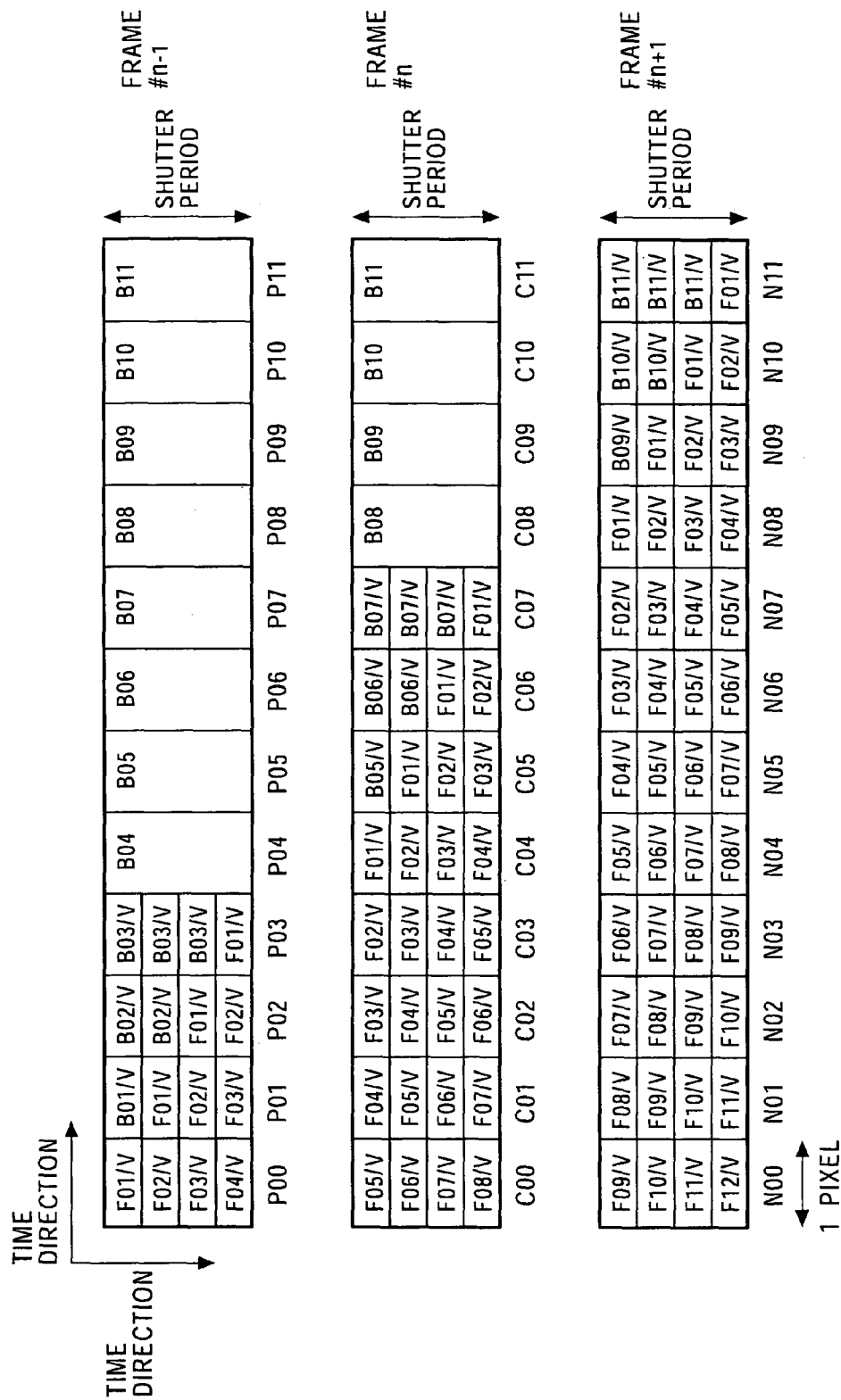

In the model of an image wherein the movement amount v of the foreground object is 4, shown as an example in FIG. 111, the sixth through eighth pixels from the left in the frame #n belong to the mixed region.

The pixel value of the sixth pixel from the left in the frame #n can be represented with Expression (145). In the same way, the pixel value of the seventh pixel from the left in frame #n can be represented with Expression (146), and the pixel value of the eighth pixel from the left in frame #n can be represented with Expression (147).

$$C05 = \sum_{i=1}^{3} Fi + \alpha 05 \cdot B05 \tag{145}$$

$$C06 = \sum_{i=1}^{2} Fi + \alpha 06 \cdot B06 \tag{146}$$

$$C07 = \sum_{i=1}^{1} Fi + \alpha 07 \cdot B07 \tag{147}$$

In the same way, the tenth through twelfth pixels from the left in the frame #n+1 belong to the mixed region. The pixel value of the tenth pixel from the left in the frame #n+1 can be represented with Expression (148). In the same way, the pixel value of the eleventh pixel from the left in the frame #n+1 can be represented with Expression (149), and the pixel value of the twelfth pixel from the left in the frame #n+1 can be represented with Expression (150).

$$N09 = \sum_{i=1}^{3} Fi + \alpha 09 \cdot B09 \tag{148}$$

$$N10 = \sum_{i=1}^{2} Fi + \alpha 10 \cdot B10 \tag{149}$$

$$N11 = \sum_{i=1}^{1} Fi + \alpha 11 \cdot B11 \tag{150}$$

Figure 112:
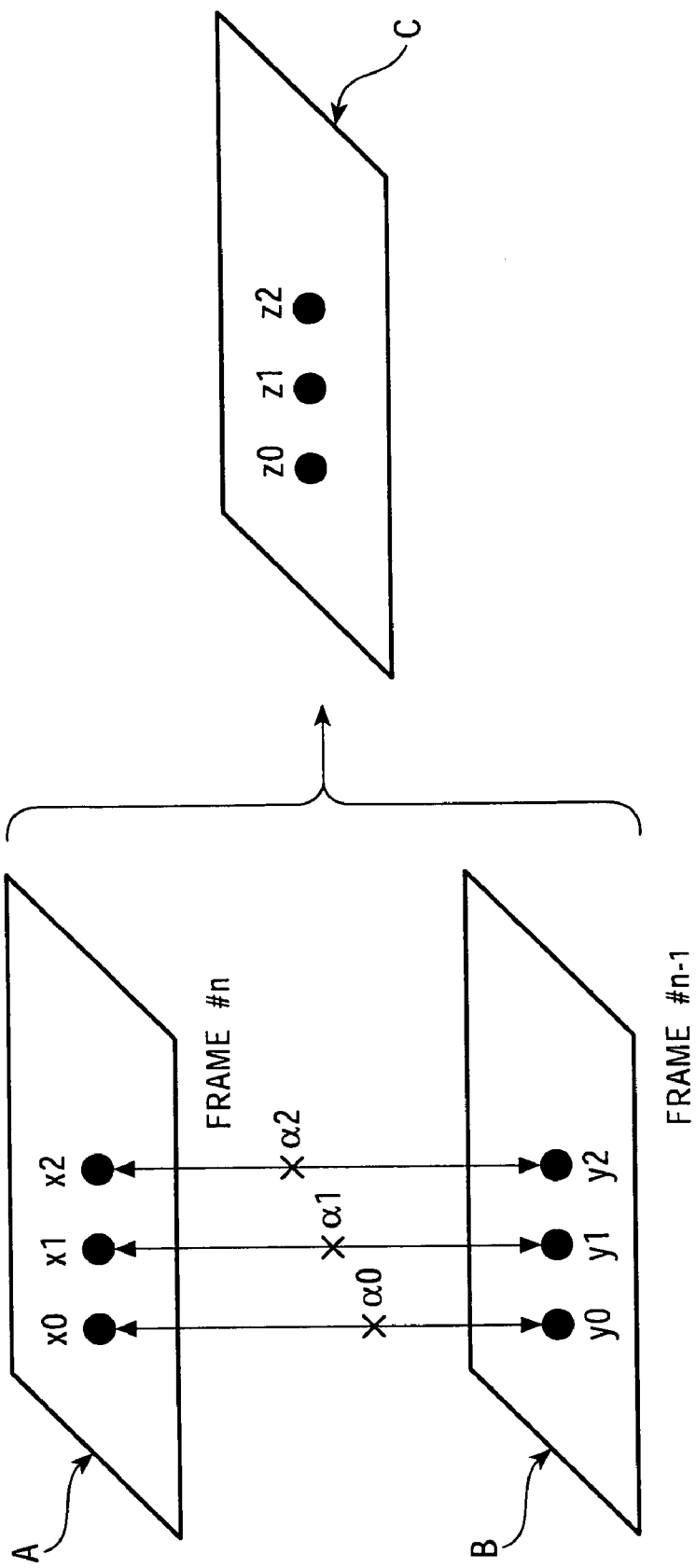

As shown in FIG. 112, the weighted difference image data is calculated by multiplying the weight by the pixel value of the frame #n−1 to calculate a pixel value multiplied by the weight, and subtracting the a pixel value multiplied by the weight from the pixel value of the pixel in the frame #n. A in FIG. 112 indicates the frame #n of the input image, and B in FIG. 112 indicates the frame #n−1 in the input image. C in FIG. 112 indicates the weighted difference image data.

For example, the difference z0 of weighted difference image data corresponding to a pixel with a pixel value of x0 in the frame #n is calculated by Expression (151). The difference z1 of weighted difference image data corresponding to a pixel with a pixel value of x1 in the frame #n is calculated by Expression (152). The difference z2 of weighted difference image data corresponding to a pixel with a pixel value of x2 in the frame #n is calculated by Expression (153).

$$Z0 = x0 - \alpha 0 \times y0 \tag{151}$$

$$Z1 = x1 - \alpha 1 \times y1 \tag{152}$$

$$Z2 = x2 - \alpha 2 \times y2 \tag{153}$$

The y0 is a pixel value of a pixel belonging to the background region of the frame #n−1 corresponding to the pixel which has a pixel value of x0 in the frame #n. The y1 is a pixel value of a pixel belonging to the background region of the frame #n−1 corresponding to the pixel which has a pixel value of x1 in the frame #n. The y2 is a pixel value of a pixel belonging to the background region of the frame #n−1 corresponding to the pixel which has a pixel value of x2 in the frame #n.

In the event that $\alpha 0$ is equal to the mixture ratio $\alpha$ of a pixel having a pixel value of x0 in the frame #n, the difference z0 of the weighted difference image data consists only of the foreground component of a pixel having a pixel value of x0 in the frame #n.

In the event that $\alpha 1$ is equal to the mixture ratio $\alpha$ of a pixel having a pixel value of x1 in the frame #n, the difference z1 of the weighted difference image data consists only of the foreground component of a pixel having a pixel value of x1 in the frame #n.

In the event that $\alpha 2$ is equal to the mixture ratio $\alpha$ of a pixel having a pixel value of x2 in the frame #n, the difference z2 of the weighted difference image data consists only of the foreground component of a pixel having a pixel value of x2 in the frame #n.

This will now be described with reference to FIG. 113.

An example will be described wherein the sixth pixel from the left in the frame #n is taken as the pixel of interest. In Expression (145), the mixture ratio $\alpha 05$ of the sixth pixel in the frame #n is ¼.

Figure 113:
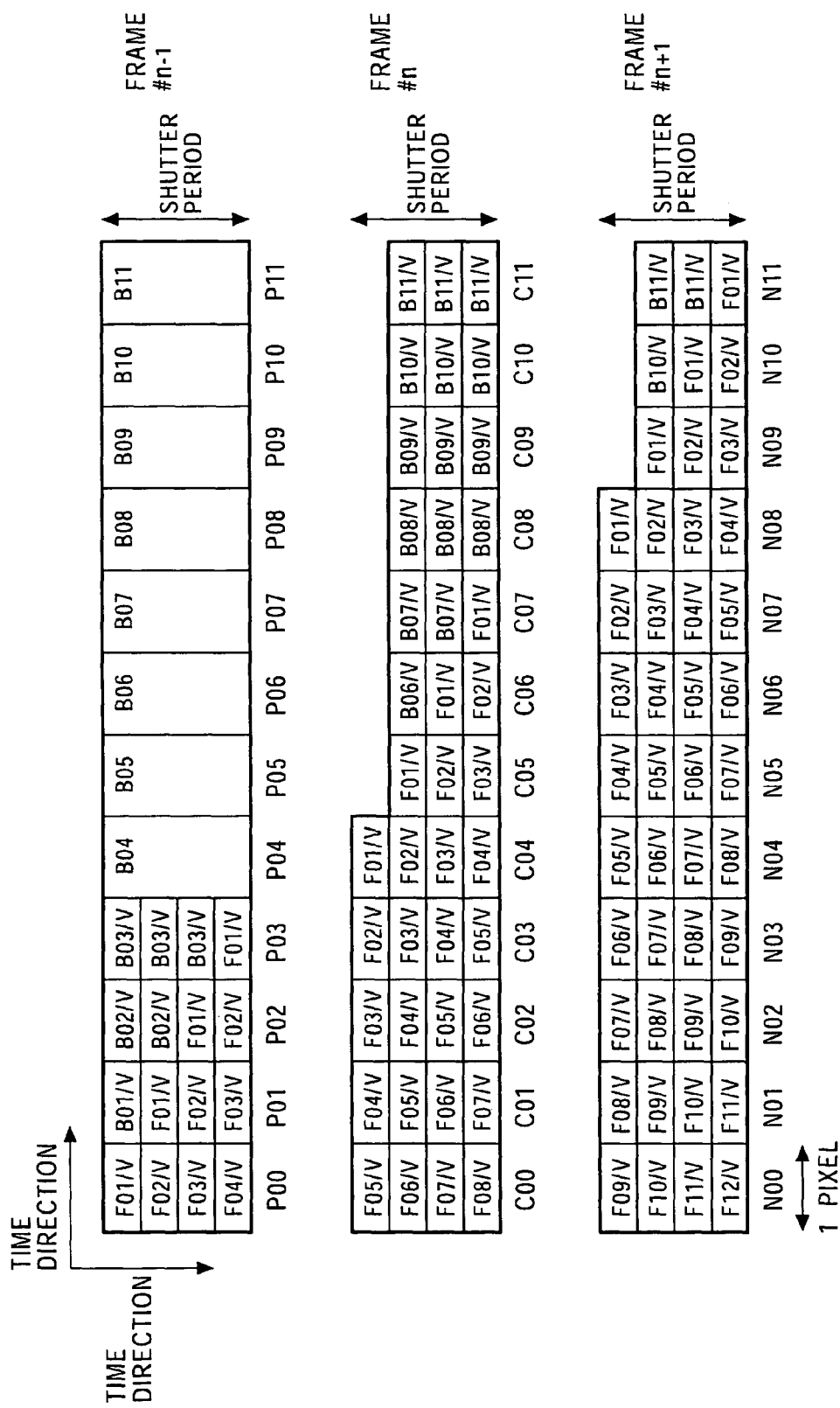

Upon a value being calculated wherein the same value of weight as the mixture ratio of the pixel of interest is multiplied by the pixel value in frame #n−1, and the difference with the pixel value of the pixel of interest in frame #n being obtained, all or part of the background component contained in the pixel value is removed, as shown in FIG. 113.

In the pixel of interest which is the sixth pixel from the left in the frame #n, all of the background component contained in the pixel value is removed, and all of the foreground component is left.

In the same way, in Expression (148), the mixture ratio $\alpha 09$ of the tenth pixel in the frame #n+1 is ¼.

Upon a value being calculated wherein the same value of weight as the mixture ratio $\alpha$ of the pixel of interest in the frame #n is multiplied by the pixel value in frame #n, and the difference with the pixel value of the corresponding pixel belonging to the mixed region in the frame #n+1 being obtained, all or part of the background component contained in the pixel value is removed, as shown in FIG. 113.

In the tenth pixel from the left, all of the background component contained in the pixel value is removed, and all of the foreground component is left.

As shown in FIG. 113, the foreground component contained in the sixth pixel from the left in frame #n is the same as the foreground component contained in the tenth pixel from the left in frame #n+1, so in the event that the weight is the same as the mixture ratio of the pixel of interest, the correlation between the difference corresponding to the sixth pixel from the left in frame #n and the difference of the tenth pixel from the left in frame #n+1 is the greatest of the correlations between the difference corresponding to the sixth pixel from the left in the frame #n and the difference of each of the pixels in the frame #n+1.

Figure 114:
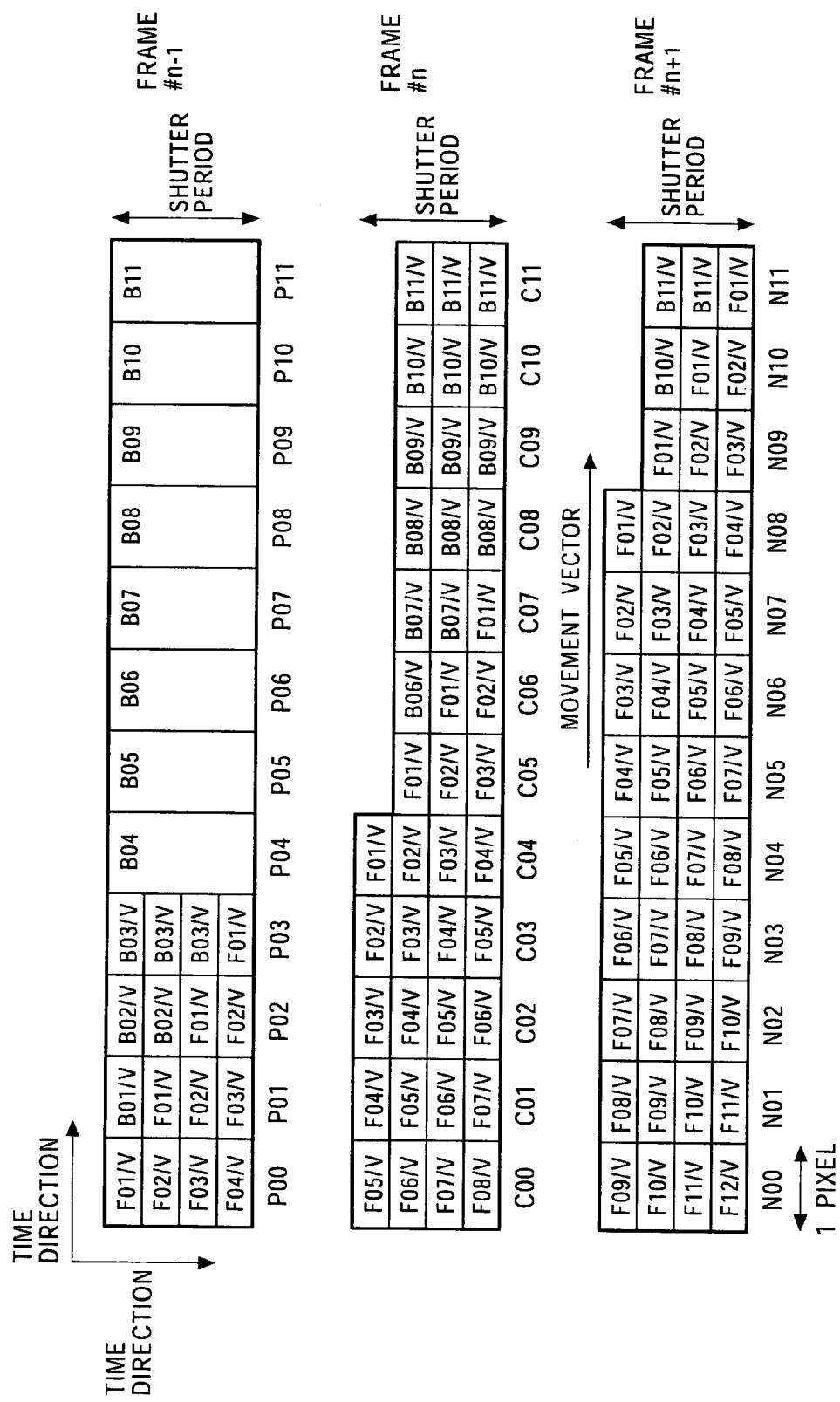

As shown in FIG. 114, in the event that the sixth pixel from the left in frame #n is the pixel of interest, the maximum value judgment unit 3428 selects a weight ¼ corresponding to the maximum correlation as the estimated mixture ratio, and also selects a movement vector indicating the tenth pixel from the left in frame #n+1 as an estimated movement vector corresponding to the pixel of interest in the frame #n, with the sixth pixel from the left in frame #n as a reference.

In the same way, an example will be described wherein the seventh pixel from the left in the frame #n is taken as the pixel of interest. In Expression (146), the mixture ratio $\alpha 06$ of the seventh pixel from the left in the frame #n is ½.

Figure 115:
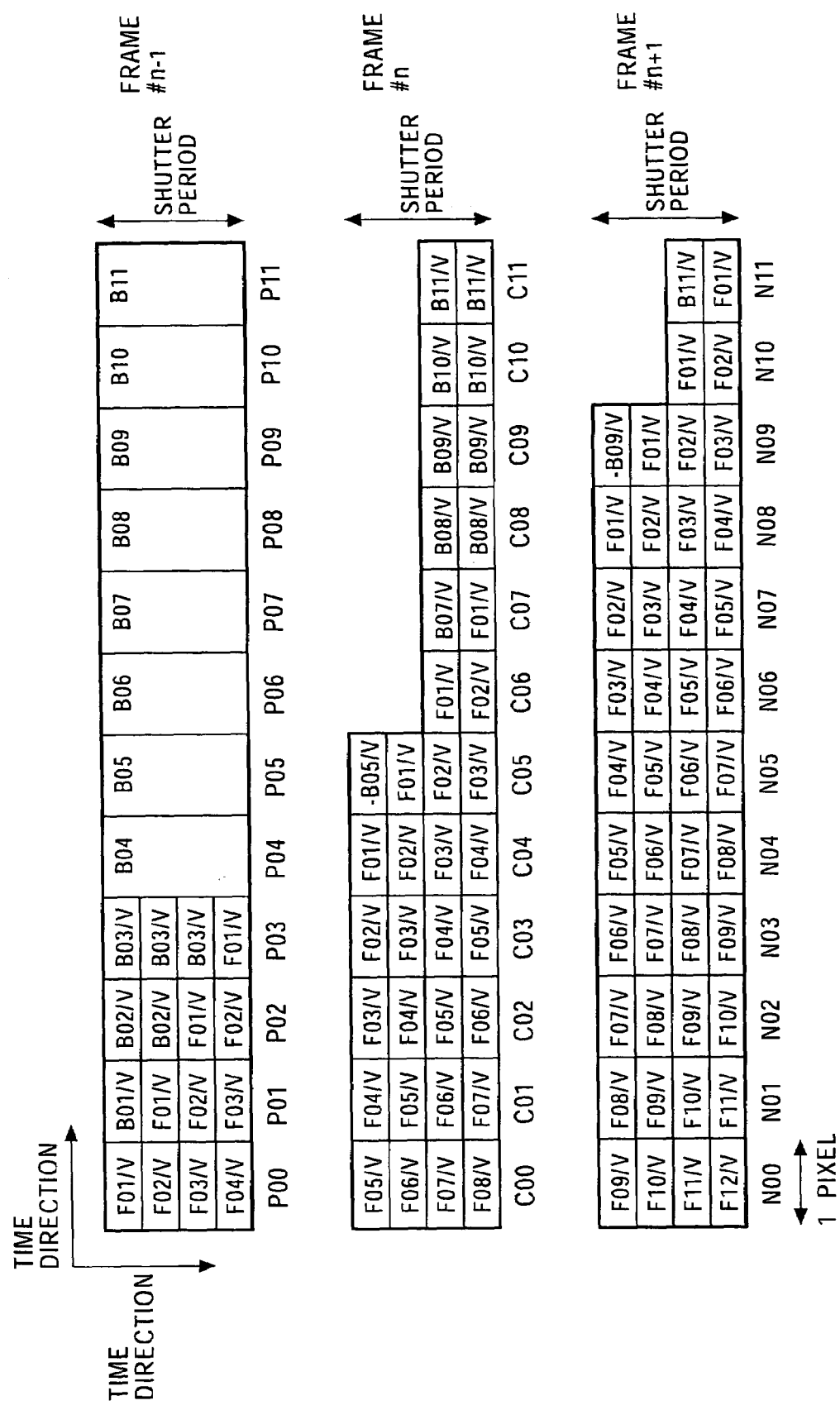

Upon a value being calculated wherein the same weight as the mixture ratio of the pixel of interest is multiplied by the pixel value in frame #n−1, and the difference with the pixel value of the corresponding pixel belonging to the mixed region or background region of the frame #n being obtained, all or part of the background component contained in the pixel value is removed, as shown in FIG. 115. In the sixth pixel from the left, the background component equal to or exceeding the originally contained background component is removed, so this pixel value contains a negative value for the corresponding background component.

In the seventh pixel from the left in the frame #n, all of the background component contained in the pixel value is removed, and all of the foreground component is left.

In Expression (149), the mixture ratio $\alpha 10$ of the eleventh pixel in the frame #n+1 is ½.

Upon a value being calculated wherein the same value of weight as the mixture ratio $\alpha$ of the pixel of interest of the frame #n is multiplied by the pixel value in frame #n, and the difference with the pixel value of the corresponding pixel belonging to the mixed region of the frame #n+1 being obtained, all or part of the background component contained in the pixel value is removed, as shown in FIG. 115. In the tenth pixel from the left, the background component equal to or exceeding the originally contained background component is removed, so this pixel value contains a negative value for the corresponding background component.

In the eleventh pixel from the left, all of the background component contained in the pixel value is removed, and all of the foreground component is left.

As shown in FIG. 115, the foreground component contained in the seventh pixel from the left in frame #n is the same as the foreground component contained in the eleventh pixel from the left in frame #n+1, so in the event that the weight is the same as the mixture ratio of the pixel of interest, the correlation between the difference of the seventh pixel from the left in frame #n and the difference corresponding to the eleventh pixel from the left in frame #n+1 is the greatest of the correlations between the difference corresponding to the seventh pixel from the left in the frame #n and the difference of each of the pixels in the frame #n+1.

Figure 116:
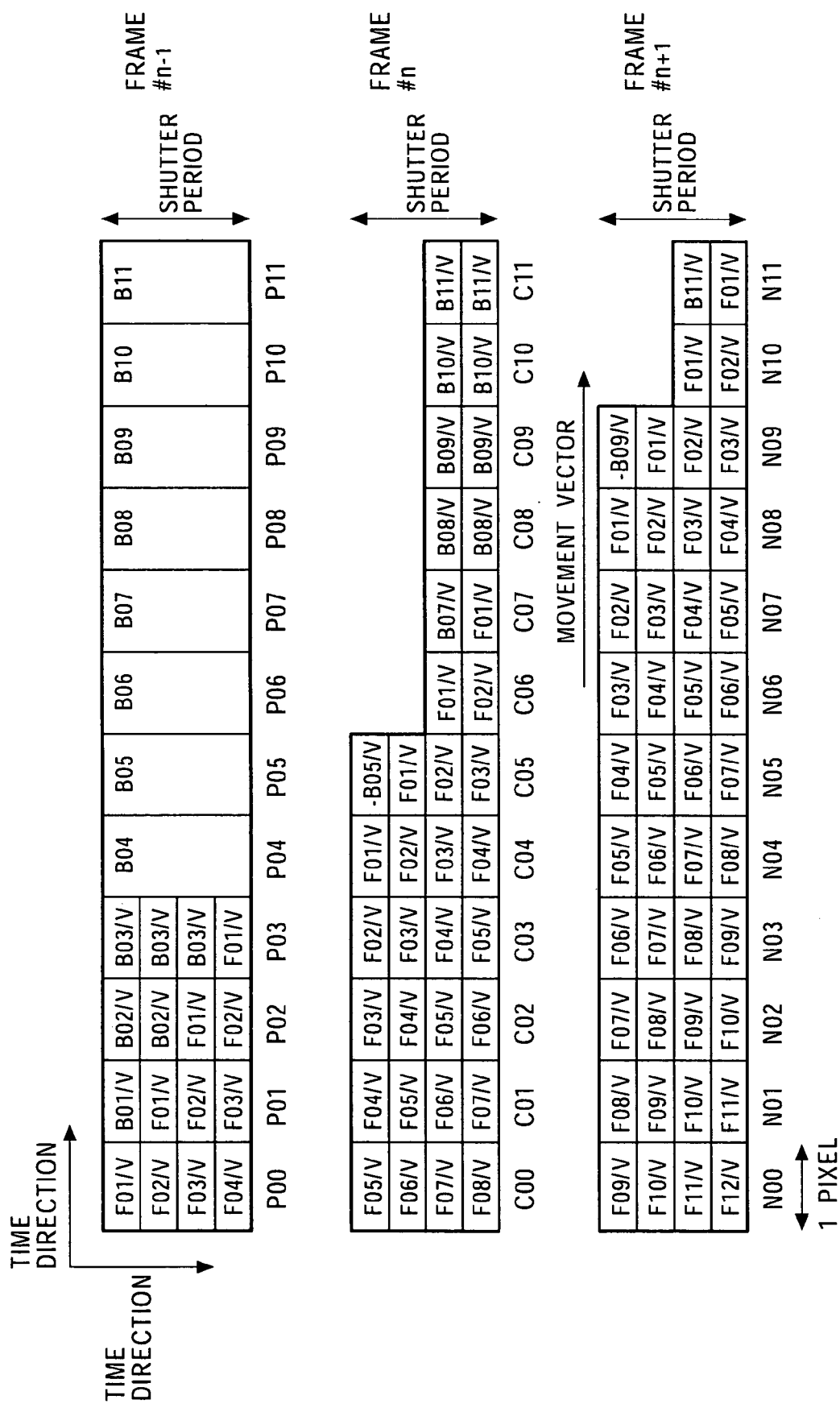

As shown in FIG. 116, in the event that the seventh pixel from the left in frame #n is the pixel of interest, the maximum value judgment unit 3428 selects a weight ½ corresponding to the maximum correlation as the estimated mixture ratio, and also selects a movement vector indicating the eleventh pixel from the left in frame #n+1 as an estimated movement vector corresponding to the seventh pixel from the left in the frame #n, with the seventh pixel from the left in frame #n as a reference.

Figure 117:
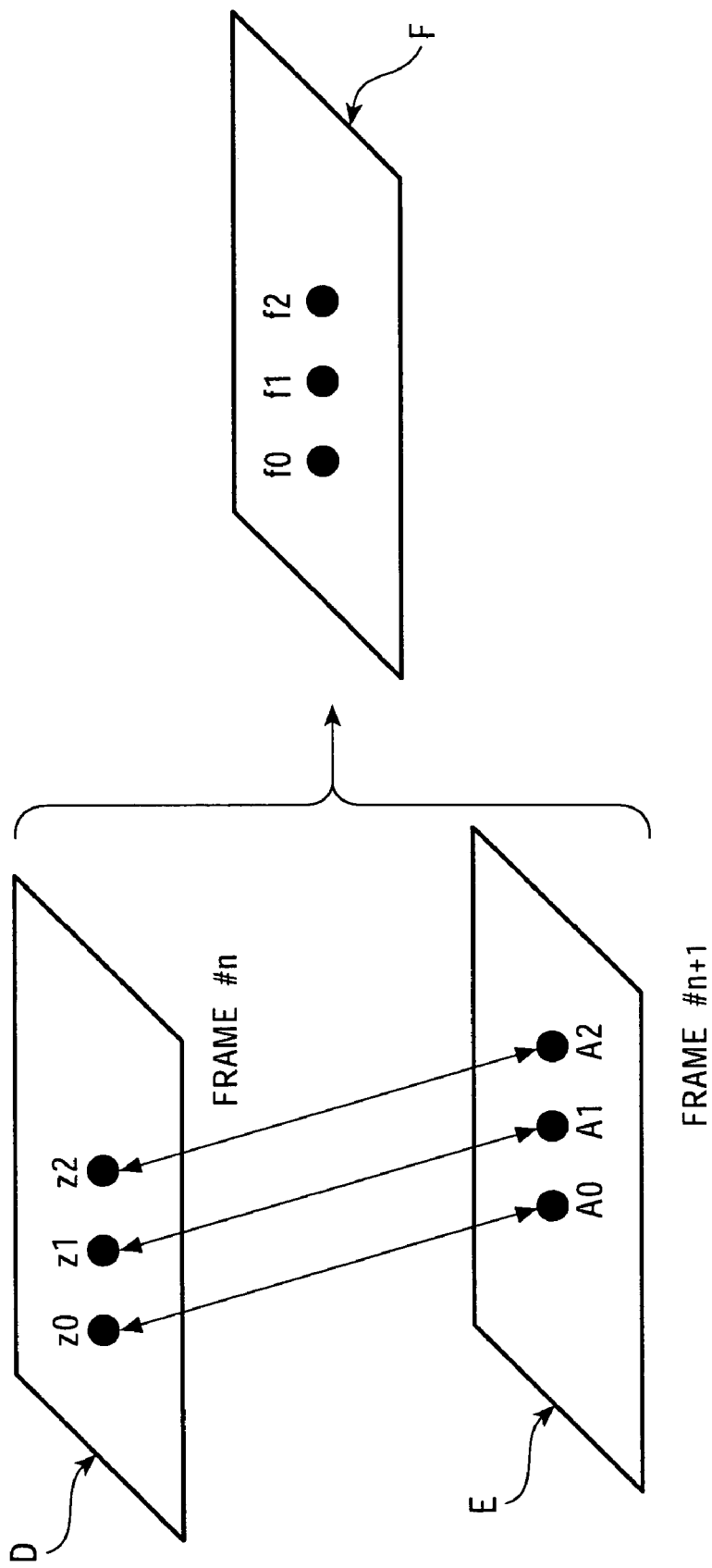

That is, as shown in FIG. 117, upon calculating a value by multiplying a pixel value in frame #n−1 by a certain weight and obtaining differences z0, z1, and z2 with pixel values of corresponding pixels belonging to the mixed region in frame #n, and calculating a value by multiplying a pixel value in frame #n by the same weight and obtaining differences A0, A1, and A2 with pixel values of corresponding pixels belonging to the mixed region in frame #n+1, in the event that, for example, the difference z1 corresponding to the pixel of interest in the frame #n and the difference A1 corresponding to the pixel at the position indicated by the movement vector in the frame #n+1 with the pixel of interest as a reference, are equal, the weight thereof is equal to the mixture ratio α of the pixel of interest in frame #n, and the movement vector is equal to the movement vector of he pixel of interest in the frame #n. D in FIG. 117 indicates weighted difference image data corresponding to frame #n, and E in FIG. 117 indicates weighted difference image data corresponding to frame #n+1. F in FIG. 117 indicates the weighted difference image correlation data.

In this way, the estimated mixture ratio processing unit 3401 calculates a value by multiplying a pixel value in frame #n−1 by a certain weight and obtains the difference with the pixel value of a corresponding pixel belonging to the mixed region in frame #n, and also calculates a value by multiplying a pixel value in frame #n by the same weight and obtains the difference with the pixel value of a corresponding pixel belonging to the mixed region in frame #n+1. In the event that the difference corresponding to the pixel of interest in the frame #n and the difference corresponding to the pixel at the position indicated by the movement vector in the frame #n+1 with the pixel of interest as a reference, are equal, the estimated mixture ratio processing unit 3401 takes the weight thereof as the mixture ratio α of the pixel of interest in frame #n, and takes the movement vector thereof as the movement vector of he pixel of interest in the frame #n.

The estimated mixture ratio processing unit 3401 may be arranged so as to detect estimated mixture ratio and estimated movement vectors in increments of blocks made up of a predetermined number of pixels.

Figure 118:
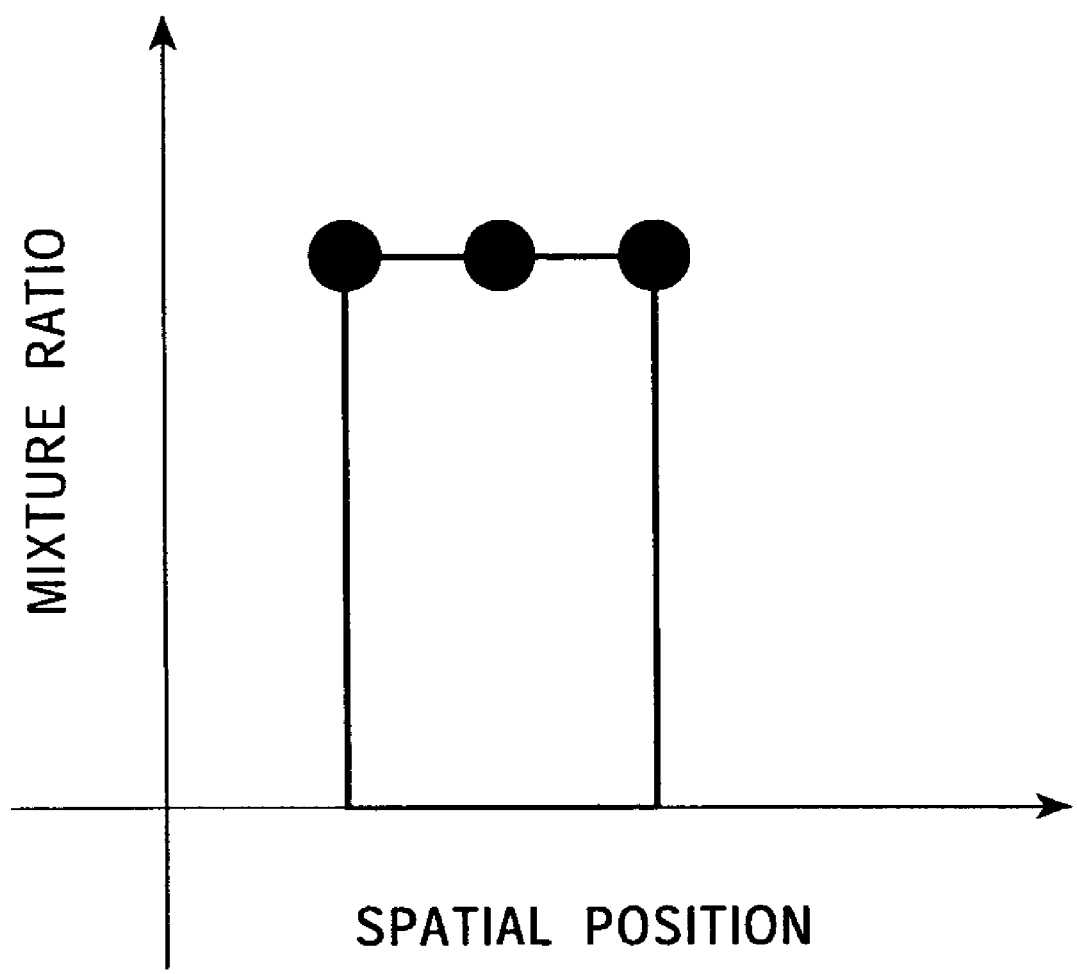
Figure 119:
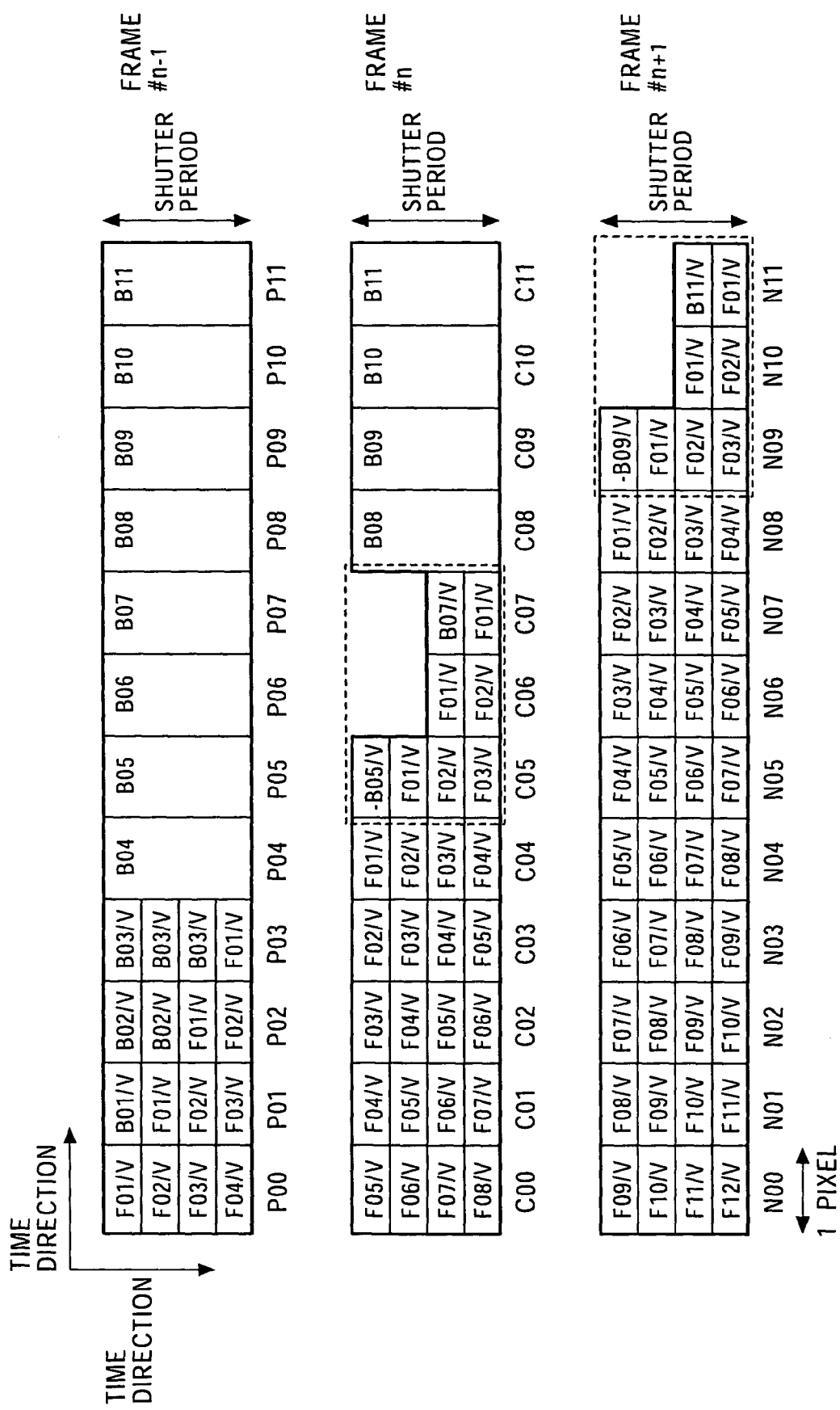

For example, as shown in FIG. 118, the estimated mixture ratio processing unit 3401 can detect the estimated mixture ratio and estimated movement vector with three pixels as one block, assuming that the mixture ratio α in one block is constant. More specifically, as shown in FIG. 119, for example, with the sixth through eight pixels from the left in the frame #n as one block, the estimated mixture ratio processing unit 3401 calculates difference corresponding to one weight, obtains the correlation with the difference of corresponding blocks in the frame #n, and selects the weight and movement vector corresponding to the block with the highest correlation.

Figure 120:
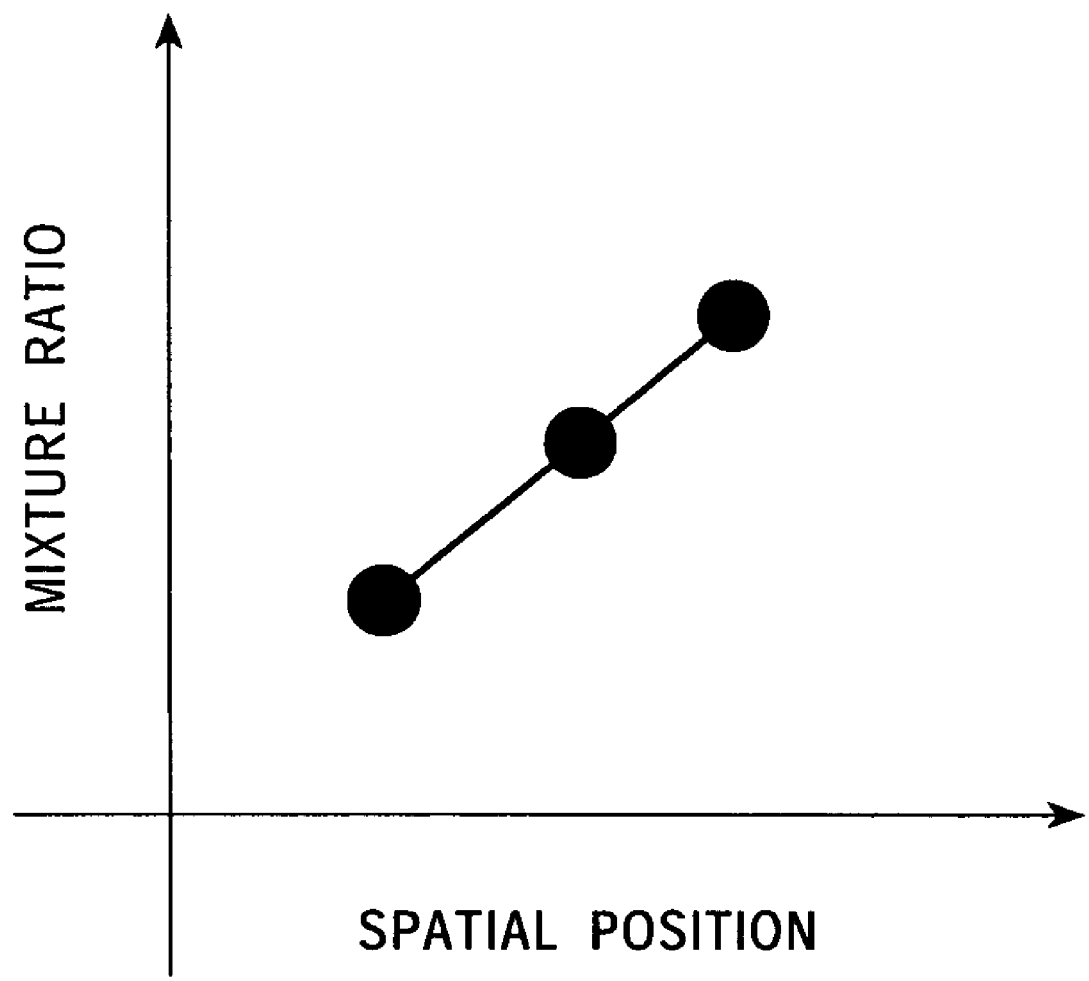

Also, for example, as shown in FIG. 120, the estimated mixture ratio processing unit 3401 can detect the estimated the mixture ratio and estimated movement vector with three pixels as one block, applying a predetermined straight line or a curve to one block, assuming that the mixture ratio α changes corresponding to the applied straight line or curve. In the event that a predetermined straight line or a curve is applied to one block with three pixels as one block, the weight generating unit 3422 outputs three weights corresponding to the three pixels contained in the one block, corresponding to the straight line or curve, as weight information.

For example, one piece of weight information generated by the weight generating unit 3422 is made up of three weights, having the values of 0.25, 0.5, and 0.75.

The weight generating unit 3422 generates weight information made up of multiple weight corresponding to straight lines or curves with the inclination, intercept, or curvature changed, corresponding to one frame.

Figure 121:
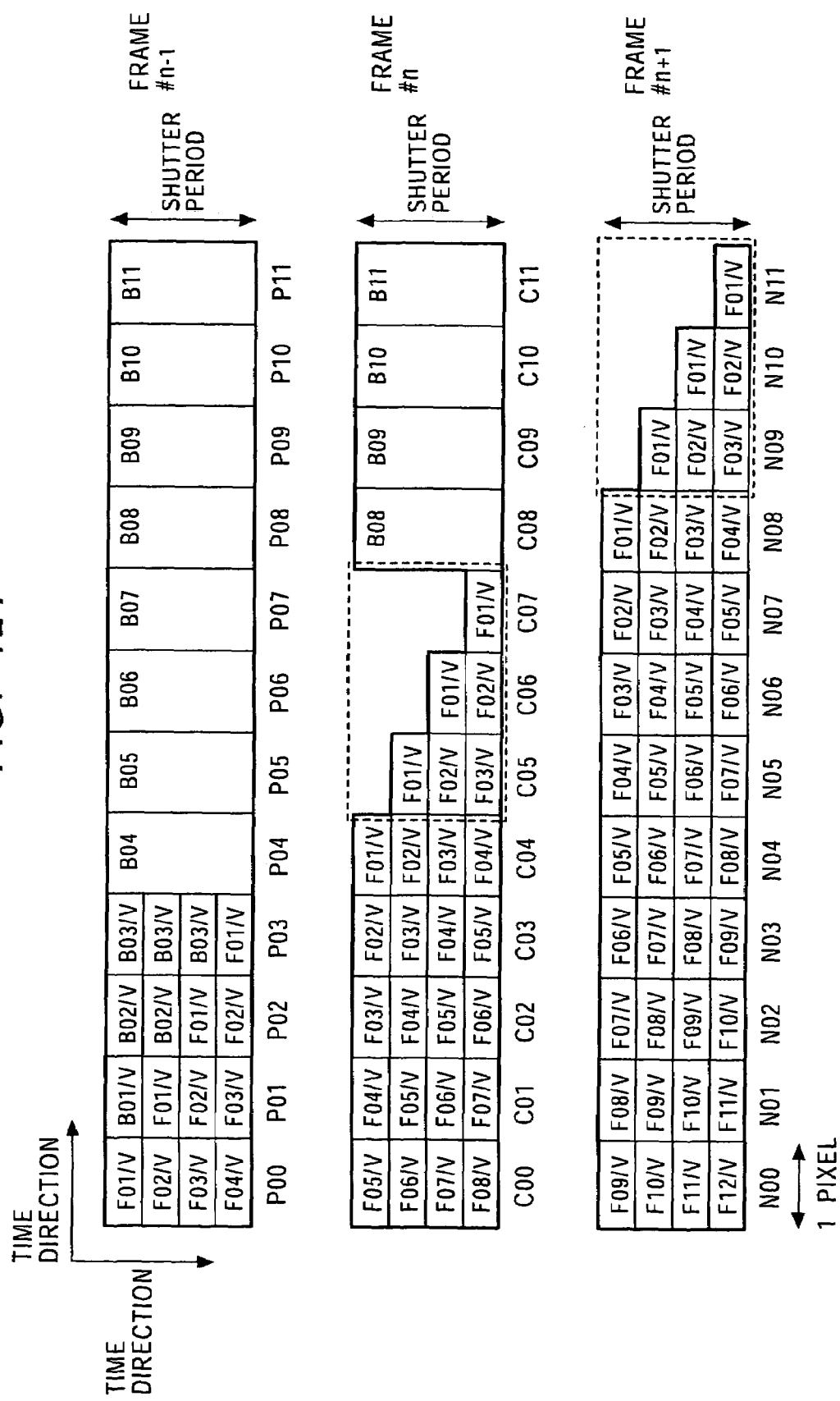

More specifically, for example, in the event of the weight generating unit 3422 generating one piece of weight information made up of 0.25, 0.5, and 0.75 corresponding to a straight line, corresponding to one block, the estimated mixture ratio processing unit 3401 calculates difference for the sixth pixel from the left in frame #n based on the weight of 0.25, calculates difference for the seventh pixel from the left in frame #n based on the weight of 0.5, and calculates difference for the eighth pixel from the left in frame #n based on the weight of 0.75, with the sixth through eighth pixels from the left in the frame #n as one block, as shown in FIG. 121. In the same way, the estimated mixture ratio processing unit 3401 calculates difference for the tenth pixel from the left in frame #n+1 based on the weight of 0.25, calculates difference for the eleventh pixel from the left in frame #n+1 based on the weight of 0.5, and calculates difference for the twelfth pixel from the left in frame #n+1 based on the weight of 0.75, with the tenth through twelfth pixels from the left in the frame #n+1 as one block.

The estimated mixture ratio processing unit 3401 obtains the correlation of difference based on the weight corresponding to the straight line or curve, and selects the weight and movement vector corresponding to the block with the highest correlation.

As shown in FIG. 122, the estimated mixture ratio processing unit 3401 can detect the estimated the mixture ratio and estimated movement vector with three pixels as one block, correlating a predetermined weight to each pixel. Such detection of estimated mixture ratio per each pixel is also referred to as a mixture ratio total search.

More specifically, for example, in the event of the weight generating unit 3422 generating one piece of weight information made up of 0.75, 0.25, and 0.5 corresponding to one block, the estimated mixture ratio processing unit 3401 calculates difference for the sixth pixel from the left in frame #n based on the weight of 0.75, calculates difference for the seventh pixel from the left in frame #n based on the weight of 0.25, and calculates difference for the eighth pixel from the left in frame #n based on the weight of 0.5, with the sixth through eighth pixels from the left in the frame #n as one block, as shown in FIG. 123. In the same way, the estimated mixture ratio processing unit 3401 calculates difference for the tenth pixel from the left in frame #n+1 based on the weight of 0.75, calculates difference for the eleventh pixel from the left in frame #n+1 based on the weight of 0.75, and calculates difference for the twelfth pixel from the left in frame #n+1 based on the weight of 0.5, with the tenth through twelfth pixels from the left in the frame #n+1 as one block.

The estimated mixture ratio processing unit 3401 obtains the correlation of difference based on the weight corresponding to each pixel of the one block, and selects the weight and movement vector corresponding to the block with the highest correlation.

Now, while description has been made with a block made up of three pixels as an example, the signal processing device according to the present invention is not restricted by the number of pixels contained in the block. Also, the block may be arranged to be made up of a predetermined number of pixels arrayed on a predetermined straight line, or may be made up of a predetermined number of pixels on a predetermined plane, such as three pixels by three pixels.

Next, processing for the estimated mixture ratio processing unit 3401 to further select a more accurate weight and movement vector, at the time of detecting the estimated mixture ratio and estimated movement vector per each pixel, or at the time of detecting the estimated mixture ratio and movement vector based on the correlation of difference based on the weight corresponding to each of the pixels in one block, will be described.

As described above, one frame is a short time period, so an assumption may be made that the object corresponding to the foreground is a rigid body, and moves at a constant velocity. Also, since an assumption may be made that the object corresponding to the foreground moves at a constant velocity within the shutter period, the mixture ratio α of a pixel belonging to the mixed region changes linearly.

The foreground object is a rigid body, so there is one movement vector corresponding to the foreground object.

Taking advantage of this nature, the estimated mixture ratio processing unit 3401 further selects a more accurate weight and movement vector.

In FIG. 124 through FIG. 128, the white circles in the drawings represent pixels. Let us say that the weights w0 through w3 corresponding to each of the pixels satisfy the relationship in Expression (154).

$$0 < w0 < w1 < w2 < w3 < 1 \qquad (154)$$

The estimated mixture ratio processing unit 3401 judges whether or not the position of at least one pixel of the pixels corresponding to the weight satisfying the relationship in Expression (154) and one movement vector is outside the mixed region, and in the event that judgment is made that the position of at least one pixel is outside the mixed region, the mixture ratio α of the foreground region is 0 and the mixture ratio α of the background region is 1, so this weight and vector is not selected.

For example, as shown in FIG. 124, in the event that the position of a pixel corresponding to the weight w0 is outside the mixed region, the estimated mixture ratio processing unit 3401 selects neither the weights w0 through w3 nor the movement vector.

The estimated mixture ratio processing unit 3401 judges whether or not the position of a pixel corresponding to the weight satisfying the relationship in Expression (154) and one movement vector is in a positional relationship corresponding to the size of the weight in Expression (154), and in the event that judgment is made that this is not in a positional relationship corresponding to the size of the weight, the weight and the movement vector are not selected.

For example, as shown in FIG. 125, in the event that a pixel corresponding to the weight w3, a pixel corresponding to the weight w1, a pixel corresponding to the weight w2, and a pixel corresponding to the weight w0, are sequentially arrayed, the mixture ratio α changes linearly, so the estimated mixture ratio processing unit 3401 selects neither the weights w0 through w3 nor the movement vector.

As shown in FIG. 126, in the event that all pixels are situated within the mixed region, and a pixel corresponding to the weight w0, a pixel corresponding to the weight w1, a pixel corresponding to the weight w2, and a pixel corresponding to the weight w3, are sequentially arrayed, the estimated mixture ratio processing unit 3401 selects the weights w0 through w3 and the movement vector.

Further, the estimated mixture ratio processing unit 3401 can select a more accurate weight and movement vector, based on the dispersion of distance of pixels indicated by the movement vector.

In the event that all pixels are situated within the mixed region, and the pixel corresponding to the weight w0, the pixel corresponding to the weight w1, the pixel corresponding to the weight w2, and the pixel corresponding to the weight w3, are sequentially arrayed, the estimated mixture ratio processing unit 3401 selects the weights w0 through w3 and the movement vector with smaller dispersion of distance of pixels.

For example, in the examples shown in FIG. 127 and FIG. 128, the dispersion of distance of pixels shown in FIG. 127 is greater than the dispersion of distance of pixels shown in FIG. 128, so the estimated mixture ratio processing unit 3401 selects the weights w0 through w3 and the movement vector with smaller dispersion, corresponding to FIG. 128. That is to say, the estimated mixture ratio processing unit 3401 selects the weights w0 through w3 and the movement vector wherein the distance of pixels indicated by movement vector is uniform. This means that the estimated mixture ratio processing unit 3401 selects a combination wherein the weight changes more linearly, since the mixture ratio α changes linearly.

Also, while the estimated mixture ratio processing unit 3401 detects estimated mixture ratio and estimated movement vectors with pixels of the previous frame as background pixels, corresponding to the covered background region, the estimated mixture ratio processing unit 3402 detects estimated mixture ratio and estimated movement vectors with pixels of the next frame as background pixels, corresponding to the uncovered background region, with the same processing as the estimated mixture ratio processing unit 3401, so description thereof will be omitted.

FIG. 129 is a block diagram illustrating another configuration of the coincidence detecting unit 3001. Parts the same as the case shown in FIG. 109 are denoted with the same reference numerals, and description thereof will be omitted.

The selection unit 3441 supplies pixels belonging to the covered background region, and pixels corresponding thereto in the previous frame, based on region information supplied from the region specifying unit 103, to the estimated mixture ratio processing unit 3401. The selection unit 3441 supplies pixels belonging to the uncovered background region, and pixels corresponding thereto in the following frame, based on region information supplied from the region specifying unit 103, to the estimated mixture ratio processing unit 3402.

Based on region information supplied from the region specifying unit 103, in the event that a pixel which is an object belongs to the foreground region, the selection unit 3442 selects an estimated mixture ratio which is 0 and sets this for the mixture ratio α, and in the event that a pixel which is an object belongs to the background region, selects an estimated mixture ratio which is 1 and sets this for the mixture ratio α. In the event that a pixel which is an object belongs to the covered background region, the selection unit 3442 selects an estimated mixture ratio which has been supplied from the estimated mixture ratio processing unit 3401 and sets this for the mixture ratio α, and in the event that a pixel which is an object belongs to the uncovered background region, selects an estimated mixture ratio which has been supplied from the estimated mixture ratio processing unit 3402 and sets this for the mixture ratio α. The selection unit 3442 outputs the mixture ratio α selected and set based on the region information.

Based on region information supplied from the region specifying unit 103, in the event that a pixel which is an object belongs to the covered background region, the selection unit 3442 selects an estimated movement vector which has been supplied from the estimated mixture ratio processing unit 3401 and sets this as the movement vector, and in the event that a pixel which is an object belongs to the uncovered background region, selects an estimated movement vector which has been supplied from the estimated mixture ratio processing unit 3402 and sets this as the movement vector. The selection unit 3442 outputs the movement vector selected and set based on the region information.

Thus, the coincidence detecting unit 3001 having another structure shown in FIG. 129 can detect the mixture ratio α and movement vector for each pixel contained in the image, and output the detected mixture ratio α and movement vector.

The processing of the mixture ratio calculating unit 104, of which the configuration is shown in FIG. 109, detecting the mixture ratio α and movement vector, will be described with reference to the flowchart in FIG. 130. The processing described with reference to the flowchart in FIG. 130 corresponds to the processing in Step S3002.

In Step S3401, the coincidence detecting unit 3001 obtains region information supplied from the region specifying unit 103. In Step S3402, the estimated mixture ratio processing unit 3401 detects the estimated mixture ratio and estimated movement vector corresponding to the covered background region, and supplies the detected estimated mixture ratio to the mixture ratio decision unit 3403, as well as supplying the detected estimated movement vector to the movement vector decision unit 3404. Details of the processing of detection of the estimated mixture ratio and estimated movement vector will be described later, with reference to the flowchart in FIG. 131.

In Step S3403, the estimated mixture ratio processing unit 3402 detects the estimated mixture ratio and estimated movement vector corresponding to the uncovered background region, and supplies the detected estimated mixture ratio to the mixture ratio decision unit 3403, as well as supplying the detected estimated movement vector to the movement vector decision unit 3404.

In Step S3404, the coincidence detecting unit 3001 judges whether or not the estimated mixture ratio and estimated movement vector have been detected for the entire frame, and in the event that judgment is made that the estimated mixture ratio and estimated movement vector have not been detected for the entire frame, the flow returns to Step S3402, and processing for detecting the estimated mixture ratio and estimated movement vector for the next pixel is executed.

In Step S3404, in the event that judgment is made that the estimated mixture ratio and estimated movement vector have been detected for the entire frame, the flow proceeds to Step S3405, where the mixture ratio decision unit 3403 sets the mixture ratio α, based on region information supplied from the region specifying unit 103 which indicates which of the foreground region, the background region, the covered background region, or the uncovered background region, the pixel belongs to. In the event that the pixel which is the object belongs to the foreground region, the mixture ratio decision unit 3403 sets the mixture ratio α to 0, in the event that the pixel which is the object belongs to the background region, sets the mixture ratio α to 1, in the event that the pixel which is the object belongs to the covered background region, sets the mixture ratio α to the estimated mixture ratio supplied from the estimated mixture ratio processing unit 3401, and in the event that the pixel which is the object belongs to the uncovered background region, sets the mixture ratio α to the estimated mixture ratio supplied from the estimated mixture ratio processing unit 3402.

The movement vector decision unit 3404 sets the movement vector, based on the region information supplied from the region specifying unit 103 which indicates which of the foreground region, the background region, the covered background region, or the uncovered background region, the pixel belongs to. In the event that the pixel which is the object belongs to the covered background region, the movement vector decision unit 3404 sets the movement vector to the estimated movement vector supplied from the estimated mixture ratio processing unit 3401, and in the event that the pixel which is the object belongs to the uncovered background region, sets the movement vector to the estimated movement vector supplied from the estimated mixture ratio processing unit 3402, and the processing ends.

Thus, the coincidence detecting unit 3001 can simultaneously detect the amount of features corresponding to each pixel, which is the mixture ratio α, and the movement vector, based upon the region information supplied from the region specifying unit 103 and the input image.

The processing of the coincidence detecting unit 3001 having the configuration shown in FIG. 129 detecting the mixture ratio α and the movement vector is the same as the processing described with the flowchart in FIG. 130, so description thereof will be omitted.

Next, the processing of estimating the mixture ratio and movement vector corresponding to the covered background region, corresponding to Step S3402 in FIG. 130, will be described with reference to the flowchart in FIG. 131.

In Step S3421, the weight generating unit 3422 sets an initial value stored beforehand as the weight. The weight generating unit 3422 supplies the weight to which the initial value has been set, to the weighted frame difference computation unit 3423 and the maximum value judgment unit 3428 as weight information.

In Step S3422, the mixture ratio processing unit 3401 judges whether or not the weight which the weight generating unit 3422 outputs has exceeded 1, and in the event that judgment is made that the weight has not exceeded 1, the flow proceeds to Step S3423.

In Step S3423, the weighted frame difference computation unit 3423 calculates the weighted difference which is the difference between the pixel value of the pixel of interest in the frame of interest, and a value wherein the pixel value of the corresponding pixel in the next frame has been multiplied by the weight, and sets the weighted difference of the pixel of interest of the frame of interest, for the difference A. The difference A is output as weighted difference image data.

In Step S3424, the weighted frame difference computation unit 3423 calculates the weighted difference which is the difference between the pixel value of the pixel in the frame following the frame of interest, and a value wherein the pixel value of the corresponding pixel in the frame of interest has been multiplied by the weight, and sets the weighted difference of the pixel of the frame following the frame of interest, as the difference B. The difference B is output as weighted difference image data.

In Step S3425, the movement vector generating unit 3426 sets the initial value for the movement vector, and supplies the movement vector set for the initial value to the movement compensation unit 3424 and maximum value judgment unit 3428.

In Step S3426, the correlation value computing unit 3427 calculates the correlation value between the pixel of interest of the difference A, and the pixel indicated by the movement vector of the difference B, based on the difference A and the difference B.

That is to say, in Step S3426, the movement compensation unit 3424 performs movement compensation for the difference B supplied from the weighted frame difference computation unit 3423, based on the movement vector supplied from the movement vector generating unit 3426, and supplies the difference B subjected to movement compensation, to the correlation value computing unit 3427.

The correlation value computing unit 3427 calculates the correlation value between the difference A supplied from the frame memory 3425 corresponding to the pixel of interest and the difference B that has been movement-compensated, and supplies this to the maximum value judgment unit 3428.

For example, the correlation value computing unit 3427 calculates the correlation value which is the absolute value of the difference corresponding to the pixel of interest in the difference A and the difference corresponding to the pixel in the difference B indicated by the movement vector with the pixel of interest as a reference.

In Step S3427, the maximum value judgment unit 3428 stores the correlation value supplied from the correlation value computing unit 3427 in a manner corresponding to the weight supplied from the weight generating unit 3422 and the movement vector supplied from the movement vector generating unit 3426.

In Step S3428, the movement vector generating unit 3426 adds a predetermined increment to the size of the movement vector.

In Step S3429, the mixture ratio processing unit 3401 judges whether or not the size of the movement vector which the movement vector generating unit 3426 outputs has exceeded a predetermined value, and in the event that judgment is made that the size of the movement vector has exceeded a predetermined value, the flow proceeds to Step S3430, where the movement vector generating unit 3426 sets the initial value for the size of the movement vector. In Step S3431, the movement vector generating unit 3426 adds another predetermined increment to the angle of the movement vector. The movement vector generating unit 3426 supplies the movement vector wherein the size has been set to the initial value and the angle has been changed, to the movement compensation unit 3424 and the maximum value judgment unit 3428.

In Step S3432, the estimated mixture ratio processing unit 3401 judges whether or not correlation values have been calculated for pixels within a predetermined range, based on the size and angle of the movement vector, and in the event that judgment is made that correlation values have not been calculated for pixels within a predetermined range, the flow returns to Step S3426, and the processing for calculating correlation value is repeated.

In Step S3432, in the event that judgment is made that correlation values have been calculated for pixels within a predetermined range, the flow proceeds to Step S3433, where the weight generating unit 3422 adds the incrementation δ stored beforehand to the weight, the flow returns to Step S3422, and the processing for calculating the correlation value corresponding to the weight is repeated.

That is to say, in the event that the weight is 1 or smaller, the processing in Step S3423 through Step S3433 is repeated, a correlation value corresponding to the weight increasing by incrementations δ and movement vector indicating a predetermined range is calculated, and the correlation value is stored in a manner corresponding to the weight and movement vector.

In Step S3429, in the event that judgment is made that the size of the movement vector has not exceeded a predetermined value, the processing returns to Step S3426, and repeats processing for calculating the correlation value corresponding to the weight.

In Step S3422, in the event that judgement has been made that the weight has exceeded 1, the flow proceeds to Step S3434, where the maximum value judgment unit 3428 selects the movement vector and weight corresponding to the greatest correlation value indicating the correlation is the greatest.

In Step S3435, the maximum value judgment unit 3428 sets the selected movement vector for an estimated movement vector, and supplies the estimated movement vector to the movement vector decision unit 3404.

In Step S3436, the maximum value judgment unit 3428 sets the selected weight for an estimated mixture ratio, and outputs the estimated mixture ratio with the weight set to the mixture ratio decision unit 3403, and the processing ends.

In this way, the estimated mixture ratio processing unit 3401 can calculate the estimated mixture ratio and estimated movement vector corresponding to the covered background region.

Note that the processing corresponding to the uncovered background region in Step S3403 is the same as the processing described with reference to the flowchart shown in FIG. 131, except for the point that the pixel value of the following frame is used as the pixel value corresponding to the background in the processing for calculating of the difference A and difference B, so description thereof will be omitted.

Next, other processing of the mixture ratio and movement vector estimation by the mixture ratio processing unit 3401 will be described with reference to the flowchart shown in FIG. 132.

The procedures in Step S3451 through Step S3464 each are the same as the procedures in Step S3421 through Step S3434, so description thereof will be omitted.

In Step S3465, the maximum value judgment unit 3428 selects, of the movement vectors and weights selected in the processing in Step S3464, a movement vector and weight satisfying a predetermined relationship. That is to say, with regard to a position of a pixel indicated by the movement vector, the maximum value judgment unit 3428 selects a movement vector and weight wherein a pixel corresponding to one movement vector and corresponding to a predetermined weight is situated within the mixed region, and wherein the order of the position of the pixel corresponds to the order of the greatness of the weight, as described with reference to FIG. 124 through FIG. 128.

In the event of selecting a more accurate movement vector and weight, the maximum value judgment unit 3428 selects a movement vector and weight wherein the spacing of the position of pixels corresponds to change in the greatness of the weight.

In Step S3466, the maximum value judgment unit 3428 sets the selected movement vector for the estimated movement vector, and supplies the estimated movement vector to the movement vector decision unit 3404.

In Step S3467, the maximum value judgment unit 3428 sets the selected weight for the estimated mixture ratio, outputs the estimated mixture ratio with the weight set to the mixture ratio decision unit 3403, and the processing ends.

Thus, the mixture ratio processing unit 3401 can calculate a more accurate mixture ratio and movement vector, corresponding to the covered background region.

FIG. 133 is a block diagram illustrating another configuration of the mixture ratio processing unit 3401. Parts the same as the case shown in FIG. 110 are denoted with the same reference numerals, and description thereof will be omitted.

The movement vector generating unit 3426 generates movement vectors wherein the size thereof sequentially increases from a predetermined initial value for each of the weights generated by the weight generating unit 3422, as well as the angle thereof sequentially changes from another predetermined initial value, and supplies the generated movement vectors to the movement compensation unit 3461-1 and movement compensation unit 3461-2, and the maximum value judgment unit 3464.

The movement compensation unit 3461-1 performs movement compensation for the weighted difference image data supplied from the weighted frame difference computation unit 3423, based on the movement vector supplied from the movement vector generating unit 3426, and supplies the movement-compensated weighted difference to the correlation value computing unit 3463.

The movement compensation unit 3461-2 performs movement compensation for the weighted difference image data supplied from the frame memory 3462-2, based on the movement vector supplied from the movement vector generating unit 3426, and supplies the movement-compensated weighted difference to the correlation value computing unit 3463.

In the event of the same movement vector being input, the movement compensation units 3461-1 and 3461-2 each perform movement compensation for the weighted difference image data in opposite directions.

FIG. 134 is a diagram describing the processing of movement compensation of the movement compensation units 3461-1 and 3461-2.

A case of the sixth pixel from the left in the frame #n being taken as the pixel of interest will be described as an example. Upon a value being calculated wherein weight of the same value as the mixture ratio of the pixel of interest is multiplied by the pixel value in frame #n−1, and the difference with the pixel value of the corresponding pixel belonging to the mixed region or background region of the frame #n being obtained, all of the background component contained in the pixel value is removed and all of the foreground component is left in the sixth pixel from the left in the frame #n.

Upon a value being calculated wherein weight of the same value as the mixture ratio of the pixel of interest is multiplied by the pixel value in frame #n−2, and the difference with the pixel value of the corresponding pixel belonging to the mixed region or background region of the frame #n−1 being obtained, all of the background component contained in the pixel value is removed and all of the foreground component is left in the second pixel from the left in the frame #n−1.

In the same way, upon a value being calculated wherein weight of the same value as the mixture ratio of the pixel of interest is multiplied by the pixel value in frame #n, and the difference with the pixel value of the corresponding pixel belonging to the mixed region or background region of the frame #n+1 being obtained, all of the background component contained in the pixel value is removed and all of the foreground component is left in the tenth pixel from the left in the frame #n+1.

At the time of the movement compensation unit 3461-1 performing movement compensation on the weighted difference image data in the frame #n+1 so that the positions of the difference corresponding to the sixth pixel from the left in the frame #n and the difference corresponding to the tenth pixel from the left in the frame #n+1 agree, based on the movement vector supplied from the movement vector generating unit 3426, the movement compensation unit 3461-2 performs movement compensation on the weighted difference image data in the frame #n−1 so that the positions of the difference corresponding to the sixth pixel from the left in the frame #n and the difference corresponding to the second pixel from the left in the frame #n−1 agree, based on the same movement vector supplied from the movement vector generating unit 3426.

The assumption holds that the object corresponding to the foreground is a rigid body and moves at a constant velocity since one frame is a short time period, so the movement vectors of the frame #n−1 and the frame #n are equal to the movement vectors of the frame #n and the frame #n+1. Accordingly, in the event that the weight is equal to the mixture ratio $\alpha$, and the movement vector generated by the movement vector generating unit 3426 is equal to the movement of the foreground object, the pixel of interest of the weighted difference image data in the frame #n, the pixel corresponding to the movement-compensated weighted difference image data in frame #n+1, and the pixel corresponding to the movement-compensated weighted difference image data in frame #n−1, each consist of only the same foreground component, and the correlation thereof is maximum.

The frame memory 3462-1 stores each frame of multiple sets of weighted difference image data supplied from the weighted frame difference computation unit 3423, delays by a time period corresponding to one frame, and supplies the stored weighted difference image data to the frame memory 3462-2 and the correlation value computing unit 3463.

The frame memory 3462-2 stores each frame of multiple sets of weighted difference image data supplied from the frame memory 3462-1, delays by a time period corresponding to one frame, and supplies the stored weighted difference image data to the movement compensation unit 3461-2.

The correlation value computing unit 3463 computes for each pixel, for each combination of each of the weights and each of the movement vectors, the correlation value of the movement-compensated weighted difference image data supplied from the movement compensation unit 3461-1, the weighted difference image data delayed by one frame supplied from the frame memory 3462-1, and the movement-compensated weighted difference image data delayed by two frames supplied from the movement compensation unit 3461-2, and supplies the computed correlation value to the maximum value judgment unit 3464.

The maximum value judgment unit 3464 stores the correlation value supplied from the correlation value computing unit 3463, correlated with the combination of the value of the weight supplied from the weight generating unit 3422 and the movement vector supplied from the movement vector generating unit 3426. The maximum value judgment unit 3464 selects the weight and movement vector corresponding to the correlation value with the greatest correlation, based on the stored correlation values.

The maximum value judgment unit 3464 sets the selected weight for the estimated mixture ratio, and outputs the estimated mixture ratio with the selected weight set. The maximum value judgment unit 3464 sets the selected movement vector the estimated movement vector, and outputs the estimated movement vector with the selected movement vector set.

Next, the processing of estimating the mixture ratio and movement vector corresponding to the covered background region with the estimated mixture ratio processing unit 3401 of which the configuration is shown in FIG. 133, will be described with reference to the flowchart in FIG. 135. The processing in the flowchart shown in FIG. 135 corresponds to the processing in Step S3402 in FIG. 130.

In Step S3481, the weight generating unit 3422 sets an initial value stored beforehand as the weight. The weight generating unit 3422 supplies the weight for which the initial value has been set, to the weighted frame difference computation unit 3423 and the maximum value judgment unit 3464, as weight information.

In Step S3482., the estimated mixture ratio processing unit 3401 judges whether or not the weight which the weight generating unit 3422 outputs has exceeded 1, and in the event that judgment is made that the weight has not exceeded 1, the flow proceeds to Step S3483.

In Step S3483, the weighted frame difference computation unit 3423 calculates the weighted difference which is the difference between the pixel value of the pixel in the frame previous to the frame of interest, and a value wherein the pixel value of the corresponding pixel in the frame two frames previous to the frame of interest has been multiplied by the weight, and sets the weighted difference of the frame before the frame of interest, to the difference A. The difference A is output as weighted difference image data.

In Step S3484, the weighted frame difference computation unit 3423 calculates the weighted difference which is the difference between the pixel value of the pixel in the frame of interest, and a value wherein the pixel value of the pixel in the frame before the frame of interest has been multiplied by the weight, and sets the weighted difference of the frame of interest for the difference B. The difference B is output as weighted difference image data.

In Step S3485, the weighted frame difference computation unit 3423 calculates the weighted difference which is the difference between the pixel value of the pixel in the frame following the frame of interest, and a value wherein the pixel value of the pixel in the frame of interest has been multiplied by the weight, and sets the weighted difference of the frame following the frame of interest, to the difference C. The difference C is output as weighted difference image data.

In Step S3486, the movement vector generating unit 3426 sets the initial value for the movement vector, and supplies the movement vector set to the initial value to the movement compensation unit 3461-1 and the movement compensation unit 3461-2, and the maximum value judgment unit 3464.

In Step S3487, the correlation value computing unit 3463 calculates the correlation value between the pixel indicated by the movement vector of the difference C, the pixel of interest of the difference B, and the pixel indicated by the movement vector of the difference C, based on the difference A, difference B, and difference C.

That is to say, in Step S3487, the movement compensation unit 3461-1 performs movement compensation for the difference C supplied from the weighted frame difference computation unit 3423, based on the movement vector supplied from the movement vector generating unit 3426, and supplies the difference C subjected to movement compensation, to the correlation value computing unit 3463. The movement compensation unit 3461-2 performs movement compensation for the difference A supplied from the frame memory 3462-2, based on the movement vector supplied from the movement vector generating unit 3426, and supplies the difference A subjected to movement compensation, to the correlation value computing unit 3463.

The correlation value computing unit 3463 calculates the correlation value between the difference B supplied from the frame memory 3462-1, the difference A that has been movement-compensated, and the difference C that has been movement-compensated, and supplies this to the maximum value judgment unit 3464.

In Step S3488, the maximum value judgment unit 3464 stores the correlation value supplied from the correlation value computing unit 3463 in a manner corresponding to the weight supplied from the weight generating unit 3422 and the vector supplied from the movement vector generating unit 3426.

In Step S3489, the movement vector generating unit 3426 adds a predetermined increment to the size of the movement vector.

In Step S3490, the mixture ratio processing unit 3401 judges whether or not the size of the movement vector which the movement vector generating unit 3426 outputs has exceeded a predetermined value, and in the event that judgment is made that the size of the movement vector has exceeded a predetermined value, the flow proceeds to Step S3491, where the movement vector generating unit 3426 sets the initial value for the size of the movement vector. In Step S3492, the movement vector generating unit 3426 adds a predetermined increment to the angle of the movement vector. The movement vector generating unit 3426 supplies the movement vector wherein the size has been set to the initial value and the angle has been changed, to the movement compensation unit 3461-1, movement compensation unit 3461-2, and the maximum value judgment unit 3464.

In Step S3493, the mixture ratio processing unit 3401 judges whether or not correlation values have been calculated for pixels within a predetermined range, based on the size and angle of the movement vector, and in the event that judgment is made that correlation values have not been calculated for pixels within a predetermined range, the flow returns to Step S3487, and the processing for calculating the correlation value is repeated.

In Step S3493, in the event that judgment is made that correlation values have been calculated for pixels within a predetermined range, the flow proceeds to Step S3494, where the weight generating unit 3422 adds the incrementation δ stored beforehand, the flow returns to Step S3487, and the processing for calculating the correlation value corresponding to the weight is repeated.

That is to say, in the event that the weight is 1 or smaller, the processing in Step S3483 through Step S3494 is repeated, a correlation value corresponding to the weight increasing by incrementations δ and movement vector indicating a predetermined range is calculated, and the correlation value is stored in a manner corresponding to the weight and movement vector.

In Step S3490, in the event that judgment is made that the size of the movement vector has not exceeded a predetermined value, the processing returns to Step S3487, and repeats processing for calculating the correlation value corresponding to the weight.

In Step S3482, in the event that judgement has been made that the weight has exceeded 1, the flow proceeds to Step S3495, where the maximum value judgment unit 3464 selects the movement vector and weight corresponding to the greatest correlation value indicating the correlation is the greatest.

In Step S3496, the maximum value judgment unit 3464 sets the selected movement vector for an estimated movement vector, and supplies the estimated movement vector to the movement vector decision unit 3404.

In Step S3497, the maximum value judgment unit 3464 sets the selected weight to an estimated mixture ratio, and outputs the estimated mixture ratio with the weight set to the mixture ratio decision unit 3403, and the processing ends.

In this way, the estimated mixture ratio processing unit 3401 can calculate the estimated mixture ratio and estimated movement vector corresponding to the covered background region.

Note that the processing corresponding to the uncovered background region in Step S3403 is the same as the processing described with reference to the flowchart shown in FIG. 135 with regard to the processing for calculating the difference A, difference B, and difference C, except for the point that the pixel value of the following frame is used as the pixel value corresponding to the background, so description thereof will be omitted.

FIG. 136 is a block diagram illustrating yet another configuration of the signal processing device.

Parts the same as the case shown in FIG. 2 are denoted with the same reference numerals, and description thereof will be omitted when appropriate.

The region specifying unit 103 supplies the region information to the mixture ratio calculating unit 104 and a synthesizing unit 4001.

The mixture ratio calculating unit 104 supplies the mixture ratio α to the foreground/background separation unit 105 and the synthesizing unit 4001.

The foreground/background separation unit 105 supplies the foreground component image to the synthesizing unit 4001.

The synthesizing unit 4001 synthesizes an arbitrary background image, and the foreground component image supplied from the foreground/background separation unit 105, based on the mixture ratio α supplied from the mixture ratio calculating unit 104 and the region information supplied from the region specifying unit 103, and outputs a synthesized image wherein the arbitrary background image and the foreground component image have been synthesized.

FIG. 137 is a block diagram illustrating the configuration of the synthesizing unit 4001. A background component creating unit 4021 generates a background component image based on the mixture ratio α and the arbitrary background image, and supplies this to a mixed region image synthesizing unit 4022.

The mixed region image synthesizing unit 4022 synthesizes the background component image supplied from the background component creating unit 4021 with the foreground component image to generated a mixed region synthesized image, and supplies the generated mixed region synthesized image to an image synthesizing unit 4023.

The image synthesizing unit 4023 synthesizes the foreground component image, mixed region synthesized image supplied from the mixed region image synthesizing unit 4022, and the arbitrary background image, to generate and output a synthesized image.

Thus, the synthesizing unit 4001 can synthesize a foreground component image with an arbitrary background image.

The image obtained by synthesizing the foreground component image with the arbitrary background image based on the mixture ratio α, which is a features value, is more natural that an image wherein pixels are simply synthesized.

FIG. 138 is a block diagram illustrating yet another configuration of the signal processing device for adjusting the amount of movement blurring. While the signal processing device shown in FIG. 2 performs region specification and calculation of the mixture ratio α in a sequential manner, the signal processing device shown in FIG. 138 performs region specification and calculation of the mixture ratio α in a parallel manner.

Parts the same as the functions shown in the block diagram in FIG. 2 are denoted with the same reference numerals, and description thereof will be omitted.

The input image is supplied to the mixture ratio calculating unit 4101, the foreground/background separation unit 4102, region specifying unit 103, and object extracting unit 101.

The mixture ratio calculation unit 4101 calculates the estimated mixture ratio in a case wherein a pixel is assumed to belong to the covered background region, and the estimated mixture ratio in a case wherein a pixel is assumed to belong to the uncovered background region, based on the input image, for each of the pixels contained in the input image, and supplies to the foreground/background separation unit 4102 the calculated estimated mixture ratio in the case wherein a pixel is assumed to belong to the covered background region, and the estimated mixture ratio in the case wherein a pixel is assumed to belong to the uncovered background region.

FIG. 139 is a block diagram illustrating an example of the configuration of the mixture ratio calculation unit 4101.

The estimated mixture ratio processing unit 401 shown in FIG. 139 is the same as the estimated mixture ratio processing unit 401 shown in FIG. 47. The estimated mixture ratio processing unit 402 shown in FIG. 139 is the same as the estimated mixture ratio processing unit 402 shown in FIG. 47.

The estimated mixture ratio processing unit 401 calculates an estimated mixture ratio for each pixel, by computation corresponding to a model of the covered background region, based on the input image, and outputs the calculated estimated mixture ratio.

The estimated mixture ratio processing unit 402 calculates an estimated mixture ratio for each pixel, by computation corresponding to a model of the uncovered background region, based on the input image, and outputs the calculated estimated mixture ratio.

The foreground/background separation unit 4102 generates a foreground component image from the input image based upon the estimated mixture ratio in a case wherein a pixel is assumed to belong to the covered background region and the estimated mixture ratio in a case wherein a pixel is assumed to belong to the uncovered background region supplied from the mixture ratio calculation unit 4101, and the region information supplied from the region specifying unit 103, and supplies the generated foreground component image to the movement blurring adjustment unit 106 and selection unit 107.

FIG. 140 is a block diagram illustrating an example of the configuration of the foreground/background separation unit 4102.

Parts the same as the foreground/background separation unit 105 shown in FIG. 58 are denoted with the same reference numerals, and description thereof will be omitted.

The selection unit 4121 selects one or the other of the estimated mixture ratio in the case wherein a pixel is assumed to belong to the covered background region, and the estimated mixture ratio in the case wherein a pixel is assumed to belong to the uncovered background region, that are supplied from the mixture ratio calculation unit 4101, based upon region information supplied from the region specifying unit 103, and supplies the selected estimated mixture ratio to the separation unit 601 as the mixture ratio α.

The separation unit 601 extracts the foreground component and the background component from the pixel value of the pixel belonging to the mixed region, based on the mixture ratio α supplied from the selection unit 4121 and the region information, and supplies the extracted foreground component to the synthesizing unit 603, while supplying the background component to the synthesizing unit 605.

The separation unit 601 may have the same configuration as the configuration shown in FIG. 63.

The synthesizing unit 603 synthesizes and outputs a foreground component image. The synthesizing unit 605 synthesizes and outputs a background component image.

The movement blurring adjustment unit 106 shown in FIG. 138 may have the same configuration as the case shown in FIG. 2, and adjusts the amount of movement blurring contained in the foreground component image supplied from the foreground/background separation unit 4102, and outputs the foreground component image of which the amount of movement blurring has been adjusted.

The selection unit 107 shown in FIG. 138 selects one or the other of the foreground component image supplied from the foreground/background separation unit 4102 and the foreground component image of which the amount of movement blurring has been adjusted that has been supplied from the movement blurring adjustment unit 106, and outputs the selected foreground component image.

In this way, the signal processing device having the configuration shown in FIG. 138 can adjust and output the amount of movement blurring contained in an image corresponding to a foreground object contained in the input image. The signal processing device having the configuration shown in FIG. 138 can, as with the first embodiment, calculate the mixture ratio α which is buried information, and output the calculated mixture ratio α.

FIG. 141 is a block diagram illustrating yet another configuration of a signal processing device for synthesizing a foreground component image with an arbitrary background image. While the signal processing device shown in FIG. 136 performs region specification and calculation of the mixture ratio α in a serial manner, the signal processing device shown in FIG. 141 performs region specification and calculation of the mixture ratio α in a parallel manner.

Parts the same as the functions shown in the block diagram in FIG. 138 are denoted with the same reference numerals, and description thereof will be omitted.

The mixture ratio calculation unit 4101 shown in FIG. 141 calculates the estimated mixture ratio in a case wherein a pixel is assumed to belong to the covered background region, and the estimated mixture ratio in a case wherein a pixel is assumed to belong to the uncovered background region, based on the input image, for each of the pixels contained in the input image, and supplies to the foreground/background separation unit 4102 and the synthesizing unit 4201 the calculated estimated mixture ratio in the case wherein a pixel is assumed to belong to the covered background region, and the estimated mixture ratio in the case wherein a pixel is assumed to belong to the uncovered background region.

The foreground/background separation unit 4102 shown in FIG. 141 generates a foreground component image based on the estimated mixture ratio in a case wherein a pixel is assumed to belong to the covered background region and the estimated mixture ratio in a case wherein a pixel is assumed to belong to the uncovered background region supplied from the mixture ratio calculation unit 4101, and the region information supplied from the region specifying unit 103, and supplies the foreground component image generated from the input image to the synthesizing unit 4201.

The synthesizing unit 4201 synthesizes an arbitrary background image with the foreground component image supplied from the foreground/background separation unit 4102, based on the estimated mixture ratio in the case wherein a pixel is assumed to belong to the covered background region and the estimated mixture ratio in the case wherein a pixel is assumed to belong to the uncovered background region, supplied from the mixture ratio calculation unit 4101, and the region information supplied from the region specifying unit 103, and outputs the synthesized image wherein the arbitrary background image and the foreground component image have been synthesized.

FIG. 142 is a diagram illustrating the configuration of the synthesizing unit 4201. Parts the same as the functions shown in the block diagram in FIG. 137 are denoted with the same reference numerals, and description thereof will be omitted.

Based on the region information supplied from the region specifying unit 103, the selection unit 4221 selects one or the other of the estimated mixture ratio in the case wherein a pixel is assumed to belong to the covered background region, and the estimated mixture ratio in the case wherein a pixel is assumed to belong to the uncovered background region, that are supplied from the mixture ratio calculation unit 4101, and supplies the selected estimated mixture ratio to the background component generating unit 4021 as the mixture ratio α.

The background component generating unit 4021 shown in FIG. 142 generates a background component image based on the mixture ratio α supplied from the selection unit 4221 and the arbitrary background image, and supplies this to the mixed region image synthesizing unit 4022.

The mixed region image synthesizing unit 4022 shown in FIG. 142 generates a mixed region synthesized image by synthesizing the background component image supplied from the background component generating unit 4021 and the foreground component image, and supplies the generated mixed region synthesized image to the image synthesizing unit 4023.

The image synthesizing unit 4023 synthesizes the foreground component image, mixed region synthesized image supplied from the mixed region image synthesizing unit 4022, and the arbitrary background image, based on the region information, to generate and output a synthesized image.

Thus, the synthesizing unit 4201 can synthesize a foreground component image with an arbitrary background image.

FIG. 143 is a block diagram illustrating yet another configuration of a signal processing device. Parts the same as the case shown in FIG. 79 are denoted with the same reference numerals, and description thereof will be omitted.

The region specifying unit 103 supplies region information to the mixture ratio calculation unit 2001 and the foreground/background separation unit 105.

The noise removal unit 4501 removes noise from the foreground component image, based on the movement vector supplied from the movement estimation unit 2002 and the multiple frames of foreground component image supplied from the foreground/background separation unit 105, and supplies the foreground component image from which noise has been removed, to the selection unit 107.

The selection unit 107 selects one or the other of the foreground component image supplied from the foreground/background separation unit 105 and the foreground component image from which noise has been removed that has been supplied from the noise removal unit 4501, based on selection signals corresponding to selection made by a user, for example, and outputs the selected foreground component image.

FIG. 144 is a block diagram illustrating the configuration of the noise removal unit 4501.

The foreground component image supplied from the foreground/background separation unit 105 is input to the frame memory 4511-1 and an average pixel value calculation unit 4513.

Frame memory 4511-1 through 4511-N are serially connected, store the foreground component image supplied from the foreground/background separation unit 105 or the previous frame memory, delay by a time period corresponding to one frame, and output the foreground component image stored therein.

The frame memory 4511-1 stores the foreground component image supplied from the foreground/background separation unit 105, delays by a time period corresponding to one frame, and supplies the foreground component image stored therein to the frame memory 4511-2 and the movement compensation unit 4512-1.

The frame memory 4511-2 through 4511-(N−1) each store the foreground component image supplied from the previous frame memory, delay by a time period corresponding to one frame, and supply to the subsequent frame memory and one of the movement compensation units 4512-2 through 4512-(N−1).

The frame memory 454N stores the foreground component image supplied from the frame memory 4511-(N−1), delays by a time period corresponding to one frame, and supplies the foreground component image stored therein to the movement compensation unit 4512-N.

The movement compensation unit 4512-1 performs movement compensation for the foreground component image supplied from the frame memory 4511-1, based on the movement vector supplied from the movement estimation unit 2002, and supplies the movement-compensated foreground component image to the average pixel value calculation unit 4513.

Each of the movement compensation units 4512-2 through 4512-(N) perform movement compensation for the foreground component image supplied from one of the frame memory 4511-2 through 4511-N, based on movement vectors supplied from the movement estimation unit 2002, and supply each of the movement-compensated foreground component images to the average pixel value calculation unit 4513.

The position on the screen of all foreground component images supplied from the movement compensation units 4512-1 through 4512-N to the average pixel value calculation unit 4513 match the position on the screen of the foreground component images input to the noise removal unit 4501.

The average pixel value calculation unit 4513 calculates the average value of the pixel values of each pixel, based on the foreground component images input to the noise removal unit 4501 and the foreground component images supplied from each of the movement compensation units 4512-1 through 4512-N of which the position on the screen match. The average pixel value calculation unit 4513 sets the calculated average value of the pixel values to the pixel value of the foreground component image, thereby removing noise from the foreground component image and outputting a foreground component image with noise removed.

In this way, the noise removal unit 4501 can remove noise from the foreground component images output from the foreground/background separation unit 105, based on movement vectors supplied from the movement estimation unit 2002.

The movement vector which the movement estimation unit 2002 outputs is a movement vector wherein the mixed region has been taken into consideration, so the multiple frames of foreground component images can be subjected to movement compensation in a more accurate manner, and accordingly, the noise removal unit 4501 can reduce the nose level even further.

The processing for removing noise with the signal processing device of which the configuration is shown in FIG. 143 will be described with reference to the flowchart shown in FIG. 145.

Each of the procedures in Step S4501 through Step S4504 are the same as each of the procedures in Step S2001 through Step S2004, so description thereof will be omitted.

In Step S4505, the noise removal unit 4501 removes noise from the foreground component image supplied from the foreground/background separation unit 105, based on the movement vector supplied from the movement estimation unit 2002. Details of the processing for removing noise will be described later with reference to the flowchart in FIG. 146.

In Step S4506, the signal processing device judges whether or not processing has ended for the entire screen, and in the event that judgment is made that processing has not ended for the entire screen, the flow proceeds to Step S4505, and the processing for noise removal is repeated.

In Step S4506, in the event that judgment is made that processing has ended for the entire screen, the processing ends.

Thus, the signal processing device can remove noise from foreground component images.

FIG. 146 is a flowchart describing the processing for removing noise from foreground component images, with the noise removal unit 4501 corresponding to the processing in Step S4505.

In Step S4511, the frame memory 4511-1 through 4511-N each store the foreground component image for each frame. The frame memory 4511-1 through 4511-N each supply the foreground component images stored therein to one of the movement compensation units 4512-1 through 4512-N.

In Step S4512, the movement compensation units 4512-1 through 4512-N perform movement compensation for the foreground component images for each frame, based on the movement vector supplied from the movement estimation unit 2002.

In Step S4513, the average pixel value calculation unit 4513 calculates the average value of the pixel values of the foreground component images subjected to movement compensation, and sets the calculated average value to the foreground component image, thereby removing noise from the foreground component image, and outputting a foreground component image with noise removed, upon which the processing ends.

In this way, the noise removal unit 4501 can remove noise from foreground component images.

As described above, the signal processing device of which the configuration is shown in FIG. 143 can separate the foreground component image and background component image, and remove noise from the separated foreground component image.

FIG. 147 is a block diagram illustrating yet another configuration of the functions of the signal processing device for adjusting the amount of movement blurring. While the signal processing device shown in FIG. 107 performs region specification and calculation of the mixture ratio α in a sequential manner, the signal processing device shown in FIG. 147 performs region specification and calculation of the mixture ratio α in a parallel manner.

Parts the same as the functions shown in the block diagram in FIG. 107 are denoted with the same reference numerals, and description thereof will be omitted.

The input image is supplied to the coincidence detecting unit 4601, foreground/background separation unit 4102, and region specifying unit 103.

The coincidence detecting unit 4601 calculates the estimated mixture ratio in a case wherein a pixel is assumed to belong to the covered background region, and the estimated mixture ratio α case wherein a pixel is assumed to belong to the uncovered background region, based on the input image, for each of the pixels contained in the input image, and supplies to the movement blurring adjustment unit 4602 the calculated estimated mixture ratio in the case wherein a pixel is assumed to belong to the covered background region, and the estimated mixture ratio the case wherein a pixel is assumed to belong to the uncovered background region.

The coincidence detecting unit 4601 calculates the estimated movement vector in a case wherein a pixel is assumed to belong to the covered background region, and the estimated movement vector a case wherein a pixel is assumed to belong to the uncovered background region, based on the input image, for each of the pixels contained in the input image, and supplies to the foreground/background separation unit 4102 the calculated estimated movement vector in the case wherein a pixel is assumed to belong to the covered background region, and the estimated movement vector the case wherein a pixel is assumed to belong to the uncovered background region.

FIG. 148 is a block diagram illustrating an example of the configuration of the coincidence detecting unit 4601.

The estimated mixture ratio processing unit 3401 shown in FIG. 148 is the same as the estimated mixture ratio processing unit 3401 shown in FIG. 109. The estimated mixture ratio processing unit 3402 shown in FIG. 148 is the same as the estimated mixture ratio processing unit 3402 shown in FIG. 109.

The estimated mixture ratio processing unit 3401 calculates the estimated mixture ratio and estimated movement vector for each pixel by computation corresponding to a model of the covered background region, based on the input image, and outputs the calculated estimated mixture ratios and estimated movement vectors.

The estimated mixture ratio processing unit 3402 calculates the estimated mixture ratio and estimated movement vector for each pixel by computation corresponding to a model of the uncovered background region, based on the input image, and outputs the calculated estimated mixture ratios and estimated movement vectors.

The foreground/background separation unit 4102 generates a foreground component image from the input image, based on the estimated mixture ratio in a case wherein a pixel is assumed to belong to the covered background region and the estimated mixture ratio in a case wherein a pixel is assumed to belong to the uncovered background region supplied from the coincidence detecting unit 4601, and the region information supplied from the region specifying unit 103, and supplies the generated foreground component image to the movement blurring adjustment unit 4602 and the selection unit 107.

The movement blurring adjustment unit 4602 adjusts the amount of movement blurring contained in the foreground component image supplied from the foreground/background separation unit 4102, based on the region information and estimated movement vector, and outputs the foreground component image of which the amount of movement blurring has been adjusted.

FIG. 149 is a diagram illustrating the configuration of the movement blurring adjustment unit 4602.

Parts the same as the movement blurring adjustment unit 106 shown in FIG. 66 are denoted with the same reference numerals, and description thereof will be omitted.

The selection unit 4641 selects one or the other of the estimated movement vector in the case wherein a pixel is assumed to belong to the covered background region, and the estimated movement vector in the case wherein a pixel is assumed to belong to the uncovered background region, which are supplied from the coincidence detecting unit 4601, based on the region information supplied from the region specifying unit 103, and supplies the selected estimated movement vector to the processing increment decision unit 801 and computation unit 805 as the movement vector.

The selection unit 107 shown in FIG. 147 selects one or the other of the foreground component image supplied from the foreground/background separation unit 4102 and the foreground component image of which the amount of movement blurring has been adjusted that has been supplied from the movement blurring adjustment unit 4602, based on selection signals corresponding to a selection made by a user, for example, and outputs the selected foreground component image.

Thus, the signals processing device having the configuration shown in FIG. 147 can adjust and output the amount of movement blurring contained in an image corresponding to a foreground object contained in the input image.

FIG. 150 is a block diagram illustrating yet another configuration of a signal processing device according to the present invention. Parts the same as the signal processing device shown in FIG. 107 are denoted with the same reference numerals, and description thereof will be omitted. Parts the same as the signal processing device shown in FIG. 143 are denoted with the same reference numerals, and description thereof will be omitted.

The region specifying unit 103 supplies region information to the coincidence detecting unit 3001 and the foreground/background separation unit 105.

The coincidence detecting unit 3001 supplies the detected mixture ratio α to the foreground/background separation unit 105, while supplying the detected movement vector to the noise removal unit 4501.

The noise removal unit 4501 removes noise from the foreground component image, based on the movement vector supplied from the coincidence detecting unit 3001 and the multiple frames of foreground component image supplied from the foreground/background separation unit 105, and supplies the foreground component image from which noise has been removed, to the selection unit 107.

The selection unit 107 selects one or the other of the foreground component image supplied from the foreground/background separation unit 105 and the foreground component image from which noise has been removed that has been supplied from the noise removal unit 4501, based on selection signals corresponding to a selection made by a user, for example, and outputs the selected foreground component image.

The processing for removing noise with the signal processing device will now be described with reference to the flowchart in FIG. 151.

Each of the processing in Step S4701 through S4703 is the same as each of the processing in Step S3001 through S3003, so description thereof will be omitted.

In Step S4704, the noise removal unit 4501 removes noise from the foreground component image supplied from the foreground/background separation unit 105, based on the movement vector supplied from the coincidence detecting unit 3001. Details of the processing in Step S4704 are the same as the processing described with reference to the flowchart in FIG. 146, and accordingly the description thereof will be omitted.

In Step S4705, the signal processing device judges whether or not processing has ended for the entire screen, and in the event that judgment is made that processing has not ended for the entire screen, the flow proceeds to Step S4704, and the processing for noise removal is repeated.

In Step S4705, in the event that judgment is made that processing has ended for the entire screen, the processing ends.

Thus, the signal processing device can remove noise from foreground component images.

As described above, the signal processing device having the configuration illustrated in FIG. 150 can separate the foreground component image and the background component image, and remove noise from the separated foreground component image.

In this way, with an arrangement wherein a weighted difference between each pixel in a frame of interest in the image data and each pixel in an adjacent frame which is adjacent to the frame of interest in the image data is calculated, based on weighting which is to correspond to a mixture ratio indicating a mixed state in the pixel data of objects which are multiple in the real world, output as weighted difference image data corresponding to the frame of interest, a relative position of the weighted difference image data of the frame of interest and the weighted difference image data of the adjacent frame is matched according to a movement vector which is to indicate relative movement between the pixel data of the frame of interest and the pixel data of the adjacent frame, the correlation between a block of interest containing each pixel of interest of the weighted difference image data of the frame of interest and a corresponding block of the weighted difference image data of the adjacent frame is computed, and output as inter-weighted-difference-image correlation data, and, with regard to each predetermined increment of the inter-weighted-difference-image correlation data, at least one of the weighting and the movement vector where the correlation between the weighted difference image data is maximum are detected, with the weighting being set to the mixture ratio corresponding to the increment of the frame of interest in the event that the weighting is detected, and the movement vector being set to the movement vector corresponding to the increment of the frame of interest in the event that the movement vector is detected; a mixture ratio indicating the proportion of mixing of a background image and an image of a moving object can be detected, or a movement vector of a moving object can be detected taking into consideration a region wherein a background image and an image of a moving object are mixed.

With an arrangement wherein a plurality of weights corresponding to a mixture ratio indicating a mixed state in the pixel data of objects which are multiple in the real world and weighting information indicating each of the generated weights are generated, a weighted difference between each pixel in a frame of interest in the image data and each pixel in an adjacent frame which is adjacent to the frame of interest in the image data is detected based on the weight indicated by the weighting information, and output as weighted difference image data corresponding to the frame of interest, a relative position of the weighted difference image data of the frame of interest and the weighted difference image data of the adjacent frame is matched according to a movement vector for indicating relative movement between the pixel data of the frame of interest and the pixel data of the adjacent frame, correlation between a block of interest made up of at least one pixel and centered on each pixel of interest of the weighted difference image data of the frame of interest and a corresponding block made up of at least one pixel of the weighted difference image data of the adjacent frame is computed, and output as inter-weighted-difference-image correlation data, and, with regard to each predetermined increment made up of at least one pixel of the inter-weighted-difference-image correlation data, the weighting where the correlation between the weighted difference image data is maximum is detected, and output as the mixture ratio corresponding to the increment of the frame of interest; a mixture ratio indicating the state of mixing of multiple objects such as a background image and an image of a moving object can be detected.

With an arrangement wherein a mixed region made up of a mixture of a foreground object component configuring foreground objects and a background object component configuring background objects based on the image data is specified, region information indicating the specified mixed region is output, a mixture ratio indicating ratio of mixture between the foreground object component and the background object component in the pixel data belonging to the mixed region is estimated based on the image data and the region information, a plurality of estimated movement vectors are generated and each of the estimated movement vectors that have been generated are output, difference based on the mixture ratio of the pixel of interest of the frame of interest between each pixel of the frame of interest of the image data and each pixel of a first adjacent frame adjacent to the frame of interest of the image data is calculated and output as first difference image data, and difference based on the mixture ratio of the pixel of interest of the frame of interest between each pixel of the frame of interest of the image data and each pixel of a second adjacent frame adjacent to the frame of interest of the image data is calculated and output as second difference image data, the relative position of the first difference image data and the second difference image data is matched based on the estimated movement vector, the correlation between the block of interest made up of at least one pixel centered a pixel of the first difference image data corresponding to the pixel of interest of the frame of interest and the corresponding block made up of at least one pixel of the second difference image data is computed and output as inter-difference-image correlation data, and the estimated movement vector where the correlation is maximum is detected based on the inter-difference-image correlation data, and output as the movement vector corresponding to the pixel of interest of the frame of interest; a more accurate movement vector can be detected, taking into consideration the mixing of multiple objects such as background images and moving object images.

With an arrangement wherein a plurality of weights each with different values are generated corresponding to a mixture ratio indicating a mixed state in the pixel data of objects which are multiple in the real world, weighting information indicating each of the generated weights is generated, weighted difference is calculated based on the weighting indicated by the weighting information between each pixel of a frame of interest of the image data and each pixel of an adjacent frame which is adjacent to the frame of interest of the image data and output as weighted difference image data corresponding to the frame of interest, a plurality of movement vectors each having different values indicating relative movement between the pixel data of the frame of interest and the pixel data of the adjacent frame are generated, movement vector information indicating each of the generated movement vectors is generated, the relative position of the weighted difference image data of the frame of interest and the weighted difference image data of the adjacent frame is matched according to the movement vector indicated by the movement vector information, the correlation between a block of interest made up of at least one pixel centered on each pixel of interest of the weighted difference image data of the frame of interest and a corresponding block made up of at least one pixel of the weighted difference image data of the adjacent frame is computed and output as inter-weighted-difference-image correlation data, and the weighting and the movement vector where the correlation between the weighted difference image data is maximum are detected for each predetermined increment made up of at least one pixel of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output; a mixture ratio indicating the proportion of mixing of a background image and an image of a moving object can be detected, or a movement vector of a moving object can be detected taking into consideration a region wherein a background image and an image of a moving object are mixed.

With an arrangement wherein a plurality of weights each with different values are generated corresponding to a mixture ratio indicating a mixed state in the pixel data of objects which are multiple in the real world, weighting information indicating each of the generated weights is generated, weighted difference is calculated based on the weighting indicated by the weighting information between each pixel of a frame of interest of the image data and each pixel of an adjacent frame which is adjacent to the frame of interest of the image data and output as weighted difference image data corresponding to the frame of interest, a plurality of movement vectors each having different values indicating relative movement between the pixel data of the frame of interest and the pixel data of the adjacent frame are generated, movement vector information indicating each of the generated movement vectors is generated, the relative position of the weighted difference image data of the frame of interest and the weighted difference image data of the adjacent frame is matched according to the movement vector indicated by the movement vector information, the correlation between a first block of interest made up of a plurality of pixels centered on each pixel of interest of the weighted difference image data of the frame of interest and a first corresponding block made up of a plurality of pixels of the weighted difference image data of the adjacent frame is computed and output as inter-weighted-difference-image correlation data, and the weighting and the movement vector where the correlation between the weighted difference image data is maximum are detected for each predetermined increment made up of a plurality of pixels of the inter-weighted-difference-image correlation data, the detected weight is set to the mixture ratio corresponding to the increment of the frame of interest, the detected movement vector is set to the movement vector corresponding to the increment of the frame of interest, and at least one of the mixture ratio and the movement vector is output; a mixture ratio indicating the proportion of mixing of a background image and an image of a moving object can be detected, or a movement vector of a moving object can be detected taking into consideration a region wherein a background image and an image of a moving object are mixed.

Note that while the mixture ratio $\alpha$ has been described as a proportion of the background component contained in the pixel value, this may be the proportion of the foreground component contained in the pixel value.

Also, the movement of the object which is the foreground has been described as being from the left to the right, but it is needless to say that this is not restricted to that direction.

In the above, an example has been given of a case of projecting images in real space having three-dimensional space and time-axis information onto time-space having two-dimensional space and time-axis information, using a video camera, but the present invention is not restricted to this example, and may be applied to cases for, in the event of projecting a greater amount of first information of a first dimension onto less second information of a second dimension, correcting distortion which occurs due to the projection, extracting significant information, or synthesizing an image in a more natural way.

Note that the sensor is not restricted to a CCD, and may be a sensor which is a solid-state image-taking device, e.g., a CMOS (Complementary Metal Oxide Semiconductor (complementary metal oxide film semiconductor)), BBD (Bucket Brigade Device), CID (Charge Injection Device), or CPD (Charge Priming Device) or the like, and is not restricted to a sensor wherein detecting elements are arrayed in a matrix fashion, but may rather be a sensor wherein the detecting elements are arrayed in a row.

The recording medium storing the program for executing the signal processing of the present invention is not only configured packaged media such as a magnetic disk 51 (including floppy (Registered Trademark) disks), optical disk 52 (including CD-ROMs (Compact Disc-Read Only Memory), DVDs (Digital Versatile Disc)), magneto-optical disk 53 (including MDs (Mini-Disc) (Registered Trademark)), or semiconductor memory 54 or the like, storing the program, to be distributed separately from the computer as shown in FIG. 1 for providing the program to users; but is configured of ROM 22 or a hard disk included in the storage unit 28 or the like storing the program, provided to the user in the state of being assembled into the computer beforehand.

Also, in the present Specification, the steps describing the program recorded in the recording medium includes processing which is executed in the time-sequence following the described order, of course, and also processing which is executed in parallel or individually, even if not processed in time-sequence.

INDUSTRIAL APPLICABILITY

According to the first present invention, a mixture ratio indicating the proportion of mixing of a background image and an image of a moving object can be detected, or a movement vector of a moving object can be detected taking into consideration a region wherein a background image and an image of a moving object are mixed.

According to the second present invention, a mixture ratio indicating the state of mixing of multiple objects such as a background image and an image of a moving object, for example, can be detected.

According to the third present invention, a more accurate movement vector can be detected, taking into consideration the mixing of multiple objects such as background images and moving object images.

According to the fourth present invention, a mixture ratio indicating the proportion of mixing of a background image and an image of a moving object can be detected, or a movement vector of a moving object can be detected taking into consideration a region wherein a background image and an image of a moving object are mixed.

According to the fifth present invention, a mixture ratio indicating the proportion of mixing of a background image and an image of a moving object can be detected, or a movement vector of a moving object can be detected taking into consideration a region wherein a background image and an image of a moving object are mixed.

The invention claimed is:

1. An image processing device for processing image data made up of a predetermined number of pieces of pixel data obtained by an image-taking device having a predetermined number of pixels having time-integration effects, said image processing device comprising:

weighted difference image data calculating means for calculating a weighted difference between each pixel in a frame of interest in said image data and each pixel in an adjacent frame which is adjacent to said frame of interest in said image data, based on weighting which is to correspond to a mixture ratio indicating a mixed state in said pixel data of objects which are multiple in the real world, and outputting as weighted difference image data corresponding to said frame of interest;

inter-weighted-difference-image correlation data computing means for matching a relative position of said weighted difference image data of said frame of interest and said weighted difference image data of said adjacent frame according to a movement vector which is to indicate relative movement between said pixel data of said frame of interest and said pixel data of said adjacent frame, computing the correlation between a block of interest containing each pixel of interest of said weighted difference image data of said frame of interest and a corresponding block of said weighted difference image data of said adjacent frame, and outputting as inter-weighted-difference-image correlation data; and detecting means for, with regard to each predetermined increment of said inter-weighted-difference-image correlation data, detecting at least one of said weighting and said movement vector where the correlation between said weighted difference image data is maximum, setting said weighting to said mixture ratio corresponding to said increment of said frame of interest in the event that said weighting is detected, and setting said movement vector to said movement vector corresponding to said increment of said frame of interest in the event that said movement vector is detected.

2. An image processing device according to claim 1, further comprising:

weighting information generating means for generating a plurality of said weights corresponding to said mixture ratio indicating a mixed state in said pixel data of said objects which are multiple in the real world, and generating weighting information indicating said weight of each of the generated weights;

wherein said weighted difference image data calculating means detect said weighted difference based on said weighting indicated by said weighting information between each pixel of said frame of interest of said image data and each pixel of said adjacent frame which is adjacent to said frame of interest of said image data, and output as said weighted difference image data corresponding to said frame of interest;

and wherein said inter-weighted-difference-image correlation data computing means match the relative position of said weighted difference image data of said frame of interest and said weighted difference image data of said adjacent frame according to said movement vector for indicating relative movement between said pixel data of said frame of interest and said pixel data of said adjacent frame, computes the correlation between said block of interest made up of at least one pixel centered on each pixel of interest of said weighted difference image data of said frame of interest and said corresponding block made up of at least one pixel of said weighted difference image data of said adjacent frame, and output as said inter-weighted-difference-image correlation data;

and wherein said detecting means detect said weighting where the correlation between said weighted difference image data is maximum, for each predetermined increment made up of at least one pixel of said inter-weighted-difference-image correlation data, and outputs as said mixture ratio corresponding to said increment of said frame of interest.

3. An image processing device according to claim 1, further comprising:

region specifying means for specifying a mixed region made up of a mixture of a foreground object component configuring foreground objects and a background object component configuring background objects based on said image data, and outputting region information indicating said specified mixed region;

mixture ratio estimating means for estimating said ratio of mixture between said foreground object component and said background object component in said pixel data belonging to said mixed region, based on said image data and said region information; and estimated movement vector generating means for generating a plurality of estimated movement vectors, and outputting each of said estimated movement vectors that have been generated;

wherein said weighted difference image data calculating means calculate difference based on said mixture ratio of said pixel of interest of said frame of interest between each pixel of said frame of interest of said image data and each pixel of a first adjacent frame adjacent to said frame of interest of said image data, and output as first difference image data, and calculate difference based on said mixture ratio of said pixel of interest of said frame of interest between each pixel of said frame of interest of said image data and each pixel of a second adjacent frame adjacent to said frame of interest of said image data, and output as second difference image data;

and wherein said inter-weighted-difference-image correlation data computing means match the relative position of said first difference image data and said second difference image data based on said estimated movement vector, computes the correlation between said block of interest made up of at least one pixel centered a pixel of said first difference image data corresponding to said pixel of interest of said frame of interest, and said corresponding block made up of at least one pixel of said second difference image data, and outputs as inter-difference-image correlation data;

and wherein said detecting means detect said estimated movement vector where the correlation is maximum, based on said inter-weighted-difference-image correlation data, and outputs as said movement vector corresponding to said pixel of interest of said frame of interest.

4. An image processing device according to claim 1, further comprising:
- weighting information generating means for generating a plurality of said weights each with different values, corresponding to said mixture ratio indicating a mixed state in said pixel data of said objects which are multiple in the real world, and generating weighting information indicating said weight of each of the generated weights; and
- movement vector information generating means for generating a plurality of said movement vectors each having different values indicating relative movement between said pixel data of said frame of interest and pixel data of said adjacent frame, and generating movement vector information indicating each of said generated movement vectors;
- wherein said weighted difference image data calculating means calculate said weighted difference based on said weighting indicated by said weighting information between each pixel of said frame of interest of said image data and each pixel of said adjacent frame adjacent to said frame of interest of said image data, and outputs as said weighted difference image data corresponding to said frame of interest;
- and wherein said inter-weighted-difference-image correlation data computing means match the relative position of said weighted difference image data of said frame of interest and said weighted difference image data of said adjacent frame according to said movement vector indicated by said movement vector information, compute the correlation between said block of interest made up of at least one pixel centered on each pixel of interest of said weighted difference image data of said frame of interest and said corresponding block made up of at least one pixel of said weighted difference image data of said adjacent frame, and outputs as inter-weighted-difference-image correlation data;
- and wherein said detecting means detect said weighting and said movement vector where the correlation between said weighted difference image data is maximum, for each predetermined increment made up of at least one pixel of said inter-weighted-difference-image correlation data, sets said detected weight to said mixture ratio corresponding to said increment of said frame of interest, sets said detected movement vector to said movement vector corresponding to said increment of said frame of interest, and outputs at least one of said mixture ratio and said movement vector.

5. An image processing device according to claim 1, further comprising:
- weighting information generating means for generating a plurality of said weights each with different values, corresponding to said mixture ratio indicating said mixed state in said pixel data of said objects which are multiple in the real world, and generating weighting information indicating the weight of each of the generated weights; and
- movement vector information generating means for generating a plurality of said movement vectors each having different values indicating relative movement between said pixel data of said frame of interest and pixel data of said adjacent frame, and generating movement vector information indicating each of said generated movement vectors;
- wherein said weighted difference image data calculating means calculate weighted difference based on said weighting indicated by said weighting information between each pixel of said frame of interest of said image data and each pixel of said adjacent frame of said image data, and outputs as said weighted difference image data corresponding to said frame of interest;
- and wherein said inter-weighted-difference-image correlation data computing means match the relative position of said weighted difference image data of said frame of interest and said weighted difference image data of said adjacent frame according to said movement vector indicated by said movement vector information, computes the correlation between said block of interest made up of a plurality of pixels centered on each pixel of interest of said weighted difference image data of said frame of interest and said corresponding block made up of a plurality of pixels of said weighted difference image data of said adjacent frame, and outputs as inter-weighted-difference-image correlation data;
- and wherein said detecting means detect said weighting and said movement vector where the correlation between said weighted difference image data is maximum, for each predetermined increment made up of a plurality of pixels of said inter-weighted-differenceimage correlation data, sets said detected weight to said mixture ratio corresponding to said increment of said frame of interest, sets said detected movement vector to said movement vector corresponding to said increment of said frame of interest, and outputs at least one of said mixture ratio and said movement vector.

6. An image processing method for processing image data made up of a predetermined number of pieces of pixel data obtained by an image-taking device having a predetermined number of pixels having time-integration effects, said method comprising:
- a weighted difference image data calculating step for calculating a weighted difference between each pixel in a frame of interest in said image data and each pixel in an adjacent frame which is adjacent to said frame of interest in said image data, based on weighting which is to correspond to a mixture ratio indicating a mixed state in said pixel data of objects which are multiple in the real world, and outputting as weighted difference image data corresponding to said frame of interest;
- an inter-weighted-difference-image correlation data computing step for matching a relative position of said weighted difference image data of said frame of interest and said weighted difference image data of said adjacent frame according to a movement vector which is to indicate relative movement between said pixel data of said frame of interest and said pixel data of said adjacent frame, computing the correlation between a block of interest containing each pixel of interest of said weighted difference image data of said frame of interest and a corresponding block of said weighted difference image data of said adjacent frame, and outputting as inter-weighted-difference-image correlation data; and
- a detecting step for, with regard to each predetermined increment of said inter-weighted-difference-image correlation data, detecting at least one of said weighting and said movement vector where the correlation between said weighted difference image data is maximum, setting said weighting to said mixture ratio corresponding to said increment of said frame of interest in the event that said weighting is detected, and setting said movement vector to said movement vector corresponding to said increment of said frame of interest in the event that said movement vector is detected.

7. An image processing method according to claim 6, further comprising:

a weighting information generating step for generating a plurality of said weights corresponding to said mixture ratio indicating a mixed state in said pixel data of said objects which are multiple in the real world, and generating weighting information indicating said weight of each of the generated weights;

wherein, in said weighted difference image data calculating step, said weighted difference is detected based on said weighting indicated by said weighting information between each pixel of said frame of interest of said image data and each pixel of said adjacent frame which is adjacent to said frame of interest of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector for indicating relative movement between said pixel data of said frame of interest and said pixel data of said adjacent frame, the correlation is calculated between said block of interest made up of at least one pixel centered on each pixel of interest of said weighted difference image data of said frame of interest and said corresponding block made up of at least one pixel of said weighted difference image data of said adjacent frame, and output as said inter-weighted-difference-image correlation data;

and wherein in said detecting step, said weighting where the correlation between said weighted difference image data is maximum is detected for each predetermined increment made up of at least one pixel of said inter-weighted-difference-image correlation data, and output as said mixture ratio corresponding to said increment of said frame of interest.

8. An image processing method according to claim 6, further comprising:

a region specifying step for specifying a mixed region made up of a mixture of a foreground object component configuring foreground objects and a background object component configuring background objects based on said image data, and outputting region information indicating said specified mixed region;

a mixture ratio estimating step for estimating said mixture ratio indicating ratio of mixture between said foreground object component and said background object component in said pixel data belonging to said mixed region, based on said image data and said region information; and an estimated movement vector generating step for generating a plurality of estimated movement vectors, and outputting each of said estimated movement vectors that have been generated;

wherein, in said weighted difference image data calculating step, difference is calculated based on said mixture ratio of said pixel of interest of said frame of interest between each pixel of said frame of interest of said image data and each pixel of a first adjacent frame adjacent to said frame of interest of said image data, and output as first difference image data, and difference is calculated based on said mixture ratio of said pixel of interest of said frame of interest between each pixel of said frame of interest of said image data and each pixel of a second adjacent frame adjacent to said frame of interest of said image data, and output as second difference image data;

and wherein, in said inter-weighted-difference-image correlation data computing step, the relative position of said first difference image data and said second difference image data is matched based on said estimated movement vector, the correlation is computed between said block of interest made up of at least one pixel centered a pixel of said first difference image data corresponding to said pixel of interest of said frame of interest, and said corresponding block made up of at least one pixel of said second difference image data, and output as inter-difference-image correlation data;

and wherein, in said detecting step, said estimated movement vector where the correlation is maximum is detected based on said inter-weighted-difference-image correlation data, and output as said movement vector corresponding to said pixel of interest of said frame of interest.

9. An image processing method according to claim 6, further comprising:

a weighting information generating step for generating a plurality of said weights each with different values, corresponding to said mixture ratio indicating a mixed state in said pixel data of said objects which are multiple in the real world, and generating weighting information indicating said weight of each of the generated weights; and a movement vector information generating step for generating a plurality of said movement vectors each having different values indicating relative movement between said pixel data of said frame of interest and pixel data of said adjacent frame, and generating movement vector information indicating each of said generated movement vectors;

wherein, in said weighted difference image data calculating step, said weighted difference is calculated based on said weighting indicated by said weighting information between each pixel of said frame of interest of said image data and each pixel of said adjacent frame adjacent to said frame of interest of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector indicated by said movement vector information, the correlation is computed between said block of interest made up of at least one pixel centered on each pixel of interest of said weighted difference image data of said frame of interest and said corresponding block made up of at least one pixel of said weighted difference image data of said adjacent frame, and output as inter-weighted-difference-image correlation data;

and wherein, in said detecting step, said weighting and said movement vector where the correlation between said weighted difference image data is maximum are detected for each predetermined increment made up of at least one pixel of said inter-weighted-difference-image correlation data, said detected weight is set to said mixture ratio corresponding to said increment of said frame of interest, said detected movement vector is set to said movement vector corresponding to said increment of said frame of interest, and at least one of said mixture ratio and said movement vector is output.

10. An image processing method according to claim 6, further comprising:

a weighting information generating step for generating a plurality of said weights each with different values, corresponding to said mixture ratio indicating said mixed state in said pixel data of said objects which are multiple in the real world, and generating weighting information indicating said weight of each of the generated weights; and a movement vector information generating step for generating a plurality of said movement vectors each having different values indicating relative movement between said pixel data of said frame of interest and said pixel data of said adjacent frame, and generating movement vector information indicating each of said generated movement vectors;

wherein, in said weighted difference image data calculating step, weighted difference is calculated based on said weighting indicated by said weighting information between each pixel of said frame of interest of said image data and each pixel of said adjacent frame of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector indicated by said movement vector information, the correlation is computed between said block of interest made up of a plurality of pixels centered on each pixel of interest of said weighted difference image data of said frame of interest and said corresponding block made up of a plurality of pixels of said weighted difference image data of said adjacent frame, and output as inter-weighted-difference-image correlation data;

and wherein, in said detecting step, said weighting and said movement vector where the correlation between said weighted difference image data is maximum are detected for each predetermined increment made up of a plurality of pixels of said inter-weighted-difference-image correlation data, said detected weight is set to said mixture ratio corresponding to said increment of said frame of interest, said detected movement vector is set to said movement vector corresponding to said increment of said frame of interest, and at least one of said mixture ratio and said movement vector is output.

11. A recording medium storing a computer-readable program for processing image data made up of a predetermined number of pieces of pixel data obtained by an image-taking device having a predetermined number of pixels having time-integration effects, said program comprising:

a weighted difference image data calculating step for calculating a weighted difference between each pixel in a frame of interest in said image data and each pixel in an adjacent frame which is adjacent to said frame of interest in said image data, based on weighting which is to correspond to a mixture ratio indicating a mixed state in said pixel data of objects which are multiple in the real world, and outputting as weighted difference image data corresponding to said frame of interest;

an inter-weighted-difference-image correlation data computing step for matching a relative position of said weighted difference image data of said frame of interest and said weighted difference image data of said adjacent frame according to a movement vector which is to indicate relative movement between said pixel data of said frame of interest and said pixel data of said adjacent frame, computing the correlation between a block of interest containing each pixel of interest of said weighted difference image data of said frame of interest and a corresponding block of said weighted difference image data of said adjacent frame, and outputting as inter-weighted-difference-image correlation data; and a detecting step for, with regard to each predetermined increment of said inter-weighted-difference-image correlation data, detecting at least one of said weighting and said movement vector where the correlation between said weighted difference image data is maximum, setting said weighting to said mixture ratio corresponding to said increment of said frame of interest in the event that said weighting is detected, and setting said movement vector to said movement vector corresponding to said increment of said frame of interest in the event that said movement vector is detected.

12. A recording medium according to claim 11, said program further comprising:

a weighting information generating step for generating a plurality of said weights corresponding to said mixture ratio indicating a mixed state in said pixel data of said objects which are multiple in the real world, and generating weighting information indicating said weight of each of the generated weights;

wherein, in said weighted difference image data calculating step, said weighted difference is detected based on said weighting indicated by said weighting information between each pixel of said frame of interest of said image data and each pixel of said adjacent frame which is adjacent to said frame of interest of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector for indicating relative movement between said pixel data of said frame of interest and said pixel data of said adjacent frame, the correlation is computed between said block of interest made up of at least one pixel centered on each pixel of interest of said weighted difference image data of said frame of interest and said corresponding block made up of at least one pixel of said weighted difference image data of said adjacent frame, and output as said inter-weighted-difference-image correlation data;

and wherein in said detecting step, said weighting where the correlation between said weighted difference image data is maximum is detected for each predetermined increment made up of at least one pixel of said inter-weighted-difference-image correlation data, and output as said mixture ratio corresponding to said increment of said frame of interest.

13. A recording medium according to claim 11, said program further comprising:

a region specifying step for specifying a mixed region made up of a mixture of a foreground object component configuring foreground objects and a background object component configuring background objects based on said image data, and outputting region information indicating said specified mixed region;

a mixture ratio estimating step for estimating said mixture ratio indicating ratio of mixture between said foreground object component and said background object component in said pixel data belonging to said mixed region, based on said image data and said region information; and an estimated movement vector generating step for generating a plurality of estimated movement vectors, and outputting each of said estimated movement vectors that have been generated;

wherein, in said weighted difference image data calculating step, difference is calculated based on said mixture ratio of said pixel of interest of said frame of interest between each pixel of said frame of interest of said image data and each pixel of a first adjacent frame adjacent to said frame of interest of said image data, and output as first difference image data, and difference is calculated based on said mixture ratio of said pixel of interest of said frame of interest between each pixel of said frame of interest of said image data and each pixel of a second adjacent frame adjacent to said frame of interest of said image data, and output as second difference image data;

and wherein, in said inter-weighted-difference-image correlation data computing step, the relative position of said first difference image data and said second difference image data is matched based on said estimated movement vector, the correlation is computed between said block of interest made up of at least one pixel centered a pixel of said first difference image data corresponding to said pixel of interest of said frame of interest, and said corresponding block made up of at least one pixel of said second difference image data, and output as inter-difference-image correlation data;

and wherein, in said detecting step, said estimated movement vector where the correlation is maximum is detected based on said difference image correlation data, and output as said movement vector corresponding to said pixel of interest of said frame of interest.

14. A recording medium according to claim 11, said program further comprising:

a weighting information generating step for generating a plurality of said weights each with different values, corresponding to said mixture ratio indicating a mixed state in said pixel data of said objects which are multiple in the real world, and generating weighting information indicating each of said generated weight; and a movement vector information generating step for generating a plurality of said movement vectors each having different values indicating relative movement between said pixel data of said frame of interest and pixel data of said adjacent frame, and generating movement vector information indicating each of said generated movement vectors;

wherein, in said weighted difference image data calculating step, said weighted difference is calculated based on said weighting indicated by said weighting information between each pixel of said frame of interest of said image data and each pixel of said adjacent frame adjacent to said frame of interest of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector indicated by said movement vector information, the correlation is computed between said block of interest made up of at least one pixel centered on each pixel of interest of said weighted difference image data of said frame of interest and said corresponding block made up of at least one pixel of said weighted difference image data of said adjacent frame, and output as inter-weighted-difference-image correlation data;

and wherein, in said detecting step, said weighting and said movement vector where the correlation between said weighted difference image data is maximum are detected for each predetermined increment made up of at least one pixel of said inter-weighted-difference-image correlation data, said detected weight is set to said mixture ratio corresponding to said increment of said frame of interest, said detected movement vector is set to said movement vector corresponding to said increment of said frame of interest, and at least one of said mixture ratio and said movement vector is output.

15. A recording medium according to claim 11, said program further comprising:

a weighting information generating step for generating a plurality of said weights each with different values, corresponding to said mixture ratio indicating a mixed state in said pixel data of said objects which are multiple in the real world, and generating weighting information indicating each of said generated weights; and a movement vector information generating step for generating a plurality of said movement vectors each having different values indicating relative movement between said pixel data of said frame of interest and said pixel data of said adjacent frame, and generating movement vector information indicating each of said generated movement vectors;

wherein, in said weighted difference image data calculating step, weighted difference is calculated based on said weighting indicated by said weighting information between each pixel of said frame of interest of said image data and each pixel of said adjacent frame adjacent to said frame of interest of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector indicated by said movement vector information, the correlation is computed between said block of interest made up of a plurality of pixels centered on each pixel of interest of said weighted difference image data of said frame of interest and said corresponding block made up of a plurality of pixels of said weighted difference image data of said adjacent frame, and output as inter-weighted-difference-image correlation data;

and wherein, in said detecting step, said weighting and said movement vector where the correlation between said weighted difference image data is maximum are detected for each predetermined increment made up of a plurality of pixels of said inter-weighted-difference-image correlation data, said detected weight is set to said mixture ratio corresponding to said increment of said frame of interest, said detected movement vector is set to said movement vector corresponding to said increment of said frame of interest, and at least one of said mixture ratio and said movement vector is output.

16. A program for causing a computer, which processes image data made up of a predetermined number of pieces of pixel data obtained by an image-taking device having a predetermined number of pixels having time-integration effects, to execute:

a weighted difference image data calculating step for calculating a weighted difference between each pixel in a frame of interest in said image data and each pixel in an adjacent frame which is adjacent to said frame of interest in said image data, based on weighting which is to correspond to a mixture ratio indicating a mixed state in said pixel data of objects which are multiple in the real world, and outputting as weighted difference image data corresponding to said frame of interest;

an inter-weighted-difference-image correlation data computing step for matching a relative position of said weighted difference image data of said frame of interest and said weighted difference image data of said adjacent frame according to a movement vector which is to indicate relative movement between said pixel data of said frame of interest and said pixel data of said adjacent frame, computing the correlation between a block of interest containing each pixel of interest of said weighted difference image data of said frame of interest and a corresponding block of said weighted difference image data of said adjacent frame, and outputting as inter-weighted-difference-image correlation data; and a detecting step for, with regard to each predetermined increment of said inter-weighted-difference-image correlation data, detecting at least one of said weighting and said movement vector where the correlation between said weighted difference image data is maximum, setting said weighting to said mixture ratio corresponding to said increment of said frame of interest in the event that said weighting is detected, and setting said movement vector to said movement vector corresponding to said increment of said frame of interest in the event that said movement vector is detected.

17. A program according to claim 16, further comprising:

a weighting information generating step for generating a plurality of said weights corresponding to said mixture ratio indicating a mixed state in said pixel data of said objects which are multiple in the real world, and generating weighting information indicating each of said generated weights;

wherein, in said weighted difference image data calculating step, said weighted difference is detected based on said weighting indicated by said weighting information between each pixel of said frame of interest of said image data and each pixel of said adjacent frame which is adjacent to said frame of interest of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector for indicating relative movement between said pixel data of said frame of interest and said pixel data of said adjacent frame, the correlation is computed between said block of interest made up of at least one pixel centered on each pixel of interest of said weighted difference image data of said frame of interest and said corresponding block made up of at least one pixel of said weighted difference image data of said adjacent frame, and output as said inter-weighted-difference-image correlation data;

and wherein in said detecting step, said weighting where the correlation between said weighted difference image data is maximum is detected for each predetermined increment made up of at least one pixel of said inter-weighted-difference-image correlation data, and output as said mixture ratio corresponding to said increment of said frame of interest.

18. A program according to claim 16, further comprising:

a region specifying step for specifying a mixed region made up of a mixture of a foreground object component configuring foreground objects and a background object component configuring background objects based on said image data, and outputting region information indicating said specified mixed region;

a mixture ratio estimating step for estimating said mixture ratio indicating ratio of mixture between said foreground object component and said background object component in said pixel data belonging to said mixed region, based on said image data and said region information; and an estimated movement vector generating step for generating a plurality of estimated movement vectors, and outputting each of said estimated movement vectors that have been generated;

wherein, in said weighted difference image data calculating step, difference is calculated based on said mixture ratio of said pixel of interest of said frame of interest between each pixel of said frame of interest of said image data and each pixel of a first adjacent frame adjacent to said frame of interest of said image data, and output as first difference image data, and difference is calculated based on said mixture ratio of said pixel of interest of said frame of interest between each pixel of said frame of interest of said image data and each pixel of a second adjacent frame adjacent to said frame of interest of said image data, and output as second difference image data;

and wherein, in said inter-weighted-difference-image correlation data computing step, the relative position of said first difference image data and said second difference image data is matched based on said estimated movement vector, the correlation is computed between said block of interest made up of at least one pixel centered a pixel of said first difference image data corresponding to said pixel of interest of said frame of interest, and said corresponding block made up of at least one pixel of said second difference image data, and output as inter-difference-image correlation data;

and wherein, in said detecting step, said estimated movement vector where the correlation is maximum is detected based on said inter-weighted-difference-image correlation data, and output as said movement vector corresponding to said pixel of interest of said frame of interest.

19. A program according to claim 16, further comprising:

a weighting information generating step for generating a plurality of said weights each with different values, corresponding to said mixture ratio indicating a mixed state in said pixel data of said objects which are multiple in the real world, and generating weighting information indicating said weight of each of the generated weights; and a movement vector information generating step for generating a plurality of said movement vectors each having different values indicating relative movement between said pixel data of said frame of interest and said pixel data of said adjacent frame, and generating movement vector information indicating each of said generated movement vectors;

wherein, in said weighted difference image data calculating step, said weighted difference is calculated based on said weighting indicated by said weighting information between each pixel of said frame of interest of said image data and each pixel of said adjacent frame adjacent to said frame of interest of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector indicated by said movement vector information, the correlation is computed between said block of interest made up of at least one pixel centered on each pixel of interest of said weighted difference image data of said frame of interest and said corresponding block made up of at least one pixel of said weighted difference image data of said adjacent frame, and output as said inter-weighted-difference-image correlation data;

and wherein, in said detecting step, said weighting and said movement vector where the correlation between said weighted difference image data is maximum are detected for each predetermined increment made up of at least one pixel of said inter-weighted-difference-image correlation data, said detected weight is set to said mixture ratio corresponding to said increment of said frame of interest, said detected movement vector is set to said movement vector corresponding to said increment of said frame of interest, and at least one of said mixture ratio and said movement vector is output.

20. A program according to claim 16, further comprising:

a weighting information generating step for generating a plurality of said weights each with different values, corresponding to said mixture ratio indicating a mixed state in said pixel data of said objects which are multiple in the real world, and generating weighting information indicating each of said generated weights; and a movement vector information generating step for generating a plurality of said movement vectors each having different values indicating relative movement between said pixel data of said frame of interest and pixel data of said adjacent frame, and generating movement vector information indicating each of said generated movement vectors;

wherein, in said weighted difference image data calculating step, weighted difference is calculated based on said weighting indicated by said weighting information between each pixel of said frame of interest of said image data and each pixel of said adjacent frame adjacent to said frame of interest of said image data, and output as said weighted difference image data corresponding to said frame of interest;

and wherein, in said inter-weighted-difference-image correlation data computing step, the relative position of said weighted difference image data of said frame of interest and said weighted difference image data of said adjacent frame is matched according to said movement vector indicated by said movement vector information, the correlation is computed between said block of interest made up of a plurality of pixels centered on each pixel of interest of said weighted difference image data of said frame of interest and said corresponding block made up of a plurality of pixels of said weighted difference image data of said adjacent frame, and output as inter-weighted-difference-image correlation data;

and wherein, in said detecting step, said weighting and said movement vector where the correlation between said weighted difference image data is maximum are detected for each predetermined increment made up of a plurality of pixels of said inter-weighted-difference-image correlation data, said detected weight is set to said mixture ratio corresponding to said increment of said frame of interest, said detected movement vector is set to said movement vector corresponding to said increment of said frame of interest, and at least one of said mixture ratio and said movement vector is output.

21. An image-taking device, comprising:

image-taking means for outputting a subject image taken by an image-taking device having a predetermined number of pixels having time-integration effects as image data made up of a predetermined number of pieces of pixel data;

weighted difference image data calculating means for calculating a weighted difference between each pixel in a frame of interest in said image data and each pixel in an adjacent frame which is adjacent to said frame of interest in said image data, based on weighting which is to correspond to a mixture ratio indicating a mixed state in said pixel data of objects which are multiple in the real world, and outputting as weighted difference image data corresponding to said frame of interest;

inter-weighted-difference-image correlation data computing means for matching a relative position of said weighted difference image data of said frame of interest and said weighted difference image data of said adjacent frame according to a movement vector which is to indicate relative movement between said pixel data of said frame of interest and said pixel data of said adjacent frame, computing the correlation between a block of interest containing each pixel of interest of said weighted difference image data of said frame of interest and a corresponding block of said weighted difference image data of said adjacent frame, and outputting as inter-weighted-difference-image correlation data; and detecting means for, with regard to each predetermined increment of said inter-weighted-difference-image correlation data, detecting at least one of said weighting and said movement vector where the correlation between said weighted difference image data is maximum, setting said weighting to said mixture ratio corresponding to said increment of said frame of interest in the event that said weighting is detected, and setting said movement vector to said movement vector corresponding to said increment of said frame of interest in the event that said movement vector is detected.

22. An image-taking device according to claim 21, further comprising:

weighting information generating means for generating a plurality of said weights corresponding to said mixture ratio indicating a mixed state in said pixel data of said objects which are multiple in the real world, and generating weighting information indicating each of said generated weights;

wherein said weighted difference image data calculating means detect said weighted difference based on said weighting indicated by said weighting information between each pixel of said frame of interest of said image data and each pixel of said adjacent frame which is adjacent to said frame of interest of said image data, and outputs as said weighted difference image data corresponding to said frame of interest;

and wherein said inter-weighted-difference-image correlation data computing means match the relative position of said weighted difference image data of said frame of interest and said weighted difference image data of said adjacent frame according to said movement vector for indicating relative movement between said pixel data of said frame of interest and said pixel data of said adjacent frame, computes the correlation between said block of interest made up of at least one pixel centered on each pixel of interest of said weighted difference image data of said frame of interest and said corresponding block made up of at least one pixel of said weighted difference image data of said adjacent frame, and outputs as said inter-weighted-difference-image correlation data;

and wherein said detecting means detect said weighting where the correlation between said weighted difference image data is maximum, for each predetermined increment made up of at least one pixel of said inter-weighted-difference-image correlation data, and outputs as said mixture ratio corresponding to said increment of said frame of interest.

23. An image-taking device according to claim 21, further comprising:

region specifying means for specifying a mixed region made up of a mixture of a foreground object component configuring foreground objects and a background object component configuring background objects based on said image data, and outputting region information indicating said specified mixed region;

mixture ratio estimating means for estimating said mixture ratio indicating ratio of mixture between said foreground object component and said background object component in said pixel data belonging to said mixed region, based on said image data and said region information; and estimated movement vector generating means for generating a plurality of estimated movement vectors, and outputting each of said estimated movement vectors that have been generated;

wherein said weighted difference image data calculating means calculate difference based on said mixture ratio of said pixel of interest of said frame of interest between each pixel of said frame of interest of said image data and each pixel of a first adjacent frame adjacent to said frame of interest of said image data, and output as first difference image data, and calculate difference based on said mixture ratio of said pixel of interest of said frame of interest between each pixel of said frame of interest of said image data and each pixel of a second adjacent frame adjacent to said frame of interest of said image data, and output as second difference image data;

and wherein said inter-weighted-difference-image correlation data computing means match the relative position of said first difference image data and said second difference image data based on said estimated movement vector, computes the correlation between said block of interest made up of at least one pixel centered a pixel of said first difference image data corresponding to said pixel of interest of said frame of interest, and said corresponding block made up of at least one pixel of said second difference image data, and outputs as inter-difference-image correlation data;

and wherein said detecting means detect said estimated movement vector where the correlation is maximum, based on said inter-weighted-difference-image correlation data, and outputs as said movement vector corresponding to said pixel of interest of said frame of interest.

24. An image-taking device according to claim 21, further comprising:

weighting information generating means for generating a plurality of said weights each with different values, corresponding to said mixture ratio indicating a mixed state in said pixel data of said objects which are multiple in the real world, and generating weighting information indicating each of said generated weights; and movement vector information generating means for generating a plurality of said movement vectors each having different values indicating relative movement between said pixel data of said frame of interest and said pixel data of said adjacent frame, and generating movement vector information indicating each of said generated movement vectors;

wherein said weighted difference image data calculating means calculate said weighted difference based on said weighting indicated by said weighting information between each pixel of said frame of interest of said image data and each pixel of said adjacent frame adjacent to said frame of interest of said image data, and outputs as said weighted difference image data corresponding to said frame of interest;

and wherein said inter-weighted-difference-image correlation data computing means match the relative position of said weighted difference image data of said frame of interest and said weighted difference image data of said adjacent frame according to said movement vector indicated by said movement vector information, computes the correlation between said block of interest made up of at least one pixel centered on each pixel of interest of said weighted difference image data of said frame of interest and said corresponding block made up of at least one pixel of said weighted difference image data of said adjacent frame, and outputs as inter-weighted-difference-image correlation data;

and wherein said detecting means detect said weighting and said movement vector where the correlation between said weighted difference image data is maximum, for each predetermined increment made up of at least one pixel of said inter-weighted-difference-image correlation data, sets said detected weight to said mixture ratio corresponding to said increment of said frame of interest, sets said detected movement vector to said movement vector corresponding to said increment of said frame of interest, and outputs at least one of said mixture ratio and said movement vector.

25. An image-taking device according to claim 21, further comprising:

weighting information generating means for generating a plurality of said weights each with different values, corresponding to said mixture ratio indicating said mixed state in said pixel data of said objects which are multiple in the real world, and generating weighting information indicating each of said generated weights; and movement vector information generating means for generating a plurality of said movement vectors each having different values indicating relative movement between said pixel data of said frame of interest and said pixel data of said adjacent frame, and generating movement vector information indicating each of said generated movement vectors;

wherein said weighted difference image data calculating means calculate weighted difference based on said weighting indicated by said weighting information between each pixel of said frame of interest of said image data and each pixel of said adjacent frame adjacent to said frame of interest of said image data, and outputs as said weighted difference image data corresponding to said frame of interest;

and wherein said inter-weighted-difference-image correlation data computing means match the relative position of said weighted difference image data of said frame of interest and said weighted difference image data of said adjacent frame according to said movement vector indicated by said movement vector information, computes the correlation between said block of interest made up of a plurality of pixels centered on each pixel of interest of said weighted difference image data of said frame of interest and said corresponding block made up of a plurality of pixels of said weighted difference image data of said adjacent frame, and outputs as inter-weighted-difference-image correlation data;

and wherein said detecting means detect said weighting and said movement vector where the correlation between said weighted difference image data is maximum, for each predetermined increment made up of a plurality of pixels of said inter-weighted-difference-image correlation data, sets said detected weight to said mixture ratio corresponding to said increment of said frame of interest, sets said detected movement vector to said movement vector corresponding to said increment of said frame of interest, and outputs at least one of said mixture ratio and said movement vector.

26. An image processing device for processing image data made up of a predetermined number of pieces of pixel data obtained by an image-taking device having a predetermined number of pixels having time-integration effects, said image processing device comprising:

weighting information generating means for generating a plurality of weights corresponding to a mixture ratio indicating a mixed state in said pixel data of objects which are multiple in the real world, and generating weighting information indicating each of said generated weights;

weighted difference image data detecting means for detecting a weighted difference between each pixel in a frame of interest in said image data and each pixel in an adjacent frame which is adjacent to said frame of interest in said image data, based on said weight indicated by said weighting information, and outputting as weighted difference image data corresponding to said frame of interest;

inter-weighted-difference-image correlation data detecting means for matching a relative position of said weighted difference image data of said frame of interest and said weighted difference image data of said adjacent frame according to a movement vector for indicating relative movement between said pixel data of said frame of interest and said pixel data of said adjacent frame, computing the correlation between a block of interest made up of at least one pixel and centered on each pixel of interest of said weighted difference image data of said frame of interest and a corresponding block made up of at least one pixel of said weighted difference image data of said adjacent frame, and outputting as inter-weighted-difference-image correlation data; and mixture ratio detecting means for, with regard to each predetermined increment made up of at least one pixel of said inter-weighted-difference-image correlation data, detecting said weighting where the correlation between said weighted difference image data is maximum, and outputting as said mixture ratio corresponding to said increment of said frame of interest.

27. An image processing device according to claim 26, wherein said weighting information generating means sequentially generate said weighting information indicating a plurality of said weights which each differ, corresponding to a plurality of said mixture ratios which each differ;

and wherein said weighted difference image data detecting means detect said weighted difference corresponding to said plurality of weights which each differ, and output as weighted difference image data corresponding to said frame of interest;

and wherein said inter-weighted-difference-image correlation data detecting means compute said correlation corresponding to said plurality of weights which each differ, and output as inter-weighted-difference-image correlation data;

and wherein said mixture ratio detecting means detect, from said plurality of weights which each differ, said weighting where the correlation between said weighted difference image data is maximum, and output as said mixture ratio corresponding to said increment of said frame of interest.

28. An image processing device according to claim 26, wherein said inter-weighted-difference-image correlation data detecting means compute, as said correlation, a difference absolute value between said block of interest made up of at least one pixel and centered on each pixel of interest of said weighted difference image data of said frame of interest and said corresponding block made up of at least one pixel of said weighted difference image data of said adjacent frame, and output as inter-weighted-difference-image. correlation data.

29. An image processing device according to claim 26, wherein said inter-weighted-difference-image correlation data detecting means compute, as said correlation, a sum of absolute value of difference between said block of interest made up of at least one pixel and centered on each pixel of interest of said weighted difference image data of said frame of interest and said corresponding block made up of at least one pixel of said weighted difference image data of said adjacent frame, and output as inter-weighted-difference-image correlation data.

30. An image processing device according to claim 26, wherein said weighted difference image data detecting means detect a weighted difference due to said weight indicated by said weighting information between each pixel of said frame of interest and each pixel of said frame prior to said frame of interest in the event that said pixel of said frame of interest belongs to a covered background region formed at a tip side in the direction of movement of an object in the foreground and which is a mixed region wherein a plurality of said objects are mixed, and detect a weighted difference due to said weight indicated by said weighting information between each pixel of said frame of interest and each pixel of said frame following said frame of interest in the event that said pixel of said frame of interest belongs to an uncovered background region formed at a trailing side in the direction of movement of an object in said foreground and which is a mixed region wherein a plurality of said objects are mixed.

31. An image processing device according to claim 26, further comprising region information generating means for specifying a foreground region made up of objects forming a foreground of said plurality of objects in said image data, a background region made up of objects forming a background of said plurality of objects in said image data, a covered background region formed at a tip side in the direction of movement of said foreground objects which is a mixed region wherein a plurality of said objects are mixed, and an uncovered background region formed at a trailing side in the direction of movement of said foreground objects which is said mixed region, and generating region information indicating said foreground region, said background region, and said mixed region including said covered background region and said uncovered background region.

32. An image processing device according to claim 26, further comprising movement vector detecting means for detecting said movement vector indicating relative movement between said pixel data of said frame of interest and said pixel data of said adjacent frame.

33. An image processing device according to claim 26, wherein said mixture ratio detecting means detect said mixture ratio of said pixel of said frame of interest, belonging to a mixed region where said plurality of objects are mixed.

34. An image processing device according to claim 26, further comprising separating means for separating, from said pixel data, at least objects making up a foreground from said plurality of objects, based on said mixture ratio.

35. An image processing device according to claim 34, further comprising blurring adjustment means for adjusting the amount of movement blurring of objects making up said separated foreground.

36. An image processing device according to claim 34, further comprising synthesizing means for synthesizing desired other objects and objects making up said separated foreground, based on said mixture ratio.

37. An image processing method for processing image data made up of a predetermined number of pieces of pixel data obtained by an image-taking device having a predetermined number of pixels having time-integration effects, said method comprising:
a weighting information generating step for generating a plurality of weights corresponding to a mixture ratio indicating a mixed state in said pixel data of objects which are multiple in the real world, and generating weighting information indicating each of said generated weights;
a weighted difference image data detecting step for detecting a weighted difference between each pixel in a frame of interest in said image data and each pixel in an adjacent frame which is adjacent to said frame of interest in said image data, based on said weight indicated by said weighting information, and outputting as weighted difference image data corresponding to said frame of interest;
an inter-weighted-difference-image correlation data detecting step for matching a relative position of said weighted difference image data of said frame of interest and said weighted difference image data of said adjacent frame according to a movement vector for indicating relative movement between said pixel data of said frame of interest and said pixel data of said adjacent frame, computing the correlation between a block of interest made up of at least one pixel and centered on each pixel of interest of said weighted difference image data of said frame of interest and a corresponding block made up of at least one pixel of said weighted difference image data of said adjacent frame, and outputting as inter-weighted-difference-image correlation data; and
a mixture ratio detecting step for, with regard to each predetermined increment made up of at least one pixel of said inter-weighted-difference-image correlation data, detecting said weighting where the correlation between said weighted difference image data is maximum, and outputting as said mixture ratio corresponding to said increment of said frame of interest.

38. An image processing method according to claim 37, wherein, in said weighting information generating step, said weighting information indicating a plurality of said weights which each differ is sequentially generated, corresponding to a plurality of said mixture ratios which each differ;
and wherein, in said weighted difference image data detecting step, said weighted difference is detected corresponding to said plurality of weights which each differ, and output as weighted difference image data corresponding to said frame of interest;
and wherein, in said inter-weighted-difference-image correlation data detecting step, said correlation corresponding to said plurality of weights which each differ is computed, and output as inter-weighted-difference-image correlation data;
and wherein, in said mixture ratio detecting step, said weighting where the correlation between said weighted difference image data is maximum is detected from said plurality of weights which each differ, and output as said mixture ratio corresponding to said predetermined increment of said frame of interest.

39. An image processing method according to claim 37, wherein, in said inter-weighted-difference-image correlation data detecting step, a difference absolute value between said block of interest made up of at least one pixel and centered on each pixel of interest of said weighted difference image data of said frame of interest and said corresponding block made up of at least one pixel of said weighted difference image data of said adjacent frame is computed as said correlation, and output as inter-weighted-difference-image correlation data.

40. An image processing method according to claim 37, wherein, in said inter-weighted-difference-image correlation data detecting step, a sum of absolute value of difference between said block of interest made up of at least one pixel and centered on each pixel of interest of said weighted difference image data of said frame of interest and said corresponding block made up of at least one pixel of said weighted difference image data of said adjacent frame is computed as said correlation, and output as said inter-weighted-difference-image correlation data.

41. An image processing method according to claim 37, wherein, in said weighted difference image data detecting step, a weighted difference due to said weight indicated by said weighting information between each pixel of said frame of interest and each pixel of said frame prior to said frame of interest is detected in the event that said pixel of said frame of interest belongs to a covered background region formed at a tip side in the direction of movement of an object in the foreground and which is a mixed region wherein a plurality of said objects are mixed, and a weighted difference due to said weight indicated by said weighting information between each pixel of said frame of interest and each pixel of said frame following said frame of interest is detected in the event that said pixel of said frame of interest belongs to an uncovered background region formed at a trailing side in the direction of movement of an object in said foreground and which is a mixed region wherein a plurality of said objects are mixed.

42. An image processing method according to claim 37, further comprising a region information generating step for specifying a foreground region made up of objects forming a foreground of said plurality of objects in said image data, a background region made up of objects forming a background of said plurality of objects in said image data, a covered background region formed at a tip side in the direction of movement of said foreground objects which is a mixed region wherein a plurality of said objects are mixed, and an uncovered background region formed at a trailing side in the direction of movement of said foreground objects which is said mixed region, and generating region information indicating said foreground region, said background region, and said mixed region including said covered background region and said uncovered background region.

43. An image processing method according to claim 37, further comprising a movement vector detecting step for detecting said movement vector indicating relative movement between said pixel data of said frame of interest and said pixel data of said adjacent frame.

44. An image processing method according to claim 37, wherein, in said mixture ratio detecting step, said mixture ratio of said pixel of said frame of interest belonging to a mixed region where said plurality of objects are mixed is detected.

45. An image processing method according to claim 37, further comprising a separating step for separating, from said pixel data, at least objects making up a foreground from said plurality of objects, based on said mixture ratio.

46. An image processing method according to claim 45, further comprising a movement blurring adjustment step for adjusting the amount of movement blurring of objects making up said separated foreground.

47. An image processing method according to claim 45, further comprising a synthesizing step for synthesizing desired other objects and objects making up said separated foreground, based on said mixture ratio.

48. A recording medium storing a computer-readable program for processing image data made up of a predetermined number of pieces of pixel data obtained by an image-taking device having a predetermined number of pixels having time-integration effects, said program comprising:

a weighting information generating step for generating a plurality of weights corresponding to a mixture ratio indicating a mixed state in said pixel data of objects which are multiple in the real world, and generating weighting information indicating each of said generated weights;

a weighted difference image data detecting step for detecting a weighted difference between each pixel in a frame of interest in said image data and each pixel in an adjacent frame which is adjacent to said frame of interest in said image data, based on said weight indicated by said weighting information, and outputting as weighted difference image data corresponding to said frame of interest;

an inter-weighted-difference-image correlation data detecting step for matching a relative position of said weighted difference image data of said frame of interest and said weighted difference image data of said adjacent frame according to a movement vector for indicating relative movement between said pixel data of said frame of interest and said pixel data of said adjacent frame, computing the correlation between a block of interest made up of at least one pixel and centered on each pixel of interest of said weighted difference image data of said frame of interest and a corresponding block made up of at least one pixel of said weighted difference image data of said adjacent frame, and outputting as inter-weighted-difference-image correlation data; and a mixture ratio detecting step for, with regard to each predetermined increment made up of at least one pixel of said inter-weighted-difference-image correlation data, detecting said weighting where the correlation between said weighted difference image data is maximum, and outputting as said mixture ratio corresponding to said increment of said frame of interest.

49. A recording medium according to claim 48, wherein, in said weighting information generating step, said weighting information indicating a plurality of said weights which each differ is sequentially generated, corresponding to a plurality of said mixture ratios which each differ;

and wherein, in said weighted difference image data detecting step, said weighted difference is detected corresponding to said plurality of weights which each differ, and output as said weighted difference image data corresponding to said frame of interest;

and wherein, in said inter-weighted-difference-image correlation data detecting step, said correlation corresponding to said plurality of weights which each differ is computed, and output as inter-weighted-difference-image correlation data;

and wherein, in said mixture ratio detecting step, said weighting where the correlation between said weighted difference image data is maximum is detected from said plurality of weights which each differ, and output as said mixture ratio corresponding to said predetermined increment of said frame of interest.

50. A recording medium according to claim 48, wherein, in said inter-weighted-difference-image correlation data detecting step, a difference absolute value between said block of interest made up of at least one pixel and centered on each pixel of interest of said weighted difference image data of said frame of interest and said corresponding block made up of at least one pixel of said weighted difference image data of said adjacent frame is computed as said correlation, and output as inter-weighted-difference-image correlation data.

51. A recording medium according to claim 48, wherein, in said inter-weighted-difference-image correlation data detecting step, a sum of absolute value of difference between said block of interest made up of at least one pixel and centered on each pixel of interest of said weighted difference image data of said frame of interest and said corresponding block made up of at least one pixel of said weighted difference image data of said adjacent frame is computed as said correlation, and output as said inter-weighted-difference-image correlation data.

52. A recording medium according to claim 48, wherein, in said weighted difference image data detecting step, a weighted difference due to said weight indicated by said weighting information between each pixel of said frame of interest and each pixel of said frame prior to said frame of interest is detected in the event that said pixel of said frame of interest belongs to a covered background region formed at a tip side in the direction of movement of an object in the foreground and which is a mixed region wherein a plurality of said objects are mixed, and a weighted difference due to said weight indicated by said weighting information between each pixel of said frame of interest and each pixel of said frame following said frame of interest is detected in the event that said pixel of said frame of interest belongs to an uncovered background region formed at a trailing side in the direction of movement of an object in said foreground and which is a mixed region wherein a plurality of said objects are mixed.

53. A recording medium according to claim 48, said program further comprising a region information generating step for specifying a foreground region made up of objects forming a foreground of said plurality of objects in said image data, a background region made up of objects forming a background of said plurality of objects in said image data, a covered background region formed at a tip side in the direction of movement of said foreground objects which is a mixed region wherein a plurality of said objects are mixed, and an uncovered background region formed at a trailing side in the direction of movement of said foreground objects which is said mixed region, and generating region information indicating said foreground region, said background region, and said mixed region including said covered background region and said uncovered background region.

54. A recording medium according to claim 48, said program further comprising a movement vector detecting step for detecting said movement vector indicating relative movement between said pixel data of said frame of interest and said pixel data of said adjacent frame.

55. A recording medium according to claim 48, wherein, in said mixture ratio detecting step, said mixture ratio of said pixel of said frame of interest belonging to a mixed region where said plurality of objects are mixed is detected.

56. A recording medium according to claim 48, said program further comprising a separating step for separating, from said pixel data, at least objects making up a foreground from said plurality of objects, based on said mixture ratio.

57. A recording medium according to claim 56, said program further comprising a movement blurring adjustment step for adjusting the amount of movement blurring of objects making up said separated foreground.

58. A recording medium according to claim 56, said program further comprising a synthesizing step for synthesizing desired other objects and objects making up said separated foreground, based on said mixture ratio.

59. A program for causing a computer, which processes image data made up of a predetermined number of pieces of pixel data obtained by an image-taking device having a predetermined number of pixels having time-integration effects, to execute:

a weighting information generating step for generating a plurality of weights corresponding to a mixture ratio indicating a mixed state in said pixel data of objects which are multiple in the real world, and generating weighting information indicating each of said generated weights;

a weighted difference image data detecting step for detecting a weighted difference between each pixel in a frame of interest in said image data and each pixel in an adjacent frame which is adjacent to said frame of interest in said image data, based on said weight indicated by said weighting information, and outputting as weighted difference image data corresponding to said frame of interest;

an inter-weighted-difference-image correlation data detecting step for matching a relative position of said weighted difference image data of said frame of interest and said weighted difference image data of said adjacent frame according to a movement vector for indicating relative movement between said pixel data of said frame of interest and said pixel data of said adjacent frame, computing the correlation between a block of interest made up of at least one pixel and centered on each pixel of interest of said weighted difference image data of said frame of interest and a corresponding block made up of at least one pixel of said weighted difference image data of said adjacent frame, and outputting as inter-weighted-difference-image correlation data; and a mixture ratio detecting step for, with regard to each predetermined increment made up of at least one pixel of said inter-weighted-difference-image correlation data, detecting said weighting where the correlation between said weighted difference image data is maximum, and outputting as said mixture ratio corresponding to said increment of said frame of interest.

60. A program according to claim 59, wherein, in said weighting information generating step, said weighting information indicating a plurality of said weights which each differ is sequentially generated, corresponding to a plurality of said mixture ratios which each differ;

and wherein, in said weighted difference image data detecting step, said weighted difference is detected corresponding to said plurality of weights which each differ, and output as weighted difference image data corresponding to said frame of interest;

and wherein, in said inter-weighted-difference-image correlation data detecting step, said correlation corresponding to said plurality of weights which each differ is computed, and output as inter-weighted-difference-image correlation data;

and wherein, in said mixture ratio detecting step, said weighting where the correlation between said weighted difference image data is maximum is detected from said plurality of weights which each differ, and output as said mixture ratio corresponding to said increment of said frame of interest.

61. A program according to claim 59, wherein, in said inter-weighted-difference-image correlation data detecting step, a difference absolute value between said block of interest made up of at least one pixel and centered on each pixel of interest of said weighted difference image data of said frame of interest and said corresponding block made up of at least one pixel of said weighted difference image data of said adjacent frame is computed as said correlation, and output as inter-weighted-difference-image correlation data.

62. A program according to claim 59, wherein, in said inter-weighted-difference-image correlation data detecting step, a sum of absolute value of difference between said block of interest made up of at least one pixel and centered on each pixel of interest of said weighted difference image data of said frame of interest and said corresponding block made up of at least one pixel of said weighted difference image data of said adjacent frame is computed as said correlation, and output as inter-weighted-difference-image correlation data.

63. A program according to claim 59, wherein, in said weighted difference image data detecting step, a weighted difference due to said weight indicated by said weighting information between each pixel of said frame of interest and each pixel of said frame prior to said frame of interest is detected in the event that said pixel of said frame of interest belongs to a covered background region formed at a tip side in the direction of movement of an object in the foreground and which is a mixed region wherein a plurality of said objects are mixed, and a weighted difference due to said weight indicated by said weighting information between each pixel of said frame of interest and each pixel of said frame following said frame of interest is detected in the event that said pixel of said frame of interest belongs to an uncovered background region formed at a trailing side in the direction of movement of an object in said foreground and which is a mixed region wherein a plurality of said objects are mixed.

64. A program according to claim 59, further comprising a region information generating step for specifying a foreground region made up of objects forming a foreground of said plurality of objects in said image data, a background region made up of objects forming a background of said plurality of objects in said image data, a covered background region formed at a tip side in the direction of movement of said foreground objects which is a mixed region wherein a plurality of said objects are mixed, and an uncovered background region formed at a trailing side in the direction of movement of said foreground objects which is said mixed region, and generating region information indicating said foreground region, said background region, and said mixed region including said covered background region and said uncovered background region.

65. A program according to claim 59, further comprising a movement vector detecting step for detecting said movement vector indicating relative movement between said pixel data of said frame of interest and said pixel data of said adjacent frame.

66. A program according to claim 59, wherein, in said mixture ratio detecting step, said mixture ratio of said pixel of said frame of interest belonging to a mixed region where said plurality of objects are mixed is detected.

67. A program according to claim 59, further comprising a separating step for separating, from said pixel data, at least objects making up a foreground from said plurality of objects, based on said mixture ratio.

68. A program according to claim 67, further comprising a movement blurring adjustment step for adjusting the amount of movement blurring of objects making up said separated foreground.

69. A program according to claim 67, further comprising a synthesizing step for synthesizing desired other objects and objects making up said separated foreground, based on said mixture ratio.

70. An image-taking device, comprising:
image-taking means for outputting a subject image taken by an image-taking device having a predetermined number of pixels having time-integration effects as image data made up of a predetermined number of pieces of pixel data;
weighting information generating means for generating a plurality of weights corresponding to a mixture ratio indicating a mixed state in said pixel data of objects which are multiple in the real world, and generating weighting information indicating each of said generated weights;
weighted difference image data detecting means for detecting a weighted difference between each pixel in a frame of interest in said image data and each pixel in an adjacent frame which is adjacent to said frame of interest in said image data, based on said weight indicated by said weighting information, and outputting as weighted difference image data corresponding to said frame of interest;
inter-weighted-difference-image correlation data detecting means for matching a relative position of said weighted difference image data of said frame of interest and said weighted difference image data of said adjacent frame according to a movement vector for indicating relative movement between said pixel data of said frame of interest and said pixel data of said adjacent frame, computing the correlation between a block of interest made up of at least one pixel and centered on each pixel of interest of said weighted difference image data of said frame of interest and a corresponding block made up of at least one pixel of said weighted difference image data of said adjacent frame, and outputting as inter-weighted-difference-image correlation data; and
mixture ratio detecting means for, with regard to each predetermined increment made up of at least one pixel of said inter-weighted-difference-image correlation data, detecting said weighting where the correlation between said weighted difference image data is maximum, and outputting as said mixture ratio corresponding to said increment of said frame of interest.

71. An image-taking device according to claim 70, wherein said weighting information generating means sequentially generate said weighting information indicating a plurality of said weights which each differ, corresponding to a plurality of said mixture ratios which each differ;
and wherein said weighted difference image data detecting means detect said weighted difference corresponding to said plurality of weights which each differ, and output as said weighted difference image data corresponding to said frame of interest;
and wherein said inter-weighted-difference-image correlation data detecting means compute said correlation corresponding to said plurality of weights which each differ, and output as inter-weighted-difference-image correlation data;
and wherein said mixture ratio detecting means detect, from said plurality of weights which each differ, said weighting where the correlation between said weighted difference image data is maximum, and output as said mixture ratio corresponding to said predetermined increment of said frame of interest.

72. An image-taking device according to claim 70, wherein said inter-weighted-difference-image correlation data detecting means compute, as said correlation, a difference absolute value between said block of interest made up of at least one pixel and centered on each pixel of interest of said weighted difference image data of said frame of interest and said corresponding block made up of at least one pixel of said weighted difference image data of said adjacent frame, and output as inter-weighted-difference-image correlation data.

73. An image-taking device according to claim 70, wherein said inter-weighted-difference-image correlation data detecting means compute, as said correlation, a sum of absolute value of difference between said block of interest made up of at least one pixel and centered on each pixel of interest of said weighted difference image data of said frame of interest and said corresponding block made up of at least one pixel of said weighted difference image data of said adjacent frame, and output as inter-weighted-difference-image correlation data.

74. An image-taking device according to claim 70, wherein said weighted difference image data detecting means detect a weighted difference due to said weight indicated by said weighting information between each pixel of said frame of interest and each pixel of said frame prior to said frame of interest in the event that said pixel of said frame of interest belongs to a covered background region formed at a tip side in the direction of movement of an object in the foreground and which is a mixed region wherein a plurality of said objects are mixed, and detect a weighted difference due to said weight indicated by said weighting information between each pixel of said frame of interest and each pixel of said frame following said frame of interest in the event that said pixel of said frame of interest belongs to an uncovered background region formed at a trailing side in the direction of movement of an object in said foreground and which is a mixed region wherein a plurality of said objects are mixed.

75. An image-taking device according to claim 70, further comprising region information generating means for specifying a foreground region made up of objects forming a foreground of said plurality of objects in said image data, a background region made up of objects forming a background of said plurality of objects in said image data, a covered background region formed at a tip side in the direction of movement of said foreground objects which is a mixed region wherein a plurality of said objects are mixed, and an uncovered background region formed at a trailing side in the direction of movement of said foreground objects which is said mixed region, and generating region information indicating said foreground region, said background region, and said mixed region including said covered background region and said uncovered background region.

76. An image-taking device according to claim 70, further comprising movement vector detecting means for detecting said movement vector indicating relative movement between said pixel data of said frame of interest and said pixel data of said adjacent frame.

77. An image-taking device according to claim 70, wherein said mixture ratio detecting means detect said mixture ratio of said pixel of said frame of interest, belonging to a mixed region where said plurality of objects are mixed.

78. An image-taking device according to claim 70, further comprising separating means for separating, from said pixel data, at least objects making up a foreground from said plurality of objects, based on said mixture ratio.

79. An image-taking device according to claim 78, further comprising movement blurring adjustment means for adjusting the amount of movement blurring of objects making up said separated foreground.

80. An image-taking device according to claim 78, further comprising synthesizing means for synthesizing desired other objects and objects making up said separated foreground, based on said mixture ratio.

81. An image processing device for processing image data made up of a predetermined number of pieces of pixel data obtained by an image-taking device having a predetermined number of pixels having time-integration effects, said image processing device comprising:
region specifying means for specifying a mixed region made up of a mixture of a foreground object component configuring foreground objects and a background object component configuring background objects based on said image data, and outputting region information indicating the specified mixed region;
mixture ratio estimating means for estimating mixture ratio indicating ratio of mixture between said foreground object component and said background object component in said pixel data belonging to said mixed region, based on said image data and said region information;
estimated movement vector generating means for generating a plurality of estimated movement vectors, and outputting each of said estimated movement vectors that have been generated;
difference image data calculating means for calculating difference based on said mixture ratio of said pixel of interest of said frame of interest between each pixel of said frame of interest of said image data and each pixel of a first adjacent frame adjacent to said frame of interest of said image data and outputting as first difference image data, and calculating difference based on said mixture ratio of said pixel of interest of said frame of interest between each pixel of said frame of interest of said image data and each pixel of a second adjacent frame adjacent to said frame of interest of said image data and outputting as second difference image data;
inter-difference-image correlation data computing means for matching the relative position of said first difference image data and said second difference image data based on said estimated movement vector, computing the correlation between said block of interest made up of at least one pixel centered a pixel of said first difference image data corresponding to said pixel of interest of said frame of interest, and said corresponding block made up of at least one pixel of said second difference image data, and outputting as inter-difference-image correlation data; and
detecting means for detecting said estimated movement vector where the correlation is maximum, based on said inter-difference-image correlation data, and outputting as said movement vector corresponding to said pixel of interest of said frame of interest.

82. An image processing device according to claim 81, wherein said inter-difference-image correlation data computing means compute, as said correlation, a difference absolute value between said block of interest and said corresponding block, and output as inter-difference-image correlation data.

83. An image processing device according to claim 81, wherein said inter-difference-image correlation data computing means compute, as said correlation, a sum of absolute value of difference between said block of interest and said corresponding block, and output as inter-weighted-difference-image correlation data.

84. An image processing device according to claim 81, further comprising separating means for separating, from said pixel data, at least said foreground objects, based on said mixture ratio.

85. An image processing device according to claim 84, further comprising movement blurring adjustment means for adjusting the amount of movement blurring of said separated foreground objects, based on said movement vector.

86. An image processing device according to claim 84, further comprising noise removing means for removing noise of said separated foreground objects, based on said movement vector.

87. An image processing method for processing image data made up of a predetermined number of pieces of pixel data obtained by an image-taking device having a predetermined number of pixels having time-integration effects, said method comprising:
  a region specifying step for specifying a mixed region made up of a mixture of a foreground object component configuring foreground objects and a background object component configuring background objects based on said image data, and outputting region information indicating said specified mixed region;
  a mixture ratio estimating step for estimating mixture ratio indicating ratio of mixture between said foreground object component and said background object component in said pixel data belonging to said mixed region, based on said image data and said region information;
  an estimated movement vector generating step for generating a plurality of estimated movement vectors, and outputting each of said estimated movement vectors that have been generated;
  a difference image data calculating step for calculating difference based on said mixture ratio of said pixel of interest of said frame of interest between each pixel of said frame of interest of said image data and each pixel of a first adjacent frame adjacent to said frame of interest of said image data and outputting as first difference image data, and calculating difference based on said mixture ratio of said pixel of interest of said frame of interest between each pixel of said frame of interest of said image data and each pixel of a second adjacent frame adjacent to said frame of interest of said image data and outputting as second difference image data;
  an inter-difference-image correlation data computing step for matching the relative position of said first difference image data and said second difference image data based on said estimated movement vector, computing the correlation between said block of interest made up of at least one pixel centered a pixel of said first difference image data corresponding to said pixel of interest of said frame of interest, and said corresponding block made up of at least one pixel of said second difference image data, and outputting as inter-difference-image correlation data; and
  a detecting step for detecting said estimated movement vector where the correlation is maximum, based on said inter-difference-image correlation data, and outputting as said movement vector corresponding to said pixel of interest of said frame of interest.

88. A recording medium storing a computer-readable image processing program for processing image data made up of a predetermined number of pieces of pixel data obtained by an image-taking device having a predetermined number of pixels having time-integration effects, said program comprising:
  a region specifying step for specifying a mixed region made up of a mixture of a foreground object component configuring foreground objects and a background object component configuring background objects based on said image data, and outputting region information indicating the specified mixed region;
  a mixture ratio estimating step for estimating mixture ratio indicating ratio of mixture between said foreground object component and said background object component in said pixel data belonging to said mixed region, based on said image data and said region information;
  an estimated movement vector generating step for generating a plurality of estimated movement vectors, and outputting each of said estimated movement vectors that have been generated;
  a difference image data calculating step for calculating difference based on said mixture ratio of said pixel of interest of said frame of interest between each pixel of a frame of interest of said image data and each pixel of a first adjacent frame adjacent to said frame of interest of said image data and outputting as first difference image data, and calculating difference based on said mixture ratio of said pixel of interest of said frame of interest between each pixel of said frame of interest of said image data and each pixel of a second adjacent frame adjacent to said frame of interest of said image data and outputting as second difference image data;
  an inter-difference-image correlation data computing step for matching the relative position of said first difference image data and said second difference image data based on said estimated movement vector, computing the correlation between said block of interest made up of at least one pixel centered a pixel of said first difference image data corresponding to said pixel of interest of said frame of interest, and said corresponding block made up of at least one pixel of said second difference image data, and outputting as inter-difference-image correlation data; and
  a detecting step for detecting said estimated movement vector where the correlation is maximum, based on said inter-difference-image correlation data, and outputting as said movement vector corresponding to said pixel of interest of said frame of interest.

89. A program for causing a computer, which processes image data made up of a predetermined number of pieces of pixel data obtained by an image-taking device having a predetermined number of pixels having time-integration effects, to execute:
  a region specifying step for specifying a mixed region made up of a mixture of a foreground object component configuring foreground objects and a background object component configuring background objects based on said image data, and outputting region information indicating said specified mixed region;
  a mixture ratio estimating step for estimating mixture ratio indicating ratio of mixture between said foreground object component and said background object component in said pixel data belonging to said mixed region, based on said image data and said region information;
  an estimated movement vector generating step for generating a plurality of estimated movement vectors, and outputting each of said estimated movement vectors that have been generated;
  a difference image data calculating step for calculating difference based on said mixture ratio of said pixel of interest of said frame of interest between each pixel of said frame of interest of said image data and each pixel of a first adjacent frame adjacent to said frame of interest of said image data and outputting as first difference image data, and calculating difference based on said mixture ratio of said pixel of interest of said frame of interest between each pixel of said frame of interest of said image data and each pixel of a second adjacent frame adjacent to said frame of interest of said image data and outputting as second difference image data;

an inter-difference-image correlation data computing step for matching the relative position of said first difference image data and said second difference image data based on said estimated movement vector, computing the correlation between said block of interest made up of at least one pixel centered a pixel of said first difference image data corresponding to said pixel of interest of said frame of interest, and said corresponding block made up of at least one pixel of said second difference image data, and outputting as inter-difference-image correlation data; and a detecting step for detecting said estimated movement vector where the correlation is maximum, based on said inter-difference-image correlation data, and outputting as said movement vector corresponding to said pixel of interest of said frame of interest.

90. An image-taking device, comprising:

image-taking means for outputting a subject image taken by an image-taking device having a predetermined number of pixels having time-integration effects as image data made up of a predetermined number of pieces of pixel data;

region specifying means for specifying a mixed region made up of a mixture of a foreground object component configuring foreground objects and a background object component configuring background objects based on said image data, and outputting region information indicating said specified mixed region;

mixture ratio estimating means for estimating mixture ratio indicating ratio of mixture between said foreground object component and said background object component in said pixel data belonging to said mixed region, based on said image data and said region information;

estimated movement vector generating means for generating a plurality of estimated movement vectors, and outputting each of said estimated movement vectors that have been generated;

difference image data calculating means for calculating difference based on said mixture ratio of said pixel of interest of said frame of interest between each pixel of said frame of interest of said image data and each pixel of a first adjacent frame adjacent to said frame of interest of said image data and outputting as first difference image data, and calculating difference based on said mixture ratio of said pixel of interest of said frame of interest between each pixel of said frame of interest of said image data and each pixel of a second adjacent frame adjacent to said frame of interest of said image data and outputting as second difference image data;

inter-difference-image correlation data computing means for matching the relative position of said first difference image data and said second difference image data based on said estimated movement vector, computing the correlation between said block of interest made up of at least one pixel centered a pixel of said first difference image data corresponding to said pixel of interest of said frame of interest, and said corresponding block made up of at least one pixel of said second difference image data, and outputting as inter-difference-image correlation data; and detecting means for detecting said estimated movement vector where the correlation is maximum, based on said inter-difference-image correlation data, and outputting as said movement vector corresponding to said pixel of interest of said frame of interest.

91. An image-taking device according to claim 90, wherein said inter-difference-image correlation data computing means compute, as said correlation, a difference absolute value between said block of interest and said corresponding block, and output as said inter-difference-image correlation data.

92. An image-taking device according to claim 90, wherein said inter-difference-image correlation data computing means compute, as said correlation, a sum of absolute value of difference between said block of interest and said corresponding block, and output as inter-weighted-difference-image correlation data.

93. An image-taking device according to claim 90, further comprising separating means for separating, from said pixel data, at least said foreground objects, based on said mixture ratio.

94. An image-taking device according to claim 93, further comprising movement blurring adjustment means for adjusting the amount of movement blurring of said separated foreground objects, based on said movement vector.

95. An image-taking device according to claim 93, further comprising noise removing means for removing noise of said separated foreground objects, based on said movement vector.

96. An image processing device for processing image data made up of a predetermined number of pieces of pixel data obtained by an image-taking device having a predetermined number of pixels having time-integration effects, said image processing device comprising:

weighting information generating means for generating a plurality of weights each with differing values, corresponding to a mixture ratio indicating a mixed state in said pixel data of objects which are multiple in the real world, and generating weighting information indicating said weight of each of the generated weights;

weighted difference image data calculating means for calculating weighted difference based on said weighting indicated by said weighting information between each pixel of said frame of interest of said image data and each pixel of said adjacent frame which is adjacent to said frame of interest of said image data, and outputting as weighted difference image data corresponding to said frame of interest;

movement vector information generating means for generating a plurality of movement vectors each having different values indicating relative movement between said pixel data of said frame of interest and said pixel data of said adjacent frame, and generating movement vector information indicating each of said generated movement vectors;

inter-weighted-difference-image correlation data computing means for matching the relative position of said weighted difference image data of said frame of interest and said weighted difference image data of said adjacent frame according to said movement vector indicated by said movement vector information, computing the correlation between block of interest made up of at least one pixel centered on each pixel of interest of said weighted difference image data of said frame of interest and said corresponding block made up of at least one pixel of said weighted difference image data of said adjacent frame, and outputting as inter-weighted-difference-image correlation data; and detecting means for detecting said weighting and said movement vector where the correlation between said weighted difference image data is maximum, for each predetermined increment made up of at least one pixel of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

97. An image processing device according to claim 96, wherein said inter-weighted-difference-image correlation data computing means match the relative position of at least said weighted difference image data of said frame of interest, said weighted difference image data of a frame before said frame of interest, and said weighted difference image data of a frame following said frame of interest, according to said movement vector indicated by said movement vector information, compute the correlation between said block of interest made up of at least one pixel centered on each pixel of interest of said weighted difference image data of said frame of interest, a corresponding block made up of at least one pixel of said weighted difference image data of said previous frame, and a corresponding block made up of at least one pixel of said weighted difference image data of said following frame, and output as inter-weighted-difference-image correlation data.

98. An image processing device according to claim 96, wherein said inter-weighted-difference-image correlation data computing means compute, as said correlation, a difference absolute value between said block of interest made up of at least one pixel and centered on each pixel of interest of said weighted difference image data of said frame of interest and said corresponding block made up of at least one pixel of said weighted difference image data of said adjacent frame, and output as said inter-weighted-difference-image correlation data.

99. An image processing device according to claim 96, wherein said inter-weighted-difference-image correlation data computing means compute, as said correlation, a sum of absolute value of difference between said block of interest made up of at least one pixel and centered on each pixel of interest of said weighted difference image data of said frame of interest and said corresponding block made up of at least one pixel of said weighted difference image data of said adjacent frame, and output as said inter-weighted-difference-image correlation data.

100. An image processing device according to claim 96, wherein said weighted difference image data calculating means calculate a weighted difference due to said weight indicated by said weighting information between each pixel of said frame of interest and each pixel of said frame prior to said frame of interest in the event that said pixel of said frame of interest belongs to a covered background region formed at a tip side in the direction of movement of an object in the foreground and which is a mixed region wherein a plurality of said objects are mixed, and calculate a weighted difference due to said weight indicated by said weighting information between each pixel of said frame of interest and each pixel of said frame following said frame of interest in the event that said pixel of said frame of interest belongs to an uncovered background region formed at a trailing side in the direction of movement of an object in said foreground and which is a mixed region wherein a plurality of said objects are mixed.

101. An image processing device according to claim 96, comprising region information generating means for specifying a foreground region made up of objects forming a foreground of said plurality of objects in said image data, a background region made up of objects forming a background of said plurality of objects in said image data, a covered background region formed at a tip side in the direction of movement of said foreground objects which is a mixed region wherein a plurality of said objects are mixed, and an uncovered background region formed at a trailing side in the direction of movement of said foreground objects which is said mixed region, and generating region information indicating said foreground region, said background region, and said mixed region including said covered background region and said uncovered background region.

102. An image processing device according to claim 96, wherein said detecting means detect said mixture ratio of said pixel of said frame of interest, belonging to a mixed region where said plurality of objects are mixed.

103. An image processing device according to claim 96, further comprising separating means for separating, from said pixel data, at least objects making up a foreground from said plurality of objects, based on said mixture ratio.

104. An image processing device according to claim 103, further comprising movement blurring adjustment means for adjusting the amount of movement blurring of objects making up said separated foreground.

105. An image processing device according to claim 103, further comprising noise removing means for removing noise of said separated foreground objects, based on said movement vector.

106. An image processing method for processing image data made up of a predetermined number of pieces of pixel data obtained by an image-taking device having a predetermined number of pixels having time-integration effects, said method comprising:

a weighting information generating step for generating a plurality of weights each with differing values, corresponding to a mixture ratio indicating a mixed state in said pixel data of objects which are multiple in the real world, and generating weighting information indicating said weight of each of the generated weights;

a weighted difference image data calculating step for calculating weighted difference based on said weighting indicated by said weighting information between each pixel of said frame of interest of said image data and each pixel of said adjacent frame which is adjacent to said frame of interest of said image data, and outputting as weighted difference image data corresponding to said frame of interest;

a movement vector information generating step for generating a plurality of movement vectors each having different values indicating relative movement between said pixel data of said frame of interest and said pixel data of said adjacent frame, and generating movement vector information indicating each of said generated movement vectors;

an inter-weighted-difference-image correlation data computing step for matching the relative position of said weighted difference image data of said frame of interest and said weighted difference image data of said adjacent frame according to said movement vector indicated by said movement vector information, computing the correlation between block of interest made up of at least one pixel centered on each pixel of interest of said weighted difference image data of said frame of interest and said corresponding block made up of at least one pixel of said weighted difference image data of said adjacent frame, and outputting as inter-weighted-difference-image correlation data; and a detecting step for detecting said weighting and said movement vector where the correlation between said weighted difference image data is maximum, for each predetermined increment made up of at least one pixel of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

107. A recording medium storing a computer-readable image processing program for processing image data made up of a predetermined number of pieces of pixel data obtained by an image-taking device having a predetermined number of pixels having time-integration effects, said program comprising:

a weighting information generating step for generating a plurality of weights each with differing values, corresponding to a mixture ratio indicating a mixed state in said pixel data of objects which are multiple in the real world, and generating weighting information indicating said weight of each of the generated weights;

a weighted difference image data calculating step for calculating weighted difference based on said weighting indicated by said weighting information between each pixel of said frame of interest of said image data and each pixel of said adjacent frame which is adjacent to said frame of interest of said image data, and outputting as weighted difference image data corresponding to said frame of interest;

a movement vector information generating step for generating a plurality of movement vectors each having different values indicating relative movement between said pixel data of said frame of interest and said pixel data of said adjacent frame, and generating movement vector information indicating each of said generated movement vectors;

an inter-weighted-difference-image correlation data computing step for matching the relative position of said weighted difference image data of said frame of interest and said weighted difference image data of said adjacent frame according to said movement vector indicated by said movement vector information, computing the correlation between block of interest made up of at least one pixel centered on each pixel of interest of said weighted difference image data of said frame of interest and said corresponding block made up of at least one pixel of said weighted difference image data of said adjacent frame, and outputting as inter-weighted-difference-image correlation data; and a detecting step for detecting said weighting and said movement vector where the correlation between said weighted difference image data is maximum, for each predetermined increment made up of at least one pixel of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

108. A program for causing a computer, which processes image data made up of a predetermined number of pieces of pixel data obtained by an image-taking device having a predetermined number of pixels having time-integration effects, to execute:

a weighting information generating step for generating a plurality of weights each with differing values, corresponding to a mixture ratio indicating a mixed state in said pixel data of objects which are multiple in the real world, and generating weighting information indicating said weight of each of the generated weights;

a weighted difference image data calculating step for calculating weighted difference based on said weighting indicated by said weighting information between each pixel of said frame of interest of said image data and each pixel of said adjacent frame which is adjacent to said frame of interest of said image data, and outputting as weighted difference image data corresponding to said frame of interest;

a movement vector information generating step for generating a plurality of movement vectors each having different values indicating relative movement between said pixel data of said frame of interest and said pixel data of said adjacent frame, and generating movement vector information indicating each of said generated movement vectors;

an inter-weighted-difference-image correlation data computing step for matching the relative position of said weighted difference image data of said frame of interest and said weighted difference image data of said adjacent frame according to said movement vector indicated by said movement vector information, computing the correlation between block of interest made up of at least one pixel centered on each pixel of interest of said weighted difference image data of said frame of interest and said corresponding block made up of at least one pixel of said weighted difference image data of said adjacent frame, and outputting as inter-weighted-difference-image correlation data; and a detecting step for detecting said weighting and said movement vector where the correlation between said weighted difference image data is maximum, for each predetermined increment made up of at least one pixel of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

109. An image-taking device, comprising:

image-taking means for outputting a subject image taken by an image-taking device having a predetermined number of pixels having time-integration effects as image data made up of a predetermined number of pieces of pixel data;

weighting information generating means for generating a plurality of weights each with differing values, corresponding to a mixture ratio indicating a mixed state in said pixel data of objects which are multiple in the real world, and generating weighting information indicating said weight of each of the generated weights;

weighted difference image data calculating means for calculating weighted difference based on said weighting indicated by said weighting information between each pixel of said frame of interest of said image data and each pixel of said adjacent frame which is adjacent to said frame of interest of said image data, and outputting as weighted difference image data corresponding to said frame of interest;

movement vector information generating means for generating a plurality of movement vectors each having different values indicating relative movement between said pixel data of said frame of interest and said pixel data of said adjacent frame, and generating movement vector information indicating each of said generated movement vectors;

inter-weighted-difference-image correlation data computing means for matching the relative position of said weighted difference image data of said frame of interest and said weighted difference image data of said adjacent frame according to said movement vector indicated by said movement vector information, computing the correlation between block of interest made up of at least one pixel centered on each pixel of interest of said weighted difference image data of said frame of interest and said corresponding block made up of at least one pixel of said weighted difference image data of said adjacent frame, and outputting as inter-weighted-difference-image correlation data; and detecting means for detecting said weighting and said movement vector where the correlation between said weighted difference image data is maximum, for each predetermined increment made up of at least one pixel of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

110. An image-taking device according to claim 109, wherein said inter-weighted-difference-image correlation data computing means match the relative position of at least said weighted difference image data of said frame of interest, said weighted difference image data of a frame before said frame of interest, and said weighted difference image data of a frame following said frame of interest, according to said movement vector indicated by said movement vector information, compute the correlation between said block of interest made up of at least one pixel centered on each pixel of interest of said weighted difference image data of said frame of interest, a corresponding block made up of at least one pixel of said weighted difference image data of said previous frame, and a corresponding block made up of at least one pixel of said weighted difference image data of said following frame, and output as inter-weighted-difference-image correlation data.

111. An image-taking device according to claim 109, wherein said inter-weighted-difference-image correlation data computing means compute, as said correlation, a difference absolute value between said block of interest made up of at least one pixel and centered on each pixel of interest of said weighted difference image data of said frame of interest and said corresponding block made up of at least one pixel of said weighted difference image data of said adjacent frame, and output as said inter-weighted-difference-image correlation data.

112. An image-taking device according to claim 109, wherein said inter-weighted-difference-image correlation data computing means compute, as said correlation, a sum of absolute value of difference between said block of interest made up of at least one pixel and centered on each pixel of interest of said weighted difference image data of said frame of interest and said corresponding block made up of at least one pixel of said weighted difference image data of said adjacent frame, and output as said inter-weighted-difference-image correlation data.

113. An image-taking device according to claim 109, wherein said weighted difference image data calculating means calculate a weighted difference due to said weight indicated by said weighting information between each pixel of said frame of interest and each pixel of said frame prior to said frame of interest in the event that said pixel of said frame of interest belongs to a covered background region formed at a tip side in the direction of movement of an object in the foreground and which is a mixed region wherein a plurality of said objects are mixed, and calculate a weighted difference due to said weight indicated by said weighting information between each pixel of said frame of interest and each pixel of said frame following said frame of interest in the event that said pixel of said frame of interest belongs to an uncovered background region formed at a trailing side in the direction of movement of an object in said foreground and which is a mixed region wherein a plurality of said objects are mixed.

114. An image-taking device according to claim 109, comprising region information generating means for specifying a foreground region made up of objects forming a foreground of said plurality of objects in said image data, a background region made up of objects forming a background of said plurality of objects in said image data, a covered background region formed at a tip side in the direction of movement of said foreground objects which is a mixed region wherein a plurality of said objects are mixed, and an uncovered background region formed at a trailing side in the direction of movement of said foreground objects which is said mixed region, and generating region information indicating said foreground region, said background region, and said mixed region including said covered background region and said uncovered background region.

115. An image-taking device according to claim 109, wherein said detecting means detect said mixture ratio of said pixel of said frame of interest, belonging to a mixed region where said plurality of objects are mixed.

116. An image-taking device according to claim 109, further comprising separating means for separating, from said pixel data, at least objects making up a foreground from said plurality of objects, based on said mixture ratio.

117. An image-taking device according to claim 116, further comprising movement blurring adjustment means for adjusting the amount of movement blurring of objects making up said separated foreground.

118. An image-taking device according to claim 116, further comprising noise removing means for removing noise of said separated foreground objects, based on said movement vector.

119. An image processing device for processing image data made up of a predetermined number of pieces of pixel data obtained by an image-taking device having a predetermined number of pixels having time-integration effects, said image processing device comprising:

weighting information generating means for generating a plurality of weights each with different values, corresponding to a mixture ratio indicating a mixed state in said pixel data of objects which are multiple in the real world, and generating weighting information indicating each of said generated weights;

weighted difference image data calculating means for calculating weighted difference based on said weighting indicated by said weighting information between each pixel of a frame of interest of said image data and each pixel of an adjacent frame which is adjacent to said frame of interest of said image data, and outputting as weighted difference image data corresponding to said frame of interest;

movement vector information generating means for generating a plurality of movement vectors each having different values indicating relative movement between said pixel data of said frame of interest and said pixel data of said adjacent frame, and generating movement vector information indicating each of said generated movement vectors;

inter-weighted-difference-image correlation data computing means for matching the relative position of said weighted difference image data of said frame of interest and said weighted difference image data of said adjacent frame according to said movement vector indicated by said movement vector information, computing the correlation between a first block of interest made up of a plurality of pixels centered on each pixel of interest of said weighted difference image data of said frame of interest and a first corresponding block made up of a plurality of pixels of said weighted difference image data of said adjacent frame, and outputting as inter-weighted-difference-image correlation data; and detecting means for detecting said weighting and said movement vector where the correlation between said weighted difference image data is maximum, for each predetermined increment made up of a plurality of pixels of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

120. An image processing device according to claim 119, wherein said weighted difference image data calculating means calculate weighted difference, based on said weighting indicated by said weighting information between a second block of interest made up of a plurality of pixels centered on each pixel of interest of said frame of interest of said image data and a second corresponding block made up of a plurality of pixels of said adjacent frame adjacent to said frame of interest of said image data, with said weighting corresponding to said plurality of pixels of said second block of interest or said second corresponding block as being constant, and output as weighted difference image data corresponding to said frame of interest;

and wherein said inter-weighted-difference-image correlation data computing means match the relative position of said weighted difference image data of said frame of interest and said weighted difference image data of said adjacent frame according to said movement vector indicated by said movement vector information, compute the correlation between said first block of interest of said weighted difference image data of said frame of interest and said first corresponding block of said weighted difference image data of said adjacent frame, and output as inter-weighted-difference-image correlation data.

121. An image processing device according to claim 119, wherein said weighted difference image data calculating means calculate weighted difference, based on said weighting corresponding to each pixel of said plurality of pixels indicated by said weighting information which is sequentially generated, between a second block of interest made up of a plurality of pixels centered on each pixel of interest of a frame of interest of said image data and a second corresponding block made up of a plurality of pixels of an adjacent frame adjacent to said frame of interest of said image data, and output as said weighted difference image data corresponding to said frame of interest;

and wherein said inter-weighted-difference-image correlation data computing means match the relative position of said weighted difference image data of said frame of interest and said weighted difference image data of said adjacent frame according to said movement vector indicated by said movement vector information, compute the correlation between said first block of interest of said weighted difference image data of said frame of interest and said first corresponding block of said weighted difference image data of said adjacent frame, and output as inter-weighted-difference-image correlation data.

122. An image processing device according to claim 121, wherein said weighted difference image data calculating means calculate weighted difference based on said weighting which continuously changes corresponding to the position of each pixel, as well as corresponding to each pixel of said plurality of pixels indicated by said weighting information which is sequentially generated between said second block of interest and said second corresponding block, and output as weighted difference image data corresponding to said pixel of interest.

123. An image processing device according to claim 121, wherein said detecting means detect most accurate said weight and said movement vector of said plurality of said weights and said movement vectors by evaluating the continuity of said weighting corresponding to each pixel within said first block of interest where the correlation between said weighted difference image data is maximum, set said detected weight to said mixture ratio corresponding to said increment of said frame of interest, set said detected movement vector to said movement vector corresponding to said increment of said frame of interest, and output at least one of said mixture ratio and said movement vector.

124. An image processing method for processing image data made up of a predetermined number of pieces of pixel data obtained by an image-taking device having a predetermined number of pixels having time-integration effects, said method comprising:

a weighting information generating step for generating a plurality of weights each with different values, corresponding to a mixture ratio indicating a mixed state in said pixel data of objects which are multiple in the real world, and generating weighting information indicating each of said generated weights;

a weighted difference image data calculating step for calculating weighted difference based on said weighting indicated by said weighting information between each pixel of a frame of interest of said image data and each pixel of an adjacent frame which is adjacent to said frame of interest of said image data, and outputting as weighted difference image data corresponding to said frame of interest;

a movement vector information generating step for generating a plurality of movement vectors each having different values indicating relative movement between said pixel data of said frame of interest and said pixel data of said adjacent frame, and generating movement vector information indicating each of said generated movement vectors;

an inter-weighted-difference-image correlation data computing step for matching the relative position of said weighted difference image data of said frame of interest and said weighted difference image data of said adjacent frame according to said movement vector indicated by said movement vector information, computing the correlation between a first block of interest made up of a plurality of pixels centered on each pixel of interest of said weighted difference image data of said frame of interest and a first corresponding block made up of a plurality of pixels of said weighted difference image data of said adjacent frame, and outputting as inter-weighted-difference-image correlation data; and a detecting step for detecting said weighting and said movement vector where the correlation between said weighted difference image data is maximum, for each predetermined increment made up of a plurality of pixels of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

125. A recording medium storing a computer-readable image processing program for processing image data made up of a predetermined number of pieces of pixel data obtained by an image-taking device having a predetermined number of pixels having time-integration effects, said program comprising:

a weighting information generating step for generating a plurality of weights each with different values, corresponding to a mixture ratio indicating a mixed state in said pixel data of objects which are multiple in the real world, and generating weighting information indicating each of said generated weights;

a weighted difference image data calculating step for calculating weighted difference based on said weighting indicated by said weighting information between each pixel of a frame of interest of said image data and each pixel of an adjacent frame which is adjacent to said frame of interest of said image data, and outputting as weighted difference image data corresponding to said frame of interest;

a movement vector information generating step for generating a plurality of movement vectors each having different values indicating relative movement between said pixel data of said frame of interest and said pixel data of said adjacent frame, and generating movement vector information indicating each of said generated movement vectors;

an inter-weighted-difference-image correlation data computing step for matching the relative position of said weighted difference image data of said frame of interest and said weighted difference image data of said adjacent frame according to said movement vector indicated by said movement vector information, computing the correlation between a first block of interest made up of a plurality of pixels centered on each pixel of interest of said weighted difference image data of said frame of interest and a first corresponding block made up of a plurality of pixels of said weighted difference image data of said adjacent frame, and outputting as inter-weighted-difference-image correlation data; and a detecting step for detecting said weighting and said movement vector where the correlation between said weighted difference image data is maximum, for each predetermined increment made up of a plurality of pixels of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

126. A program for causing a computer, which processes image data made up of a predetermined number of pieces of pixel data obtained by an image-taking device having a predetermined number of pixels having time-integration effects, to execute:

a weighting information generating step for generating a plurality of weights each with different values, corresponding to a mixture ratio indicating a mixed state in said pixel data of objects which are multiple in the real world, and generating weighting information indicating each of said generated weights;

a weighted difference image data calculating step for calculating weighted difference based on said weighting indicated by said weighting information between each pixel of a frame of interest of said image data and each pixel of an adjacent frame which is adjacent to said frame of interest of said image data, and outputting as weighted difference image data corresponding to said frame of interest;

a movement vector information generating step for generating a plurality of movement vectors each having different values indicating relative movement between said pixel data of said frame of interest and said pixel data of said adjacent frame, and generating movement vector information indicating each of said generated movement vectors;

an inter-weighted-difference-image correlation data computing step for matching the relative position of said weighted difference image data of said frame of interest and said weighted difference image data of said adjacent frame according to said movement vector indicated by said movement vector information, computing the correlation between a first block of interest made up of a plurality of pixels centered on each pixel of interest of said weighted difference image data of said frame of interest and a first corresponding block made up of a plurality of pixels of said weighted difference image data of said adjacent frame, and outputting as inter-weighted-difference-image correlation data; and a detecting step for detecting said weighting and said movement vector where the correlation between said weighted difference image data is maximum, for each predetermined increment made up of a plurality of pixels of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

127. An image-taking device, comprising:

image-taking means for outputting a subject image taken by an image-taking device having a predetermined number of pixels having time-integration effects as image data made up of a predetermined number of pieces of pixel data;

weighting information generating means for generating a plurality of weights each with different values, corresponding to a mixture ratio indicating a mixed state in said pixel data of objects which are multiple in the real world, and generating weighting information indicating each of said generated weights;

weighted difference image data calculating means for calculating weighted difference based on said weighting indicated by said weighting information between each pixel of a frame of interest of said image data and each pixel of an adjacent frame which is adjacent to said frame of interest of said image data, and outputting as weighted difference image data corresponding to said frame of interest;

movement vector information generating means for generating a plurality of movement vectors each having different values indicating relative movement between said pixel data of said frame of interest and said pixel data of said adjacent frame, and generating movement vector information indicating each of said generated movement vectors;

inter-weighted-difference-image correlation data computing means for matching the relative position of said weighted difference image data of said frame of interest and said weighted difference image data of said adjacent frame according to said movement vector indicated by said movement vector information, computing the correlation between a first block of interest made up of a plurality of pixels centered on each pixel of interest of said weighted difference image data of said frame of interest and a first corresponding block made up of a plurality of pixels of said weighted difference image data of said adjacent frame, and outputting as inter-weighted-difference-image correlation data; and detecting means for detecting said weighting and said movement vector where the correlation between said weighted difference image data is maximum, for each predetermined increment made up of a plurality of pixels of said inter-weighted-difference-image correlation data, setting said detected weight to said mixture ratio corresponding to said increment of said frame of interest, setting said detected movement vector to said movement vector corresponding to said increment of said frame of interest, and outputting at least one of said mixture ratio and said movement vector.

128. An image-taking device according to claim 127, wherein said weighted difference image data calculating means calculate weighted difference, based on said weighting indicated by said weighting information between a second block of interest made up of a plurality of pixels centered on each pixel of interest of said frame of interest of said image data and a second corresponding block made up of a plurality of pixels of said adjacent frame adjacent to said frame of interest of said image data, with said weighting corresponding to said plurality of pixels of said second block of interest or said second corresponding block as being constant, and output as weighted difference image data corresponding to said frame of interest;

and wherein said inter-weighted-difference-image correlation data computing means match the relative position of said weighted difference image data of said frame of interest and said weighted difference image data of said adjacent frame according to said movement vector indicated by said movement vector information, compute the correlation between said first block of interest of said weighted difference image data of said frame of interest and said first corresponding block of said weighted difference image data of said adjacent frame, and output as inter-weighted-difference-image correlation data.

129. An image-taking device according to claim 127, wherein said weighted difference image data calculating means calculate weighted difference, based on said weighting corresponding to each pixel of said plurality of pixels indicated by said weighting information which is sequentially generated, between a second block of interest made up of a plurality of pixels centered on each pixel of interest of a frame of interest of said image data and a second corresponding block made up of a plurality of pixels of an adjacent frame adjacent to said frame of interest of said image data, and output as said weighted difference image data corresponding to said frame of interest;

and wherein said inter-weighted-difference-image correlation data computing means match the relative position of said weighted difference image data of said frame of interest and said weighted difference image data of said adjacent frame according to said movement vector indicated by said movement vector information, compute the correlation between said first block of interest of said weighted difference image data of said frame of interest and said first corresponding block of said weighted difference image data of said adjacent frame, and output as inter-weighted-difference-image correlation data.

130. An image-taking device according to claim 129, wherein said weighted difference image data calculating means calculate weighted difference based on said weighting which continuously changes corresponding to the position of each pixel, as well as corresponding to each pixel of said plurality of pixels indicated by said weighting information which is sequentially generated, between said second block of interest and said second corresponding block, and output as weighted difference image data corresponding to said pixel of interest.

131. An image-taking device according to claim 129, wherein said detecting means detect most accurate said weight and said movement vector of said plurality of said weights and said movement vectors by evaluating the continuity of said weighting corresponding to each pixel within said first block of interest where the correlation between said weighted difference image data is maximum, set said detected weight to said mixture ratio corresponding to said increment of said frame of interest, set said detected movement vector to said movement vector corresponding to said increment of said frame of interest, and output at least one of said mixture ratio and said movement vector.

* * * * *